United States Patent
Clark et al.

(10) Patent No.: US 12,552,825 B2
(45) Date of Patent: Feb. 17, 2026

(54) C10-ALKYLENE SUBSTITUTED 13-MEMBERED MACROLIDES AND USES THEREOF

(71) Applicants: Zikani Therapeutics, Inc., Watertown, MA (US); President and Fellows of Harvard College, Cambridge, MA (US)

(72) Inventors: Roger B. Clark, Lexington, MA (US); Richard Alm, Berlin, MA (US); Wesley Francis Austin, Cambridge, MA (US); Philip Hogan, Brighton, MA (US); Ivan Jewett, Boston, MA (US); Sushmita D. Lahiri, Lexington, MA (US); Jonathan F. Lawrence, Somerville, MI (US); Xiben Li, Lexington, MA (US); Shuhao Shi, Madison, CT (US); Wenying Wang, Boston, MA (US); Yoshitaka Ichikawa, Cambridge, MA (US); Andrew G. Myers, Boston, MA (US); Ziyang Zhang, San Francisco, CA (US); Peter Niels Carlsen, Claymont, DE (US); Andre Sanchez, Bradenton, FL (US); Ganapathy Dhandapani, Tunisia (IN); Thrimurtulu Neetipalli, Arlington, MA (US); Md. Ataur Rahman, Arlington, MA (US); Thomas Lepitre, Montreal (CA)

(73) Assignees: Zikani Therapeutics , Inc., Watertown, MA (US); President and Fellows of Harvard College, Cambridge, MA (US)

( * ) Notice: Subject to any disclaimer, the term of this patent is extended or adjusted under 35 U.S.C. 154(b) by 1020 days.

(21) Appl. No.: 17/294,878

(22) PCT Filed: Nov. 18, 2019

(86) PCT No.: PCT/US2019/062030
§ 371 (c)(1),
(2) Date: May 18, 2021

(87) PCT Pub. No.: WO2020/106627
PCT Pub. Date: May 28, 2020

(65) Prior Publication Data
US 2023/0093692 A1     Mar. 23, 2023

(51) Int. Cl.
*C07H 17/00*     (2006.01)
*A61P 31/04*     (2006.01)

(52) U.S. Cl.
CPC .............. *C07H 17/00* (2013.01); *A61P 31/04* (2018.01)

(58) Field of Classification Search
CPC ...................................................... C07H 17/00
See application file for complete search history.

(56) References Cited

FOREIGN PATENT DOCUMENTS

| EP | 1985620 A1 | 10/2008 |
|---|---|---|
| WO | WO 03/014136 | 2/2003 |
| WO | WO 2004/108744 | 12/2004 |
| WO | 2012/001089 A1 | 1/2012 |
| WO | 2014165792 A2 | 10/2014 |
| WO | 2016057798 A1 | 4/2016 |
| WO | 2016154533 A1 | 9/2016 |
| WO | 2016154591 A1 | 9/2016 |
| WO | 2018201076 A2 | 11/2018 |
| WO | 00/31097 A1 | 6/2020 |

OTHER PUBLICATIONS

International Search Report for PCT/US2019/062030 dated Feb. 26, 2020.
Wilkening, R.R. et al., "Novel Transannular Rearrangements of Azalide Iminoethers," *Tetrahedron* 1997, 53, pp. 16923-16944.

*Primary Examiner* — Bahar Craigo
(74) *Attorney, Agent, or Firm* — FINNEGAN, HENDERSON, FARABOW, GARRETT & DUNNER, LLP

(57) ABSTRACT

Provided are 13-membered macrolides for the treatment of infectious diseases. The 13-membered macrolides described herein are azaketolides. Also provided are methods for preparing the 13-membered macrolides, pharmaceutical compositions comprising the 13-membered macrolides, and methods of treating infectious diseases, and in particular, disease resulting from Gram negative bacteria using the disclosed macrolides. Formula (I)

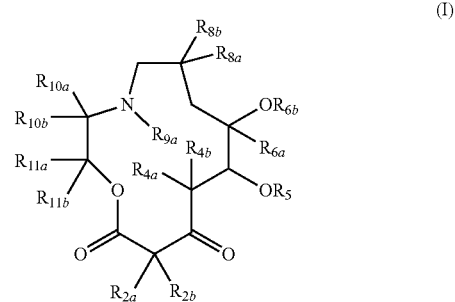

16 Claims, No Drawings

C10-ALKYLENE SUBSTITUTED 13-MEMBERED MACROLIDES AND USES THEREOF

CROSS-REFERENCE TO RELATED APPLICATIONS

This application is a national stage filing under 35 U.S.C. § 371 of International Application No. PCT/US2019/062030, filed Nov. 18, 2019, which claims the benefit of priority to U.S. Provisional Application 62/769,383, filed on Nov. 19, 2018. The entire contents of these applications are incorporated herein by reference.

BACKGROUND

Emerging resistance to existing antibiotics is rapidly developing as a crisis of global proportions, especially for infections originating from drug resistant Gram-negative bacteria. Pathogenic bacteria can transmit genes coding for antibiotic resistance both vertically (to their progeny) and horizontally (to neighboring bacteria of different lineages), and as a result antibiotic resistance can evolve quickly, particularly in nosocomial (hospital) settings. See, e.g., Wright, *Chem. Commun.* (2011) 47:4055-4061. More than 99,000 people die annually in the U.S. from healthcare-associated infections, more than all casualties from car accidents, HIV, and breast cancer combined, creating an estimated burden of up to $45 billion in U.S. healthcare costs. See, e.g., Klevens et al., *Public Health Rep* (2007) 122:160-166. The current crisis is exacerbated by decreased research in the development of new antibiotics by most major pharmaceutical companies. See, e.g., Projan, *Curr. Opin. Microbiol.* (2003) 6:427-430. The current rate of introduction of new antibiotics does not adequately address growing resistance, and with the ease of international travel and increasing population densities, the need for innovation in the field has never been higher.

The macrolides are one of the few major clinically important classes of antibiotics for which the only practical access has been through semi-synthesis, or chemical manipulation of structurally complex fermentation products, in routes as long as 16 steps. See, e.g., Paterson, *Tetrahedron* (1985) 41:3569-3624; Omura, Ed., *Macrolide Antibiotics: Chemistry, Biology, and Practice, Second Edition*; Academic Press, 2002. The macrolide class of antibiotics has proven safe and effective in the battle against pathogenic bacteria since the discovery of erythromycin over 60 years ago. See, e.g., Wu et al., *Curr. Med. Chem.* (2001) 8:1727-1758. Erythromycin displays a spectrum of antibacterial activity against Gram-positive bacteria similar to that of penicillin but has a lesser propensity to induce allergic interactions, and it has been routinely prescribed for upper and lower respiratory tract infections and urogenital infections. See, e.g., Washington et al., *Mayo. Clin. Proc.* (1985) 60:189-203; Washington et al., *Mayo. Clin. Proc.* (1985) 60:271-278. However, erythromycin is known to undergo acid-promoted internal ketalization (cyclization of the C6 and C12 hydroxyl groups onto the C9 ketone) in the gut, which leads to adverse gastrointestinal events. See, e.g., Kurath et al., *Experientia* (1971) 27:362. Second-generation macrolide antibiotics clarithromycin and azithromycin addressed issues of acid instability and were prepared semi-synthetically in 4-6 steps from erythromycin, which is readily available through large-scale fermentation. See, e.g., Ma et al., *Curr. Med. Chem.* (2011) 18:1993-2015; Wu et al., *Curr. Pharm. Des.* (2000) 6:181-223; Ma et al., *Mini-Rev. Med. Chem.* (2010) 10:272-286; Asaka et al., *Curr. Top. Med. Chem.* (Sharjah, United Arab Emirates) (2003) 3:961-989; Morimoto et al., *J. Antibiot.* (1990) 43:286-294; Morimoto et al., *J. Antibiot.* (1984) 37:187-189; Watanabe et al., *J. Antibiot.* (1993) 46: 1163-1167; Watanabe et al., *J. Antibiot.* (1993) 46:647-660; Bright et al., *J. Antibiot.* (1988) 41: 1029-1047; Djokic et al., *J. Antibiot.* (1987) 40:1006-1015; Mutak et al., *J. Antibiot.* (2007) 60: 85-122; and Retsema et al., *Antimicrob. Agents Chemother.* (1987) 31:1939-1947. Azithromycin has been shown to exhibit markedly improved efficacy against Gram negative organisms, and it has a longer half-life and higher tissue distribution than the other macrolide antibiotics, thought to correlate with its 15-membered ring containing a tertiary amine. See, e.g., Ferwerda et al., *J. Antimicrob. Chemother.* (2001) 47:441-446; Girard et al., *Antimicrob. Agents Chemother.* (1987) 31:1948-1954. The natural product tylosin, a 16-membered macrolide used in veterinary medicine, has been shown by X-ray crystallography to occupy the same binding pocket as erythromycin and azithromycin, suggesting that there is a high tolerance for variability in ring size and composition of the macrocycle.

The three primary causes of resistance to macrolides in bacterial organisms are: ribosome methylation encoded by erm genes, mutations in ribosomal RNA or peptides, and cell efflux mediated by mef and msr genes. See, e.g., Leclercq et al., *Antimicrob. Agents Chemother.* (1991) 35:1273-1276; Leclercq et al., *Antimicrob. Agents Chemother.* (1991) 35:1267-1272; Weisblum, *Antimicrob. Agents Chemother.* (1995) 39:577-585; Vester et al., *Antimicrob. Agents Chemother.* (2001) 45:1-12; Prunier et al., *Antimicrob. Agents Chemother.* (2002) 46:3054-3056; Li et al., *J. Antimicrob. Chemother.* (2011) 66:1983-1986; Sutcliffe et al., *Antimicrob. Agents Chemother.* (1996) 40:1817-1824; Wondrack et al., *Antimicrob. Agents Chemother.* (1996) 40: 992-998. Ketolides such as telithromycin and solithromycin defeat the efflux mechanism of resistance by replacement of the C3 cladinose sugar with a carbonyl group (hence the name "ketolides") and are thought to exhibit greatly increased binding by virtue of favorable interactions between the novel aryl-alkyl sidechain and the ribosome. See, e.g., Ma et al., *Curr. Med Chem.* (2011) 18:1993-2015; Ma et al., *Mini-Rev. Med Chem.* (2010) 10:272-286. Despite greatly improved ribosomal binding, ketolides such as telithromycin and solithromycin have not addressed several of the newest forms of macrolide resistance that have evolved in nosocomial settings, especially ribosome methylation and RNA point mutations.

Accordingly, the discovery and development of new antibiotics effective against drug-resistant bacteria, especially Gram-negative bacteria, represents a currently unmet medical need.

SUMMARY

Disclosed herein are compounds that are novel, synthetically accessible 13-membered macrolides. The compounds are novel antibiotics with unexpectedly potent antimicrobial activity.

In one aspect, the present disclosure provides compounds of Formula (I):

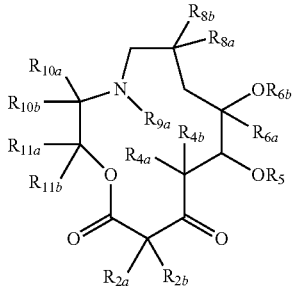

or a pharmaceutically acceptable salt thereof, wherein:
one of $R_{2a}$ and $R_{2b}$ is selected from the group consisting of H, halo, optionally substituted $C_{1-10}$ alkyl, optionally substituted $C_{1-10}$ alkoxy, and optionally substituted $C_{1-10}$ alkenyl, wherein $C_{1-10}$ alkyl, $C_{1-10}$ alkoxy, and $C_{1-10}$ alkenyl are optionally substituted with one or more groups selected from the group consisting of halo, aryl, amino, alkyl, heteroalkyl, heteroalkenyl, heterocycloalkyl, and heteroaryl; and the other of $R_{2a}$ and $R_{2b}$ is selected from the group consisting of halo, optionally substituted $C_{1-10}$ alkyl, optionally substituted $C_{1-10}$ alkoxy, and optionally substituted $C_{1-10}$ alkenyl, wherein $C_{1-10}$ alkyl, $C_{1-10}$ alkoxy, and $C_{1-10}$ alkenyl are optionally substituted with one or more groups selected from the group consisting of halo, aryl, amino, substituted amino, alkyl, heteroalkyl, heteroalkenyl, heterocycloalkyl, and heteroaryl;

each of $R_{4a}$ and $R_{4b}$ is independently selected from the group consisting of H and optionally substituted $C_{1-10}$ alkyl;

$R_5$ is selected from the group consisting of H, an oxygen protecting group, and

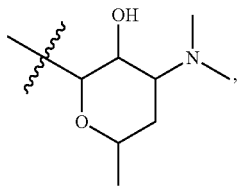 [SMILES: *C1OC(C)CC(N(C)C)C1O]

wherein "⁓" indicates a point of attachment;

$R_{6a}$ is optionally substituted $C_{1-10}$ alkyl;

$R_{6b}$ is H, $C_{1-10}$ alkyl, $C_{1-10}$ hydroxyalkyl, allyl, haloalkyl, aryl, heteroalkenyl, heterocycloalkyl, or heteroaryl, any of which can be optionally substituted with one or more groups selected from the group consisting of halo, aryl, amino, heteroalkyl, heteroalkenyl, heterocycloalkyl, and heteroaryl;

$R_{8a}$ and $R_{8b}$ are each independently selected from the group consisting of H and optionally substituted $C_{1-10}$ alkyl;

$R_{9a}$ is selected from the group consisting of H, optionally substituted $C_{1-10}$ alkyl, hydroxyalkyl, optionally substituted $C_{1-10}$ alkylene-$NR_TR_{T'}$, optionally substituted $C_{1-10}$ alkylene-cycloalkyl-$NR_TR_{T'}$, and optionally substituted alkoxyalkyl; wherein $R_T$ and $R_{T'}$ are each independently selected from the group consisting of H, optionally substituted alkyl, and optionally substituted $C_{1-10}$ alkylene-heterocycloalkyl;

one of $R_{10a}$ and $R_{10b}$ is selected from the group consisting of H, optionally substituted $C_{1-10}$ alkyl, optionally substituted $C_{1-10}$ alkoxy, and the other of $R_{10a}$ and $R_{10b}$ is selected from the group consisting of —$CO_2H$, —$CO_2$-optionally substituted alkyl, —$CON(R_z)(R_{z'})$, optionally substituted $C_{1-10}$ alkylene-$R_{101}$, optionally substituted $C_{2-10}$ alkenylene-$R_{101}$, and optionally substituted $C_{2-10}$ alkynylene-$R_{101}$; wherein:

$R_{101}$ is selected from the group consisting of H, ($C_{1-6}$ alkyl)-S—, ($C_{1-6}$ alkyl)-SO—, ($C_{1-6}$ alkyl)-$SO_2$—, —OH, optionally substituted —O—($C_{1-6}$ alkyl), —$NR_xR_{x'}$, optionally substituted cycloalkyl, optionally substituted heterocycloalkyl, optionally substituted aryl, and optionally substituted heteroaryl; wherein:

$R_z$ and $R_{z'}$ are each independently H or optionally substituted alkyl;

$R_x$ and $R_{x'}$ are each independently selected from the group consisting of H, optionally substituted alkyl, optionally substituted carbocyclyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-N($R_{y'}$)($R_{y''}$), wherein $R_{y'}$ and $R_{y''}$ are each independently H or optionally substituted alkyl; or $R_x$ and $R_{x'}$ together with the atom to which they are attached form an optionally substituted 3-, 4-, 5-, 6-, or 7-membered ring optionally containing an additional heteroatom selected from the group consisting of O, S, SO, $SO_2$, $NR_y$, and N—$C_1$-$C_{10}$ alkyl; and wherein each $R_y$ is independently selected from the group consisting of —H and optionally substituted $C_{1-10}$ alkyl; and $R_{11a}$ and $R_{11b}$ are each independently selected from the group consisting of —H and optionally substituted $C_{1-10}$ alkyl.

The disclosed compounds have anti-microbial activity and may be used to treat and/or prevent infectious diseases. Pharmaceutical compositions of the compounds, and methods of treatment and prevention using the compounds or compositions thereof are provided herein. Infectious diseases which may be treated with compounds of the invention include, but are not limited to, bacterial infections caused by *Staphylococcus, Acinetobacter, Klebsiella, Escherichia*, and *Pseudomonas* species.

Methods of preparing the compounds are also provided herein. The present disclosure also provides intermediates in the preparation of the compounds described herein.

The details of certain embodiments of the invention are set forth in the Detailed Description of Certain Embodiments, as described below. Other features, objects, and advantages of the invention will be apparent from the Definitions, Drawings, Examples, and Claims.

DETAILED DESCRIPTION OF CERTAIN EMBODIMENTS

The compounds disclosed herein include 13-membered azaketolides. The disclosed compounds may have reduced structural complexity over known macrolides, providing compounds that may be accessed by less demanding synthetic routes over routes required for other macrolides. Despite their reduced structural complexity, the disclosed 13-membered azaketolides provide unexpected and potent activity against various microorganisms, including Gram negative bacteria. Also disclosed are methods for the preparation of the compounds, pharmaceutical compositions comprising the compounds, and methods of using the compounds (e.g., treatment of an infectious disease).

In certain embodiments, provided are compounds of formula I:

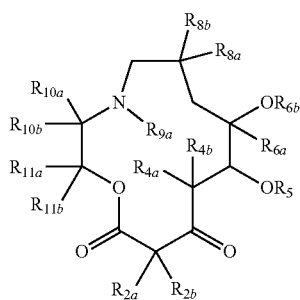

I or a pharmaceutically acceptable salt thereof, wherein:
one of $R_{2a}$ and $R_{2b}$ is selected from the group consisting of H, halo, optionally substituted $C_{1-10}$ alkyl, optionally substituted $C_{1-10}$ alkoxy, and optionally substituted $C_{1-10}$ alkenyl, wherein $C_{1-10}$ alkyl, $C_{1-10}$ alkoxy, and $C_{1-10}$ alkenyl are optionally substituted with one or more groups selected from the group consisting of halo, aryl, amino, alkyl, heteroalkyl, heteroalkenyl, heterocycloalkyl, and heteroaryl; and the other of $R_{2a}$ and $R_{2b}$ is selected from the group consisting of halo, optionally substituted $C_{1-10}$ alkyl, optionally substituted $C_{1-10}$ alkoxy, and optionally substituted $C_{1-10}$ alkenyl, wherein $C_{1-10}$ alkyl, $C_{1-10}$ alkoxy, and $C_{1-10}$ alkenyl are optionally substituted with one or more groups selected from the group consisting of halo, aryl, amino, substituted amino, alkyl, heteroalkyl, heteroalkenyl, heterocycloalkyl, and heteroaryl;

each of $R_{4a}$ and $R_{4b}$ is independently selected from the group consisting of H and optionally substituted $C_{1-10}$ alkyl;

$R_5$ is selected from the group consisting of H, an oxygen protecting group, and

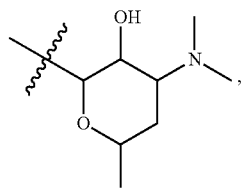 [SMILES: *C1OC(C)CC(N(C)C)C1O]

wherein "⌇" indicates appoint of attachment;
$R_{6a}$ is optionally substituted $C_{1-10}$ alkyl;
$R_{6b}$ is H, $C_{1-10}$ alkyl, $C_{1-10}$ hydroxyalkyl, allyl, haloalkyl, aryl, heteroalkenyl, heterocycloalkyl, or heteroaryl, any of which can be optionally substituted with one or more groups selected from the group consisting of halo, aryl, amino, heteroalkyl, heteroalkenyl, heterocycloalkyl, and heteroaryl;
$R_{8a}$ and $R_{8b}$ are each independently selected from the group consisting of H and optionally substituted $C_{1-10}$ alkyl;
$R_{9a}$ is selected from the group consisting of H, optionally substituted $C_{1-10}$ alkyl, hydroxyalkyl, optionally substituted $C_{1-10}$ alkylene-$NR_TR_{T'}$, optionally substituted $C_{1-10}$ alkylene-cycloalkyl-$NR_TR_{T'}$, and optionally substituted alkoxyalkyl; wherein $R_T$ and $R_{T'}$ are each independently selected from the group consisting of H, optionally substituted alkyl, and optionally substituted $C_{1-10}$ alkylene-heterocycloalkyl;

one of $R_{10a}$ and $R_{10b}$ is selected from the group consisting of H, optionally substituted $C_{1-10}$ alkyl, optionally substituted and the other of $R_{10a}$ and $R_{10b}$ is selected from the group consisting of —$CO_2H$, —$CO_2$-optionally substituted alkyl, —$CON(R_z)(R_{z''})$, optionally substituted $C_{1-10}$ alkylene-$R_{101}$, optionally substituted $C_{2-10}$ alkenylene-$R_{101}$, and optionally substituted $C_{2-10}$ alkynylene-$R_{101}$; wherein:

$R_{101}$ is selected from the group consisting of H, ($C_{1-6}$ alkyl)-S—, ($C_{1-6}$ alkyl)-SO—, ($C_{1-16}$ alkyl)-$SO_2$—, —OH, optionally substituted —O—($C_{1-6}$ alkyl), —$NR_xR_{x'}$, optionally substituted cycloalkyl, optionally substituted heterocycloalkyl, optionally substituted aryl, and optionally substituted heteroaryl; wherein:

$R_{z'}$ and $R_{z''}$ are each independently H or optionally substituted alkyl;

$R_x$ and $R_{x'}$ are each independently selected from the group consisting of H, optionally substituted alkyl, optionally substituted carbocyclyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-$N(R_{y'})(R_{y''})$, wherein $R_{y'}$ and $R_{y''}$ are each independently H or optionally substituted alkyl; or $R_x$ and $R_{x'}$ together with the atom to which they are attached form an optionally substituted 3-, 4-, 5-, 6-, or 7-membered ring optionally containing an additional heteroatom selected from the group consisting of O, S, SO, $SO_2$, $NR_y$, and N—$C_1$-$C_{10}$ alkyl; and wherein each $R_y$ is independently selected from the group consisting of —H and optionally substituted $C_{1-10}$ alkyl; and $R_{11a}$ and $R_{11b}$ are each independently selected from the group consisting of —H and optionally substituted $C_{1-10}$ alkyl.

In certain embodiments, provided are compounds of formula I:

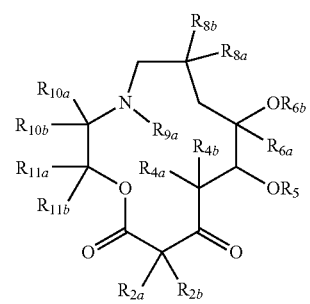

I or a pharmaceutically acceptable salt thereof, wherein:
one of $R_{2a}$ and $R_{2b}$ is selected from the group consisting of H, halo, optionally substituted $C_{1-10}$ alkyl, optionally substituted $C_{1-10}$ alkoxy, and optionally substituted $C_{1-10}$ alkenyl, wherein $C_{1-10}$ alkyl, $C_{1-10}$ alkoxy, and $C_{1-10}$ alkenyl are optionally substituted with one or more groups selected from the group consisting of halo, aryl, amino, alkyl, heteroalkyl, heteroalkenyl, heterocycloalkyl, and heteroaryl; and the other of $R_{2a}$ and $R_{2b}$ is selected from the group consisting of halo, optionally substituted $C_{1-10}$ alkyl, optionally substituted $C_{1-10}$ alkoxy, and optionally substituted $C_{1-10}$ alkenyl, wherein $C_{1-10}$ alkyl, $C_{1-10}$ alkoxy, and $C_{1-10}$ alkenyl are optionally substituted with one or more groups selected from the group consisting of halo, aryl, amino, alkyl, heteroalkyl, heteroalkenyl, heterocycloalkyl, and heteroaryl;

each of $R_{4a}$ and $R_{4b}$ is independently selected from the group consisting of H and optionally substituted $C_{1-10}$ alkyl;

$R_5$ is selected from the group consisting of H, an oxygen protecting group, and

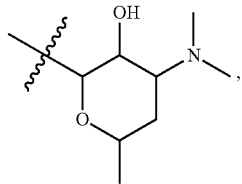 [SMILES: *C1OC(C)CC(N(C)C)C1O]

wherein "⌇⌇" indicates appoint of attachment;

$R_{6a}$ is optionally substituted $C_{1-10}$ alkyl;

$R_{6b}$ is H, $C_{1-10}$ alkyl, $C_{1-10}$ hydroxyalkyl, allyl, haloalkyl, aryl, heteroalkenyl, heterocycloalkyl, or heteroaryl, any of which can be optionally substituted with one or more groups selected from the group consisting of halo, aryl, amino, heteroalkyl, heteroalkenyl, heterocycloalkyl, and heteroaryl;

$R_{8a}$ and $R_{8b}$ are each independently selected from the group consisting of H and optionally substituted $C_{1-10}$ alkyl;

$R_{9a}$ is selected from the group consisting of H, optionally substituted $C_{1-10}$ alkyl, hydroxyalkyl, and optionally substituted alkoxyalkyl;

one of $R_{10a}$ and $R_{10b}$ is selected from the group consisting of H, optionally substituted $C_{1-10}$ alkyl, optionally substituted and the other of $R_{10a}$ and $R_{10b}$ is selected from the group consisting of —$CO_2H$, —$CO_2$-optionally substituted alkyl, —$CON(R_{z'})(R_{z''})$, optionally substituted $C_{1-10}$ alkylene-$R_{101}$, optionally substituted $C_{2-10}$ alkenylene-$R_{101}$, and optionally substituted $C_{2-10}$ alkynylene-$R_{101}$; wherein:

$R_{101}$ is selected from the group consisting of H, ($C_{1-6}$ alkyl)-S—, ($C_{1-6}$ alkyl)-SO—, ($C_{1-6}$ alkyl)-$SO_2$—, —OH, optionally substituted —O—($C_{1-6}$ alkyl), —$NR_xR_{x'}$, optionally substituted cycloalkyl, optionally substituted heterocycloalkyl, optionally substituted aryl, and optionally substituted heteroaryl; wherein:

$R_{z'}$ and $R_{z''}$ are each independently H or optionally substituted alkyl;

$R_x$ and $R_{x'}$ are each independently selected from the group consisting of H, optionally substituted alkyl, optionally substituted cycloalkyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-N($R_{y'}$)($R_{y''}$), wherein $R_{y'}$ and $R_{y''}$ are each independently H or optionally substituted alkyl; or $R_x$ and $R_{x'}$ together with the atom to which they are attached form a 3-, 4-, 5-, 6-, or 7-membered ring optionally containing an additional heteroatom selected from the group consisting of O, S, SO, $SO_2$, $NR_y$, and N—$C_1$-$C_{10}$ alkyl; and wherein each $R_y$ is independently selected from the group consisting of —H and optionally substituted $C_{1-10}$ alkyl; and $R_{11a}$ and $R_{11b}$ are each independently selected from the group consisting of —H and optionally substituted $C_{1-10}$ alkyl.

One embodiment of a compound of formula I is a compound of formula IA:

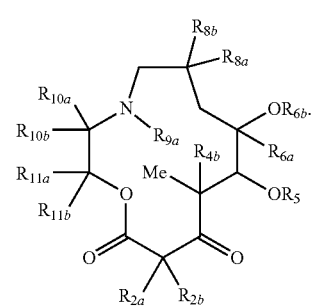

IA

Another embodiment of a compound of formula I and IA is a compound of formula IB:

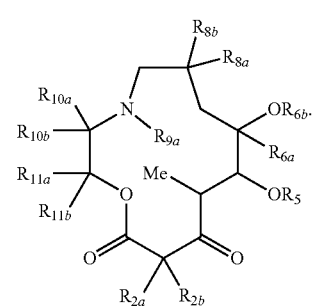

IB

In certain embodiments of the compound of formula I, IA, and IB, $R_5$ is

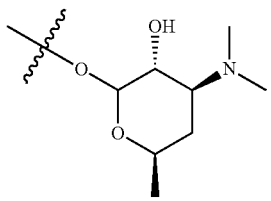 [SMILES: *OC1O[C@H](C)C[C@H](N(C)C)[C@H]1O]

Another embodiment of a compound of formula I, IA, and IB is a compound of formula IC:

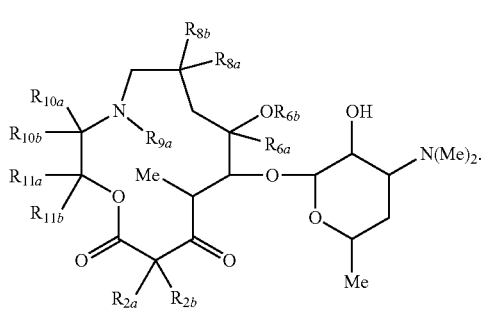

IC

Another embodiment of a compound of formula I, IA, IB, and IC is a compound of formula ID:

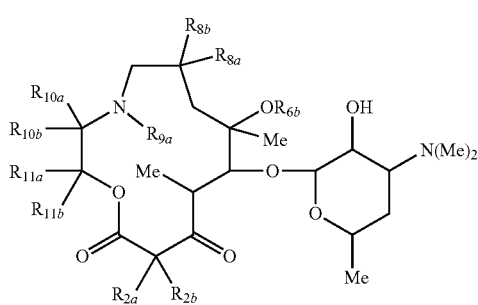

ID

In another embodiment of a compound of formula I, IA, IB, IC, and ID, $R_{6b}$ is selected from the group consisting of —H, optionally substituted $C_1$-$C_{10}$ alkyl, optionally substituted $C_1$-$C_{10}$ hydroxyalkyl, and allyl.

In another embodiment of a compound of formula I, IA, IB, IC, and ID, $R_{6b}$ is selected from the group consisting of: methyl, hydroxymethyl, hydroxyethyl, hydroxypropyl, hydroxybutyl, hydroxypentyl, hydroxyhexyl, —CH$_2$CHOHCH$_2$OH, and allyl.

Another embodiment of a compound of formula I, IA, IB, IC, and ID is a compound of formula IE:

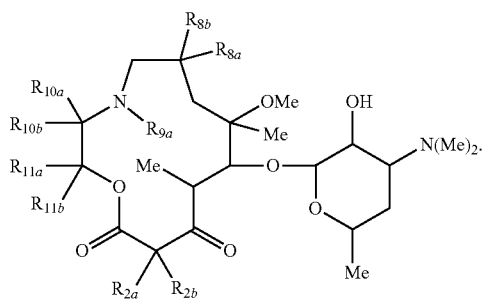

IE

Another embodiment of a compound of formula I, IA, IB, IC, ID, and IE is a compound of formula IF:

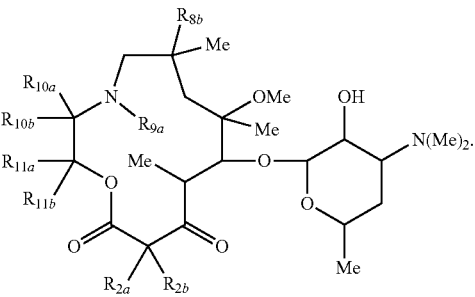

IF

Another embodiment of a compound of formula I, IA, IB, IC, ID, IE, and IF is a compound of formula IG:

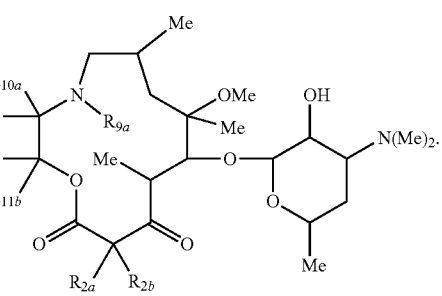

IG

In another embodiment of a compound of formula I, IA, IB, IC, ID, IE, IF, or IG, $R_{9a}$ is —H or optionally substituted $C_{1-4}$ alkyl.

In another embodiment of a compound of formula I, IA, IB, IC, ID, IE, IF, or IG, $R_{9a}$ is —H, methyl, ethyl, propyl, isopropyl, butyl, or isobutyl. In another embodiment of a compound of formula I, IA, IB, IC, ID, IE, IF, and IG, $R_{9a}$ is —H, or methyl.

In another embodiment of a compound of formula I, IA, IB, IC, ID, IE, IF, or IG $R_{11a}$ and $R_{11b}$ are —H.

In another embodiment of a compound of formula I, IA, IB, IC, ID, IE, IF, or IG, one of $R_{11a}$ and $R_{11b}$ is —H and the other is optionally substituted $C_{1-10}$ alkyl.

In another embodiment of a compound of formula I, IA, IB, IC, ID, IE, IF, or IG, one of $R_{11a}$ and $R_{11b}$ is —H and the other is methyl.

In another embodiment of a compound of formula I, IA, IB, IC, ID, IE, IF, or IG, $R_{11a}$ and $R_{11b}$ are each independently optionally substituted $C_{1-10}$ alkyl.

In another embodiment of a compound of formula I, IA, IB, IC, ID, IE, IF, or IG, $R_{11a}$ and $R_{11b}$ are each methyl.

In another embodiment of a compound of formula I, IA, IB, IC, ID, IE, IF, or IG, one of $R_{2a}$ and $R_{2b}$ is optionally substituted $C_{1-10}$ alkyl.

In another embodiment of a compound of formula I, IA, IB, IC, ID, IE, IF, or IG, one of $R_{2a}$ and $R_{2b}$ is optionally substituted aminoalkyl.

In another embodiment of a compound of formula I, IA, IB, IC, ID, IE, IF, or IG, one of $R_{2a}$ and $R_{2b}$ is optionally substituted $C_{1-10}$ alkyl and the other of $R_{2a}$ and $R_{2b}$ is H.

In another embodiment of a compound of formula I, IA, IB, IC, ID, IE, IF, or IG, both of $R_{2a}$ and $R_{2b}$ are optionally substituted $C_{1-10}$ alkyl.

In another embodiment of a compound of formula I, IA, IB, IC, ID, IE, IF, or IG, one of $R_{2a}$ and $R_{2b}$ is methyl.

In another embodiment of a compound of formula I, IA, IB, IC, ID, IE, IF, or IG, one of $R_{2a}$ and $R_{2b}$ is methyl and the other of $R_{2a}$ and $R_{2b}$ is H.

In another embodiment of a compound of formula I, IA, IB, IC, ID, IE, IF, or IG, both of $R_{2a}$ and $R_{2b}$ are methyl.

In another embodiment of a compound of formula I, IA, IB, IC, ID, IE, IF, or IG, one of $R_{2a}$ and $R_{2b}$ is methyl and the other is halo. In a further embodiment, halo is selected from the group consisting of F and Cl.

In another embodiment of a compound of formula I, IA, IB, IC, ID, IE, IF, or IG, one of $R_{2a}$ and $R_{2b}$ is methyl and the other is optionally substituted $C_{1-10}$ alkyl.

In another embodiment of a compound of formula I, IA, IB, IC, ID, IE, IF, or IG, one of $R_{2a}$ and $R_{2b}$ is methyl and the other is selected from the group consisting of optionally substituted $C_{1-10}$ alkyl, optionally substituted $C_{1-10}$ alkoxy, and optionally substituted $C_{1-10}$ alkenyl, wherein $C_{1-10}$ alkyl, $C_{1-10}$ alkoxy, and $C_{1-10}$ alkenyl are optionally substituted with one or more groups selected from halo, aryl, and heteroaryl.

Another embodiment of a compound of formula I, IA, IB, IC, ID, IE, IF, or IG is a compound of formula IG-1.

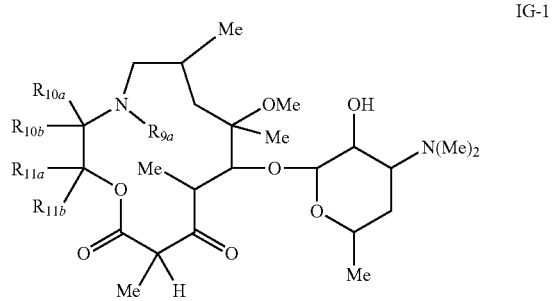

IG-1

Another embodiment of a compound of formula I, IA, IB, IC, ID, IE, IF, or IG is a compound of formula IH-1.

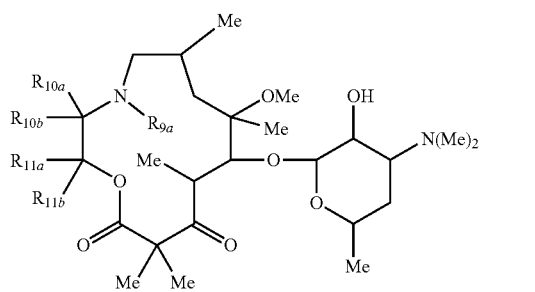

In another embodiment of a compound of formula I, IA, IB, IC, ID, IE, IF, IG, IG-1, or IH $R_{9a}$ is —H, methyl, ethyl, propyl, isopropyl, butyl, or isobutyl. In another embodiment of a compound of formula I, IA, IB, IC, ID, IE, IF, and IG, $R_{9a}$ is —H, or methyl.

In another embodiment of a compound of formula I, IA, IB, IC, ID, IE, IF, IG, IG-1, or IH, one of $R_{10a}$ and $R_{10b}$ is H or optionally substituted $C_{1-10}$ alkyl.

In another embodiment of a compound of formula I, IA, IB, IC, ID, IE, IF, IG, IG-1, or IH, one of $R_{10a}$ and $R_{10b}$ is H.

In another embodiment of a compound of formula I, IA, IB, IC, ID, IE, IF, IG, IG-1 or IH, one of $R_{10a}$ and $R_{10b}$ is optionally substituted $C_{1-10}$ alkyl.

In another embodiment of a compound of formula I, IA, IB, IC, ID, IE, IF, IG, IG-1, or IH, one of $R_{10a}$ and $R_{10b}$ is methyl.

Another embodiment of a compound of formula I, IA, IB, IC, ID, IE, IF, IG, or IH is a compound of formula IIA, IIB, IIC, or IID:

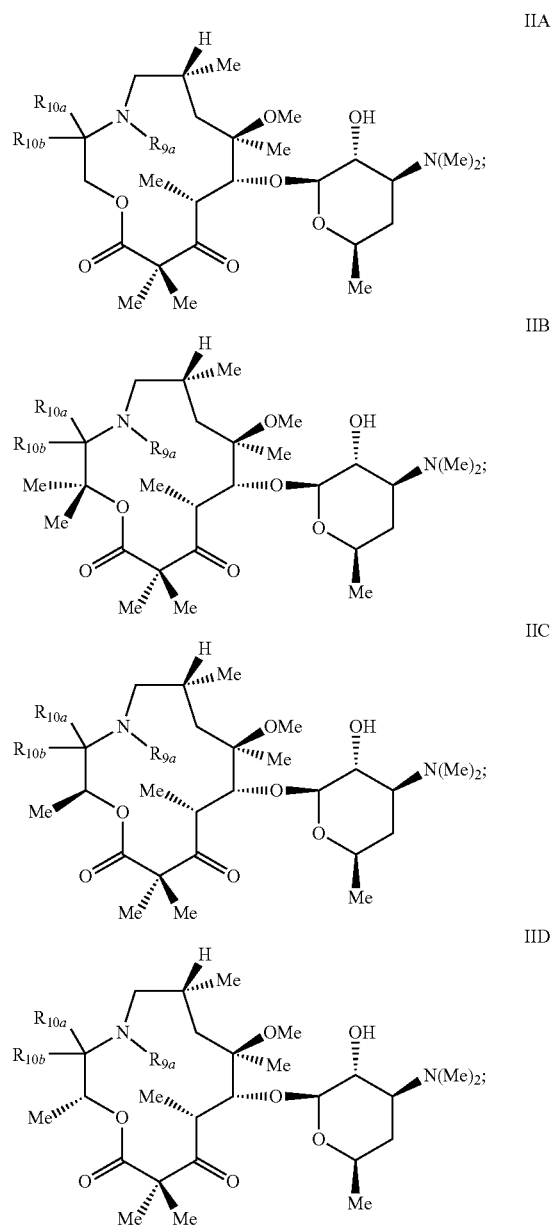

wherein one of $R_{10a}$ and $R_{10b}$ is selected from the group consisting of H and optionally substituted $C_{1-10}$ alkyl; and the other of $R_{10a}$ and $R_{10b}$ is selected from the group consisting of —$CO_2H$, and —$CO_2$-alkyl, optionally substituted $C_{1-10}$ alkylene-$R_{101}$, $C_{2-10}$ alkenylene-$R_{101}$, and $C_{2-10}$ alkynylene-$R_{101}$; wherein $R_{101}$ is selected from the group consisting H, ($C_{1-6}$ alkyl)-S—, ($C_{1-6}$ alkyl)-SO—, ($C_{1-6}$ alkyl)-$SO_2$— —OH, —O-alkyl, —$NR_xR_{x'}$, optionally substituted cycloalkyl, optionally substituted heterocycloalkyl, optionally substituted aryl, and optionally substituted heteroaryl;

$R_x$ and $R_{x'}$ are each independently selected from the group consisting of —H, optionally substituted alkyl, optionally substituted carbocyclyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-N($R_{y'}$)($R_{y''}$); or $R_x$ and $R_{x'}$ together with the atom to which they are attached form an optionally substituted 3-, 4-, 5-, 6-, or 7-membered ring optionally containing an additional heteroatom selected from the group consisting of O, S, SO, $SO_2$, $NR_y$, and N—$C_1$-$C_{10}$ alkyl; and wherein:

each $R_y$ is independently selected from the group consisting of H and optionally substituted $C_{1-10}$ alkyl.

Another embodiment of a compound of formula I, IA, IB, IC, ID, IE, IF, IG, or IH is a compound of formula IIA, IIB, IIC, or IID:

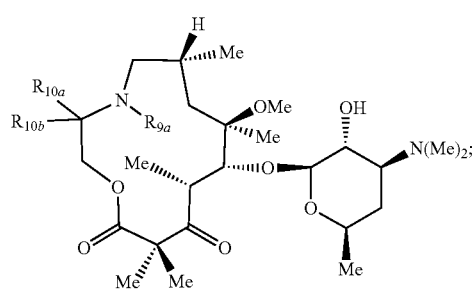

IIA

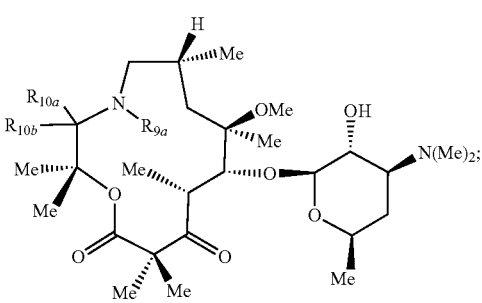

IIB

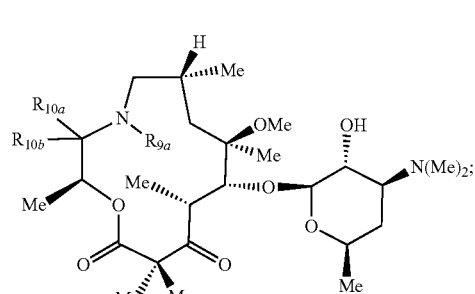

IIC

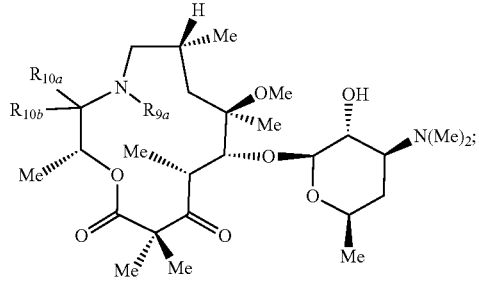

IID wherein one of $R_{10a}$ and $R_{10b}$ is selected from the group consisting of H and optionally substituted $C_{1-10}$ alkyl; and the other of $R_{10a}$ and $R_{10b}$ is selected from the group consisting of —$CO_2H$, and —$CO_2$-alkyl, optionally substituted $C_{1-10}$ alkylene-$R_{101}$, $C_{2-10}$ alkenylene-$R_{101}$, and $C_{2-10}$ alkynylene-$R_{101}$; wherein $R_{101}$ is selected from the group consisting H, ($C_{1-6}$ alkyl)-S—, ($C_{1-6}$ alkyl)-SO—, ($C_{1-6}$ alkyl)-$SO_2$— —OH, —O-alkyl, —$NR_xR_{x'}$, optionally substituted cycloalkyl, optionally substituted heterocycloalkyl, optionally substituted aryl, and optionally substituted heteroaryl;

$R_x$ and $R_{x'}$ are each independently selected from the group consisting of —H, optionally substituted alkyl, optionally substituted cycloalkyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-N($R_{y'}$)($R_{y''}$); or $R_x$ and $R_{x'}$ together with the atom to which they are attached form a 3-, 4-, 5-, 6-, or 7-membered ring optionally containing an additional heteroatom selected from the group consisting of O, S, SO, $SO_2$, $NR_y$, and N—$C_1$-$C_{10}$ alkyl; and wherein:

each $R_y$ is independently selected from the group consisting of H and optionally substituted $C_{1-10}$ alkyl.

In one embodiment of a compound of formula IIA, IIB, IIC, and IID, $R_{9a}$ is —H, methyl, ethyl, propyl, isopropyl, butyl, or isobutyl. In another embodiment of a compound of formula IIA, IIB, IIC, and IID, $R_{9a}$ is —H, or methyl.

Another embodiment of a compound of formula IIA, IIB, IIC, and IID is a compound of formula IIA-1, IIA-2, IIB-1, IIB-2, IIC-1, IIC-2, IID-1, or IID-2:

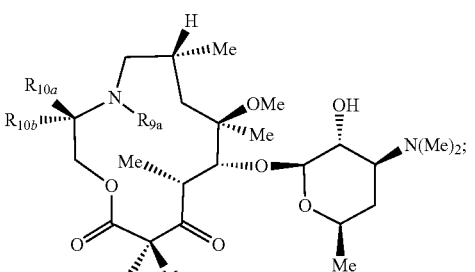

IIA-1

IIA-2
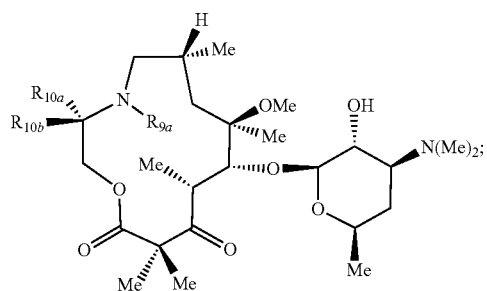

IIB-1
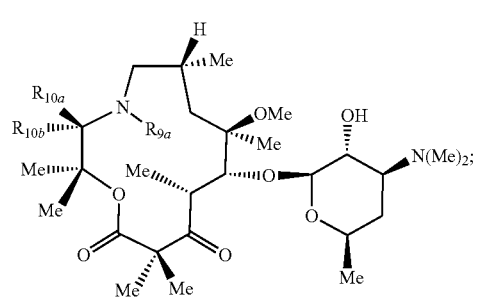

IIB-2
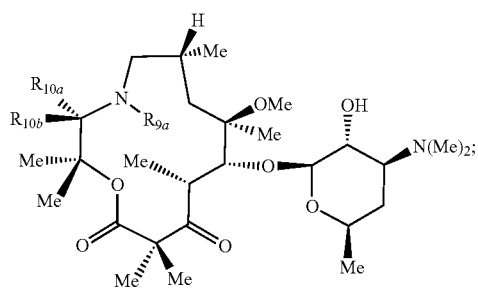

IIC-1
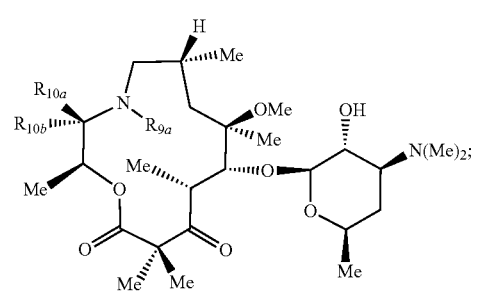

IIC-2
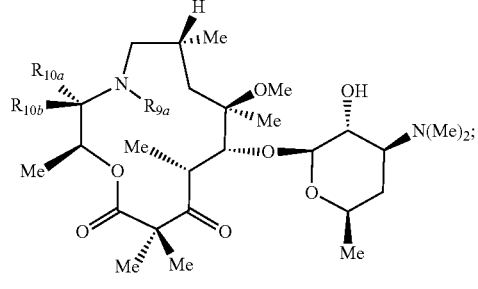

IID-1
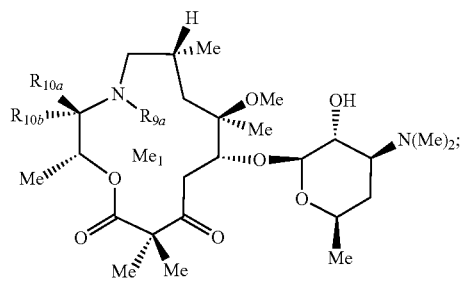

IID-2
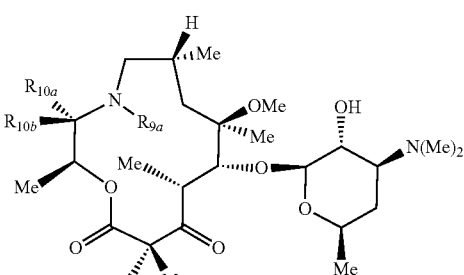

In one embodiment of a compound of formula IIA-1, IIA-2, IIB-1, IIB-2, IIC-1, IIC-2, IID-1, or IID-2, $R_{9a}$ is —H, methyl, ethyl, propyl, isopropyl, butyl, or isobutyl. In another embodiment of a compound of formula IIA-1, IIA-2, IIB-1, IIB-2, IIC-1, IIC-2, IID-1, or ID-2, $R_{9a}$ is —H, or methyl.

Another embodiment of a compound of formula IIA, IIB, IIC, and IID is a compound of formula IIA-1a, IIA-2a, IIB-1a, IIB-2a, IIC-1a, IIC-2a, IID-1a, or IID-2a:

IIA-1a
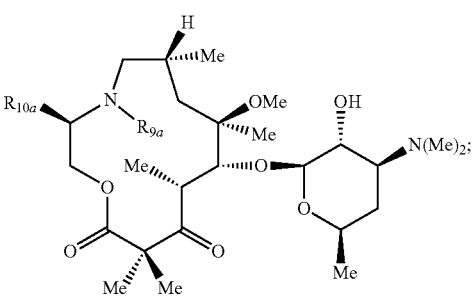

IIA-2a
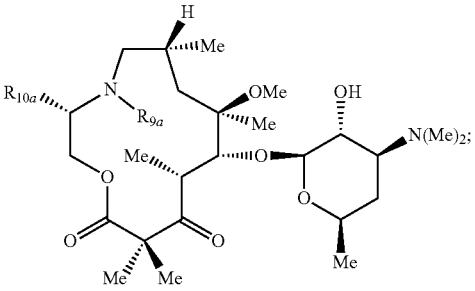

IIB-1a
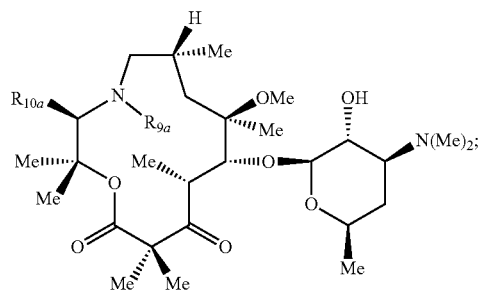

IIB-2a
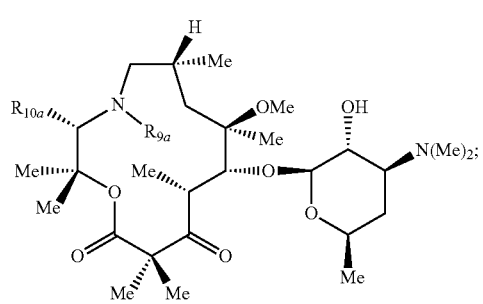

IIC-1a
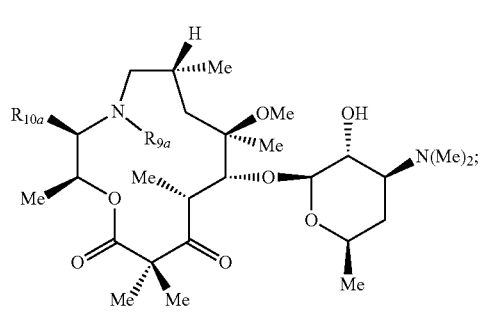

IIC-2a
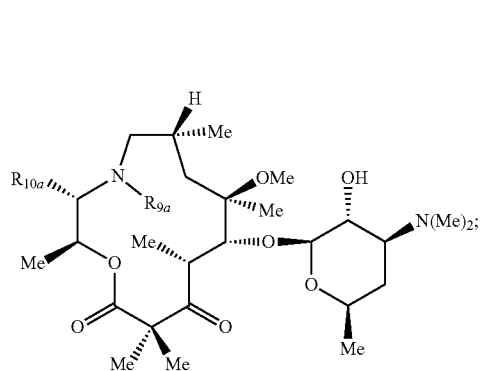

IID-1a
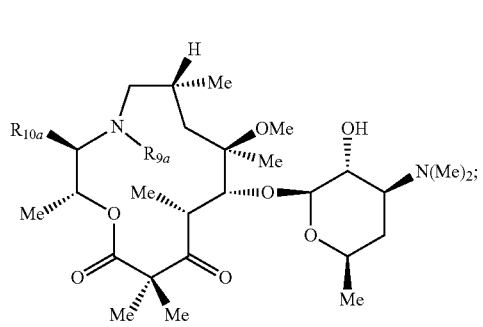

IID-2a
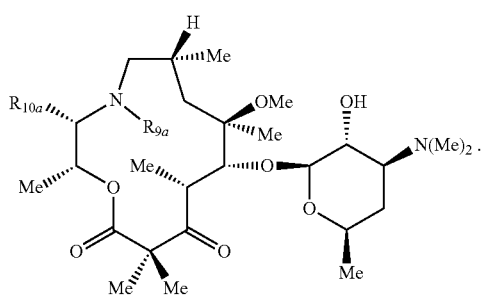

In one embodiment of a compound of formula IIA-1a, IIA-2a, IIB-1a, IIB-2a, IIC-1a, IIC-2a, IID-1a, or IID-2a, $R_{9a}$ is —H, methyl, ethyl, propyl, isopropyl, butyl, or isobutyl. In another embodiment of a compound of formula IIA-1a, IIA-2a, IIB-1a, IIB-2a, IIC-1a, IIC-2a, IID-1a, or IID-2a, $R_{9a}$ is —H, or methyl.

Another embodiment of a compound of formula IIA, IIB, IIC, and IID is a compound of formula IIA-1b, IIA-2b, IID-1b, IIB-2b, IIC-1b, IIC-2b, IID-1b, or IID-2b:

IIA-1b
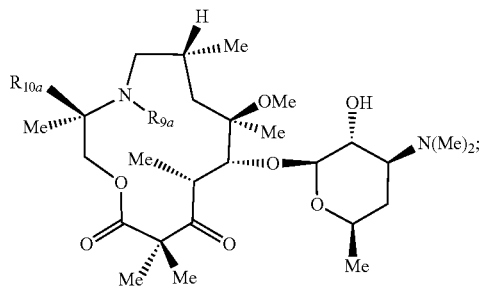

IA-2b
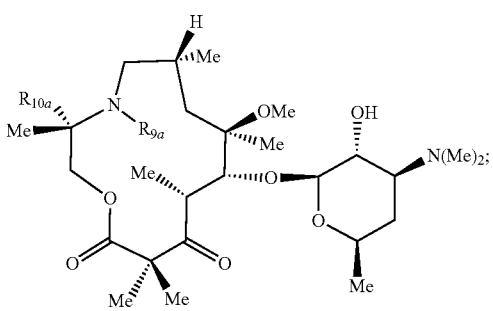

IIB-1b
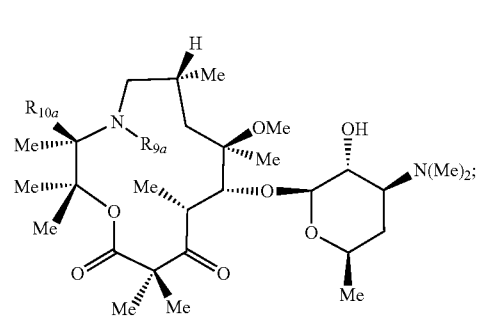

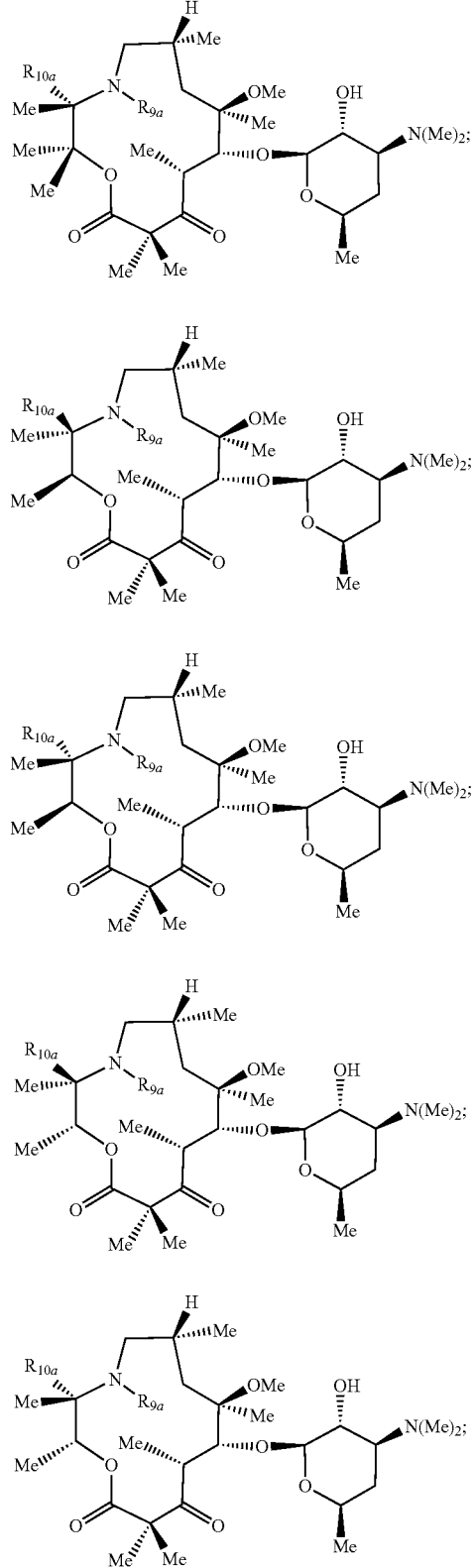

In one embodiment of a compound of formula IIA-1b, IIA-2b, IIB-1b, IIB-2b, IIC-1b, IIC-2b, IID-1b, or IID-2b, $R_{9a}$ is —H, methyl, ethyl, propyl, isopropyl, butyl, or isobutyl. In another embodiment of a compound of formula IIA-1b, IIA-2b, IIB-1b, IIB-2b, IIC-1b, IIC-2b, IID-1b, or IID-2b, $R_{9a}$ is —H, or methyl.

In one embodiment of a compound of formula IIA, IIB, IIC, IID, IIA-1a, IIA-2a, IIB-1a, IIB-2a, IIC-1a, IIC-2a, IID-1a, IID-2a, IIA-1b, IIA-2b, IIB-1b, IIB-2b, IIC-1b, IIC-2b, IID-1b, or IID-2b:

$R_{10a}$ is —$C_1$-$C_{10}$ alkylene-$R_{101a}$;

$R_{101a}$ is selected from the group consisting of —H, ($C_{1-6}$ alkyl)-S—, ($C_{1-6}$ alkyl)-SO—, ($C_{1-6}$alkyl)-SO$_2$—, —OH, —O-alkyl, ($C_{1-6}$ alkyl)-S—, ($C_{1-6}$ alkyl)-SO—, ($C_{1-6}$ alkyl)-SO$_2$—, —NR$_x$R$_{x'}$, optionally substituted cycloalkyl, optionally substituted heterocycloalkyl, optionally substituted aryl, and optionally substituted heteroaryl; wherein R$_x$ and R$_{x'}$ are each independently selected from the group consisting of H, optionally substituted alkyl, optionally substituted carbocyclyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-N(R$_{y'}$)(R$_{y''}$); or R$_x$ and R$_{x'}$ together with the atom to which they are attached form an optionally substituted 3-, 4-, 5-, 6-, or 7-membered ring optionally containing an additional heteroatom selected from the group consisting of O, S, SO, SO$_2$, NR$_y$, and N—$C_1$-$C_{10}$ alkyl; and wherein each R$_y$ is independently selected from the group consisting of —H and optionally substituted $C_{1-10}$ alkyl.

In another embodiment:

$R_{10a}$ is an optionally substituted $C_3$ alkylene-$R_{101a}$;

$R_{101a}$ is selected from the group consisting of —H, —OH, —O-alkyl, ($C_{1-6}$ alkyl)-S—, ($C_{1-6}$ alkyl)-SO—, ($C_{1-6}$ alkyl)-SO$_2$—, —NR$_x$R$_{x'}$, optionally substituted cycloalkyl, optionally substituted heterocycloalkyl, optionally substituted aryl, and optionally substituted heteroaryl; wherein R$_x$ and R$_{x'}$ are each independently selected from the group consisting of H, optionally substituted alkyl, optionally substituted cycloalkyl, optionally substituted carbocyclyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-N(R$_{y'}$)(R$_{y''}$); or R$_x$ and R$_{x'}$ together with the atom to which they are attached form an optionally substituted 3-, 4-, 5-, 6-, or 7-membered ring optionally containing an additional heteroatom selected from the group consisting of O, S, SO, SO$_2$, NR$_y$, and N—$C_1$-$C_{10}$ alkyl; and wherein each R$_y$ is independently selected from the group consisting of —H and optionally substituted $C_{1-10}$ alkyl.

In another embodiment:

$R_{10a}$ is selected from the group consisting of an optionally substituted $R_{101a}$—CH$_2$CH$_2$CH$_2$—, $R_{101a}$—CH$_2$CH$_2$CH(OH)—, and $R_{101a}$—CH$_2$CH$_2$CH(OMe)-; and $R_{101a}$ is selected from the group consisting of H, —OH, —O-optionally substituted alkyl, —N(Me)(Et), —N(Me)$_2$, —N(Me)(t-Bu), —N(Me)(iPr), —NH(Me), —NH(iPr), —N(Et)$_2$, —N(Me)(cyclopropyl), —NH(cyclopropyl), —N(Me)(cyclobutyl), —NH(cyclobutyl), —N(Me)(cyclopentyl), —NH(cyclopentyl), —N(Me)(cyclohexyl), —NH(cyclohexyl), optionally substituted aziridinyl, optionally substituted azetidinyl, optionally substituted pyrollidinyl, optionally substituted piperidinyl, optionally substituted piperazinyl, optionally substituted morpholinyl, optionally substituted piperazinyl-2-one, optionally substituted tetrahydroisoquinolinyl, optionally substituted indolinyl, and optionally substituted isoindolinyl.

In another embodiment:

$R_{10a}$ is selected from the group consisting of an optionally substituted $R_{101a}$—$CH_2CH_2CH_2$—, $R_{101a}$—$CH_2CH_2CH(OH)$—, and $R_{101a}$—$CH_2CH_2CH(OMe)$-; and $R_{101a}$ is $NR_xR_{x'}$ wherein one of $R_x$ and $R_{x'}$ is H, methyl, or ethyl, and the other of $R_x$ and $R_{x'}$ is H, methyl, ethyl, propyl, isopropyl, butyl, isobutyl, tert-butyl, pentyl, neopentyl, or —$CH_2C(CH_3)_3$. In another embodiment, one of $R_x$ and $R_{x'}$ is H, methyl, or ethyl, and the other of $R_x$ and $R_{x'}$ is —C(=O)—$CH_2$—$N(R_{y'})(R_{y''})$ wherein $R_{y'}$ and $R_{y''}$ are each independently H or methyl. In another embodiment, one of $R_x$ and $R_{x'}$ is H, methyl, or ethyl, and the other of $R_x$ and $R_{x'}$ is —C(=O)—$CH_2$—$N(R_{y'})(R_{y''})$ wherein one of $R_{y'}$ and $R_{y''}$ is H or methyl and the other of $R_{y'}$ and $R_{y''}$ is H, methyl, cyclopropyl, or —$CH_2$-cyclopropyl. In a further embodiment, $NR_xR_{x'}$ is selected from the group consisting of —N(Me)(Et), —N(Me)$_2$, —N(Me)(t-Bu), —N(Me)(iPr), —NH(Me), —NH(iPr), —N(Et)$_2$, —N(Me)(cyclopropyl), —NH(cyclopropyl), —N(Me)(cyclobutyl), —NH(cyclobutyl), —N(Me)(cyclopentyl), —NH(cyclopentyl), —N(Me)(cyclohexyl), and —NH(cyclohexyl).

In a further embodiment, $R_{10a}$ is selected from the group consisting of:

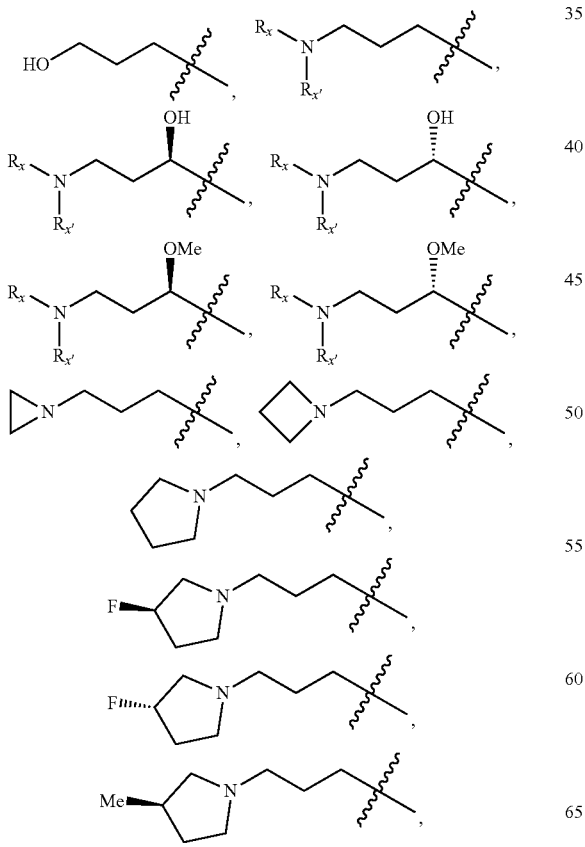

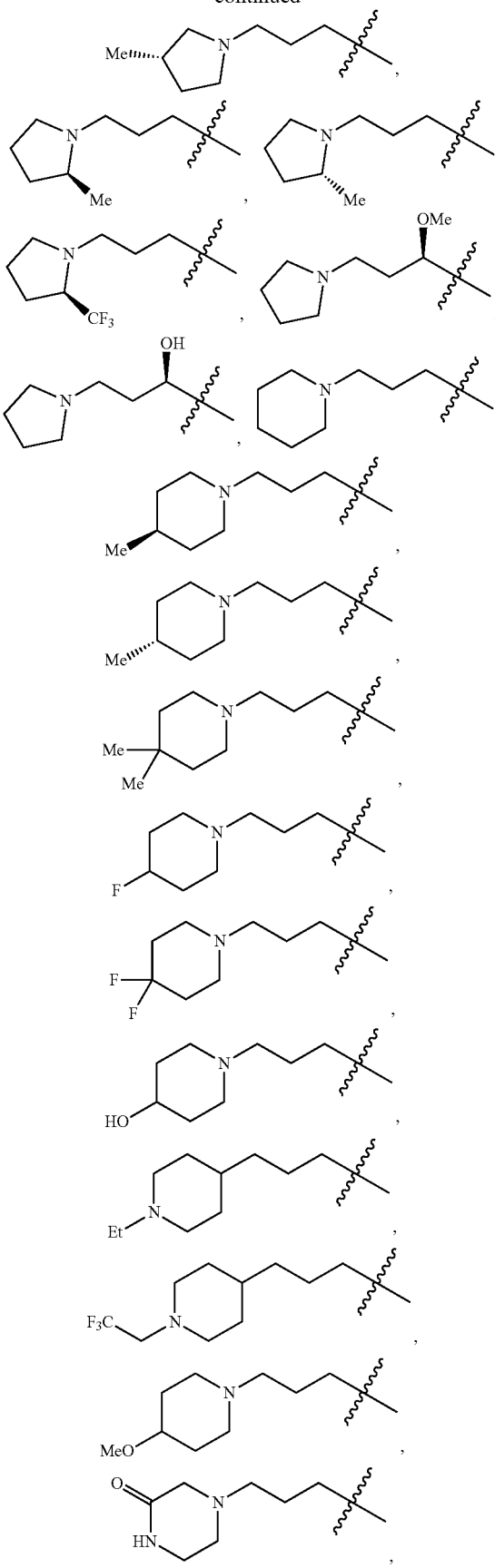

-continued

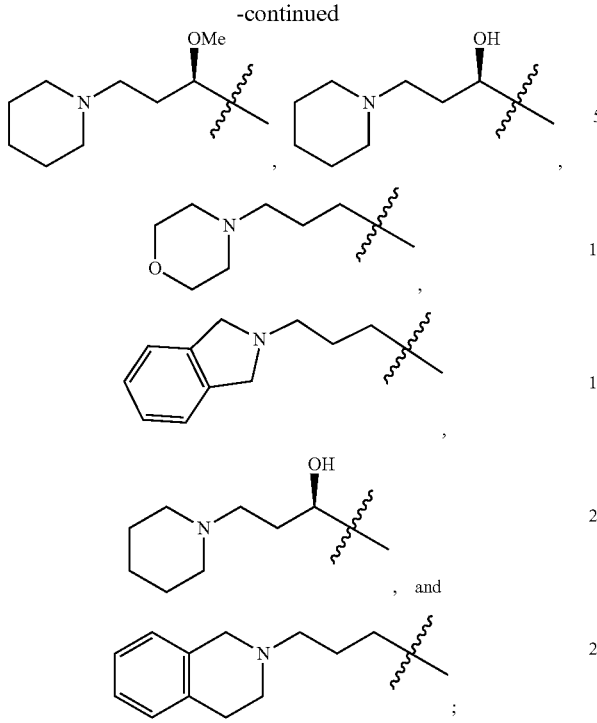

wherein " ⁓ " indicates a point of attachment.

In another embodiment of a compound of formula IIA, IIB, IIC, or IID:

$R_{10a}$ is an optionally substituted —$C_2$ alkylene-$R_{101a1}$;

$R_{101a1}$ is selected from the group consisting of H, ($C_{1-6}$ alkyl)-S—, ($C_{1-6}$ alkyl)-SO—, ($C_{1-6}$ alkyl)-SO$_2$—, —OH, —O-optionally substituted alkyl, —NR$_x$R$_{x'}$, optionally substituted cycloalkyl, optionally substituted heterocycloalkyl, optionally substituted aryl, and optionally substituted heteroaryl; wherein R$_x$ and R$_{x'}$ are each independently selected from the group consisting of —H, optionally substituted alkyl, optionally substituted carbocyclyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-N(R$_{y'}$)(R$_{y''}$); or R$_x$ and R$_{x'}$ together with the atom to which they are attached form an optionally substituted 3-, 4-, 5-, 6-, or 7-membered ring optionally containing an additional heteroatom selected from the group consisting of O, S, SO, SO$_2$, NR$_y$, and N—$C_1$-$C_{10}$ alkyl; and wherein each R$_y$ is independently selected from the group consisting of —H and optionally substituted $C_{1-10}$ alkyl.

In another embodiment, $R_{10a}$ is optionally substituted $R_{101a1}$—CH$_2$CH$_2$—.

In a further embodiment, $R_{101a1}$ is —S(Me), —SO(Me), or —SO$_2$(Me).

In another embodiment, $R_{10a}$ is MeSCH$_2$CH$_2$—, MeSOCH$_2$CH$_2$—, or MeSO$_2$CH$_2$CH$_2$—.

In a further embodiment, $R_{101a1}$ is an optionally substituted heterocycloalkyl.

In another embodiment, $R_{10a}$ is selected from the group consisting of:

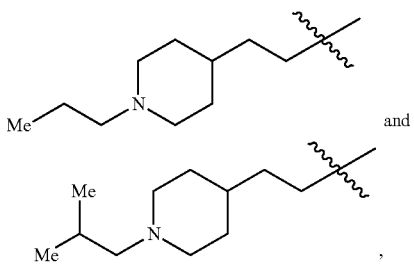

wherein " ⁓ " indicates a point of attachment.

In another embodiment of a compound of formula IIA, IIB, IIC, and IID:

$R_{10a}$ is an optionally substituted $C_1$ alkylene-$R_{101a2}$;

$R_{101a2}$ is selected from the group consisting of —H, —OH, —O-alkyl, —NR$_x$R$_{x'}$, optionally substituted cycloalkyl, optionally substituted heterocycloalkyl, optionally substituted aryl, and optionally substituted heteroaryl; wherein R$_x$ and R$_{x'}$ are each independently selected from the group consisting of H, optionally substituted alkyl, optionally substituted carbocyclyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-N(R$_{y'}$)(R$_{y''}$); or R$_x$ and R$_{x'}$ together with the atom to which they are attached form an optionally substituted 3-, 4-, 5-, 6-, or 7-membered ring optionally containing an additional heteroatom selected from the group consisting of O, S, SO, SO$_2$, NR$_y$, and N—$C_1$-$C_{10}$ alkyl; and wherein each R$_y$ is independently selected from the group consisting of H and optionally substituted $C_{1-10}$ alkyl.

In another embodiment:

$R_{10a}$ is an optionally substituted $R_{101a2}$—CH$_2$—, $R_{101a2}$—CH(OH)—, $R_{101a2}$—CH(OMe)-,

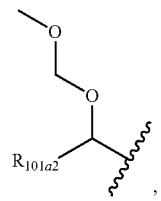

or $R_{101a2}$—C(=O)—, wherein " ⁓ " indicates a point of attachment; and $R_{101a2}$ is selected from the group consisting of —H, —OH, —O-alkyl, —NR$_x$R$_{x'}$, optionally substituted cycloalkyl, optionally substituted heterocycloalkyl, optionally substituted aryl, and optionally substituted heteroaryl; wherein R$_x$ and R$_{x'}$ are each independently selected from the group consisting of H, optionally substituted alkyl, optionally substituted carbocyclyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-N ($R_{y'}$)($R_{y''}$); or $R_x$ and $R_{x'}$ together with the atom to which they are attached form an optionally substituted 3-, 4-, 5-, 6-, or 7-membered ring optionally containing an additional heteroatom selected from the group consisting of O, S, SO, $SO_2$, $NR_y$, and N—$C_1$-$C_{10}$ alkyl; and wherein each $R_y$ is independently selected from the group consisting of H and optionally substituted $C_{1-10}$ alkyl.

In another embodiment:
$R_{10a}$ is $R_{101a2}$—$CH_2$—; and
$R_{101a2}$ is $NR_xR_{x'}$, wherein $R_x$ and $R_{x'}$ are each independently selected from the group consisting of H, optionally substituted alkyl, optionally substituted cycloalkyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, and optionally substituted alkylene-heteroaryl group and —C(=O)-alkylene-N($R_{y'}$)($R_{y''}$).

In a further embodiment:
$R_{10a}$ is an optionally substituted $R_{101a2}$—$CH_2$—; and
$R_{101a2}$ is selected from the group consisting of —$NHR_z$, and —$NMeR_z$, wherein:
$R_z$ is optionally substituted cycloalkyl, optionally substituted heterocycloalkyl, optionally substituted —$CH_2$-cycloalkyl, optionally substituted —$CH_2$-heterocycloalkyl, optionally substituted —$CH_2$-aryl, optionally substituted —$CH_2$-heteroaryl, —(C=O)-cycloalkyl or —(C=O)-alkylene-$NR_{z'}R_{z''}$; wherein $R_{z'}$ and $R_{z''}$ are each independently H or alkyl; or
$R_z$ is -optionally substituted alkylene-$R_{101a2'}$, wherein $R_{101a2'}$ is optionally substituted heteroaryl.

In a further embodiment, $R_{101a2}$—$CH_2$— is —$(CH_2)_6$-heteroaryl. In another embodiment, $R_{101c}$—$CH_2$— is —$(CH_2)_6$-triazolyl.

In a further embodiment, $R_{101a2}$—$CH_2$— is —$CH_2NHMe$, —$CH_2N(Me)_2$, —$CH_2N(Me)(cyclopropyl)$, —$CH_2NH(oxetanyl)$, —$CH_2NHCH_2(cyclopropyl)$, or

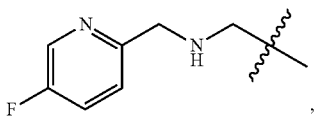 [SMILES: *CNCc1ccc(F)cn1]

wherein " ⌇ " indicates a point of attachment,

In a further embodiment:
$R_{10a}$ is an optionally substituted $R_{101a2}$—$CH_2$—; and
$R_{101a2}$ is —(C=O)-cycloalkyl or —(C=O)-alkylene-$NR_{z'}R_{z''}$; wherein $R_{z'}$ and $R_{z''}$ are each independently H or alkyl.

In a further embodiment:
$R_{10a}$ is an optionally substituted $R_{101a2}$—$CH_2$—; and
$R_{101a2}$ is —(C=O)—$CH_2$—$NR_{z'}R_{z''}$; wherein $R_{z'}$ and $R_{z''}$ are each independently H or alkyl.

In a further embodiment:
$R_{10a}$ is an optionally substituted $R_{101a2}$—$CH_2$—; and
$R_{101a2}$ is —(C=O)—$CH_2$—$NH_2$, —(C=O)—$CH_2$—NHMe, or —(C=O)—$CH_2$—$N(Me)_2$.

In another embodiment:
$R_{10a}$ is $R_{101a2}$—$CH_2$—; and
$R_{101a2}$ is selected from the group consisting of optionally substituted cycloalkyl, optionally substituted heterocycloalkyl, optionally substituted aryl, and optionally substituted heteroaryl.

In another embodiment:
$R_{10a}$ is $R_{101a2}$—$CH_2$—; and
$R_{101a2}$ is selected from the group consisting of optionally substituted cyclobutyl, optionally substituted azetinyl, optionally substituted pyrrolidinyl, optionally substituted piperidinyl, optionally substituted piperazinyl, optionally substituted morpholinyl, and optionally substituted triazolyl.

In another embodiment:
$R_{10a}$ is $R_{101a2}$—$CH_2$—; and
$R_{101a2}$ is selected from the group consisting of optionally substituted cyclobutyl, optionally substituted azetinyl, optionally substituted pyrrolidinyl, optionally substituted piperidinyl, optionally substituted piperazinyl, optionally substituted morpholinyl, and optionally substituted triazolyl.

In another embodiment:
$R_{10a}$ is an optionally substituted $R_{101a2}$—$CH_2$—, $R_{101a2}$—CH(OH)—, $R_{101a2}$—CH(OMe)-,

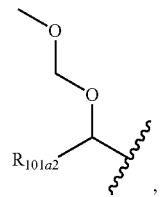

or $R_{101a2}$—C(=O)—, wherein " ⌇ " indicates a point of attachment; and
$R_{101a2'}$ is an optionally substituted piperidinyl or optionally substituted piperizinyl.

In another embodiment:
$R_{10a}$ is an optionally substituted $R_{101a2}$—$CH_2$—, $R_{101a2}$—CH(OH)—, $R_{101a2}$—CH(OMe)-,

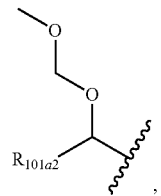

or $R_{101a2}$—C(=O)—, wherein " ⌇ " indicates a point of attachment; and
$R_{101a2'}$ is an optionally substituted

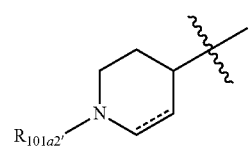

or optionally substituted

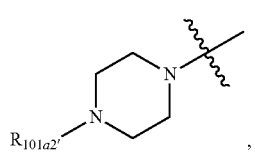

, wherein R$_{101a2'}$ is H, optionally substituted alkyl, optionally substituted alkenyl, optionally substituted cycloalkyl, optionally substituted cycloalkenyl, optionally substituted heterocycloalkyl, —C(=O)—H, —C(=O)-optionally substituted cycloalkyl, —C(=O)-optionally substituted alkylene-R$_{101a2'''}$, or optionally substituted alkylene-R$_{101a2'''}$, wherein R$_{101a2''}$ is selected from the group consisting of H, optionally substituted cycloalkyl, optionally substituted heterocycloalkyl, optionally substituted aryl, optionally substituted heteroaryl, and optionally substituted alkenyl, and wherein "~~~" indicates a point of attachment.

In another embodiment:
R$_{10a}$ is R$_{101a2}$—CH$_2$—, R$_{101a2}$—CH(OH)—, R$_{101a2}$—CH(OMe)-,

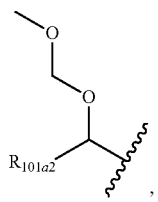
, or R$_{101a2}$—C(=O)—; and
R$_{101a2}$ is

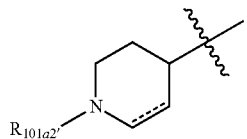
, wherein R$_{101a2'}$ is H, optionally substituted alkyl, optionally substituted alkenyl, optionally substituted cycloalkyl, optionally substituted cycloalkenyl, optionally substituted heterocycloalkyl, —C(=O)—H, —C(=O)-optionally substituted cycloalkyl, —C(=O)-optionally substituted alkylene-R$_{101a2'''}$, or optionally substituted alkylene-R$_{101a2'''}$, wherein R$_{101a2''}$ is selected from the group consisting of H, optionally substituted cycloalkyl, optionally substituted heterocycloalkyl, optionally substituted aryl, optionally substituted heteroaryl, and optionally substituted alkenyl, and wherein "~~~" indicates a point of attachment.

In another embodiment:

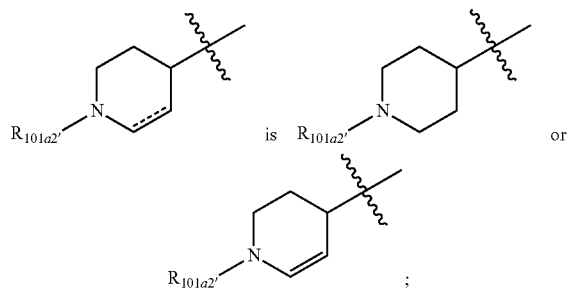

and
R$_{101a2'}$ is selected from the group consisting of -alkylene-OH and -alkylene O-alkyl. In another embodiment, R$_{101a}$ is selected from the group consisting of —(CH$_2$)$_3$—OH, —(CH$_2$)$_3$—OMe, —(CH$_2$)$_2$—OH, and —(CH$_2$)$_2$—OMe, and wherein "~~~" indicates a point of attachment.

In another embodiment:

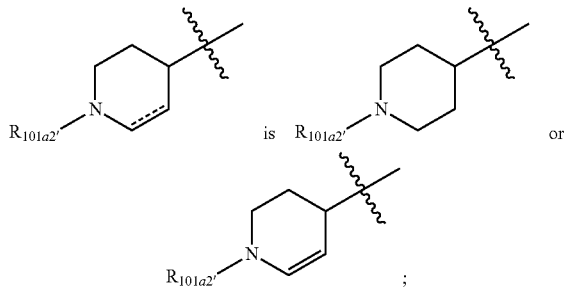

and
R$_{101a2'}$ is selected from the group consisting of H, methyl, ethyl, propyl, isopropyl, butyl, isobutyl, tert-butyl, neopentyl, CH$_2$(Me)$_3$ hexyl, and heptyl, wherein "~~~" indicates a point of attachment.

In another embodiment:

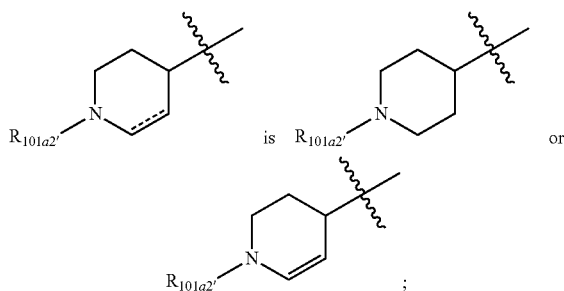

and
R$_{101a2'}$ is alkenyl. In a further embodiment R$_{101a}$ is

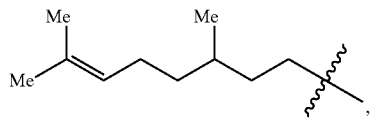 [SMILES: *CCC(C)CCC=C(C)C]
, wherein "~~~" indicates a point of attachment.

In another embodiment:

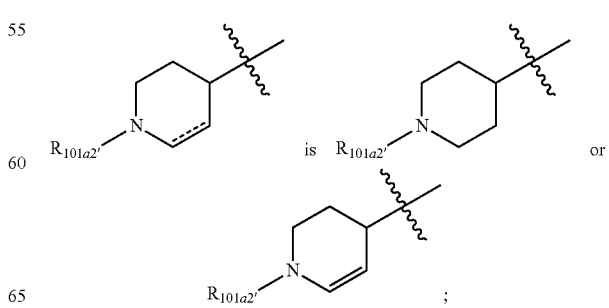

and

R$_{101a2'}$ is selected from the group consisting of cyclopropyl, cyclobutyl, cylopentyl and cyclohexyl, wherein "〰" indicates a point of attachment In another embodiment:

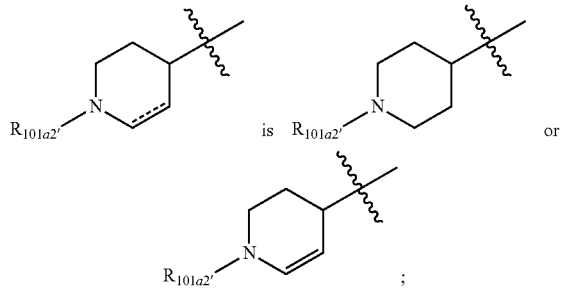

and

R$_{101a2'}$ is optionally substituted alkylene-cycloalkyl. In a further embodiment, R$_{101a}$ is optionally substituted —CH$_2$-cycloalkyl. In a further embodiment, R$_{101a}$ is optionally substituted —CH$_2$-cyclopropyl, optionally substituted —CH$_2$-cyclobutyl, optionally substituted —CH$_2$-cyclopentyl, and optionally substituted —CH$_2$-cyclohexyl wherein "〰" indicates a point of attachment.

In another embodiment:

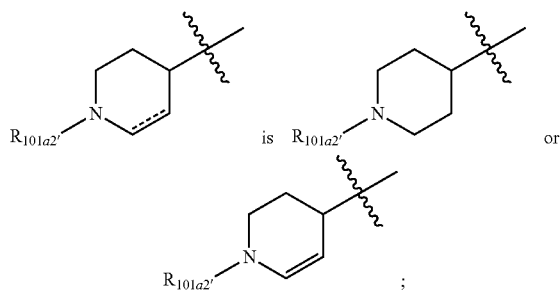

and

R$_{101a2'}$ is —C(=O)-cycloalkyl.

In another embodiment:

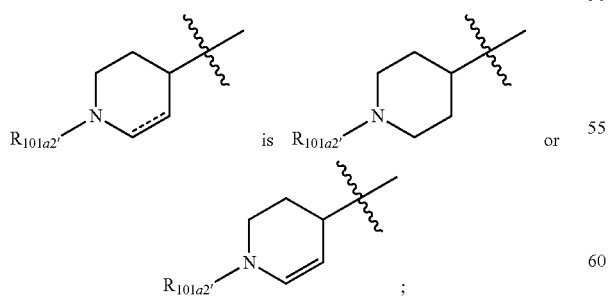

and

R$_{101a2'}$ is —C(=O)-cyclopropyl, —C(=O)-cyclobutyl, —C(=O)-cyclopentyl, or —C(=O)-cyclohexyl, and wherein "〰" indicates a point of attachment.

In another embodiment:

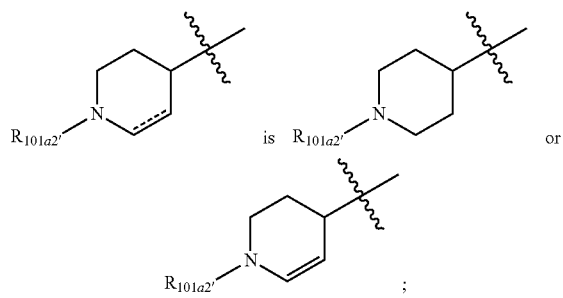

and

R$_{101a2'}$ is optionally substituted alkylene-aryl or optionally substituted —CH$_2$-aryl. In a further embodiment, R$_{101a}$ is —CH$_2$-phenyl, —CH$_2$-furanyl, —CH$_2$-pyridyl, optionally substituted —CH$_2$-cyclobutyl, optionally substituted —CH$_2$-cyclopentyl, or optionally substituted —CH$_2$-cyclohexyl wherein "〰" indicates a point of attachment In another embodiment, R$_{10a}$ is selected from the group consisting of:

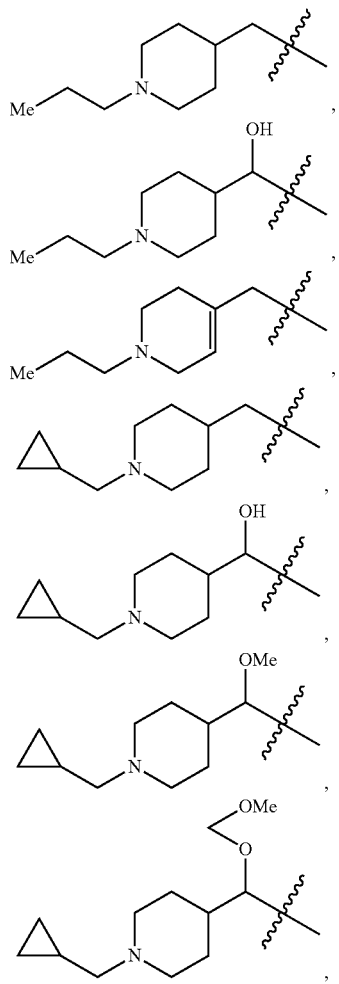

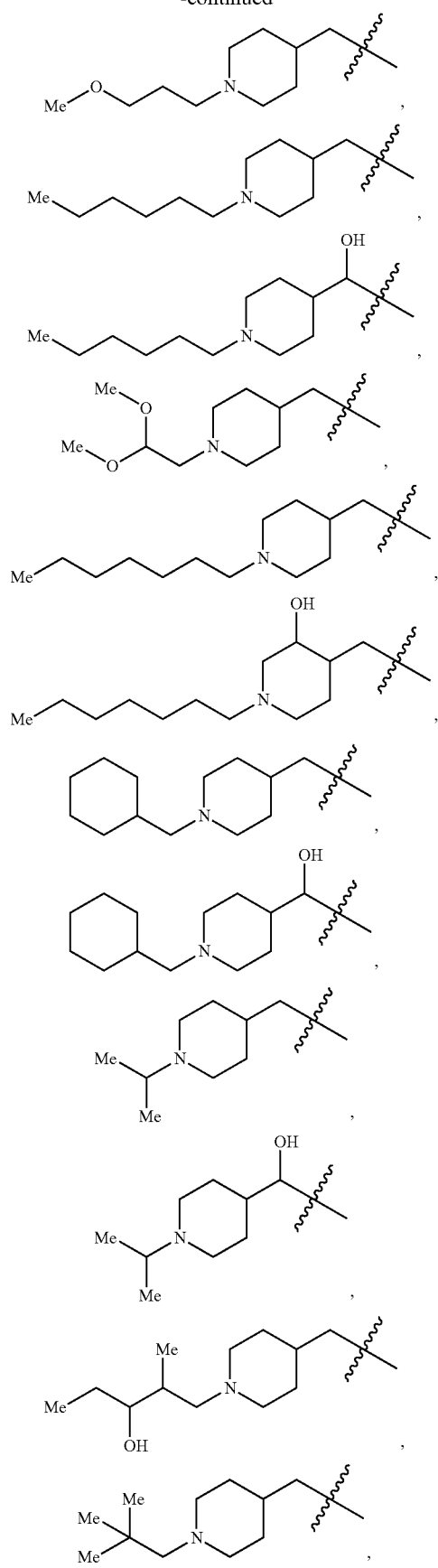
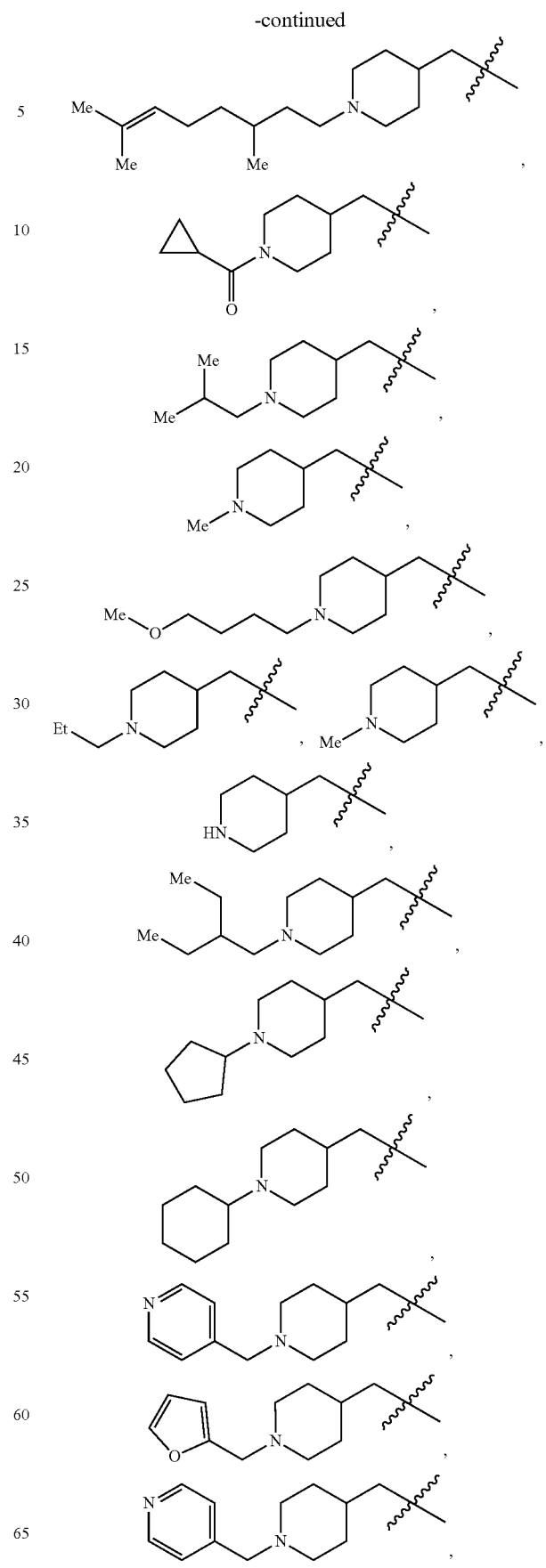

-continued

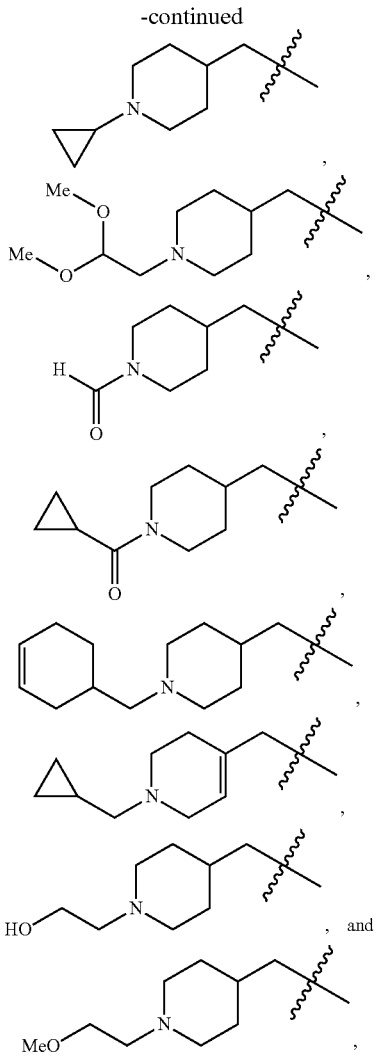

wherein "⁓" indicates a point of attachment.
In another embodiment:
$R_{10a}$ is $R_{101a2}$—$CH_2$—, $R_{101a2}$—CH(OH)—, $R_{101a2}$—CH(OMe)-,

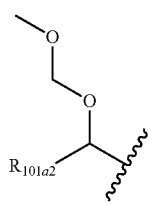

or $R_{101a1}$—C(=O)—; and
$R_{101a2}$ is

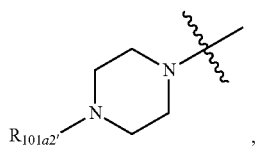

wherein $R_{101a2'}$ is H, optionally substituted alkyl, optionally substituted alkenyl, optionally substituted cycloalkyl, optionally substituted cycloalkenyl, optionally substituted heterocycloalkyl, —C(=O)—H, —C(=O)-optionally substituted cycloalkyl, —C(=O)-optionally substituted alkylene-$R_{101a2''}$, or optionally substituted alkylene-$R_{101a2''}$, wherein $R_{101a2''}$ is selected from the group consisting of H, optionally substituted cycloalkyl, optionally substituted heterocycloalkyl, optionally substituted aryl, optionally substituted heteroaryl, and optionally substituted alkenyl, and wherein "⁓" indicates a point of attachment.
In another embodiment:
$R_{10a}$ is

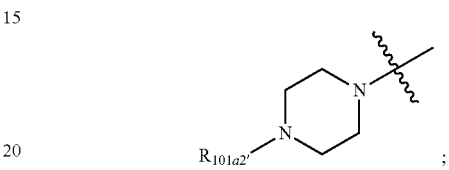

and
$R_{101a2'}$ is selected from the group consisting of -alkylene-OH and -alkylene O-alkyl.
In a further embodiment:
$R_{10a}$ is

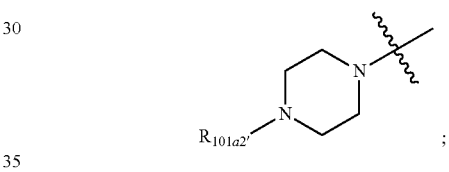

and
$R_{101a2}$, is selected from the group consisting of —(CH$_2$)$_3$—OH, —(CH$_2$)$_3$—OMe, —(CH$_2$)$_2$—OH, and —(CH$_2$)$_2$—OMe,
In another embodiment:
$R_{10a}$ is

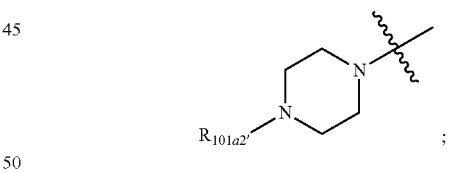

and
$R_{101a2'}$ is selected from the group consisting of H, methyl, ethyl, propyl, isopropyl, butyl, isobutyl, tert-butyl, neopentyl, CH$_2$(Me)$_3$ hexyl, and heptyl, wherein "⁓" indicates a point of attachment.
In another embodiment:
$R_{10a}$ is

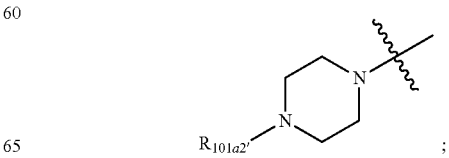

and $R_{101a2'}$ is alkenyl.

In another embodiment $R_{10a}$ is

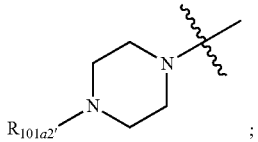

and $R_{101a2'}$ is

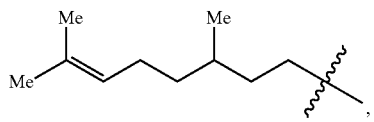 [SMILES: *CCC(C)CCC=C(C)C]

wherein "~~~" indicates a point of attachment.

In another embodiment:

$R_{10a}$ is

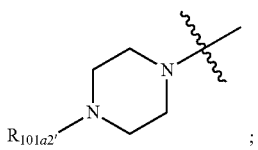

and $R_{101a2'}$ is selected from the group consisting of cyclopropyl, cyclobutyl, cylopentyl and cyclohexyl, wherein "~~~" indicates a point of attachment In another embodiment:

$R_{10a}$ is

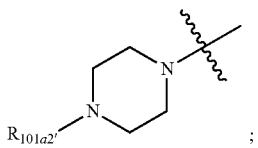

and $R_{101ca2'}$ is optionally substituted alkylene-cycloalkyl.

In another embodiment:

$R_{10a}$ is

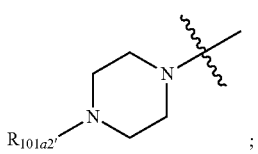

and $R_{101a2'}$ is optionally substituted —CH$_2$-cyclopropyl, optionally substituted —CH$_2$-cyclobutyl, optionally substituted —CH$_2$-cyclopentyl, or optionally substituted —CH$_2$-cyclohexyl wherein "~~~" indicates a point of attachment.

In another embodiment:

$R_{10a}$ is

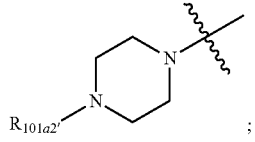

and $R_{101ca2'}$ is —C(O)-cycloalkyl. In another embodiment, $R_{101a}$ is —C(=O)-cyclopropyl, —C(=O)-cyclobutyl, —C(=O)-cyclopentyl, or —C(=O)-cyclohexyl, wherein "~~~" indicates a point of attachment.

In another embodiment:

$R_{10a}$ is

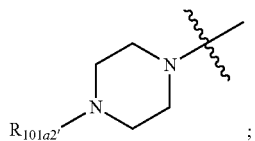

and $R_{101a2'}$ is optionally substituted alkylene-aryl or optionally substituted —CH$_2$-aryl. In a further embodiment, $R_{101a}$ is —CH$_2$-phenyl, —CH$_2$-furanyl, —CH$_2$-pyridyl, optionally substituted —CH$_2$-cyclobutyl, optionally substituted —CH$_2$-cyclopentyl, or optionally substituted —CH$_2$-cyclohexyl wherein "~~~" indicates a point of attachment, wherein "~~~" indicates a point of attachment In another embodiment, $R_{10a}$ is selected from the group consisting of:

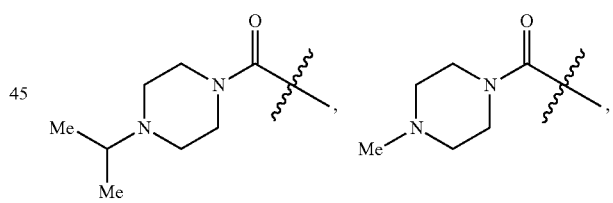

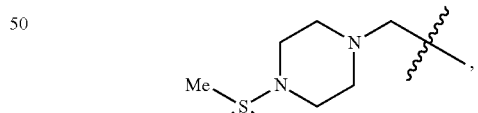

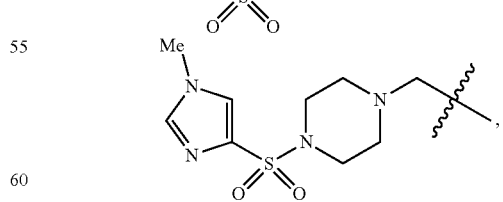

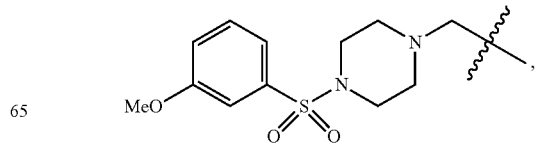

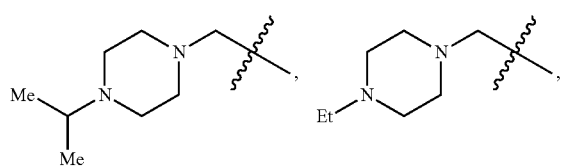

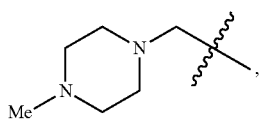

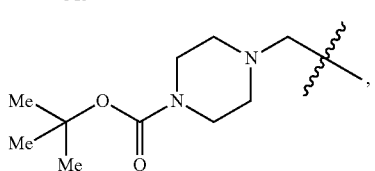

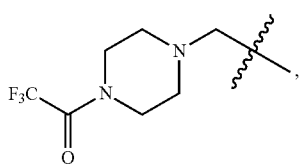

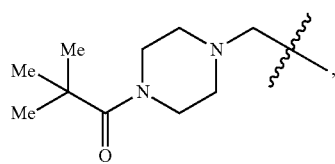

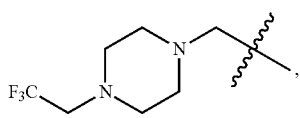

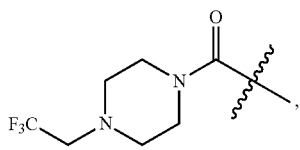

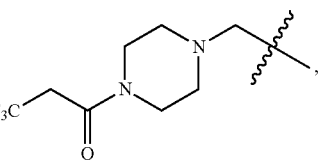

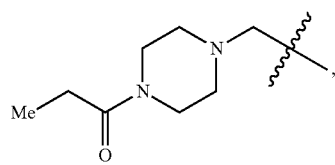

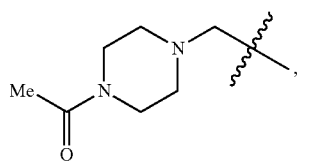

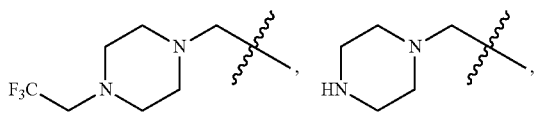

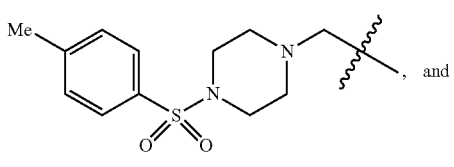

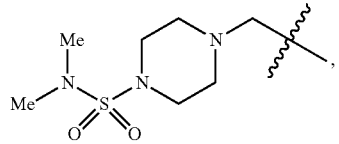

wherein "∿∿∿" indicates a point of attachment.

In another embodiment: $R_{10a}$ is $R_{101a3}$—$CH_2$—, $R_{101a3}$—CH(OH)—, $R_{101a3}$—CH(OMe)-,

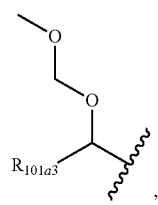

or $R_{101a3}$—C(=O)—; and $R_{101a3}$ is optionally substituted azetidinyl.

In another embodiment, $R_{10a}$ is selected from the group consisting of

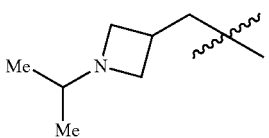

and

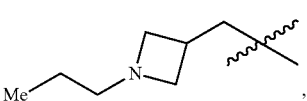

wherein "∿∿∿" indicates a point of attachment.

In another embodiment: $R_{10a}$ is $R_{101a4}$—$CH_2$—, $R_{101a4}$—CH(OH)—, $R_{101a4}$—CH(OMe)-,

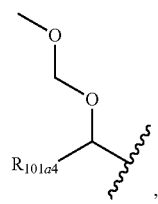

or $R_{101a4}$—C(=O)—; and $R_{101a5}$ is optionally substituted cyclobutyl.

In another embodiment, $R_{10a}$ is selected from the group consisting of

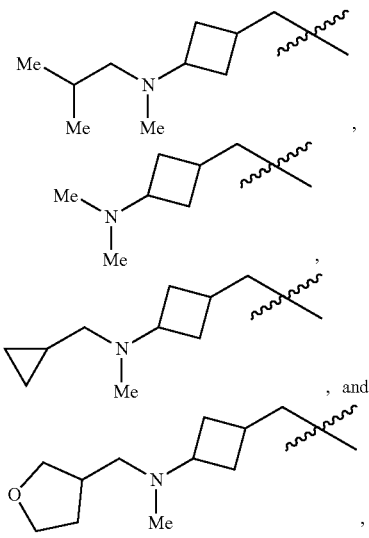

, and

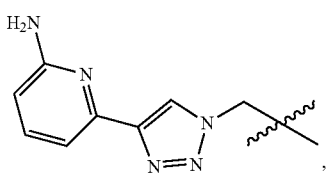 [SMILES: *Cn1cc(-c2cccc(N)n2)nn1]

wherein "⌇" indicates a point of attachment.

In another embodiment:

$R_{10a}$ is $R_{101a5}$—CH$_2$—, $R_{101a5}$—CH(OH)—, $R_{101a5}$—CH(OMe)-,

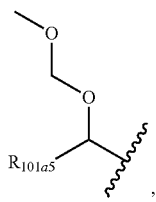

or $R_{101a5}$—C(=O)—; and $R_{101a5}$ is optionally substituted triazolyl.

In another embodiment, $R_{10a}$ is

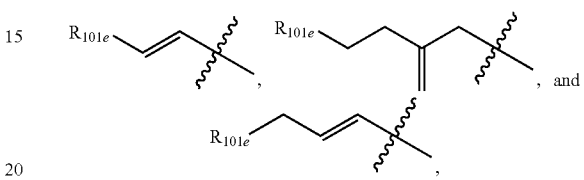

wherein "⌇" indicates a point of attachment.

In another embodiment, $R_{10a}$ is an optionally substituted $C_{2-10}$ alkenylene-$R_{101}$, wherein $R_{101}$ is selected from the group consisting of H, —OH, —O-alkyl, —NR$_x$R$_{x'}$, optionally substituted cycloalkyl, optionally substituted heterocycloalkyl, optionally substituted aryl, and optionally substituted heteroaryl; wherein:

$R_x$ and $R_{x'}$ are each independently selected from the group consisting of H, optionally substituted alkyl, optionally substituted carbocyclyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-N(R$_{y'}$)(R$_{y''}$); or $R_x$ and $R_{x'}$ together with the atom to which they are attached form an optionally substituted 3-, 4-, 5-, 6-, or 7-membered ring optionally containing an additional heteroatom selected from the group consisting of O, S, SO, SO$_2$, NR$_y$, and N—C$_1$-C$_{10}$ alkyl; and wherein each R$_y$ is independently selected from the group consisting of —H and optionally substituted C$_{1-10}$ alkyl.

In another embodiment, $R_{10a}$ is an optionally substituted $C_{2-5}$ alkenylene-$R_{101e}$ selected from the group consisting of

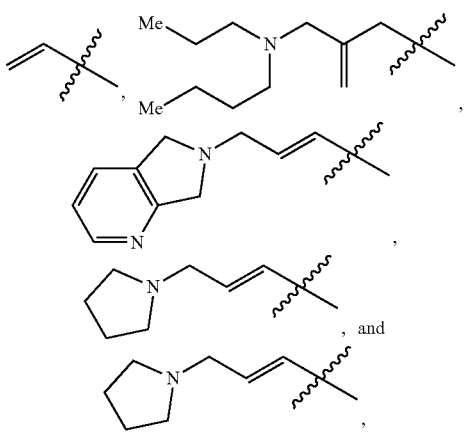

wherein $R_{101e}$ is selected from H, optionally substituted alkyl, optionally substituted cycloalkyl, optionally substituted heterocycloalkyl, optionally substituted aryl, optionally substituted heteroaryl, and NR$_x$R$_{x'}$, R$_x$ and R$_{x'}$ are each independently selected from the group consisting of H, optionally substituted alkyl, optionally substituted carbocyclyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-N(R$_{y'}$)(R$_{y''}$); or $R_x$ and $R_{x'}$ together with the atom to which they are attached form an optionally substituted 3-, 4-, 5-, 6-, or 7-membered ring optionally containing an additional heteroatom selected from the group consisting of O, S, SO, SO$_2$, NR$_y$, and N—C$_1$-C$_{10}$ alkyl; and wherein each R$_y$ is independently selected from the group consisting of —H and optionally substituted C$_{1-10}$ alkyl; and wherein "⌇" indicates a point of attachment.

In another embodiment, $R_{10a}$ is an optionally substituted $C_{2-5}$ alkenylene-$R_{101}$ selected from the group consisting of wherein "⌇" indicates a point of attachment.

In another embodiment, $R_{10a}$ is an optionally substituted alkenylene-$R_{101}$

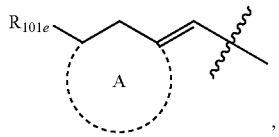

, wherein A is an optionally substituted cycloalkyl or heterocycloalkyl, and $R_{101e}$ is selected from the group consisting of H, halo, alkyl, haloalkyl and —$NR_xR_{x'}$, wherein $R_x$ and $R_{x'}$ are each independently selected from the group consisting of H and optionally substituted alkyl, and wherein "⁓⁓⁓" indicates a point of attachment.

In another embodiment, $R_{10a}$ is an optionally substituted alkenylene-$R_{101}$

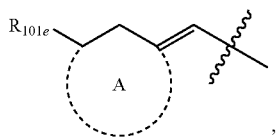

, selected from the group consisting of

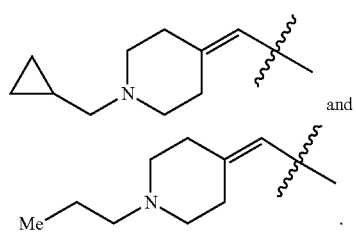

and

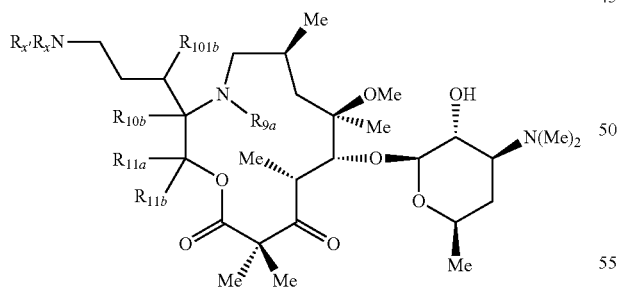

.

Another embodiment of a compound of formula I is a compound of formula III:

III

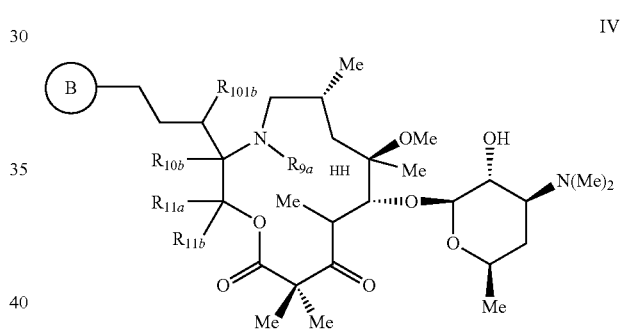

or a pharmaceutically acceptable salt thereof, wherein:
$R_{101b}$ is H, optionally substituted alkyl or alkoxy;
$R_{10b}$ is —H or alkyl;
$R_{11a}$ and $R_{11b}$ are independently selected from the group consisting of H and methyl;
$R_x$ and $R_{x'}$ are each independently selected from the group consisting of —H, optionally substituted alkyl, optionally substituted carbocyclyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-N($R_y$)$_2$; or
$R_x$ and $R_{x'}$ together with the atom to which they are attached form an optionally substituted 3-, 4-, 5-, 6-, or 7-membered ring optionally containing an additional heteroatom selected from the group consisting of O, S, SO, SO$_2$, NR$_y$, and N—C$_1$-C$_{10}$ alkyl; and wherein each $R_y$ is independently selected from the group consisting of H and optionally substituted C$_{1-10}$ alkyl.

In some embodiments of formula III, $R_{9a}$ is —H, methyl, ethyl, propyl, isopropyl, butyl, or isobutyl. In some embodiments III, $R_{9a}$ is —H, or methyl; and $R_{10b}$ is H or methyl. In some embodiments, $R_{11a}$ and $R_{11b}$ are each independently H or methyl. In some embodiments, $R_{10b}$ is H and $R_{11a}$ and $R_{11b}$ are each independently H.

In one embodiment:
$R_{101b}$ is H, methyl, or methoxy;
In one embodiment of formula III, NR$_x$R$_{x'}$ is selected from the group consisting of —N(Me)(Et), —N(Me)$_2$, —N(Me)(t-Bu), —N(Me)(iPr), —NH(Me), —NH(iPr), —N(Et)$_2$, —N(Me)(cyclopropyl), —NH(cyclopropyl), —N(Me)(cyclobutyl), —NH(cyclobutyl), —N(Me)(cyclopentyl), —NH(cyclopentyl), —N(Me)(cyclohexyl), and —NH(cyclohexyl).

Another embodiment of a compound of formula I is a compound of formula IV:

IV

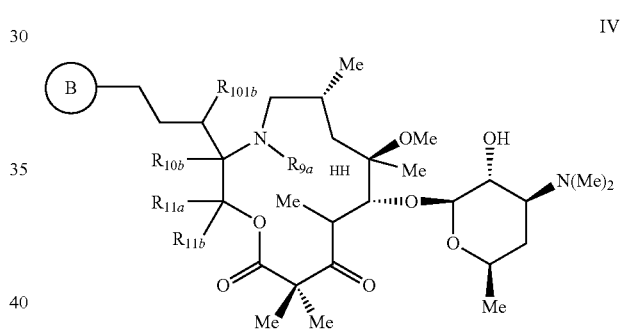

or a pharmaceutically acceptable salt thereof, wherein:
$R_{101b}$ is H, optionally substituted alkyl or alkoxy;
$R_{11a}$ and $R_{11b}$ are independently selected from the group consisting of —H and methyl; and

is selected from the group consisting of optionally substituted cycloalkyl, optionally substituted heterocycloalkyl, optionally substituted aryl, and optionally substituted heteroaryl.

In one embodiment of formula IV:
$R_{101b}$ is H, methyl, or methoxy;

is selected from the group consisting of optionally substituted aziridinyl, optionally substituted azetidinyl, optionally substituted pyrollidinyl, optionally substituted piperidinyl, optionally substituted piperazinyl, optionally substituted morpholinyl, optionally substituted piperazinyl-2-one, optionally substituted tetrahydroisoquinolinyl, optionally substituted indolinyl, and optionally substituted isoindoliny.

In some embodiments of formula IV, $R_{9a}$ is —H, methyl, ethyl, propyl, isopropyl, butyl, or isobutyl. In some embodiments IV, $R_{9a}$ is —H, or methyl; and $R_{10b}$ is H or methyl. In some embodiments, $R_{11a}$ and $R_{11b}$ are each independently H or methyl. In some embodiments, $R_{10b}$ is H; and $R_{11a}$ and $R_{11b}$ are each independently H.

Another embodiment of a compound of formula I is a compound of formula V:

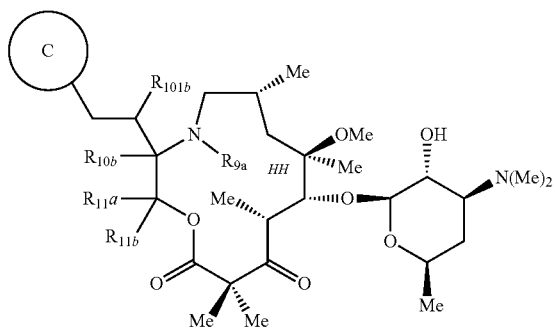

V or a pharmaceutically acceptable salt thereof, wherein:

$R_{101b}$ is H, optionally substituted alkyl or alkoxy;

$R_{11a}$ and $R_{11b}$ are independently selected from the group consisting of —H and methyl; and

is optionally substituted heterocycloalkyl.

In one embodiment of formula V:

$R_{10b}$ is H or optionally substituted alkyl;

is optionally substituted piperidinyl.

In some embodiments of formula V, $R_{9a}$ is —H, methyl, ethyl, propyl, isopropyl, butyl, or isobutyl. In some embodiments V, $R_{9a}$ is —H, or methyl $R_{10b}$ is H or methyl. In some embodiments, $R_{11a}$ and $R_{11b}$ are each independently H or methyl. In some embodiments, $R_{10b}$ is H and $R_{11a}$ and $R_{11b}$ are each independently H.

Another embodiment of a compound of formula I is a compound of formula VI:

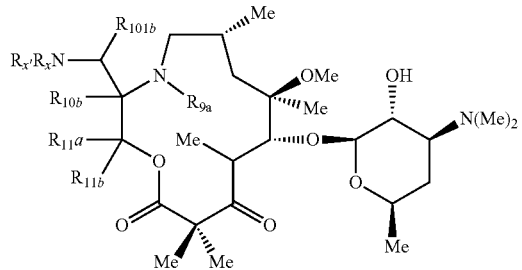

VI or a pharmaceutically acceptable salt thereof, wherein:

$R_{101}b$ is H;

$R_{10b}$ is H or alkyl;

$R_{11a}$ and $R_{11b}$ are independently selected from the group consisting of —H and methyl; and $R_x$ and $R_{x'}$ are each independently selected from the group consisting of —H, optionally substituted alkyl, optionally substituted hydroxyalkyl, optionally substituted carbocyclyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-N($R_y$)$_2$; or $R_x$ and $R_{x'}$ together with the atom to which they are attached form an optionally substituted 3-, 4-, 5-, 6-, or 7-membered ring optionally containing an additional heteroatom selected from the group consisting of O, S, SO, SO$_2$, NR$_y$, and N—C$_1$-C$_{10}$ alkyl; and wherein each $R_y$ is independently selected from the group consisting of —H and optionally substituted C$_{1-10}$ alkyl; or one of $R_x$ and $R_{x'}$ is —H or alkyl; and the other is $R_z$, wherein $R_z$ is —(C=O)-cycloalkyl or —(C=O)-alkylene-NR$_{z''}$R$_{z'''}$; wherein $R_{z''}$ and $R_{z'''}$ are each independently —H or alkyl; or $R_z$ is -alkylene-$R_{101a}$ wherein $R_{101a}$ is optionally substituted heteroaryl.

In some embodiments of formula VI, $R_{9a}$ is —H, methyl, ethyl, propyl, isopropyl, butyl, or isobutyl. In some embodiments VI, $R_{9a}$ is —H, or methyl $R_{10b}$ is H or methyl. In some embodiments, $R_{11a}$ and $R_{11b}$ are each independently H or methyl. In some embodiments, $R_{10b}$ is H and $R_{11a}$ and $R_{11b}$ are each independently H.

Another embodiment of a compound of formula I is a compound of formula VII:

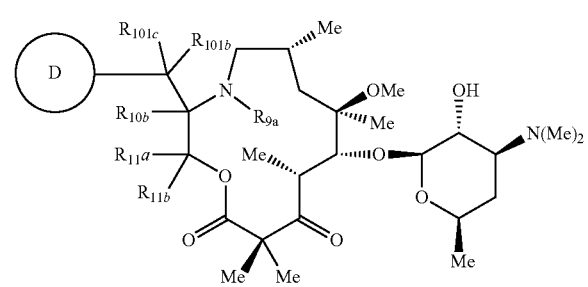

VII or a pharmaceutically acceptable salt thereof, wherein:
$R_{101c}$ is H;
$R_{101b}$ is —H, —OH, —OMe, or —OCH$_2$OMe; or $R_{101b}$ and $R_{101c}$ form =O; and
$R_{10b}$ is —H or optionally substituted alkyl;
$R_{11a}$ and $R_{11b}$ are independently selected from the group consisting of —H and methyl; and

is selected from the group consisting of is selected from the group consisting of optionally substituted cyclobutyl, optionally substituted azetinyl, optionally substituted pyrrolidinyl, optionally substituted piperidinyl, optionally substituted piperazinyl, optionally substituted morpholinyl, and optionally substituted triazolyl.

In some embodiments of formula VII, $R_{9a}$ is —H, methyl, ethyl, propyl, isopropyl, butyl, or isobutyl. In some embodiments VII, $R_{9a}$ is —H, or methyl $R_{10b}$ is H or methyl. In some embodiments, $R_{11a}$ and $R_{11b}$ are each independently H or methyl. In some embodiments, $R_{10b}$ is H and $R_{11a}$ and $R_{11b}$ are each independently H.

In another embodiment, the compound of formula I, II, III, IV, V, VI, or VII is selected from Table A, or a pharmaceutically acceptable salt thereof.

TABLE A

| Compound # | Structure |
|---|---|
| 1 | |
| 2 | |
| 3 | |

TABLE A-continued

| Compound # | Structure |
|---|---|
| 4 | |
| 5 | |
| 6 | |
| 7 | |
| 8 | |

TABLE A-continued

| Compound # | Structure |
|---|---|
| 9 | |
| 10 | |
| 11 | |
| 12 | |
| 13 | |

TABLE A-continued
| Compound # | Structure |
|---|---|
| 14 | 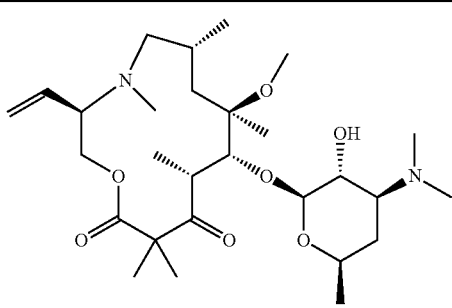 |
| 15 | 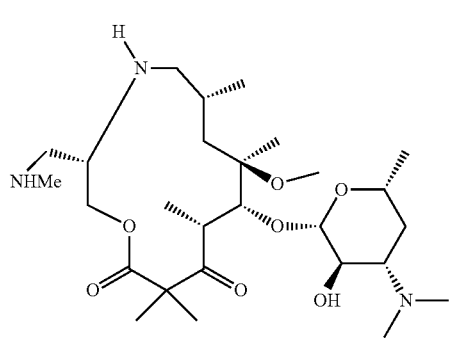 |
| 16 | 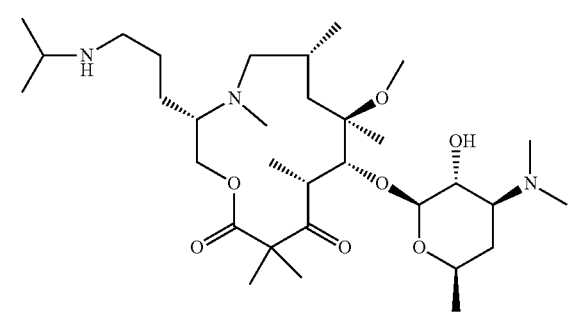 [SMILES: CO[C@]1(C)C[C@@H](C)CN(C)[C@@H](CCCNC(C)C)COC(=O)C(C)(C)C(=O)[C@H](C)[C@H]1O[C@@H]1O[C@H](C)C[C@H](N(C)C)[C@H]1O] |
| 17 | 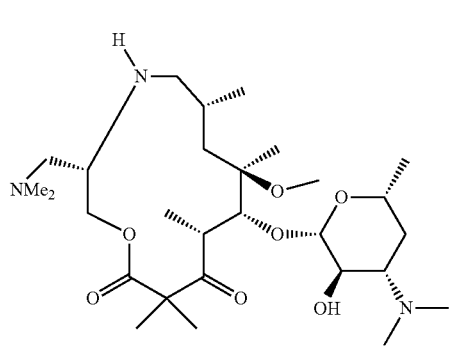 [SMILES: CO[C@]1(C)C[C@@H](C)CN[C@@H](CN(C)C)COC(=O)C(C)(C)C(=O)[C@H](C)[C@H]1O[C@@H]1O[C@H](C)C[C@H](N(C)C)[C@H]1O] |
| 18 | 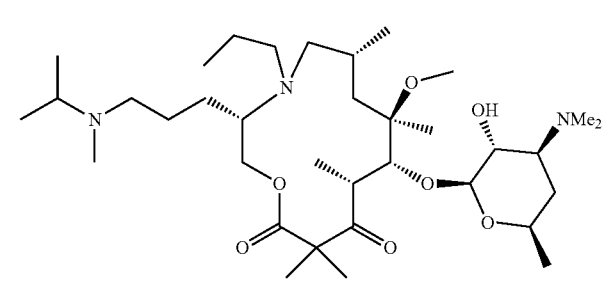 [SMILES: CCCN1C[C@H](C)C[C@@](C)(OC)[C@H](O[C@@H]2O[C@H](C)C[C@H](N(C)C)[C@H]2O)[C@@H](C)C(=O)C(C)(C)C(=O)OC[C@@H]1CCCN(C)C(C)C] |

TABLE A-continued

| Compound # | Structure |
|---|---|
| 19 | |
| 20 | |
| 21 | |
| 22 | |
| 23 | |

TABLE A-continued

| Compound # | Structure |
|---|---|
| 24 | (chemical structure) |
| 25 | (chemical structure) |
| 26 | (chemical structure) |
| 27 | (chemical structure) |

TABLE A-continued
| Compound # | Structure |
|---|---|
| 28 | 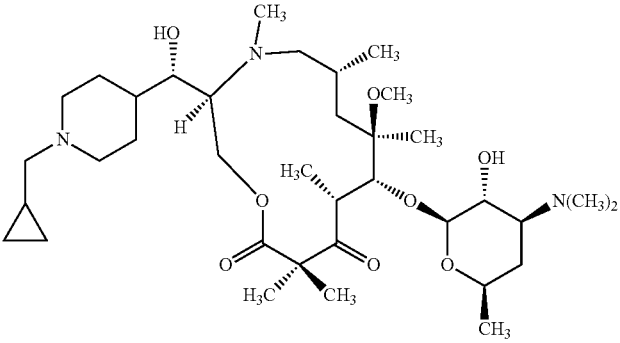 |
| 29 | 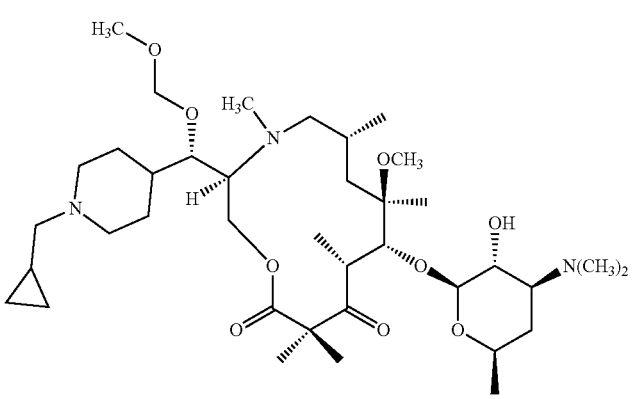 |
| 35 | 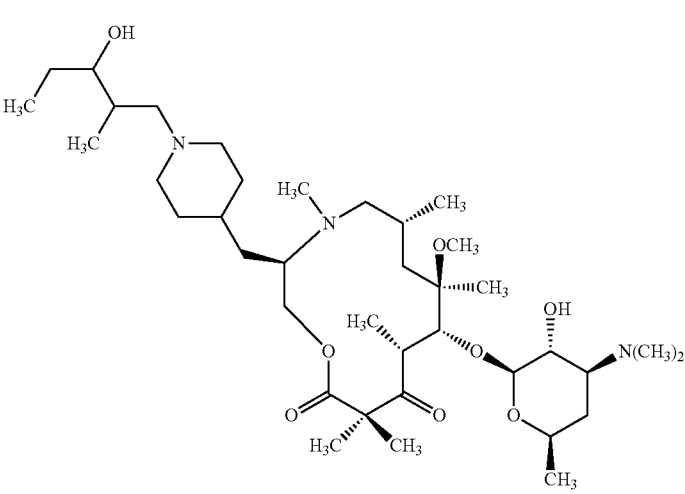 |

TABLE A-continued
| Compound # | Structure |
|---|---|
| 36 | 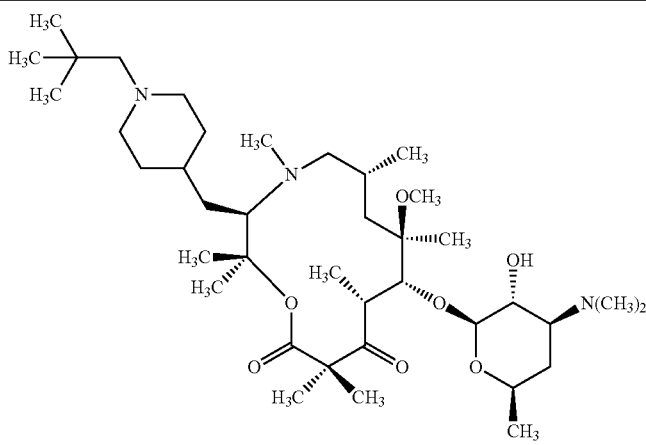 |
| 37 | 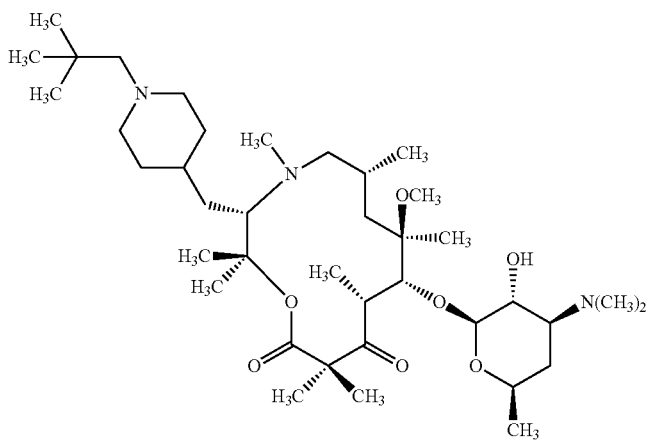 |
| 38 | 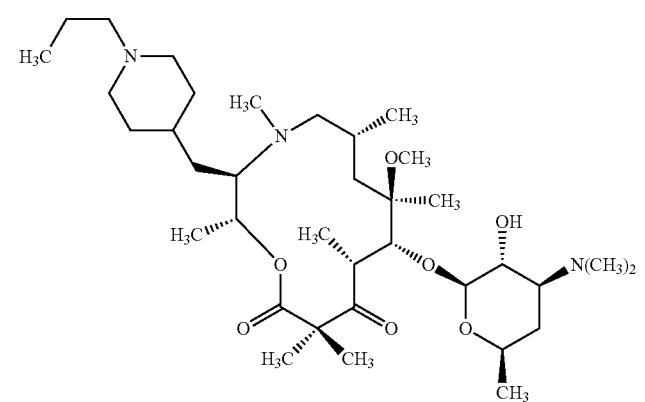 |

TABLE A-continued
| Compound # | Structure |
|---|---|
| 39 | 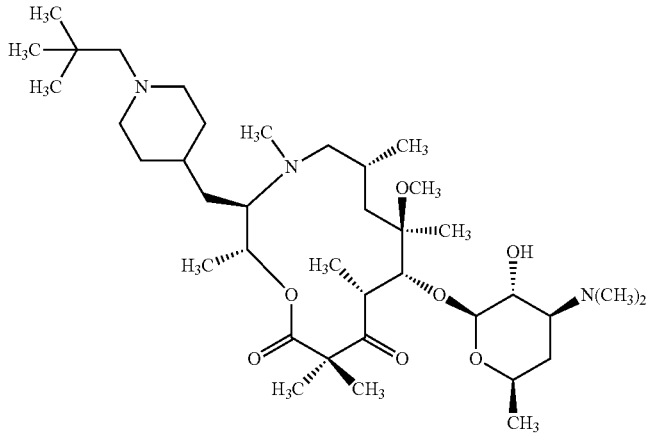 |
| 40 | 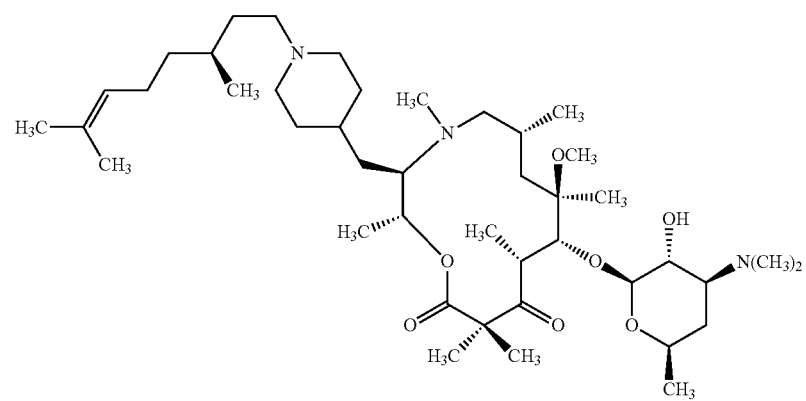 |
| 41 | 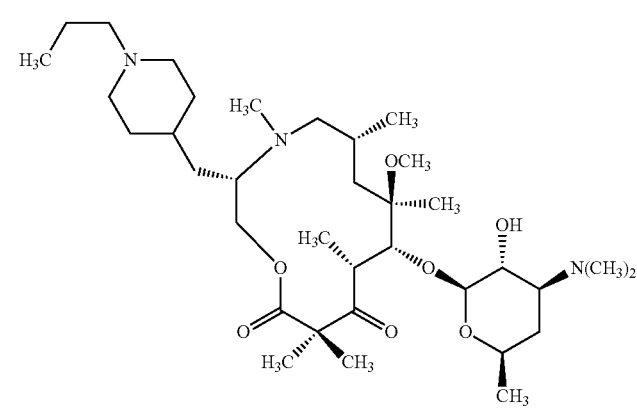 |

TABLE A-continued
| Compound # | Structure |
|---|---|
| 42 | 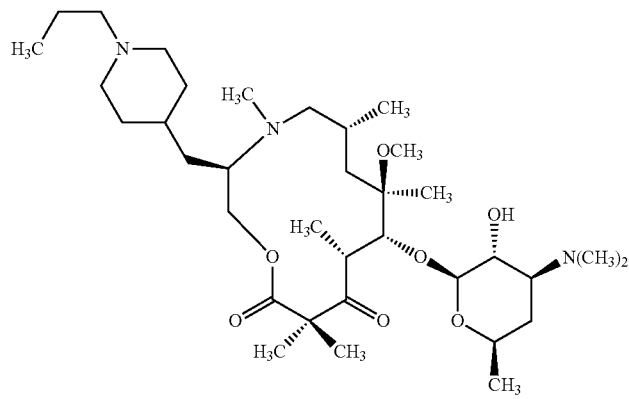 |
| 44 | 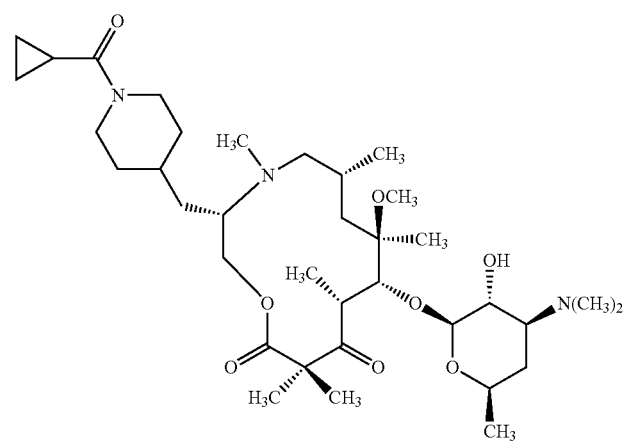 |
| 45 | 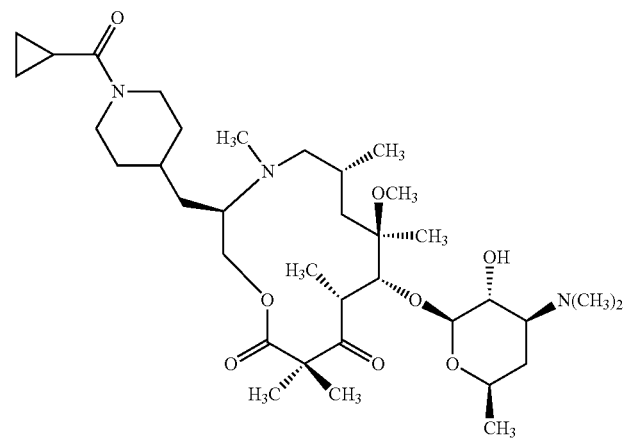 |

TABLE A-continued
| Compound # | Structure |
|---|---|
| 46 | 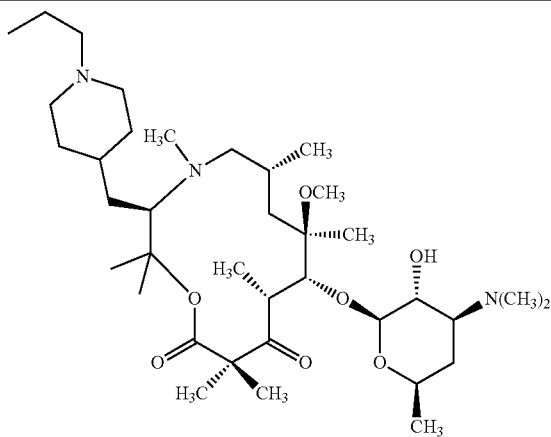 |
| 47 | 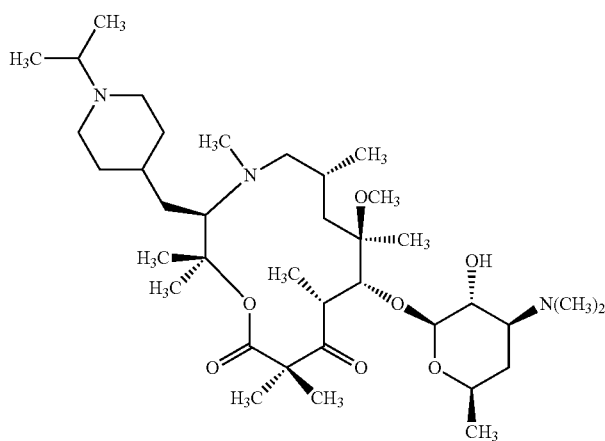 |
| 48 | 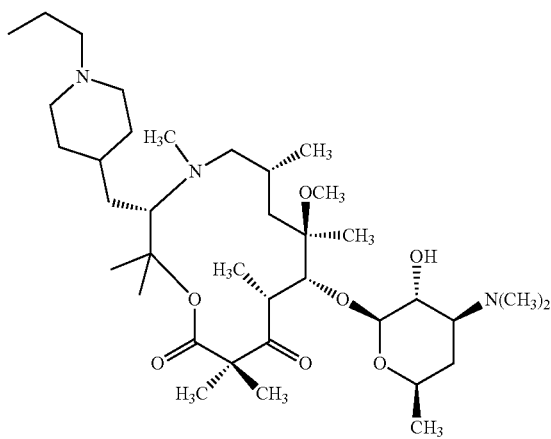 |

TABLE A-continued

| Compound # | Structure |
|---|---|
| 49 | |
| 50 | |
| 51 | |
| 52 | |

TABLE A-continued

| Compound # | Structure |
|---|---|
| 53 | |
| 54 | |
| 55 | |

TABLE A-continued
| Compound # | Structure |
|---|---|
| 56 | 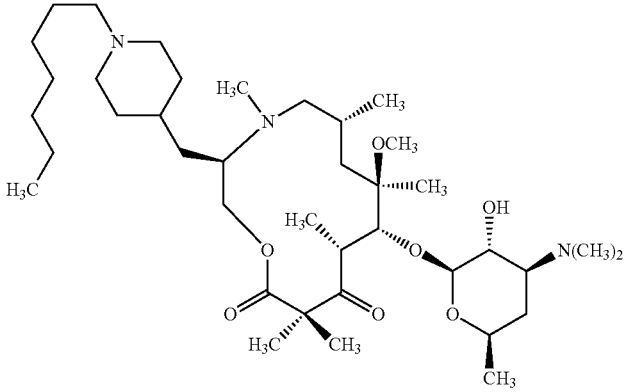 |
| 57 | 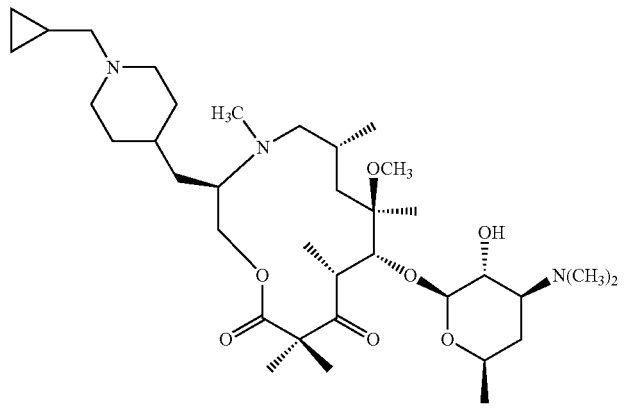 |
| 58 | 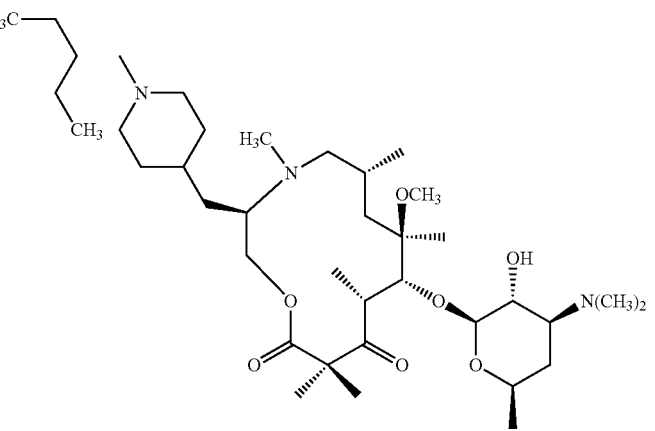 |

TABLE A-continued
| Compound # | Structure |
|---|---|
| 59 | 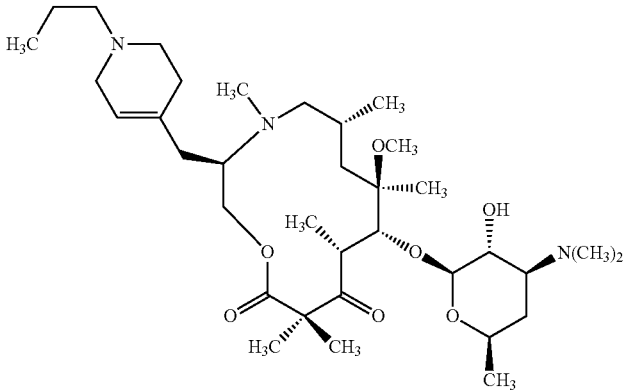 |
| 60 | 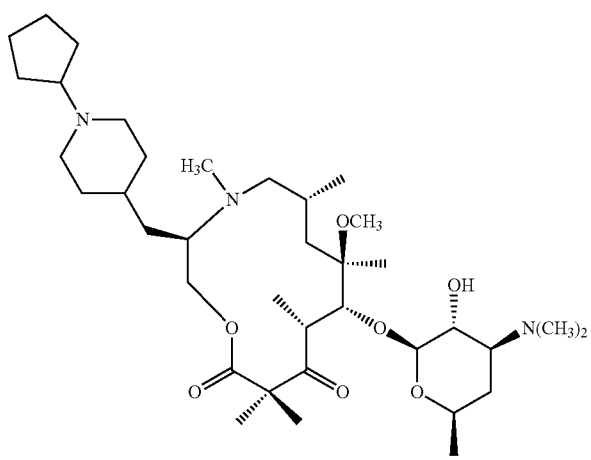 |
| 61 | 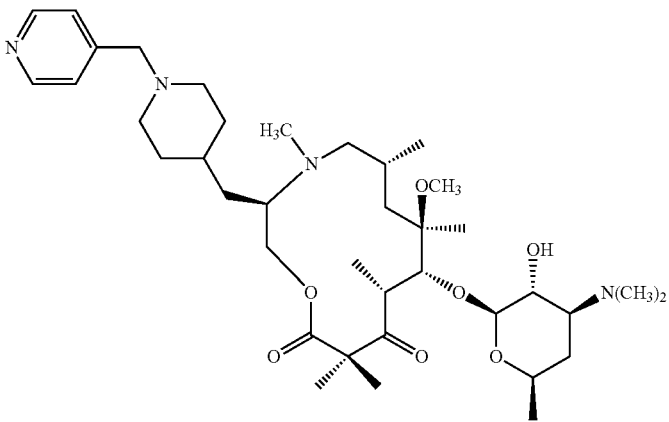 |

TABLE A-continued

| Compound # | Structure |
|---|---|
| 62 | |
| 63 | |
| 64 | |

TABLE A-continued
| Compound # | Structure |
|---|---|
| 65 | 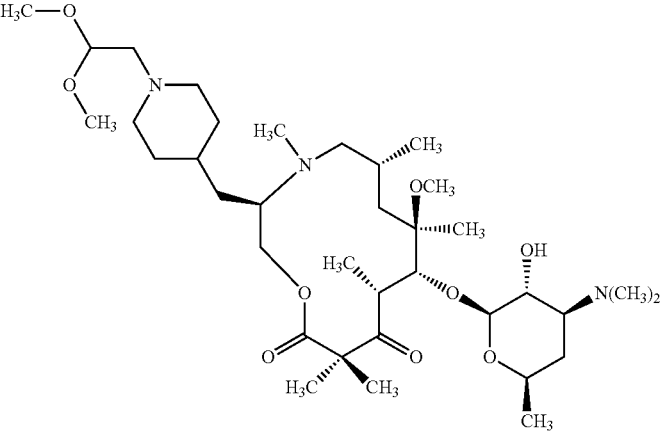 |
| 66 | 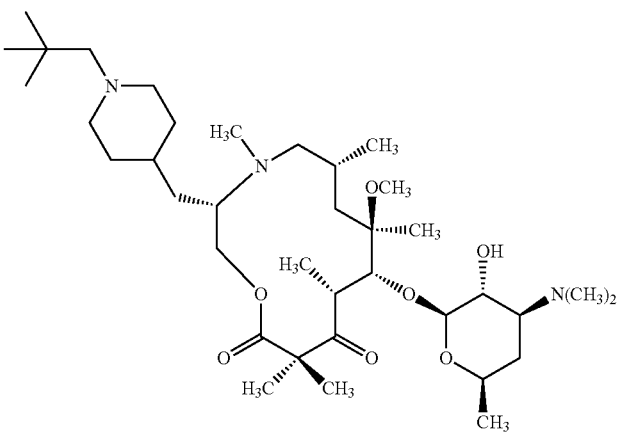 |
| 67 | 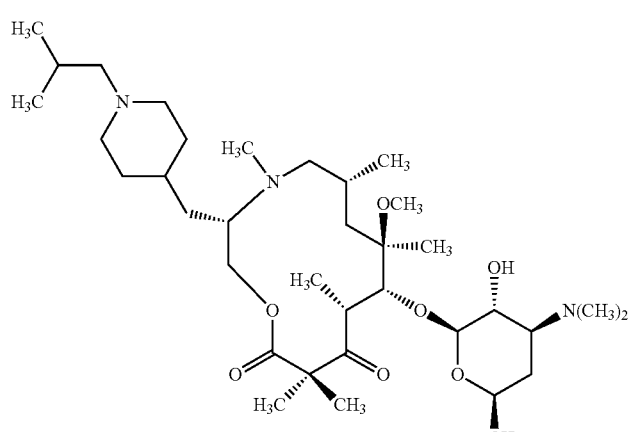 |

TABLE A-continued
| Compound # | Structure |
|---|---|
| 68 | 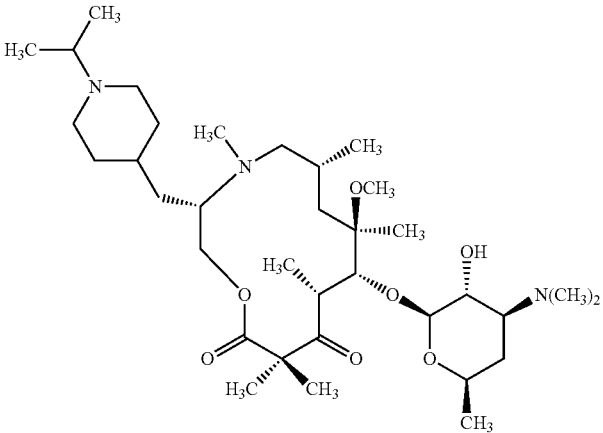 |
| 69 | 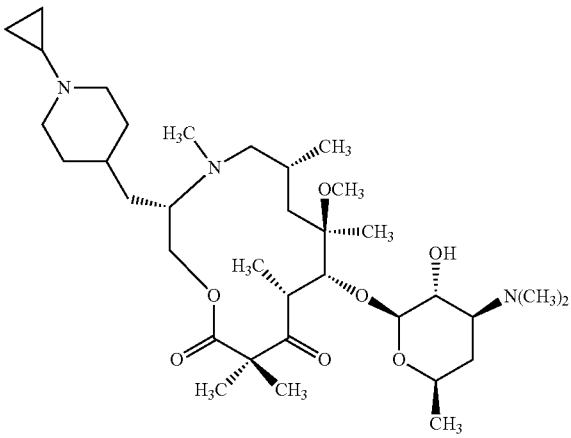 |
| 70 | 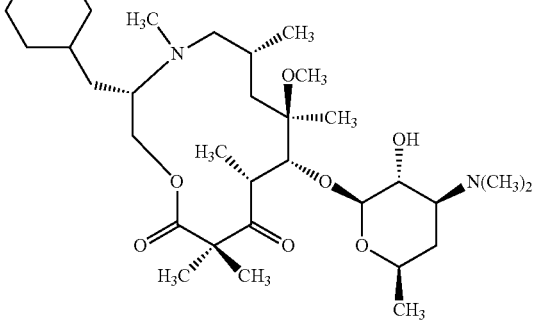 |

TABLE A-continued
| Compound # | Structure |
|---|---|
| 71 | 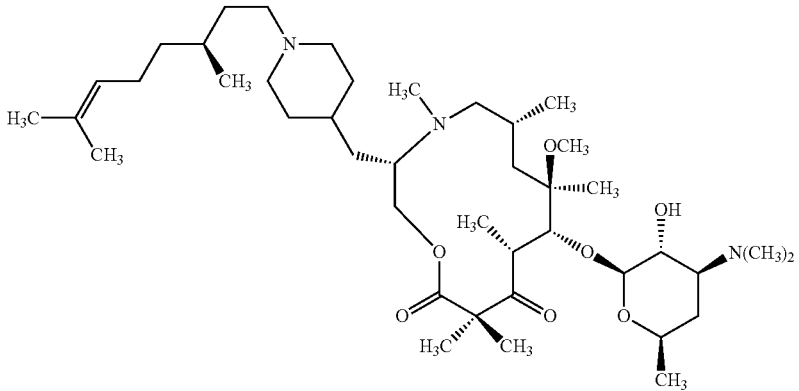 |
| 72 | 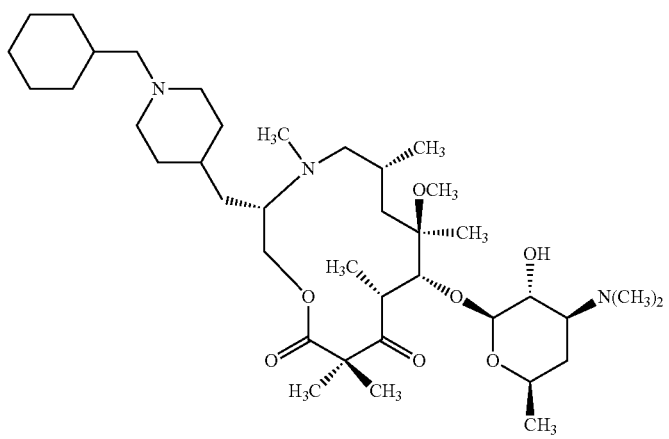 |
| 73 | 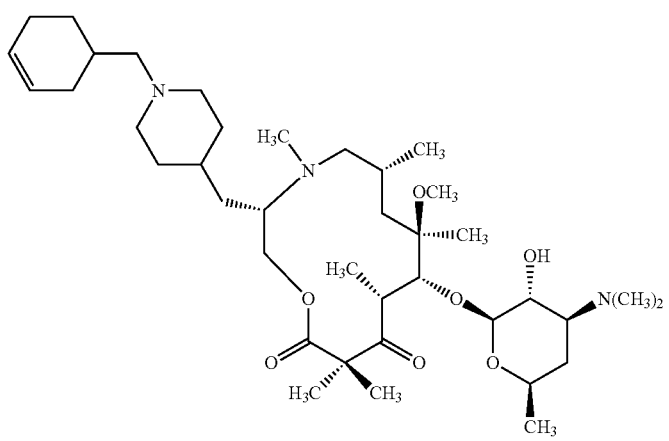 |

TABLE A-continued

| Compound # | Structure |
|---|---|
| 74 | |
| 75 | |
| 76 | |
| 77 | |

TABLE A-continued

| Compound # | Structure |
|---|---|
| 78 | |
| 79 | |
| 80 | |
| 81 | |

TABLE A-continued

| Compound # | Structure |
| --- | --- |
| 82 | |
| 83 | |
| 84 | |
| 85 | |
| 86 | |

TABLE A-continued

| Compound # | Structure |
|---|---|
| 87 | |
| 88 | |
| 89 | |
| 90 | |
| 91 | |

| Compound # | Structure |
|---|---|
| 92 | |
| 93 | |
| 94 | |
| 95 | |
| 96 | |

TABLE A-continued

| Compound # | Structure |
| --- | --- |
| 97 | |
| 98 | |
| 99 | |
| 101 | |
| 102 | |

TABLE A-continued

| Compound # | Structure |
|---|---|
| 103 | |
| 104 | |
| 105 | |
| 106 | |
| 107 | |

TABLE A-continued

| Compound # | Structure |
| --- | --- |
| 108 | |
| 109 | |
| 110 | |
| 111 | |
| 112 | |

TABLE A-continued

| Compound # | Structure |
|---|---|
| 113 | |
| 114 | |
| 115 | |
| 116 | |
| 117 | |

TABLE A-continued

| Compound # | Structure |
|---|---|
| 118 | |
| 119 | |
| 120 | |
| 121 | |
| 122 | |

TABLE A-continued

| Compound # | Structure |
| --- | --- |
| 123 | |
| 124 | |
| 125 | |
| 126 | |
| 127 | |

TABLE A-continued
| Compound # | Structure |
|---|---|
| 128 | 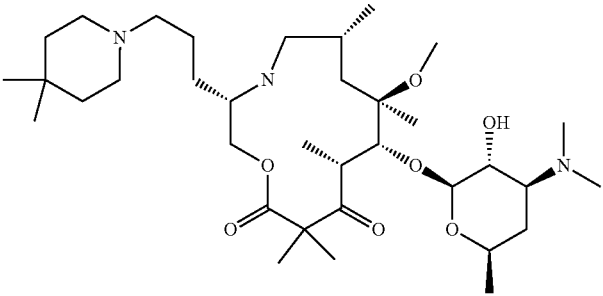 |
| 129 | 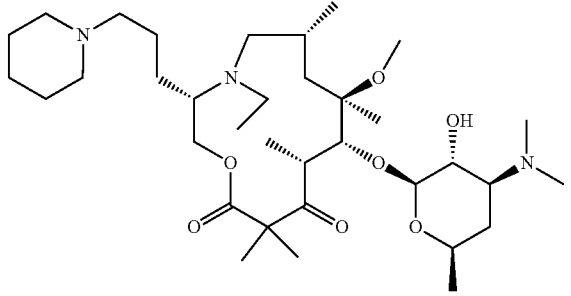 [SMILES: CCN1C[C@H](C)C[C@@](C)(OC)[C@H](O[C@@H]2O[C@H](C)C[C@H](N(C)C)[C@H]2O)[C@@H](C)C(=O)C(C)(C)C(=O)OC[C@@H]1CCCN1CCCCC1] |
| 130 | 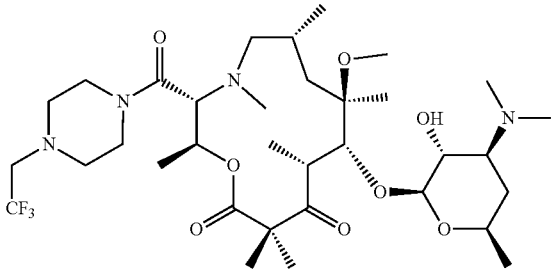 |
| 131 | 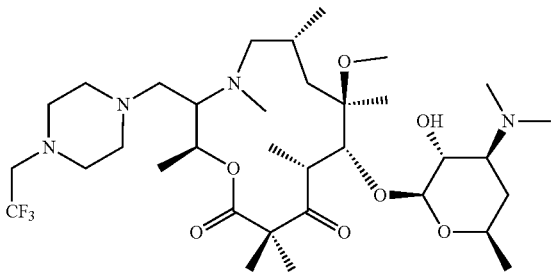 |
| 132 | 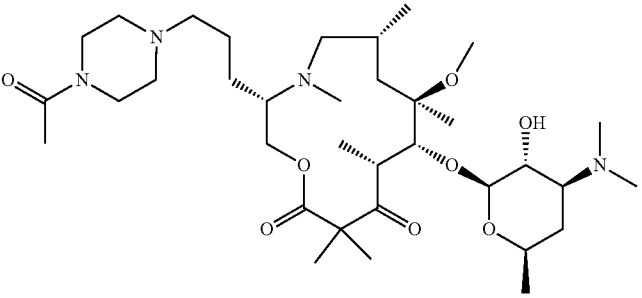 [SMILES: CO[C@]1(C)C[C@@H](C)CN(C)[C@@H](CCCN2CCN(C(C)=O)CC2)COC(=O)C(C)(C)C(=O)[C@H](C)[C@H]1O[C@@H]1O[C@H](C)C[C@H](N(C)C)[C@H]1O] |

TABLE A-continued

| Compound # | Structure |
|---|---|
| 133 | |
| 134 | |
| 135 | |
| 136 | |
| 137 | |

TABLE A-continued

| Compound # | Structure |
|---|---|
| 138 | |
| 139 | |
| 140 | |
| 141 | |
| 142 | |

TABLE A-continued

| Compound # | Structure |
|---|---|
| 143 | |
| 144 | |
| 145 | |
| 146 | |

TABLE A-continued

| Compound # | Structure |
|---|---|
| 147 | |
| 148 | |
| 149 | |
| 150 | |

TABLE A-continued

| Compound # | Structure |
|---|---|
| 151 | |
| 152 | |
| 153 | |
| 154 | |

TABLE A-continued

| Compound # | Structure |
|---|---|
| 155 | |
| 156 | |
| 157 | |
| 158 | |
| 159 | |

TABLE A-continued

| Compound # | Structure |
|---|---|
| 160 | |
| 161 | |
| 162 | |
| 163 | |
| 164 | |

TABLE A-continued

| Compound # | Structure |
|---|---|
| 165 | |
| 166 | |
| 168 | |
| 169 | |
| 170 | |

TABLE A-continued
| Compound # | Structure |
|---|---|
| 171 | 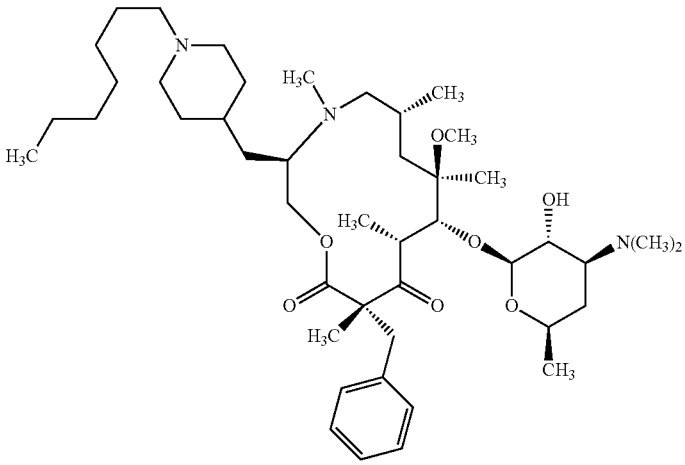 [SMILES: CCCCCCCN1CCC(C[C@@H]2COC(=O)[C@@](C)(Cc3ccccc3)C(=O)[C@H](C)[C@@H](O[C@@H]3O[C@H](C)C[C@H](N(C)C)[C@H]3O)[C@](C)(OC)C[C@@H](C)CN2C)CC1] |
| 172 | 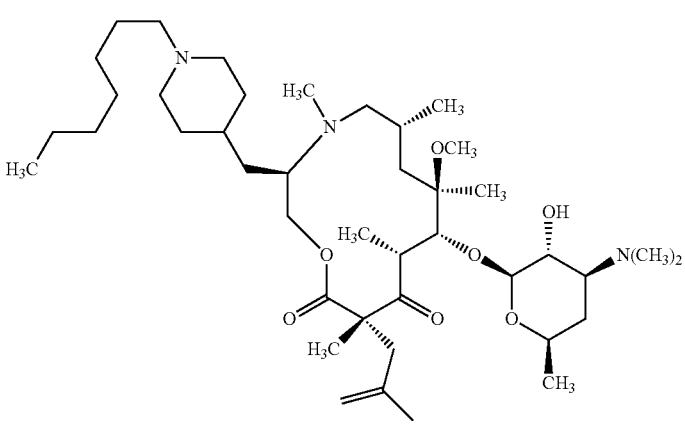 [SMILES: C=C(C)C[C@]1(C)C(=O)OC[C@@H](CC2CCN(CCCCCCC)CC2)N(C)C[C@H](C)C[C@@](C)(OC)[C@H](O[C@@H]2O[C@H](C)C[C@H](N(C)C)[C@H]2O)[C@@H](C)C1=O] |
| 173 | 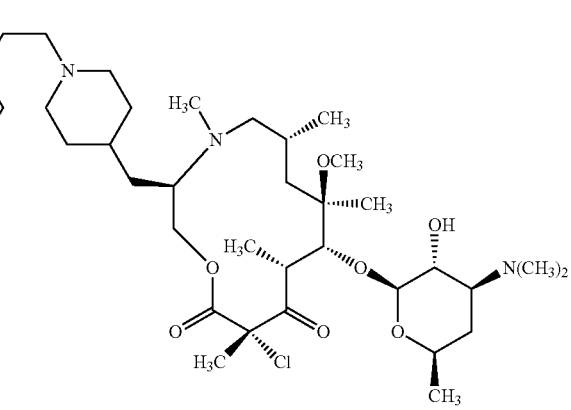 |

| Compound # | Structure |
|---|---|
| 174 | |
| 175 | |
| 176 | |
| 177 | |

TABLE A-continued

| Compound # | Structure |
|---|---|
| 178 | |
| 180 | |
| 181 | |
| 182 | |
| 189 | |

TABLE A-continued

| Compound # | Structure |
|---|---|
| 190 | |
| 191 | |
| 192 | |

TABLE A-continued

| Compound # | Structure |
|---|---|
| 193 | |
| 194 | |
| 195 | |
| 196 | |

| Compound # | Structure |
|---|---|
| 197 | |
| 198 | |
| 199 | |
| 200 | |
| 201 | |

TABLE A-continued
| Compound # | Structure |
|---|---|
| 202 | 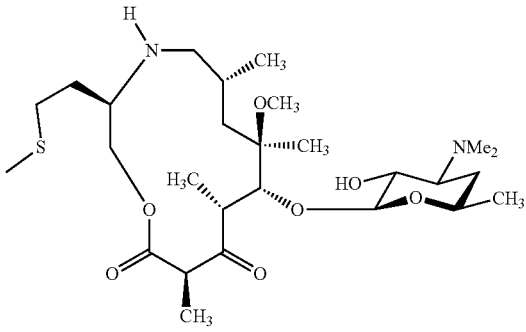 |
| 203 | 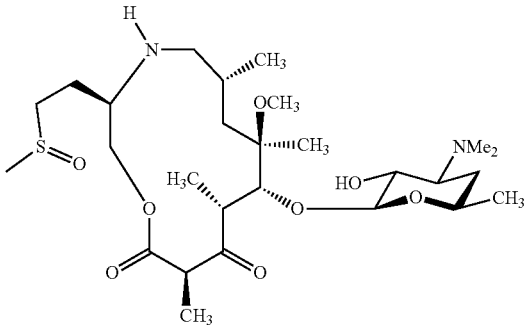 |
| 204 | 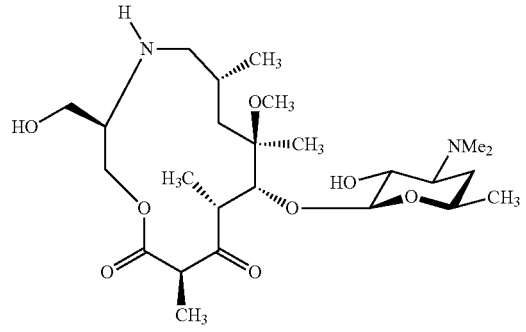 |
| 205 | 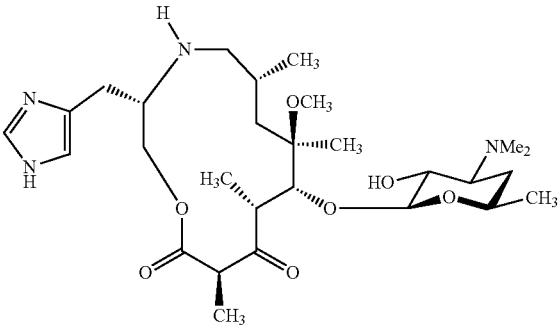 |

TABLE A-continued

| Compound # | Structure |
|---|---|
| 206 | |
| 207 | |
| 208 | |
| 209 | |

TABLE A-continued

| Compound # | Structure |
|---|---|
| 210 | |
| 211 | |
| 212 | |
| 213 | |

TABLE A-continued

| Compound # | Structure |
|---|---|
| 215 | |
| 216 | |
| 217 | |
| 218 | |

TABLE A-continued

| Compound # | Structure |
|---|---|
| 219 | |
| 220 | |
| 221 | |
| 222 | |

TABLE A-continued

| Compound # | Structure |
|---|---|
| 223 | |
| 224 | |
| 225 | |
| 226 | |

TABLE A-continued

| Compound # | Structure |
|---|---|
| 227 | |
| 228 | |
| 229 | |
| 230 | |

TABLE A-continued

| Compound # | Structure |
| --- | --- |
| 231 | |
| 232 | |
| 233 | |
| 234 | |

TABLE A-continued
| Compound # | Structure |
|---|---|
| 235 | 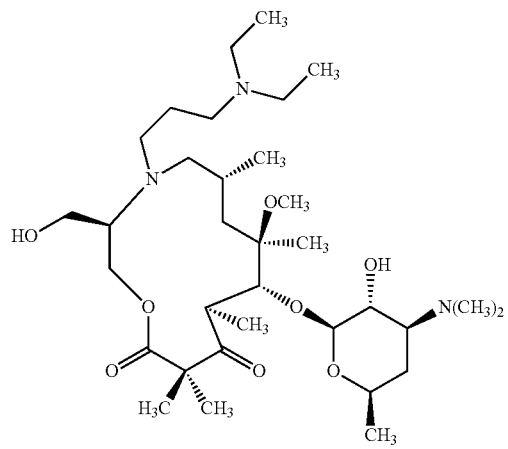 |
| 236 | 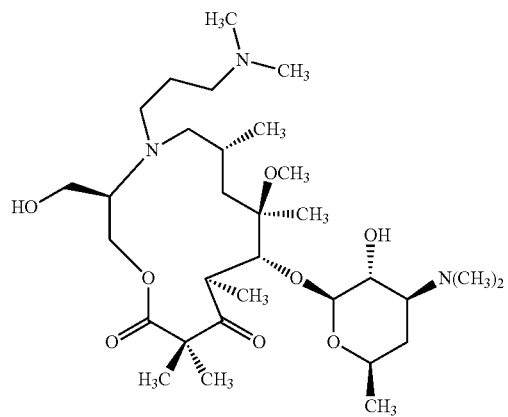 |
| 237 | 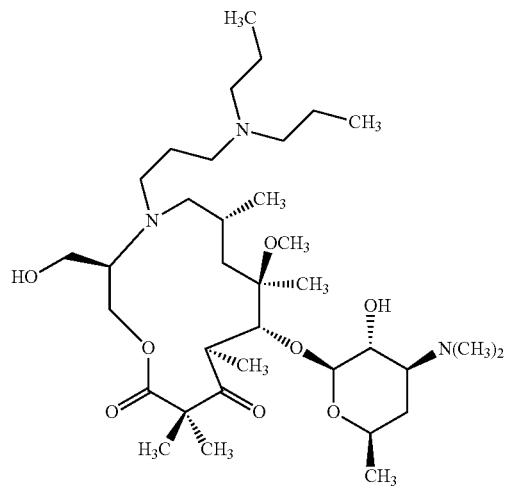 |

TABLE A-continued

| Compound # | Structure |
|---|---|
| 238 | |
| 239 | |
| 240 | |

Unless otherwise stated, any formulae described herein are also meant to include salts, solvates, hydrates, polymorphs, co-crystals, tautomers, stereoisomers, and isotopically labeled derivatives thereof. In certain embodiments, the provided compound is a salt of any of the formulae described herein. In certain embodiments, the provided compound is a pharmaceutically acceptable salt of any of the formulae described herein. In certain embodiments, the provided compound is a solvate of any of the formulae described herein. In certain embodiments, the provided compound is a hydrate of any of the formulae described herein. In certain embodiments, the provided compound is a polymorph of any of the formulae described herein. In certain embodiments, the provided compound is a co-crystal of any of the formulae described herein. In certain embodiments, the provided compound is a tautomer of any of the formulae described herein. In certain embodiments, the provided compound is a stereoisomer of any of the formulae described herein. In certain embodiments, the provided compound is of an isotopically labeled form of any of the formulae described herein. For example, compounds having the present structures except for the replacement of hydrogen by deuterium or tritium, replacement of $^{19}F$ with $^{18}F$, or the replacement of a $^{12}C$ by a $^{13}C$ or $^{14}C$ are within the scope of the disclosure. In certain embodiments, the provided compound is a deuterated form of any of the formulae or compounds described herein.

Additional Formulae

Provided herein are certain intermediates that may be prepared during the preparation of a macrolide described herein.

In one aspect, the present disclosure provides a macrolide eastern half intermediate of Formula (M):

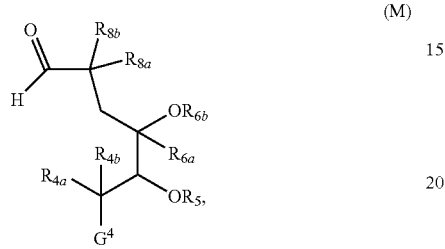

(M)

or salt thereof, wherein:
  $R^3$, $R^{4a}$, $R^{4b}$, $R^5$, $R^{6a}$, $R^{6b}$, $R^{8a}$, and $R^{8b}$ are as defined herein; and
  $G^4$ is of formula:

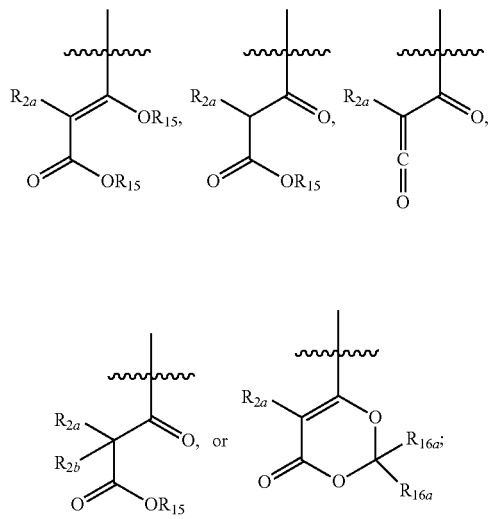

each instance of $R^{15}$ is independently silyl, optionally substituted alkyl, optionally substituted alkenyl, optionally substituted alkynyl, optionally substituted carbocyclyl, optionally substituted heterocyclyl, optionally substituted aryl, or optionally substituted heteroaryl, or two $R^{15}$ groups are joined to form an optionally substituted heterocyclyl or heteroaryl ring; and
  each instance of $R^{16a}$ is independently hydrogen, optionally substituted alkyl, optionally substituted alkenyl, optionally substituted alkynyl, optionally substituted carbocyclyl, optionally substituted heterocyclyl, optionally substituted aryl, or optionally substituted heteroaryl.

In another aspect, the present disclosure provides an uncyclized macrolide intermediate of Formula (N):

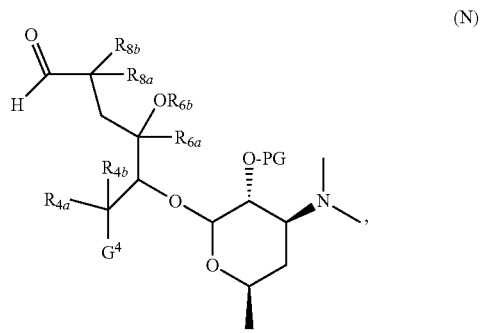

(N)

or salt thereof, wherein:
  PG is a protecting group;
  $R_{4a}$, $R_{4b}$, $R_5$, $R_{6a}$, $R_{6b}$, $R_{8a}$, and $R_{8b}$ are as defined herein;
  $G^4$ is of formula:

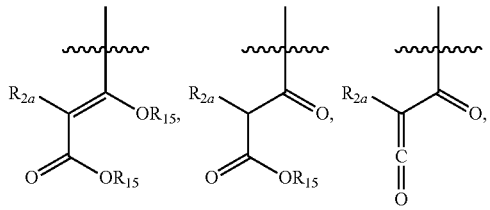

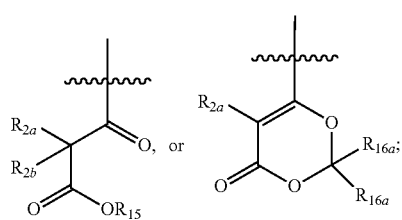

each instance of $R^{15}$ is independently silyl, optionally substituted alkyl, optionally substituted alkenyl, optionally substituted alkynyl, optionally substituted carbocyclyl, optionally substituted heterocyclyl, optionally substituted aryl, or optionally substituted heteroaryl, or two $R^{15}$ groups are joined to form an optionally substituted heterocyclyl or heteroaryl ring; and
  each instance of $R^{16a}$ is independently hydrogen, optionally substituted alkyl, optionally substituted alkenyl, optionally substituted alkynyl, optionally substituted carbocyclyl, optionally substituted heterocyclyl, optionally substituted aryl, or optionally substituted heteroaryl.

In some embodiments, —OPG is —OBz.

In certain embodiments, the compound of Formula (N) is a compound of Formula (N-a):

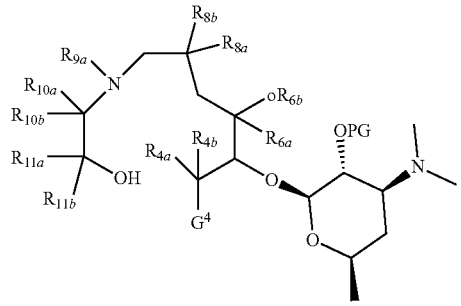

N-a or salt thereof, wherein the variables are as defined herein.

Preparation by Coupling and Macrolactonization

In certain embodiments, macrolides of the present disclosure are prepared by coupling a compound of Formula (N-2) (the eastern half) wherein $R_s$ is a sugar residue

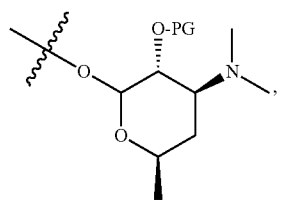

wherein PG is a protecting group and "〜〜" indicates a point of attachment, and a compound of Formula (N-1) (the western half) to provide an uncyclized macrolide precursor of Formula (N-a) as depicted in Scheme 1.

Scheme 1.

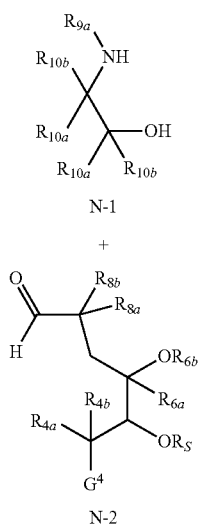

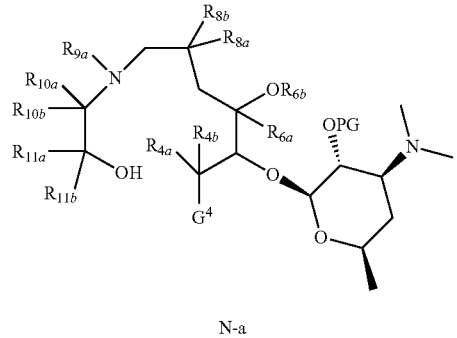

N-a

Formula (N-a) is cyclized to give, after deprotection of the sugar residue

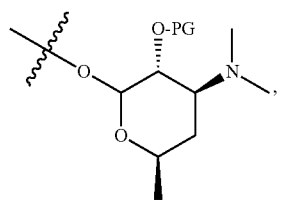

a macrolide of Formula (I) as depicted in Scheme 2.

Scheme 2.

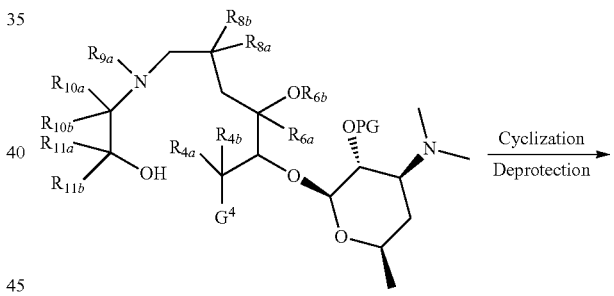

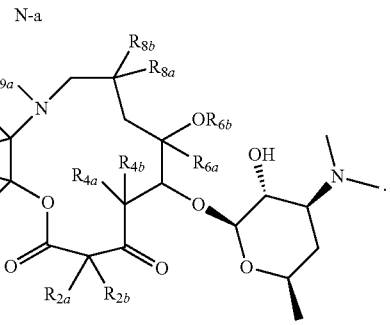

I

Alternatively, the macrolide precursor of Formula (N-a) is cyclized to provide a macrolide of Formula (P) (i.e., a compound of Formula (I), wherein $R_{9a}$ is hydrogen), which can undergo reductive amination to provide a compound of Formula (I) as shown in Scheme 3, wherein $R_{9a}$ is other than H as otherwise defined for formula I.

Scheme 3.

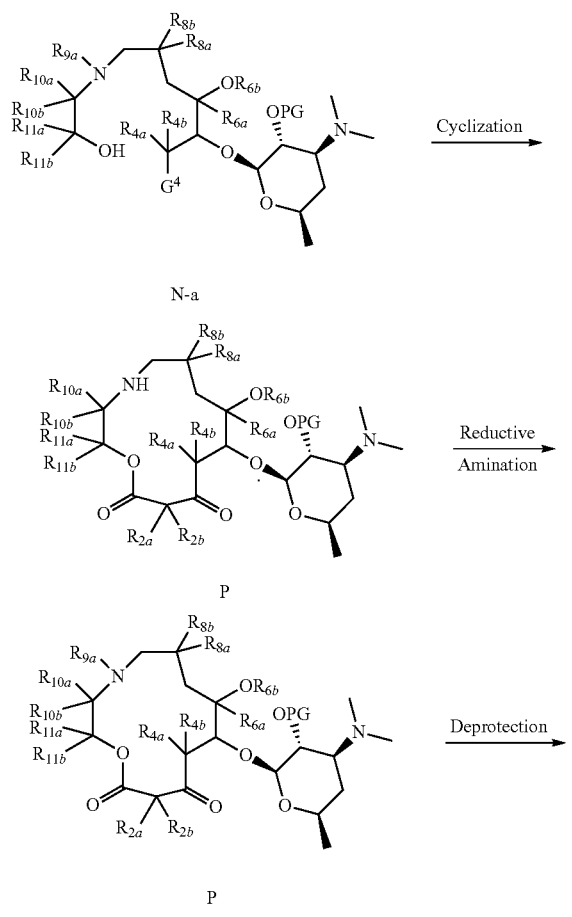

Late-stage installment of the $R_{2b}$ group can be achieved via treatment of a compound of Formula (A) prepared as provide above with a base and a suitable electrophile group (e.g., halogenating agent or $R_2$-LG, wherein LG is a leaving group) as depicted in Scheme 4. The compound of Formula (A) may be prepared in the same manner as the compound of Formula (I) as depicted in Schemes 2 and 3 with the exception that one of $R_{2a}$ or $R_{2b}$ is hydrogen.

Scheme 4.

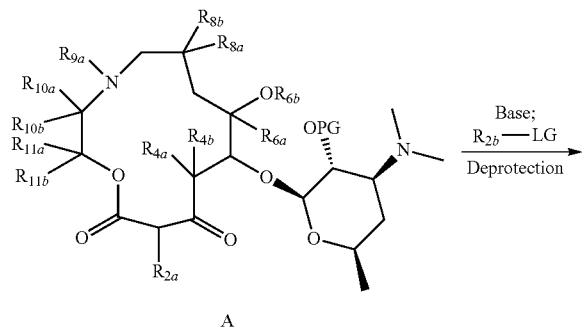

Exemplary methods that may be used in the preparation of a macrolide of the present disclosure are described below, and are not to be construed as limiting. Further description of the methods for preparation of the eastern and western halves, coupling of the halves, macrocyclization, and other methods for various steps in the preparation of the macrolides herein are described in PCT publications WO2014/165792 and WO2016/154591, which are both incorporated herein by reference in their entirety. The macrolides herein may be prepared by other methods of synthesis known in the art, and the procedures described herein may be modified or combined with other known methods.

For all intermediates, the variables are as defined herein for a compound of Formula (I).

Other variables depicted for intermediates and precursors are defined as follows:

$R_{2a}$ is other than H as defined for formula I and is selected from the group consisting of halo, optionally substituted $C_{1-10}$ alkyl, optionally substituted $C_{1-10}$ alkoxy, and optionally substituted $C_{1-10}$ alkenyl, wherein $C_{1-10}$ alkyl, $C_{1-10}$ alkoxy, and $C_{1-10}$ alkenyl are optionally substituted with one or more groups selected from the group consisting of halo, aryl, amino, alkyl, heteroalkyl, heteroalkenyl, heterocycloalkyl, and heteroaryl;

LG is a leaving group;

$G^4$ is of formula:

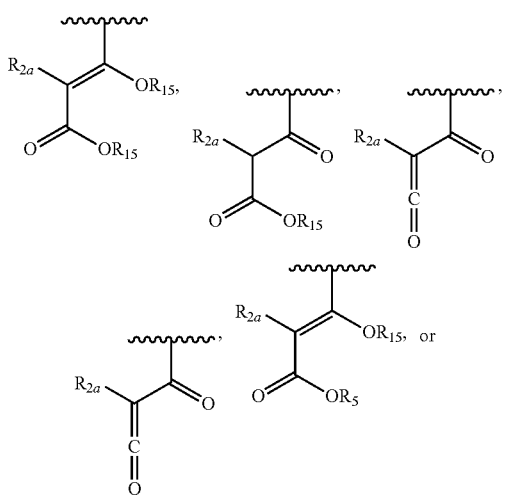

-continued

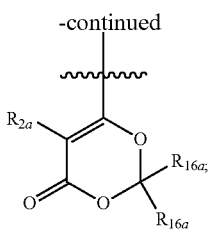

each instance of $R^{15}$ is independently silyl, optionally substituted alkyl, optionally substituted alkenyl, optionally substituted alkynyl, optionally substituted carbocyclyl, optionally substituted heterocyclyl, optionally substituted aryl, or optionally substituted heteroaryl, or two $R^{15}$ groups are joined to form an optionally substituted heterocyclyl or heteroaryl ring; and each instance of $R^{16a}$ is independently hydrogen, optionally substituted alkyl, optionally substituted alkenyl, optionally substituted alkynyl, optionally substituted carbocyclyl, optionally substituted heterocyclyl, optionally substituted aryl, or optionally substituted heteroaryl.

In some embodiments wherein $R_5$ is a sugar moiety

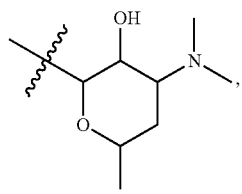 [SMILES: *C1OC(C)CC(N(C)C)C1O]

the sugar moiety is typically attached to the macrolide framework during synthesis of the eastern half, but may also be attached at other stages of the preparation. The sugar moiety may be attached by a chemical or enzymatic glycosylation reaction between the hydroxyl group at the C5 position and a glycosyl donor. In certain embodiments, the sugar moiety is attached to the macrolide framework as a thioglycoside. In certain embodiments, substituents of the sugar moiety are modified after the glycosylation of the macrolide or macrolide precursor (e.g., eastern half).

Pharmaceutical Compositions and Administration

The present disclosure provides pharmaceutical compositions comprising a macrolide as described herein, or a pharmaceutically acceptable salt thereof, and a pharmaceutically acceptable excipient.

Pharmaceutically acceptable excipients include any and all solvents, diluents, or other liquid vehicles, dispersions, suspension aids, surface active agents, isotonic agents, thickening or emulsifying agents, preservatives, solid binders, lubricants and the like, as suited to the particular dosage form desired. General considerations in formulation and/or manufacture of pharmaceutical compositions agents can be found, for example, in *Remington's Pharmaceutical Sciences*, Sixteenth Edition, E. W. Martin (Mack Publishing Co., Easton, Pa., 1980), and *Remington: The Science and Practice of Pharmacy*, 21st Edition (Lippincott Williams & Wilkins, 2005).

Pharmaceutical compositions described herein can be prepared by any method known in the art of pharmacology. In general, such preparatory methods include the steps of bringing the macrolide of the present invention into association with a carrier and/or one or more other accessory ingredients, and then, if necessary and/or desirable, shaping and/or packaging the product into a desired single- or multi-dose unit.

Pharmaceutical compositions can be prepared, packaged, and/or sold in bulk, as a single unit dose, and/or as a plurality of single unit doses. As used herein, a "unit dose" is discrete amount of the pharmaceutical composition comprising a predetermined amount of the macrolide of the present invention. The amount of the macrolide is generally equal to the dosage of the macrolide which would be administered to a subject and/or a convenient fraction of such a dosage such as, for example, one-half or one-third of such a dosage.

Relative amounts of the macrolide, the pharmaceutically acceptable excipient, and/or any additional ingredients in a pharmaceutical composition of the invention will vary, depending upon the identity, size, and/or condition of the subject treated and further depending upon the route by which the composition is to be administered. By way of example, the composition may comprise between 0.1% and 100% (w/w) macrolide.

Pharmaceutically acceptable excipients used in the manufacture of provided pharmaceutical compositions include inert diluents, dispersing and/or granulating agents, surface active agents and/or emulsifiers, disintegrating agents, binding agents, preservatives, buffering agents, lubricating agents, and/or oils. Excipients such as cocoa butter and suppository waxes, coloring agents, coating agents, sweetening, flavoring, and perfuming agents may also be present in the composition.

Liquid dosage forms for oral and parenteral administration include pharmaceutically acceptable emulsions, microemulsions, solutions, suspensions, syrups and elixirs. In addition to the macrolides, the liquid dosage forms may comprise inert diluents commonly used in the art such as, for example, water or other solvents, solubilizing agents, and emulsifiers, and mixtures thereof. Besides inert diluents, the oral compositions can include adjuvants such as wetting agents, emulsifying and suspending agents, sweetening, flavoring, and perfuming agents. In certain embodiments for parenteral administration, the conjugates of the invention are mixed with solubilizing agents, and mixtures thereof.

Injectable preparations, for example, sterile injectable aqueous or oleaginous suspensions can be formulated according to the known art using suitable dispersing or wetting agents and suspending agents. The sterile injectable preparation can be a sterile injectable solution, suspension or emulsion in a nontoxic parenterally acceptable diluent or solvent, for example, as a solution in 1,3-butanediol. Among the acceptable vehicles and solvents that can be employed are water, Ringer's solution, U.S.P., and isotonic sodium chloride solution. In addition, sterile, fixed oils are conventionally employed as a solvent or suspending medium.

Solid dosage forms for oral administration include capsules, tablets, pills, powders, and granules. In such solid dosage forms, the macrolide is mixed with at least one inert, pharmaceutically acceptable excipient or carrier such as sodium citrate or dicalcium phosphate and/or a) fillers or extenders such as starches, lactose, sucrose, glucose, mannitol, and silicic acid, b) binders such as, for example, carboxymethylcellulose, alginates, gelatin, polyvinylpyrrolidinone, sucrose, and acacia, c) humectants such as glycerol, d) disintegrating agents such as agar, calcium carbonate, potato or tapioca starch, alginic acid, certain silicates, and sodium carbonate, e) solution retarding agents such as paraffin, f) absorption accelerators such as quaternary ammonium compounds, g) wetting agents such as, for example, cetyl alcohol and glycerol monostearate, h) absorbents such as kaolin and bentonite clay, and i) lubricants such as talc, calcium stearate, magnesium stearate, solid polyethylene glycols, sodium lauryl sulfate, and mixtures thereof. In the case of capsules, tablets and pills, the dosage form may comprise buffering agents.

Dosage forms for topical and/or transdermal administration of a macrolide of this invention may include ointments, pastes, creams, lotions, gels, powders, solutions, sprays, inhalants and/or patches. Generally, the macrolide is admixed under sterile conditions with a pharmaceutically acceptable carrier and/or any needed preservatives and/or buffers as can be required.

Although the descriptions of pharmaceutical compositions provided herein are principally directed to pharmaceutical compositions which are suitable for administration to humans, it will be understood by the skilled artisan that such compositions are generally suitable for administration to animals of all sorts. Modification of pharmaceutical compositions suitable for administration to humans in order to render the compositions suitable for administration to various animals is well understood, and the ordinarily skilled veterinary pharmacologist can design and/or perform such modification with ordinary experimentation.

Macrolides provided herein are typically formulated in dosage unit form for ease of administration and uniformity of dosage. It will be understood, however, that the total daily amount of the macrolide will be decided by the attending physician within the scope of sound medical judgment. The specific therapeutically effective dose level for any particular subject will depend upon a variety of factors including the disease, disorder, or condition being treated and the severity of the disorder; the activity of the specific macrolide employed; the specific composition employed; the age, body weight, general health, sex, and diet of the subject; the time of administration, route of administration, and rate of excretion of the specific macrolide employed; the duration of the treatment; drugs used in combination or coincidental with the specific macrolide employed; and like factors well known in the medical arts.

The macrolides and compositions provided herein can be administered by any route, including enteral (e.g., oral), parenteral, intravenous, intramuscular, intra-arterial, intramedullary, intrathecal, subcutaneous, intraventricular, transdermal, interdermal, rectal, intravaginal, intraperitoneal, topical (as by powders, ointments, creams, and/or drops), mucosal, nasal, bucal, sublingual; by intratracheal instillation, bronchial instillation, and/or inhalation; and/or as an oral spray, nasal spray, and/or aerosol. In general, the most appropriate route of administration will depend upon a variety of factors including the nature of the agent, the therapeutic regimen, and/or the condition of the subject. Oral administration is the preferred mode of administration. However, in certain embodiments, the subject may not be in a condition to tolerate oral administration, and thus intravenous, intramuscular, and/or rectal administration are also preferred alternative modes of administration.

An effective amount may be included in a single dose (e.g., single oral dose) or multiple doses (e.g., multiple oral doses). In certain embodiments, when multiple doses are administered to a subject or applied to a tissue or cell, any two doses of the multiple doses include different or substantially the same amounts of a compound described herein. In certain embodiments, when multiple doses are administered to a subject or applied to a tissue or cell, the frequency of administering the multiple doses to the subject or applying the multiple doses to the tissue or cell is three doses a day, two doses a day, one dose a day, one dose every other day, one dose every third day, one dose every week, one dose every two weeks, one dose every three weeks, or one dose every four weeks. In certain embodiments, a dose (e.g., a single dose, or any dose of multiple doses) described herein includes independently between 0.1 μg and 1 μg, between 0.001 mg and 0.01 mg, between 0.01 mg and 0.1 mg, between 0.1 mg and 1 mg, between 1 mg and 3 mg, between 3 mg and 10 mg, between 10 mg and 30 mg, between 30 mg and 100 mg, between 100 mg and 300 mg, between 300 mg and 1,000 mg, or between 1 g and 10 g, inclusive, of a compound described herein.

It will be also appreciated that a macrolide or composition, as described herein, can be administered in combination with one or more additional therapeutically active agents. The macrolide or composition can be administered concurrently with, prior to, or subsequent to, one or more additional therapeutically active agents. In general, each agent will be administered at a dose and/or on a time schedule determined for that agent. In will further be appreciated that the additional therapeutically active agent utilized in this combination can be administered together in a single composition or administered separately in different compositions. The particular combination to employ in a regimen will take into account compatibility of the inventive macrolide with the additional therapeutically active agent and/or the desired therapeutic effect to be achieved. In general, it is expected that additional therapeutically active agents utilized in combination be utilized at levels that do not exceed the levels at which they are utilized individually. In certain embodiments, the levels utilized in combination will be lower than those utilized individually.

Exemplary additional therapeutically active agents include, but are not limited to, antibiotics, anti-viral agents, anesthetics, anti-coagulants, inhibitors of an enzyme, steroidal agents, steroidal or non-steroidal anti-inflammatory agents, antihistamine, immunosuppressant agents, antigens, vaccines, antibodies, decongestant, sedatives, opioids, pain-relieving agents, analgesics, anti-pyretics, hormones, and prostaglandins. Therapeutically active agents include small organic molecules such as drug compounds (e.g., compounds approved by the US Food and Drug Administration as provided in the Code of Federal Regulations (CFR)), peptides, proteins, carbohydrates, monosaccharides, oligosaccharides, polysaccharides, nucleoproteins, mucoproteins, lipoproteins, synthetic polypeptides or proteins, small molecules linked to proteins, glycoproteins, steroids, nucleic acids, DNAs, RNAs, nucleotides, nucleosides, oligonucleotides, antisense oligonucleotides, lipids, hormones, vitamins, and cells.

In certain embodiments, the additional therapeutically active agent is an antibiotic. Exemplary antibiotics include, but are not limited to, penicillins (e.g., penicillin, amoxicillin), cephalosporins (e.g., cephalexin), macrolides (e.g., erythromycin, clarithormycin, azithromycin, troleandomycin), fluoroquinolones (e.g., ciprofloxacin, levofloxacin, ofloxacin), sulfonamides (e.g., co-trimoxazole, trimethoprim), tetracyclines (e.g., tetracycline, chlortetracycline, oxytetracycline, demeclocycline, methacycline, sancycline, doxycline, aureomycin, terramycin, minocycline, 6-deoxytetracycline, lymecycline, meclocycline, methacycline, rolitetracycline, and glycylcycline antibiotics (e.g., tigecycline)), aminoglycosides (e.g., gentamicin, tobramycin, paromomycin), aminocyclitol (e.g., spectinomycin), chloramphenicol, sparsomycin, and quinupristin/dalfoprisin (Syndercid™).

Also encompassed by the invention are kits (e.g., pharmaceutical packs). The kits provided may comprise an inventive pharmaceutical composition or macrolide and a container (e.g., a vial, ampule, bottle, syringe, and/or dispenser package, or other suitable container). In certain embodiments, provided kits may optionally further include a second container comprising a pharmaceutical excipient for dilution or suspension of an inventive pharmaceutical composition or macrolide. In certain embodiments, the inventive pharmaceutical composition or macrolide provided in the container and the second container are combined to form one unit dosage form.

Methods of Treatment and Uses

The present disclosure contemplates using macrolides of the present invention for the treatment of infectious diseases, for example, fungal, bacterial, viral, or parasitic infections, and for the treatment of inflammatory conditions. Ketolides are known to exhibit anti-bacterial activity as well as anti-parasitic activity. See, for example, Clark et al., *Bioorganic & Medicinal Chemistry Letters* (2000) 10:815-819 (antibacterial activity); and Lee et al., *J. Med. Chem.* (2011) 54:2792-2804 (anti-bacterial and anti-parasitic activity). Ketolides are also known to exhibit an anti-inflammatory effect. See, for example, Amsden, *Journal of Antimicrobial Chemotherapy* (2005) 55:10-21 (chronic pulmonary inflammatory syndromes).

Thus, as generally described herein, provided is a method of treating an infectious disease comprising administering an effective amount of a macrolide of the present disclosure, or a pharmaceutically acceptable salt thereof, to a subject in need thereof. Such a method can be conducted in vivo (i.e., by administration to a subject) or in vitro (e.g., upon contact with the pathogen, tissue, or cell culture). Treating, as used herein, encompasses therapeutic treatment and prophylactic treatment.

In certain embodiments, the effective amount is a therapeutically effective amount. For example, in certain embodiments, the method slows the progress of an infectious disease in the subject. In certain embodiments, the method improves the condition of the subject suffering from an infectious disease. In certain embodiments, the subject has a suspected or confirmed infectious disease.

In certain embodiments, the effective amount is a prophylactically effective amount. For example, in certain embodiments, the method prevents or reduces the likelihood of an infectious disease, e.g., in certain embodiments, the method comprises administering a macrolide of the present invention to a subject in need thereof in an amount sufficient to prevent or reduce the likelihood of an infectious disease. In certain embodiments, the subject is at risk of an infectious disease (e.g., has been exposed to another subject who has a suspected or confirmed infectious disease or has been exposed or thought to be exposed to a pathogen).

In another aspect, provided is an in vitro method of inhibiting pathogenic growth comprising contacting an effective amount of the macrolide of the present invention with a pathogen (e.g., a bacteria, virus, fungus, or parasite) in a cell culture.

As used herein, "infectious disease" and "microbial infection" are used interchangeably, and refer to an infection with a pathogen, such as a fungus, bacteria, virus, or a parasite. In certain embodiments, the infectious disease is caused by a pathogen resistant to other treatments. In certain embodiments, the infectious disease is caused by a pathogen that is multi-drug tolerant or resistant, e.g., the infectious disease is caused by a pathogen that neither grows nor dies in the presence of or as a result of other treatments.

In certain embodiments, the infectious disease is a bacterial infection. For example, in certain embodiments, provided is a method of treating a bacterial infection comprising administering an effective amount of a macrolide of the present invention, or a pharmaceutically acceptable salt thereof, to a subject in need thereof.

In certain embodiments, the macrolide has a mean inhibitory concentration (MIC), with respect to a particular bacterial isolate, of less than 50 µg/mL, less than 25 µg/mL, less than 20 µg/mL, less than 10 µg/mL, less than 5 µg/mL, or less than 1 µg/mL.

In certain embodiments, the bacterial isolate is susceptible (e.g., responds to) or resistant to known commercial macrolides, such as azithromycin, clindamycin, telithromycin, erythromycin, spiramycin, and the like. In certain embodiments, the bacterial isolate is resistant to a known macrolide. For example, in certain embodiments, the bacterium is erythromycin resistant (ER). In certain other embodiments, the bacterium is azithromycin resistant (AR).

In certain embodiments, the bacterial infection is resistant to other antibiotics (e.g., non-macrolide) therapy. For example, in certain embodiments, the pathogen is vancomycin resistant (VR). In certain embodiments, the pathogen is methicillin-resistant (MR), e.g., in certain embodiments, the bacterial infection is a methicillin-resistant *S. aureus* infection (a MRSA infection). In certain embodiments, the pathogen is quinolone resistant (QR). In certain embodiments, the pathogen is fluoroquinolone resistant (FR).

In certain embodiments, the bacterial isolate has an efflux (e.g.; mef, msr) genotype. In certain embodiments, the bacteria have a methylase (e.g., erm) genotype. In certain embodiments, the bacterial isolates have a constitutive genotype. In certain embodiments, the bacterial isolates have an inducible genotype.

Exemplary bacterial infections include, but are not limited to, infections with a Gram positive bacteria (e.g., of the phylum Actinobacteria, phylum Firmicutes, or phylum Tenericutes); Gram negative bacteria (e.g., of the phylum Aquificae, phylum Deinococcus-Thermus, phylum Fibrobacteres/Chlorobi/Bacteroidetes (FCB), phylum Fusobacteria, phylum Gemmatimonadest, phylum Ntrospirae, phylum Planctomycetes/Verrucomicrobia/Chlanydiae (PVC), phylum Proteobacteria, phylum Spirochaetes, or phylum Synergistetes); or other bacteria (e.g., of the phylum Acidobacteria, phylum Chlroflexi, phylum Chrystiogenetes, phylum Cyanobacteria, phylum Deferrubacteres, phylum Dictyoglomi, phylum Thermodesulfobacteria, or phylum Thermotogae).

In certain embodiments, the bacterial infection is an infection with a Gram positive bacterium.

In certain embodiments, the Gram positive bacterium is a bacterium of the phylum Firmicutes.

In certain embodiments, the bacteria are members of the phylum Firmicutes and the genus *Enterococcus*, i.e., the bacterial infection is an *Enterococcus* infection. Exemplary Enterococci bacteria include, but are not limited to, *E. avium, E. durans, E. faecalis, E. faecium, E. gallinarum, E. solitarius, E. casseliflavus,* and *E. raffinosus.*

In certain embodiments, the bacteria are members of the phylum Firmicutes and the genus *Staphylococcus*, i.e., the bacterial infection is a *Staphylococcus* infection. Exemplary Staphylococci bacteria include, but are not limited to, *S. arlettae, S. aureus, S. auricularis, S. capitis, S. caprae, S. carnous, S. chromogenes, S. cohii, S. condimenti, S. croceolyticus, S. delphini, S. devriesei, S. epidermis, S. equorum, S. felis, S. fluroettii, S. gallinarum, S. haemolyticus, S. hominis, S. hyicus, S. intermedius, S. kloosii, S. leei, S. lenus,*

*S. lugdunesis, S. lutrae, S. lyticans, S. massiliensis, S. microti, S. muscae, S. nepalensis, S. pasteuri, S. penttenkoferi, S. piscifermentans, S. psuedointermedius, S. psudolugdensis, S. pulvereri, S. rostri, S. saccharolyticus, S. saprophyticus, S. schleiferi, S. sciuri, S. simiae, S. simulans, S. stepanovicii, S. succinus, S. vitulinus, S. warneri*, and *S. xylosus*. In certain embodiments, the *Staphylococcus* infection is an *S. aureus* infection. In certain embodiments, the *S. aureus* has an efflux (e.g., mef, msr) genotype. In certain embodiments, the *S. aureus* has a methylase (e.g., erm) genotype.

In certain embodiments, the bacteria are members of the phylum Firmicutes and the genus *Bacillus*, i.e., the bacterial infection is a *Bacillus* infection. Exemplary *Bacillus* bacteria include, but are not limited to, *B. alcalophilus, B. alvei, B. aminovorans, B. amyloliquefaciens, B. aneurinolyticus, B. anthracis, B. aquaemaris, B. atrophaeus, B. boroniphilus, B. brevis, B. caldolyticus, B. centrosporus, B. cereus, B. circulans, B. coagulans, B. firmus, B. flavothermus, B. fusiformis, B. globigii, B. infernus, B. larvae, B. laterosporus, B. lentus, B. lichenmformis, B. megaterium, B. mesentericus, B. mucilaginosus, B. mycoides, B. natto, B. pantothenticus, B. polymyxa, B. pseudoanthracis, B. pumilus, B. schlegelii, B. sphaericus, B. sporothermodurans, B. stearothermophilus, B. subtilis, B. thermoglucosidasius, B. thuringiensis, B. vulgatis*, and *B. weihenstephanensis*. In certain embodiments, the *Bacillus* infection is a *B. subtilis* infection. In certain embodiments, the *B. subtilis* has an efflux (e.g., mef, msr) genotype. In certain embodiments, the *B. subtilis* has a methylase (e.g., erm) genotype.

In certain embodiments, the bacteria are members of the phylum Firmicutes and the genus *Streptococcus*, i.e., the bacterial infection is a *Streptococcus* infection. Exemplary *Streptococcus* bacteria include, but are not limited to, *S. agalactiae, S. anginosus, S. bovis, S. canis, S. constellatus, S. dysgalactiae, S. equinus, S. iniae, S. intermedius, S. mitis, S. mutans, S. oralis, S. parasanguinis, S. peroris, S. pneumoniae, S pyogenes, S ratti, S. salivarius, S. thermophilus, S. sanguinis, S. sobrinus, S. suis, S. uberis, S. vestibularis, S. viridans*, and *S. zooepidemicus*. In certain embodiments, the *Streptococcus* infection is an *S. pyogenes* infection. In certain embodiments, the *Streptococcus* infection is an *S. pneumoniae* infection. In certain embodiments, the *S. pneumoniae* has an efflux (e.g., mef, msr) genotype. In certain embodiments, the *S. pneumoniae* has a methylase (e.g., erm) genotype.

In certain embodiments, the bacteria are members of the phylum Actinobacteria and the genus *Mycobacterium*, i.e., the bacterial infection is a *Mycobacterium* infection. Exemplary Mycobacteriaceae bacteria include, but are not limited to, *M. tuberculosis, M avium, M. gordonae, M. kansasi, M nonchromogenicum, M. terrae, M. ulcerans, M. simiae, M. leprae, M. abscessus, M. chelonae, M. fortuitum, M. mucogenicum, M parafortuitum*, and *M. vaccae*.

In certain embodiments, the bacterial infection is an infection with a Gram negative bacteria.

In certain embodiments, the Gram negative bacteria are bacteria of the phylum Proteobacteria and the genus *Escherichia*. i.e., the bacterial infection is an *Escherichia* infection. Exemplary *Escherichia* bacteria include, but are not limited to, *E. albertii, E. blattae, E. coli, E. fergusonii, E. hermannii*, and *E. vulneris*. In certain embodiments, the *Escherichia* infection is an *E. coli* infection.

In certain embodiments, the Gram negative bacteria are bacteria of the phylum Proteobacteria and the genus *Haemophilus*. i.e., the bacterial infection is an *Haemophilus* infection. Exemplary *Haemophilus* bacteria include, but are not limited to, *H. aegyptius, H. aphrophilus, H. avium, H. ducreyi, H felis, H. haemolyticus, H. influenzae, H. parainfluenzae, H. paracuniculus, H parahaemolyticus, H. pittmaniae, Haemophilus segnis*, and *H. somnus*. In certain embodiments, the *Haemophilus* infection is an *H. influenzae* infection.

In certain embodiments, the Gram negative bacteria are bacteria of the phylum Proteobacteria and the genus *Acinetobacter*. i.e., the bacterial infection is an *Acinetobacter* infection. Exemplary *Acinetobacter* bacteria include, but are not limited to, *A. baumanii, A. haemolyticus*, and *A. lwoffii*. In certain embodiments, the *Acinetobacter* infection is an *A. baumanii* infection.

In certain embodiments, the Gram negative bacteria are bacteria of the phylum Proteobacteria and the genus *Klebsiella*. i.e., the bacterial infection is a *Klebsiella* infection. Exemplary *Klebsiella* bacteria include, but are not limited to, *K. granulomatis, K. oxytoca, K. michiganensis, K. pneunoniae, K. quasipneumoniae*, and *K. variicola*. In certain embodiments, the *Klebsiella* infection is a *K. pneumoniae* infection.

In certain embodiments, the Gram negative bacteria are bacteria of the phylum Proteobacteria and the genus *Pseudomonas*. i.e., the bacterial infection is a *Pseudomonas* infection. Exemplary *Pseudomonas* bacteria include, but are not limited to, *P. aeruginosa, P. oryzihabitans, P. plecoglissicida, P. syringae, P. putida*, and *P. fluoroscens*. In certain embodiments, the *Pseudomonas* infection is a *P. aeruginosa* infection.

In certain embodiments, the bacterium is an atypical bacteria, i.e., are neither Gram positive nor Gram negative.

In certain embodiments, the infectious disease is an infection with a parasitic infection. Thus, in certain embodiments, provided is a method of treating a parasitic infection comprising administering an effective amount of a macrolide of the present invention, or a pharmaceutically acceptable salt thereof, to a subject in need thereof.

In certain embodiments, the macrolide has an $IC_{50}$ (uM) with respect to a particular parasite, of less than 50 uM, less than 25 uM, less than 20 uM, less than 10 uM, less than 5 uM, or less than 1 uM.

Exemplary parasites include, but are not limited to, *Trypanosoma* spp. (e.g., *Trypanosoma cruzi, Trypansosoma brucei*), *Leishmania* spp., *Giardia* spp., *Trichomonas* spp., *Entamoeba* spp., *Naegleria* spp., *Acanthamoeba* spp., *Schistosoma* spp., *Plasmodium* spp. (e.g., *P. flaciparum*), *Crytosporidium* spp., *Isospora* spp., *Balantidium* spp., *Loa Loa, Ascaris lumbricoides, Dirofilaria immitis*, and *Toxoplasma* spp. (e.g. *T. gondii*).

As generally described herein, the present disclosure further provides a method of treating an inflammatory condition comprising administering an effective amount of a macrolide of the present disclosure, or a pharmaceutically acceptable salt thereof, to a subject in need thereof. Such a method can be conducted in vivo (i.e., by administration to a subject) or in vitro (e.g., upon contact with the pathogen, tissue, or cell culture). Treating, as used herein, encompasses therapeutic treatment and prophylactic treatment.

In certain embodiments, the effective amount is a therapeutically effective amount. For example, in certain embodiments, the method slows the progress of an inflammatory condition in the subject. In certain embodiments, the method improves the condition of the subject suffering from an inflammatory condition. In certain embodiments, the subject has a suspected or confirmed inflammatory condition.

In certain embodiments, the effective amount is a prophylatically effective amount. For example, in certain embodiments, the method prevents or reduces the likelihood of an inflammatory condition, e.g., in certain embodiments, the method comprises administering a macrolide of the present invention to a subject in need thereof in an amount sufficient to prevent or reduce the likelihood of an inflammatory condition. In certain embodiments, the subject is at risk to an inflammatory condition.

In another aspect, provided is an in vitro method of treating an inflammatory condition comprising contacting an effective amount of the macrolide of the present invention with an inflammatory cell culture.

The term "inflammatory condition" refers to those diseases, disorders, or conditions that are characterized by signs of pain (dolor, from the generation of noxious substances and the stimulation of nerves), heat (calor, from vasodilatation), redness (rubor, from vasodilatation and increased blood flow), swelling (tumor, from excessive inflow or restricted outflow of fluid), and/or loss of function (functio laesa, which can be partial or complete, temporary or permanent). Inflammation takes on many forms and includes, but is not limited to, acute, adhesive, atrophic, catarrhal, chronic, cirrhotic, diffuse, disseminated, exudative, fibrinous, fibrosing, focal, granulomatous, hyperplastic, hypertrophic, interstitial, metastatic, necrotic, obliterative, parenchymatous, plastic, productive, proliferous, pseudomembranous, purulent, sclerosing, seroplastic, serous, simple, specific, subacute, suppurative, toxic, traumatic, and/or ulcerative inflammation.

Exemplary inflammatory conditions include, but are not limited to, chronic pulmonary inflammatory syndromes (e.g., diffuse panbronchiolitis, cystic fibrosis, asthma, bronchiectasis, and chronic obstructive pulmonary disease).

In certain embodiments, the inflammatory condition is an acute inflammatory condition (e.g., for example, inflammation resulting from an infection). In certain embodiments, the inflammatory condition is a chronic inflammatory condition. In certain embodiments, the inflammatory condition is inflammation associated with cancer.

Definitions

Chemical Terms

Definitions of specific functional groups and chemical terms are described in more detail below. The chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5th Edition, John Wiley & Sons, Inc., New York, 2001; Larock, *Comprehensive Organic Transformations*, VCH Publishers, Inc., New York, 1989; and Carruthers, *Some Modern Methods of Organic Synthesis*, 3rd Edition, Cambridge University Press, Cambridge, 1987.

Compounds described herein can comprise one or more asymmetric centers, and thus can exist in various stereoisomeric forms, e.g., enantiomers and/or diastereomers. For example, the compounds described herein can be in the form of an individual enantiomer, diastereomer or geometric isomer, or can be in the form of a mixture of stereoisomers, including racemic mixtures and mixtures enriched in one or more stereoisomer. Isomers can be isolated from mixtures by methods known to those skilled in the art, including chiral high pressure liquid chromatography (HPLC) and the formation and crystallization of chiral salts; or preferred isomers can be prepared by asymmetric syntheses. See, for example, Jacques et al., *Enantiomers, Racemates and Resolutions* (Wiley Interscience, New York, 1981); Wilen et al., *Tetrahedron* 33:2725 (1977); Eliel, E. L. *Stereochemistry of Carbon Compounds* (McGraw-Hill, N Y, 1962); and Wilen, S. H. *Tables of Resolving Agents and Optical Resolutions* p. 268 (E. L. Eliel, Ed., Univ. of Notre Dame Press, Notre Dame, IN 1972). The invention additionally encompasses compounds as individual isomers substantially free of other isomers, and alternatively, as mixtures of various isomers.

In a formula, ⁓ is a single bond where the stereochemistry of the moieties immediately attached thereto is not specified, - - - is absent or a single bond, and ═ or ≡ is a single or double bond. When a variable is defined generically, with a number of possible substituents, each individual radical can be defined with or without the bond. For example, if $R_{zz}$ can be hydrogen, this can be indicated as "—H" or "H" in the definition of $R_{zz}$.

Unless otherwise stated, structures depicted herein are also meant to include compounds that differ only in the presence of one or more isotopically enriched atoms. For example, compounds having the present structures except for the replacement of hydrogen by deuterium or tritium, replacement of $^{19}F$ with $^{18}F$, or the replacement of $^{12}C$ with $^{13}C$ or $^{14}C$ are within the scope of the disclosure. Such compounds are useful, for example, as analytical tools or probes in biological assays.

When a range of values is listed, it is intended to encompass each value and sub-range within the range. For example, "$C_{1-10}$ alkyl" is intended to encompass, $C_1$, $C_2$, $C_3$, $C_4$, $C_5$, $C_6$, $C_{1-6}$, $C_{1-5}$, $C_{1-4}$, $C_{1-3}$, $C_{1-2}$, $C_{2-6}$, $C_{2-5}$, $C_{2-4}$, $C_{2-3}$, $C_{3-6}$, $C_{3-5}$, $C_{3-4}$, $C_{4-6}$, $C_{4-5}$, and $C_{5-6}$ alkyl. The ranges can be written as, for example, $C_{1-10}$ or as $C_1$-$C_{10}$.

The term "aliphatic" refers to alkyl, alkenyl, alkynyl, and carbocyclic groups. Likewise, the term "heteroaliphatic" refers to heteroalkyl, heteroalkenyl, heteroalkynyl, and heterocyclic groups.

The term "alkyl" refers to a radical of a straight-chain or branched saturated hydrocarbon group having from 1 to 10 carbon atoms ("$C_{1-10}$ alkyl"). In certain embodiments, an alkyl group has 1 to 9 carbon atoms ("$C_{1-9}$ alkyl"). In certain embodiments, an alkyl group has 1 to 8 carbon atoms ("$C_{1-8}$ alkyl"). In certain embodiments, an alkyl group has 1 to 7 carbon atoms ("$C_{1-7}$ alkyl"). In certain embodiments, an alkyl group has 1 to 6 carbon atoms ("$C_{1-6}$ alkyl"). In certain embodiments, an alkyl group has 1 to 5 carbon atoms ("$C_{1-5}$ alkyl"). In certain embodiments, an alkyl group has 1 to 4 carbon atoms ("$C_{1-4}$ alkyl"). In certain embodiments, an alkyl group has 1 to 3 carbon atoms ("$C_{1-3}$ alkyl"). In certain embodiments, an alkyl group has 1 to 2 carbon atoms ("$C_{1-2}$ alkyl"). In certain embodiments, an alkyl group has 1 carbon atom ("$C_1$ alkyl"). In certain embodiments, an alkyl group has 2 to 6 carbon atoms ("$C_{2-6}$ alkyl"). Examples of $C_{1-6}$ alkyl groups include methyl ($C_1$), ethyl ($C_2$), propyl ($C_3$) (e.g., n-propyl, isopropyl), butyl ($C_4$) (e.g., n-butyl, tert-butyl, sec-butyl, iso-butyl), pentyl ($C_5$) (e.g., n-pentyl, 3-pentanyl, amyl, neopentyl, 3-methyl-2-butanyl, tertiary amyl), and hexyl ($C_6$) (e.g., n-hexyl). Additional examples of alkyl groups include n-heptyl ($C_7$), n-octyl ($C_8$), and the like. Unless otherwise specified, each instance of an alkyl group is independently unsubstituted (an "unsubstituted alkyl") or substituted (a "substituted alkyl") with one or more substituents (e.g., halogen, such as F). In certain embodiments, the alkyl group is an unsubstituted $C_{1-10}$ alkyl (such as unsubstituted $C_{1-6}$ alkyl, e.g., —$CH_3$ (Me), unsubstituted ethyl (Et), unsubstituted propyl (Pr, e.g., unsubstituted n-propyl (n-Pr), unsubstituted isopropyl (i-Pr)), unsubstituted butyl (Bu, e.g., unsubstituted n-butyl (n-Bu), unsubstituted tert-butyl (tert-Bu or t-Bu), unsubstituted sec-butyl (sec-Bu), unsubstituted isobutyl (i-Bu)). In certain embodiments, the alkyl group is a substituted $C_{1-10}$ alkyl (such as substituted $C_{1-6}$ alkyl, e.g., —$CF_3$, Bn).

The term "haloalkyl" is a substituted alkyl group, wherein one or more of the hydrogen atoms are independently replaced by a halogen, e.g., fluoro, bromo, chloro, or iodo. In certain embodiments, the haloalkyl moiety has 1 to 8 carbon atoms ("$C_{1-8}$ haloalkyl"). In certain embodiments, the haloalkyl moiety has 1 to 6 carbon atoms ("$C_{1-6}$ haloalkyl"). In certain embodiments, the haloalkyl moiety has 1 to 4 carbon atoms ("$C_{1-4}$ haloalkyl"). In certain embodiments, the haloalkyl moiety has 1 to 3 carbon atoms ("$C_{1-3}$ haloalkyl"). In certain embodiments, the haloalkyl moiety has 1 to 2 carbon atoms ("$C_{1-2}$ haloalkyl"). Examples of haloalkyl groups include —$CF_3$, —$CF_2CF_3$, —$CF_2CF_2CF_3$, —$CCl_3$, —$CFCl_2$, —$CF_2Cl$, and the like.

The term "alkoxy" refers to a moiety of the formula —OR', wherein R' is an ($C_1$-$C_6$)alkyl moiety as defined herein. The term "$C_{n-m}$ alkoxy" or ($C_n$-$C_m$) alkoxy refers to an alkoxy group, the alkyl group of which has n to m carbons. Examples of alkoxy moieties include, but are not limited to, methoxy, ethoxy, isopropoxy, and the like.

The term "hydroxyalkyl" refers to a moiety of the formula HOR', wherein R' is an ($C_1$-$C_6$)alkyl moiety as defined herein. The term "$C_{n-m}$ alkoxy" or ($C_n$-$C_m$) alkoxy refers to an alkoxy group, the alkyl group of which has n to m carbons. Examples of alkoxy moieties include, but are not limited to, methoxy, ethoxy, isopropoxy, and the like.

The term "heteroalkyl" refers to an alkyl group, which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkyl group refers to a saturated group having from 1 to 10 carbon atoms and 1 or more heteroatoms within the parent chain ("hetero$C_{1-10}$ alkyl"). In certain embodiments, a heteroalkyl group is a saturated group having 1 to 9 carbon atoms and 1 or more heteroatoms within the parent chain ("hetero$C_{1-9}$ alkyl"). In certain embodiments, a heteroalkyl group is a saturated group having 1 to 8 carbon atoms and 1 or more heteroatoms within the parent chain ("hetero$C_{1-8}$ alkyl"). In certain embodiments, a heteroalkyl group is a saturated group having 1 to 7 carbon atoms and 1 or more heteroatoms within the parent chain ("hetero$C_{1-7}$ alkyl"). In certain embodiments, a heteroalkyl group is a saturated group having 1 to 6 carbon atoms and 1 or more heteroatoms within the parent chain ("hetero$C_{1-6}$ alkyl"). In certain embodiments, a heteroalkyl group is a saturated group having 1 to 5 carbon atoms and 1 or 2 heteroatoms within the parent chain ("hetero$C_{1-5}$ alkyl"). In certain embodiments, a heteroalkyl group is a saturated group having 1 to 4 carbon atoms and 1 or 2 heteroatoms within the parent chain ("hetero$C_{1-4}$ alkyl"). In certain embodiments, a heteroalkyl group is a saturated group having 1 to 3 carbon atoms and 1 heteroatom within the parent chain ("hetero$C_{1-3}$ alkyl"). In certain embodiments, a heteroalkyl group is a saturated group having 1 to 2 carbon atoms and 1 heteroatom within the parent chain ("hetero$C_{1-2}$ alkyl"). In certain embodiments, a heteroalkyl group is a saturated group having 1 carbon atom and 1 heteroatom ("hetero$C_1$ alkyl"). In certain embodiments, a heteroalkyl group is a saturated group having 2 to 6 carbon atoms and 1 or 2 heteroatoms within the parent chain ("hetero$C_{2-6}$ alkyl"). Unless otherwise specified, each instance of a heteroalkyl group is independently unsubstituted (an "unsubstituted heteroalkyl") or substituted (a "substituted heteroalkyl") with one or more substituents. In certain embodiments, the heteroalkyl group is an unsubstituted hetero$C_{1-10}$ alkyl. In certain embodiments, the heteroalkyl group is a substituted hetero$C_{1-10}$ alkyl.

The term "alkenyl" refers to a radical of a straight-chain or branched hydrocarbon group having from 2 to 10 carbon atoms and one or more carbon-carbon double bonds (e.g., 1, 2, 3, or 4 double bonds). In certain embodiments, an alkenyl group has 2 to 9 carbon atoms ("$C_{2-9}$ alkenyl"). In certain embodiments, an alkenyl group has 2 to 8 carbon atoms ("$C_{2-8}$ alkenyl"). In certain embodiments, an alkenyl group has 2 to 7 carbon atoms ("$C_{2-7}$ alkenyl"). In certain embodiments, an alkenyl group has 2 to 6 carbon atoms ("$C_{2-6}$ alkenyl"). In certain embodiments, an alkenyl group has 2 to 5 carbon atoms ("$C_{2-5}$ alkenyl"). In certain embodiments, an alkenyl group has 2 to 4 carbon atoms ("$C_{2-4}$ alkenyl"). In certain embodiments, an alkenyl group has 2 to 3 carbon atoms ("$C_{2-3}$ alkenyl"). In certain embodiments, an alkenyl group has 2 carbon atoms ("$C_2$ alkenyl"). The one or more carbon-carbon double bonds can be internal (such as in 2-butenyl) or terminal (such as in 1-butenyl). Examples of $C_{2-4}$ alkenyl groups include ethenyl ($C_2$), 1-propenyl ($C_3$), 2-propenyl ($C_3$), 1-butenyl ($C_4$), 2-butenyl ($C_4$), butadienyl ($C_4$), and the like. Examples of $C_{2-6}$ alkenyl groups include the aforementioned $C_{2-4}$ alkenyl groups as well as pentenyl ($C_5$), pentadienyl ($C_5$), hexenyl ($C_6$), and the like. Additional examples of alkenyl include heptenyl ($C_7$), octenyl ($C_8$), octatrienyl ($C_8$), and the like. Unless otherwise specified, each instance of an alkenyl group is independently unsubstituted (an "unsubstituted alkenyl") or substituted (a "substituted alkenyl") with one or more substituents. In certain embodiments, the alkenyl group is an unsubstituted $C_{2-10}$ alkenyl. In certain embodiments, the alkenyl group is a substituted $C_{2-10}$ alkenyl. In an alkenyl group, a C=C double bond for which the stereochemistry is not specified (e.g., —CH=$CHCH_3$ or

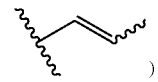

)

may be an (E)- or (Z)-double bond.

The term "heteroalkenyl" refers to an alkenyl group, which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkenyl group refers to a group having from 2 to 10 carbon atoms, at least one double bond, and 1 or more heteroatoms within the parent chain ("hetero$C_{2-10}$ alkenyl"). In certain embodiments, a heteroalkenyl group has 2 to 9 carbon atoms at least one double bond, and 1 or more heteroatoms within the parent chain ("hetero$C_{2-9}$ alkenyl"). In certain embodiments, a heteroalkenyl group has 2 to 8 carbon atoms, at least one double bond, and 1 or more heteroatoms within the parent chain ("hetero$C_{2-8}$ alkenyl"). In certain embodiments, a heteroalkenyl group has 2 to 7 carbon atoms, at least one double bond, and 1 or more heteroatoms within the parent chain ("hetero$C_{2-7}$ alkenyl"). In certain embodiments, a heteroalkenyl group has 2 to 6 carbon atoms, at least one double bond, and 1 or more heteroatoms within the parent chain ("heteroC$_{2-6}$ alkenyl"). In certain embodiments, a heteroalkenyl group has 2 to 5 carbon atoms, at least one double bond, and 1 or 2 heteroatoms within the parent chain ("heteroC$_{2-5}$ alkenyl"). In certain embodiments, a heteroalkenyl group has 2 to 4 carbon atoms, at least one double bond, and 1 or 2 heteroatoms within the parent chain ("heteroC$_{2-4}$ alkenyl"). In certain embodiments, a heteroalkenyl group has 2 to 3 carbon atoms, at least one double bond, and 1 heteroatom within the parent chain ("heteroC$_{2-3}$ alkenyl"). In certain embodiments, a heteroalkenyl group has 2 to 6 carbon atoms, at least one double bond, and 1 or 2 heteroatoms within the parent chain ("heteroC$_{2-6}$ alkenyl"). Unless otherwise specified, each instance of a heteroalkenyl group is independently unsubstituted (an "unsubstituted heteroalkenyl") or substituted (a "substituted heteroalkenyl") with one or more substituents. In certain embodiments, the heteroalkenyl group is an unsubstituted heteroC$_{2-10}$ alkenyl. In certain embodiments, the heteroalkenyl group is a substituted heteroC$_{2-10}$ alkenyl.

The term "alkynyl" refers to a radical of a straight-chain or branched hydrocarbon group having from 2 to 10 carbon atoms and one or more carbon-carbon triple bonds (e.g., 1, 2, 3, or 4 triple bonds) ("C$_{2-10}$ alkynyl"). In certain embodiments, an alkynyl group has 2 to 9 carbon atoms ("C$_{2-9}$ alkynyl"). In certain embodiments, an alkynyl group has 2 to 8 carbon atoms ("C$_{2-8}$ alkynyl"). In certain embodiments, an alkynyl group has 2 to 7 carbon atoms ("C$_{2-7}$ alkynyl"). In certain embodiments, an alkynyl group has 2 to 6 carbon atoms ("C$_{2-6}$ alkynyl"). In certain embodiments, an alkynyl group has 2 to 5 carbon atoms ("C$_{2-5}$ alkynyl"). In certain embodiments, an alkynyl group has 2 to 4 carbon atoms ("C$_{2-4}$ alkynyl"). In certain embodiments, an alkynyl group has 2 to 3 carbon atoms ("C$_{2-3}$ alkynyl"). In certain embodiments, an alkynyl group has 2 carbon atoms ("C$_2$ alkynyl"). The one or more carbon-carbon triple bonds can be internal (such as in 2-butynyl) or terminal (such as in 1-butynyl). Examples of C$_{2-4}$ alkynyl groups include, without limitation, ethynyl (C$_2$), 1-propynyl (C$_3$), 2-propynyl (C$_3$), 1-butynyl (C$_4$), 2-butynyl (C$_4$), and the like. Examples of C$_{2-6}$ alkenyl groups include the aforementioned C$_{2-4}$ alkynyl groups as well as pentynyl (C$_5$), hexynyl (C$_6$), and the like. Additional examples of alkynyl include heptynyl (C$_7$), octynyl (C$_8$), and the like. Unless otherwise specified, each instance of an alkynyl group is independently unsubstituted (an "unsubstituted alkynyl") or substituted (a "substituted alkynyl") with one or more substituents. In certain embodiments, the alkynyl group is an unsubstituted C$_{2-10}$ alkynyl. In certain embodiments, the alkynyl group is a substituted C$_{2-10}$ alkynyl.

The term "heteroalkynyl" refers to an alkynyl group, which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkynyl group refers to a group having from 2 to 10 carbon atoms, at least one triple bond, and 1 or more heteroatoms within the parent chain ("heteroC$_{2-10}$ alkynyl"). In certain embodiments, a heteroalkynyl group has 2 to 9 carbon atoms, at least one triple bond, and 1 or more heteroatoms within the parent chain ("heteroC$_{2-9}$ alkynyl"). In certain embodiments, a heteroalkynyl group has 2 to 8 carbon atoms, at least one triple bond, and 1 or more heteroatoms within the parent chain ("heteroC$_{2-8}$ alkynyl"). In certain embodiments, a heteroalkynyl group has 2 to 7 carbon atoms, at least one triple bond, and 1 or more heteroatoms within the parent chain ("heteroC$_{2-7}$ alkynyl"). In certain embodiments, a heteroalkynyl group has 2 to 6 carbon atoms, at least one triple bond, and 1 or more heteroatoms within the parent chain ("heteroC$_{2-6}$ alkynyl"). In certain embodiments, a heteroalkynyl group has 2 to 5 carbon atoms, at least one triple bond, and 1 or 2 heteroatoms within the parent chain ("heteroC$_{2-5}$ alkynyl"). In certain embodiments, a heteroalkynyl group has 2 to 4 carbon atoms, at least one triple bond, and 1 or 2 heteroatoms within the parent chain ("heteroC$_{2-4}$ alkynyl"). In certain embodiments, a heteroalkynyl group has 2 to 3 carbon atoms, at least one triple bond, and 1 heteroatom within the parent chain ("heteroC$_{2-3}$ alkynyl"). In certain embodiments, a heteroalkynyl group has 2 to 6 carbon atoms, at least one triple bond, and 1 or 2 heteroatoms within the parent chain ("heteroC$_{2-6}$ alkynyl"). Unless otherwise specified, each instance of a heteroalkynyl group is independently unsubstituted (an "unsubstituted heteroalkynyl") or substituted (a "substituted heteroalkynyl") with one or more substituents. In certain embodiments, the heteroalkynyl group is an unsubstituted heteroC$_{2-10}$ alkynyl. In certain embodiments, the heteroalkynyl group is a substituted heteroC$_{2-10}$ alkynyl.

The term "carbocyclyl" or "carbocyclic" refers to a radical of a non-aromatic cyclic hydrocarbon group having from 3 to 14 ring carbon atoms ("C$_{3-14}$ carbocyclyl") and zero heteroatoms in the non-aromatic ring system. In certain embodiments, a carbocyclyl group has 3 to 10 ring carbon atoms ("C$_{3-10}$ carbocyclyl"). In certain embodiments, a carbocyclyl group has 3 to 8 ring carbon atoms ("C$_{3-8}$ carbocyclyl"). In certain embodiments, a carbocyclyl group has 3 to 7 ring carbon atoms ("C$_{3-7}$ carbocyclyl"). In certain embodiments, a carbocyclyl group has 3 to 6 ring carbon atoms ("C$_{3-6}$ carbocyclyl"). In certain embodiments, a carbocyclyl group has 4 to 6 ring carbon atoms ("C$_{4-6}$ carbocyclyl"). In certain embodiments, a carbocyclyl group has 5 to 6 ring carbon atoms ("C$_{5-6}$ carbocyclyl"). In certain embodiments, a carbocyclyl group has 5 to 10 ring carbon atoms ("C$_{5-10}$ carbocyclyl"). Exemplary C$_{3-6}$ carbocyclyl groups include, without limitation, cyclopropyl (C$_3$), cyclopropenyl (C$_3$), cyclobutyl (C$_4$), cyclobutenyl (C$_4$), cyclopentyl (C$_5$), cyclopentenyl (C$_5$), cyclohexyl (C$_6$), cyclohexenyl (C$_6$), cyclohexadienyl (C$_6$), and the like. Exemplary C$_{3-8}$ carbocyclyl groups include, without limitation, the aforementioned C$_{3-6}$ carbocyclyl groups as well as cycloheptyl (C$_7$), cycloheptenyl (C$_7$), cycloheptadienyl (C$_7$), cycloheptatrienyl (C$_7$), cyclooctyl (C$_8$), cyclooctenyl (C$_8$), bicyclo[2.2.1]heptanyl (C$_7$), bicyclo[2.2.2]octanyl (C$_8$), and the like. Exemplary C$_{3-10}$ carbocyclyl groups include, without limitation, the aforementioned C$_{3-8}$ carbocyclyl groups as well as cyclononyl (C$_9$), cyclononenyl (C$_9$), cyclodecyl (C$_{10}$), cyclodecenyl (C$_{10}$), octahydro-1H-indenyl (C$_9$), decahydronaphthalenyl (C$_{10}$), spiro[4.5]decanyl (C$_{10}$), and the like. As the foregoing examples illustrate, in certain embodiments, the carbocyclyl group is either monocyclic ("monocyclic carbocyclyl") or polycyclic (e.g., containing a fused, bridged or spiro ring system such as a bicyclic system ("bicyclic carbocyclyl") or tricyclic system ("tricyclic carbocyclyl")) and can be saturated or can contain one or more carbon-carbon double or triple bonds. "Carbocyclyl" also includes ring systems wherein the carbocyclyl ring, as defined above, is fused with one or more aryl or heteroaryl groups wherein the point of attachment is on the carbocyclyl ring, and in such instances, the number of carbons continue to designate the number of carbons in the carbocyclic ring system. Unless otherwise specified, each instance of a carbocyclyl group is independently unsubstituted (an "unsubstituted carbocyclyl") or substituted (a "substituted carbocyclyl") with one or more substituents. In certain embodiments, the carbocyclyl group is an unsubstituted $C_{3-14}$ carbocyclyl. In certain embodiments, the carbocyclyl group is a substituted $C_{3-14}$ carbocyclyl.

In certain embodiments, "carbocyclyl" is a monocyclic, saturated carbocyclyl group having from 3 to 14 ring carbon atoms ("$C_{3-14}$ cycloalkyl"). In certain embodiments, a cycloalkyl group has 3 to 10 ring carbon atoms ("$C_{3-10}$ cycloalkyl"). In certain embodiments, a cycloalkyl group has 3 to 8 ring carbon atoms ("$C_{3-8}$ cycloalkyl"). In certain embodiments, a cycloalkyl group has 3 to 6 ring carbon atoms ("$C_{3-6}$ cycloalkyl"). In certain embodiments, a cycloalkyl group has 4 to 6 ring carbon atoms ("$C_{4-6}$ cycloalkyl"). In certain embodiments, a cycloalkyl group has 5 to 6 ring carbon atoms ("$C_{5-6}$ cycloalkyl"). In certain embodiments, a cycloalkyl group has 5 to 10 ring carbon atoms ("$C_{5-10}$ cycloalkyl"). Examples of $C_{5-6}$ cycloalkyl groups include cyclopentyl ($C_5$) and cyclohexyl ($C_5$). Examples of $C_{3-6}$ cycloalkyl groups include the aforementioned $C_{5-6}$ cycloalkyl groups as well as cyclopropyl ($C_3$) and cyclobutyl ($C_4$). Examples of $C_{3-8}$ cycloalkyl groups include the aforementioned $C_{3-6}$ cycloalkyl groups as well as cycloheptyl ($C_7$) and cyclooctyl ($C_5$). Unless otherwise specified, each instance of a cycloalkyl group is independently unsubstituted (an "unsubstituted cycloalkyl") or substituted (a "substituted cycloalkyl") with one or more substituents. In certain embodiments, the cycloalkyl group is an unsubstituted $C_{3-14}$ cycloalkyl. In certain embodiments, the cycloalkyl group is a substituted $C_{3-14}$ cycloalkyl.

The term "heterocycloalkyl" or "heterocyclyl" or "heterocyclic" refers to a radical of a 3- to 14-membered saturated or partially unsaturated but non-aromatic ring system having ring carbon atoms and 1 to 4 ring heteroatoms, wherein each heteroatom is independently selected from nitrogen, oxygen, and sulfur ("3-14 membered heterocyclyl"). In heterocyclyl groups that contain one or more nitrogen atoms, the point of attachment can be a carbon or nitrogen atom, as valency permits. A heterocyclyl group can either be monocyclic ("monocyclic heterocyclyl") or polycyclic (e.g., a fused, bridged or spiro ring system such as a bicyclic system ("bicyclic heterocyclyl") or tricyclic system ("tricyclic heterocyclyl")), and can be saturated or can contain one or more carbon-carbon double or triple bonds. Heterocyclyl polycyclic ring systems can include one or more heteroatoms in one or both rings. "Heterocyclyl" also includes ring systems wherein the heterocyclyl ring, as defined above, is fused with one or more carbocyclyl groups wherein the point of attachment is either on the carbocyclyl or heterocyclyl ring, or ring systems wherein the heterocyclyl ring, as defined above, is fused with one or more aryl or heteroaryl groups, wherein the point of attachment is on the heterocyclyl ring, and in such instances, the number of ring members continue to designate the number of ring members in the heterocyclyl ring system. Unless otherwise specified, each instance of heterocyclyl is independently unsubstituted (an "unsubstituted heterocyclyl") or substituted (a "substituted heterocyclyl") with one or more substituents. In certain embodiments, the heterocyclyl group is an unsubstituted 3-14 membered heterocyclyl. In certain embodiments, the heterocyclyl group is a substituted 3-14 membered heterocyclyl.

In certain embodiments, a heterocyclyl group is a 5-10 membered non-aromatic ring system having ring carbon atoms and 1-4 ring heteroatoms, wherein each heteroatom is independently selected from nitrogen, oxygen, and sulfur ("5-10 membered heterocyclyl"). In certain embodiments, a heterocyclyl group is a 5-8 membered non-aromatic ring system having ring carbon atoms and 1-4 ring heteroatoms, wherein each heteroatom is independently selected from nitrogen, oxygen, and sulfur ("5-8 membered heterocyclyl"). In certain embodiments, a heterocyclyl group is a 5-6 membered non-aromatic ring system having ring carbon atoms and 1-4 ring heteroatoms, wherein each heteroatom is independently selected from nitrogen, oxygen, and sulfur ("5-6 membered heterocyclyl"). In certain embodiments, the 5-6 membered heterocyclyl has 1-3 ring heteroatoms selected from nitrogen, oxygen, and sulfur. In certain embodiments, the 5-6 membered heterocyclyl has 1-2 ring heteroatoms selected from nitrogen, oxygen, and sulfur. In certain embodiments, the 5-6 membered heterocyclyl has 1 ring heteroatom selected from nitrogen, oxygen, and sulfur.

Exemplary 3-membered heterocyclyl groups containing 1 heteroatom include, without limitation, azirdinyl, oxiranyl, and thiiranyl. Exemplary 4-membered heterocyclyl groups containing 1 heteroatom include, without limitation, azetidinyl, oxetanyl, and thietanyl. Exemplary 5-membered heterocyclyl groups containing 1 heteroatom include, without limitation, tetrahydrofuranyl, dihydrofuranyl, tetrahydrothiophenyl, dihydrothiophenyl, pyrrolidinyl, dihydropyrrolyl, and pyrrolyl-2,5-dione. Exemplary 5-membered heterocyclyl groups containing 2 heteroatoms include, without limitation, dioxolanyl, oxathiolanyl and dithiolanyl. Exemplary 5-membered heterocyclyl groups containing 3 heteroatoms include, without limitation, triazolinyl, oxadiazolinyl, and thiadiazolinyl. Exemplary 6-membered heterocyclyl groups containing 1 heteroatom include, without limitation, piperidinyl, tetrahydropyranyl, dihydropyridinyl, and thianyl. Exemplary 6-membered heterocyclyl groups containing 2 heteroatoms include, without limitation, piperazinyl, morpholinyl, dithianyl, and dioxanyl. Exemplary 6-membered heterocyclyl groups containing 2 heteroatoms include, without limitation, triazinanyl. Exemplary 7-membered heterocyclyl groups containing 1 heteroatom include, without limitation, azepanyl, oxepanyl and thiepanyl. Exemplary 8-membered heterocyclyl groups containing 1 heteroatom include, without limitation, azocanyl, oxecanyl and thiocanyl. Exemplary bicyclic heterocyclyl groups include, without limitation, indolinyl, isoindolinyl, dihydrobenzofuranyl, dihydrobenzothienyl, tetra-hydro-benzo-thienyl, tetrahydrobenzofuranyl, tetrahydroindolyl, tetrahydroquinolinyl, tetrahydroisoquinolinyl, decahydroquinolinyl, decahydroisoquinolinyl, octahydrochromenyl, octahydroisochromenyl, decahydronaphthyridinyl, decahydro-1,8-naphthyridinyl, octahydropyrrolo[3,2-b]pyrrole, indolinyl, phthalimidyl, naphthalimidyl, chromanyl, chromenyl, 1H-benzo[e][1,4]diazepinyl, 1,4,5,7-tetra-hydro-pyrano[3,4-b]pyrrolyl, 5,6-dihydro-4H-furo[3,2-b]pyrrolyl, 6,7-dihydro-5H-furo[3,2-b]pyranyl, 5,7-dihydro-4H-thieno[2,3-c]pyranyl, 2,3-dihydro-1H-pyrrolo[2,3-b]pyridinyl, 2,3-dihydrofuro[2,3-b]pyridinyl, 4,5,6,7-tetrahydro-1H-pyrrolo[2,3-b]pyridinyl, 4,5,6,7-tetra-hydrofuro[3,2-c]pyridinyl, 4,5,6,7-tetrahydrothieno[3,2-b]pyridinyl, 1,2,3,4-tetrahydro-1,6-naphthyridinyl, and the like.

The term "aryl" refers to a radical of a monocyclic or polycyclic (e.g., bicyclic or tricyclic) 4n+2 aromatic ring system (e.g., having 6, 10, or 14 π electrons shared in a cyclic array) having 6-14 ring carbon atoms and zero heteroatoms provided in the aromatic ring system ("$C_{6-14}$ aryl"). In certain embodiments, an aryl group has 6 ring carbon atoms ("$C_6$ aryl"; e.g., phenyl). In certain embodiments, an aryl group has 10 ring carbon atoms ("$C_{10}$ aryl"; e.g., naphthyl such as 1-naphthyl and 2-naphthyl). In certain embodiments, an aryl group has 14 ring carbon atoms ("$C_{14}$ aryl"; e.g., anthracyl). "Aryl" also includes ring systems wherein the aryl ring, as defined above, is fused with one or more carbocyclyl or heterocyclyl groups wherein the radical or point of attachment is on the aryl ring, and in such instances, the number of carbon atoms continue to designate the number of carbon atoms in the aryl ring system. Unless otherwise specified, each instance of an aryl group is independently unsubstituted (an "unsubstituted aryl") or substituted (a "substituted aryl") with one or more substituents. In certain embodiments, the aryl group is an unsubstituted $C_{6-14}$ aryl. In certain embodiments, the aryl group is a substituted $C_{6-14}$ aryl.

"Aralkyl" is a subset of "alkyl" and refers to an alkyl group substituted by an aryl group, wherein the point of attachment is on the alkyl moiety.

The term "heteroaryl" refers to a radical of a 5-14 membered monocyclic or polycyclic (e.g., bicyclic, tricyclic) 4n+2 aromatic ring system (e.g., having 6, 10, or 14 π electrons shared in a cyclic array) having ring carbon atoms and 1-4 ring heteroatoms provided in the aromatic ring system, wherein each heteroatom is independently selected from nitrogen, oxygen, and sulfur ("5-14 membered heteroaryl"). In heteroaryl groups that contain one or more nitrogen atoms, the point of attachment can be a carbon or nitrogen atom, as valency permits. Heteroaryl polycyclic ring systems can include one or more heteroatoms in one or both rings. "Heteroaryl" includes ring systems wherein the heteroaryl ring, as defined above, is fused with one or more carbocyclyl or heterocyclyl groups wherein the point of attachment is on the heteroaryl ring, and in such instances, the number of ring members continue to designate the number of ring members in the heteroaryl ring system. "Heteroaryl" also includes ring systems wherein the heteroaryl ring, as defined above, is fused with one or more aryl groups wherein the point of attachment is either on the aryl or heteroaryl ring, and in such instances, the number of ring members designates the number of ring members in the fused polycyclic (aryl/heteroaryl) ring system. Polycyclic heteroaryl groups wherein one ring does not contain a heteroatom (e.g., indolyl, quinolinyl, carbazolyl, and the like) the point of attachment can be on either ring, i.e., either the ring bearing a heteroatom (e.g., 2-indolyl) or the ring that does not contain a heteroatom (e.g., 5-indolyl).

In certain embodiments, a heteroaryl group is a 5-10 membered aromatic ring system having ring carbon atoms and 1-4 ring heteroatoms provided in the aromatic ring system, wherein each heteroatom is independently selected from nitrogen, oxygen, and sulfur ("5-10 membered heteroaryl"). In certain embodiments, a heteroaryl group is a 5-8 membered aromatic ring system having ring carbon atoms and 1-4 ring heteroatoms provided in the aromatic ring system, wherein each heteroatom is independently selected from nitrogen, oxygen, and sulfur ("5-8 membered heteroaryl"). In certain embodiments, a heteroaryl group is a 5-6 membered aromatic ring system having ring carbon atoms and 1-4 ring heteroatoms provided in the aromatic ring system, wherein each heteroatom is independently selected from nitrogen, oxygen, and sulfur ("5-6 membered heteroaryl"). In certain embodiments, the 5-6 membered heteroaryl has 1-3 ring heteroatoms selected from nitrogen, oxygen, and sulfur. In certain embodiments, the 5-6 membered heteroaryl has 1-2 ring heteroatoms selected from nitrogen, oxygen, and sulfur. In certain embodiments, the 5-6 membered heteroaryl has 1 ring heteroatom selected from nitrogen, oxygen, and sulfur. Unless otherwise specified, each instance of a heteroaryl group is independently unsubstituted (an "unsubstituted heteroaryl") or substituted (a "substituted heteroaryl") with one or more substituents. In certain embodiments, the heteroaryl group is an unsubstituted 5-14 membered heteroaryl. In certain embodiments, the heteroaryl group is a substituted 5-14 membered heteroaryl.

Exemplary 5-membered heteroaryl groups containing 1 heteroatom include, without limitation, pyrrolyl, furanyl, and thiophenyl. Exemplary 5-membered heteroaryl groups containing 2 heteroatoms include, without limitation, imidazolyl, pyrazolyl, oxazolyl, isoxazolyl, thiazolyl, and isothiazolyl. Exemplary 5-membered heteroaryl groups containing 3 heteroatoms include, without limitation, triazolyl, oxadiazolyl, and thiadiazolyl. Exemplary 5-membered heteroaryl groups containing 4 heteroatoms include, without limitation, tetrazolyl. Exemplary 6-membered heteroaryl groups containing 1 heteroatom include, without limitation, pyridinyl. Exemplary 6-membered heteroaryl groups containing 2 heteroatoms include, without limitation, pyridazinyl, pyrimidinyl, and pyrazinyl. Exemplary 6-membered heteroaryl groups containing 3 or 4 heteroatoms include, without limitation, triazinyl and tetrazinyl, respectively. Exemplary 7-membered heteroaryl groups containing 1 heteroatom include, without limitation, azepinyl, oxepinyl, and thiepinyl. Exemplary 5,6-bicyclic heteroaryl groups include, without limitation, indolyl, isoindolyl, indazolyl, benzotriazolyl, benzothiophenyl, isobenzothiophenyl, benzofuranyl, benzoisofuranyl, benzimidazolyl, benzoxazolyl, benzisoxazolyl, benzoxadiazolyl, benzthiazolyl, benzisothiazolyl, benzthiadiazolyl, indolizinyl, and purinyl. Exemplary 6,6-bicyclic heteroaryl groups include, without limitation, naphthyridinyl, pteridinyl, quinolinyl, isoquinolinyl, cinnolinyl, quinoxalinyl, phthalazinyl, and quinazolinyl. Exemplary tricyclic heteroaryl groups include, without limitation, phenanthridinyl, dibenzofuranyl, carbazolyl, acridinyl, phenothiazinyl, phenoxazinyl and phenazinyl.

"Heteroaralkyl" is a subset of "alkyl" and refers to an alkyl group substituted by a heteroaryl group, wherein the point of attachment is on the alkyl moiety.

Affixing the suffix "-ene" to a group indicates the group is a divalent moiety, e.g., alkylene is the divalent moiety of alkyl, alkenylene is the divalent moiety of alkenyl, alkynylene is the divalent moiety of alkynyl, heteroalkylene is the divalent moiety of heteroalkyl, heteroalkenylene is the divalent moiety of heteroalkenyl, heteroalkynylene is the divalent moiety of heteroalkynyl, carbocyclylene is the divalent moiety of carbocyclyl, heterocyclylene is the divalent moiety of heterocyclyl, arylene is the divalent moiety of aryl, and heteroarylene is the divalent moiety of heteroaryl.

A group is optionally substituted unless expressly provided otherwise. The term "optionally substituted" refers to being substituted or unsubstituted. In certain embodiments, alkyl, alkenyl, alkynyl, heteroalkyl, heteroalkenyl, heteroalkynyl, carbocyclyl, heterocyclyl, aryl, and heteroaryl groups are optionally substituted. "Optionally substituted" refers to a group which may be substituted or unsubstituted (e.g., "substituted" or "unsubstituted" alkyl, "substituted" or "unsubstituted" alkenyl, "substituted" or "unsubstituted" alkynyl, "substituted" or "unsubstituted" heteroalkyl, "substituted" or "unsubstituted" heteroalkenyl, "substituted" or "unsubstituted" heteroalkynyl, "substituted" or "unsubstituted" carbocyclyl, "substituted" or "unsubstituted" heterocyclyl, "substituted" or "unsubstituted" aryl or "substituted" or "unsubstituted" heteroaryl group). In general, the term "substituted" means that at least one hydrogen present on a group is replaced with a permissible substituent, e.g., a substituent which upon substitution results in a stable compound, e.g., a compound which does not spontaneously undergo transformation such as by rearrangement, cyclization, elimination, or other reaction. Unless otherwise indicated, a "substituted" group has a substituent at one or more substitutable positions of the group, and when more than one position in any given structure is substituted, the substituent is either the same or different at each position. The term "substituted" is contemplated to include substitution with all permissible substituents of organic compounds, and includes any of the substituents described herein that results in the formation of a stable compound. The present invention contemplates any and all such combinations in order to arrive at a stable compound. For purposes of this invention, heteroatoms such as nitrogen may have hydrogen substituents and/or any suitable substituent as described herein which satisfy the valencies of the heteroatoms and results in the formation of a stable moiety. The invention is not intended to be limited in any manner by the exemplary substituents described herein.

Exemplary carbon atom substituents include, but are not limited to, halogen (halo), —CN, —NO$_2$, —N$_3$, —SO$_2$H, —SO$_3$H, —OH, —OR$^{aa}$, —ON(R$^{bb}$)$_2$, —N(R$^{bb}$)$_2$, —N(R$^{bb}$)$_3$$^+$X$^-$, —N(OR$^{cc}$)R$^{bb}$, —SH, —SR$^{aa}$, —SSR$^{cc}$, —C(=O)R$^{aa}$, —CO$_2$H, —CHO, —C(OR$^{cc}$)$_2$, —CO$_2$R$^{aa}$, —OC(=O)R$^{aa}$, —OCO$_2$R$^{aa}$, —C(=O)N(R$^{bb}$)$_2$, —OC(=O)N(R$^{bb}$)$_2$, —NR$^{bb}$C(=O)R$^{aa}$, —NR$^{bb}$CO$_2$R$^{aa}$, —NR$^{bb}$C(=O)N(R$^{bb}$)$_2$, —C(=NR$^{bb}$)R$^{aa}$, —C(=NR$^{bb}$)OR$^{aa}$, —OC(=NR$^{bb}$)R$^{aa}$, —OC(=NR$^{bb}$)OR$^{aa}$, —C(=NR$^{bb}$)N(R$^{bb}$)$_2$, —OC(=NR$^{bb}$)N(R$^{bb}$)$_2$, —NR$^{bb}$C(=NR$^{bb}$)N(R$^{bb}$)$_2$, —C(=O)NR$^{bb}$SO$_2$R$^{aa}$, —NR$^{bb}$SO$_2$R$^{aa}$, —SO$_2$N(R$^{bb}$)$_2$, —SO$_2$R$^{aa}$, —SO$_2$OR$^{aa}$, —OSO$_2$R$^{aa}$, —S(=O)R$^{aa}$, —OS(=O)R$^{aa}$, —Si(R$^{aa}$)$_3$, —OSi(R$^{aa}$)$_3$—C(=S)N(R$^{bb}$)$_2$, —C(=O)SR$^{aa}$, —C(=S)SR$^{aa}$, —SC(=S)SR$^{aa}$, —SC(=O)SR$^{aa}$, —OC(=O)SR$^{aa}$, —SC(=O)OR$^{aa}$, —SC(=O)R$^{aa}$, —P(=O)$_2$R$^{aa}$, —OP(=O)$_2$R$^{aa}$, —P(=O)(R$^{aa}$)$_2$, —OP(=O)(R$^{aa}$)$_2$, —OP(=O)(OR$^{cc}$)$_2$, —P(=O)$_2$N(R$^{bb}$)$_2$, —OP(=O)$_2$N(R$^{bb}$)$_2$, —P(=O)(NR$^{bb}$)$_2$, —OP(=O)(NR$^{bb}$)$_2$, —NR$^{bb}$P(=O)(OR$^{cc}$)$_2$, —NR$^{bb}$P(=O)(NR$^{bb}$)$_2$, —P(R$^{cc}$)$_2$, —P(R$^{cc}$)$_3$, —OP(R$^{cc}$)$_2$, —OP(R$^{cc}$)$_3$, —B(R$^{aa}$)$_2$, —B(OR$^{cc}$)$_2$, —BR$^{aa}$(OR$^{cc}$), C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$ alkynyl, C$_{3-10}$ carbocyclyl, 3-14 membered heterocyclyl, C$_{6-14}$ aryl, and 5-14 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

or two geminal hydrogens on a carbon atom are replaced with the group =O, =S, =NN(R$^{bb}$)$_2$, =NNR$^{bb}$C(=O)R$^{aa}$, =NNR$^{bb}$C(=O)OR$^{aa}$, =NNR$^{bb}$S(=O)$_2$R$^{aa}$, =NR$^{bb}$, or =NOR$^{cc}$;

each instance of R$^{aa}$ is, independently, selected from C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$ alkynyl, C$_{3-10}$ carbocyclyl, 3-14 membered heterocyclyl, C$_{6-14}$ aryl, and 5-14 membered heteroaryl, or two R$^{aa}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

each instance of R$^{bb}$ is, independently, selected from hydrogen, —OH, —OR$^{aa}$, —N(R$^{cc}$)$_2$, —CN, —C(=O)R$^{aa}$, —C(=O)N(R$^{cc}$)$_2$, —CO$_2$R$^{aa}$, —SO$_2$R$^{aa}$, —C(=NR$^{cc}$)OR$^{aa}$, —C(=NR$^{cc}$)N(R$^{cc}$)$_2$, —SO$_2$N(R$^{cc}$)$_2$, —SO$_2$R$^{cc}$, —SO$_2$OR$^{cc}$, —SOR$^{aa}$, —C(=S)N(R$^{cc}$)$_2$, —C(=O)SR$^{cc}$, —C(=S)SR$^{cc}$, —P(=O)$_2$R$^{aa}$, —P(=O)(R$^{aa}$)$_2$, —P(=O)$_2$N(R$^{cc}$)$_2$, —P(=O)(NR$^{cc}$)$_2$, C$_{1-10}$ alkyl, C$_{1-10}$ perhaloalkyl, C$_{2-10}$ alkenyl, C$_{2-10}$ alkynyl, heteroC$_{1-10}$alkyl, heteroC$_{2-10}$ alkenyl, heteroC$_{2-10}$alkynyl, C$_{3-10}$ carbocyclyl, 3-14 membered heterocyclyl, C$_{6-14}$ aryl, and 5-14 membered heteroaryl, or two R$^{bb}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

each instance of R$^{cc}$ is, independently, selected from hydrogen, C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$ alkynyl, C$_{3-10}$ carbocyclyl, 3-14 membered heterocyclyl, C$_{6-14}$ aryl, and 5-14 membered heteroaryl, or two R$^{cc}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

each instance of R$^{dd}$ is, independently, selected from halogen, —CN, —NO$_2$, —N$_3$, —SO$_2$H, —SO$_3$H, —OH, —OR$^{ee}$, —ON(R$^{ff}$)$_2$, —N(R$^{ff}$)$_2$, —N(R$^{ff}$)$_3$$^+$X$^-$, —N(OR$^{ee}$)R$^{ff}$, —SH, —SR$^{ee}$, —SSR$^{ee}$, —C(=O)R$^{ee}$, —CO$_2$H, —CO$_2$R$^{ee}$, —OC(=O)R$^{ee}$, —OCO$_2$R$^{ee}$, —C(=O)N(R$^{ff}$)$_2$, —OC(=O)N(R$_{ff}$)$_2$, —NR$^{ff}$C(=O)R$^{ee}$, —NR$^{ff}$CO$_2$R$^{ee}$, —NR$^{ff}$C(=O)N(R$^{ff}$)$_2$, —C(=NR$^{ff}$)OR$^{ee}$, —OC(=NR$^{ff}$)R$^{ee}$, —OC(=NR$^{ff}$)OR$^{ee}$, —C(=NR$^{ff}$)N(R$^{ff}$)$_2$, —OC(=NR$^{ff}$)N(R$^{ff}$)$_2$, —NR$^{ff}$C(=NR$^{ff}$)N(R$^{ff}$)$_2$, —NR$^{ff}$SO$_2$R$^{ee}$, —SO$_2$N(R$^{ff}$)$_2$, —SO$_2$R$^{ee}$, —SO$_2$OR$^{ee}$, —OSO$_2$R$^{ee}$, —S(=O)R$^{ee}$, —Si(R$^{ee}$)$_3$, —OSi(R$^{ee}$)$_3$, —C(=S)N(R$^{ff}$)$_2$, —C(=O)SR$^{ee}$, —C(=S)SR$^{ee}$, —SC(=S)SR$^{ee}$, —P(=O)$_2$R$^{ee}$, —P(=O)(R$^{ee}$)$_2$, —OP(=O)(R$^{ee}$)$_2$, —OP(=O)(OR$^{ee}$)$_2$, C$_{1-6}$ alkyl, C$_{1-6}$ perhaloalkyl, C$_{2-6}$ alkenyl, C$_{2-6}$ alkynyl, heteroC$_{1-6}$alkyl, heteroC$_{2-6}$alkenyl, heteroC$_{2-6}$alkynyl, C$_{3-10}$ carbocyclyl, 3-10 membered heterocyclyl, C$_{6-10}$ aryl, 5-10 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups, or two geminal R$^{dd}$ substituents can be joined to form =O or =S;

each instance of R$^{ee}$ is, independently, selected from C$_{1-6}$ alkyl, C$_{1-6}$ perhaloalkyl, C$_{2-6}$ alkenyl, C$_{2-6}$ alkynyl, heteroC$_{1-6}$ alkyl, heteroC$_{2-6}$alkenyl, heteroC$_{2-6}$ alkynyl, C$_{3-10}$ carbocyclyl, C$_{6-10}$ aryl, 3-10 membered heterocyclyl, and 3-10 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups;

each instance of R$^{ff}$ is, independently, selected from hydrogen, C$_{1-6}$ alkyl, C$_{1-6}$ perhaloalkyl, C$_{2-6}$ alkenyl, C$_{2-6}$ alkynyl, heteroC$_{1-6}$alkyl, heteroC$_{2-6}$alkenyl, heteroC$_{2-6}$alkynyl, C$_{3-10}$ carbocyclyl, 3-10 membered heterocyclyl, C$_{6-10}$ aryl and 5-10 membered heteroaryl, or two R$^{ff}$ groups are joined to form a 3-10 membered heterocyclyl or 5-10 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups; and each instance of R$^{gg}$ is, independently, halogen, —CN, —NO$_2$, —N$_3$, —SO$_2$H, —SO$_3$H, —OH, —OC$_{1-6}$ alkyl, —ON(C$_{1-6}$ alkyl)$_2$, —N(C$_{1-6}$ alkyl)$_2$, —N(C$_{1-6}$ alkyl)$_3$$^+$X$^-$, —NH(C$_{1-6}$ alkyl)$_2$$^+$X$^-$, —NH$_2$(C$_{1-6}$ alkyl)$^+$ X$^-$, —NH$_3$$^+$X$^-$, —N(OC$_{1-6}$ alkyl)(C$_{1-6}$ alkyl), —N(OH)(C$_{1-6}$ alkyl), —NH(OH), —SH, —SC$_{1-6}$ alkyl, —SS(C$_{1-6}$ alkyl), —C(=O)(C$_{1-6}$ alkyl), —CO$_2$H, —CO$_2$(C$_{1-6}$ alkyl), —OC(=O)(C$_{1-6}$ alkyl), —OCO$_2$(C$_{1-6}$ alkyl), —C(=O)NH$_2$, —C(=O)N(C$_{1-6}$ alkyl)$_2$, —OC(=O)NH(C$_{1-6}$ alkyl), —NHC(=O)(C$_{1-6}$ alkyl), —N(C$_{1-6}$ alkyl)C(=O)(C$_{1-6}$ alkyl), —NHCO$_2$(C$_{1-6}$ alkyl), —NHC(=O)N(C$_{1-6}$ alkyl)$_2$, —NHC(=O)NH(C$_{1-6}$ alkyl), —NHC(=O)NH$_2$, —C(=NH)O(C$_{1-6}$ alkyl), —OC(=NH)(C$_{1-6}$ alkyl), —OC(=NH)OC$_{1-6}$ alkyl, —C(=NH)N(C$_{1-6}$ alkyl)$_2$, —C(=NH)NH(C$_{1-6}$ alkyl), —C(=NH)NH$_2$, —OC(=NH)N(C$_{1-6}$ alkyl)$_2$, —OC(NH)NH(C$_{1-6}$ alkyl), —OC(NH)NH$_2$, —NHC(NH)N(C$_{1-6}$ alkyl)$_2$, —NHC(=NH)NH$_2$, —NHSO$_2$(C$_{1-6}$ alkyl), —SO$_2$N(C$_{1-6}$ alkyl)$_2$, —SO$_2$NH(C$_{1-6}$ alkyl), —SO$_2$NH$_2$, —SO$_2$C$_{1-6}$ alkyl, —SO$_2$OC$_{1-6}$ alkyl, —OSO$_2$C$_{1-6}$ alkyl, —SOC$_{1-6}$ alkyl, —Si(C$_{1-6}$ alkyl)$_3$, —OSi(C$_{1-6}$ alkyl)$_3$-C(=S)N(C$_{1-6}$ alkyl)$_2$, C(=S)NH(C$_{1-6}$ alkyl), C(=S)NH$_2$, —C(=Q)S(C$_{1-6}$ alkyl), —C(=S)SC$_{1-6}$ alkyl, —SC(=S)SC$_{1-6}$ alkyl, —P(=O)$_2$(C$_{1-6}$ alkyl), —P(=O)(C$_{1-6}$ alkyl)$_2$, —OP(=O)(C$_{1-6}$ alkyl)$_2$, —OP(=O)(OC$_{1-6}$ alkyl)$_2$, C$_{1-6}$ alkyl, C$_{1-6}$ perhaloalkyl, C$_{2-6}$ alkenyl, C$_{2-6}$ alkynyl, heteroC$_{1-6}$alkyl, heteroC$_{2-6}$alkenyl, heteroC$_{2-6}$alkynyl, C$_{3-10}$ carbocyclyl, C$_{6-10}$ aryl, 3-10 membered heterocyclyl, 5-10 membered heteroaryl; or two geminal R$^{gg}$ substituents can be joined to form =O or =S; wherein X$^-$ is a counterion.

The term "halo" or "halogen" refers to fluorine (fluoro, —F), chlorine (chloro, —Cl), bromine (bromo, —Br), or iodine (iodo, —I).

The term "hydroxyl" or "hydroxy" refers to the group —OH. The term "substituted hydroxyl" or "substituted hydroxyl," by extension, refers to a hydroxyl group wherein the oxygen atom directly attached to the parent molecule is substituted with a group other than hydrogen, and includes groups selected from —OR$^{aa}$, —ON(R$^{bb}$)$_2$, —OC(=O)SR$^{aa}$, —OC(=O)R$^{aa}$, —OCO$_2$R$^{aa}$, —OC(=O)N(R$^{bb}$)$_2$, —OC(=NR$^{bb}$)Ra, —OC(=NR$^{bb}$)OR$^{aa}$, —OC(=NR$^{bb}$)N(R$^{bb}$)$_2$, —OS(=O)R$^{aa}$, —OSO$_2$R$^{aa}$, —OSi(R$^{aa}$)$_3$, —OP(R$^{cc}$)$_2$, —OP(R$^{cc}$)$_3$, —OP(=O)$_2$R$^{aa}$, —OP(=O)(R$^{aa}$)$_2$, —OP(=O)(OR$^{cc}$)$_2$, —OP(=O)$_2$N(R$^{bb}$)$_2$, and —OP(=O)(NR$^{bb}$)$_2$, wherein R$^{aa}$, R$^{bb}$, and R$^{cc}$ are as defined herein.

The term "amino" refers to the group —NH$_2$. The term "substituted amino," by extension, refers to a monosubstituted amino, a disubstituted amino, or a trisubstituted amino. In certain embodiments, the "substituted amino" is a mono-substituted amino or a disubstituted amino group.

The term "monosubstituted amino" refers to an amino group wherein the nitrogen atom directly attached to the parent molecule is substituted with one hydrogen and one group other than hydrogen, and includes groups selected from —NH(R$^{bb}$), —NHC(=O)R$^{aa}$, —NHCO$_2$R$^{aa}$, —NHC(=O)N(R$^{bb}$)$_2$, —NHC(=NR$^{bb}$)N(R$^{bb}$)$_2$, —NHSO$_2$R$^{aa}$, —NHP(=O)(OR$^{cc}$)$_2$, and —NHP(=O)(NR$^{bb}$)$_2$, wherein R$^{aa}$, R$^{bb}$ and R$^{cc}$ are as defined herein, and wherein R$^{bb}$ of the group —NH(R$^{bb}$) is not hydrogen.

The term "disubstituted amino" refers to an amino group wherein the nitrogen atom directly attached to the parent molecule is substituted with two groups other than hydrogen, and includes groups selected from —N(R$^{bb}$)$_2$, —NR$^{bb}$C(=O)R$^{bb}$, —NR$^{bb}$CO$_2$R$^{aa}$, —NR$^{bb}$C(=O)N(R$^{bb}$)$_2$, —NR$^{bb}$C(=NR$^{bb}$)N(R$^{bb}$)$_2$, —NR$^{bb}$SO$_2$R$^{aa}$, —NR$^{bb}$P(=O)(OR$^{cc}$)$_2$, and —NR$^{bb}$P(=O)(NR$^{bb}$)$_2$, wherein R$^{aa}$, R$^{bb}$, and R$^{cc}$ are as defined herein, with the proviso that the nitrogen atom directly attached to the parent molecule is not substituted with hydrogen.

The term "trisubstituted amino" refers to an amino group wherein the nitrogen atom directly attached to the parent molecule is substituted with three groups, and includes groups selected from —N(R$^{bb}$)$_3$ and —N(R$^{bb}$)$_3$$^+$X$^-$ wherein R$^{bb}$ and X$^-$ are as defined herein.

The term "aminoalkyl" as used herein, refers to an amino group, as defined herein, appended to the parent molecular moiety through an alkyl group, as defined herein. "Substituted aminoalkyl" includes a monosubstituted amino, disubstituted amino, or trisubstituted amino group, as defined herein, appended to the parent molecular moiety through an alkyl group. The alkyl moiety of the group may be substituted or unsubstituted.

The term "sulfonyl" refers to a group selected from —SO$_2$N(R$^{bb}$)$_2$, —SO$_2$R$^{aa}$, and —SO$_2$OR$^{aa}$, wherein R$^{aa}$ and R$^{bb}$ are as defined herein.

The term "sulfinyl" refers to the group —S(=O)R$^{aa}$, wherein R$^{aa}$ is as defined herein.

The term "acyl" refers to a group having the general formula —C(=O)R$^{X1}$, —C(=O)OR$^{X1}$, —C(=O)—O—C(=O)R$^{X1}$, —C(=O)SR$^{X1}$, —C(=O)N(R$_x$)$_2$, —C(=S)R$^{X1}$, —C(=S)N(R$^{X1}$)$_2$, and —C(=S)S(R$^{X1}$), —C(=NR$^{X1}$)R$^{X1}$, —C(=NR$^{X1}$)OR$^{X1}$, —C(=NR$^{X1}$)SR$^{X1}$, and —C(=NR$^{X1}$)N(R$^{X1}$)$_2$, wherein R$^{X1}$ is hydrogen; halogen; substituted or unsubstituted hydroxyl; substituted or unsubstituted thiol; substituted or unsubstituted amino; substituted or unsubstituted acyl, cyclic or acyclic, substituted or unsubstituted, branched or unbranched aliphatic; cyclic or acyclic, substituted or unsubstituted, branched or unbranched heteroaliphatic; cyclic or acyclic, substituted or unsubstituted, branched or unbranched alkyl; cyclic or acyclic, substituted or unsubstituted, branched or unbranched alkenyl; substituted or unsubstituted alkynyl; substituted or unsubstituted aryl, substituted or unsubstituted heteroaryl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, mono- or di-aliphaticamino, mono- or di-heteroaliphaticamino, mono- or di-alkylamino, mono- or di-heteroalkylamino, mono- or di-arylamino, or mono- or di-heteroarylamino; or two R$^{X1}$ groups taken together form a 5- to 6-membered heterocyclic ring. Exemplary acyl groups include aldehydes (—CHO), carboxylic acids (—CO$_2$H), ketones, acyl halides, esters, amides, imines, carbonates, carbamates, and ureas. Acyl substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The term "silyl" refers to the group —Si(R$^{aa}$)$_3$, wherein R$^{aa}$ is as defined herein.

The term "oxo" refers to the group =O, and the term "thiooxo" refers to the group =S.

Nitrogen atoms can be substituted or unsubstituted as valency permits, and include primary, secondary, tertiary, and quaternary nitrogen atoms. Exemplary nitrogen atom substituents include, but are not limited to, hydrogen, —OH, —OR$^{aa}$, —N(R$^{cc}$)$_2$, —CN, —C(=O)R$^{aa}$, —C(=O)N(R$^{cc}$)$_2$, —CO$_2$R$^{aa}$, —SO$_2$R$^{aa}$, —C(=NR$^{bb}$)R$^{aa}$, —C(=NR$^{cc}$)OR$^{aa}$, —C(=NR$^{cc}$)N(R$^{cc}$)$_2$, —SO$_2$N(R$^{cc}$)$_2$, —SO$_2$R$^{cc}$, —SO$_2$OR$^{cc}$, —SOR$^{aa}$, —C(=S)N(R$^{cc}$)$_2$, —C(=O)SR$^{cc}$, —C(=S)SR$^{cc}$, —P(=O)$_2$R$^{aa}$, —P(=O)(R$^{aa}$)$_2$, —P(=O)$_2$N(R$^{cc}$)$_2$, —P(=O)(NR$^{cc}$)$_2$, C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$alkynyl, C$_{3-10}$ carbocyclyl, 3-14 membered heterocyclyl, C$_{6-14}$ aryl, and 5-14 membered heteroaryl, or two R$^{cc}$ groups attached to an N atom are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups, and wherein R$^{aa}$, R$^{bb}$, R$^{cc}$ and R$^{dd}$ are as defined above.

In certain embodiments, the substituent present on the nitrogen atom is a nitrogen protecting group (also referred to herein as an "amino protecting group"). Nitrogen protecting groups include, but are not limited to, —OH, —OR$^{aa}$, —N(R$^{cc}$)$_2$, —C(=O)R$^{aa}$, —C(=O)N(R$^{cc}$)$_2$, —CO$_2$R$^{aa}$, —SO$_2$R$^{aa}$, —C(=NR$^{cc}$)R$^{aa}$, —C(=NR$^{cc}$)OR$^{aa}$, —C(=NR$^{cc}$)N(R$^{cc}$)$_2$, —SO$_2$N(R$^{cc}$)$_2$, —SO$_2$R$^{cc}$, —SO$_2$OR$^{cc}$, —SOR$^{aa}$, —C(=S)N(R$^{cc}$)$_2$, —C(=O)SR$^{cc}$, —C(=S)SR$^{cc}$, C$_{1-10}$ alkyl (e.g., aralkyl, heteroaralkyl), C$_{2-10}$ alkenyl, C$_{2-10}$ alkynyl, heteroC$_{1-10}$ alkyl, heteroC$_{2-10}$ alkenyl, heteroC$_{2-10}$ alkynyl, C$_{3-10}$ carbocyclyl, 3-14 membered heterocyclyl, C$_{6-14}$ aryl, and 5-14 membered heteroaryl groups, wherein each alkyl, alkenyl, alkynyl, heteroalkyl, heteroalkenyl, heteroalkynyl, carbocyclyl, heterocyclyl, aralkyl, aryl, and heteroaryl is independently substituted with 0, 1, 2, 3, 4, or 5 R$^{dd}$ groups, and wherein R$^{aa}$, R$^{bb}$, R$^{cc}$ and R$^{dd}$ are as defined herein. Nitrogen protecting groups are well known in the art and include those described in detail in *Protecting Groups in Organic Synthesis*, T. W. Greene and P. G. M. Wuts, 3$^{rd}$ edition, John Wiley & Sons, 1999, incorporated herein by reference.

For example, nitrogen protecting groups such as amide groups (e.g., —C(=O)R$^{aa}$) include, but are not limited to, formamide, acetamide, chloroacetamide, trichloroacetamide, trifluoroacetamide, phenylacetamide, 3-phenylpropanamide, picolinamide, 3-pyridylcarboxamide, N-benzoylphenylalanyl derivative, benzamide, p-phenylbenzamide, o-nitophenylacetamide, o-nitrophenoxyacetamide, acetoacetamide, (N'-dithiobenzyloxyacylamino)acetamide, 3-(p-hydroxyphenyl)propanamide, 3-(o-nitrophenyl)propanamide, 2-methyl-2-(o-nitrophenoxy)propanamide, 2-methyl-2-(o-phenylazophenoxy)propanamide. 4-chlorobutanamide, 3-methyl-3-nitrobutanamide, o-nitrocinnamide, N-acetylmethionine derivative, o-nitrobenzamide and o-(benzoyloxymethyl)benzamide.

Nitrogen protecting groups such as carbamate groups (e.g., —C(=O)OR$^{aa}$) include, but are not limited to, methyl carbamate, ethyl carbamate, 9-fluorenylmethyl carbamate (Fmoc), 9-(2-sulfo)fluorenylmethyl carbamate, 9-(2,7-dibromo)fluoroenylmethyl carbamate, 2,7-di-t-butyl-[9-(10,10-dioxo-10,10,10,10-tetrahydrothioxanthyl)]methyl carbamate (DBD-Tmoc), 4-methoxyphenacyl carbamate (Phenoc), 2,2,2-trichloroethyl carbamate (Troc), 2-trimethylsilylethyl carbamate (Teoc), 2-phenylethyl carbamate (hZ), 1-(1-adamantyl)-1-methylethyl carbamate (Adpoc), 1,1-dimethyl-2-haloethyl carbamate, 1,1-dimethyl-2,2-dibromoethyl carbamate (DB-t-BOC), 1,1-dimethyl-2,2,2-trichloroethyl carbamate (TCBOC), 1-methyl-1-(4-biphenylyl)ethyl carbamate (Bpoc), 1-(3,5-di-t-butylphenyl)-1-methylethyl carbamate (t-Bumeoc), 2-(2'- and 4'-pyridyl)ethyl carbamate (Pyoc), 2-(N,N-dicyclohexylcarboxamido) ethyl carbamate, t-butyl carbamate (BOC or Boc), 1-adamantyl carbamate (Adoc), vinyl carbamate (Voc), allyl carbamate (Alloc), 1-isopropylallyl carbamate (Ipaoc), cinnamyl carbamate (Coc), 4-nitrocinnamyl carbamate (Noc), 8-quinolyl carbamate, N-hydroxypiperidinyl carbamate, alkyldithio carbamate, benzyl carbamate (Cbz), p-methoxybenzyl carbamate (Moz), p-nitobenzyl carbamate, p-bromobenzyl carbamate, p-chlorobenzyl carbamate, 2,4-dichlorobenzyl carbamate, 4-methylsulfinylbenzyl carbamate (Msz), 9-anthrylmethyl carbamate, diphenylmethyl carbamate, 2-methylthioethyl carbamate, 2-methylsulfonylethyl carbamate, 2-(p-toluenesulfonyl)ethyl carbamate, [2-(1,3-dithianyl)]methyl carbamate (Dmoc), 4-methylthiophenyl carbamate (Mtpc), 2,4-dimethylthiophenyl carbamate (Bmpc), 2-phosphonioethyl carbamate (Peoc), 2-triphenylphosphonioisopropyl carbamate (Ppoc), 1,1-dimethyl-2-cyanoethyl carbamate, m-chloro-p-acyloxybenzyl carbamate, p-(dihydroxyboryl)benzyl carbamate, 5-benzisoxazolylmethyl carbamate, 2-(trifluoromethyl)-6-chromonylmethyl carbamate (Tcroc), m-nitrophenyl carbamate, 3,5-dimethoxybenzyl carbamate, o-nitrobenzyl carbamate, 3,4-dimethoxy-6-nitrobenzyl carbamate, phenyl(o-nitrophenyl)methyl carbamate, t-amyl carbamate, S-benzyl thiocarbamate, p-cyanobenzyl carbamate, cyclobutyl carbamate, cyclohexyl carbamate, cyclopentyl carbamate, cyclopropylmethyl carbamate, p-decyloxybenzyl carbamate, 2,2-dimethoxyacylvinyl carbamate, o-(N,N-dimethylcarboxamido)benzyl carbamate, 1,1-dimethyl-3-(N,N-dimethylcarboxamido)propyl carbamate, 1,1-dimethylpropynyl carbamate, di(2-pyridyl)methyl carbamate, 2-furanylmethyl carbamate, 2-iodoethyl carbamate, isobornyl carbamate, isobutyl carbamate, isonicotinyl carbamate, p-(p'-methoxyphenylazo)benzyl carbamate, 1-methylcyclobutyl carbamate, 1-methylcyclohexyl carbamate, 1-methyl-1-cyclopropylmethyl carbamate, 1-methyl-1-(3,5-dimethoxyphenyl)ethyl carbamate, 1-methyl-1-(p-phenylazophenyl)ethyl carbamate, 1-methyl-1-phenylethyl carbamate, 1-methyl-1-(4-pyridyl)ethyl carbamate, phenyl carbamate, p-(phenylazo) benzyl carbamate, 2,4,6-tri-t-butylphenyl carbamate, 4-(trimethylammonium)benzyl carbamate, and 2,4,6-trimethylbenzyl carbamate.

Nitrogen protecting groups such as sulfonamide groups (e.g., —S(=O)$_2$R$^{aa}$) include, but are not limited to, p-toluenesulfonamide (Ts), benzenesulfonamide, 2,3,6-trimethyl-4-methoxybenzenesulfonamide (Mtr), 2,4,6-trimethoxybenzenesulfonamide (Mtb), 2,6-dimethyl-4-methoxybenzenesulfonamide (Pme), 2,3,5,6-tetramethyl-4-methoxybenzenesulfonamide (Mte), 4-methoxybenzenesulfonamide (Mbs), 2,4,6-trimethylbenzenesulfonamide (Mts), 2,6-dimethoxy-4-methylbenzenesulfonamide (iMds), 2,2,5,7,8-pentamethylchroman-6-sulfonamide (Pmc), methanesulfonamide (Ms), β-trimethylsilylethanesulfonamide (SES), 9-anthracenesulfonamide, 4-(4',8'-dimethoxynaphthylmethyl)benzenesulfonamide (DNMBS), benzylsulfonamide, trifluoromethylsulfonamide, and phenacylsulfonamide.

Other nitrogen protecting groups include, but are not limited to, phenothiazinyl-(10)-acyl derivative, N'-p-toluenesulfonylaminoacyl derivative, N'-phenylaminothioacyl derivative, N-benzoylphenylalanyl derivative, N-acetylmethionine derivative, 4,5-diphenyl-3-oxazolin-2-one, N-phthalimide, N-dithiasuccinimide (Dts), N-2,3-diphenylmaleimide, N-2,5-dimethylpyrrole, N-1,1,4,4-tetramethyldisilylazacyclopentane adduct (STABASE), 5-substituted 1,3-dimethyl-1,3,5-triazacyclohexan-2-one, 5-substituted 1,3-dibenzyl-1,3,5-triazacyclohexan-2-one, 1-substituted 3,5-dinitro-4-pyridone, N-methylamine, N-allylamine, N-[2-(trimethylsilyl)ethoxy]methylamine (SEM), N-3-acetoxypropylamine, N-(1-isopropyl-4-nitro-2-oxo-3-pyroolin-3-yl)amine, quaternary ammonium salts, N-benzylamine, N-di(4-methoxyphenyl)methylamine, N-5-dibenzosuberylamine, N-triphenylmethylamine (Tr), N-[(4-methoxyphenyl)diphenylmethyl]amine (MMTr), N-9-phenylfluorenylamine (PhF), N-2,7-dichloro-9-fluorenylmethyleneamine, N-ferrocenylmethylamino (Fcm), N-2-picolylamino N'-oxide, N-1,1-dimethylthiomethyleneamine, N-benzylideneamine, N-p-methoxybenzylideneamine, N-diphenylmethyleneamine, N-[(2-pyridyl)mesityl]methyleneamine, N—(N',N'-dimethylaminomethylene)amine, N,N'-isopropylidenediamine, N-p-nitrobenzylideneamine, N-salicylideneamine, N-5-chlorosalicylideneamine, N-(5-chloro-2-hydroxyphenyl)phenylmethyleneamine, N-cyclohexylideneamine, N-(5,5-dimethyl-3-oxo-1-cyclohexenyl)amine, N-borane derivative, N-diphenylborinic acid derivative, N-[phenyl(pentaacylchromium- or tungsten)acyl]amine, N-copper chelate, N-zinc chelate, N-nitroamine, N-nitrosoamine, amine N-oxide, diphenylphosphinamide (Dpp), dimethylthiophosphinamide (Mpt), diphenylthiophosphinamide (Ppt), dialkyl phosphoramidates, dibenzyl phosphoramidate, diphenyl phosphoramidate, benzenesulfenamide, o-nitrobenzenesulfenamide (Nps), 2,4-dinitrobenzenesulfenamide, pentachlorobenzenesulfenamide, 2-nitro-4-methoxybenzenesulfenamide, triphenylmethylsulfenamide, and 3-nitropyridinesulfenamide (Npys).

In certain embodiments, the substituent present on an oxygen atom is an oxygen protecting group (also referred to herein as an "hydroxyl protecting group"). Oxygen protecting groups include, but are not limited to, —$R^{aa}$, —$N(R^{bb})_2$, —$C(=O)SR^{aa}$, —$C(=O)R^{aa}$, —$CO_2R^{aa}$, —$C(=O)N(R^{bb})_2$, —$C(=NR^{bb})R^{aa}$, —$C(=NR^{bb})OR^{aa}$, —$C(=NR^{bb})N(R^{bb})_2$, —$S(=O)R^{aa}$, —$SO_2R^{aa}$, —$Si(R^{aa})_3$, —$P(R^{cc})_2$, —$P(R^{cc})_3$, —$P(=O)_2R^{aa}$, —$P(=O)(R^{aa})_2$, —$P(=O)(OR^{cc})_2$, —$P(=O)_2N(R^{bb})_2$, and —$P(=O)(NR^{bb})_2$, wherein $R^{aa}$, $R^{bb}$, and $R^{cc}$ are as defined herein. Oxygen protecting groups are well known in the art and include those described in detail in *Protecting Groups in Organic Synthesis*, T. W. Greene and P. G. M. Wuts, $3^{rd}$ edition, John Wiley & Sons, 1999, incorporated herein by reference.

Exemplary oxygen protecting groups include, but are not limited to, methyl, methoxylmethyl (MOM), methylthiomethyl (MTM), t-butylthiomethyl, (phenyldimethylsilyl)methoxymethyl (SMOM), benzyloxymethyl (BOM), p-methoxybenzyloxymethyl (PMBM), (4-methoxyphenoxy)methyl (p-AOM), guaiacolmethyl (GUM), t-butoxymethyl, 4-pentenyloxymethyl (POM), siloxymethyl, 2-methoxyethoxymethyl (MEM), 2,2,2-trichloroethoxymethyl, bis(2-chloroethoxy)methyl, 2-(trimethylsilyl)ethoxymethyl (SEMOR), tetrahydropyranyl (THP), 3-bromotetrahydropyranyl, tetrahydrothiopyranyl, 1-methoxycyclohexyl, 4-methoxytetrahydropyranyl (MTHP), 4-methoxytetrahydrothiopyranyl, 4-methoxytetrahydrothiopyranyl S,S-dioxide, 1-[(2-chloro-4-methyl)phenyl]-4-methoxypiperidin-4-yl (CTMP), 1,4-dioxan-2-yl, tetrahydrofuranyl, tetrahydrothiofuranyl, 2,3,3a, 4,5,6,7,7a-octahydro-7,8,8-trimethyl-4,7-methanobenzofuran-2-yl, 1-ethoxyethyl, 1-(2-chloroethoxy)ethyl, 1-methyl-1-methoxyethyl, 1-methyl-1-benzyloxyethyl, 1-methyl-1-benzyloxy-2-fluoroethyl, 2,2,2-trichloroethyl, 2-trimethylsilylethyl, 2-(phenylselenyl)ethyl, t-butyl, allyl, p-chlorophenyl, p-methoxyphenyl, 2,4-dinitrophenyl, benzyl (Bn), p-methoxybenzyl, 3,4-dimethoxybenzyl, o-nitrobenzyl, p-nitrobenzyl, p-halobenzyl, 2,6-dichlorobenzyl, p-cyanobenzyl, p-phenylbenzyl, 2-picolyl, 4-picolyl, 3-methyl-2-picolyl N-oxido, diphenylmethyl, p,p'-dinitrobenzhydryl, 5-dibenzosuberyl, triphenylmethyl, α-naphthyldiphenylmethyl, p-methoxyphenyldiphenylmethyl, di(p-methoxyphenyl)phenylmethyl, tri(p-methoxyphenyl)methyl, 4-(4'-bromophenacyloxyphenyl)diphenylmethyl, 4,4',4"-tris(4,5-dichlorophthalimidophenyl)methyl, 4,4',4"-tris(levulinoyloxyphenyl)methyl, 4,4',4"-tris(benzoyloxyphenyl)methyl, 3-(imidazol-1-yl)bis(4',4"-dimethoxyphenyl)methyl, 1,1-bis(4-methoxyphenyl)-1'-pyrenylmethyl, 9-anthryl, 9-(9-phenyl)xanthenyl, 9-(9-phenyl-10-oxo)anthryl, 1,3-benzodithiolan-2-yl, benzisothiazolyl S,S-dioxido, trimethylsilyl (TMS), triethylsilyl (TES), triisopropylsilyl (TIPS), dimethylisopropylsilyl (IPDMS), diethylisopropylsilyl (DEIPS), dimethylthexylsilyl, t-butyldimethylsilyl (TBDMS), t-butyldiphenylsilyl (TBDPS), tribenzylsilyl, tri-p-xylylsilyl, triphenylsilyl, diphenylmethylsilyl (DPMS), t-butylmethdxyphenylsilyl (TBMPS), formate, benzoylformate, acetate, chloroacetate, dichloroacetate, trichloroacetate, trifluoroacetate, methoxyacetate, triphenylmethoxyacetate, phenoxyacetate, p-chlorophenoxyacetate, 3-phenylpropionate, 4-oxopentanoate (levulinate), 4,4-(ethylenedithio)pentanoate (levulinoyldithioacetal), pivaloate, adamantoate, crotonate, 4-methoxycrotonate, benzoate, p-phenylbenzoate, 2,4,6-trimethylbenzoate (mesitoate), methyl carbonate, 9-fluorenylmethyl carbonate (Fmoc), ethyl carbonate, 2,2,2-trichloroethyl carbonate (Troc), 2-(trimethylsilyl)ethyl carbonate (TMSEC), 2-(phenylsulfonyl) ethyl carbonate (Psec), 2-(triphenylphosphonio) ethyl carbonate (Peoc), isobutyl carbonate, vinyl carbonate, allyl carbonate, t-butyl carbonate (BOC or Boc), p-nitrophenyl carbonate, benzyl carbonate, p-methoxybenzyl carbonate, 3,4-dimethoxybenzyl carbonate, o-nitrobenzyl carbonate, p-nitrobenzyl carbonate, S-benzyl thiocarbonate, 4-ethoxy-1-napththyl carbonate, methyl dithiocarbonate, 2-iodobenzoate, 4-azidobutyrate, 4-nitro-4-methylpentanoate, o-(dibromomethyl)benzoate, 2-formylbenzenesulfonate, 2-(methylthiomethoxy)ethyl, 4-(methylthiomethoxy)butyrate, 2-(methylthiomethoxymethyl)benzoate, 2,6-dichloro-4-methylphenoxyacetate, 2,6-dichloro-4-(1,1,3,3-tetramethylbutyl)phenoxyacetate, 2,4-bis(1,1-dimethylpropyl)phenoxyacetate, chlorodiphenylacetate, isobutyrate, monosuccinoate, (E)-2-methyl-2-butenoate, o-(methoxyacyl)benzoate, α-naphthoate, nitrate, alkyl N,N,N',N'-tetramethylphosphorodiamidate, alkyl N-phenylcarbamate, borate, dimethylphosphinothioyl, alkyl 2,4-dinitrophenylsulfenate, sulfate, methanesulfonate (mesylate), benzylsulfonate, and tosylate (Ts).

In certain embodiments, the substituent present on a sulfur atom is a sulfur protecting group (also referred to as a "thiol protecting group"). Sulfur protecting groups include, but are not limited to, —$R^{aa}$, —$N(R^{bb})_2$, —$C(=O)SR^{aa}$, —$C(=O)R^{aa}$, —$CO_2R^{aa}$, —$C(=O)N(R^{bb})_2$, —$C(=NR^{bb})R^{aa}$, —$C(=NR^{bb})OR^{aa}$, —$C(=NR^{bb})N(R^{bb})_2$, —$S(=O)R^{aa}$, —$SO_2R^{aa}$, —$Si(R^{aa})_3$, —$P(R^{cc})_2$, —$P(R^{cc})_3$, —$P(=O)_2R^{aa}$, —$P(=O)(R^{aa})_2$, —$P(=O)(OR^{cc})_2$, —$P(=O)_2N(R^{bb})_2$, and —$P(=O)(NR^{bb})_2$, wherein $R^{aa}$, $R^{bb}$, and $R^{cc}$ are as defined herein. Sulfur protecting groups are well known in the art and include those described in detail in *Protecting Groups in Organic Synthesis*, T. W. Greene and P. G. M. Wuts, $3^{rd}$ edition, John Wiley & Sons, 1999, incorporated herein by reference.

As used herein, a "leaving group" (LG) is an art-understood term referring to a molecular fragment that departs with a pair of electrons in heterolytic bond cleavage, wherein the molecular fragment is an anion or neutral molecule. As used herein, a leaving group can be an atom or a group capable of being displaced by a nucleophile. See, for example, Smith, *March Advanced Organic Chemistry* 6th ed. (501-502). Exemplary leaving groups include, but are not limited to, halo (e.g., chloro, bromo, iodo), —$OR^{aa}$ (when the O atom is attached to a carbonyl group, wherein $R^{aa}$ is as defined herein), —$O(C=O)R^{LG}$, or —$O(SO)_2R^{LG}$ (e.g., tosyl, mesyl, besyl), wherein $R^{LG}$ is optionally substituted alkyl, optionally substituted aryl, or optionally substituted heteroaryl. In certain embodiments, the leaving group is a halogen. In certain embodiments, the leaving group is 1.

As used herein, use of the phrase "at least one instance" refers to 1, 2, 3, 4, or more instances, but also encompasses a range, e.g., for example, from 1 to 4, from 1 to 3, from 1 to 2, from 2 to 4, from 2 to 3, or from 3 to 4 instances, inclusive.

A "non-hydrogen group" refers to any group that is defined for a particular variable that is not hydrogen.

The term "carbohydrate" or "saccharide" refers to an aldehydic or ketonic derivative of polyhydric alcohols. Carbohydrates include compounds with relatively small molecules (e.g., sugars) as well as macromolecular or polymeric substances (e.g., starch, glycogen, and cellulose polysaccharides). The term "sugar" refers to monosaccharides, disaccharides, or polysaccharides. Monosaccharides are the simplest carbohydrates in that they cannot be hydrolyzed to smaller carbohydrates. Most monosaccharides can be represented by the general formula $C_yH_{2y}O_y$ (e.g., $C_6H_{12}O_6$ (a hexose such as glucose)), wherein y is an integer equal to or greater than 3. Certain polyhydric alcohols not represented by the general formula described above may also be considered monosaccharides. For example, deoxyribose is of the formula $C_5H_{10}O_4$ and is a monosaccharide. Monosaccharides usually consist of five or six carbon atoms and are referred to as pentoses and hexoses, receptively. If the monosaccharide contains an aldehyde it is referred to as an aldose; and if it contains a ketone, it is referred to as a ketose. Monosaccharides may also consist of three, four, or seven carbon atoms in an aldose or ketose form and are referred to as trioses, tetroses, and heptoses, respectively. Glyceraldehyde and dihydroxyacetone are considered to be aldotriose and ketotriose sugars, respectively. Examples of aldotetrose sugars include erythrose and threose; and ketotetrose sugars include erythrulose. Aldopentose sugars include ribose, arabinose, xylose, and lyxose; and ketopentose sugars include ribulose, arabulose, xylulose, and lyxulose. Examples of aldohexose sugars include glucose (for example, dextrose), mannose, galactose, allose, altrose, talose, gulose, and idose; and ketohexose sugars include fructose, psicose, sorbose, and tagatose. Ketoheptose sugars include sedoheptulose. Each carbon atom of a monosaccharide bearing a hydroxyl group (—OH), with the exception of the first and last carbons, is asymmetric, making the carbon atom a stereocenter with two possible configurations (R or S). Because of this asymmetry, a number of isomers may exist for any given monosaccharide formula. The aldohexose D-glucose, for example, has the formula $C_6H_{12}O_6$, of which all but two of its six carbons atoms are stereogenic, making D-glucose one of the 16 (i.e., $2^4$) possible stereoisomers. The assignment of D or L is made according to the orientation of the asymmetric carbon furthest from the carbonyl group: in a standard Fischer projection if the hydroxyl group is on the right the molecule is a D sugar, otherwise it is an L sugar. The aldehyde or ketone group of a straight-chain monosaccharide will react reversibly with a hydroxyl group on a different carbon atom to form a hemiacetal or hemiketal, forming a heterocyclic ring with an oxygen bridge between two carbon atoms. Rings with five and six atoms are called furanose and pyranose forms, respectively, and exist in equilibrium with the straight-chain form. During the conversion from the straight-chain form to the cyclic form, the carbon atom containing the carbonyl oxygen, called the anomeric carbon, becomes a stereogenic center with two possible configurations: the oxygen atom may take a position either above or below the plane of the ring. The resulting possible pair of stereoisomers is called anomers. In an a anomer, the —OH substituent on the anomeric carbon rests on the opposite side (trans) of the ring from the —$CH_2OH$ side branch. The alternative form, in which the —$CH_2OH$ substituent and the anomeric hydroxyl are on the same side (cis) of the plane of the ring, is called a β anomer. A carbohydrate including two or more joined monosaccharide units is called a disaccharide or polysaccharide (e.g., a trisaccharide), respectively. The two or more monosaccharide units bound together by a covalent bond known as a glycosidic linkage formed via a dehydration reaction, resulting in the loss of a hydrogen atom from one monosaccharide and a hydroxyl group from another. Exemplary disaccharides include sucrose, lactulose, lactose, maltose, isomaltose, trehalose, cellobiose, xylobiose, laminaribiose, gentiobiose, mannobiose, melibiose, nigerose, or rutinose. Exemplary trisaccharides include, but are not limited to, isomaltotriose, nigerotriose, maltotriose, melezitose, maltotriulose, raffinose, and kestose. The term carbohydrate also includes other natural or synthetic stereoisomers of the carbohydrates described herein.

These and other exemplary substituents are described in more detail in the Detailed Description, Examples, and claims. The invention is not intended to be limited in any manner by the above exemplary listing of substituents.

Other Definitions

As used herein, the term "salt" refers to any and all salts, and encompasses pharmaceutically acceptable salts.

The term "pharmaceutically acceptable salt" refers to those salts which are, within the scope of sound medical judgment, suitable for use in contact with the tissues of humans and lower animals without undue toxicity, irritation, allergic response, and the like, and are commensurate with a reasonable benefit/risk ratio. Pharmaceutically acceptable salts are well known in the art. For example, Berge et al. describe pharmaceutically acceptable salts in detail in *J. Pharmaceutical Sciences*, 1977, 66, 1-19, incorporated herein by reference. Pharmaceutically acceptable salts of the compounds of this invention include those derived from suitable inorganic and organic acids and bases. Examples of pharmaceutically acceptable, nontoxic acid addition salts are salts of an amino group formed with inorganic acids, such as hydrochloric acid, hydrobromic acid, phosphoric acid, sulfuric acid, and perchloric acid or with organic acids, such as acetic acid, oxalic acid, maleic acid, tartaric acid, citric acid, succinic acid, or malonic acid or by using other methods known in the art such as ion exchange. Other pharmaceutically acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. Salts derived from appropriate bases include alkali metal, alkaline earth metal, ammonium, and $N^+(C_{1-4}$ alkyl$)_4^-$ salts. Representative alkali or alkaline earth metal salts include sodium, lithium, potassium, calcium, magnesium, and the like. Further pharmaceutically acceptable salts include, when appropriate, nontoxic ammonium, quaternary ammonium, and amine cations formed using counterions such as halide, hydroxide, carboxylate, sulfate, phosphate, nitrate, lower alkyl sulfonate, and aryl sulfonate.

The term "solvate" refers to forms of the compound, or a salt thereof, that are associated with a solvent, usually by a solvolysis reaction. This physical association may include hydrogen bonding. Conventional solvents include water, methanol, ethanol, acetic acid, DMSO, THF, diethyl ether, and the like. The compounds described herein may be prepared, e.g., in crystalline form, and may be solvated. Suitable solvates include pharmaceutically acceptable solvates and further include both stoichiometric solvates and non-stoichiometric solvates. In certain instances, the solvate will be capable of isolation, for example, when one or more solvent molecules are incorporated in the crystal lattice of a crystalline solid. "Solvate" encompasses both solution-phase and isolatable solvates. Representative solvates include hydrates, ethanolates, and methanolates.

The term "hydrate" refers to a compound that is associated with water. Typically, the number of the water molecules contained in a hydrate of a compound is in a definite ratio to the number of the compound molecules in the hydrate. Therefore, a hydrate of a compound may be represented, for example, by the general formula R·x H$_2$O, wherein R is the compound, and x is a number greater than 0. A given compound may form more than one type of hydrate, including, e.g., monohydrates (x is 1), lower hydrates (x is a number greater than 0 and smaller than 1, e.g., hemihydrates (R·0.5 H$_2$O)), and polyhydrates (x is a number greater than 1, e.g., dihydrates (R·2H$_2$O) and hexahydrates (R·6H$_2$O)).

The term "tautomers" or "tautomeric" refers to two or more interconvertible compounds resulting from at least one formal migration of a hydrogen atom and at least one change in valency (e.g., a single bond to a double bond, a triple bond to a single bond, or vice versa). The exact ratio of the tautomers depends on several factors, including temperature, solvent, and pH. Tautomerizations (i.e., the reaction providing a tautomeric pair) may catalyzed by acid or base. Exemplary tautomerizations include keto-to-enol, amide-to-imide, lactam-to-lactim, enamine-to-imine, and enamine-to-(a different enamine) tautomerizations.

It is also to be understood that compounds that have the same molecular formula but differ in the nature or sequence of bonding of their atoms or the arrangement of their atoms in space are termed "isomers". Isomers that differ in the arrangement of their atoms in space are termed "stereoisomers".

Stereoisomers that are not mirror images of one another are termed "diastereomers" and those that are non-superimposable mirror images of each other are termed "enantiomers". When a compound has an asymmetric center, for example, it is bonded to four different groups, a pair of enantiomers is possible. An enantiomer can be characterized by the absolute configuration of its asymmetric center and is described by the R- and S-sequencing rules of Cahn and Prelog, or by the manner in which the molecule rotates the plane of polarized light and designated as dextrorotatory or levorotatory (i.e., as (+) or (−)-isomers respectively). A chiral compound can exist as either individual enantiomer or as a mixture thereof. A mixture containing equal proportions of the enantiomers is called a "racemic mixture".

The term "polymorph" refers to a crystalline form of a compound (or a salt, hydrate, or solvate thereof). All polymorphs have the same elemental composition. Different crystalline forms usually have different X-ray diffraction patterns, infrared spectra, melting points, density, hardness, crystal shape, optical and electrical properties, stability, and solubility. Recrystallization solvent, rate of crystallization, storage temperature, and other factors may cause one crystal form to dominate. Various polymorphs of a compound can be prepared by crystallization under different conditions.

The term "prodrugs" refers to compounds that have cleavable groups and become by solvolysis or under physiological conditions the compounds described herein, which are pharmaceutically active in vivo. Such examples include, but are not limited to, choline ester derivatives and the like, N-alkylmorpholine esters and the like. Other derivatives of the compounds described herein have activity in both their acid and acid derivative forms, but in the acid sensitive form often offer advantages of solubility, tissue compatibility, or delayed release in the mammalian organism (see, Bundgard, H., *Design of Prodrugs*, pp. 7-9, 21-24, Elsevier, Amsterdam 1985). Prodrugs include acid derivatives well known to practitioners of the art, such as, for example, esters prepared by reaction of the parent acid with a suitable alcohol, or amides prepared by reaction of the parent acid compound with a substituted or unsubstituted amine, or acid anhydrides, or mixed anhydrides. Simple aliphatic or aromatic esters, amides, and anhydrides derived from acidic groups pendant on the compounds described herein are particular prodrugs. In some cases it is desirable to prepare double ester type prodrugs such as (acyloxy)alkyl esters or ((alkoxycarbonyl)oxy)alkylesters. $C_{1-8}$ alkyl, $C_{2-8}$ alkenyl, $C_{2-8}$ alkynyl, aryl, $C_{7-12}$ substituted aryl, and $C_7$-$C_{12}$ arylalkyl esters of the compounds described herein may be preferred.

The terms "composition" and "formulation" are used interchangeably.

A "subject" to which administration is contemplated refers to a human (i.e., male or female of any age group, e.g., pediatric subject (e.g., infant, child, or adolescent) or adult subject (e.g., young adult, middle-aged adult, or senior adult)) or non-human animal. In certain embodiments, the non-human animal is a mammal (e.g., primate (e.g., cynomolgus monkey or rhesus monkey), commercially relevant mammal (e.g., cattle, pig, horse, sheep, goat, cat, or dog), or bird (e.g., commercially relevant bird, such as chicken, duck, goose, or turkey)). In certain embodiments, the non-human animal is a fish, reptile, or amphibian. The non-human animal may be a male or female at any stage of development. The non-human animal may be a transgenic animal or genetically engineered animal "Disease," "disorder," and "condition" are used interchangeably herein.

The term "administer," "administering," or "administration" refers to implanting, absorbing, ingesting, injecting, inhaling, or otherwise introducing a compound described herein, or a composition thereof, in or on a subject.

As used herein, and unless otherwise specified, the terms "treat," "treating" and "treatment" contemplate an action that occurs while a subject is suffering from the specified infectious disease or inflammatory condition, which reduces the severity of the infectious disease or inflammatory condition, or retards or slows the progression of the infectious disease or inflammatory condition ("therapeutic treatment"), and also contemplates an action that occurs before a subject begins to suffer from the specified infectious disease or inflammatory condition ("prophylactic treatment").

In general, the "effective amount" of a compound refers to an amount sufficient to elicit the desired biological response. As will be appreciated by those of ordinary skill in this art, the effective amount of a compound of the invention may vary depending on such factors as the desired biological endpoint, the pharmacokinetics of the compound, the disease being treated, the mode of administration, and the age, health, and condition of the subject. An effective amount encompasses therapeutic and prophylactic treatment.

As used herein, and unless otherwise specified, a "therapeutically effective amount" of a compound is an amount sufficient to provide a therapeutic benefit in the treatment of an infectious disease or inflammatory condition, or to delay or minimize one or more symptoms associated with the infectious disease or inflammatory condition. A therapeutically effective amount of a compound means an amount of therapeutic agent, alone or in combination with other therapies, which provides a therapeutic benefit in the treatment of the infectious disease or inflammatory condition. The term "therapeutically effective amount" can encompass an amount that improves overall therapy, reduces or avoids symptoms or causes of infectious disease or inflammatory condition, or enhances the therapeutic efficacy of another therapeutic agent.

As used herein, and unless otherwise specified, a "prophylactically effective amount" of a compound is an amount sufficient to prevent an infectious disease or inflammatory condition, or one or more symptoms associated with the infectious disease or inflammatory condition, or prevent its recurrence. A prophylactically effective amount of a compound means an amount of a therapeutic agent, alone or in combination with other agents, which provides a prophylactic benefit in the prevention of the infectious disease or inflammatory condition. The term "prophylactically effective amount" can encompass an amount that improves overall prophylaxis or enhances the prophylactic efficacy of another prophylactic agent.

The term "inflammatory disease" refers to a disease caused by, resulting from, or resulting in inflammation. The term "inflammatory disease" may also refer to a dysregulated inflammatory reaction that causes an exaggerated response by macrophages, granulocytes, and/or T-lymphocytes leading to abnormal tissue damage and/or cell death. An inflammatory disease can be either an acute or chronic inflammatory condition and can result from infections or non-infectious causes. Inflammatory diseases include, without limitation, atherosclerosis, arteriosclerosis, autoimmune disorders, multiple sclerosis, systemic lupus erythematosus, polymyalgia rheumatica (PMR), gouty arthritis, degenerative arthritis, tendonitis, bursitis, psoriasis, cystic fibrosis, arthrosteitis, rheumatoid arthritis, inflammatory arthritis, Sjogren's syndrome, giant cell arteritis, progressive systemic sclerosis (scleroderma), ankylosing spondylitis, polymyositis, dermatomyositis, pemphigus, pemphigoid, diabetes (e.g., Type I), myasthenia gravis, Hashimoto's thyroiditis, Graves' disease, Goodpasture's disease, mixed connective tissue disease, sclerosing cholangitis, inflammatory bowel disease, Crohn's disease, ulcerative colitis, pernicious anemia, inflammatory dermatoses, usual interstitial pneumonitis (UIP), asbestosis, silicosis, bronchiectasis, berylliosis, talcosis, pneumoconiosis, sarcoidosis, desquamative interstitial pneumonia, lymphoid interstitial pneumonia, giant cell interstitial pneumonia, cellular interstitial pneumonia, extrinsic allergic alveolitis, Wegener's granulomatosis and related forms of angiitis (temporal arteritis and polyarteritis nodosa), inflammatory dermatoses, hepatitis, delayed-type hypersensitivity reactions (e.g., poison ivy dermatitis), pneumonia, respiratory tract inflammation, Adult Respiratory Distress Syndrome (ARDS), encephalitis, immediate hypersensitivity reactions, asthma, hayfever, allergies, acute anaphylaxis, rheumatic fever, glomerulonephritis, pyelonephritis, cellulitis, cystitis, chronic cholecystitis, ischemia (ischemic injury), reperfusion injury, allograft rejection, host-versus-graft rejection, appendicitis, arteritis, blepharitis, bronchiolitis, bronchitis, cervicitis, cholangitis, chorioamnionitis, conjunctivitis, dacryoadenitis, dermatomyositis, endocarditis, endometritis, enteritis, enterocolitis, epicondylitis, epididymitis, fasciitis, fibrositis, gastritis, gastroenteritis, gingivitis, ileitis, iritis, laryngitis, myelitis, myocarditis, nephritis, omphalitis, oophoritis, orchitis, osteitis, otitis, pancreatitis, parotitis, pericarditis, pharyngitis, pleuritis, phlebitis, pneumonitis, proctitis, prostatitis, rhinitis, salpingitis, sinusitis, stomatitis, synovitis, testitis, tonsillitis, urethritis, urocystitis, uveitis, vaginitis, vasculitis, vulvitis, vulvovaginitis, angitis, chronic bronchitis, osteomyelitis, optic neuritis, temporal arteritis, transverse myelitis, necrotizing fasciitis, and necrotizing enterocolitis. An ocular inflammatory disease includes, but is not limited to, post-surgical inflammation.

EXAMPLES

In order that the invention described herein may be more fully understood, the following examples are set forth. The synthetic and biological examples described in this application are offered to illustrate the compounds, pharmaceutical compositions, and methods provided herein and are not to be construed in any way as limiting their scope.

Table 1 lists intermediates that were used in the preparation of example compounds.

TABLE 1

| Aminoalcohol Number | Structure | Source |
|---|---|---|
| I1 | | Commercial |
| I2 | | Commercial |
| I3 | | Commercial |
| I4 | | Methods of Intermediate Scheme 1 |
| I5 | | Methods of Intermediate Scheme 1 |

TABLE 1-continued

| Aminoalcohol Number | Structure | Source |
|---|---|---|
| I6 | | Methods of Intermediate Scheme 1 |
| I7 | | Methods of Intermediate Scheme 2 |
| I8 | | Methods of Intermediate Scheme 3 |
| I9 | | Commercial |
| I10 | | Methods of Intermediate Scheme 4 |
| I11 | | Methods of Intermediate Scheme 4 |
| I12 | | Methods of Intermediate Scheme 5 |
| I13 | | Methods of Intermediate Scheme 5 |
| I14 | | Methods of Intermediate Scheme 6 |
| I15 | | Methods of Intermediate Scheme 7 |
| I16 | | Methods of Intermediate Scheme 8 |
| I17 | | Methods of Intermediate Scheme 9 |
| I18 | | Methods of Intermediate Scheme 10 |
| I19 | | Methods of Intermediate Scheme 11 |
| I20 | | Methods of Intermediate Scheme 12 |

TABLE 1-continued

| Aminoalcohol Number | Structure | Source |
|---|---|---|
| I21 | | Methods of Intermediate Scheme 13 |
| I22 | | Methods of Intermediate Scheme 14 |
| I23 | | Methods of Intermediate Scheme 15 |
| I24 | | Methods of Intermediate Scheme 16 |

The reaction mixture was diluted with EtOAc (40 mL) and washed sequentially with 1 M HCl aqueous (aq.) (120 mL), water (50 mL), sat. NaHCO$_3$ (80 mL), dried over Na$_2$SO$_4$, filtered, concentrated, and re-concentrated from dichloromethane/MBTE to give an off-white foam. The crude product was purified by silica gel chromatography eluting with EtOAc/dichloromethane (0-70% gradient) to yield a white solid (1.70 g). $^1$H NMR (400 MHz, Chloroform-d) δ 7.38-7.25 (m, 5H), 6.03 (d, 11H), 5.09 (s, 2H), 4.49 (d, 1H), 4.15-3.99 (m, 2H), 3.77-3.58 (m, 2H), 3.45 (tt, 4H), 3.36-3.21 (m, 2H), 1.46 (s, 9H), 1.15 (d, 3H).

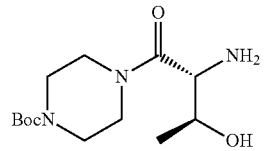 [SMILES: C[C@H](O)[C@@H](N)C(=O)N1CCN(C(=O)OC(C)(C)C)CC1]

tert-Butyl 4-(D-threonyl)piperazine-1-carboxylate (I4)

IS1-1 (766 mg, 1.03 mmol) was dissolved in absolute EtOH (12 mL) and the reaction mixture was evacuated and back-filled with nitrogen (3 times). 5% Pd/C (109 mg, 0.05

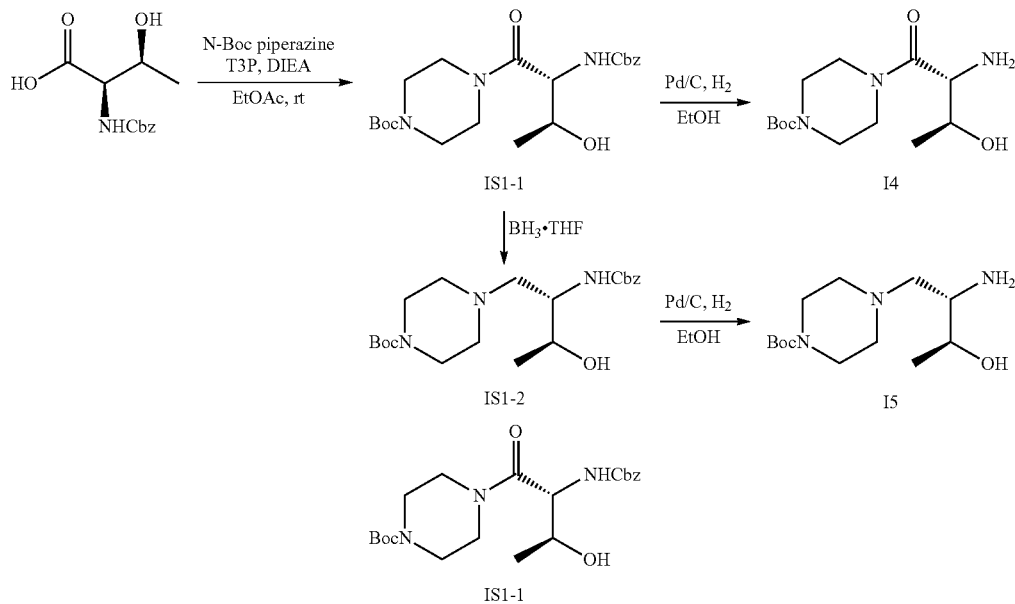

Intermediate Scheme 1.

tert-Butyl 4-(((benzyloxy)carbonyl)-D-threonyl)piperazine-1-carboxylate (IS1-1)

To a solution of (2R,3S)-2-{[(benzyloxy)carbonyl]amino}-3-hydroxybutanoic acid (3 g, 11.8 mmol) in EtOAc (50 mL) was added DIEA (1.8 mL, 10.3 mmol) and tert-butyl piperazine (2 g, 10.7 mmol). 1-Propanephosphonic anhydride (T3P®) (8.63 g of a 50% w/w soln in dichloromethane) was added by pipet with stirring over 2 minutes (mins) and the reaction mixture was stirred for 6.5 hours (h).

mmol) was added and the reaction mixture was evacuated and back-filled with nitrogen (3 times). The reaction mixture was then evacuated and back-filled with hydrogen (3 times) and stirred at room temperature (rt) under a hydrogen atmosphere (balloon) for 1.5 h. The reaction mixture was evacuated and back-filled with nitrogen (5 times). Diatomaceous earth (Celite®) was added to reaction mixture it was stirred for 5 min, and filtered through a MeOH wetted pad of Celite® rinsed with MeOH and concentrated. The crude material was dissolved in dichloromethane and filtered through a syringe filter to deliver the crude product. MS (ESI+) m/z: 288.03 [M+H]+, 1H NMR (400 MHz, Chloroform-d) δ 3.86 (td, 1H), 3.79 (s, 10H), 1.47 (s, 9H), 1.18 (d, 3H).

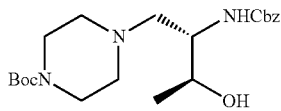

tert-Butyl 4-((2S,3S)-2-(((benzyloxy)carbonyl)amino)-3-hydroxybutyl)piperazine-1-carboxylate (IS1-2)

In an oven-dried 3-necked flask fitted with a reflux condenser, IS1-1 (1.25 g, 2.96 mmol) was dissolved in dry THF (29 mL, 0.1 M) and cooled to 0° C. under nitrogen. 1 M Borane·THF complex (8.8 mL, 8.8 mmol) was added dropwise over 11.5 min, keeping the temperature below 3.5° C. A slight evolution of gas was observed. The reaction mixture was stirred for 6 min, the ice-bath was removed, and then the reaction mixture was allowed to warm to 16.5° C. and then heated to 65° C. for 2 h. The reaction mixture was cooled in an ice-bath and slowly quenched by the addition of MeOH (7 mL). The reaction mixture was diluted with additional MeOH and concentrated (3 times). The residue was dissolved in MeOH (50 mL), heated to a gentle reflux for approximately 1 h and concentrated. The crude product was purified by silica gel chromatography eluting with 20% MeOH in dichloromethane+0.5% NH4OH/CH2Cl2 (0-60% gradient) to yield a white foam (766 mg). MS (ESI+) m/z: 408.13 [M+H]+, 1H NMR (400 MHz, Chloroform-d) δ 7.44-7.29 (m, 5H), 5.24 (d, 1H), 5.11 (s, 2H), 4.05 (qd, 1H), 3.65 (d, 1H), 3.48-3.31 (m, 4H), 2.71 (dd, 1H), 2.56-2.46 (m, 3H), 2.42 (dt, 2H), 1.45 (s, 9H), 1.18 (d, 3H).

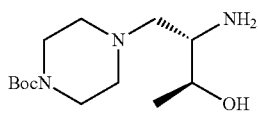 [SMILES: C[C@H](O)[C@@H](N)CN1CCN(C(=O)OC(C)(C)C)CC1]

tert-Butyl 4-((2S,3S)-2-amino-3-hydroxybutyl)piperazine-1-carboxylate (I5)

IS1-2 (766 mg, 1.87 mmol) was dissolved in absolute EtOH (20 mL) and the reaction mixture was evacuated and back-filled with nitrogen (3 times). 5% Pd/C (200 mg, 0.94) was added and the reaction mixture was evacuated and back-filled with nitrogen (3 times). The reaction mixture was evacuated and back-filled with hydrogen (3 times) and stirred at rt under a hydrogen atmosphere (balloon) for 1.5 h and heated to 45° C. for 1 h. The reaction mixture was cooled to rt, evacuated and back-filled with nitrogen (5 times). Celite® was added to reaction mixture it was stirred for 5 min, and filtered through a MeOH wetted pad of Celite® rinsed with MeOH and concentrated to yield the crude product as an off-white solid. MS (ESI+) m/z: 274.08 [M+H]+, 1H NMR (400 MHz, Chloroform-d) δ 7.41-7.33 (m, OH), 3.56 (qd, 1H), 3.50-3.34 (m, 4H), 2.93-2.78 (m, 1H), 2.48 (d, 3H), 2.43-2.28 (m, 3H), 1.45 (s, 10H), 1.17 (d, 3H).

Intermediate Scheme 2.

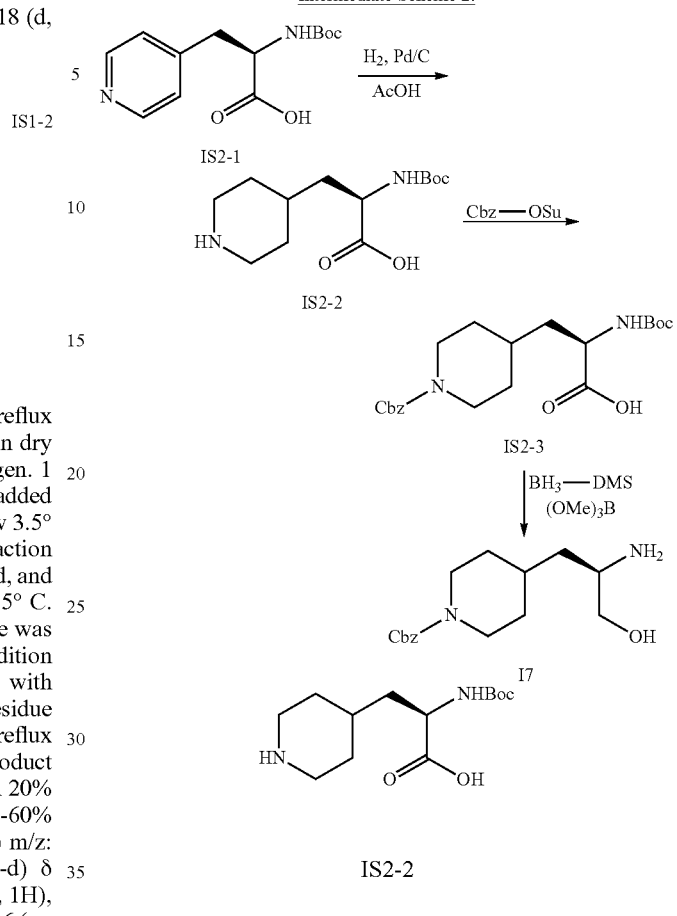

(R)-2-((tert-butoxycarbonyl)amino)-3-(piperidin-4-yl)propanoic acid (IS2-2)

An oven-dried flask was evacuated and back-filled with nitrogen (2 times) before cooling to rt. 10% Pd/C (50% wet, 7.96 g, 3.74 mmol) was added to the flask which was evacuated and back-filled with nitrogen (2 times). Glacial acetic acid (32 mL) was added to the reaction which was evacuated and back-filled with nitrogen (2 times). N-Boc-D-pyridylalanine (5 g, 18.7 mmol) was added followed by glacial acetic acid (5 mL). The reaction was evacuated and back-filled with nitrogen (2 times) and was then evacuated and back-filled with hydrogen (4 times). The reaction mixture was heated to 60° C. and was stirred under a hydrogen balloon for 15 h. The reaction mixture was cooled to rt and was evacuated and back-flushed with nitrogen (4 times). Celite® was added, and the reaction mixture was stirred for approximately 15 min and was then filtered through a pad of Celite® while rinsing with MeOH. The reaction mixture was concentrated and then re-concentrated from MTBE to give a clear gum. The material was used without further purification. MS (ESI+) m/z: 273.07 [M+H]+.

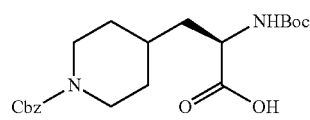

IS2-3

(R)-3-(1-((benzyloxy)carbonyl)piperidin-4-yl)-2-((tert-butoxycarbonyl)amino)propanoic acid (IS2-3)

Crude IS2-2 (4.15 g, 15.2 mmol) was dissolved in THF (30 mL) to which sat. aq. NaHCO₃ (20 mL) was added. The reaction mixture was cooled to 0° C., and N-(benzyloxycarbonyloxy)succinimide (4.16 g, 16.7 mmol) was added. The reaction mixture was stirred for 11 min, the ice-bath was removed, and the reaction mixture was stirred at room temperature. Upon completion, the reaction mixture was cooled in an ice-bath, and 1N HCl (approximately 50 mL) was added slowly until bubbling ceased and the solution was pH 2-3. The reaction mixture was extracted with MTBE (25 mL×3). The combined extracts were washed with 1N HCl (20 mL×2), water (40 mL), and brine (40 mL) and were dried over MgSO₄, were filtered, and were concentrated. The material was purified on 80 g silica gel (dichloromethane/EtOAc+1% AcOH Gradient: 0-100%) to give the title compound (2.3 g, 37%, 2 steps). MS (ESI+) m/z: 429.09 [M+Na]⁺. ¹H NMR (400 MHz, Chloroform-d) δ 7.42-7.28 (m, 5H), 5.14 (s, 2H), 4.95 (d, 1H), 4.44-4.32 (m, 1H), 4.30-4.07 (m, 2H), 2.89-2.66 (m, 2H), 1.91-1.51 (m, 5H), 1.46 (s, 9H), 1.27-1.06 (m, 2H).

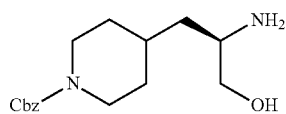 [SMILES: N[C@@H](CO)CC1CCN(C(=O)OCc2ccccc2)CC1]

17 benzyl (R)-4-(2-amino-3-hydroxypropyl)piperidine-1-carboxylate (I7)

In an oven-dried flask, crude IS2-3 (2.3 g, 5.65 mmol) was concentrated from dry toluene (10 mL), was dissolved in dry THF (12 mL) under N₂, and was cooled to 0° C. Trimethyl borate (1.37 mL, 12.4 mmol) was added, and the reaction mixture was stirred for approximately 7 min. Borane dimethylsulfide complex (0.80 mL, 8.47 mmol) was added dropwise by syringe over approximately 4 minutes such that the temperature did not exceed 3° C. The reaction mixture was stirred for 10 min, the ice-bath was removed, and the reaction mixture was stirred at rt for 5.5 h. The reaction mixture was cooled to 0° C. and additional trimethylborate (0.7 mL) and borane dimethylsulfide (0.4 mL) were added; the reaction mixture was allowed to slowly warm to rt over 1.5 h. The reaction mixture was cooled to 0° C. and methanol (10 mL) was added dropwise over 15 min, keeping the temperature below 10° C. The ice-bath was removed, and the reaction mixture was stirred for 30 min and was concentrated. The resulting clear oil was re-dissolved in methanol (approximately 50 mL) and was concentrated (2 times) before being placed on the high vac for approximately 20 min. The residue was partitioned between 1 N HCl (30 mL) and MTBE (25 mL). The aqueous layer was extracted with MTBE (25 mL×2). The aqueous layer was basified with sat. aq. NaHCO₃ (pH approximately 8.5) and was extracted with EtOAc (20 mL×3). The combined organic layers were dried over Na₂SO₄, were filtered, and were concentrated. MS (ESI+) m/z: 293.01 [M+H]⁺. ¹H NMR (400 MHz, Chloroform-d) δ 7.31-7.24 (m, 2H), 7.24-7.20 (m, 1H), 7.20-7.11 (m, 1H), 7.11-7.01 (m, 1H), 5.03 (s, 2H), 4.18-3.96 (m, 2H), 3.47 (dd, 1H), 3.16 (ddd, 1H), 2.84 (tt, 1H), 2.78-2.57 (m, 2H), 1.67-1.41 (m, 3H), 1.27-0.88 (m, 4H).

Intermediate Scheme 3.

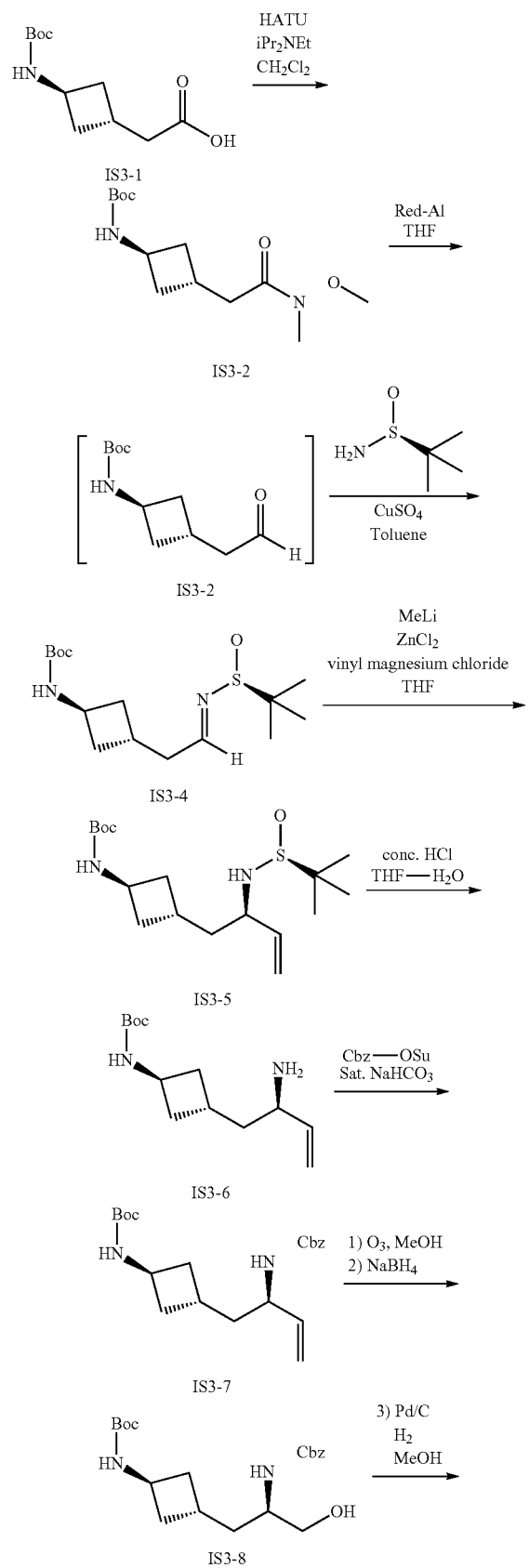

-continued

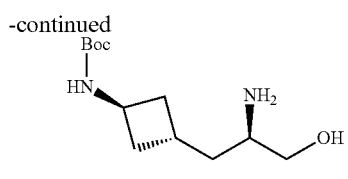

I8

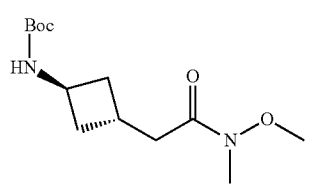

IS3-2 tert-Butyl ((1R,3R)-3-(2-(methoxy(methyl)amino)-2-oxoethyl)cyclobutyl)carbamate (IS3-2)

To a solution of 2-((1R,3R)-3-((tert-butoxycarbonyl)amino)cyclobutyl)acetic acid (1.1 g, 4.8 mmol) in dichloromethane (20 mL) was added methyoxyl(methyl)amine hydrochloride (0.70 g, 7.2 mmol), N,N-diisopropylethylamine (4.15 mL, 24.0 mmol), and 1-[Bis(dimethylamino) methylene]-1H-1,2,3-triazolo[4,5-b]pyridinium 3-oxid hexafluorophosphate (HATU) (2.73 g, 7.2 mmol). The reaction mixture was stirred at room temperature for 16 h. The reaction mixture was poured into 1 M NaOH and was stirred vigorously for 10 min. The organic layer was separated and was washed with 2N HCl (2 times), water (1 time), and brine (1 time). The organic layer was dried over sodium sulfate and was concentrated in vacuo. The crude material was purified by column chromatography (80 g silica gel column, 0-50% EtOAC/Hex) to give the title compound as a white powder (1.19 g, 4.4 mmol, 92%). MS (ESI+) m/z: [M+Na]+ 295.2.

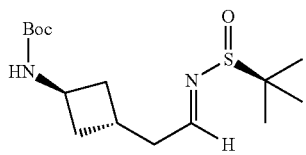

IS3-4 tert-Butyl ((1R,3R)-3-((E)-2-(((R)-tert-butylsulfinyl)imino)propyl)cyclobutyl)carbamate (IS3-4)

IS3-2 (1.19 g, 4.4 mmol) in THF (20 mL) was cooled to −40° C., and Red-Al (1.83 mL, 70 wt % in toluene, 5.7 mmol) was added. The reaction mixture was allowed to warm to room temperature and was stirred for 16 h. Ethyl acetate and sat. aq. potassium sodium tartrate (Rochelle salt) was added, and the mixture was stirred vigorously for 2 h. The organic layer was separated and was washed with brine (1 time), was dried over sodium sulfate, was filtered, and was concentrated to give aldehyde IS3-3 as a clear oil. IS3-3 (0.96 g, 4.5 mmol) was dissolved in toluene (9 mL), (S)-2-methylpropane-2-sulfinamide (0.545 g, 4.5 mmol) followed by copper(II) sulfate (2.15 g, 13.5 mmol) were added. The reaction mixture was stirred at rt for 18 h and was filtered through Celite®, eluting with ethyl acetate. The filtrate was concentrated and was purified by column chromatography on silica gel (24 g, 0-70% EtOAc/Hex) to give the title compound as a white solid (0.53 g, 1.67 mmol, 37%). 1H NMR (400 MHz, Chloroform-d) δ 7.99 (t, 1H), 4.71 (s, 1H), 4.24 (s, 1H), 2.70 (dd, 2H), 2.65-2.51 (m, 1H), 2.23-1.98 (m, 4H), 1.43 (d, 10H), 1.18 (d, 9H).

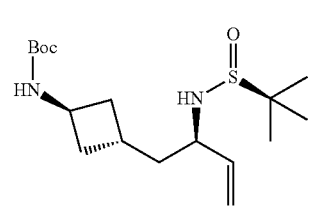

IS3-5 tert-Butyl ((1S,3R)-3-((R)-2-(((S)-tert-butylsulfinyl)amino)but-3-en-1-yl)cyclobutyl)carbamate (IS3-5)

A solution of ZnCl2 (2.63 mL, 1.9 M in MeTHF, 5.01 mmol) was added to dry THF (3.34 mL) and cooled to −78° C. A solution of methyllithium (3.22 mL, 3.1M in DME, 10 mmol) was added slowly, keeping the internal reaction temperature below −65° C. The mixture was stirred for 10 min, and a solution of vinylmagnesium chloride (3.22 mL, 1.6 M in THF, 3.13 mmol) was added slowly, keeping the internal reaction temperature below −65° C. The mixture was stirred for 5 min. A solution of IS3-4 (0.53 g, 1.67 mmol) in THF (1 mL) was added dropwise, and the reaction mixture was stirred for 30 min. Acetic acid (0.5 mL) was added slowly, the bath was removed, and the reaction mixture was allowed to warm to rt over 20 min. Half saturated (sat.) aq NH4Cl was added followed by MTBE. The layers were separated, the aqueous layer was extracted with MBTE (2 times), and the combined extracts were dried over Na2SO4, were filtered, and were concentrated. The crude material was purified by column chromatography (12 g silica gel column, 0-50% EtOAC/Hex) to give the title compound as a white powder (0.366 g, 1.06 mmol, 64%). 1H NMR (400 MHz, Chloroform-d) δ 5.61 (dddd, 1H), 5.22-5.08 (m, 2H), 4.73 (s, 1H), 4.10 (s, 1H), 3.76-3.67 (m, 1H), 3.06 (d, 1H), 2.41-2.26 (m, 1H), 2.13-1.92 (m, 4H), 1.74 (td, 2H), 1.42 (s, 9H), 1.19 (d, 9H).

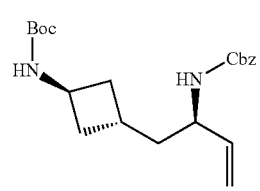

IS3-7

Benzyl ((R)-1-((1R,3S)-3-((tert-butoxycarbonyl)amino)cyclobutyl)but-3-en-2-yl)carbamate (IS3-7)

Concentrated HCl (0.1 mL, 1.27 mmol) was added to a solution of IS3-5 (0.366 g, 1.06 mmol) in THF/water (5:2, 2.8 mL), and the reaction mixture was stirred at room temperature for 18 h. Sat. aq. NaHCO3 (3 mL) was added followed by N-(benzyloxycarbonyloxy)succinimide (0.276 g, 1.11 mmol). The reaction mixture was stirred at room temperature for 1 hour and was extracted with EtOAc (2 times). The combined extracts were washed with brine, were dried over sodium sulfate, were filtered, and were concentrated in vacuo. The material was purified by column chromatography on silica gel (12 g, 0-70% EtOAc/Hex) to give the title compound as a white powder (0.31 g, 0.83 mmol, 78%). MS (ESI+) m/z: 397.31 [M+Na]$^+$; $^1$H NMR (400 MHz, Chloroform-d) δ 7.40-7.30 (m, 5H), 5.73 (ddd, 1H), 5.18-5.04 (m, 4H), 4.63 (d, 2H), 4.12 (s, 2H), 2.28 (s, 1H), 2.06 (s, 2H), 1.97 (s, 2H), 1.74-1.59 (m, 2H), 1.43 (s, 9H).

IS3-8

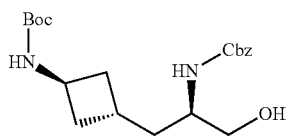

Benzyl ((R)-1-((1R,3S)-3-((tert-butoxycarbonyl) amino)cyclobutyl)-3-hydroxypropan-2-yl)carbamate (IS3-8)

IS3-7 (0.31 g, 0.827 mmol) was dissolved in methanol (16.5 mL) and was cooled to −78° C. A stream of ozone (7 PSI, 2 LPM) was bubbled through the reaction mixture for 8 min, at which point a slight blue coloration was observed. The ozone stream was removed, and nitrogen was then bubbled through the solution for 5 min (blue color disappeared) Sodium borohydride (77.1 mg, 2.04 mmol) was added, and the reaction mixture was removed from the bath and was allowed to warm to room temperature for 30 min. The reaction was quenched with sat. aq NH$_4$Cl and was extracted with dichloromethane (3 times). The combined extracts were dried over Na$_2$SO$_4$, were filtered, and were concentrated in vacuo. The material was purified with column chromatography on silica gel (12 g, 0-70% EtOAc/Hex) to give the title compound as a white foam (0.265 g, 0.7 mmol, 85%). MS (ESI+) m/z: 401.09 [M+Na]$^+$; $^1$H NMR (400 MHz, Chloroform-d) δ 7.44-7.30 (m, 5H), 5.09 (s, 2H), 4.82 (s, 1H), 4.69 (s, 1H), 4.22-4.09 (m, 1H), 3.67 (s, 2H), 3.55 (s, 1H), 2.28 (s, 1H), 2.06 (d, 2H), 1.99 (s, 3H), 1.74-1.60 (m, 2H), 1.43 (s, 9H).

I8

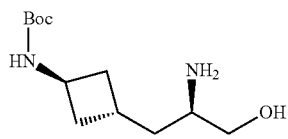

tert-Butyl ((1S,3R)-3-((R)-2-amino-3-hydroxypropyl)cyclobutyl)carbamate (I8)

A solution of IS3-8 (265 mg, 0.7 mmol) was dissolved in methanol (3 mL) and Pd/C was added (74.3 mg, 5 wt % on charcoal, 0.5 mol %). A balloon of hydrogen was bubbled through the reaction mixture for 0.5 hr. The reaction mixture was filtered through Celite®, eluting with methanol, and the filtrate was concentrated in vacuo to give 18 as a clear oil (171 mg, 0.7 mmol, 100%). MS (ESI+) m/z: 245.08 [M+Na]$^+$; $^1$H NMR (400 MHz, Methanol-d4) δ 4.13-4.01 (m, 1H), 3.64 (dd, 1H), 3.42 (dd, 1H), 2.97 (dt, 1H), 2.39-2.23 (m, 1H), 2.16-1.95 (m, 4H), 1.69 (ddt, 2H), 1.43 (s, 9H).

Intermediate Scheme 4.

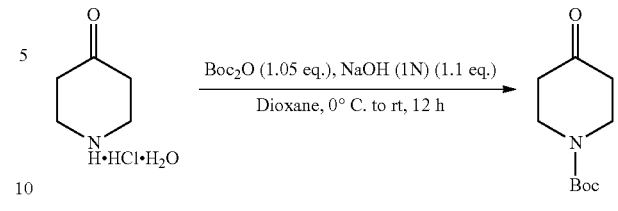

A solution of di-tert-butyldicarbonate (34.2 mmol, 1.05 eq.) in 1,4-dioxane (20 mL) and a 1 N aqueous sodium hydroxide solution (35.8 mmol, 1.1 eq.) were slowly added at the same time to an ice-cooled mixture of 4-piperidone hydrochloride monohydrate (32.6 mmol, 1.0 eq.) in 1,4-dioxane (20 mL). The reaction was kept under stirring overnight (12 h) at which point TLC showed full protection of starting material. The 1,4-dioxane was then removed under reduced pressure and the residue was extracted twice with ethyl acetate (2×30 mL). The combined organic layers were successively washed with a 5% aqueous potassium hydrogen sulfate solution (20 mL), water (20 mL) and brine (20 mL), and were then dried over anhydrous magnesium sulfate. The solvent was removed under reduced pressure to afford tert-butyl 4-oxopiperidine-1-carboxylate as a white solid (6.10 g, 94%)

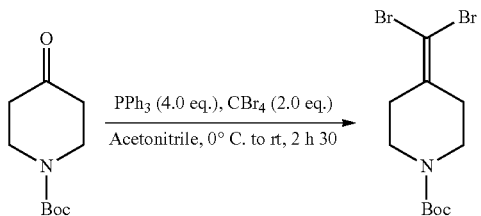 [SMILES: CC(C)(C)OC(=O)N1CCC(=O)CC1 ; CC(C)(C)OC(=O)N1CCC(=C(Br)Br)CC1]

To a stirring solution of tert-butyl 4-oxopiperidine-1-carboxylate (25.09 mmol, 1.0 eq.) and triphenylphosphine (100.36 mmol, 4.0 eq.) at 0° C. in acetonitrile (60 mL) under argon atmosphere was added tetrabromomethane (50.18 mmol, 2.0 eq.) portionwise. The reaction mixture was stirred at 0° C. for 15 mins and was then allowed to warm up to room temperature and was kept under stirring for another 2 h. The formed precipitate was filtrated through a pad of celite and the filtrate was concentrated under reduced pressure. tert-Butyl 4-(dibromomethylene)piperidine-1-carboxylate was obtained as a white solid (7.63 g, 86%) after purification of the filtrate on column chromatography (Hexanes/AcOEt: 100:0 to 85:15).

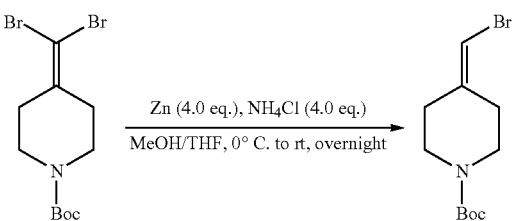 [SMILES: CC(C)(C)OC(=O)N1CCC(=C(Br)Br)CC1 ; CC(C)(C)OC(=O)N1CCC(=CBr)CC1]

To a stirring solution of tert-butyl 4-(dibromomethylene) piperidine-1-carboxylate (12.67 mmol, 1.0 eq.) in THF/MeOH 1:2 mixture (55 mL) at 0° C. under argon atmosphere was added ammonium chloride (50.7 mmol, 4.0 eq.) in one portion and the reaction was allowed to stir at 0° C. for 30 minutes. Zinc powder (50.7 mmol, 4.0 eq.) was then added in one portion at 0° C. and the reaction was allowed to warm up to room temperature and was kept under stirring overnight. After 14 h of stirring TLC analysis showed full conversion of starting material in a more polar product (Rf=0.43 in AcOEt/Hexanes 1:9). The solids were removed by filtration and the filtrate was concentrated under reduced pressure. tert-Butyl 4-(bromomethylene)piperidine-1-carboxylate was obtained after purification by flash column chromatography (Hexanes/AcOEt 100:0 to 90:10) as a colorless oil (3.28 g, 94%).

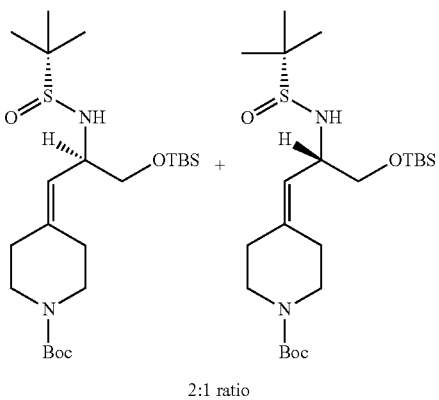

2:1 ratio

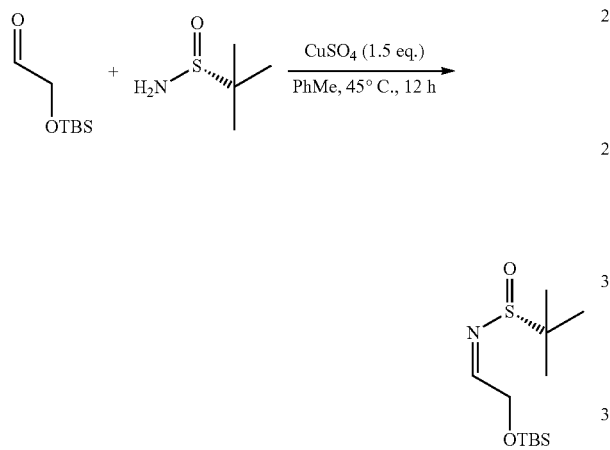

(R)-2-Methylpropane-2-sulfinamide (32.5 mmol, 1.0 eq.) was added to a solution of 2-((tert-butyldimethylsilyl)oxy) acetaldehyde (32.5 mmol, 1.0 eq.) and copper sulfate (48.7 mmol, 1.5 eq.) in toluene (55 mL). The reaction mixture was allowed to stir overnight at 40-45° C. After 14 h TLC showed full conversion of the starting material in sulfonimide product (Rf=0.36 (Hexanes/AcOEt 8:2). The crude mixture was allowed to cool at rt and was then filtrated through a pad of celite, which was washed with DCM (2×10 mL). The filtrate was concentrated under vacuum and tert-butyl 4-(bromomethylene)piperidine-1-carboxylate was obtained after purification by flash column chromatography (Hexanes/EtOAc 100:0 to 80:20) as a white solid (6.76 g, 75%).

A solution of tert-butyllithium (16.22 mmol, 3.0 eq.) was added dropwise to a stirring solution of tert-butyl 4-(bromomethylene)piperidine-1-carboxylate (8.11 mmol, 1.5 eq.) in dry Et$_2$O (20 mL) at −78° C. under argon atmosphere. The reaction mixture was allowed to stir for 30 minutes at −78° C. In parallel, the second solution was prepared: trimethylaluminum solution (5.95 mmol, 1.1 eq.) was added dropwise to a stirring solution of (R,Z)—N-(2-((tert-butyldimethylsilyl)oxy)ethylidene)-2-methylpropane-2-sulfinamide in dry THF (20 mL) at −78° C. under argon atmosphere. This second reaction mixture was allowed to stir for 5 minutes before being added dropwise at −78° C. to the first reaction mixture. The reaction media was allowed to stir for 3 h at −78° C. At this point the reaction showed the formation of two products (two diasteromers, one major one minor) (Rf1=0.29, Rf2=0.16 in Hexanes/AcOEt 7:3 ratio). The reaction media was quenched with NH$_4$Cl sat aq. (30 mL) and aqueous layer was extracted with Et$_2$O (3×10 mL). Organic layers were then assembled, washed with brine (15 mL), dried over anhydrous MgSO$_4$, and concentrated under vacuum. Desired products were separated on flash column chromatography (Hexanes/EtOAc 100:0 to 50:50) and were obtained as colorless oils in a 2:1 ratio, respectively 1.38 g and 0.66 g, Overall yield 80%.

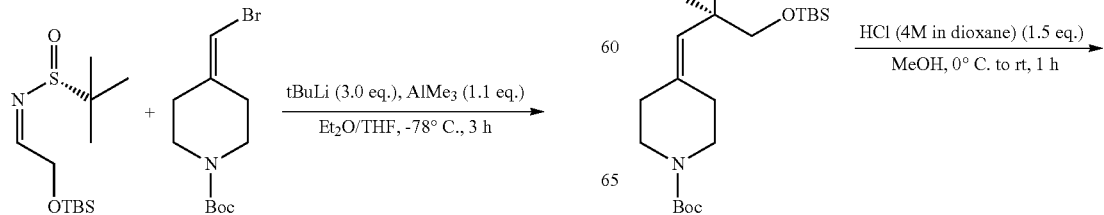

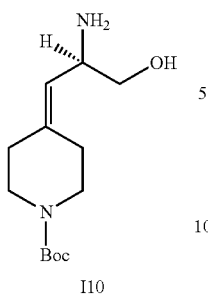

I10

A solution of HCl (4M in dioxane) (4.36 mmol, 1.5 eq.) was added dropwise to a stirring solution of tert-butyl 4-((S)-3-((tert-butyldimethylsilyl)oxy)-2-(((R)-tert-butylsulfinyl)amino)propylidene)piperidine-1-carboxylate (2.91 mmol, 1.0 eq.) in MeOH (15 mL) at 0° C. The reaction mixture was kept under stirring until full deprotection of the starting material (1 h by TLC monitoring). The reaction mixture was then concentrated under reduced pressure. A white amalgam was obtained which was triturated in cold diethyl ether. The mixture was filtrated through a Buchner. The solid obtained was washed several times with diethyl ether and was then dissolved in MeOH and purified over flash column chromatography (Eluent DCM/MeOH 100:0 to 80:20) to afford tert-butyl (R)-4-(2-amino-3-hydroxypropylidene)piperidine-1-carboxylate (I10) as a white solid (0.53 g, 71%).

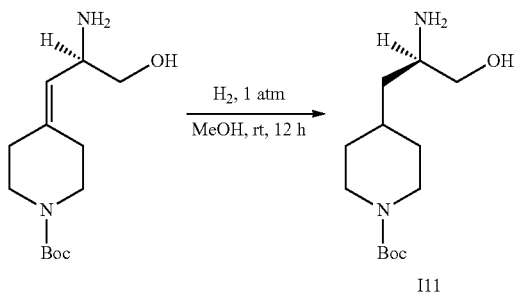

I11

A round bottom flask was charged with tert-butyl (R)-4-(2-amino-3-hydroxypropylidene)piperidine-1-carboxylate (1.64 mmol, 1.0 eq.) and palladium activated on charcoal (10 w %, 0.33 mmol, 0.2 eq.). Methanol (6 mL) was added and the solution was flushed with nitrogen before flushing back with H₂. The reaction was kept at room temperature under one atmosphere of H₂ overnight. After 12 h of stirring, LCMS analysis showed full reduction of the double bond. The reaction mixture was flushed with nitrogen and was filtrated through a pad of celite. The celite cake was washed several times with methanol and the filtrate was concentrated under reduced pressure. tert-Butyl (R)-4-(2-amino-3-hydroxypropyl)piperidine-1-carboxylate (I11) was obtained after purification by flash column chromatography (DCM/MeOH 100:0 to 80:20+1% NEt₃) as a colorless oil (0.41 g, 97%).

Intermediate Scheme 5.

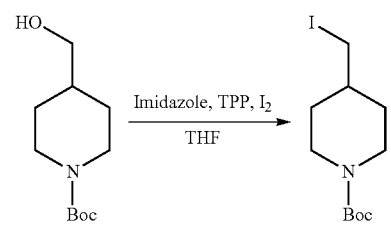

To a stirred solution of tert-butyl 4-(hydroxymethyl)piperidine-1-carboxylate (1 equiv) in dry THF (10 mL) was added imidazole (1.2 equiv), TPP (1.2 equiv), and iodine (1.2 equiv) under argon atmosphere at rt. The reaction mixture was kept under stirring until complete consumption of the starting material at room temp. (2 h by TLC monitoring). The solvent was removed under reduced pressure and the crude mixture was purified by column chromatography (Hexanes/EtOAc 100:0 to 90:10) to afford tert-butyl 4-(iodomethyl)piperidine-1-carboxylate as a colorless oil that gradually solidified.

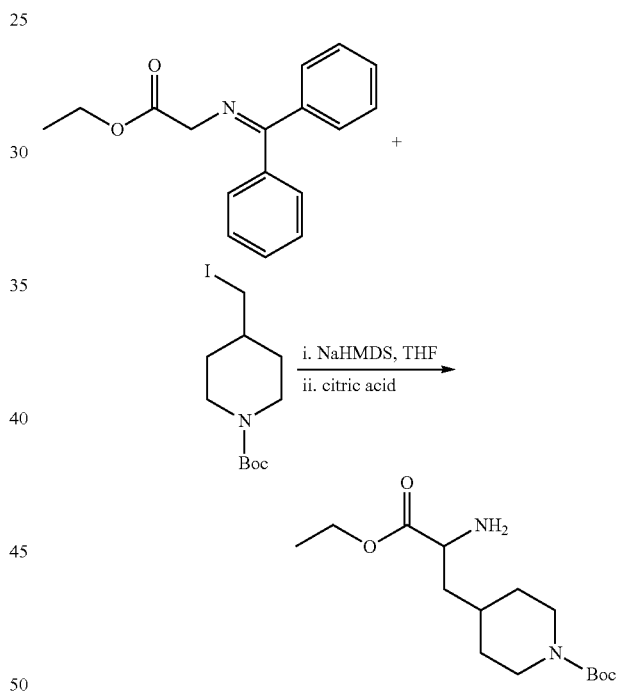

A dry 100 mL round bottom flask (oven heated/argon cooled), was charged with ethyl 2-((diphenylmethylene)amino)acetate (1 equiv, 7.48 mmol). The flask was purged with argon, and 30 mL of dry THF were injected into the air-free system. The resulting solution was cooled to −78° C. with stirring, and NaHMDS (1.2 equiv, 898 mmol) was added to the solution dropwise. The reaction was stirred at −78° C. for 30 min, and a solution of tert-butyl 4-(iodomethyl)piperidine-1-carboxylate (1.0 equiv, 7.48 mmol) in dry THF (20 mL) was injected into the system via a cannula. The solution was stirred at −78° C. for 1 hr, at 0° C. for 1 hr, and at room temp overnight. TLC showed complete consumption of starting materials. The reaction mixture was diluted with AcOEt (50 mL) and then washed with a solution of 0.5 g of citric acid (10 equiv) in water (20 mL). The organic layer was extracted, dried over magnesium sulfate and then concentrated. Crude product was purified by column chromatography to provide tert-butyl 4-(2-amino-3-ethoxy-3-oxopropyl)piperidine-1-carboxylate.

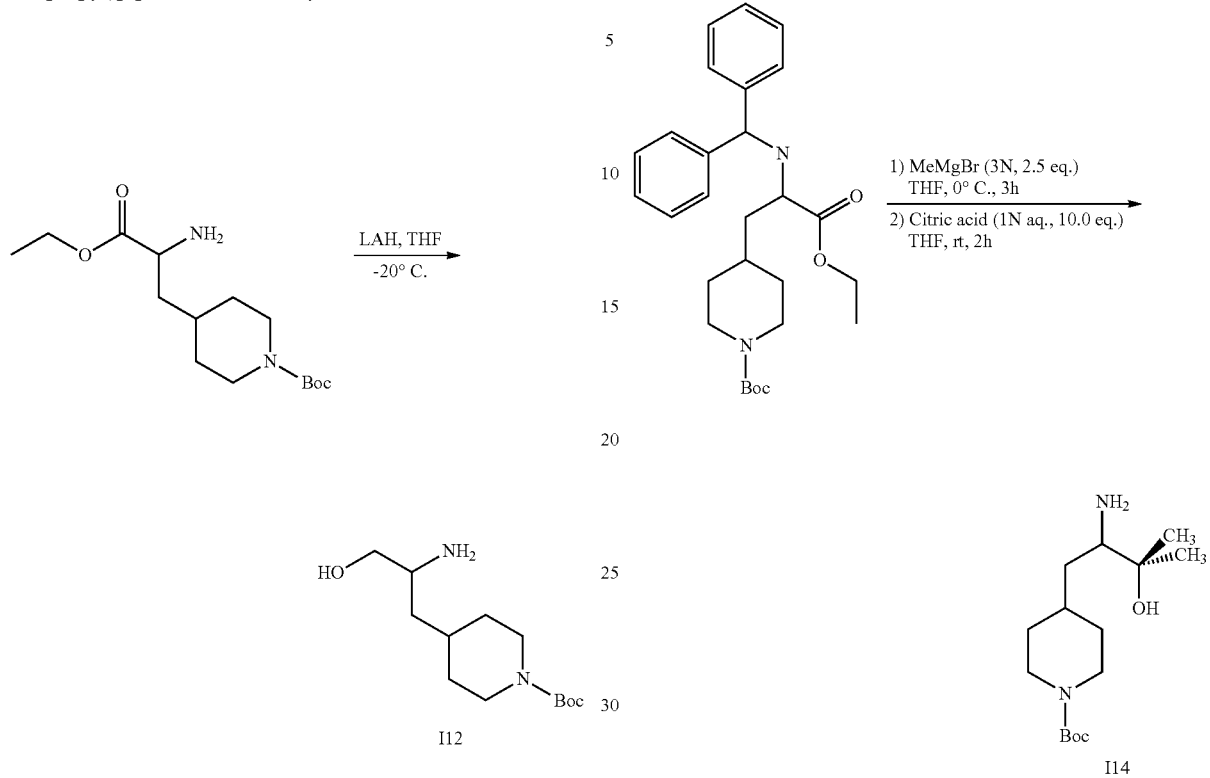

Intermediate Scheme 6

LAH (1 equiv, 2.203 equiv) was added portion wise to a solution of tert-butyl 4-(2-amino-3-ethoxy-3-oxopropyl)piperidine-1-carboxylate (1 equiv, 2.203 equiv) in dry THF (10 mL) at −20° C. The reaction mixture was allowed to stir for 4 h at this temperature. After complete consumption of starting material, (TLC monitoring), the reaction mixture was diluted with ether and cooled to 0° C. Water was slowly added, followed by 15% aq NaOH (0.3 mL) and the mixture was stirred for 15 mins. After drying over anhydrous magnesium sulfate and filtration to remove salts, the organic layer was concentrated under vacuum to afford tert-butyl 4-(2-amino-3-hydroxypropyl)piperidine-1-carboxylate (I12), which was purified by column chromatography.

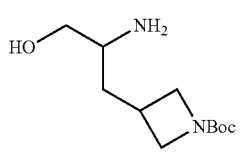

I13 tert-Butyl 3-(2-amino-3-hydroxypropyl)azetidine-1-carboxylate (I13) was prepared by employing the same synthetic sequence used to prepare tert-butyl 4-(2-amino-3-hydroxypropyl)piperidine-1-carboxylate, but substituting tert-butyl 3-(hydroxymethyl)azetidine-1-carboxylate for tert-butyl 4-(hydroxymethyl)piperidine-1-carboxylate.

Methylmagnesium bromide solution (3.0 M, 3.34 mmol, 2.5 eq.) was added dropwise to a solution of tert-butyl 4-(2-(((diphenylmethylene)amino)-3-ethoxy-3-oxopropyl)piperidine-1-carboxylate in dry THF (15 mL) at 0° C. The reaction mixture was kept under stirring at 0° C. for 3 h. HRMS analysis showed complete conversion of the ester group into the corresponding tertiary alcohol. The reaction was allowed to warm up to room temperature and 1N citric acid aqueous solution (13.34 mmol, 10.0 eq.) was added to the reaction media. After two hours of stirring TLC analysis showed complete deprotection of the Shiff base. AcOEt (20 mL) was added to the reaction mixture and benzophenone was removed by extraction with AcOEt (2×20 mL). Aqueous phase was then basified to pH=9-10 with careful addition of solid $Na_2CO_3$. The aqueous phase was then extracted by DCM (4×15 mL). Organic layers were assembled, dried over anhydrous $Na_2SO_4$ and concentrated under vacuum to afford tert-butyl 4-(2-amino-3-hydroxy-3-methylbutyl)piperidine-1-carboxylate as a white solid (I14) (0.32 g, 84%).

Intermediate Scheme 7.

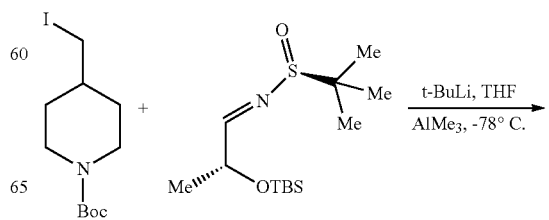

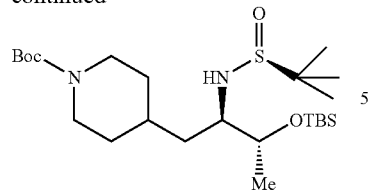

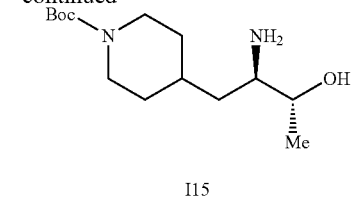

A first solution A was prepared: To a stirring solution of (S)—N—((R,E)-2-((tert-butyldimethylsilyl)oxy)propylidene)-2-methylpropane-2-sulfinamide (1 equiv, 11.07 mmol) in dry diethyl ether (60 mL) at −78° C. under argon atmosphere was added t-BuLi (2.2 equiv, 27.1 mmol). The reaction mixture was stirred for 30 mints at −78° C. In parallel, a second solution B was prepared: Trimethylaluminium (1.1 equiv, 13.53 mmol) was added dropwise to a stirring solution of Iodo (1 equiv, 12.30 mmol) in dry THF (40 mL) at −78° C. under argon atmosphere. This reaction mixture B was allowed to stir for 5 minutes before being added dropwise to the reaction mixture A. The reaction media was allowed to stir for 16 h at −78° C. The reaction mixture was quenched with NH₄Cl (10 mL) and organic layers were extracted with Et₂O (3×10 mL). tert-Butyl 4-((R)-3-((tert-butyldimethylsilyl)oxy)-2-(((S)-tert-butylsulfinyl)amino)propyl)piperidine-1-carboxylate was obtained after FCC (Hexanes/EtOAc 100:0 to 80:20) as a yellow oil.

To a stirred solution of tert-butyl 4-((2R,3R)-2-amino-3-((tert-butyldimethylsilyl)oxy)butyl)piperidine-1-carboxylate (1 equiv, 0.58 mmol) in THF at 0° C. was added TBAF (2.5 equiv). The reaction mixture was kept under stirring until complete consumption of the starting material at room temp. (2 h by TLC monitoring). The reaction mixture was quenched with water and organic layers were extracted with DCM (3×10 mL) and concentrated under reduced pressure and tert-butyl 4-((2R,3R)-2-amino-3-hydroxybutyl)piperidine-1-carboxylate (115) was obtained after FCC purification.

Intermediate Scheme 8

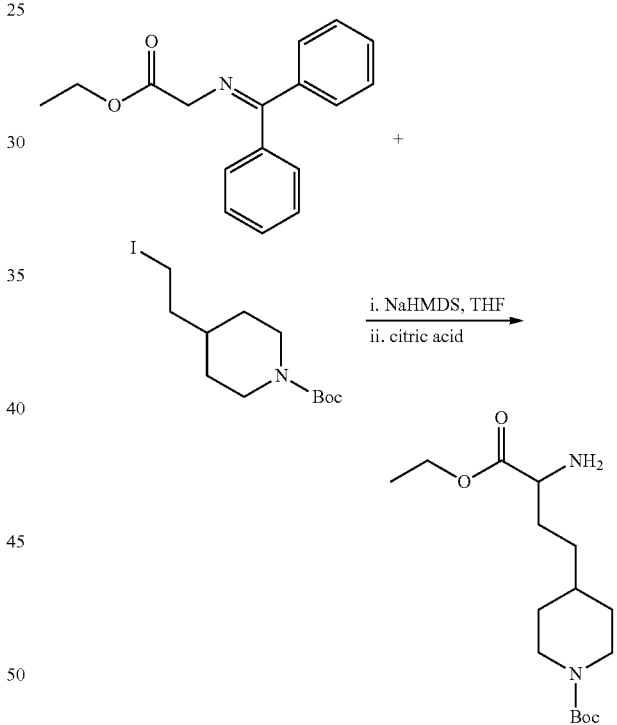

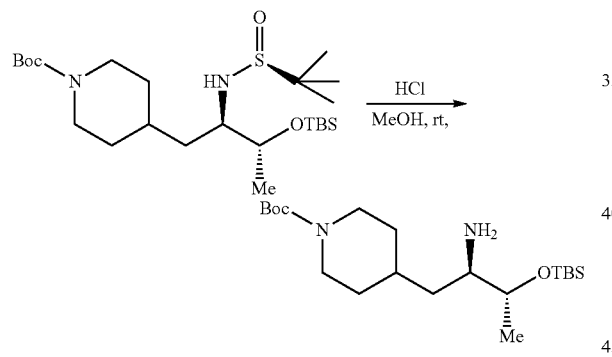

To a stirring solution of tert-butyl 4-((R)-3-((tert-butyldimethylsilyl)oxy)-2-(((S)-tert-butylsulfinyl)amino)propyl)piperidine-1-carboxylate (1 equiv, 0.835) in methanol at 0° C. was added HCl in 1,4 dioxane (1.05 equiv, 0.877 mmol). The reaction mixture was kept under stirring until complete consumption of the sulfonamide starting material at room temp. (2.5 hr by TLC monitoring). The reaction mixture was concentrated under reduced pressure and tert-butyl 4-((2R,3R)-2-amino-3-((tert-butyldimethylsilyl)oxy)butyl)piperidine-1-carboxylate was obtained after column chromatography purification (DCM/MeOH: 100:0: to 80:20:0 to 80:20) as a yellow oil.

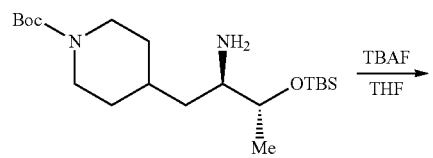

A dry 100 mL round bottom flask (oven heated/argon cooled) was charged with ethyl 2-((diphenylmethylene)amino)acetate. The flask was purged with argon, and 30 mL of dry THF were injected into the air-free system. The resulting solution was cooled to −78° C. with stirring, and NaHMDS was added to the solution dropwise. The reaction was stirred at −78° C. for 30 min, and a solution of tert-butyl 4-(3-amino-4-ethoxy-4-oxobutyl)piperidine-1-carboxylate in dry THF (20 mL) was injected into the system via a cannula. The solution was stirred at −78° C. for 1 hr, at 0° C. for 1 hr, and at room temp overnight. TLC showed complete consumption of starting materials. The reaction mixture was diluted with AcOEt (50 mL) and then washed with a solution of 0.5 g of citric acid in water (20 mL). The organic layer was extracted, dried over magnesium sulfate and then concentrated. Crude product was purified by FCC to provide tert-butyl 4-(3-amino-4-ethoxy-4-oxobutyl)piperidine-1-carboxylate.

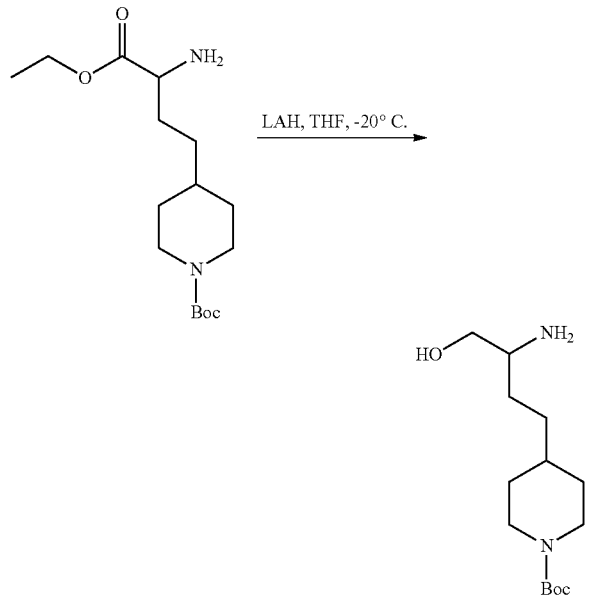

LAH was added portionwise to a solution of tert-butyl 4-(3-amino-4-ethoxy-4-oxobutyl)piperidine-1-carboxylate in dry THF at −20° C. The reaction mixture was allowed to stir for 4 h at this temperature. After complete consumption of starting material, (TLC monitoring), the reaction mixture was diluted with ether and cool to 0° C. slowly added water then 15% aq NaOH followed by 0.3 mL and stirred for 15 mins. Add some anhydrous magnesium sulfate stir 15 mints and filter to remove salts. Organic layer was concentrated under vacuum to afford tert-butyl 4-(3-amino-4-hydroxybutyl)piperidine-1-carboxylate (I16), which was purified by column chromatography.

Intermediate Scheme 9.

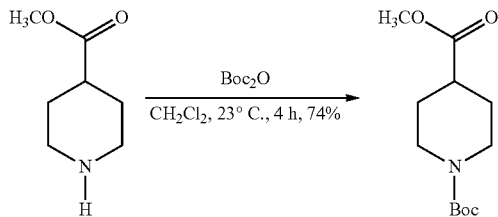

To a stirred solution of methyl piperidine-4-carboxylate (15 g, 95 mmol) in $CH_2Cl_2$ (100 mL) in 500 mL round bottom flask at 23° C. was added di-tert-butyl dicarbonate (22.91 g, 105 mmol) slowly to the reaction mixture and stirred for 4 mins. The reaction was neutralized with cold water (50 mL) at same temperature, and added $CH_2Cl_2$ (50 mL). The organic layer was separated and aqueous layer was washed $CH_2Cl_2$ (50 mL×3). The combined organic layers were washed with brine, dried over anhydrous $Na_2SO_4$, concentrated under vacuum, purified with flash column chromatography to give 1-(tert-butyl) 4-methyl piperidine-1,4-dicarboxylate (18.34 g, 74%) as a colourless oil.

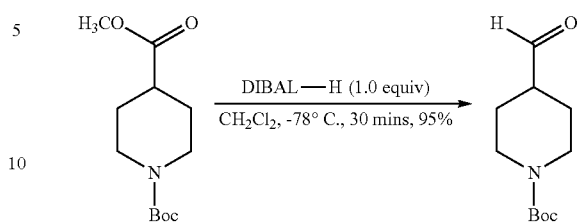

To a stirred solution of 1-(tert-butyl) 4-methyl piperidine-1,4-dicarboxylate (10.5 g, 43.3 mmol) in $CH_2Cl_2$ (200 mL) at −78° C. was added DIBAL-H (43.2 mL, 43.3 mmol) slowly to the reaction mixture and stirred for 30 mins. Reaction was neutralized with saturated solution of sodium potassium tartatrate (50 mL) at same temperature, added $CH_2Cl_2$ (100 mL) and allowed to stir reaction until layer separation at 23° C. Organic layer was separated and aqueous layer was washed with $CH_2Cl_2$ (50 mL×3). The combined organic layers were washed with brine, dried over anhydrous $Na_2SO_4$, concentrated under vacuum, and purified with flash column chromatography to give tert-butyl 4-formylpiperidine-1-carboxylate (8.78 g, 95%) as a colorless oil.

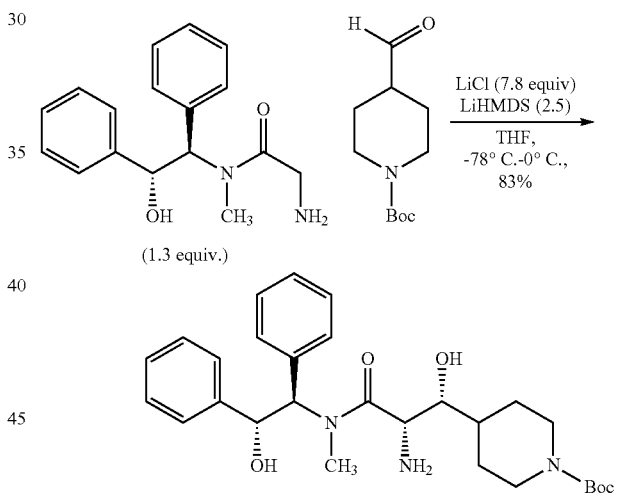

A 100-mL round-bottom flask equipped with a stir bar was charged with anhydrous lithium chloride (1.55 g, 110 mmol, 7.8 equiv). The vessel was heated with a gentle flame under vacuum (0.1 mmHg) for 5 min. After cooling to 23° C. in vacuo, the flask was backfilled with argon and (R,R)-pseudoephenamine glycinamide (1.733 g, 18.29 mmol, 1.3 equiv) was added. Tetrahydrofuran (25 mL) was added by syringe and the reaction mixture was stirred at 23° C. until pseudoephenamine glycinamide had dissolved (~5 min); lithium chloride does not completely dissolve. The resulting suspension was cooled to −78° C. in a dry ice-acetone cooling bath and a freshly prepared solution of lithium hexamethyldisilazide in tetrahydrofuran (1.0 M, 2.5 mL, 2.5 mmol, 2.5 equiv.) was added dropwise. After 5 min, the reaction vessel was transferred to an ice-water bath and stirring was continued for 25 min. The vessel was re-cooled to −78° C., and a solution of tert-butyl 4-formylpiperidine-1-carboxylate (1.0 g 1.0 equiv) in tetrahydrofuran (3 ml) was added dropwise. Once the aldehyde was completely consumed as indicated by TLC (usually ≤1 h), half-saturated aqueous ammonium chloride solution (10 mL) was added and the vessel was allowed to warm to 23° C. The mixture was partitioned between half-saturated aqueous ammonium chloride solution (20 mL) and ethyl acetate (25 mL). The layers were separated, and the aqueous layer was extracted with ethyl acetate (2×25 mL). The combined organic extracts were washed with saturated aqueous sodium chloride solution (20 mL) and the washed solution was dried over sodium sulfate. The dried solution was filtered, and the filtrate was concentrated. The diastereomeric ratio of the crude product was determined by $^1$H NMR or HPLC analysis. The residue was purified by flash column chromatography on silica gel to give tert-butyl 4-((1R,2S)-2-amino-1-hydroxy-3-(((1R,2R)-2-hydroxy-1,2-diphenylethyl)(methyl)amino)-3-oxopropyl)piperidine-1-carboxylate (1.98 g, 85%).

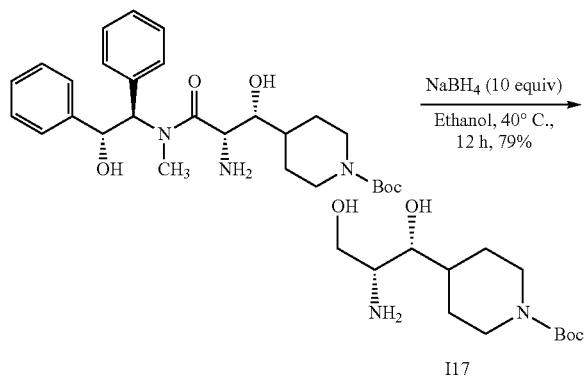

Sodium borohoydride (753 mg, 19.89 mmol, 5 equiv) was added in a single portion to a solution of aldol adduct tert-butyl 4-((1R,2S)-2-amino-1-hydroxy-3-(((1R,2R)-2-hydroxy-1,2-diphenylethyl)(methyl)amino)-3-oxopropyl)piperidine-1-carboxylate (1.98 mg, 3.98 mmol, 1 equiv) in ethanol (40 mL, 200-proof) in a 100-mL round-bottom flask. The reaction vessel was immersed in an oil bath heated to 40° C. Reaction progress was monitored by the consumption of starting material by TLC (10% methanol in dichloromethane+0.5% saturated aqueous ammonium hydroxide solution). After 8 h, the reaction mixture was allowing to cool to 23° C. and saturated aqueous ammonium chloride (~1.5 mL) solution was added carefully until gas evolution ceased. The reaction mixture was concentrated in vacuo and the residue was purified by column chromatography (10→30% methanol-dichloromethane+1% saturated aqueous ammonium hydroxide solution) to provide tert-butyl 4-((1R,2R)-2-amino-1,3-dihydroxypropyl)piperidine-1-carboxylate (117) (857 mg, 79%)

Intermediate Scheme 10.

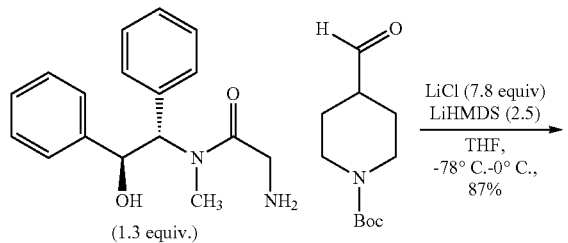

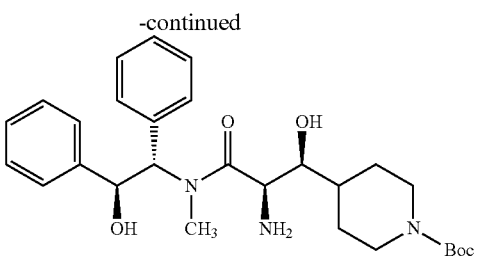

A 100-mL round-bottom flask equipped with a stir bar was charged with anhydrous lithium chloride (1.55 g, 110 mmol, 7.8 equiv). The vessel was heated with a gentle flame under vacuum (0.1 mm Hg) for 5 min. After cooling to 23° C. in vacuo, the flask was backfilled with argon and (S,S)-pseudoephenamine glycinamide (1.733 g, 18.29 mmol, 1.3 equiv) was added. Tetrahydrofuran (25 mL) was added by syringe and the reaction mixture was stirred at 23° C. until pseudoephenamine glycinamide had dissolved (~5 min); lithium chloride does not completely dissolve. The resulting suspension was cooled to −78° C. in a dry ice-acetone cooling bath and a freshly prepared solution of lithium hexamethyldisilazide in tetrahydrofuran (1.0 M, 2.5 mL, 2.5 mmol, 2.5 equiv.) was added dropwise. After 5 min, the reaction vessel was transferred to an ice-water bath and stirring was continued for 25 min. The vessel was re-cooled to −78° C., and a solution of tert-butyl 4-formylpiperidine-1-carboxylate (1.0 g, 1.0 equiv) in tetrahydrofuran (3 ml) was added dropwise. Once the aldehyde was completely consumed as indicated by TLC (usually ≤1 h), half-saturated aqueous ammonium chloride solution (10 mL) was added and the vessel was allowed to warm to 23° C. The mixture was partitioned between half-saturated aqueous ammonium chloride solution (20 mL) and ethyl acetate (25 mL). The layers were separated, and the aqueous layer was extracted with ethyl acetate (2×25 mL). The combined organic extracts were washed with saturated aqueous sodium chloride solution (20 mL) and the washed solution was dried over sodium sulfate. The dried solution was filtered, and the filtrate was concentrated. The diastereomeric ratio of the crude product was determined by 1H NMR or HPLC analysis (vide infra). The residue was purified by flash column chromatography on silica gel to give tert-butyl 4-((1S,2R)-2-amino-1-hydroxy-3-(((1S,2S)-2-hydroxy-1,2-diphenylethyl)(methyl)amino)-3-oxopropyl)piperidine-1-carboxylate (2.03 g, 87%).

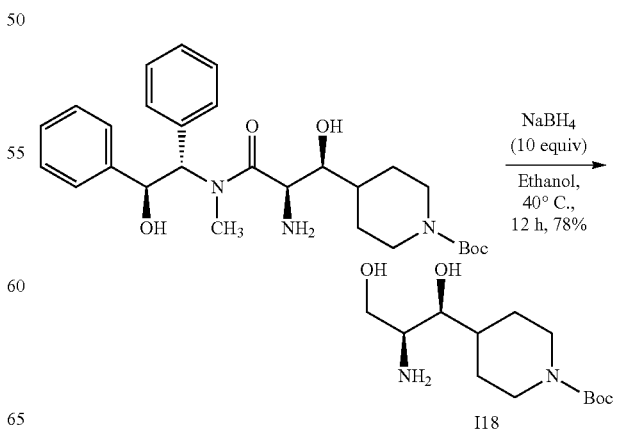

Sodium borohoydride (753 mg, 19.89 mmol, 5 equiv) was added in a single portion to a solution of aldol adduct tert-butyl 4-((1S,2R)-2-amino-1-hydroxy-3-(((1S,2S)-2-hydroxy-1,2-diphenylethyl)(methyl)amino)-3-oxopropyl)piperidine-1-carboxylate (1.98 mg, 3.98 mmol, 1 equiv) in ethanol (40 mL, 200-proof) in a 100-mL round-bottom flask. The reaction vessel was immersed in an oil bath heated to 40° C. Reaction progress was monitored by the consumption of starting material by TLC (10% methanol in dichloromethane+0.5% saturated aqueous ammonium hydroxide solution). After 8 h, the reaction mixture was allowing to cool to 23° C. and saturated aqueous ammonium chloride (~1.5 mL) solution was added carefully until gas evolution ceased. The reaction mixture was concentrated in vacuo and the residue was purified by column chromatography (10→30% methanol-dichloromethane+1% saturated aqueous ammonium hydroxide solution) to provide tert-butyl 4-((1S,2S)-2-amino-1,3-dihydroxypropyl)piperidine-1-carboxylate (I18) (857 mg, 79%).

Intermediate Scheme 11.

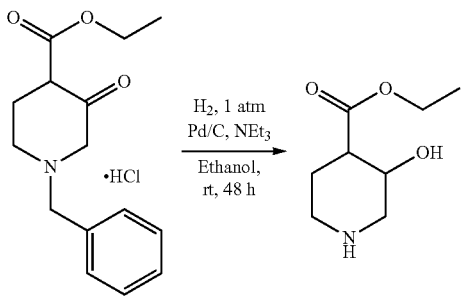

Triethylamine (7.02 mL, 50.4 mmol, 1.5 eq.) was added to a solution of 1-benzyl-4-(ethoxycarbonyl)-3-oxopiperidin-1-ium chloride (10.0 g, 33.6 mmol, 1.0 eq.) and palladium on carbon 10 w % (1.79 g, 1.77 mmol, 5 mol %) in 110 mL of ethanol at room temperature. Once the starting material was completely dissolved the reaction media was purged with nitrogen before flushing with $H_2$. The reaction mixture was kept under stirring at room temperature under 1 atm of $H_2$ until full consumption of the starting material. After 48 h of reaction time LCMS analysis showed full deprotection of the benzyl group as well as full reduction of the ketone. Nitrogen was flushed into the reaction media. The crude mixture was filtrated through a pad of celite and washed several times with ethanol. The solvent was removed under vacuum to afford ethyl 3-hydroxypiperidine-4-carboxylate as a white solid (5.75 g, 99%) which was used as such for next step.

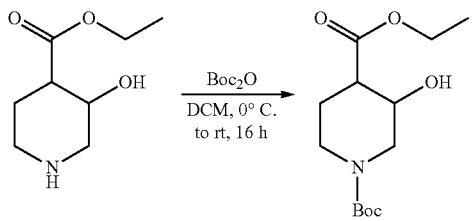 [SMILES: "Boc2O" ; CCOC(=O)C1CCNCC1O ; CCOC(=O)C1CCN(C(=O)OC(C)(C)C)CC1O]

Boc-anhydride (7.83 g, 35.9 mmol, 1.1 eq.) was added portionwise to a stirring solution of ethyl 3-hydroxypiperidine-4-carboxylate (5.65 g, 32.6 mmol, 1.0 eq.) and triethylamine (6.81 mL, 48.9 mmol, 1.5 eq.) in 150 mL of DCM at 0° C. The reaction media was allowed to warm up to room temperature and was kept under stirring overnight. TLC analysis revealed full conversion of starting material after 16 h of stirring. $NaHCO_3$ sat. aq. (100 mL) was added to the reaction media and the organic phase was extracted with DCM (3×50 mL). Organic layers were assembled, dried over $Na_2SO_4$ and finally concentrated under vacuum. 1-(tert-Butyl) 4-ethyl 3-hydroxypiperidine-1,4-dicarboxylate was obtained as a white solid (7.11 g, 80%) after purification over FCC (Hexanes/AcOEt: 100:0 to 70:30).

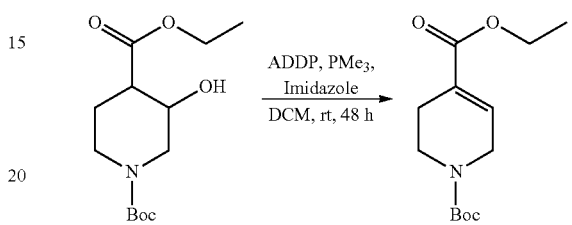

(E)-diazene-1,2-diylbis(piperidin-1-ylmethanone) (6.92 g, 27.4 mmol, 1.5 eq.) and 1H-pyrrole (1.84 g, 27.4 mmol, 1.5 eq.) were added to a solution of 1-(tert-butyl) 4-ethyl 3-hydroxypiperidine-1,4-dicarboxylate (5.0 g, 18.29 mmol, 1.0 eq.) in 280 mL of DCM at room temperature. Trimethylphosphane (36.6 mL, 36.6 mmol, 2.0 eq.) (1M solution in toluene) was then added dropwise and the reaction mixture was allowed to stir for 48 h. At this point TLC showed complete conversion of the starting material and a major product less polar (Rf=0.52 Hexanes/EtOAc 9:1). Hexanes (200 mL) were added to the reaction mixture and the formed precipitate was filtrated. The filtrate was rinsed once with hexanes. 1-(tert-Butyl) 4-ethyl 3,6-dihydropyridine-1,4 (2H)-dicarboxylate was obtained by purification on FCC (Hexanes/AcOEt 100:0 to 70:30) as a yellow oil (3.81 g, 82%).

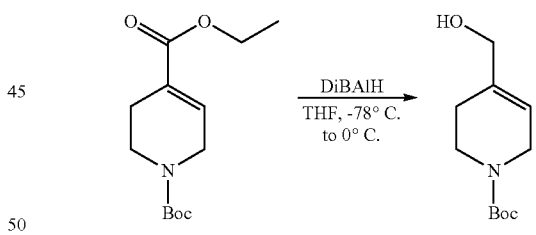

Diisobutylaluminum hydride (47.6 mL, 47.6 mmol, 3.2 eq.) was added dropwise to a stirring solution of 1-(tert-butyl) 4-ethyl 3,6-dihydropyridine-1,4 (2H)-dicarboxylate (3.8 g, 14.88 mmol, 1.0 eq.) in THF (150 mL) at −78° C. under argon atmosphere. The reaction mixture was allowed to stir at −78° C. for 30 min then was allowed to warm up to rt and was kept under stirring for 20 additional minutes. At this point TLC analysis showed full reduction of the ester into the corresponding alcohol (more polar spot, Rf=0.22 in hexane/AcOEt 7:3). 50 mL of $NH_4Cl$ were slowly added to the reaction mixture at 0° C. and stirring was kept for 3 h. The reaction mixture was then filtrated through a pad of celite. The celite cake was washed several times with EtOAc. The aqueous layer was extracted by AcOEt (3×30 mL). Organic layers were combined, washed once with brine (50 mL) and dried over $Na_2SO_4$. Removal of the solvent under reduced pressure afforded tert-butyl 4-(hydroxymethyl)-3,6-dihydropyridine-1 (2H)-carboxylate as a yellow oil (2.77 g, 87%).

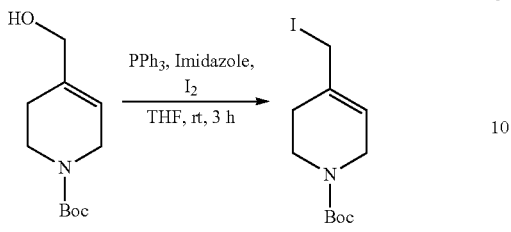

A solution of iodine (3.91 g, 15.42 mmol, 1.2 eq.) in dry THF (10 mL) was transferred via a cannula to a stirring solution of tert-butyl 4-(hydroxymethyl)-3,6-dihydropyridine-1 (2H)-carboxylate (2.74 g, 12.85 mmol, 1.0 eq.), triphenylphosphane (4.04 g, 15.42 mmol, 1.2 eq.) and 1H-imidazole (1.05 g, 15.42 mmol, 1.2 eq.) in dry THF (30 mL) under argon atmosphere at rt and the stirring was kept for 3 h (TLC monitoring). TLC showed full conversion into a major product (Rf=0.64 in Hexanes/AcOEt 7:3 as eluant). The solvent was removed under reduced pressure and the crude mixture was purified by FCC (Hexanes/EtOAc 100:0 to 70:30) to afford tert-butyl 4-(iodomethyl)-3,6-dihydropyridine-1 (2H)-carboxylate as a pale green oil (2.39 g, 58%).

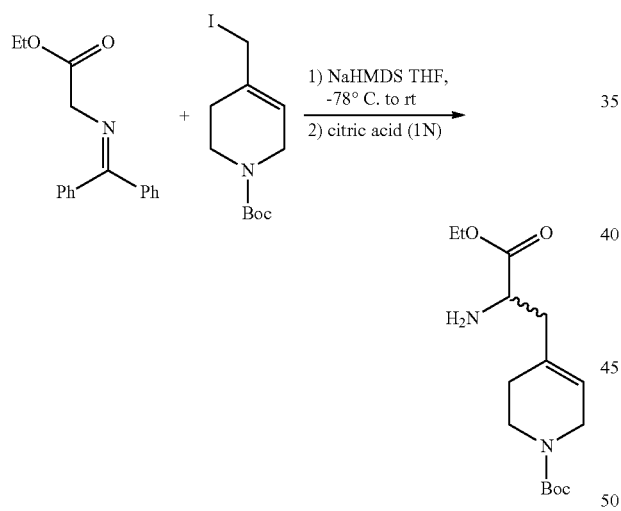

A dry 100 mL round bottom flask (oven heated/argon cooled), was charged with ethyl 2-((diphenylmethylene) amino)acetate (2.34 g, 7.24 mmol, 1.0 eq.). The flask was purged with argon, and 30 mL of dry THF were injected into the air-free system. The resulting solution was cooled to −78° C. with stirring, and NaHMDS (8.69 mL, 8.69 mmol, 1.2 eq.) was added to the solution dropwise. The reaction was stirred at −78° C. for 30 min, and a solution of tert-butyl 4-(iodomethyl)-3,6-dihydropyridine-1 (2H)-carboxylate (2.13 g, 7.96 mmol, 1.1 eq.) in dry THF (20 mL) was injected into the system via a cannula. The solution was stirred at −78° C. for 1 hr, at 0° C. for 1 hr, and at room temp overnight. TLC showed complete consumption of starting materials. The reaction mixture was diluted with AcOEt (50 mL) and then washed with a solution of 0.5 g of citric acid (10 equiv) in water (20 mL) The organic layer was extracted, dried over magnesium sulfate and then concentrated. Crude product was purified by column chromatography (Hexanes/EtOAc 100:0 to 50:50) to give 4-(2-amino-3-ethoxy-3-oxopropyl)-3,6-dihydropyridine-1 (2H)-carboxylate (1.93 g, 89%).

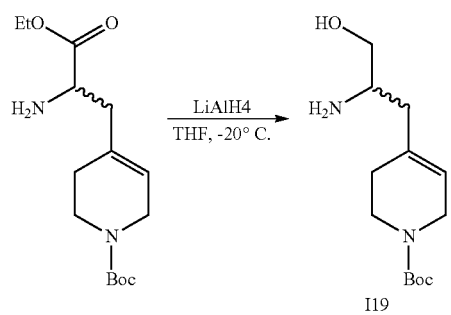

I19

Lithium-aluminum hydride (3.23 mL, 6.46 mmol, 1.0 eq.) was added dropwise to a solution of tert-butyl 4-(2-amino-3-ethoxy-3-oxopropyl)-3,6-dihydropyridine-1 (2H)-carboxylate (1.93 g, 6.46 mmol, 1.0 eq.) in dry THF (80 mL) at −20° C. The reaction mixture was allowed to stir for 4 h at this temperature. After complete consumption of starting material, (TLC monitoring), the reaction mixture was diluted in 40 mL of AcOEt and $Na_2SO_3$ sat aq. (30 mL) was added carefully. The solid formed was removed by filtration, the organic layers were extracted with EtOAc two times (2×20 mL), then washed with brine, dried over $MgSO_4$ and concentrated under vacuum to afford desired amino alcohol which was purified by FCC (DCM/Methanol with 1% $NH_4OH$, 100:0 to 80:20). tert-Butyl 4-(2-amino-3-hydroxypropyl)-3,6-dihydropyridine-1 (2H)-carboxylate (I19) was obtained as a colorless oil (0.69 g, 42% yield).

Intermediate Scheme 12.

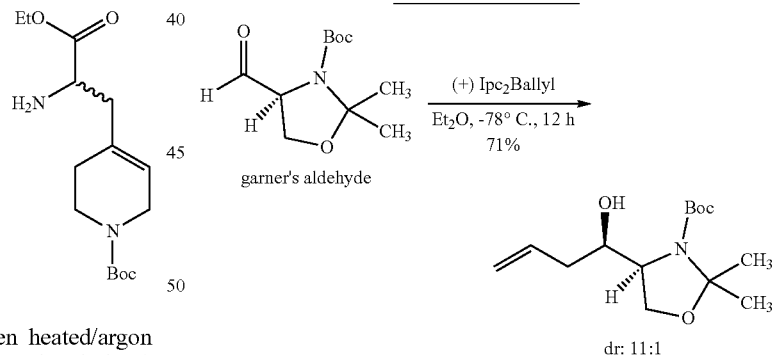

garner's aldehyde dr: 11:1 tert-Butyl (S)-4-formyl-2,2-dimethyloxazolidine-3-carboxylate (commercially available; 2.0 g, 8.72 mmol, 1 eq) was added to a solution of (+) $Ipc_2B$(allyl)borane solution in 1M pentane (8.72 mL, 1 eq) at −78° C. The reaction mixture was stirred for 4 h at −78° C. and it was quenched by the dropwise addition of 10 mL methanol. Triethyl amine (1 mL) and hydrogen peroxide (3 mL) was added successively and the reaction mixture was allowed to room temperature stirred for overnight (12 h). A saturated aqueous solution of sodium thiosulfate (30 mL) was added to the mixture and then it was concentrated in vacuo to leave an opaque residue. The residue was diluted with water (20 mL) and then extracted with ethyl acetate (3×50 mL). The combined organic extracts were dried (MgSO₄) and concentrated in vacuo to leave a light-yellow oil. Purification by flash chromatography gave tert-butyl (S)-4-((R)-1-hydroxybut-3-en-1-yl)-2,2-dimethyloxazolidine-3-carboxylate (1.6 g, 71% yield) as a liquid.

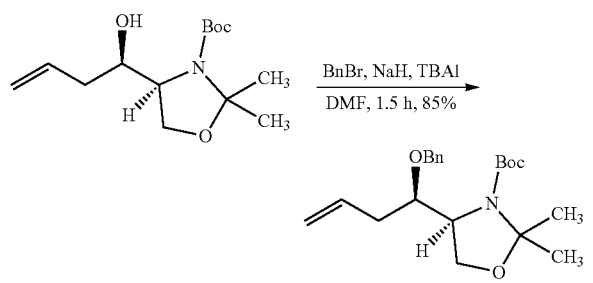

tert-Butyl (S)-4-((R)-1-hydroxybut-3-en-1-yl)-2,2-dimethyloxazolidine-3-carboxylate (1.5 g, 5.53 mmol, 1 eq) was dissolved in dry DMF (20 mL), and the solution was cooled to 0° C. and stirred under N₂. Tetrabutylammonium iodide (3.06 g, 8.29 mmol, 1.5 eq) and benzyl bromide (0.986 mL, 8.29 mmol, 1.5 eq) were added. followed by NaH (60%, 0.398 g, 16.58 mmol, 3 eq) was added in two portions. The reaction mixture was stirred for at 0° C. for 45 minutes and then room temperature for 45 minutes. After complete conversion the reaction on TLC, the reaction mixture was quenched with aqueous ammonium chloride, and the reaction mixture was extracted with diethylether (4×40 mL). The combined organic extracts were dried under Na₂SO₄ and concentrated in vacuo to leave a light-yellow oil. Purification by flash chromatography to give tert-butyl (S)-4-((R)-1-(benzyloxy)but-3-en-1-yl)-2,2-dimethyloxazolidine-3-carboxylate (1.69 g, 85%) as a liquid.

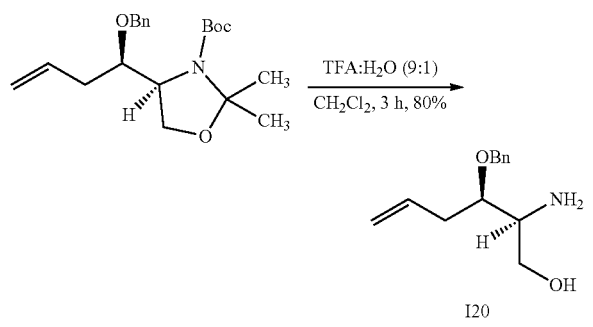

tert-Butyl (S)-4-((R)-1-(benzyloxy)but-3-en-1-yl)-2,2-dimethyloxazolidine-3-carboxylate (1.0 g, 2.77 mmol, 1 eq) was dissolved in dichloromethane (20 mL). A mixture of TFA (138 mmol, 50 eq) and water (9:1, 12 mL) was added. The reaction mixture was stirred at room temperature for 3 hours until TLC analysis showed consumption of the starting material. Afterwards all volatiles were removed at the rotary evaporator and the residue was dissolved in 3 M NaOH-solution and the pH was adjusted to pH=13. The mixture was extracted with CHCl₃:ⁱPrOH (9:1, 10×50 mL). Combined organic extracts were dried over MgSO₄, filtered and concentrated in vacuo to yield as a light-yellow oil. Purified through column chromatography in MeOH and CH₂Cl₂ solvent system (TLC 10% MeOH:CH₂Cl₂) to give (2S,3R)-2-amino-3-(benzyloxy)hex-5-en-1-ol (I20) (0.490 g, 80%).

Intermediate Scheme 13.

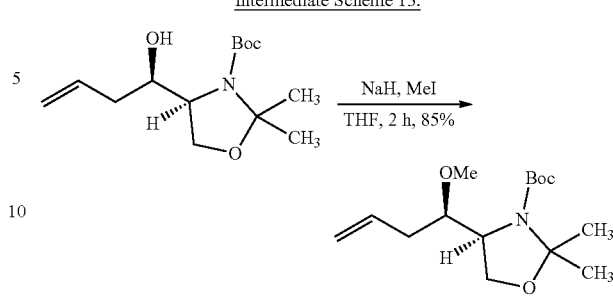

tert-Butyl (S)-4-((R)-1-methoxybut-3-en-1-yl)-2,2-dimethyloxazolidine-3-carboxylate (1.5 g, 5.53 mmol, 1 eq) was dissolved in dry THF (20 mL), and the solution was cooled to 0° C. and stirred under N₂. Methyliodide (1.17 g, 8.29 mmol, 1.5 eq) was added. followed by NaH (60%, 0.398 g, 16.58 mmol, 3 eq) was added in two portions. The reaction mixture was stirred for at 0° C. for 30 minutes and then room temperature for 90 minutes. After complete conversion the reaction on TLC, the reaction mixture was quenched with aqueous ammonium chloride, and the reaction mixture was extracted with diethyl ether (4×40 mL). The combined organic extracts were dried under Na₂SO₄ and concentrated in vacuo to leave a light-yellow oil. Purification by flash chromatography to give alcohol in 1.42 g, 90% as a liquid.

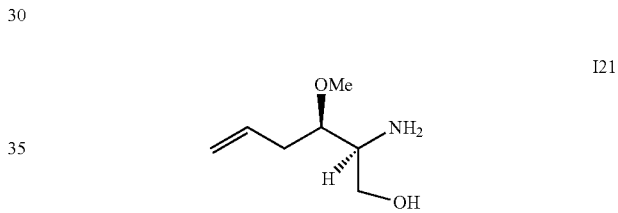

(2S,3R)-2-amino-3-methoxyhex-5-en-1-ol was prepared in an analogous manner to the procedure used to prepare (2S,3R)-2-amino-3-(benzyloxy)hex-5-en-1-ol (I21).

Intermediate Scheme 14.

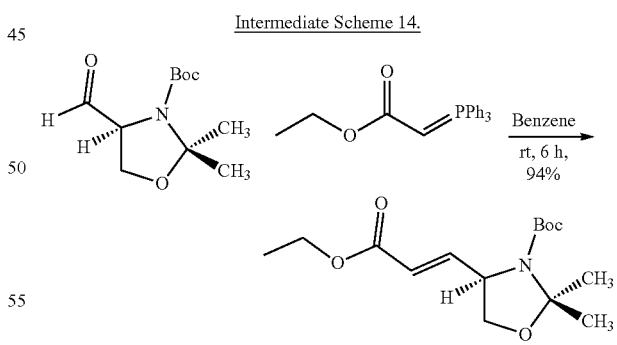

To a stirred solution of tert-butyl (S)-4-formyl-2,2-dimethyloxazolidine-3-carboxylate (1.5 g, 6.54 mmol) in dry benzene (150 mL) at 23° C., ethyl 2-(triphenyl-15-phosphaneylidene)acetate (C-2 Wittig ylide) (2.74 g, 7.85 mmol) was added to the reaction mixture and stirred for 7 h. The reaction was monitored by TLC, after completion of reaction precipitate was filtered over vacuum. The organic layer was concentrated under vacuum and purified by flash column chromatography to give tert-butyl (R,E)-4-(3-ethoxy-3-oxoprop-1-en-1-yl)-2,2-dimethyloxazolidine-3-carboxylate (1.84 g, 94%) as a colorless oil.

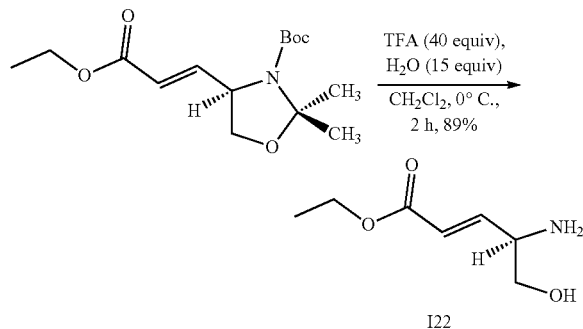

To a stirred solution of tert-butyl (R,E)-4-(3-ethoxy-3-oxoprop-1-en-1-yl)-2,2-dimethyloxazolidine-3-carboxylate (1.84 g, 5.23 mmol) in dry CH$_2$Cl$_2$ (30 mL) at 23° C., 2,2,2 trifluoro acetic acid (24.6 mL, 314 mmol) and H$_2$O (2.6 mL, 137 mmol) were added to the reaction mixture and stirred for 7 h. After completion of the reaction it was quenched with continuous addition of solid Na$_2$CO$_3$ (pH 11), then 15 mL water was added to the reaction mixture. The organic layer was separated and the aqueous layer was washed with CH$_2$Cl$_2$ (3×50 mL). The combined organic layers were washed with brine and the organic layer was dried over anhydrous Na$_2$SO$_4$, concentrated under vacuum, and purified by flash column chromatography to give ethyl (R,E)-4-amino-5-hydroxypent-2-enoate (122) (870 mg, 89%) as a colorless liquid.

Intermediate Scheme 15.

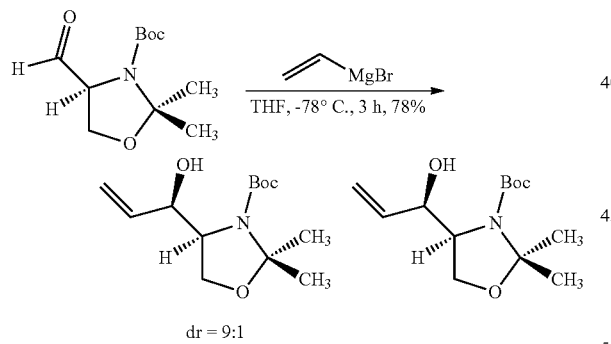

To a solution of tert-butyl (S)-4-formyl-2,2-dimethyloxazolidine-3-carboxylate (1.8 g, 7.85 mmol) in dry THF under argon at −78° C. was added vinylmagnesium bromide (1M solution in THF, 11.78 mL, 11.78 mmol) dropwise over a period of 30 min. The reaction mixture was stirred for 2 h at the same temperature and then allowed to warm to room temperature. After completion of the reaction, reaction mixture was quenched with aqueous NH$_4$Cl solution and extracted with ethyl acetate (2×50 mL). The combined organic layers were dried over anhydrous Na$_2$SO$_4$. The solvent was removed on a rotary evaporator and the residue was purified by silica gel chromatography using ethyl acetate/hexane as eluent to give a mixture of both isomers as a colorless oil. Purified by flash chromatography on silica gel to afford desired tert-butyl (S)-4-((R)-1-hydroxyallyl)-2,2-dimethyloxazolidine-3-carboxylate (1.57 mg, 78%).

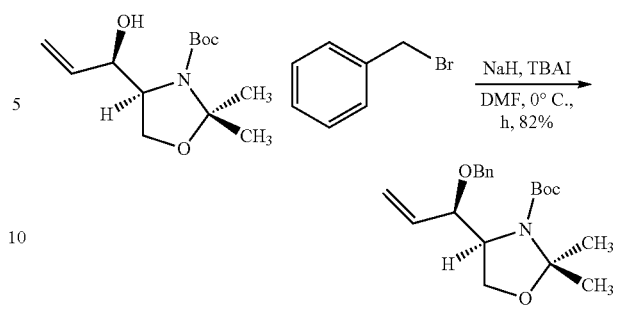

To a stirred solution of sodium hydride (0.439 g, 18.30 mmol) and tetrabutylammonium iodide (3.38 g, 9.15 mmol) in dry DMF (35 mL), then tert-butyl (S)-4-((R)-1-hydroxyallyl)-2,2-dimethyloxazolidine-3-carboxylate (1.57 g, 6.10 mmol) was added to the reaction mixture diluting with dry DMF under argon atmosphere. After 10 min benzyl bromide (1.089 mL, 9.15 mmol) was added dropwise via syringe. The reaction mixture was stirred for 2 h. After completion of the reaction, it was quenched with aqueous NH$_4$Cl solution stirred for 10 mins. Organic layer was separated and aqueous layer was extracted with ethyl acetate (2×50 mL). The combined organic layers were dried over anhydrous Na$_2$SO$_4$. The solvent was removed on a rotary evaporator and the residue was purified by silica gel chromatography using ethyl acetate/hexane as eluent to give a mixture of both the isomer as a colorless oil. Purified by flash chromatography on silica gel to afford tert-butyl (S)-4-((R)-1-(benzyloxy)allyl)-2,2-dimethyloxazolidine-3-carboxylate as a colorless liquid (1.728 mg, 82%).

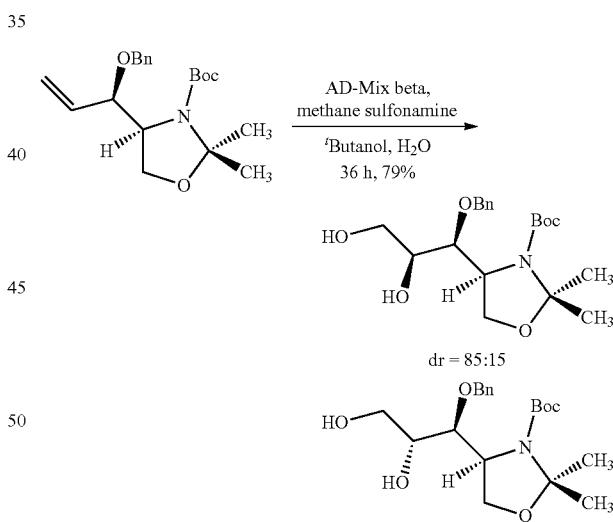

To a stirred suspension of AD-mix-beta (7.5 g, 4.89 mmol)(1.4 g/mmol) in t-BuOH:H2O (1:1, 40 mL) at 0° C. was added MeSO$_2$NH$_2$ (0.465 g, 4.89 mmol) in one portion. After stirring at 0° C. for 2 h, to properly cool the reaction mixture down, the tert-butyl (S)-4-((R)-1-(benzyloxy)allyl)-2,2-dimethyloxazolidine-3-carboxylate (1.7 g, 4.89 mmol) was added. Stirring was continued at 0° C. for 48 h whereupon the reaction was quenched by adding saturated Na$_2$SO$_3$ (50 mL) and the resultant mixture was stirred for 1 h at room temperature. The mixture was then diluted with EtOAc (100 mL). The organic layer was separated and the aqueous phase was further extracted with EtOAc (300 mL). The combined organic layers were washed with brine (300 mL), dried over Na₂SO₄, filtered and concentrated in vacuum. The crude residue was then purified by flash chromatography on silica gel (hexane:EtOAc=4:1) to afford tert-butyl (S)-4-((1S,2S)-1-(benzyloxy)-2,3-dihydroxypropyl)-2,2-dimethyloxazolidine-3-carboxylate (1.476 g, 79%).

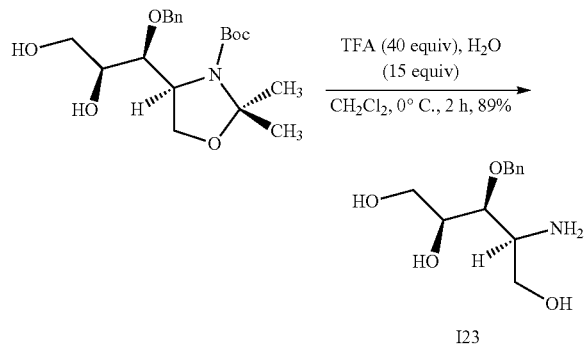

To a stirred solution of tert-butyl (R,E)-4-(3-ethoxy-3-oxoprop-1-en-1-yl)-2,2-dimethyloxazolidine-3-carboxylate (1.84 g, 5.23 mmol) in dry CH₂Cl₂ (30 mL) at 23° C., 2,2,2 trifluoroacetic acid (24.6 mL, 314 mmol) and H₂O (2.6 mL, 137 mmol) were added to the reaction mixture and stirred for 7 h. After completion of reaction it was quenched with continuous addition of solid Na₂CO₃ (pH 11) then 15 mL water was added to the reaction mixture. Organic layer was separated and aqueous layer was washed with CH₂Cl₂ (3×50 mL). The combined organic layers were washed with brine, dried over anhydrous Na₂SO₄, concentrated under vacuum, purified by flash column chromatography to give ethyl (R,E)-4-amino-5-hydroxypent-2-enoate (I23) (870 mg, 89%) as a colorless liquid.

Intermediate Scheme 16.

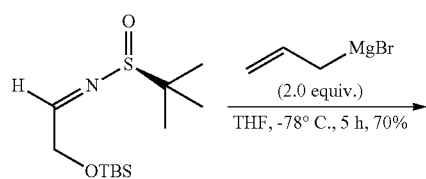

To a stirred solution of (S)—N-(2-((tert-butyldimethylsilyl)oxy)ethylidene)-2-methylpropane-2-sulfinamide (2.5 g, 9.01 mmol) in 20 ml of THF, was added allylmagnesium bromide (18.02 ml as 1 molar solution, 18.02 mmol) dropwise to the reaction mixture at −78° C., which was then stirred for another 5 h. After completion of reaction it was neutralized with saturated solution of NH₄Cl (10 ml) and 10 ml of cold water followed by 30 ml EtOAc. The organic layer was separated, and aqueous layer was washed EtOAc (50 mL×3). Combined organic layers were washed with brine, dried over anhydrous Na₂SO₄, concentrated, and purified by flash column chromatography to give (S)—N—((R)-1-((tert-butyldimethylsilyl)oxy)pent-4-en-2-yl)-2-methylpropane-2-sulfinamide (1.8 g, 61%) as a thick liquid.

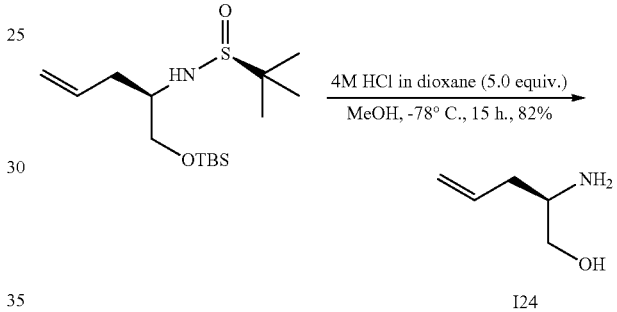

To a stirred solution of (S)—N—((R)-1-((tert-butyldimethylsilyl)oxy)pent-4-en-2-yl)-2-methylpropane-2-sulfinamide (1.8 g, 5.63 mmol) in methanol at 0° C., was added HCl in dioxane (7.4 ml. 4M. 28.4 mmol), and the reaction mixture stirred for 15 h at 23° C. Methanol was removed under vacuum and the reaction mixture was diluted with CH₂Cl₂ (15 ml) then neutralized with a saturated solution of NaHCO₃. The organic layer was separated and the aqueous layer was washed with CH₂Cl₂ (20 ml×3). The combined organic layers were washed with brine, dried over anhydrous Na₂SO₄, concentrated, and purified by flash column chromatography to provide (R)-2-aminopent-4-en-1-ol (0.75 g, 82%) as a thick liquid.

Scheme 1.

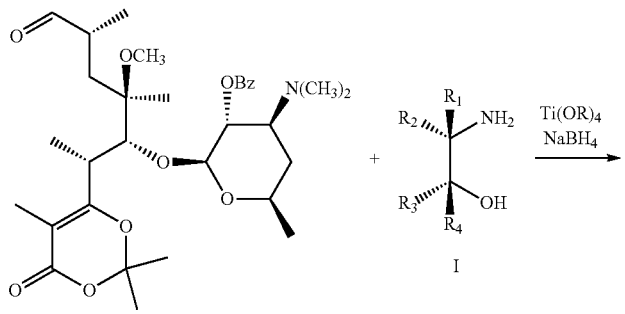

S1-1

-continued
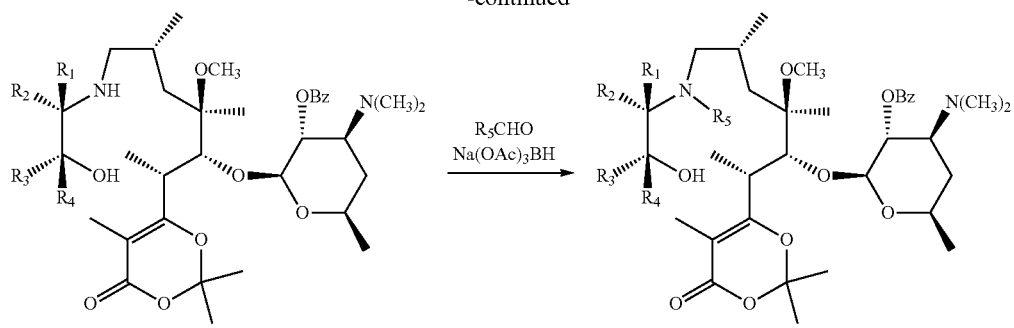
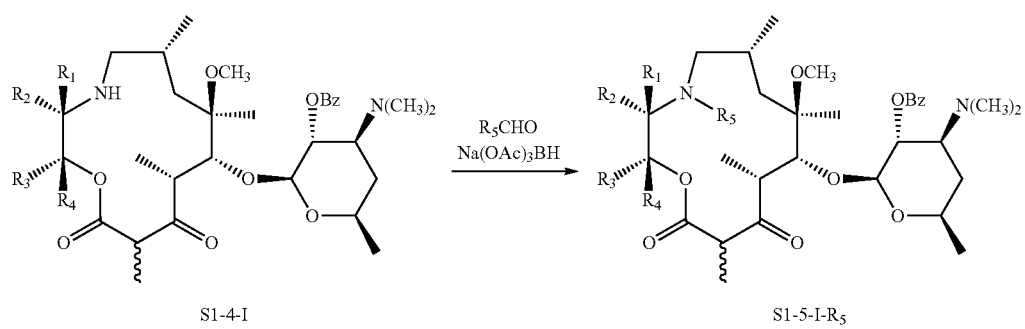
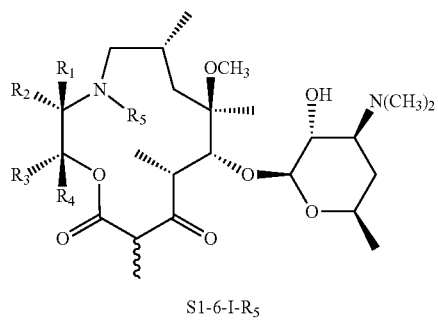
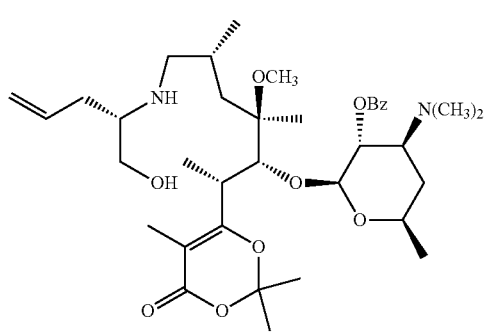
S1-2-I1

(2S,3R,4S,6R)-4-(Dimethylamino)-2-(((2R,3R,4R, 6R)-7-(((S)-1-hydroxypent-4-en-2-yl)amino)-4-methoxy-4,6-dimethyl-2-(2,2,5-trimethyl-4-oxo-4H-1,3-dioxin-6-yl)heptan-3-yl)oxy)-6-methyltetrahydro-2H-pyran-3-yl benzoate (S1-2-I1)

(S)-2-aminopent-4-en-1-ol (343 mg, 3.40 mmol) and S1-1 (1.34 g, 2.27 mmol) were dissolved in EtOH (11.3 mL), and Ti(OEt)$_4$ (0.946 mL, 4.54 mmol) was added. After 30 min, a small aliquot was removed from the reaction mixture and was added to a suspension of a small amount of NaBH$_4$ in MeOH. LC/MS analysis showed approximately 90% conversion. Additional (S)-2-aminopent-4-en-1-ol (200 mg, 1.97 mmol) was added. After 30 min, a small aliquot was removed from the reaction mixture and was added to a suspension of a small amount of NaBH$_4$ in MeOH. LC/MS analysis showed complete conversion. NaBH$_4$ (171 mg, 4.54 mmol) was added. When gas evolution ceased, 30% aqueous NH$_4$OH (6 mL) was added, and the mixture was filtered through a pad of Celite®, washing with EtOAc. The filtrate was washed with brine, was dried over Na$_2$SO$_4$, was filtered, and was concentrated. The material was used without further purification. MS (ESI+) m/z: 675.25 [M+H]$^+$.

S1-3-I1-1

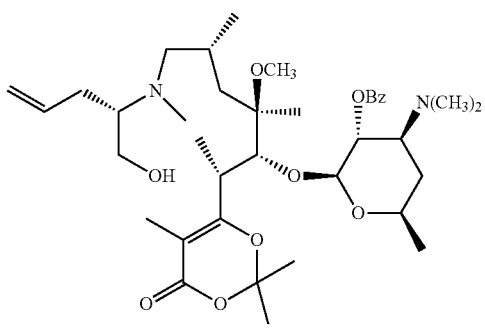

(2S,3R,4S,6R)-4-(Dimethylamino)-2-(((2R,3R,4R, 6R)-7-(((S)-1-hydroxypent-4-en-2-yl)(methyl)amino)-4-methoxy-4,6-dimethyl-2-(2,2,5-trimethyl-4-oxo-4H-1,3-dioxin-6-yl)heptan-3-yl)oxy)-6-methyltetrahydro-2H-pyran-3-yl benzoate (S1-3-I1-1)

S1-2-I1 (1.53 g, 2.26 mmol) was dissolved in dichloromethane (10 mL) and Na(OAc)$_3$BH (957 mg; 4.52 mmol) was added. Formaldehyde (37 wt % solution in water, 1.82 mL, 22.5 mmol) was added. After 15 min., additional Na(OAc)$_3$BH (475 mg; 2.24 mmol) and formaldehyde (37 wt % solution in water, 0.30 mL, 3.7 mmol) were added. After 20 min., the reaction mixture was quenched by the addition of NaHCO$_3$ (sat., aq. solution) The layers were separated, and the aqueous layer was extracted with dichloromethane (3 times). The combined dichloromethane extracts were dried over Na$_2$SO$_4$, were filtered, and were concentrated. The material was purified on 40 g of silica gel (elution with 2-10% MeOH-dichloromethane gradient containing 0.5% aqueous NH$_4$OH) to give the title compound (1.20 g, 76%, 2 steps) as a thick oil. MS (ESI+) m/z: 689.26 [M+H]$^+$. $^1$H NMR (400 MHz, Chloroform-d) δ 8.04 (dt, 2H), 7.61-7.51 (m, 1H), 7.44 (t, 2H), 5.82-5.66 (m, 1H), 5.16-4.95 (m, 3H), 4.70 (d, 1H), 3.87 (d, 1H), 3.55 (dq, 1H), 3.47 (dd, 1H), 3.33-3.18 (m, 2H), 3.06 (s, 3H), 2.88 (td, 1H), 2.81-2.66 (m, 1H), 2.49 (dd, 1H), 2.38-2.23 (m, 7H), 2.16 (s, 3H), 2.10 (dd, 1H), 1.92-1.75 (m, 5H), 1.73 (s, 3H), 1.68 (s, 3H), 1.64-1.55 (m, 1H), 1.55-1.42 (m, 1H), 1.38 (dd, 1H), 1.34-1.18 (m, 7H), 0.95 (d, 3H), 0.83 (d, 3H).

S1-5-I1-1

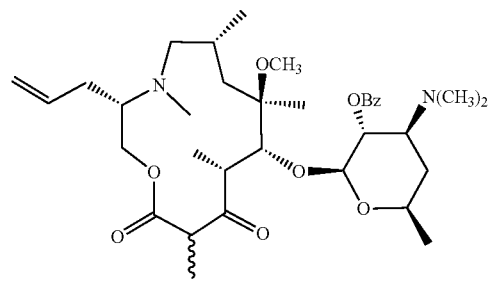

(2S,3R,4S,6R)-2-(((3S,6R,8R,9R,10R)-3-Allyl-8-methoxy-4,6,8,10,12-pentamethyl-11,13-dioxo-1-oxa-4-azacyclotridecan-9-yl)oxy)-4-(dimethylamino)-6-methyltetrahydro-2H-pyran-3-yl benzoate (S1-5-I1-1)

S1-3-I1-1 (1.19 g, 1.72 mmol) was concentrated three times from toluene. The material was dissolved in chlorobenzene (357 mL), and a stream of nitrogen was bubbled through the solution for 10 min. The mixture was heated at a bath temperature of 145° C. (approximately 130-135° C. internal temperature) overnight. The reaction was allowed to cool to rt and was concentrated. The residue was purified on 40 g of silica gel (elution with 2-10% MeOH-dichloromethane gradient containing 0.5% aqueous NH$_4$OH) to give the title compound as an off-white solid (835 mg, 77%). Mixture of C$_2$ epimers. MS (ESI+) m/z: 631.23 [M+H]$^+$.

Scheme 2.

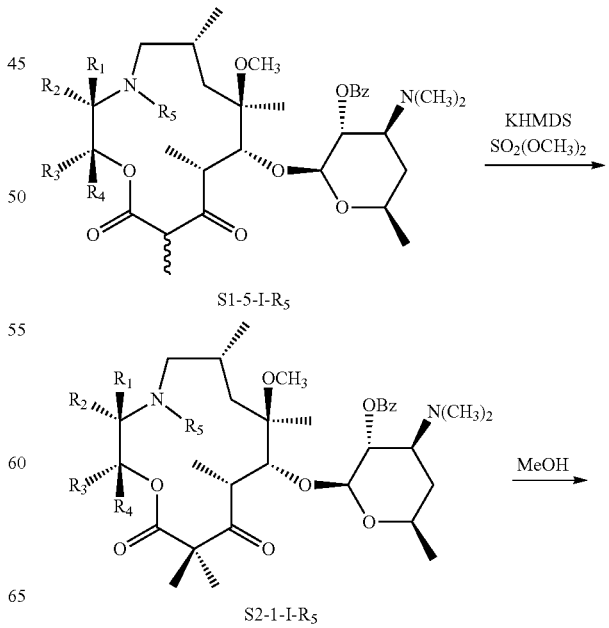

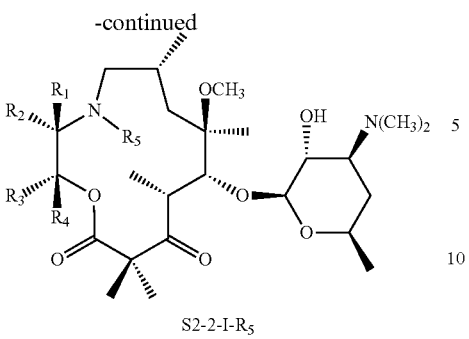

S2-2-I-R5

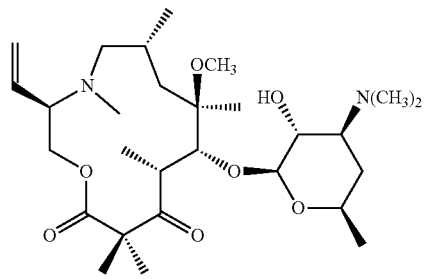

S2-2-I3-1

(3R,6R,8R,9R,10R)-9-(((2S,3R,4S,6R)-4-(Dimethyl-amino)-3-hydroxy-6-methyltetrahydro-2H-pyran-2-yl)oxy)-8-methoxy-4,6,8,10,12,12-hexamethyl-3-vinyl-1-oxa-4-azacyclotridecane-11,13-dione (S2-2-I3-1) (Compound 14)

S2-1-I3-1 (18 mg, 0.029 mmol, prepared according to the methods of S2-1-I1-1) was dissolved in MeOH (2 mL), and the reaction mixture was heated to 65° C. (external temp.) for 3 h. The reaction mixture was cooled to rt and was concentrated under reduced pressure. The material was purified by HPLC (Atlantis T3 column, 5-30% MeCN-water-0.1% HCO$_2$H) to give 6.35 mg of the title compound (6.35 mg) as a formate salt. MS (ESI+) m/z: 176.1 [M+3H]$^{3+}$, 263.7 [M+2H]$^{2+}$, 526.4 [M+H]$^+$; $^1$H NMR (400 MHz, Methanol-d$_4$) δ 8.54 (s, 2H), 5.97 (dt, 1H), 5.68 (s, 2H), 4.46 (d, 1H), 4.29-4.17 (m, 2H), 3.72 (dtt, 1H), 3.48-3.37 (m, 2H), 3.31 (tq, 2H), 3.06 (s, 3H), 2.95 (d, 1H), 2.82 (s, 1H), 2.75 (s, 6H), 2.00 (ddd, 1H), 1.53-1.25 (m, 16H), 1.05 (d, 3H).

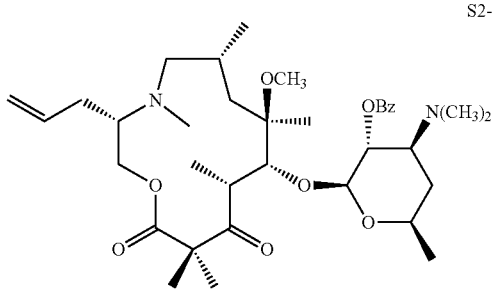

S2-1-I1-1

(2S,3R,4S,6R)-2-(((3S,6R,8R,9R,10R)-3-Allyl-8-methoxy-4,6,8,10,12,12-hexamethyl-11,13-dioxo-1-oxa-4-azacyclotridecan-9-yl)oxy)-4-(dimethyl-amino)-6-methyltetrahydro-2H-pyran-3-yl benzoate (S2-1-I1-1)

S1-5-I1-1 (834 mg, 1.32 mmol) was dissolved in 1,2-dimethoxyethane (6.6 mL), and the reaction mixture was cooled to −42° C. in a dry ice/acetonitrile bath. Potassium bis(trimethylsilyl)amide (1.0 M solution in THF; 1.71 mL, 1.71 mmol) was added. After 15 min, dimethyl sulfate (0.249 mL, 2.64 mmol) was added, and the bath was replaced with an ice/water batch. After 30 min., triethylamine (1.83 mL, 13.2 mmol) was added, and the reaction mixture was stirred at rt. After 20 min., the reaction was quenched by the addition of NH$_4$Cl (sat., aq. solution) and was extracted with dichloromethane (3 times). The combined extracts were over Na$_2$SO$_4$, were filtered, and were concentrated. The residue was purified on 40 g of silica gel (elution with 2-10% MeOH-dichloromethane-0.5% NH$_4$OH gradient) to give the title compound (551 mg, 64%) as a white solid. MS (ESI+) m/z: 645.24 [M+H]$^+$. $^1$H NMR (400 MHz, Chloroform-d) δ 8.11-7.92 (m, 2H), 7.61-7.48 (m, 1H), 7.43 (t, 2H), 5.78 (dddd, 1H), 5.15-4.90 (m, 3H), 4.57 (d, 1H), 4.16 (dd, 1H), 4.01 (d, 1H), 3.96-3.80 (m, 1H), 3.58 (dtd, 1H), 3.41 (ddd, 1H), 3.08 (td, 1H), 2.99-2.86 (m, 1H), 2.81 (s, 3H), 2.36-2.22 (m, 7H), 2.19 (s, 3H), 2.01 (t, 2H), 1.75 (m, 7.1 Hz, 5H), 1.46-1.33 (m, 4H), 1.33-1.15 (m, 9H), 1.06-0.95 (d, 3H), 0.88 (d, 3H).

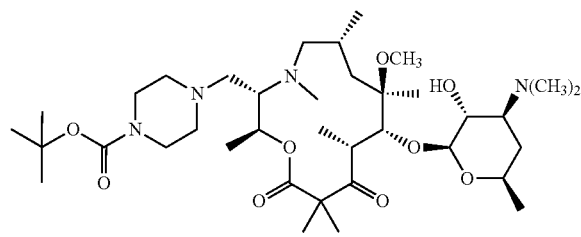

S2-2-I5-1 tert-Butyl 4-(((2S,3S,6R,8R,9R,10R)-9-(((2S,3R,4S,6R)-4-(dimethylamino)-3-hydroxy-6-methyltetra-hydro-2H-pyran-2-yl)oxy)-8-methoxy-2,4,6,8,10,12,12-heptamethyl-11,13-dioxo-1-oxa-4-azacyclotridecan-3-yl)methyl)piperazine-1-carboxylate (S2-2-I5-1) (Compound 106)

Prepared according to the methods of S2-1-I1-1 and S2-2-I3-1 from I5 to provide the title compound as a formate salt. MS (ESI+) m/z: 713.6 [M+H]$^+$; $^1$H NMR (400 MHz, Methanol-d) δ 8.34 (s, 3H), 5.43 (dd, 1H), 4.49 (d, 1H), 4.10 (d, 1H), 3.87 (ddd, 1H), 3.73 (ddd, 1H), 3.55-3.37 (m, 7H), 3.17 (s, 3H), 3.11-3.03 (m, 1H), 3.02 (s, 3H), 2.96-2.85 (m, 2H), 2.82 (s, 6H), 2.62-2.52 (m, 3H), 2.52-2.40 (m, 2H), 2.26 (d, 1H), 2.08-1.97 (m, 1H), 1.82 (d, 1H), 1.57-1.48 (m, 4H), 1.44 (s, 9H), 1.38 (d, 4H), 1.37-1.33 (m, 9H), 1.31 (d, 3H), 1.06 (d, 3H).

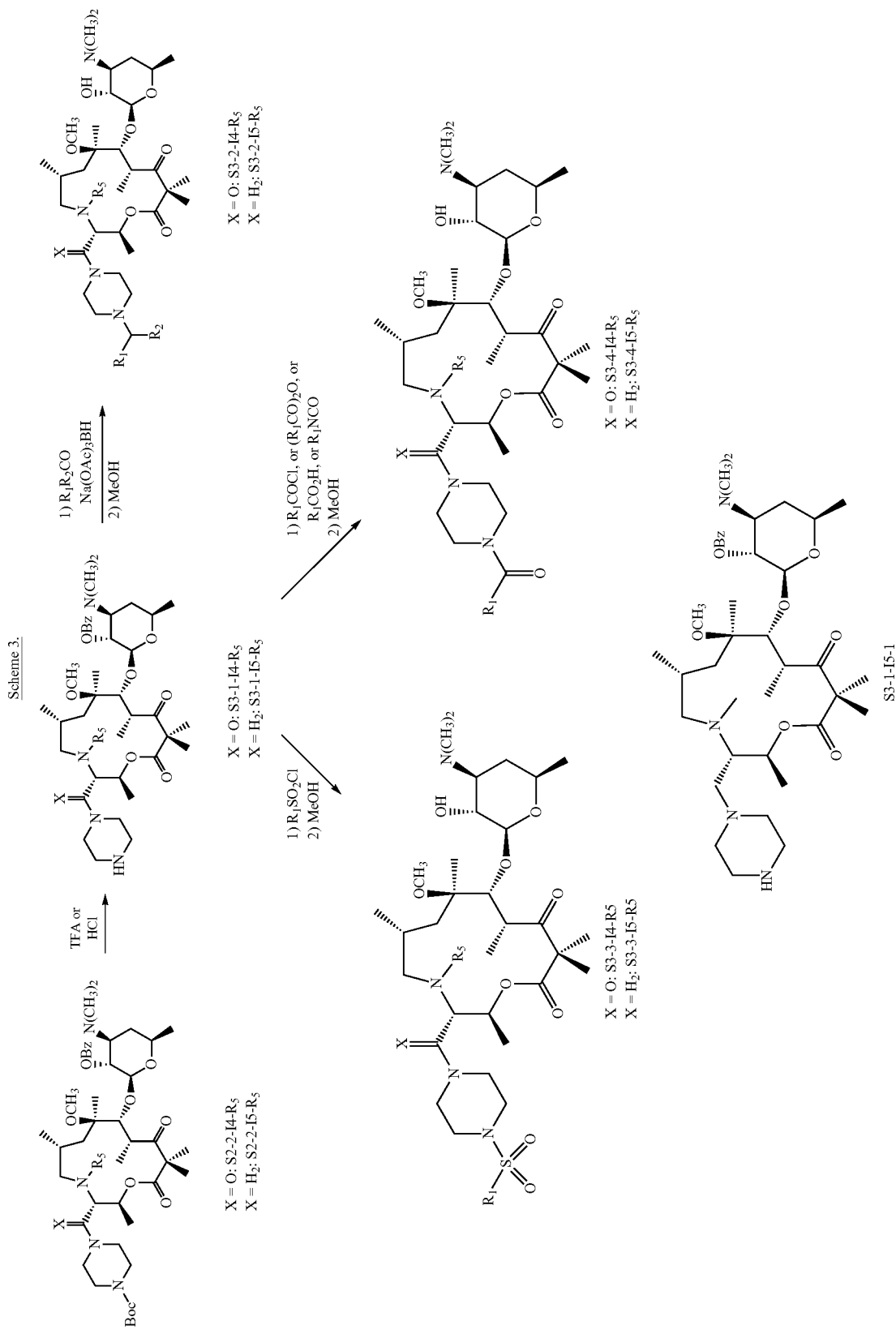

(2S,3R,4S,6R)-4-(dimethylamino)-2-(((2S,3S,6R, 8R,9R,10R)-8-methoxy-2,4,6,8,10,12,12-heptam-ethyl-11,13-dioxo-3-(piperazin-1-ylmethyl)-1-oxa-4-azacyclotridecan-9-yl)oxy)-6-methyltetrahydro-2H-pyran-3-yl benzoate (S3-1-I5-1)

S2-2-I5-1 (430 mg, 0.526 mmol) was dissolved in dichloromethane (4.4 mL) and was cooled in an ice/water bath. Trifluoroacetic acid (0.5 mL, 6.52 mmol) was added, the ice/water bath was removed, and the reaction mixture was stirred at rt for 5.5 h. The reaction mixture was concentrated to a yellowish gum, was slowly treated with NaHCO$_3$ (sat., aq., 10 mL), and was extracted with EtOAc (9 mL×4). The combined extracts were dried over Na$_2$SO$_4$, were filtered, and were concentrated to give the crude title compound as a white solid. MS (ESI+) m/z: 717.13 [M+H]$^+$.

(external temp.) overnight. The reaction mixture was cooled to rt and was concentrated under reduced pressure. The material was purified by HPLC (Atlantis T3 column, 5-30% MeCN-water-0.1% HCO$_2$H) to give 1.83 mg of the title compound as a formate salt. MS (ESI+) m/z: 627.42 [M+H]$^+$; $^1$H NMR (400 MHz, Methanol-d) δ 8.29 (s, 4H), 5.27 (s, 1H), 4.46 (d, 1H), 4.30 (s, 1H), 4.14-3.87 (m, 4H), 3.81-3.63 (m, 2H), 3.62-3.50 (m, 2H), 3.46-3.35 (m, 2H), 3.31-3.12 (m, 3H), 2.92 (s, 3H), 2.74 (d, 10H), 2.35 (d, 1H), 2.08-1.84 (m, 2H), 1.62 (dd, 1H), 1.55-1.23 (m, 18H), 1.19 (d, 3H), 0.89 (d, 3H).

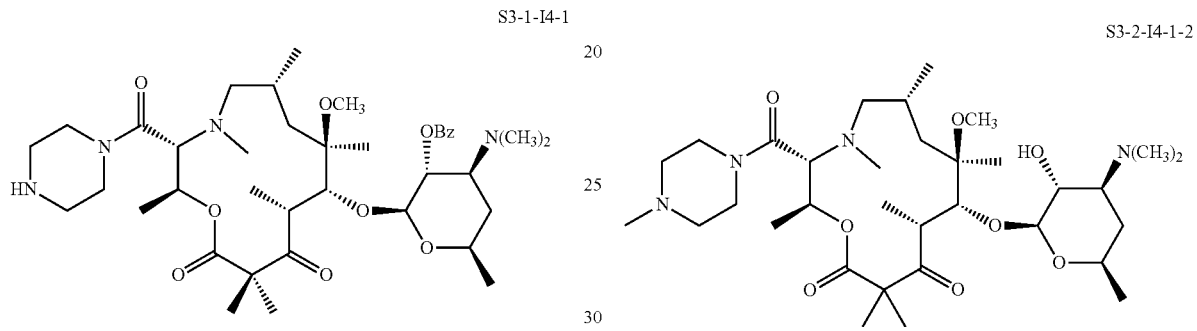

(2S,3R,4S,6R)-4-(dimethylamino)-2-(((2S,3R,6R, 8R,9R,10R)-8-methoxy-2,4,6,8,10,12,12-heptam-ethyl-11,13-dioxo-3-(piperazine-1-carbonyl)-1-oxa-4-azacyclotridecan-9-yl)oxy)-6-methyltetrahydro-2H-pyran-3-yl benzoate (S3-1-I4-1)

Prepared according to the methods of S3-1-I5-1, substituting S2-2-I4-1. This gave the title compound as a white solid, which was used without further purification. MS (ESI+) m/z: 731.04 [M+H]$^+$.

(2S,3R,6R,8R,9R,10R)-9-(((2S,3R,4S,6R)-4-(dimethylamino)-3-hydroxy-6-methyltetrahydro-2H-pyran-2-yl)oxy)-8-methoxy-2,4,6,8,10,12,12-heptamethyl-3-(4-methylpiperazine-1-carbonyl)-1-oxa-4-azacyclotridecane-11,13-dione (S3-2-I4-1-2)

(Compound 97)

S3-1-I4-1 (36.4 mg, 0.0497 mmol) was dissolved in dichloromethane (0.5 mL), and Na(OAc)$_3$BH (20 mg, 0.094 mmol) followed by formaldehyde (37 wt % aqueous solution, 20.1 mg, 0.248 mmol) were added. After 14 h, the reaction mixture was quenched with NaHCO$_3$ (sat., aq. solution) and was extracted with EtOAc (3 times). The combined extracts were dried over Na$_2$SO$_4$, were filtered, and were concentrated. The crude material was dissolved in methanol (1 mL), and the reaction mixture was heated to 40° C. external temperature overnight. The reaction was allowed to cool to rt and was concentrated. The residue was purified by HPLC (Atlantis T3 column, 5-50% MeCN-water-0.1% HCO$_2$H) to give 9.45 mg of the title compound as a formate salt. MS (ESI+) m/z: 641.36 [M+H]$^+$; $^1$H NMR (400 MHz, Methanol-d) δ 8.33 (s, 3H), 5.30 (s, 1H), 4.48 (d, 1H), 4.31 (s, 1H), 4.03 (d, 1H), 3.94-3.80 (m, 2H), 3.80-3.68 (m, 2H), 3.67-3.54 (m, 2H), 3.49-3.36 (m, 2H), 2.95 (s, 3H), 2.82 (s, 6H), 2.76-2.65 (m, 6H), 2.65-2.52 (m, 2H), 2.44 (s, 3H), 2.42-2.31 (m, 1H), 2.06-1.98 (m, 1H), 1.92 (s, 1H), 1.71-1.62 (m, 1H), 1.52 (q, 1H), 1.47 (s, 3H), 1.42-1.35 (m, 4H), 1.35-1.29 (m, 9H), 1.20 (d, 3H), 0.92 (d, 3H).

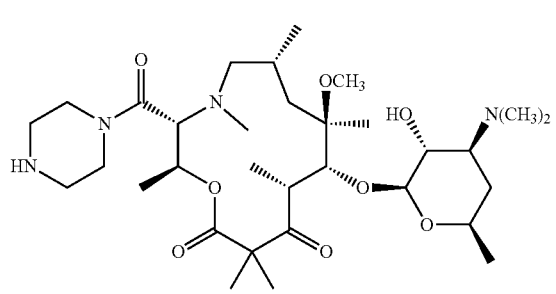

(2S,3R,6R,8R,9R,10R)-9-(((2S,3R,4S,6R)-4-(dimethylamino)-3-hydroxy-6-methyltetrahydro-2H-pyran-2-yl)oxy)-8-methoxy-2,4,6,8,10,12,12-heptamethyl-3-(piperazine-1-carbonyl)-1-oxa-4-azacyclotridecane-11,13-dione (S3-2-I4-1-1)

(Compound 136)

S3-1-I4-1 (35 mg, 0.048 mmol) was dissolved in MeOH (1 mL), and the reaction mixture was heated to 40° C.

S3-2-I4-1-3

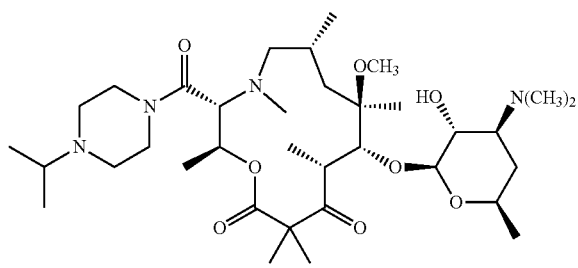

(2S,3R,6R,8R,9R,10R)-9-(((2S,3R,4S,6R)-4-(dimethylamino)-3-hydroxy-6-methyltetrahydro-2H-pyran-2-yl)oxy)-3-(4-isopropylpiperazine-1-carbonyl)-8-methoxy-2,4,6,8,10,12,12-heptamethyl-1-oxa-4-azacyclotridecane-11,13-dione (S3-2-I4-1-3) (Compound 91)

Prepared according to the methods of S3-2-I4-1-2 from S3-1-I4-1 and acetone to provide the title compound as a formate salt. MS (ESI+) m/z: 669.44 [M+H]$^+$; $^1$H NHR (400 MHz, Methanol-d) δ 8.50 (s, 2H), 5.08 (s, 1H), 4.48 (d, 1H), 4.09-3.89 (m, 2H), 3.87-3.54 (m, 6H), 3.50-3.35 (m, 3H), 2.91 (s, 3H), 2.80 (s, 6H), 2.79-2.72 (m, 1H), 2.71-2.44 (m, 8H), 2.15-1.93 (m, 2H), 1.75 (d, 2H), 1.52 (q, 1H), 1.42 (s, 3H), 1.39 (s, 3H), 1.31 (dd, 9H), 1.17 (d, 3H), 1.10 (d, 6H), 0.85 (d, 3H).

S3-2-I5-1-1

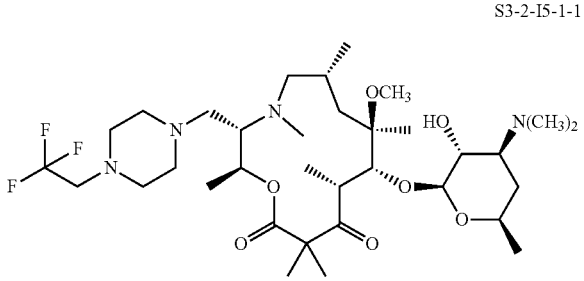 [SMILES: CO[C@]1(C)C[C@@H](C)CN(C)[C@@H](CN2CCN(CC(F)(F)F)CC2)[C@H](C)OC(=O)C(C)(C)C(=O)[C@H](C)[C@H]1O[C@@H]1O[C@H](C)C[C@H](N(C)C)[C@H]1O]

(2S,3S,6R,8R,9R,10R)-9-(((2S,3R,4S,6R)-4-(dimethylamino)-3-hydroxy-6-methyltetrahydro-2H-pyran-2-yl)oxy)-8-methoxy-2,4,6,8,10,12,12-heptamethyl-3-((4-(2,2,2-trifluoroethyl)piperazin-1-yl)methyl)-1-oxa-4-azacyclotridecane-11,13-dione (S3-2-I5-1-1) (Compound 124)

S3-1-I5-1 (36.8 mg, 0.051 mmol) was dissolved in dry THF (0.6 mL) under nitrogen. Phenylsilane (12.5 μL, 1.020 mmol) was added followed by trifluoroacetic acid (6.8 μL, 0.090 mmol). The reaction mixture was placed in a preheated dry block at 70° C. and stirred for 6 h. The reaction was cooled, quenched through the addition of sat. NaHCO$_3$ (1.5 mL) and extracted with EtOAc (1 mL×3). The combined extracts were dried over Na$_2$SO$_4$, were filtered, and were concentrated. The resulting crude material was dissolved in MeOH (1 mL), was heated at 40° C. overnight, and was concentrated. The residue was purified by HPLC (Atlantis T3 column, 5-50% MeCN-water-0.1% HCO$_2$H) to give 8.31 mg of the title compound as a formate salt. MS (ESI+) m/z: 695.33 [M+H]$^+$; $^1$H NMR (400 MHz, Methanol-d) δ 8.40 (s, 3H), 5.41 (dt, 1H), 4.50 (d, 1H), 4.11 (d, 1H), 3.91-3.80 (m, 1H), 3.73 (ddd, 1H), 3.57-3.47 (m, 1H), 3.47-3.36 (m, 2H), 3.18 (s, 3H), 3.07 (q, 3H), 3.02 (s, 3H), 2.95-2.84 (m, 2H), 2.82 (s, 6H), 2.77-2.61 (m, 6H), 2.61-2.51 (m, 2H), 2.27 (d, 1H), 2.08-1.99 (m, 1H), 1.83 (d, 1H), 1.58-1.47 (m, 4H), 1.42-1.30 (m, 17H), 1.07 (d, 3H).

S3-2-I4-1-4

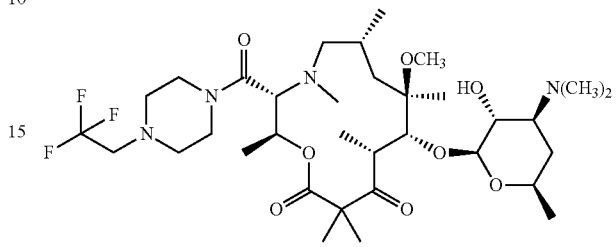

(2S,3R,6R,8R,9R,10R)-9-(((2S,3R,4S,6R)-4-(dimethylamino)-3-hydroxy-6-methyltetrahydro-2H-pyran-2-yl)oxy)-8-methoxy-2,4,6,8,10,12,12-heptamethyl-3-(4-(2,2,2-trifluoroethyl)piperazine-1-carbonyl)-1-oxa-4-azacyclotridecane-11,13-dione (S3-2-I4-1-4) (Compound 130)

Prepared according to the methods of S3-2-I5-1-1 from S3-1-I4-1 to provide the title compound as a formate salt. MS (ESI+) m/z: 709.29 [M+H]$^+$; $^1$H NMR (400 MHz, Methanol-d) δ 8.49 (s, 1H), 5.27 (s, 1H), 4.49 (d, 1H), 4.23 (s, 1H), 4.03 (d, 1H), 3.90-3.66 (m, 4H), 3.66-3.54 (m, 2H), 3.49-3.37 (m, 2H), 3.14 (q, 2H), 2.95 (s, 3H), 2.82 (s, 6H), 2.80-2.62 (m, 8H), 2.33 (s, 1H), 2.09-1.98 (m, 1H), 1.95-1.81 (m, 1H), 1.70 (d, 1H), 1.54 (q, 1H), 1.50-1.41 (m, 4H), 1.41-1.23 (m, 13H), 1.20 (d, 3H), 0.91 (d, 3H).

S3-3-I5-1-1

(2S,3S,6R,8R,9R,10R)-9-(((2S,3R,4S,6R)-4-(dimethylamino)-3-hydroxy-6-methyltetrahydro-2H-pyran-2-yl)oxy)-8-methoxy-2,4,6,8,10,12,12-heptamethyl-3-((4-(methylsulfonyl)piperazin-1-yl)methyl)-1-oxa-4-azacyclotridecane-11,13-dione (S3-3-I5-1-1) (Compound 80)

S3-1-I5-1 (37.4 mg, 0.0521 mmol) and 4-dimethylaminopyridine (1 mg, 0.008 mmol) were dissolved in dichloromethane (0.45 mL) and N,N-diisopropylethylamine (0.050 mL, 0.26 mmol). The solution was cooled to 0° C., methanesulfonyl chloride (0.012 mL, 0.156 mmol) was added, and the reaction mixture was allowed to warm to rt. After 3 h, the reaction was quenched through the addition of sat. NaHCO$_3$ (1 mL) and was extracted with EtOAc (1 mL×3). The combined extracts were dried over Na$_2$SO$_4$, were filtered, and were concentrated. The resulting crude material was dissolved in MeOH (1 mL), was heated at 40° C. overnight, and was concentrated. The residue was purified by HPLC (Atlantis T3 column, 5-50% MeCN-water-0.1% HCO$_2$H) to give 14.1 mg of the title compound as a formate salt. MS (ESI+) m/z: 691.30 [M+H]$^+$; $^1$H NMR (400 MHz, Methanol-d) δ 8.33 (s, 3H), 5.44 (dq, 1H), 4.49 (d, 1H), 4.10 (d, 1H), 3.90-3.80 (m, 1H), 3.72 (ddd, 1H), 3.55-3.37 (m, 3H), 3.27-3.19 (m, 4H), 3.16 (s, 3H), 3.10-3.02 (m, 1H), 3.02 (s, 3H), 2.95-2.85 (m, 2H), 2.84 (s, 3H), 2.81 (s, 6H), 2.74-2.59 (m, 5H), 2.31-2.21 (m, 1H), 2.07-1.99 (m, 1H), 1.82 (d, 1H), 1.57-1.43 (m, 4H), 1.42-1.33 (m, 13H), 1.31 (d, 3H), 1.06 (d, 3H).

(2S,3S,6R,8R,9R,10R)-9-(((2S,3R,4S,6R)-4-(dimethylamino)-3-hydroxy-6-methyltetrahydro-2H-pyran-2-yl)oxy)-8-methoxy-2,4,6,8,10,12,12-heptamethyl-3-((4-tosylpiperazin-1-yl)methyl)-1-oxa-4-azacyclotridecane-11,13-dione (S3-3-I5-1-3) (Compound 139)

Prepared according to the methods of S3-3-I5-1-1 from S3-1-I5-1 and p-toluenesulfonyl chloride to provide the title compound as a formate salt. MS (ESI+) m/z: 767.38 [M+H]$^+$; $^1$H NMR (400 MHz, Methanol-d) δ 8.36 (s, 3H), 7.63 (d, 2H), 7.41 (d, 2H), 5.38 (dt, 1H), 4.46 (d, 1H), 4.06 (d, 1H), 3.78 (ddd, 1H), 3.74-3.66 (m, 1H), 3.51-3.35 (m, 3H), 3.03 (s, 3H), 2.99 (d, 5H), 2.96 (s, 3H), 2.88-2.82 (m, 2H), 2.80 (s, 6H), 2.71-2.62 (m, 2H), 2.62-2.52 (m, 3H), 2.42 (d, 3H), 2.25-2.14 (m, 1H), 2.04-1.97 (m, 1H), 1.78 (d, 1H), 1.55-1.41 (m, 5H), 1.37-1.24 (m, 16H), 1.00 (d, 3H).

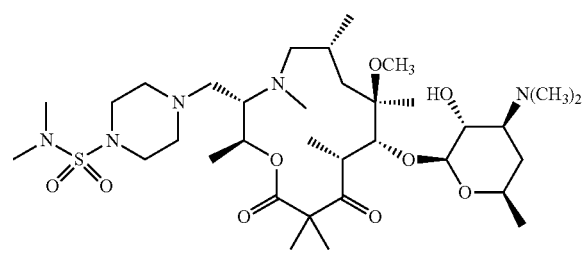

S3-3-I5-1-2

4-(((2S,3S,6R,8R,9R,10R)-9-(((2S,3R,4S,6R)-4-(dimethylamino)-3-hydroxy-6-methyltetrahydro-2H-pyran-2-yl)oxy)-8-methoxy-2,4,6,8,10,12,12-heptamethyl-11,13-dioxo-1-oxa-4-azacyclotridecan-3-yl)methyl)-N,N-dimethylpiperazine-1-sulfonamide (S3-3-I5-1-2) (Compound 142)

Prepared according to the methods of S3-3-I5-1-1 from S3-1-I5-1 and dimethylsulfamoyl chloride to provide the title compound as a formate salt. MS (ESI+) m/z: 720.24 [M+H]$^+$; $^1$H NMR (400 MHz, Methanol-d) δ 8.25 (s, 1H), 5.45 (dq, 1H), 4.51 (d, 1H), 4.11 (d, 1H), 3.93-3.85 (m, 1H), 3.79-3.70 (m, 1H), 3.58-3.40 (m, 3H), 3.29-3.23 (m, 3H), 3.19 (s, 3H), 3.12-2.99 (m, 4H), 2.94 (dd, 1H), 2.89 (s, 3H), 2.87-2.81 (m, 9H), 2.68 (q, 1H), 2.64 (s, 6H), 2.63-2.56 (m, 2H), 2.37-2.20 (m, 1H), 2.10-2.02 (m, 1H), 1.84 (d, 1H), 1.61-1.47 (m, 4H), 1.44-1.26 (m, 15H), 1.08 (d, 3H).

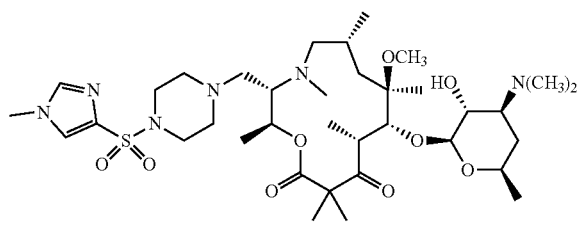

S3-3-I5-1-4

(2S,3S,6R,8R,9R,10R)-9-(((2S,3R,4S,6R)-4-(dimethylamino)-3-hydroxy-6-methyltetrahydro-2H-pyran-2-yl)oxy)-8-methoxy-2,4,6,8,10,12,12-heptamethyl-3-((4-((1-methyl-1H-imidazol-4-yl)sulfonyl)piperazin-1-yl)methyl)-1-oxa-4-azacyclotridecane-11,13-dione (S3-3-I5-1-4) (Compound 81)

Prepared according to the methods of S3-3-I5-1-1 from S3-1-I5-1 and 1-methyl-1H-imidazole-4-sulfonyl chloride to provide the title compound as a formate salt. MS (ESI+) m/z: 757.32 [M+H]$^+$; $^1$H NMR (400 MHz, Methanol-d) δ 8.35 (s, 3H), 7.76 (d, 1H), 7.71 (d, 1H), 5.39 (dt, 1H), 4.47 (d, 1H), 4.07 (d, 1H), 3.85-3.78 (m, 1H), 3.77 (s, 3H), 3.71 (ddd, 1H), 3.52-3.45 (m, 1H), 3.44-3.35 (m, 2H), 3.19-3.10 (m, 4H), 3.08 (s, 3H), 3.04-2.93 (m, 4H), 2.92-2.82 (m, 2H), 2.80 (s, 6H), 2.70-2.53 (m, 5H), 2.28-2.14 (m, 1H), 2.06-1.98 (m, 1H), 1.79 (d, 1H), 1.59-1.41 (m, 4H), 1.39-1.25 (m, 17H), 1.02 (d, 3H).

S3-3-I5-1-3

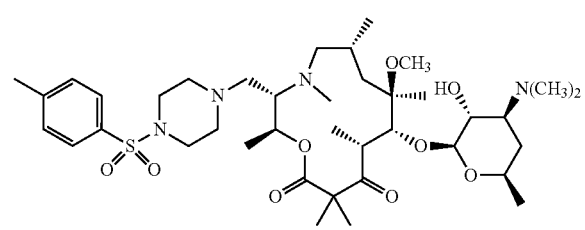

S3-4-I5-1-1

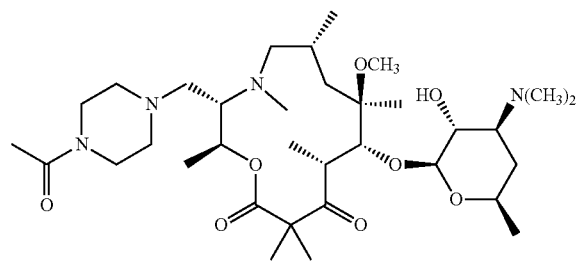

(2S,3S,6R,8R,9R,10R)-3-((4-acetylpiperazin-1-yl)methyl)-9-(((2S,3R,4S,6R)-4-(dimethylamino)-3-hydroxy-6-methyltetrahydro-2H-pyran-2-yl)oxy)-8-methoxy-2,4,6,8,10,12,12-heptamethyl-1-oxa-4-azacyclotridecane-11,13-dione (S3-4-I5-1-1) (Compound 135)

S3-1-I5-1 (36.0 mg, 0.0502 mmol) and 4-dimethylaminopyridine (1 mg, 0.008 mmol) were dissolved in dichloromethane (0.45 mL) and N,N-diisopropylethylamine (0.050 mL, 0.26 mmol). The solution was cooled to 0° C., acetyl chloride (0.0106 mL, 0.150 mmol) was added, and the reaction mixture was allowed to warm to rt. After 2 h, the reaction was placed in a freezer overnight. After stirring for an additional 1 h at rt, the reaction was quenched through the addition of sat. NaHCO₃ (1 mL) and was extracted with EtOAc (1 mL×3). The combined extracts were dried over Na₂SO₄, were filtered, and were concentrated. The resulting crude material was dissolved in MeOH (1 mL), was heated at 40° C. overnight, and was concentrated. The residue was purified by HPLC (Atlantis T3 column, 5-50% MeCN-water-0.1% HCO₂H) to give 12.9 mg of the title compound as a formate salt. MS (ESI+) m/z: 655.39 [M+H]⁺; ¹H NMR (400 MHz, Methanol-d) δ 8.35 (s, 3H), 5.43 (dq, 1H), 4.49 (d, 1H), 4.10 (d, 1H), 3.88 (ddt, 1H), 3.73 (ddd, 1H), 3.65-3.36 (m, 7H), 3.18 (d, 3H), 3.07 (t, 1H), 3.02 (d, 3H), 2.98-2.85 (m, 2H), 2.82 (d, 6H), 2.68-2.53 (m, 4H), 2.53-2.44 (m, 1H), 2.26 (d, 1H), 2.09 (s, 3H), 2.07-2.01 (m, 1H), 1.83 (d, 1H), 1.59-1.43 (m, 4H), 1.42-1.37 (m, 5H), 1.37-1.33 (m, 9H), 1.33-1.27 (m, 3H), 1.07 (d, 3H).

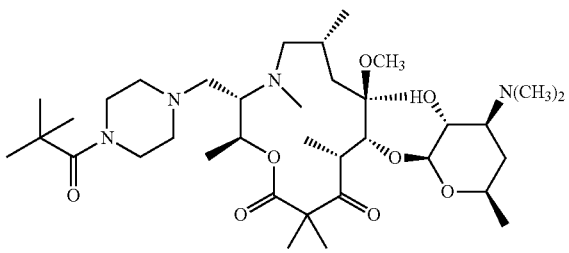

S3-4-I5-1-1

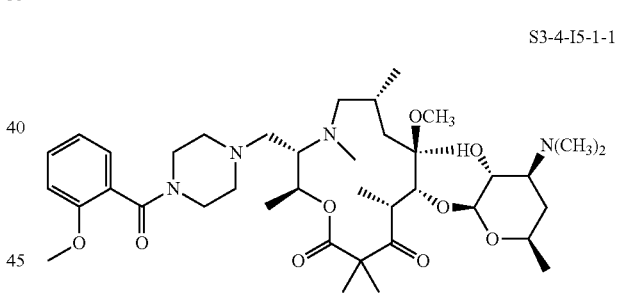

S3-4-I5-1-2

(2S,3S,6R,8R,9R,10R)-9-(((2S,3R,4S,6R)-4-(dimethylamino)-3-hydroxy-6-methyltetrahydro-2H-pyran-2-yl)oxy)-8-methoxy-2,4,6,8,10,12,12-heptamethyl-3-((4-propionylpiperazin-1-yl)methyl)-1-oxa-4-azacyclotridecane-11,13-dione (S3-4-I5-1-2) (Compound 133)

Prepared according to the methods of S3-4-I5-1-1 from S3-1-I5-1 and propionyl chloride to provide the title compound as a formate salt. MS (ESI+) m/z: 669.43 [M+H]⁺; ¹H NMR (400 MHz, Methanol-d) δ 8.43 (s, 3H), 5.44 (dt, 1H), 4.49 (d, 1H), 4.10 (d, 1H), 3.88 (ddd, 1H), 3.73 (ddd, 1H), 3.65-3.37 (m, 7H), 3.18 (s, 3H), 3.10-2.98 (m, 4H), 2.98-2.84 (m, 2H), 2.82 (s, 6H), 2.59 (dt, 3H), 2.53-2.45 (m, 1H), 2.40 (q, 2H), 2.27 (d, 1H), 2.03 (ddd, 1H), 1.83 (d, 1H), 1.61-1.52 (m, 1H), 1.50 (s, 3H), 1.43-1.33 (m, 14H), 1.33-1.27 (m, 3H), 1.14-1.03 (m, 6H).

(2S,3S,6R,8R,9R,10R)-9-(((2S,3R,4S,6R)-4-(dimethylamino)-3-hydroxy-6-methyltetrahydro-2H-pyran-2-yl)oxy)-8-methoxy-2,4,6,8,10,12,12-heptamethyl-3-((4-pivaloylpiperazin-1-yl)methyl)-1-oxa-4-azacyclotridecane-11,13-dione (S3-4-I5-1-3) (Compound 114)

Prepared according to the methods of S3-4-I5-1-1 from S3-1-I5-1 and pivaloyl chloride to provide the title compound as a formate salt. MS (ESI+) m/z: 697.33 [M+H]⁺; ¹H NMR (400 MHz, Methanol-d) δ 8.37 (s, 3H), 5.42 (dq, 1H), 4.49 (d, 1H), 4.10 (d, 1H), 3.93-3.81 (m, 1H), 3.78-3.59 (m, 5H), 3.54-3.46 (m, 1H), 3.46-3.36 (m, 2H), 3.18 (d, 3H), 3.07 (t, 1H), 3.02 (s, 3H), 2.97-2.83 (m, 2H), 2.81 (d, 6H), 2.65-2.55 (m, 3H), 2.55-2.47 (m, 2H), 2.33-2.20 (m, 1H), 2.02 (ddd, 1H), 1.82 (d, 1H), 1.59-1.44 (m, 4H), 1.42-1.33 (m, 13H), 1.31 (d, 3H), 1.26 (d, 9H), 1.10-1.03 (m, 3H).

S3-4-I5-1-1

(2S,3S,6R,8R,9R,10R)-9-(((2S,3R,4S,6R)-4-(dimethylamino)-3-hydroxy-6-methyltetrahydro-2H-pyran-2-yl)oxy)-8-methoxy-3-((4-(2-methoxybenzoyl)piperazin-1-yl)methyl)-2,4,6,8,10,12,12-heptamethyl-1-oxa-4-azacyclotridecane-11,13-dione (S3-4-I5-1-4) (Compound 84)

Prepared according to the methods of S3-4-I5-1-1 from S3-1-I5-1 and 2-methoxybenzoyl chloride to provide the title compound as a formate salt. MS (ESI+) m/z: 747.35 [M+H]⁺; ¹H NMR (400 MHz, Methanol-d) δ 8.36 (s, 3H), 7.36 (t, 1H), 7.03 (ddd, 1H), 6.97-6.89 (m, 2H), 5.43 (dd, 1H), 4.49 (d, 1H), 4.09 (d, 1H), 3.92-3.83 (m, 1H), 3.81 (s, 3H), 3.79-3.68 (m, 3H), 3.55-3.35 (m, 5H), 3.17 (s, 3H), 3.10-2.98 (m, 4H), 2.96-2.85 (m, 2H), 2.81 (s, 7H), 2.74-2.40 (m, 5H), 2.26 (d, 1H), 2.06-2.00 (m, 1H), 1.82 (d, 1H), 1.49 (d, 4H), 1.42-1.33 (m, 12H), 1.30 (d, 3H), 1.06 (d, 3H).

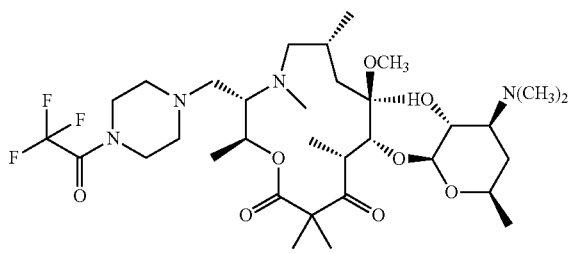

S3-4-I5-1-5

(2S,3S,6R,8R,9R,10R)-9-(((2S,3R,4S,6R)-4-(dimethylamino)-3-hydroxy-6-methyltetrahydro-2H-pyran-2-yl)oxy)-8-methoxy-2,4,6,8,10,12,12-heptamethyl-3-((4-(2,2,2-trifluoroacetyl)piperazin-1-yl)methyl)-1-oxa-4-azacyclotridecane-11,13-dione (S3-4-I5-1-5) (Compound 109)

Prepared according to the methods of S3-4-I5-1-1 from S3-1-I5-1 and trifluoroacetic anhydride to provide the title compound as a formate salt. MS (ESI+) m/z: 709.27 [M+H]$^+$; $^1$H NMR (400 MHz, Methanol-d) δ 8.49 (s, 3H), 5.46 (s, 1H), 4.51 (d, 1H), 4.12 (d, 1H), 3.89 (s, 1H), 3.80-3.65 (m, 5H), 3.53 (dd, 1H), 3.49-3.34 (m, 2H), 3.19 (s, 3H), 3.04 (s, 4H), 2.93 (dd, 2H), 2.80 (s, 6H), 2.74-2.58 (m, 5H), 2.28 (s, 1H), 2.06-1.99 (m, 1H), 1.85 (d, 1H), 1.52 (s, 4H), 1.45-1.35 (m, 13H), 1.33 (d, 3H), 1.09 (d, 3H)

The following Examples were prepared according to the methods of Scheme 3, substituting the appropriate Intermediate from Table 1.

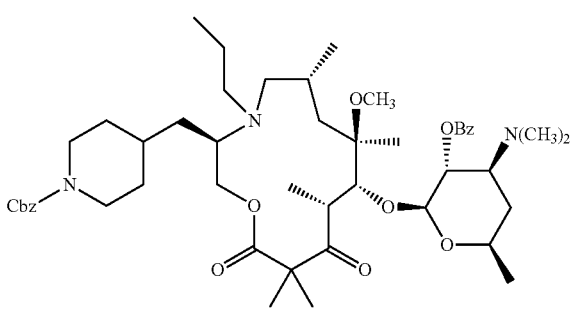

S3-1-I7-3

Benzyl 4-(((3R,6R,8R,9R,10R)-9-(((2S,3R,4S,6R)-3-(benzoyloxy)-4-(dimethylamino)-6-methyltetrahydro-2H-pyran-2-yl)oxy)-8-methoxy-6,8,10,12,12-pentamethyl-11,13-dioxo-4-propyl-1-oxa-4-azacyclotridecan-3-yl)methyl)piperidine-1-carboxylate (S3-1-I7-3)

An oven-dried flask was evacuated and back-filled with nitrogen (2 times) before cooling to rt. S2-1-I7-3 (196 mg, 0.226 mmol, prepared as described in Scheme 1 from 17 and propionaldehyde) in ethanol (4 mL) was added to the flask, which was then evacuated and back-filled with nitrogen (2 times). 10% Pd/C (50% wet, 40 mg, 0.0187 mmol) was added to the flask, and the reaction mixture was evacuated and back-filled with nitrogen (2 times) and was then evacuated and back-filled with hydrogen (4 times). The reaction mixture was stirred under a hydrogen balloon for 1.5 h. The reaction mixture was evacuated and back-filled with nitrogen (4 times). Celite® was added, and the reaction mixture was stirred for approximately 10 min and was filtered through Celite®. The wet pad was rinsed with EtOH (5 mL×2), and the combined organic layers were concentrated to give the crude title compound (166.4 mg, 100%), which was used without further purification. MS (ESI+) m/z: 730.26 [M+H]$^+$, formate salt, $^1$H NMR (400 MHz, Methanol-d) δ 8.48 (s, 3H), 4.46 (dd, 1H), 4.34-4.06 (m, 2H), 3.80-3.67 (m, 1H), 3.55-3.34 (m, 5H), 3.25-3.05 (m, 2H), 3.04-2.86 (m, 6H), 2.86-2.74 (m, 10H), 2.18-1.90 (m, 4H), 1.85-1.57 (m, 7H), 1.57-1.46 (m, 6H), 1.43-1.23 (m, 13H), 1.09-0.90 (m, 6H).

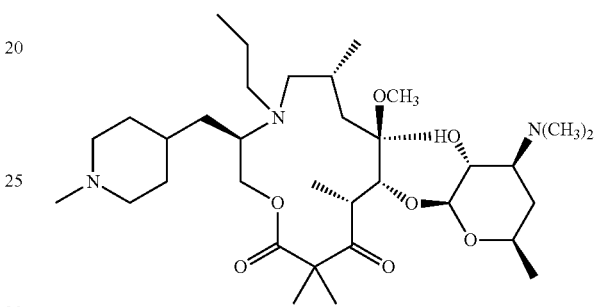

S3-2-I7-3-1

(3R,6R,8R,9R,10R)-9-(((2S,3R,4S,6R)-4-(dimethylamino)-3-hydroxy-6-methyltetrahydro-2H-pyran-2-yl)oxy)-8-methoxy-6,8,10,12,12-pentamethyl-3-((1-methylpiperidin-4-yl)methyl)-4-propyl-1-oxa-4-azacyclotridecane-11,13-dione (S3-2-I7-3-1) (Compound 95)

Prepared according to the methods of S3-2-I4-1-2 from S3-1-I7-3 and formaldehyde to provide the title compound as a formate salt. MS (ESI+) m/z: 640.33 [M+H]$^+$; $^1$H NMR (400 MHz, Methanol-d) δ 8.48 (s, 3H), 4.46 (dd, 1H), 4.34-4.06 (m, 2H), 3.80-3.67 (m, 1H), 3.55-3.34 (m, 5H), 3.25-3.05 (m, 2H), 3.04-2.86 (m, 6H), 2.86-2.74 (m, 10H), 2.18-1.90 (m, 4H), 1.85-1.57 (m, 7H), 1.57-1.46 (m, 6H), 1.43-1.23 (m, 13H), 1.09-0.90 (m, 6H).

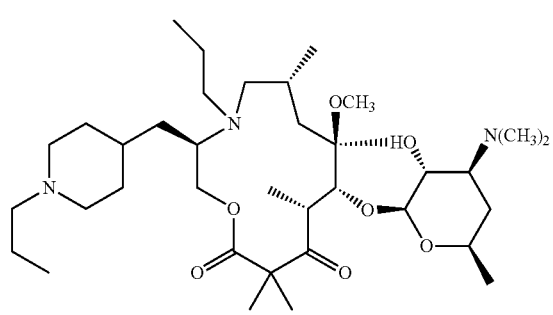

S3-2-I7-3-2

(3R,6R,8R,9R,10R)-9-(((2S,3R,4S,6R)-4-(dimethylamino)-3-hydroxy-6-methyltetrahydro-2H-pyran-2-yl)oxy)-8-methoxy-6,8,10,12,12-pentamethyl-4-propyl-3-((1-propylpiperidin-4-yl)methyl)-1-oxa-4-azacyclotridecane-11,13-dione (S3-2-I7-3-2) (Compound 96)

Prepared according to the methods of S3-2-I4-1-2 from S3-1-I7-3 and propionaldehyde to provide the title compound as a formate salt. MS (ESI+) m/z: 668.38 [M+H]$^+$; $^1$H NMR (400 MHz, Methanol-d) δ 8.51 (s, 3H), 4.46 (d, 1H), 4.26-3.96 (m, 2H), 3.79-3.66 (m, 1H), 3.62-3.49 (m, 3H), 3.49-3.34 (m, 3H), 3.05-2.96 (m, 3H), 2.96-2.83 (m, 5H), 2.83-2.73 (m, 7H), 2.15-1.91 (m, 4H), 1.82-1.70 (m, 3H), 1.70-1.43 (m, 11H), 1.41-1.22 (m, 13H), 1.07-0.83 (m, 9H).

(3R,6R,8R,9R,10R)-9-(((2S,3R,4S,6R)-4-(dimethylamino)-3-hydroxy-6-methyltetrahydro-2H-pyran-2-yl)oxy)-4-ethyl-3-((1-ethylpiperidin-4-yl) methyl)-8-methoxy-6,8,10,12,12-pentamethyl-1-oxa-4-azacyclotridecane-11,13-dione (S3-2-I7-2-2) (Compound 118)

Prepared according to the methods of S3-2-I4-1-2 from S3-1-I7-2 and acetaldehyde to provide the title compound as a formate salt. MS (ESI+) m/z: 640.35 [M+H]$^+$; $^1$H NMR (400 MHz, Methanol-d) δ 8.54 (s, 3H), 4.46 (d, 1H), 4.37-3.97 (m, 2H), 3.79-3.65 (m, 1H), 3.64-3.40 (m, 5H), 3.40-3.33 (m, 1H), 3.16-3.03 (m, 3H), 3.03-2.81 (m, 6H), 2.81-2.70 (m, 8H), 2.16-1.84 (m, 5H), 1.57-1.41 (m, 8H), 1.41-1.08 (m, 20H), 1.08-0.81 (m, 4H).

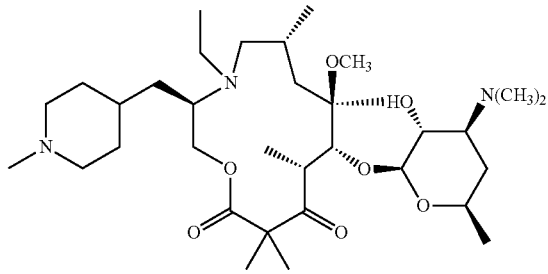

S3-2-I7-2-1

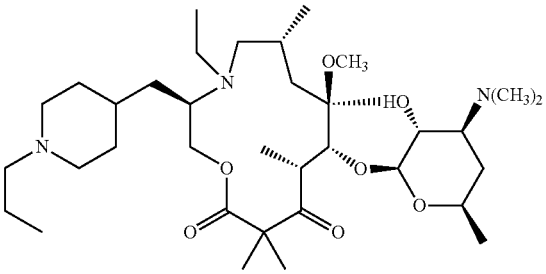

S3-2-I7-2-3

(3R,6R,8R,9R,10R)-9-(((2S,3R,4S,6R)-4-(dimethylamino)-3-hydroxy-6-methyltetrahydro-2H-pyran-2-yl)oxy)-4-ethyl-8-methoxy-6,8,10,12,12-pentamethyl-3-((1-methylpiperidin-4-yl)methyl)-1-oxa-4-azacyclotridecane-11,13-dione (S3-2-I7-2-1) (Compound 98)

Prepared according to the methods of S3-2-I4-1-2 from S3-1-I7-2 and formaldehyde to provide the title compound as a formate salt. MS (ESI+) m/z: 209.5 [M+3H]$^{3+}$, 313.8 [M+2H]$^{2+}$, 626.5 [M+H]$^+$; $^1$H NMR (400 MHz, Methanol-d4) δ 8.50 (s, 2H), 4.41 (d, 1H), 4.14 (s, 1H), 3.68 (m, 1H), 3.46-3.25 (m, 5H), 2.95-2.80 (m, 5H), 2.75 (d, 6H), 2.07-1.94 (m, 3H), 1.89 (d, 1H), 1.52 (s, 1H), 1.44 (d, 3H), 1.30 (m, 12H), 1.21 (s, 2H), 1.00-0.93 (m, 2H).

(3R,6R,8R,9R,10R)-9-(((2S,3R,4S,6R)-4-(dimethylamino)-3-hydroxy-6-methyltetrahydro-2H-pyran-2-yl)oxy)-4-ethyl-8-methoxy-6,8,10,12,12-pentamethyl-3-((1-propylpiperidin-4-yl)methyl)-1-oxa-4-azacyclotridecane-11,13-dione (S3-2-I7-2-3) (Compound 102)

Prepared according to the methods of S3-2-I4-1-2 from S3-1-I7-2 and propionaldehyde to provide the title compound as a formate salt. MS (ESI+) m/z: 654.30 [M+H]$^+$; $^1$H NMR (400 MHz, Methanol-d) δ 8.51 (s, 2H), 4.46 (d, 1H), 4.36-3.90 (m, 2H), 3.78-3.65 (m, 1H), 3.62-3.39 (m, 5H), 3.39-3.33 (m, 1H), 3.07-2.82 (m, 8H), 2.82-2.67 (m, 8H), 2.14-1.87 (m, 4H), 1.82-1.60 (m, 5H), 1.60-1.41 (m, 8H), 1.41-1.24 (m, 14H), 1.24-1.07 (m, 3H), 1.07-0.81 (m, 6H).

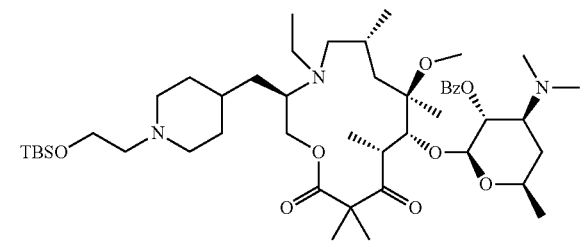

(2S,3R,4S,6R)-2-(((3R,6R,8R,9R,10R)-3-((1-(2-((tert-Butyldimethylsilyl)oxy)ethyl)piperidin-4-yl) methyl)-4-ethyl-8-methoxy-6,8,10,12,12-pentamethyl-11,13-dioxo-1-oxa-4-azacyclotridecan-9-yl) oxy)-4-(dimethylamino)-6-methyltetrahydro-2H-pyran-3-yl benzoate S3-1-I7-2 (90 mg, 0.13 mmol) was dissolved in dry methylene chloride (2 mL) Acetic acid (0.021 mL, 0.38

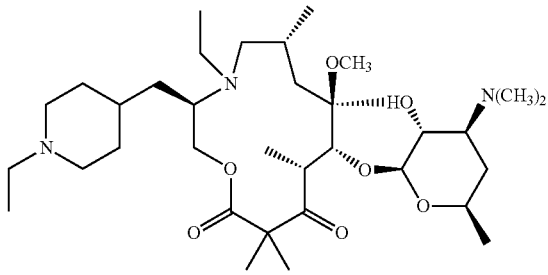

mmol) and 2-((tert-butyldimethylsilyl)oxy)acetaldehyde (0.036 mL, 0.19 mmol) was added. Then NaBH(OAc)$_3$ (53 mg, 0.25 mmol) was added to the reaction mixture in one portion. The reaction was allowed to stir at rt for 2 h at which point LC/MS showed full conversion. The reaction was quenched by adding saturated, aqueous NaHCO$_3$ (5 mL), and the aqueous layer was extracted with methylene chloride (3×10 mL) The combined extracts were dried over MgSO$_4$, were filtered, and were concentrated. The residue was purified on 4 g of silica gel (elution with 0-10% MeOH-dichloromethane+0.5% of 30% aq NH$_4$OH) to give the title compound as a white solid (60 mg, 55%). MS (ESI+) m/z: 292.2 [M+3H]$^{3+}$, 437.8 [M+2H]$^{2+}$, 874.6 [M+H]$^+$.

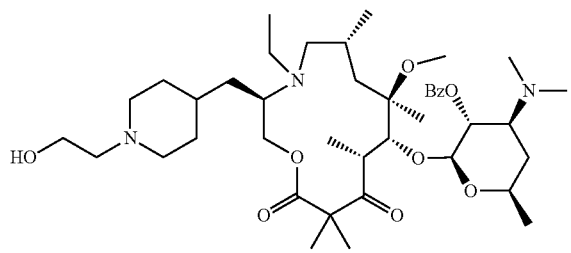

(2S,3R,4S,6R)-4-(Dimethylamino)-2-(((3R,6R,8R,9R,10R)-4-ethyl-3-((1-(2-hydroxyethyl)piperidin-4-yl)methyl)-8-methoxy-6,8,10,12,12-pentamethyl-11,13-dioxo-1-oxa-4-azacyclotridecan-9-yl)oxy)-6-methyltetrahydro-2H-pyran-3-yl benzoate (2S,3R,4S,6R)-2-(((3R,6R,8R,9R,10R)-3-((1-(2-((tert-Butyldimethylsilyl)oxy)ethyl)piperidin-4-yl)methyl)-4-ethyl-8-methoxy-6,8,10,12,12-pentamethyl-11,13-dioxo-1-oxa-4-azacyclotridecan-9-yl)oxy)-4-(dimethylamino)-6-methyltetrahydro-2H-pyran-3-yl benzoate (60 mg, 0.067 mmol) was dissolved in dry THF (2 mL) and TBAF (1M in THF, 0.20 mL, 0.020 mmol) was added at room temperature. The reaction mixture was stirred at rt for 2 h and was concentrated. The residue was purified on 4 g of silica gel (elution with 0-20% MeOH-dichloromethane+0.5% of 30% aq NH$_4$OH) to give the title compound as a white solid (46 mg, 88%). MS (ESI+) m/z: 254.2 [M+3H]$^{3+}$, 380.8 [M+2H]$^{2+}$, 760.5 [M+H]$^+$.

S3-2-I7-2-4

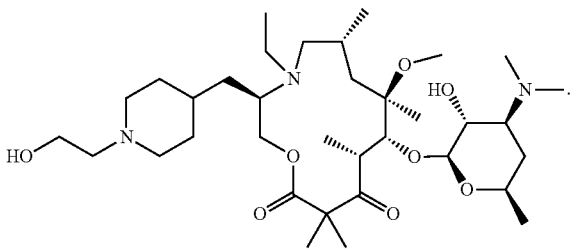

(3R,6R,8R,9R,10R)-9-(((2S,3R,4S,6R)-4-(Dimethylamino)-3-hydroxy-6-methyltetrahydro-2H-pyran-2-yl)oxy)-4-ethyl-3-((1-(2-hydroxyethyl)piperidin-4-yl)methyl)-8-methoxy-6,8,10,12,12-pentamethyl-1-oxa-4-azacyclotridecane-11,13-dione (S3-2-I7-2-4) (Compound 169)

Prepared by methanolysis of (2S,3R,4S,6R)-4-(Dimethylamino)-2-(((3R,6R,8R,9R,10R)-4-ethyl-3-((1-(2-hydroxyethyl)piperidin-4-yl)methyl)-8-methoxy-6,8,10,12,12-pentamethyl-11,13-dioxo-1-oxa-4-azacyclotridecan-9-yl)oxy)-6-methyltetrahydro-2H-pyran-3-yl benzoate according to the methods of S3-2-I4-1-2. MS (ESI+) m/z: 219.5 [M+3H]$^{3+}$, 328.8 [M+2H]$^{2+}$, 656.5 [M+H]$^+$; $^1$H NMR (400 MHz, Methanol-d$_4$) δ 8.53 (s, 2H), 4.45 (d, 1H), 3.84 (t, 2H), 3.71 (ddd, 1H), 3.53-3.40 (m, 4H), 3.40-3.27 (m, 6H), 3.13 (d, 1H), 3.08 (s, 2H), 2.99-2.90 (m, 3H), 2.84 (s, 1H), 2.77 (s, 7H), 2.08-1.96 (m, 3H), 1.92 (d, 1H), 1.59 (s, 1H), 1.47 (dd, 5H), 1.39-1.27 (m, 12H), 0.97 (s, 2H).

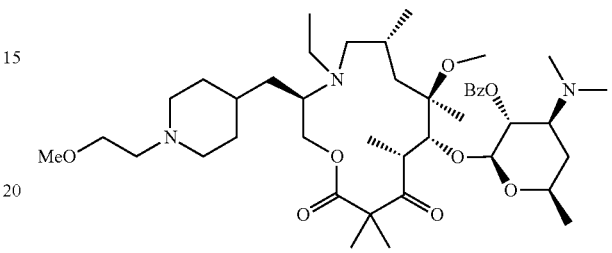

(2S,3R,4S,6R)-4-(Dimethylamino)-2-(((3R,6R,8R,9R,10R)-4-ethyl-8-methoxy-3-((1-(2-methoxyethyl)piperidin-4-yl)methyl)-6,8,10,12,12-pentamethyl-11,13-dioxo-1-oxa-4-azacyclotridecan-9-yl)oxy)-6-methyltetrahydro-2H-pyran-3-yl benzoate In a 8 mL vial was a solution of (2S,3R,4S,6R)-4-(Dimethylamino)-2-(((3R,6R,8R,9R,10R)-4-ethyl-3-((1-(2-hydroxyethyl)piperidin-4-yl)methyl)-8-methoxy-6,8,10,12,12-pentamethyl-11,13-dioxo-1-oxa-4-azacyclotridecan-9-yl)oxy)-6-methyltetrahydro-2H-pyran-3-yl benzoate (26 mg, 0.035 mmol) in 1,2-dimethoxyethane (2 mL) precooled at −60° C. KHMDS (0.10 mL, 0.10 mmol) was added dropwise. The reaction mixture was stirred at −60° C. for 20 min. Then Me$_2$SO$_4$ (16 μL, 0.17 mmol) was added. The reaction mixture was allowed to warm to −15° C. LC/MS shows full conversion. The reaction was quenched by adding triethylamine (1 mL) and the resulting mixture was diluted with dichloromethane and saturated NaHCO$_3$ was added. The aqueous layer was extracted with dichloromethane and the combined organic layers were dried over MgSO$_4$, filtered and concentrated. The residue was purified on 4 g of silica gel (elution with 0-10% MeOH-dichloromethane+ 0.5% of 30% aq NH$_4$OH) to give the title compound as a white solid (22 mg, 82%). MS (ESI+) m/z: 258.8 [M+3H]$^{3+}$, 387.8 [M+2H]$^{2+}$, 774.5 [M+H]$^+$.

S3-2-I7-2-5

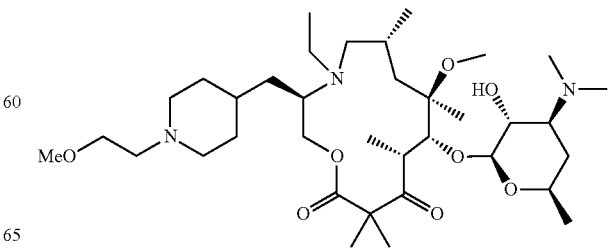

(3R,6R,8R,9R,10R)-9-(((2S,3R,4S,6R)-4-(Dimethyl-amino)-3-hydroxy-6-methyltetrahydro-2H-pyran-2-yl)oxy)-4-ethyl-8-methoxy-3-((1-(2-methoxyethyl)piperidin-4-yl)methyl)-6,8,10,12,12-pentamethyl-1-oxa-4-azacyclotridecane-11,13-dione (S3-2-I7-2-5)

Prepared by methanolysis of (2S,3R,4S,6R)-4-(Dimethylamino)-2-(((3R,6R,8R,9R,10R)-4-ethyl-8-methoxy-3-((1-(2-methoxyethyl)piperidin-4-yl)methyl)-6,8,10,12,12-pentamethyl-11,13-dioxo-1-oxa-4-azacyclotridecan-9-yl)oxy)-6-methyltetrahydro-2H-pyran-3-yl benzoate according to the methods of S3-2-I4-1-2. MS (ESI+) m/z: 224.2 [M+3H]$^{3+}$, 335.8 [M+2H]$^{2+}$, 670.5 [M+H]$^{+}$; $^{1}$H NMR (400 MHz, Methanol-d$_4$) δ 8.53 (s, 2H), 4.45 (d, 1H), 4.14 (s, 1H), 3.69 (dt, 3H), 3.54-3.44 (m, 2H), 3.44-3.27 (m, 10H), 3.19 (d, 1H), 3.13 (s, 2H), 2.94 (s, 2H), 2.78 (d, 8H), 2.06-1.96 (m, 2H), 1.89 (d, 1H), 1.54 (s, 4H), 1.51-1.40 (m, 3H), 1.39-1.27 (m, 12H), 1.25-1.18 (m, 2H), 0.98 (s, 2H).

(3S,6R,8R,9R,10R)-9-(((2S,3R,4S,6R)-4-(dimethyl-amino)-3-hydroxy-6-methyltetrahydro-2H-pyran-2-yl)oxy)-3-((4-ethylpiperazin-1-yl)methyl)-8-methoxy-4,6,8,10,12,12-hexamethyl-1-oxa-4-azacyclotridecane-11,13-dione (S3-2-I8-1-2)
(Compound 155)

Prepared according to the methods of S3-2-I4-1-2 from S3-2-I8-1 and acetaldehyde to provide 6.82 mg of the title compound as a formate salt. (ESI+) m/z: 209.72 [M+3H]$^{3+}$, 313.98 [M+2H]$^{2+}$, 627.02 [M+H]$^{+}$; $^{1}$H NMR (400 MHz, Methanol-d$_4$) δ 8.53 (s, 2H), 4.58 (d, 1H), 4.46 (d, 1H), 4.34 (t, 1H), 4.25 (d, 1H), 3.83 (s, 1H), 3.77-3.68 (m, 1H), 3.54-3.36 (m, 2H), 3.14 (s, 1H), 3.02 (s, 3H), 2.92-2.78 (m, 6H), 2.76 (s, 8H), 2.74-2.64 (m, 5H), 2.60 (dd, 2H), 2.17 (s, 1H), 2.06-1.97 (m, 1H), 1.70 (s, 2H), 1.55 (s, 3H), 1.54-1.44 (m, 1H), 1.39 (d, 6H), 1.33 (dd, 6H), 1.20 (t, 3H), 1.03 (d, 3H).

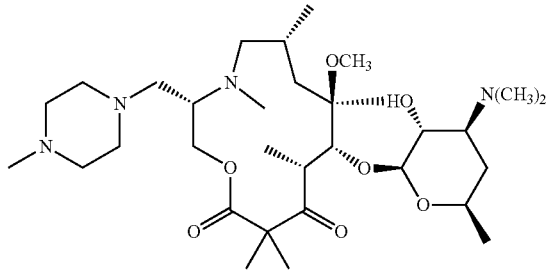

S3-2-I8-1-1

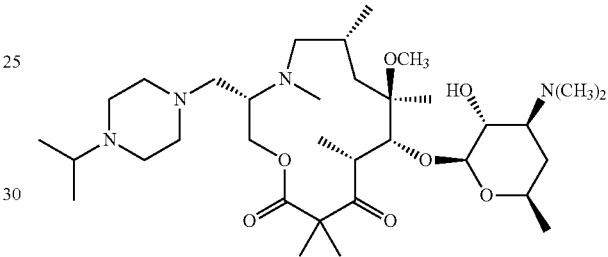

S3-2-I8-1-3

(3S,6R,8R,9R,10R)-9-(((2S,3R,4S,6R)-4-(Dimethyl-amino)-3-hydroxy-6-methyltetrahydro-2H-pyran-2-yl)oxy)-8-methoxy-4,6,8,10,12,12-hexamethyl-3-((4-methylpiperazin-1-yl)methyl)-1-oxa-4-azacyclotridecane-11,13-dione (S3-2-I8-1-1)
(Compound 154)

Prepared according to the methods of S3-2-I4-1-2 from S3-2-IS-1 and formaldehyde to provide 7.33 mg of the title compound as a formate salt. (ESI+) n/z: 205.04 [M+3H]$^{3+}$, 307.01 [M+2H]$^{2+}$, 613.01 [M+H]$^{+}$; $^{1}$H NMR (400 MHz, Methanol-d$_4$) δ 8.53 (s, 2H), 4.58 (d, 1H), 4.45 (d, 1H), 4.34 (t, 1H), 4.26 (d, 1H), 3.90 (d, 1H), 3.77-3.67 (m, 1H), 3.54-3.33 (m, 3H), 3.19 (s, 1H), 3.02 (s, 3H), 2.82 (s, 3H), 2.76 (s, 9H), 2.73-2.54 (m, 7H), 2.45 (s, 3H), 2.18 (s, 1H), 2.04-1.95 (m, 1H), 1.57 (s, 3H), 1.53-1.43 (m, 1H), 1.39 (d, 6H), 1.33 (dd, 6H), 1.04 (d, 3H).

(3S,6R,8R,9R,10R)-9-(((2S,3R,4S,6R)-4-(dimethyl-amino)-3-hydroxy-6-methyltetrahydro-2H-pyran-2-yl)oxy)-3-((4-isopropylpiperazin-1-yl)methyl)-8-methoxy-4,6,8,10,12,12-hexamethyl-1-oxa-4-azacyclotridecane-11,13-dione (S3-2-I8-1-3)
(Compound 156)

Prepared according to the methods of S3-2-I4-1-2 from S3-2-I8-1 and acetone to provide 11.7 mg of the title compound as a formate salt. (ESI+) m/z: 214.41 [M+3H]$^{3+}$, 321.01 [M+2H]$^{2+}$, 641.09 [M+H]$^{+}$; $^{1}$H NMR (400 MHz, Methanol-d$_4$) δ 8.59 (s, 2H), 4.64 (d, 1H), 4.51 (d, 1H), 4.39 (t, 1H), 4.29 (d, 1H), 3.85 (s, 1H), 3.82-3.73 (m, 1H), 3.58-3.43 (m, 2H), 3.27-3.12 (m, 2H), 3.05 (s, 7H), 2.82 (s, 14H), 2.66 (dd, 2H), 2.20 (s, 1H), 2.11-2.00 (m, 1H), 1.75 (s, 2H), 1.59 (s, 3H), 1.58-1.48 (m, 1H), 1.44 (s, 6H), 1.38 (dd, 6H), 1.30 (d, 6H), 1.08 (d, 3H).

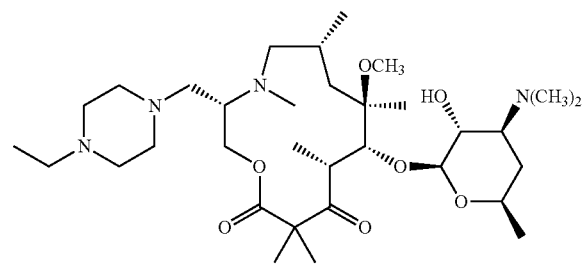

S3-2-I8-1-2

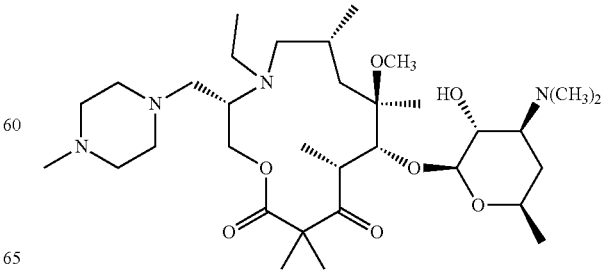

S3-2-I8-2-1

(3S,6R,8R,9R,10R)-9-(((2S,3R,4S,6R)-4-(dimethyl-amino)-3-hydroxy-6-methyltetrahydro-2H-pyran-2-yl)oxy)-4-ethyl-8-methoxy-6,8,10,12,12-pentam-ethyl-3-((4-methylpiperazin-1-yl)methyl)-1-oxa-4-azacyclotridecane-11,13-dione (S3-2-I8-2-1)
(Compound 157)

Prepared according to the methods of S3-2-I4-1-2 from S3-2-I8-2 and formaldehyde to provide 7.63 mg of the title compound as a formate salt. (ESI+) m/z: 209.74 [M+3H]$^{3+}$, 314.01 [M+2H]$^{2+}$, 627.11 [M+H]$^+$; $^1$H NMR (400 MHz, Methanol-d$_4$) δ 8.49 (s, 2H), 4.69 (s, 1H), 4.46 (d, 1H), 4.29 (s, 1H), 4.15 (d, 1H), 3.79-3.66 (m, 1H), 3.54 (s, 2H), 3.49-3.33 (m, 2H), 3.25-3.00 (m, 3H), 2.95 (s, 6H), 2.81 (s, 8H), 2.61 (s, 7H), 2.10-1.97 (m, 2H), 1.88 (s, 1H), 1.61-1.47 (s, 4H), 1.41-1.29 (m, 12H), 1.24 (t, 3H), 0.99 (d, 3H).

(3S,6R,8R,9R,10R)-9-(((2S,3R,4S,6R)-4-(Dimethyl-amino)-3-hydroxy-6-methyltetrahydro-2H-pyran-2-yl)oxy)-4-ethyl-3-((4-ethylpiperazin-1-yl)methyl)-8-methoxy-6,8,10,12,12-pentamethyl-1-oxa-4-azacyclotridecane-11,13-dione (S3-2-I8-2-2)
(Compound 158)

Prepared according to the methods of S3-2-I4-1-2 from S3-2-I8-2 and acetaldehyde to provide 6.83 mg of the title compound as a formate salt. (ESI+) m/z: 214.41 [M+3H]$^{3+}$, 321.03 [M+2H]$^{2+}$, 641.14 [M+H]$^+$; $^1$H NMR (400 MHz, Methanol-d$_4$) δ 8.52 (s, 2H), 4.54 (s, 1H), 4.46 (d, 1H), 4.19 (s, 1H), 4.09 (d, 1H), 3.78-3.65 (m, 1H), 3.59 (s, 1H), 3.44 (dd, 2H), 3.35 (dd, 1H), 2.90 (s, 8H), 2.83 (d, 3H), 2.78 (s, 9H), 2.60 (s, 4H), 2.00 (ddd, 2H), 1.91 (s, 1H), 1.53 (d, 3H), 1.48 (dd, 11H), 1.36 (s, 4H), 1.32 (d, 9H), 1.23 (t, 4H), 1.19-1.13 (m, 2H), 0.94 (d, 3H).

(3S,6R,8R,9R,10R)-9-(((2S,3R,4S,6R)-4-(Dimethyl-amino)-3-hydroxy-6-methyltetrahydro-2H-pyran-2-yl)oxy)-3-((4-isopropylpiperazin-1-yl)methyl)-8-methoxy-4,6,8,10,12,12-hexamethyl-1-oxa-4-azacyclotridecane-11,13-dione (S3-2-I8-2-3)
(Compound 159)

Prepared according to the methods of S3-2-I4-1-2 from S3-2-I8-2 and acetone to provide 6.11 mg of the title compound as a formate salt. (ESI+) m/z: 219.05 [M+3H]$^{3+}$, 328.02 [M+2H]$^{2+}$, 655.08 [M+H]$^+$; $^1$H NMR (400 MHz, Methanol-d$_4$) δ 8.52 (s, 2H), 4.53 (s, 1H), 4.46 (d, 1H), 4.18 (s, 1H), 4.08 (d, 1H), 3.76-3.66 (m, 1H), 3.61 (s, 1H), 3.44 (dd, 1H), 3.35 (dd, 1H), 3.25 (d, 1H), 3.07 (s, 4H), 2.89 (s, 6H), 2.78 (s, 7H), 2.71-2.52 (m, 4H), 2.01 (dd, 2H), 1.88 (s, 1H), 1.52 (s, 3H), 1.51-1.44 (m, 1H), 1.36 (s, 3H), 1.34-1.22 (m, 15H), 1.18 (d, 3H), 0.93 (d, 3H).

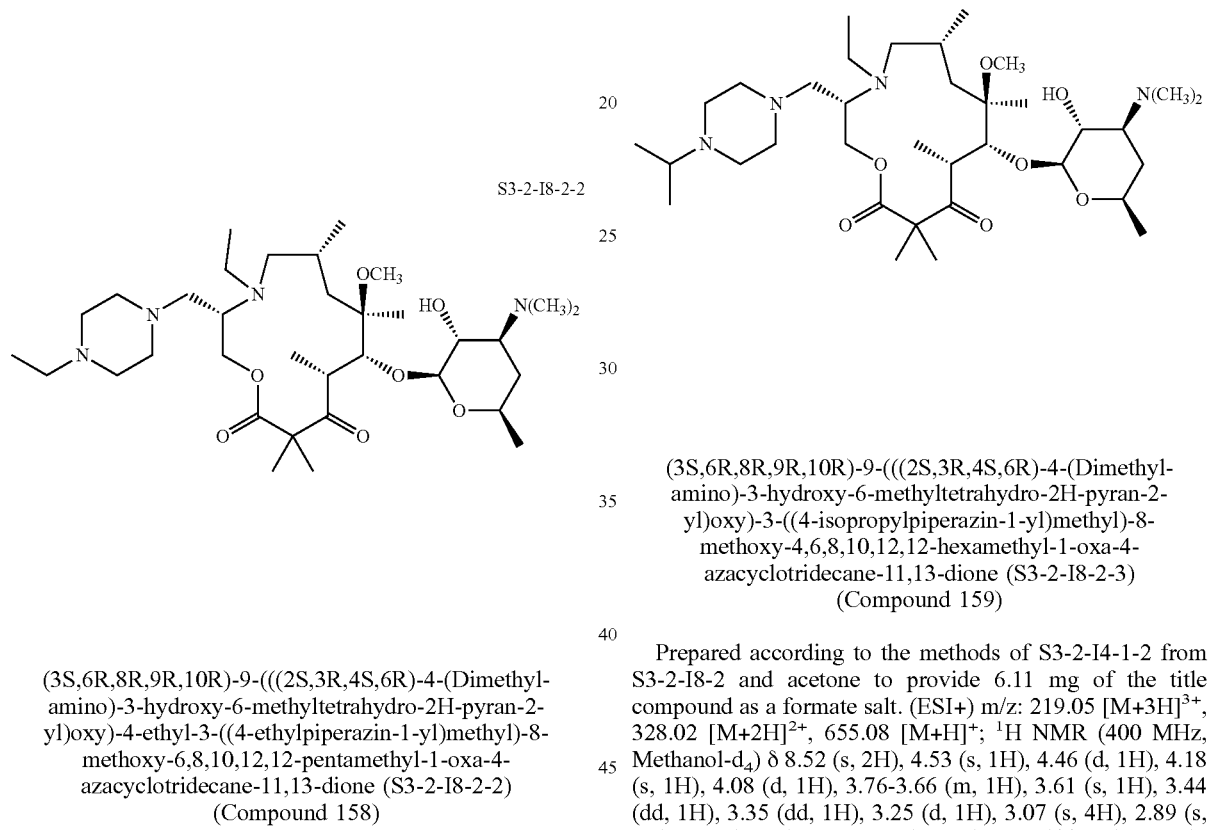

Scheme 4.

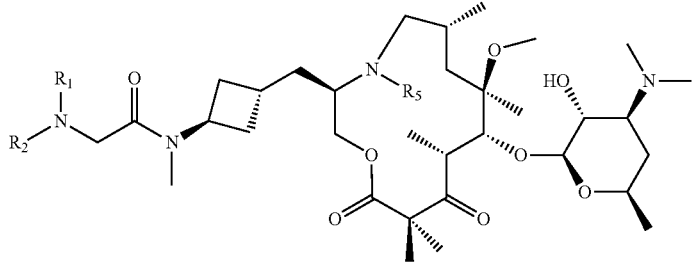

S4-3-I8-R₅

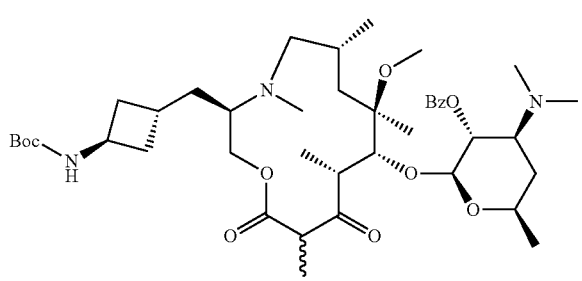

S1-5-I8-1

(2S,3R,4S,6R)-2-(((3R,6R,8R,9R,10R)-3-(((1r,3S)-3-((tert-Butoxycarbonyl)amino)cyclobutyl)methyl)-8-methoxy-4,6,8,10,12-pentamethyl-11,13-dioxo-1-oxa-4-azacyclotridecan-9-yl)oxy)-4-(dimethylamino)-6-methyltetrahydro-2H-pyran-3-yl benzoate (S1-5-I8-1)

Prepared according to the methods of S1-5-I1-1, substituting 18, to give 218 mg of the title compound. MS (ESI+) m/z: 387.72 [M+2H]²⁺, 774.25 [M+H]⁺; ¹H NMR (400 MHz, Chloroform-d) δ 8.10-7.90 (m, 2H), 7.56 (t, 1H), 7.44 (t, 2H), 5.04 (dd, 1H), 4.76-4.61 (m, 1H), 4.55 (d, 1H), 4.35 (s, 1H), 4.23-4.09 (m, 1H), 4.06 (d, 1H), 3.72 (t, 1H), 3.62-3.44 (m, 2H), 3.44-3.19 (m, 1H), 2.91 (d, 1H), 2.87-2.78 (m, 1H), 2.77 (s, 2H), 2.70-2.58 (m, 1H), 2.46 (d, 1H), 2.37-2.29 (m, 1H), 2.26 (s, 4H), 2.16 (s, 2H), 2.09 (s, 1H), 2.07-1.86 (m, 5H), 1.80 (t, 2H), 1.43 (s, 9H), 1.34-1.30 (m, 1H), 1.27 (d, 3H), 1.22 (s, 3H), 1.18 (d, 3H), 0.99 (dd, 4H), 0.83 (dd, 3H).

(2S,3R,4S,6R)-2-(((3R,6R,8R,9R,10R)-3-(((1r,3S)-3-((tert-Butoxycarbonyl)(methyl)amino)cyclobutyl)methyl)-8-methoxy-4,6,8,10,12,12-hexamethyl-11,13-dioxo-1-oxa-4-azacyclotridecan-9-yl)oxy)-4-(dimethylamino)-6-methyltetrahydro-2H-pyran-3-yl benzoate (S4-1-I8-1)

S1-5-I8-1 (212 mg, 0.273 mmol) was dissolved in 1,2-dimethoxyethane (2.72 mL), and the reaction mixture was cooled to −78° C. in a dry ice/acetone bath. Potassium bis(trimethylsilyl)amide (1.0 M solution in THF; 0.818 mL, 0.818 mmol) was added. After 5 min, dimethyl sulfate (0.128 mL, 1.36 mmol) was added. The dry ice was removed from the acetone bath, and the reaction mixture was allowed to slowly warm to −10° C. over 50 min. Triethylamine (0.378 mL, 2.27 mmol) was added and the reaction was warmed to room temperature over 30 min. The reaction was quenched by the addition of NH₄Cl (sat., aq. solution) and was diluted with EtOAc. The EtOAc layer was washed with water (2 times) and brine (1 time), was dried over Na₂SO₄, filtered and concentrated. The residue was purified on 12 g of silica gel (elution with 0-12% MeOH-dichloromethane-0.5% NH₄OH gradient) to give the 120 mg of the title compound. MS (ESI+) m/z: 401.77 [M+2H]²⁺, 802.19 [M+H]⁺; ¹H NMR (400 MHz, Chloroform-d) δ 8.08-7.97 (m, 2H), 7.59-7.49 (m, 1H), 7.43 (t, 2H), 5.03 (dd, 1H), 4.60 (d, 2H), 4.04-3.86 (m, 3H), 3.58 (dd, 1H), 3.51-3.36 (m, 1H), 2.82 (d, 7H), 2.50-2.39 (m, 1H), 2.25 (s, 7H), 2.21 (s, 3H), 2.05-1.96 (s, 1H), 1.95-1.79 (m, 4H), 1.80-1.57 (m, 3H), 1.43 (s, 9H), 1.38 (s, 4H), 1.31 (s, 3H), 1.27 (d, 4H), 1.22 (s, 3H), 1.04 (d, 3H), 0.94 (dd, 1H), 0.83 (d, 4H).

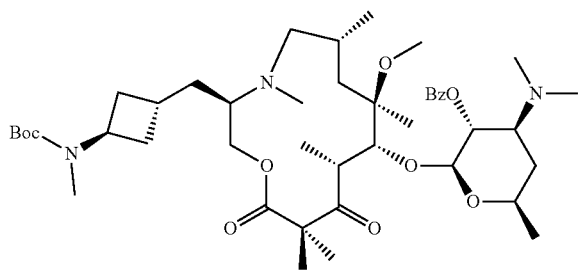

S4-1-I8-1

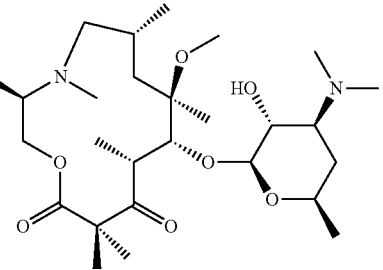

S4-2-I8-1-1

(3R,6R,8R,9R,10R)-9-(((2S,3R,4S,6R)-4-(Dimethyl-amino)-3-hydroxy-6-methyltetrahydro-2H-pyran-2-yl)oxy)-3-(((1r,3S)-3-(dimethylamino)cyclobutyl)methyl)-8-methoxy-4,6,8,10,12,12-hexamethyl-1-oxa-4-azacyclotridecane-11,13-dione (S4-2-I8-1-1) (Compound 111)

A solution of S4-1-I8-1 (120 mg, 0.149 mmol) in dichloromethane (1 mL) and trifluoroacetic acid (0.25 mL) was stirred at room temperature for 2 hr and concentrated. The residue was suspended in ethyl acetate and washed with sat. aq. NaHCO$_3$ (2 times), the washed solution was dried over sodium sulfate, filtered and concentrated in vacuo. The resulting secondary amine (25 mg, 0.0356 mmol) was dissolved in dichloromethane (1 mL), Na(OAc)$_3$BH (15 mg, 0.0712 mmol) followed by formaldehyde (37 wt % aqueous solution, 0.0238 mL, 0.356 mmol) was added. After 15 min, the reaction mixture was quenched with sat. aq. NaHCO$_3$ and extracted with dichloromethane (3 times). The combined extracts were concentrated in vacuo. The residue was dissolved in methanol (1.5 mL), and the reaction mixture was heated to 45° C. external temperature for 16 hr. Solvent was removed in vacuo and the residue was purified by HPLC (Atlantis T3 column, 2-40% MeCN-water-0.1% HCO$_2$H) to give the title compound as a formate salt (15.8 mg, 0.0236 mmol, 61%). MS (ESI+) m/z: 204.79 [M+3H]$^{3+}$, 306.59 [M+2H]$^{2+}$, 612.21 [M+H]$^+$; $^1$H NMR (400 MHz, Methanol-d$_4$) δ 8.55 (s, 2H), 4.69 (s, 1H), 4.42 (d, 1H), 4.36-4.01 (m, 2H), 3.68 (ddd, 2H), 3.36 (dd, 1H), 3.24-2.69 (m, 9H), 2.60 (s, 7H), 2.40-2.14 (m, 10H), 1.94 (dd, 4H), 1.88-1.69 (m, 1H), 1.52 (s, 3H), 1.47-1.25 (m, 13H), 1.03 (s, 3H).

(3R,6R,8R,9R,10R)-9-(((2S,3R,4S,6R)-4-(dimethyl-amino)-3-hydroxy-6-methyltetrahydro-2H-pyran-2-yl)oxy)-3-(((1r,3S)-3-(isobutyl(methyl)amino)cyclobutyl)methyl)-8-methoxy-4,6,8,10,12,12-hexamethyl-1-oxa-4-azacyclotridecane-11,13-dione (S4-2-I8-1-2) (Compound 134)

Prepared according to the methods of S4-2-I8-1-1, substituting isobutyraldehyde to provide 11.09 mg of the title compound as a formate salt. MS (ESI+) m/z: 218.78 [M+3H]$^{3+}$, 327.61 [M+2H]$^{2+}$, 654.31 [M+H]$^+$; 1H NMR (400 MHz, Methanol-d$_4$) δ 8.54 (s, 2.5H), 4.66 (s, 1H), 4.44 (d, 1H), 4.33-4.12 (m, 2H), 3.72 (ddd, 1H), 3.66 (s, 0.5H), 3.53 (s, 1H), 3.47-3.34 (m, 2H), 3.34-3.26 (m, 1H), 3.04 (s, 5H), 2.84 (s, 3H), 2.76 (s, 6H), 2.58-2.30 (m, 8H), 2.29-1.94 (m, 6H), 1.87-1.57 (m, 3H), 1.56-1.44 (m, 4H), 1.40 (d, 6H), 1.33 (dd, 6H), 1.05 (d, 3H), 1.01 (d, 6H).

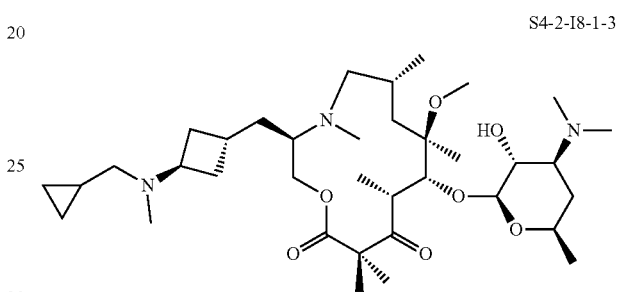

S4-2-I8-1-3

(3R,6R,8R,9R,10R)-3-(((1r,3S)-3-((cyclopropylmethyl)(methyl)amino)cyclobutyl)methyl)-9-(((2S,3R,4S,6R)-4-(dimethylamino)-3-hydroxy-6-methyltetrahydro-2H-pyran-2-yl)oxy)-8-methoxy-4,6,8,10,12,12-hexamethyl-1-oxa-4-azacyclotridecane-11,13-dione (S4-2-I8-1-3) (Compound 138)

Prepared according to the methods of S4-2-I8-1-1, substituting cyclopropanecarboxaldehyde to provide 16.73 mg of the title compound as a formate salt. MS (ESI+) m/z: 218.12 [M+3H]$^{3+}$, 326.61 [M+2H]$^{2+}$, 652.27 [M+H]$^+$; $^1$H NMR (400 MHz, Methanol-d$_4$) δ 8.55 (s, 2.6H), 4.65 (s, 1H), 4.44 (d, 1H), 4.32-4.13 (m, 2H), 3.78-3.67 (m, 2H), 3.60 (s, 0.4H), 3.48-3.34 (m, 2H), 3.35-3.25 (m, 1H), 3.04 (s, 4H), 2.90-2.77 (m, 4H), 2.76 (s, 7H), 2.69 (s, 3H), 2.59-2.34 (m, 3H), 2.27-1.95 (m, 5H), 1.87-1.58 (m, 3H), 1.56-1.44 (m, 4H), 1.39 (d, 6H), 1.33 (dd, 6H), 1.15-0.96 (m, 4H), 0.76-0.68 (m, 2H), 0.42-0.28 (m, 2H).

Scheme 5.

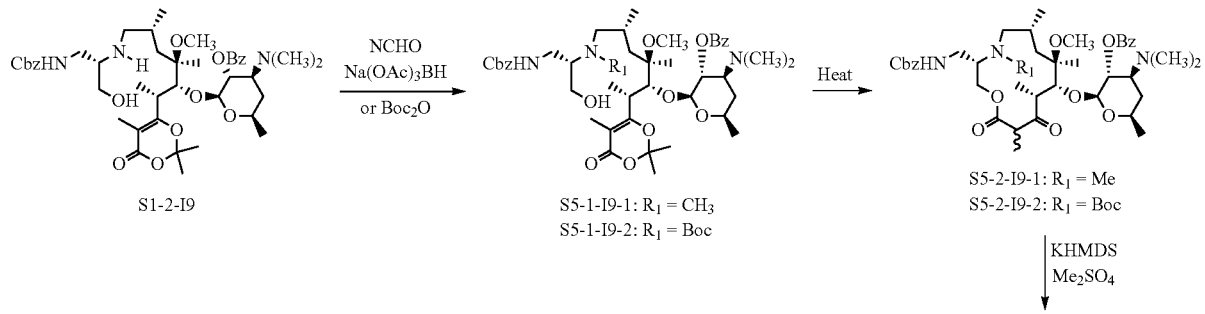

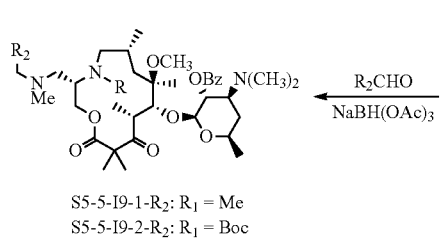
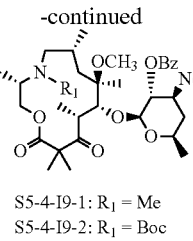
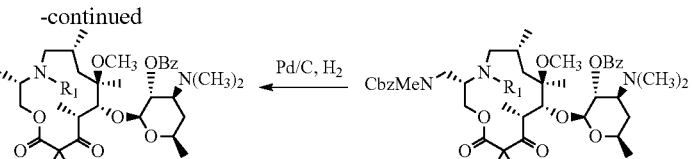

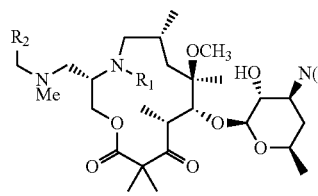
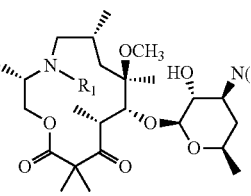
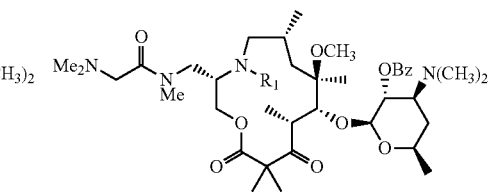

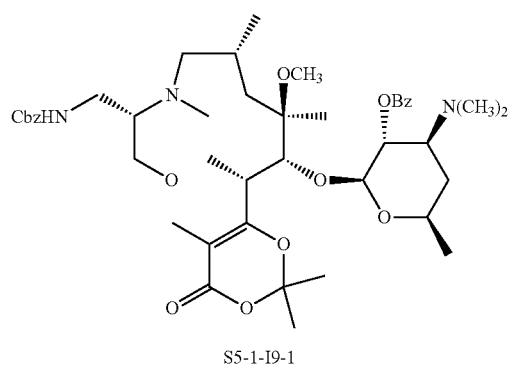

S5-1-I9-1

(2S,3R,4S,6R)-2-(((2R,3R,4R,6R)-7-(((S)-1-(((ben-zyloxy)carbonyl)amino)-3-hydroxypropan-2-yl)(methyl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (S5-1-I9-1)

S1-2-I9 (380 mg, 0.48 mmol) was dissolved in dry methylene chloride (5 mL) and formaldehyde (0.38 mL, 4.8 mmol) was added. Then NaBH(OAc)$_3$ (201 mg, 0.96 mmol) was added to the reaction mixture in one portion. The reaction was allowed to stir at rt for 10 min and LC/MS shows full conversion. The reaction was quenched by adding saturated NaHCO$_3$ (5 mL) and the aqueous layer was extracted with methylene chloride three times (10 mL) The combined organic layers were dried over MgSO$_4$, filtered and concentrated. The residue was purified on 24 g of silica gel (elution with 0-10% MeOH-dichloromethane+0.5% of 30% aq NH$_4$OH) to give the title compound as a white solid (310 mg, 80%). MS (ESI+) m/z: 406.8 [M+2H]$^{2+}$, 812.5 [M+H]$^+$.

S5-1-I9-2

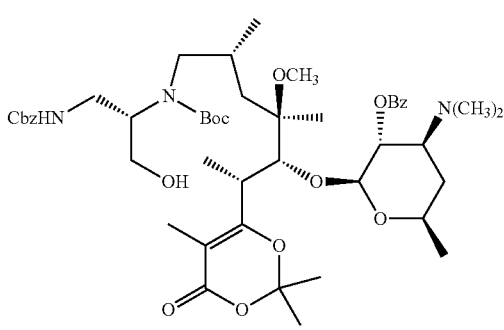

(2S,3R,4S,6R)-2-(((2R,3R,4R,6R)-7-(((S)-1-(((Benzyloxy)carbonyl)amino)-3-hydroxypropan-2-yl)(tert-butoxycarbonyl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (S5-1-I9-2)

In a 40 mL vial was a solution of S1-2-I9 (410 mg, 0.51 mmol) in dichloromethane (5 mL) to give a yellow solution which was stirred at rt. Boc₂O (0.12 mL, 0.51 mmol) was added in one portion and allowed to stir at rt for 2 hours. The reaction was diluted with dichloromethane and poured into satd aq NaHCO₃. The aqueous phase was extracted with dichloromethane and the combined organic phases were dried over MgSO₄, filtered and concentrated. The residue was purified on 24 g silica gel (elution with 0-6% MeOH-dichloromethane) to give the title compound as a white solid (360 mg, 78%). MS (ESI+) m/z: 898.5 [M+H]⁺.

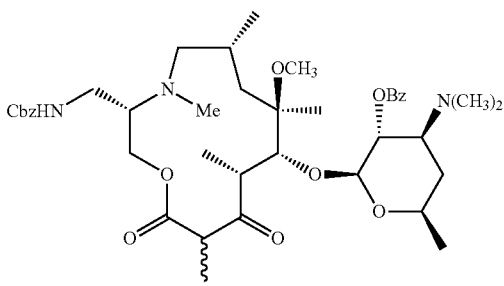

S5-2-I9-1

(2S,3R,4S,6R)-2-(((3S,6R,8R,9R,10R)-3-((((benzyloxy)carbonyl)amino)methyl)-8-methoxy-4,6,8,10,12-pentamethyl-11,13-dioxo-1-oxa-4-azacyclotridecan-9-yl)oxy)-4-(dimethylamino)-6-methyltetrahydro-2H-pyran-3-yl benzoate (S5-2-I9-1)

S5-1-I9-1 (310 mg, 0.38 mmol) was concentrated twice from toluene in a 250 mL flask.

The flask was fitted with a reflux condenser and the condenser was flame dried under vacuum, allowed to cool and backfilled with nitrogen. Chlorobenzene (95 mL) was added via cannula and the flask was placed under mild vacuum and sonicated for 2 minutes, then backfilled with nitrogen. The degassing procedure was repeated, then the mixture was heated at a bath temperature of 155° C. for 16 hours and then at a bath temperature of 165° C. for 4 hours. The reaction was allowed to cool to rt and was concentrated. The residue was purified on 24 g of silica gel (elution with 0-10% MeOH-dichloromethane+0.5% of 30% aq NH₄OH) to give the title compound as a white solid (242 mg, 82%). MS (ESI+) m/z: 377.7 [M+2H]²⁺, 754.4 [M+H]⁺.

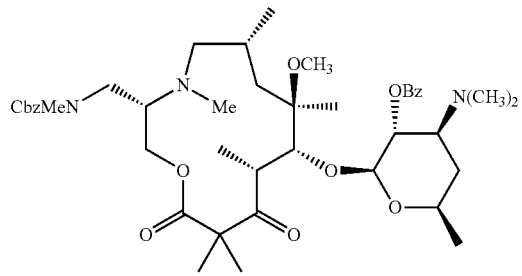

S5-3-I9-1

(2S,3R,4S,6R)-2-(((3S,6R,8R,9R,10R)-3-((((Benzyloxy)carbonyl)(methyl)amino)methyl)-8-methoxy-4,6,8,10,12,12-hexamethyl-11,13-dioxo-1-oxa-4-azacyclotridecan-9-yl)oxy)-4-(dimethylamino)-6-methyltetrahydro-2H-pyran-3-yl benzoate (S5-3-I9-1)

In a 20 mL vial was a solution of S5-2-I9-1 (242 mg, 0.32 mmol) in 1,2-dimethoxyethane (5 mL) precooled at −60° C. KHMDS (0.96 mL, 0.96 mmol) was added dropwise. The reaction mixture was stirred at −60° C. for 20 min. Then Me2SO₄ (150 µL, 1.59 mmol) was added. The reaction mixture was allowed to warm to −15° C. LC/MS shows full conversion. The reaction was quenched by adding triethylamine (1 mL) and the resulting mixture was diluted with dichloromethane and saturated NaHCO₃ was added. The aqueous layer was extracted with dichloromethane and the combined organic layers were dried over MgSO₄, filtered and concentrated. The residue was purified on 4 g of silica gel (elution with 0-10% MeOH-dichloromethane+0.5% of 30% aq NH₄OH) to give the title compound as a white solid (220 mg, 88%). MS (ESI+) m/z: 391.8 [M+2H]²⁺, 782.5 [M+H]⁺.

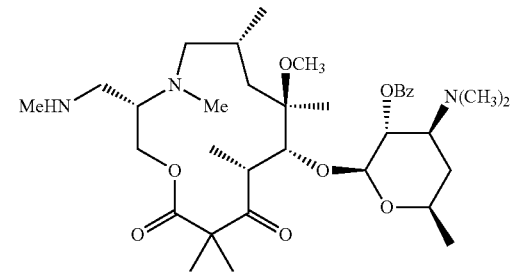

S5-4-I9-1

(2S,3R,4S,6R)-4-(Dimethylamino)-2-(((3S,6R,8R,9R,10R)-8-methoxy-4,6,8,10,12,12-hexamethyl-3-((methylamino)methyl)-11,13-dioxo-1-oxa-4-azacyclotridecan-9-yl)oxy)-6-methyltetrahydro-2H-pyran-3-yl benzoate (S5-4-I9-1)

S5-3-I9-1 (220 mg, 0.28 mmol) was dissolved in EtOAc (5 mL) and AcOH (32 µL, 0.56 mmol) was added. The reaction mixture was sonicated briefly under mild vacuum, then backfilled with nitrogen. Pd/C (60 mg, 0.028 mmol) was added and the mixture was stirred under streaming hydrogen for 10 minutes, then under static hydrogen until LC/MS indicated complete consumption of starting material. The reaction mixture was filtered through a syringe filter with the aid of EtOAc, and saturated NaHCO$_3$ (5 mL) was added. The aqueous layer was extracted with methylene chloride three times (10 mL). The combined organic layers were dried over MgSO$_4$, filtered and concentrated. The crude title compound (154 mg, 85%) was used in the next step without further purification. MS (ESI+) m/z: 216.8 [M+3H]$^{3+}$, 324.7 [M+2H]$^{2+}$, 648.4 [M+H]$^{+}$.

S5-7-I9-1-1

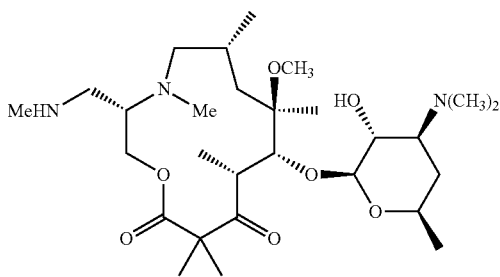

(3S,6R,8R,9R,10R)-9-(((2S,3R,4S,6R)-4-(Dimethyl-amino)-3-hydroxy-6-methyltetrahydro-2H-pyran-2-yl)oxy)-8-methoxy-4,6,8,10,12,12-hexamethyl-3-((methylamino)methyl)-1-oxa-4-azacyclotridecane-11,13-dione (S5-7-I9-1-1) (Compound 9)

S5-4-I9-1 (39 mg, 0.06 mmol) was dissolved in MeOH (0.5 mL) and heated at 60° C. until LC/MS indicated complete consumption of starting material (16 hours). The reaction mixture was filtered through a syringe filter with the aid of methanol and concentrated. The residue was purified by HPLC (MeCN-water-0.1% HCO$_2$H) to yield 9.07 mg of the title compound as a formate salt. MS (ESI+) m/z: 182.1 [M+3H]$^{3+}$, 272.7 [M+2H]$^{2+}$, 544.4 [M+H]$^{+}$; $^1$H NMR (400 MHz, Methanol-d$_4$) δ 8.50 (s, 3H), 4.45 (dd, 1H), 4.23 (dd, 1H), 4.10 (d, 1H), 3.77-3.65 (m, 1H), 3.55-3.27 (m, 4H), 3.17-3.03 (m, 1H), 2.90 (d, 3H), 2.81 (d, 7H), 2.69 (d, 1H), 2.65 (s, 2H), 2.33 (s, 1H), 2.06-1.97 (m, 1H), 1.53 (s, 3H), 1.51-1.43 (m, 1H), 1.37-1.19 (m, 12H), 0.97 (dd, 3H).

S5-7-I9-2-1

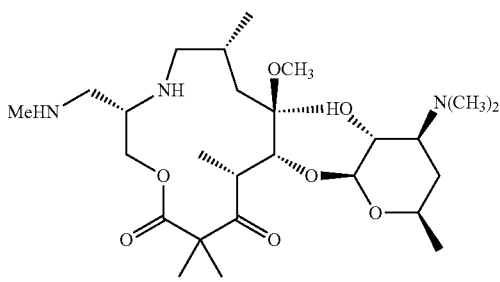

(3S,6R,8R,9R,10R)-9-(((2S,3R,4S,6R)-4-(Dimethyl-amino)-3-hydroxy-6-methyltetrahydro-2H-pyran-2-yl)oxy)-8-methoxy-6,8,10,12,12-pentamethyl-3-((methylamino)methyl)-1-oxa-4-azacyclotridecane-11,13-dione (S5-7-I9-2) (Compound 15)

S5-4-I9-2 (39 mg, 0.06 mmol) was dissolved in MeOH (0.5 mL) and heated at 60° C. until LC/MS indicated complete consumption of starting material (16 hours). The reaction mixture was cooled, and aqueous HCl (4 M, 52 µL, 4 equiv) was added. The reaction mixture was allowed to stir at rt until LC/MS indicated complete consumption of starting material. The reaction mixture was filtered through a syringe filter with the aid of methanol and concentrated. The residue was purified by HPLC (MeCN-water-0.1% HCO$_2$H) to yield 2.35 mg of the title compound as a formate salt. MS (ESI+) m/z: 177.5 [M+3H]$^{3+}$, 265.7 [M+2H]$^{2+}$, 530.4 [M+H]$^{+}$; $^1$H NMR (400 MHz, Methanol-d$_4$) δ 8.50 (s, 3H), 4.57 (dd, 1H), 4.47 (d, 1H), 4.07-3.95 (m, 2H), 3.82-3.67 (m, 2H), 3.50-3.37 (m, 2H), 3.32 (h, 3H), 3.21 (d, 1H), 3.10-2.86 (m, 3H), 2.86-2.78 (m, 8H), 2.73-2.52 (m, 5H), 2.02 (dt, 1H), 1.92 (s, 1H), 1.63 (dd, 1H), 1.49 (ddd, 4H), 1.37-1.18 (m, 12H), 1.01 (dd, 3H).

S5-5-I9-1-1

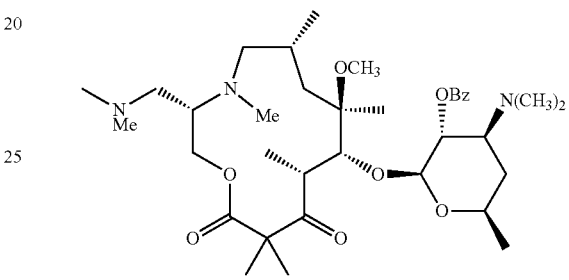

(2S,3R,4S,6R)-4-(Dimethylamino)-2-(((3S,6R,8R, 9R,10R)-3-((dimethylamino)methyl)-8-methoxy-4,6, 8,10,12,12-hexamethyl-11,13-dioxo-1-oxa-4-azacy-clotridecan-9-yl)oxy)-6-methyltetrahydro-2H-pyran-3-yl benzoate (S5-5-I9-1-1) (Compound 5)

S5-4-I9-1 (37 mg, 0.057 mmol) was dissolved in dry methylene chloride (1 mL) and formaldehyde (0.046 mL, 0.57 mmol) was added. Then NaBH(OAc)$_3$ (24 mg, 0.12 mmol) was added to the reaction mixture in one portion. The reaction was allowed to stir at rt for 10 min and LC/MS shows full conversion. The reaction was quenched by adding saturated NaHCO$_3$ (5 mL) and the aqueous layer was extracted with methylene chloride three times (10 mL). The combined organic layers were dried over MgSO$_4$, filtered and concentrated. The residue was purified on 4 g of silica gel (elution with 0-10% MeOH-dichloromethane+0.5% of 30% aq NH$_4$OH) to give 37 mg of the title compound. MS (ESI+) m/z: 221.5 [M+3H]$^{3+}$, 331.7 [M+2H]$^{2+}$, 662.4 [M+H]$^{+}$.

S5-6-I9-1-1

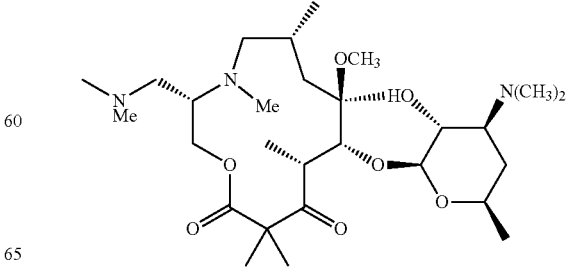

(3S,6R,8R,9R,10R)-9-(((2S,3R,4S,6R)-4-(dimethyl-
amino)-3-hydroxy-6-methyltetrahydro-2H-pyran-2-
yl)oxy)-3-((dimethylamino)methyl)-8-methoxy-4,6,
8,10,12,12-hexamethyl-1-oxa-4-azacyclotridecane-
11,13-dione (S5-6-I9-1-1)

S5-5-I9-1-1 (37 mg, 0.06 mmol) was dissolved in MeOH (0.5 mL) and heated at 60° C. until LC/MS indicated complete consumption of starting material (16 hours). The reaction mixture was filtered through a syringe filter with the aid of methanol and concentrated. The residue was purified by HPLC (MeCN-water-0.1% HCO$_2$H) to yield 9.07 mg of the title compound as a formate salt. MS (ESI+) m/z: 186.8 [M+3H]$^{3+}$, 279.7 [M+2H]$^{2+}$, 558.4 [M+H]$^+$; $^1$H NMR (400 MHz, Methanol-d$_4$) δ 8.55 (s, 3H), 4.42 (d, 2H), 4.14 (d, 3H), 3.68 (dtt, 2H), 3.49 (t, 1H), 3.44-3.28 (m, 4H), 3.13 (s, 2H), 3.02 (s, 1H), 2.80 (s, 1H), 2.67 (d, 11H), 2.44 (dd, 3H), 2.33 (d, 11H), 1.94 (ddd, 2H), 1.44 (t, 5H), 1.38 (s, 6H), 1.36-1.27 (m, 12H), 1.23 (d, 2H), 1.03 (s, 2H), 0.95 (d, 1H).

S5-6-I9-1-2

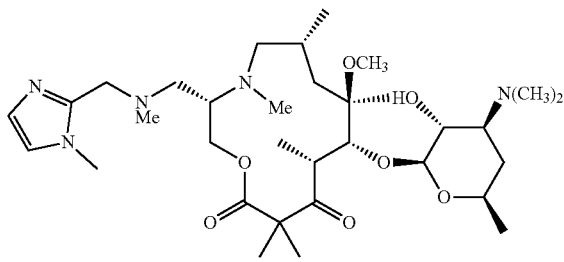

(3S,6R,8R,9R,10R)-9-(((2S,3R,4S,6R)-4-(Dimethyl-
amino)-3-hydroxy-6-methyltetrahydro-2H-pyran-2-
yl)oxy)-8-methoxy-4,6,8,10,12,12-hexamethyl-3-
((methyl((1-methyl-11H-imidazol-2-yl)methyl)
amino)methyl)-1-oxa-4-azacyclotridecane-11,13-
dione (S5-6-I9-1-2) (Compound 104)

Prepared according to the methods of S5-6-I9-1-1, substituting 1-methyl-1H-imidazole-2-carbaldehyde to provide 14.35 mg of the title compound as a formate salt. MS (ESI+) m/z: 240.5 [M+3H]$^{3+}$, 360.3 [M+2H]$^{2+}$, 719.5 [M+H]$^+$; $^1$H NMR (400 MHz, Methanol-d$_4$) δ 8.45 (s, 3H), 7.12 (d, 1H), 6.93 (d, 1H), 4.43 (d, 11H), 4.20 (d, 11H), 4.11 (d, 1H), 3.78-3.66 (m, 5H), 3.66-3.56 (m, 11H), 3.49-3.34 (m, 3H), 3.30 (q, 11H), 3.04 (d, 4H), 2.80 (d, 7H), 2.50 (dt, 11H), 2.39 (s, 3H), 2.07-1.97 (m, 11H), 1.58-1.41 (m, 5H), 1.41-1.21 (m, 13H), 0.98 (d, 3H).

S5-6-I9-2-1

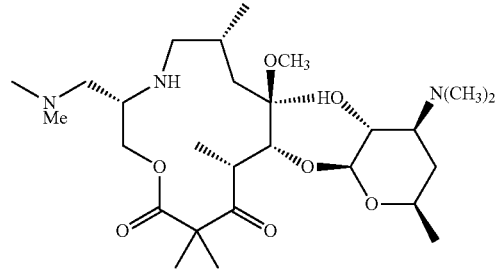

(3S,6R,8R,9R,10R)-9-(((2S,3R,4S,6R)-4-(dimethyl-
amino)-3-hydroxy-6-methyltetrahydro-2H-pyran-2-
yl)oxy)-3-((dimethylamino)methyl)-8-methoxy-6,8,
10,12,12-pentamethyl-1-oxa-4-azacyclotridecane-11,
13-dione (S5-6-I9-2-1) (Compound 17)

S5-5-I9-2-1, prepared by the methods of S5-5-I9-1-1 from S5-5-I9-2-1, (39 mg, 0.06 mmol) was dissolved in MeOH (0.5 mL) and heated at 60° C. until LC/MS indicated complete consumption of starting material (16 hours). The reaction mixture was cooled, and aqueous HCl (4 M, 52 µL, 4 equiv) was added. The reaction mixture was allowed to stir at rt until LC/MS indicated complete consumption of starting material. The reaction mixture was filtered through a syringe filter with the aid of methanol and concentrated. The residue was purified by HPLC (MeCN-water-0.1% HCO$_2$H) to yield 2.33 mg of the title compound as a formate salt. MS (ESI+) m/z: 182.1 [M+3H]$^{3+}$, 272.7 [M+2H]$^{2+}$, 544.4 [M+H]$^+$; $^1$H NMR (400 MHz, Methanol-d$_4$) δ 8.52 (s, 3H), 4.47 (d, 11H), 4.11 (d, 11H), 3.97 (dd, 11H), 3.77-3.61 (m, 3H), 3.44 (dd, 1H), 3.31 (dt, 4H), 2.94 (s, 3H), 2.83 (d, 2H), 2.77 (s, 6H), 2.70-2.58 (m, 2H), 2.58-2.46 (m, 1H), 2.46-2.38 (m, 2H), 2.37 (s, 4H), 2.03 (d, 2H), 1.72 (dd, 1H), 1.63 (dd, 1H), 1.50 (d, 3H), 1.34 (dd, 13H), 1.06 (d, 3H).

S5-8-I9-1-1

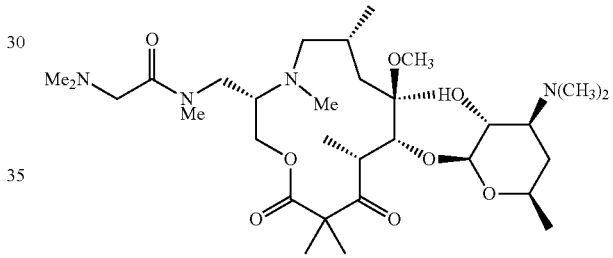

2-(dimethylamino)-N-(((3S,6R,8R,9R,10R)-9-(((2S,
3R,4S,6R)-4-(dimethylamino)-3-hydroxy-6-methyl-
tetrahydro-2H-pyran-2-yl)oxy)-8-methoxy-4,6,8,10,
12,12-hexamethyl-11,13-dioxo-1-oxa-4-
azacyclotridecan-3-yl)methyl)-N-methylacetamide
(S5-8-I9-1-1) (Compound 13)

S5-4-I9-1 (43 mg, 0.066 mmol) was dissolved in DMF (0.5 mL). DIEA (34 µL, 0.20 mmol), dimethylglycine (10.2 mg, 0.10 mmol) and HATU (33 mg, 0.086 mmol) were added at rt. The reaction mixture was allowed to stir at rt for 2 h. LC/MS indicated complete consumption of starting material. The reaction mixture was diluted with dichloromethane and quenched by adding aqueous NaHCO$_3$ (10 mL). The aqueous layer was extracted with dichloromethane and the combined organic layers were dried over MgSO$_4$, filtered and concentrated. The residue was purified on 4 g of silica gel (elution with 0-10% MeOH-dichloromethane+ 0.5% of 30% aq NH$_4$OH) to give a white solid (39 mg, 80%). MS (ESI+) m/z: 245.2 [M+3H]$^{3+}$, 367.3 [M+2H]$^{2+}$, 733.5 [M+H]$^+$. The material (39 mg, 0.06 mmol) was dissolved in MeOH (0.5 mL) and heated at 60° C. until LC/MS indicated complete consumption of starting material (16 hours). The reaction mixture was filtered through a syringe filter with the aid of methanol and concentrated. The residue was purified by HPLC (MeCN-water-0.1% HCO$_2$H) to yield 5.49 mg of the title compound as a formate salt. MS (ESI+) m/z: 210.3 [M+3H]$^{3+}$, 314.7 [M+2H]$^{2+}$, 628.4 [M+H]$^{+}$; $^1$H NMR (400 MHz, Methanol-d$_4$) δ 8.27 (s, 3H), 4.57 (dd, 1H), 4.36 (d, 1H), 4.23-4.01 (m, 4H), 3.96-3.83 (m, 3H), 3.60 (q, 2H), 3.49 (dd, 2H), 3.32 (p, 2H), 3.17 (dd, 2H), 3.01 (d, 3H), 2.94 (s, 4H), 2.85 (d, 8H), 2.75 (d, 1H), 2.71 (s, 2H), 2.62 (ddd, 1H), 2.11 (d, 1H), 1.79 (d, 1H), 1.69 (s, 3H), 1.59 (s, 1H), 1.41-1.16 (m, 12H), 0.99 (qd, 7H), 0.84-0.74 (m, 2H), 0.69 (dd, 2H).

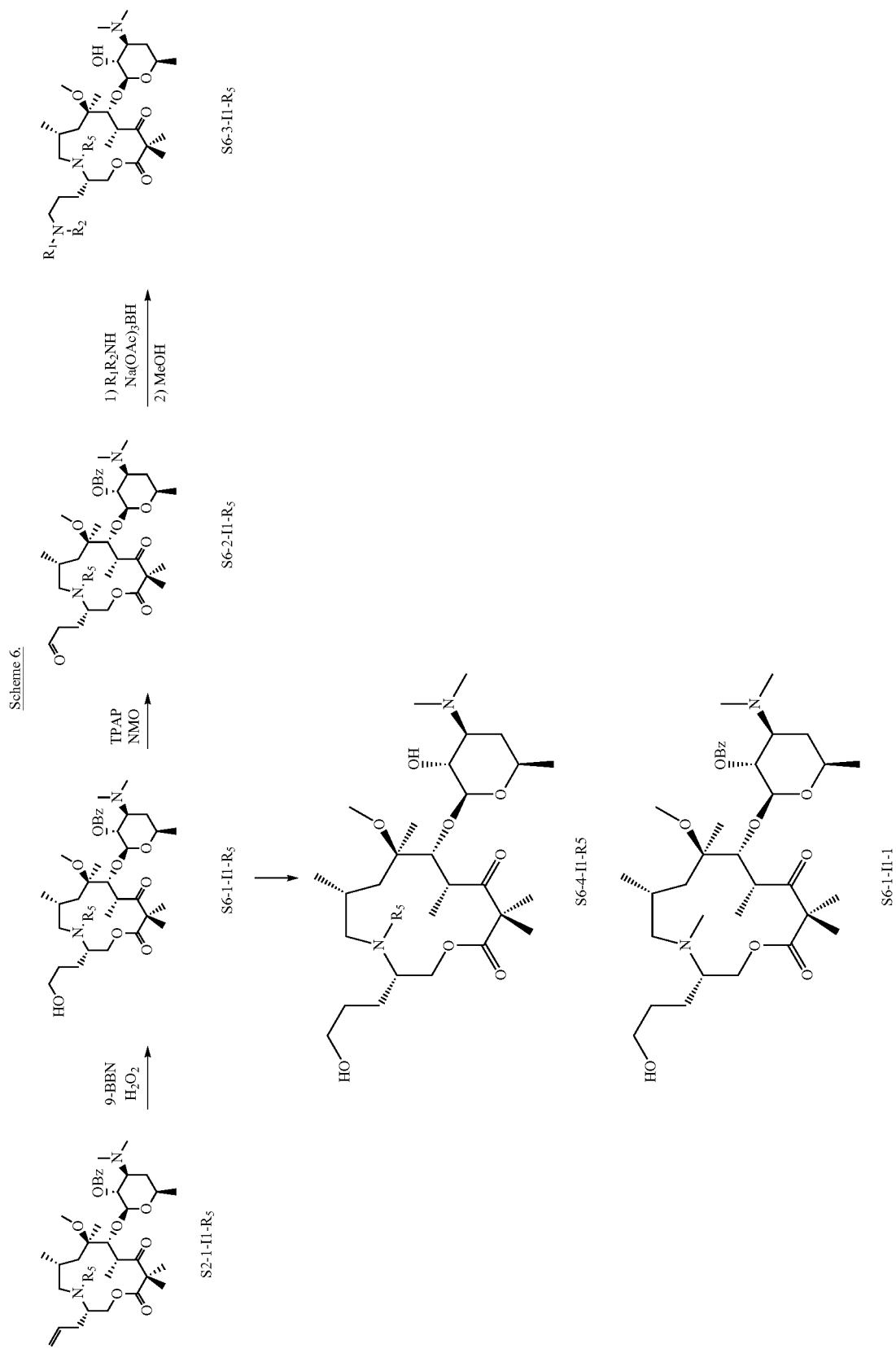

(2S,3R,4S,6R)-4-(dimethylamino)-2-(((3S,6R,8R, 9R,10R)-3-(3-hydroxypropyl)-8-methoxy-4,6,8,10, 12,12-hexamethyl-11,13-dioxo-1-oxa-4-azacyclotri- decan-9-yl)oxy)-6-methyltetrahydro-2H-pyran-3-yl benzoate (S6-1-I1-1)

To S2-1-I1-1 (240 mg, 0.372 mmol) in dry THF (3.7 mL) was added 9-BBN (0.5M solution in THF, 2.22 mL, 1.11 mmol). After 30 min at rt, the mixture was cooled to 0° C. and NaOH (6 N aqueous solution, 371 µL, 2.23 mmol) and $H_2O_2$ (30% aqueous solution, 252 µL, 2.23 mmol) were added. After 15 min, the mixture was extracted with t-butyl-methylether/EtOAc (2:1) three times. The organic layer was washed with water (1 time) and brine (1 time) and was dried over $Na_2SO_4$. After the solvent was removed, the residue was purified on 4 g of silica gel (elution with 0-20% MeOH-dichloromethane/0.5% $NH_4OH$ gradient) to give the title compound as a white solid (145 mg, 59%). MS (ESI+) m/z: 663.37 [M+H]$^+$; $^1$H NMR (400 MHz, Chloroform-d) δ 8.08-7.94 (m, 2H), 7.55 (dd, 1H), 7.44 (t, 2H), 5.03 (dd, 1H), 4.57 (d, 1H), 4.10 (dd, 1H), 4.01 (d, 1H), 3.95 (dd, 1H), 3.72-3.50 (m, 3H), 3.41 (dt, 1H), 3.04 (s, 1H), 2.87-2.81 (m, 1H), 2.80 (s, 3H), 2.32 (dd, 1H), 2.26 (s, 6H), 2.10 (t, 1H), 1.93 (d, 1H), 1.83-1.47 (m, 101H), 1.40 (s, 4H), 1.31-1.22 (m, 9H), 1.16-1.07 (m, 1H), 1.03 (d, 3H), 0.91 (d, 3H).

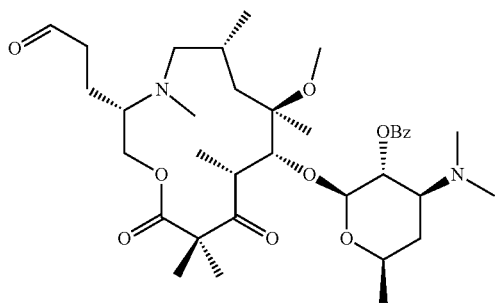

S6-2-I1-1

(2S,3R,4S,6R)-4-(dimethylamino)-2-(((3S,6R,8R, 9R,10R)-8-methoxy-4,6,8,10,12,12-hexamethyl-11, 13-dioxo-3-(3-oxopropyl)-1-oxa-4-azacyclotridecan-9-yl)oxy)-6-methyltetrahydro-2H-pyran-3-yl benzoate (S6-2-I1-1)

To S6-1-I1-1 (145 mg, 218 mmol) in dry dichloromethane/$CH_3CN$ (9:1, 2.9 mL) was added activated 4 A molecular sieves (100 mg, powdered), N-methylmorpholine N-oxide (33 mg, 283 mmol), and tetrapropylammonium perruthenate (4 mg, 10.9 mmol). After 1 h at RT, the solvent was removed. The dried residue was dissolved in t-butylmethylether/Hexane (1:1) and was filtered through celite (3 times). After the solvent was removed, the residue was dried under vacuum to give the aldehyde as a white foam. MS (ESI+) m/z: 661.35 [M+H]$^+$. Used directly in the next step.

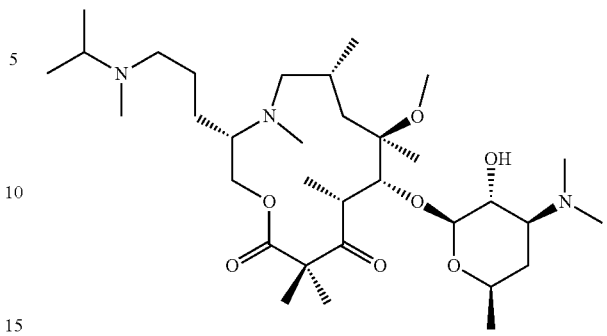

S6-3-I1-1-1

(3S,6R,8R,9R,10R)-9-(((2S,3R,4S,6R)-4-(dimethyl-amino)-3-hydroxy-6-methyltetrahydro-2H-pyran-2-yl)oxy)-3-(3-(isopropyl(methyl)amino)propyl)-8-methoxy-4,6,8,10,12,12-hexamethyl-1-oxa-4-azacyclotridecane-11,13-dione (S6-3-I1-1-1) (Compound 11)

A mixture of S6-2-I1-1 (25 mg, 37.8 mmol) and methylisopropyamine (8 mg, 113 mmol) in dichloromethane (2 mL) was stirred for 30 min, then NaBH(OAc)$_3$ (12 mg, 56.7 mmol) was added. After 20 min, the solvent was removed, and the residue was dissolved in MeOH (2 mL) and was heated at 50° C. overnight. The reaction was allowed to cool to rt and was concentrated. The residue was purified by HPLC (Atlantis T3 column, 5-50% MeCN-water-0.1% HCO$_2$H) to give 8.6 mg of the title compound as a formate salt. MS (ESI+) m/z: 614.48 [M+H]$^+$; $^1$H NMR (400 MHz, Methanol-d$_4$) δ 4.45 (d, 1H), 4.28 (d, 1H), 4.20 (d, 1H), 3.88-3.65 (m, 2H), 3.56 (hept, 1H), 3.51-3.23 (m, 4H), 3.05 (t, 7H), 2.79 (s, 8H), 2.72 (s, 3H), 2.17 (s, 1H), 2.02 (ddd, 1H), 1.84 (d, 4H), 1.67-1.41 (m, 7H), 1.45-1.19 (m, 19H), 1.05 (d, 3H).

S6-3-I1-1-2

(3S,6R,8R,9R,10R)-9-(((2S,3R,4S,6R)-4-(dimethyl-amino)-3-hydroxy-6-methyltetrahydro-2H-pyran-2-yl)oxy)-3-(3-(dimethylamino)propyl)-8-methoxy-4, 6,8,10,12,12-hexamethyl-1-oxa-4-azacyclotridecane-11,13-dione (S6-3-I1-1-2) (Compound 6)

Prepared according to the methods of S6-3-I1-1-1 from dimethylamine to give the title compound as a formate salt. MS (ESI+) m/z: 586.35 [M+H]$^+$; $^1$H NMR (400 MHz, Methanol-d$_4$) δ 4.44 (d, 1H), 4.27 (s, 3H), 3.71 (q, 2H), 3.41

(t, 2H), 3.32 (p, 6H), 3.22 (s, 1H), 3.06 (s, 4H), 2.70 (s, 10H), 2.47 (s, 5H), 2.07-1.89 (m, 2H), 1.69 (s, 4H), 1.60-1.21 (m, 16H), 1.06 (s, 3H).

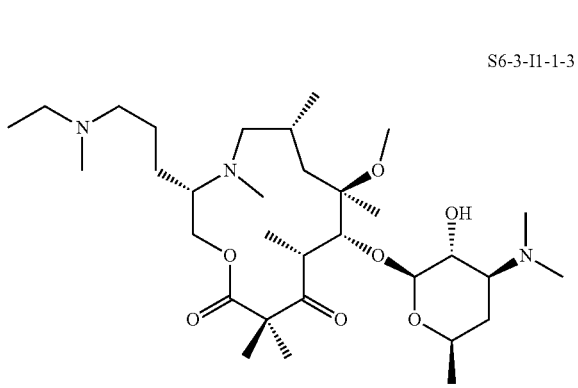

(3S,6R,8R,9R,10R)-9-(((2S,3R,4S,6R)-4-(dimethyl-amino)-3-hydroxy-6-methyltetrahydro-2H-pyran-2-yl)oxy)-3-(3-(ethyl(methyl)amino)propyl)-8-methoxy-4,6,8,10,12,12-hexamethyl-1-oxa-4-azacyclotridecane-11,13-dione (S6-3-I1-1-3) (Compound 20)

Prepared according to the methods of S6-3-I1-1-1 from ethylmethylamine to give the title compound as a formate salt. MS (ESI+) m/z: 600.41 [M+H]$^+$; $^1$H NMR (400 MHz, Methanol-d$_4$) δ 4.45 (d, 1H), 4.40-4.15 (m, 2H), 3.82-3.61 (m, 2H), 3.53-3.25 (m, 4H), 3.04 (q, 10H), 2.88-2.61 (m, 12H), 2.18 (d, 1H), 2.06-1.97 (m, 1H), 1.86 (t, 4H), 1.62-1.44 (m, 5H), 1.45-1.23 (m, 16H), 1.10-0.95 (m, 3H).

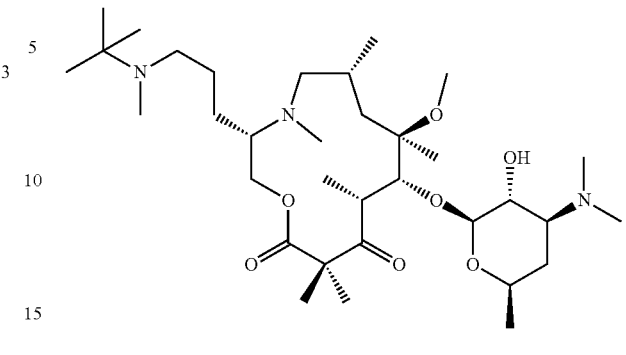

(3S,6R,8R,9R,10R)-3-(3-(tert-butyl(methyl)amino) propyl)-9-(((2S,3R,4S,6R)-4-(dimethylamino)-3-hydroxy-6-methyltetrahydro-2H-pyran-2-yl)oxy)-8-methoxy-4,6,8,10,12,12-hexamethyl-1-oxa-4-azacyclotridecane-11,13-dione (S6-3-I1-1-5) (Compound 7)

Prepared according to the methods of S6-3-I1-1-1 from t-butylmethylamine to give the title compound as a formate salt. MS (ESI+) m/z: 628.50 [M+H]$^+$; $^1$H NMR (400 MHz, Methanol-d$_4$) δ 4.44 (d, 1H), 4.38-4.02 (m, 2H), 3.72 (dt, 2H), 3.43 (dd, 2H), 3.38-3.25 (m, 6H), 3.21-2.86 (m, 7H), 2.77 (d, 10H), 2.08-1.95 (m, 2H), 1.87 (s, 4H), 1.51 (s, 5H), 1.46-1.20 (m, 21H), 1.03 (s, 3H).

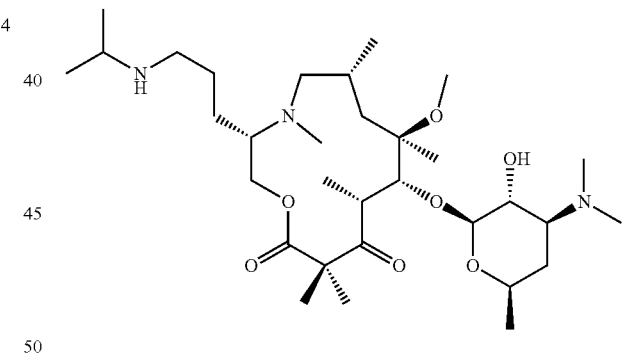

(3S,6R,8R,9R,10R)-3-(3-(diethylamino)propyl)-9-(((2S,3R,4S,6R)-4-(dimethylamino)-3-hydroxy-6-methyltetrahydro-2H-pyran-2-yl)oxy)-8-methoxy-4,6,8,10,12,12-hexamethyl-1-oxa-4-azacyclotridecane-11,13-dione (S6-3-I1-1-4) (Compound 19)

Prepared according to the methods of S6-3-I1-1-1 from ethylmethylamine to give the title compound as a formate salt. MS (ESI+) m/z: 614.46 [M+H]$^+$; $^1$H NMR (400 MHz, Methanol-d$_4$) δ 4.45 (d, 1H), 4.38-4.08 (m, 2H), 3.78-3.66 (m, 2H), 3.61 (q, 1H), 3.44 (dd, 2H), 3.37-3.25 (m, 2H), 3.24-2.86 (m, 11H), 2.76 (s, 8H), 2.35-2.09 (m, 1H), 2.04-1.96 (m, 1H), 1.76 (s, 4H), 1.50 (d, 5H), 1.44-1.22 (m, 17H), 1.16 (dt, 3H), 1.03 (s, 3H).

(3S,6R,8R,9R,10R)-9-(((2S,3R,4S,6R)-4-(dimethyl-amino)-3-hydroxy-6-methyltetrahydro-2H-pyran-2-yl)oxy)-3-(3-(isopropylamino)propyl)-8-methoxy-4,6,8,10,12,12-hexamethyl-1-oxa-4-azacyclotridecane-11,13-dione (S6-3-I1-1-6) (Compound 16)

Prepared according to the methods of S6-3-I1-1-1 from isopropylamine to give the title compound as a formate salt. MS (ESI+) m/z: 600.38 [M+H]$^+$; $^1$H NMR (400 MHz, Methanol-d$_4$) δ 4.49 (d, 1H), 4.27 (s, 1H), 4.15 (d, 11H), 3.72 (ddt, 1H), 3.61-3.34 (m, 5H), 3.31 (dt, 1H), 3.27-3.09 (m, 1H), 2.95 (s, 4H), 2.82 (d, 13H), 2.59 (d, 3H), 2.41-2.12 (m, 2H), 2.10-1.91 (m, 3H), 1.91-1.66 (m, 3H), 1.64-1.45 (m, 5H), 1.43-1.19 (m, 14H), 0.94 (d, 3H).

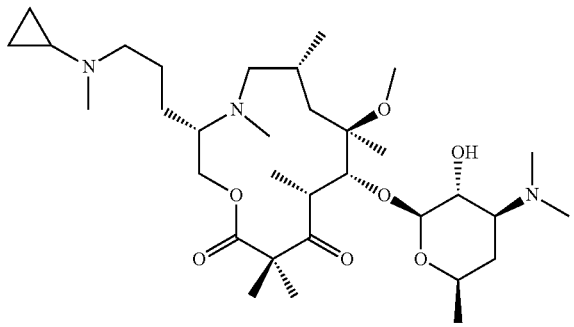

(3S,6R,8R,9R,10R)-3-(3-(cyclopropyl(methyl)amino)propyl)-9-(((2S,3R,4S,6R)-4-(dimethylamino)-3-hydroxy-6-methyltetrahydro-2H-pyran-2-yl)oxy)-8-methoxy-4,6,8,10,12,12-hexamethyl-1-oxa-4-azacyclotridecane-11,13-dione (S6-3-I1-1-7) (Compound 90)

Prepared according to the methods of S6-3-I1-1-1 from N-methylcyclopropylamine to give the title compound as a formate salt. MS (ESI+) m/z: 612.25 [M+H]$^+$; $^1$H NMR (400 MHz, Methanol-d$_4$) δ 4.41 (d, 1H), 4.24 (s, 2H), 3.68 (tt, 2H), 3.49-3.26 (m, 2H), 3.04 (s, 6H), 2.79 (s, 1H), 2.61 (d, 9H), 2.37 (d, 4H), 2.20 (s, 11H), 1.91 (d, 3H), 1.71 (tt, 3H), 1.66-1.18 (m, 20H), 1.06 (s, 3H), 0.55 (h, 2H), 0.44 (q, 2H).

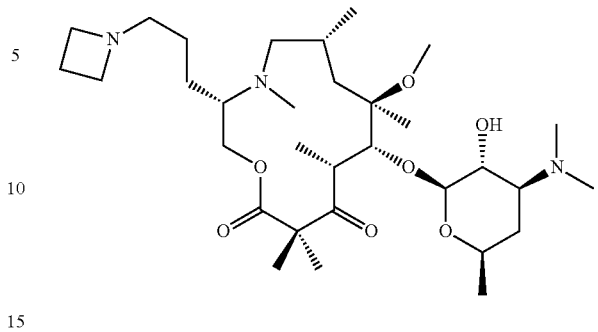

(3S,6R,8R,9R,10R)-3-(3-(azetidin-1-yl)propyl)-9-(((2S,3R,4S,6R)-4-(dimethylamino)-3-hydroxy-6-methyltetrahydro-2H-pyran-2-yl)oxy)-8-methoxy-4,6,8,10,12,12-hexamethyl-1-oxa-4-azacyclotridecane-11,13-dione (S6-3-I1-1-9) (Compound 160)

Prepared according to the methods of S6-3-I1-1-1 from azetidine to give the title compound as a formate salt. MS (ESI+) m/z: 598.42 [M+H]$^+$; $^1$H NMR (400 MHz, Methanol-d$_4$) δ 4.44 (d, 1H), 4.25 (d, 2H), 4.02 (t, 4H), 3.83-3.57 (m, 2H), 3.51-3.24 (m, 4H), 3.22-2.84 (m, 8H), 2.78 (s, 8H), 2.44 (p, 2H), 2.18 (s, 1H), 2.08-1.95 (m, 1H), 1.89 (s, 1H), 1.66 (s, 3H), 1.49 (tt, 6H), 1.44-1.24 (m, 13H), 1.04 (d, 3H).

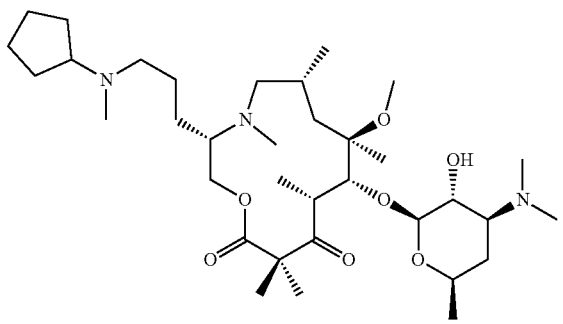

(3S,6R,8R,9R,10R)-3-(3-(cyclopentyl(methyl)amino)propyl)-9-(((2S,3R,4S,6R)-4-(dimethylamino)-3-hydroxy-6-methyltetrahydro-2H-pyran-2-yl)oxy)-8-methoxy-4,6,8,10,12,12-hexamethyl-1-oxa-4-azacyclotridecane-11,13-dione (S6-3-I1-1-8) (Compound 99)

Prepared according to the methods of S6-3-I1-1-1 from N-methylcyclopentylamine to give the title compound as a formate salt. MS (ESI+) m/z: 640.30 [M+H]$^+$; $^1$H NMR (400 MHz, Methanol-d$_4$) δ 4.46 (d, 1H), 4.25 (dd, 2H), 3.86-3.65 (m, 2H), 3.54 (q, 1H), 3.42 (dtd, 3H), 3.09 (d, 9H), 2.80 (d, 10H), 2.31-1.98 (m, 4H), 1.98-1.62 (m, 11H), 1.61-1.45 (m, 6H), 1.46-1.25 (m, 13H), 1.06 (d, 3H).

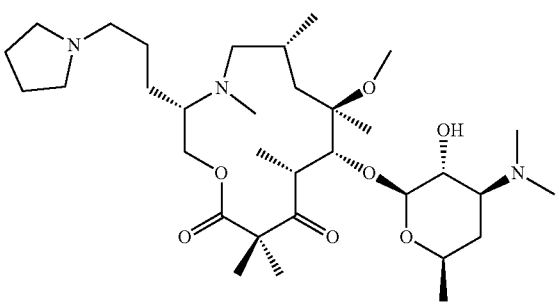

(3S,6R,8R,9R,10R)-9-(((2S,3R,4S,6R)-4-(dimethylamino)-3-hydroxy-6-methyltetrahydro-2H-pyran-2-yl)oxy)-8-methoxy-4,6,8,10,12,12-hexamethyl-3-(3-(pyrrolidin-1-yl)propyl)-1-oxa-4-azacyclotridecane-11,13-dione (S6-3-I1-1-10) (Compound 107)

Prepared according to the methods of S6-3-I1-1-1 from pyrrolidine to give the title compound as a formate salt. MS (ESI+) m/z: 612.40 [M+H]$^+$; $^1$H NMR (400 MHz, Methanol-d$_4$) δ 4.43 (d, 1H), 4.23 (dd, 2H), 3.83-3.57 (m, 2H), 3.51-3.20 (m, 8H), 3.13 (qd, 3H), 2.98 (d, 5H), 2.77 (s, 8H), 2.15 (s, 1H), 2.10-1.95 (m, 6H), 1.83 (d, 4H), 1.62-1.43 (m, 6H), 1.44-1.22 (m, 12H), 1.03 (d, 3H).

S6-3-I1-1-11

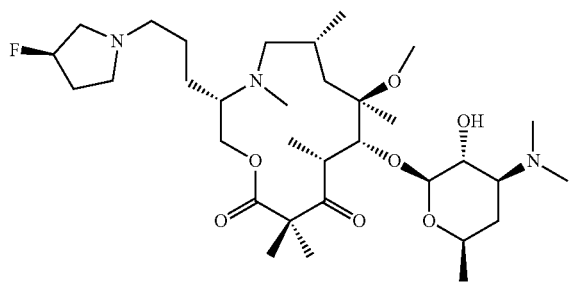

(3S,6R,8R,9R,10R)-9-(((2S,3R,4S,6R)-4-(dimethyl-amino)-3-hydroxy-6-methyltetrahydro-2H-pyran-2-yl)oxy)-3-(3-((R)-3-fluoropyrrolidin-1-yl)propyl)-8-methoxy-4,6,8,10,12,12-hexamethyl-1-oxa-4-azacyclotridecane-11,13-dione (S6-3-I1-1-11)
(Compound 108)

Prepared according to the methods of S6-3-I1-1-1 from (R)-3-fluoropyrrolidine to give the title compound as a formate salt. MS (ESI+) m/z: 630.28 [M+H]$^+$; $^1$H NMR (400 MHz, Methanol-d$_4$) δ 5.25 (dt, 1H), 4.45 (d, 1H), 4.24 (dd, 2H), 3.88-3.61 (m, 2H), 3.41 (dtd, 3H), 3.31 (p, 5H), 3.26-2.93 (m, 9H), 2.80 (s, 9H), 2.44-2.07 (m, 2H), 2.03 (ddd, 1H), 1.94 (s, 1H), 1.86-1.62 (m, 3H), 1.50 (d, 6H), 1.40 (d, 6H), 1.34 (dd, 6H), 1.06 (d, 3H).

S6-3-I1-1-13

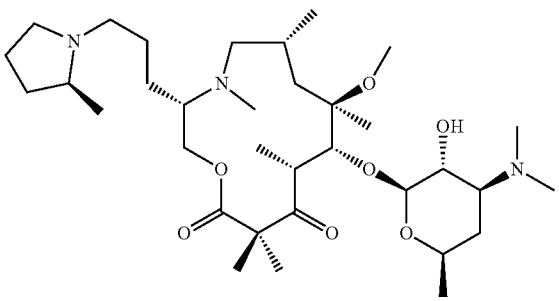

(3S,6R,8R,9R,10R)-9-(((2S,3R,4S,6R)-4-(dimethyl-amino)-3-hydroxy-6-methyltetrahydro-2H-pyran-2-yl)oxy)-8-methoxy-4,6,8,10,12,12-hexamethyl-3-(3-((S)-2-methylpyrrolidin-1-yl)propyl)-1-oxa-4-azacyclotridecane-11,13-dione (S6-3-I1-1-13)
(Compound 117)

Prepared according to the methods of S6-3-I1-1-1 from (S)-2-methylpyrrolidine to give the title compound as a formate salt. MS (ESI+) m/z: 626.29 [M+H]$^+$; $^1$H NMR (400 MHz, Methanol-d$_4$) δ 4.43 (d, 1H), 4.37-3.99 (m, 2H), 3.70 (ddt, 1H), 3.55 (s, 1H), 3.42 (dd, 2H), 3.35-3.14 (m, 8H), 2.99 (s, 7H), 2.73 (s, 7H), 2.23 (dt, 2H), 2.10-1.92 (m, 4H), 1.91-1.61 (m, 5H), 1.60-1.43 (m, 5H), 1.43-1.20 (m, 15H), 1.02 (s, 3H).

S6-3-I1-1-12

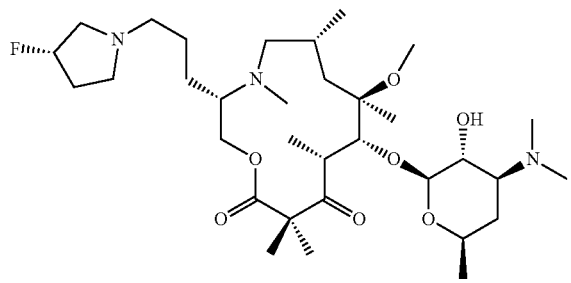

(3S,6R,8R,9R,10R)-9-(((2S,3R,4S,6R)-4-(dimethyl-amino)-3-hydroxy-6-methyltetrahydro-2H-pyran-2-yl)oxy)-3-(3-((S)-3-fluoropyrrolidin-1-yl)propyl)-8-methoxy-4,6,8,10,12,12-hexamethyl-1-oxa-4-azacyclotridecane-11,13-dione (S6-3-I1-1-12).
(Compound 125)

Prepared according to the methods of S6-3-I1-1-1 from (S)-3-fluoropyrrolidine to give the title compound as a formate salt. MS (ESI+) m/z: 630.27 [M+H]$^+$; $^1$H NMR (400 MHz, Methanol-d$_4$) δ 5.24 (dt, 1H), 4.45 (d, 1H), 4.24 (t, 2H), 3.88-3.61 (m, 2H), 3.41 (ddd, 3H), 3.31 (p, 5H), 3.23-2.92 (m, 8H), 2.79 (m, 10H), 2.37-2.11 (m, 2H), 2.08-1.99 (m, 1H), 1.94 (s, 1H), 1.86-1.59 (m, 3H), 1.50 (d, 6H), 1.40 (d, 6H), 1.34 (dd, 6H), 1.06 (d, 3H).

S6-3-I1-1-14

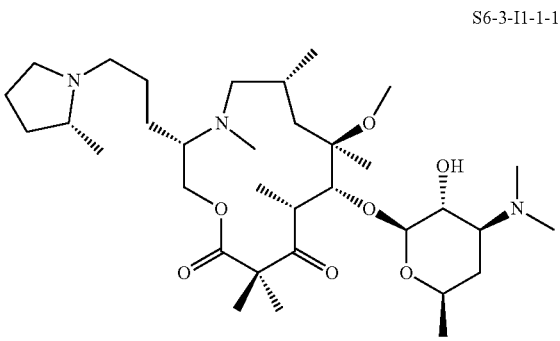

(3S,6R,8R,9R,10R)-9-(((2S,3R,4S,6R)-4-(dimethyl-amino)-3-hydroxy-6-methyltetrahydro-2H-pyran-2-yl)oxy)-8-methoxy-4,6,8,10,12,12-hexamethyl-3-(3-((R)-2-methylpyrrolidin-1-yl)propyl)-1-oxa-4-azacyclotridecane-11,13-dione (S6-3-I1-1-14)
(Compound 122)

Prepared according to the methods of S6-3-I1-1-1 from (R)-2-methylpyrrolidine to give the title compound as a formate salt. MS (ESI+) m/z: 626.29 [M+H]$^+$; $^1$H NMR (400 MHz, Methanol-d$_4$) δ 4.44 (d, 1H), 4.38-4.02 (m, 2H), 3.70 (ddt, 1H), 3.56 (q, 1H), 3.42 (dd, 2H), 3.36-3.18 (m, 7H), 3.00 (s, 6H), 2.74 (s, 9H), 2.25 (dq, 2H), 2.09-1.94 (m, 4H), 1.87 (s, 2H), 1.70 (dq, 3H), 1.48 (d, 5H), 1.44-1.18 (m, 15H), 1.02 (s, 3H).

S6-3-I1-1-15

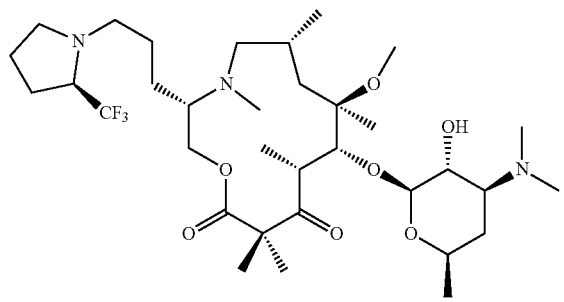

(3S,6R,8R,9R,10R)-9-(((2S,3R,4S,6R)-4-(dimethyl-amino)-3-hydroxy-6-methyltetrahydro-2H-pyran-2-yl)oxy)-8-methoxy-4,6,8,10,12,12-hexamethyl-3-(3-((R)-2-(trifluoromethyl)pyrrolidin-1-yl)propyl)-1-oxa-4-azacyclotridecane-11,13-dione (S6-3-I1-1-15) (Compound 123)

Prepared according to the methods of S6-3-I1-1-1 from (R)-2-trifluoromethylpyrrolidine to give the title compound as a formate salt. MS (ESI+) m/z: 680.24 [M+H]$^+$; $^1$H NMR (400 MHz, Methanol-d$_4$) δ 4.40 (d, 1H), 4.25 (d, 2H), 3.86-3.55 (m, 2H), 3.46-3.28 (m, 2H), 3.26-3.14 (m, 2H), 2.97 (dd, 8H), 2.79 (s, 1H), 2.70-2.47 (m, 8H), 2.42 (td, 2H), 2.21 (s, 1H), 2.12-1.97 (m, 2H), 1.96-1.76 (m, 5H), 1.71 (t, 1H), 1.65-1.17 (m, 20H), 1.06 (s, 3H).

S6-3-I1-1-16

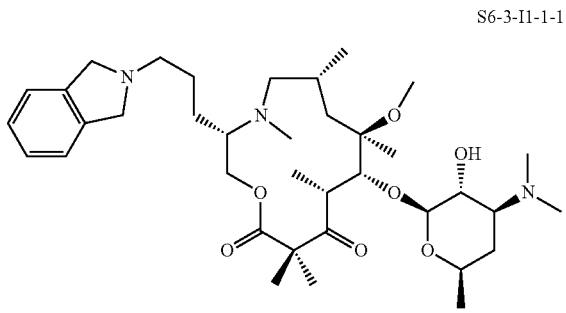

(3S,6R,8R,9R,10R)-9-(((2S,3R,4S,6R)-4-(dimethyl-amino)-3-hydroxy-6-methyltetrahydro-2H-pyran-2-yl)oxy)-3-(3-(isoindolin-2-yl)propyl)-8-methoxy-4,6,8,10,12,12-hexamethyl-1-oxa-4-azacyclotridecane-11,13-dione (S6-3-I1-1-16)

Prepared according to the methods of S6-3-I1-1-1 from isoindoline to give the title compound as a formate salt. (ESI+) m/z: 660.29 [M+H]$^+$; $^1$H NMR (400 MHz, Methanol-d$_4$) δ 7.27 (p, 4H), 4.46 (d, 1H), 4.26 (dd, 2H), 4.11 (s, 4H), 3.89-3.64 (m, 2H), 3.53-3.27 (m, 5H), 3.18-2.91 (m, 9H), 2.80 (s, 7H), 2.20 (s, 1H), 2.10-1.92 (m, 2H), 1.75 (ddd, 3H), 1.47 (d, 6H), 1.44-1.29 (m, 12H), 1.06 (d, 3H).

S6-3-I1-1-17

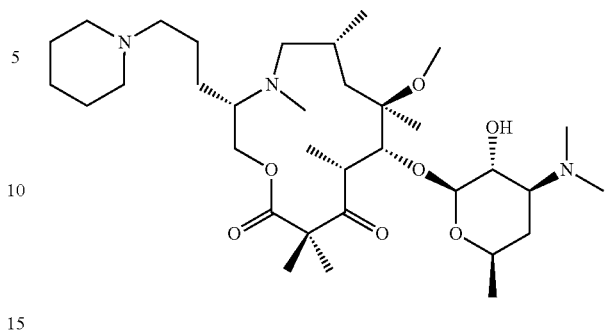

(3S,6R,8R,9R,10R)-9-(((2S,3R,4S,6R)-4-(dimethyl-amino)-3-hydroxy-6-methyltetrahydro-2H-pyran-2-yl)oxy)-8-methoxy-4,6,8,10,12,12-hexamethyl-3-(3-(piperidin-1-yl)propyl)-1-oxa-4-azacyclotridecane-11,13-dione (S6-3-I1-1-17) (Compound 83)

Prepared according to the methods of S6-3-I1-1-1 from piperidine to give the title compound as a formate salt. MS (ESI+) m/z: 626.56 [M+H]$^+$; $^1$H NMR (400 MHz, Methanol-d$_4$) δ 4.45 (d, 1H), 4.36-4.04 (m, 2H), 3.82-3.62 (m, 2H), 3.43 (dd, 2H), 3.31 (dt, 3H), 2.97 (d, 11H), 2.76 (s, 8H), 2.09-1.95 (m, 2H), 1.95-1.69 (m, 8H), 1.63 (s, 3H), 1.48 (t, 5H), 1.45-1.19 (m, 13H), 1.04 (s, 3H).

S6-3-I1-1-18

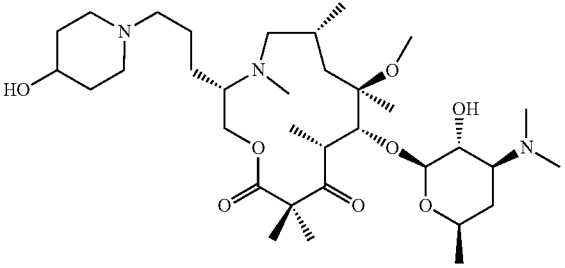

(3S,6R,8R,9R,10R)-9-(((2S,3R,4S,6R)-4-(dimethyl-amino)-3-hydroxy-6-methyltetrahydro-2H-pyran-2-yl)oxy)-3-(3-(4-hydroxypiperidin-1-yl)propyl)-8-methoxy-4,6,8,10,12,12-hexamethyl-1-oxa-4-azacyclotridecane-11,13-dione (S6-3-I1-1-18) (Compound 92)

Prepared according to the methods of S6-3-I1-1-1 from 4-hydroxypiperidine to give the title compound as a formate salt. MS (ESI+) m/z: 642.36 [M+H]$^+$, $^1$H NMR (400 MHz, Methanol-d$_4$) δ 4.44 (d, 1H), 4.23 (t, 2H), 3.93 (s, 1H), 3.85-3.65 (m, 2H), 3.54-3.22 (m, 9H), 3.03 (d, 10H), 2.81 (s, 7H), 2.20 (s, 1H), 2.13-1.98 (m, 3H), 1.98-1.63 (m, 6H), 1.45 (s, 6H), 1.44-1.23 (m, 12H), 1.05 (d, 3H).

S6-3-I1-1-19

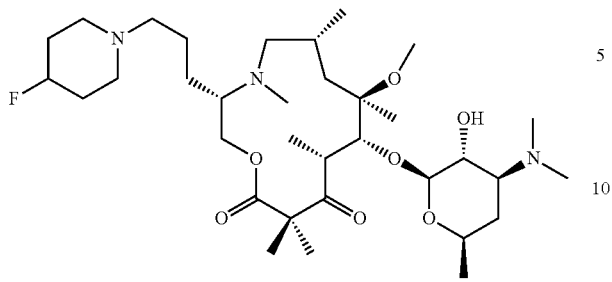

(3S,6R,8R,9R,10R)-9-(((2S,3R,4S,6R)-4-(dimethyl-amino)-3-hydroxy-6-methyltetrahydro-2H-pyran-2-yl)oxy)-3-(3-(4-fluoropiperidin-1-yl)propyl)-8-methoxy-4,6,8,10,12,12-hexamethyl-1-oxa-4-azacyclotridecane-11,13-dione (S6-3-I1-1-19) (Compound 103)

Prepared according to the methods of S6-3-I1-1-1 from 4-fluoropiperidine to give the title compound as a formate salt. MS (ESI+) m/z: 644.36 [M+H]$^+$; $^1$H NMR (400 MHz, Methanol-d$_4$) δ 4.79 (d, 1H), 4.45 (d, 1H), 4.24 (t, 2H), 3.87-3.63 (m, 2H), 3.42 (dtd, 3H), 3.31 (p, 5H), 3.12-2.90 (m, 10H), 2.81 (s, 9H), 2.26-1.94 (m, 6H), 1.77 (d, 3H), 1.48 (s, 5H), 1.44-1.26 (m, 12H), 1.06 (d, 3H).

S6-3-I1-1-21

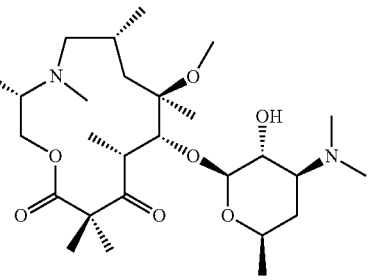

(3S,6R,8R,9R,10R)-9-(((2S,3R,4S,6R)-4-(dimethyl-amino)-3-hydroxy-6-methyltetrahydro-2H-pyran-2-yl)oxy)-3-(3-(4,4-dimethylpiperidin-1-yl)propyl)-8-methoxy-4,6,8,10,12,12-hexamethyl-1-oxa-4-azacyclotridecane-11,13-dione (S6-3-I1-1-21) (Compound 128)

Prepared according to the methods of S6-3-I1-1-1 from 4-dimethylpiperidine to give the title compound as a formate salt. MS (ESI+) m/z: 654.44 [M+H]$^+$; $^1$H NMR (400 MHz, Methanol-d$_4$) δ 4.45 (d, 1H), 4.38-4.05 (m, 2H), 3.83-3.58 (m, 2H), 3.44 (dd, 2H), 3.36-3.27 (m, 12H), 3.04 (s, 9H), 2.78 (s, 6H), 2.18 (s, 1H), 2.01 (ddd, 1H), 1.97-1.69 (m, 3H), 1.64 (t, 4H), 1.51 (d, 5H), 1.45-1.25 (m, 11H), 1.05 (s, 8H).

S6-3-I1-1-20

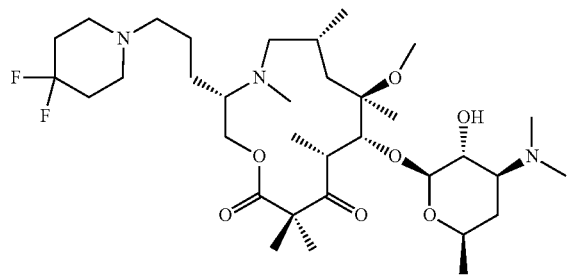

(3S,6R,8R,9R,10R)-3-(3-(4,4-difluoropiperidin-1-yl)propyl)-9-(((2S,3R,4S,6R)-4-(dimethylamino)-3-hydroxy-6-methyltetrahydro-2H-pyran-2-yl)oxy)-8-methoxy-4,6,8,10,12,12-hexamethyl-1-oxa-4-azacyclotridecane-11,13-dione (S6-3-I1-1-20) (Compound 110)

Prepared according to the methods of S6-3-I1-1-1 from 4-difluoropiperidine to give the title compound as a formate salt. MS (ESI+) m/z: 662.38 [M+H]$^+$; $^1$H NMR (400 MHz, Methanol-d$_4$) δ 4.45 (d, 1H), 4.24 (t, 2H), 3.88-3.64 (m, 2H), 3.56-3.34 (m, 3H), 3.30 (p, 4H), 3.04 (d, 6H), 2.81 (s, 7H), 2.73-2.61 (m, 4H), 2.55 (t, 2H), 2.20 (s, 1H), 2.02 (dp, 6H), 1.75 (dd, 2H), 1.50 (d, 6H), 1.45-1.24 (m, 12H), 1.06 (d, 3H).

S6-3-I1-1-22

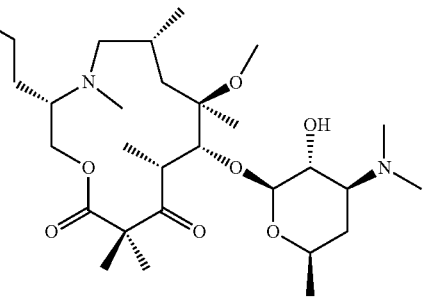

(3S,6R,8R,9R,10R)-9-(((2S,3R,4S,6R)-4-(dimethyl-amino)-3-hydroxy-6-methyltetrahydro-2H-pyran-2-yl)oxy)-8-methoxy-4,6,8,10,12,12-hexamethyl-3-(3-morpholinopropyl)-1-oxa-4-azacyclotridecane-11,13-dione (S6-3-I1-1-22) (Compound 105)

Prepared according to the methods of S6-3-I1-1-1 from morpholine to give the title compound as a formate salt. MS (ESI+) m/z: 628.40 [M+H]$^+$; $^1$H NMR (400 MHz, Methanol-d$_4$) δ 4.46 (d, 1H), 4.25 (t, 2H), 3.72 (t, 6H), 3.42 (ddd, 5H), 3.05 (d, 7H), 2.80 (s, 7H), 2.51 (dt, 6H), 2.22 (s, 1H), 2.10-1.98 (m, 1H), 1.94 (s, 1H), 1.73 (d, 2H), 1.65-1.45 (m, 7H), 1.45-1.26 (m, 12H), 1.07 (d, 3H).

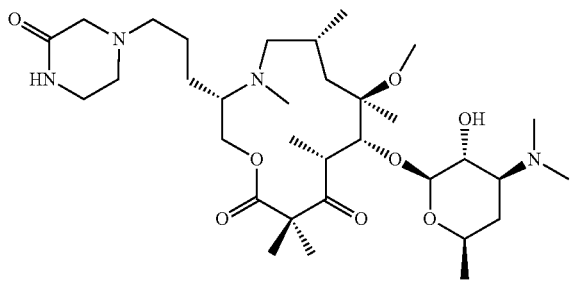

S6-3-I1-1-23

(3S,6R,8R,9R,10R)-9-(((2S,3R,4S,6R)-4-(dimethyl-amino)-3-hydroxy-6-methyltetrahydro-2H-pyran-2-yl)oxy)-8-methoxy-4,6,8,10,12,12-hexamethyl-3-(3-(3-oxopiperazin-1-yl)propyl)-1-oxa-4-azacyclotridecane-11,13-dione (S6-3-I1-1-23) (Compound 115)

Prepared according to the methods of S6-3-I1-1-1 from piperazin-2-one to give the title compound as a formate salt. MS (ESI+) m/z: 641.40 [M+H]$^+$; $^1$H NMR (400 MHz, Methanol-d$_4$) δ 4.45 (d, 1H), 4.25 (t, 2H), 3.88-3.63 (m, 2H), 3.53-3.31 (m, 8H), 3.18-2.93 (m, 9H), 2.81 (s, 7H), 2.76-2.62 (m, 2H), 2.53 (q, 2H), 2.20 (s, 1H), 2.10-1.88 (m, 2H), 1.88-1.66 (m, 2H), 1.66-1.44 (m, 7H), 1.44-1.25 (m, 12H), 1.06 (d, 3H).

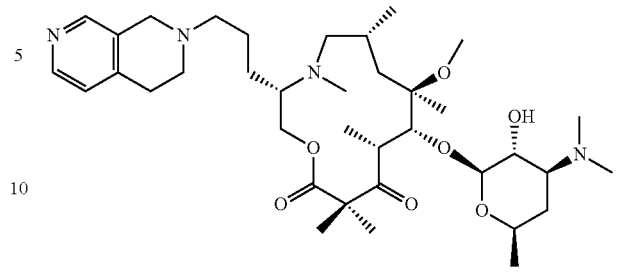

S6-3-I1-1-25

(3S,6R,8R,9R,10R)-3-(3-(3,4-dihydro-2,7-naphthyridin-2(1H)-yl)propyl)-9-(((2S,3R,4S,6R)-4-(dimethylamino)-3-hydroxy-6-methyltetrahydro-2H-pyran-2-yl)oxy)-8-methoxy-4,6,8,10,12,12-hexamethyl-1-oxa-4-azacyclotridecane-11,13-dione (S6-3-I1-1-25) (Compound 177)

Prepared according to the methods of S6-3-I1-1-1 from 1,2,3,4-tetrahydro-2,7-naphthyridine to give the title compound as a formate salt. MS (ESI+) m/z: 675.28 [M+H]$^+$; $^1$H NMR (400 MHz, Methanol-d$_4$) δ 8.32 (s, 1H), 8.26 (d, 1H), 7.16 (s, 1H), 4.45 (d, 1H), 4.27 (dd, 2H), 3.89-3.64 (m, 4H), 3.52-3.32 (m, 4H), 2.99 (dd, 9H), 2.89-2.75 (m, 9H), 2.66 (t, 2H), 2.20 (s, 1H), 2.03 (ddd, 2H), 1.89-1.64 (m, 3H), 1.63-1.45 (m, 6H), 1.45-1.26 (m, 12H), 1.05 (d, 3H).

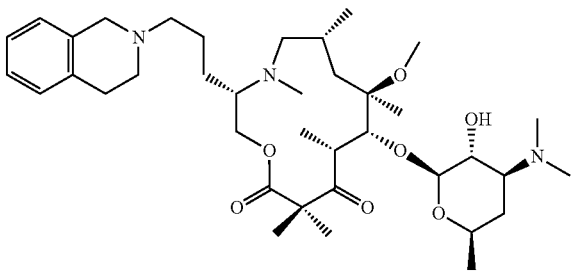

S6-3-I1-1-24

(3S,6R,8R,9R,10R)-3-(3-(3,4-dihydroisoquinolin-2(1H)-yl)propyl)-9-(((2S,3R,4S,6R)-4-(dimethyl-amino)-3-hydroxy-6-methyltetrahydro-2H-pyran-2-yl)oxy)-8-methoxy-4,6,8,10,12,12-hexamethyl-1-oxa-4-azacyclotridecane-11,13-dione (S6-3-I1-1-24) (Compound 120)

Prepared according to the methods of S6-3-I1-1-1 from 1,2,3,4-tetrahydroisoquinoline to give the title compound as a formate salt. MS (ESI+) m/z: 674.33 [M+H]$^+$; $^1$H NMR (400 MHz, Methanol-d$_4$) δ 7.28-6.98 (m, 4H), 4.45 (d, 1H), 4.27 (dd, 2H), 3.98-3.62 (m, 4H), 3.55-3.34 (m, 4H), 3.19-2.85 (m, 11H), 2.77 (s, 10H), 2.18 (d, 1H), 2.01 (ddd, 2H), 1.91-1.65 (m, 3H), 1.65-1.44 (m, 6H), 1.44-1.25 (m, 12H), 1.05 (d, 3H).

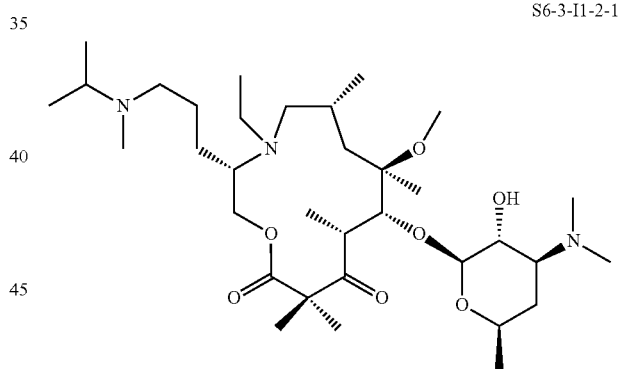

S6-3-I1-2-1

(3S,6R,8R,9R,10R)-9-(((2S,3R,4S,6R)-4-(dimethyl-amino)-3-hydroxy-6-methyltetrahydro-2H-pyran-2-yl)oxy)-4-ethyl-3-(3-(isopropyl(methyl)amino)pro-pyl)-8-methoxy-6,8,10,12,12-pentamethyl-1-oxa-4-azacyclotridecane-11,13-dione (S6-3-I1-2-1) (Compound 10)

Prepared according to the methods of S6-3-I1-1-1 from S2-1-I1-2 and N-methylisopropylamine to give the title compound as a formate salt. MS (ESI+) m/z: 628.50 [M+H]$^+$; $^1$H NMR (400 MHz, Methanol-d$_4$) δ 4.51-4.65 (s, 1H), 4.42 (d, 1H), 4.25 (s, 1H), 4.01 (t, 2H), 3.69 (ddt, 1H), 3.53 (s, 1H), 3.41 (dd, 2H), 3.22 (d, 2H), 3.02 (s, 4H), 2.82 (d, 2H), 2.72 (s, 10H), 2.34 (s, 1H), 2.27-2.03 (m, 2H), 1.97 (ddd, 1H), 1.69 (d, 4H), 1.56-1.17 (m, 24H), 1.16-0.74 (m, 6H).

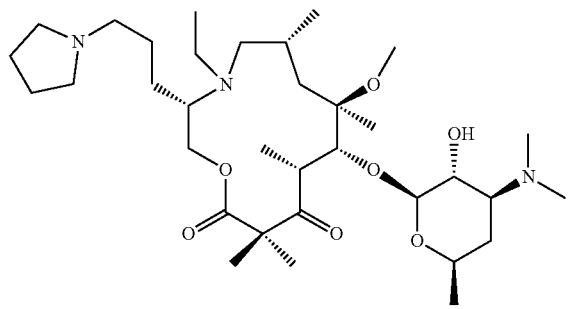

S6-3-I1-2-2

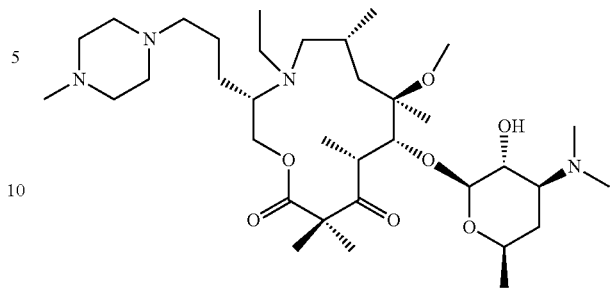

S6-3-I1-2-4

(3S,6R,8R,9R,10R)-9-(((2S,3R,4S,6R)-4-(dimethylamino)-3-hydroxy-6-methyltetrahydro-2H-pyran-2-yl)oxy)-4-ethyl-8-methoxy-6,8,10,12,12-pentamethyl-3-(3-(pyrrolidin-1-yl)propyl)-1-oxa-4-azacyclotridecane-11,13-dione (S6-3-I1-2-2) (Compound 87)

Prepared according to the methods of S6-3-I1-1-1 from S2-1-I1-2 and pyrrolidine to give the title compound as a formate salt. MS (ESI+) m/z: 626.41 [M+H]$^+$; $^1$H NMR (400 MHz, Methanol-d$_4$) δ 4.51-4.65 (s, 1H), 4.44 (d, 1H), 4.26 (s, 1H), 3.95 (s, 1H), 3.81-3.52 (m, 2H), 3.50-3.19 (m, 13H), 3.21-2.88 (m, 6H), 2.78 (s, 7H), 2.20-1.94 (m, 6H), 1.84 (s, 4H), 1.58-1.23 (m, 18H), 1.04 (s, 3H).

(3S,6R,8R,9R,10R)-9-(((2S,3R,4S,6R)-4-(dimethylamino)-3-hydroxy-6-methyltetrahydro-2H-pyran-2-yl)oxy)-4-ethyl-8-methoxy-6,8,10,12,12-pentamethyl-3-(3-(4-methylpiperazin-1-yl)propyl)-1-oxa-4-azacyclotridecane-11,13-dione (S6-3-I1-2-4)

Prepared according to the methods of S6-3-I1-1-1 from S2-1-I1-2 and N-methylpiperazine to give the title compound as a formate salt. MS (ESI+) m/z: 655.34 [M+H]$^+$; $^1$H NMR (400 MHz, Methanol-d$_4$) δ 4.60 (s, 1H), 4.42 (t, 2H), 4.26 (s, 11H), 3.93 (s, 1H), 3.80-3.66 (m, 1H), 3.58 (s, 1H), 3.49-3.27 (m, 4H), 3.27-2.36 (m, 25H), 2.17 (s, 1H), 2.07-1.96 (m, 1H), 1.97-1.19 (m, 25H), 1.06 (d, 3H).

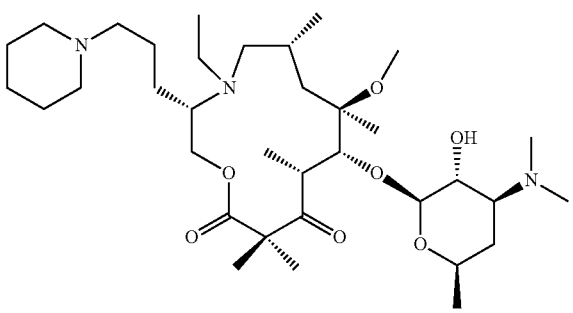

S6-3-I1-2-3

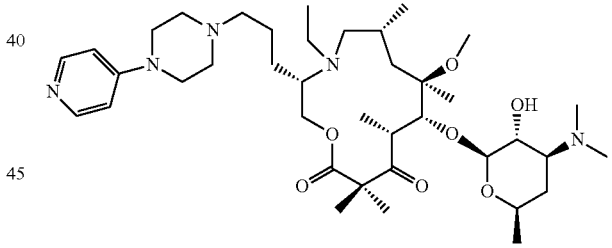

S6-3-I1-2-5

(3S,6R,8R,9R,10R)-9-(((2S,3R,4S,6R)-4-(dimethylamino)-3-hydroxy-6-methyltetrahydro-2H-pyran-2-yl)oxy)-4-ethyl-8-methoxy-6,8,10,12,12-pentamethyl-3-(3-(piperidin-1-yl)propyl)-1-oxa-4-azacyclotridecane-11,13-dione (S6-3-I1-2-3) (Compound 129)

Prepared according to the methods of S6-3-I1-1-1 from S2-1-I1-2 and piperidine to give the title compound as a formate salt. MS (ESI+) m/z: 640.46 [M+H]$^+$; $^1$H NMR (400 MHz, Methanol-d$_4$) δ 4.51-4.65 (s, 1H), 4.44 (d, 1H), 4.26 (s, 1H), 3.95 (s, 1H), 3.83-3.52 (m, 2H), 3.52-3.27 (m, 12H), 3.28-2.88 (m, 7H), 2.79 (s, 7H), 2.19 (s, 1H), 2.02 (ddd, 1H), 1.83 (p, 7H), 1.59-1.17 (m, 20H), 1.05 (s, 4H).

(3S,6R,8R,9R,10R)-9-(((2S,3R,4S,6R)-4-(dimethylamino)-3-hydroxy-6-methyltetrahydro-2H-pyran-2-yl)oxy)-4-ethyl-8-methoxy-6,8,10,12,12-pentamethyl-3-(3-(4-(pyridin-4-yl)piperazin-1-yl)propyl)-1-oxa-4-azacyclotridecane-11,13-dione (S6-3-I1-2-4)

Prepared according to the methods of S6-3-I1-1-1 from S2-1-I1-2 and 1-(pyridin-4-yl)piperazine to give the title compound as a formate salt. MS (ESI+) m/z: 718.31 [M+H]$^+$; $^1$H NMR (400 MHz, Methanol-d$_4$) δ 8.13 (d, 7.11 (s, 2H), 4.61 (s, 1H), 4.43 (q, 2H), 4.25 (s, 1H), 3.91 (d, 1H), 3.79-3.49 (m, 6H), 3.50-3.31 (m, 3H), 3.14 (d, 2H), 3.02 (s, 3H), 2.79 (d, 7H), 2.62 (q, 4H), 2.50 (hept, 2H), 2.15 (d, 1H), 2.07-1.85 (m, 2H), 1.84-1.18 (m, 25H), 1.06 (d, 3H).

(m, 1H), 2.45-2.12 (m, 3H), 2.12-1.90 (m, 6H), 1.91-1.59 (m, 5H), 1.43 (s, 7H), 1.42-1.22 (m, 14H), 1.22-0.72 (m, 8H).

S6-3-I1-3-1

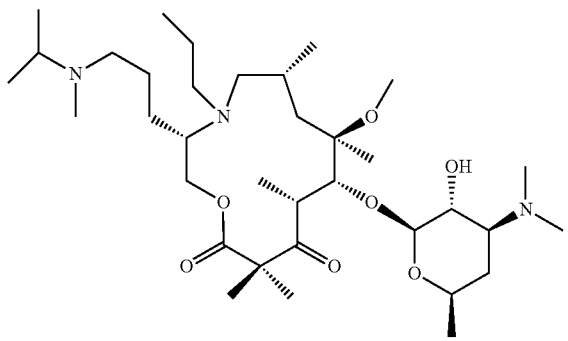

(3S,6R,8R,9R,10R)-9-(((2S,3R,4S,6R)-4-(dimethylamino)-3-hydroxy-6-methyltetrahydro-2H-pyran-2-yl)oxy)-3-(3-(isopropyl(methyl)amino)propyl)-8-methoxy-6,8,10,12,12-pentamethyl-4-propyl-1-oxa-4-azacyclotridecane-11,13-dione (S6-3-I1-3-1) (Compound 18)

Prepared according to the methods of S6-3-I1-1-1 from S2-1-I1-3 and propionaldehdye to give 10.6 mg of the title compound as a formate salt. MS (ESI+) m/z: 214.8 [M+3H]$^{3+}$, 321.7 [M+2H]$^{2+}$, 642.3 [M+H]$^{+}$; $^1$H NMR (400 MHz, Methanol-d$_4$) δ 8.52 (s, 2H), 4.44 (d, 1H), 4.40-4.25 (m, 1H), 4.12-4.00 (m, 1H), 4.00-3.84 (m, 1H), 3.79-3.66 (m, 1H), 3.66-3.51 (m, 2H), 3.44 (t, 2H), 3.19-2.91 (m, 4H), 2.91-2.67 (m, 11H), 2.66-2.48 (m, 1H), 2.45-2.08 (m, 3H), 2.00 (dd, 1H), 1.94-1.57 (m, 5H), 1.57-1.41 (m, 7H), 1.39-1.23 (m, 17H), 1.23-0.82 (m, 7H).

S6-3-I1-3-2

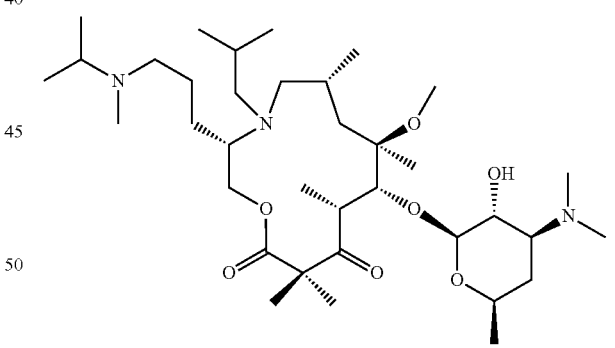

(3S,6R,8R,9R,10R)-9-(((2S,3R,4S,6R)-4-(dimethylamino)-3-hydroxy-6-methyltetrahydro-2H-pyran-2-yl)oxy)-8-methoxy-6,8,10,12,12-pentamethyl-4-propyl-3-(3-(pyrrolidin-1-yl)propyl)-1-oxa-4-azacyclotridecane-11,13-dione (S6-3-I1-3-2) (Compound 127)

Prepared according to the methods of S6-3-I1-1-1 from S2-1-I1-3 and pyrrolidine to give 12.7 mg of the title compound as a formate salt. MS (ESI+) m/z: 214.2 [M+3H]$^{3+}$, 320.7 [M+2H]$^{2+}$, 640.3 [M+H]$^{+}$; $^1$H NMR (400 MHz, Methanol-d$_4$) δ 8.52 (s, 3H), 4.44 (d, 1H), 4.40-4.21 (m, 1H), 4.10-3.80 (m, 2H), 3.71 (dd, 1H), 3.66-3.52 (m, 1H), 3.44 (t, 2H), 3.21-2.90 (m, 6H), 2.80 (s, 9H), 2.65-2.45

S6-3-I1-3-3

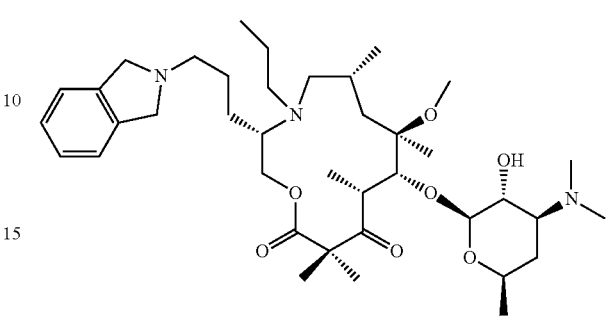

(3S,6R,8R,9R,10R)-9-(((2S,3R,4S,6R)-4-(dimethylamino)-3-hydroxy-6-methyltetrahydro-2H-pyran-2-yl)oxy)-3-(3-(isoindolin-2-yl)propyl)-8-methoxy-6,8,10,12,12-pentamethyl-4-propyl-1-oxa-4-azacyclotridecane-11,13-dione (S6-3-I1-3-3) (Compound 126)

Prepared according to the methods of S6-3-I1-1-1 from S2-1-I1-3 and isoindoline to give 11.9 mg of the title compound as a formate salt. MS (ESI+) m/z: 230.1 [M+3H]$^{3+}$, 344.7 [M+2H]$^{2+}$, 688.3 [M+H]$^{+}$; $^1$H NMR (400 MHz, Methanol-d$_4$) δ 8.54 (s, 2H), 7.26 (s, 4H), 4.69-4.20 (m, 3H), 4.20-3.86 (m, 6H), 3.69 (dd, 1H), 3.65-3.51 (m, 1H), 3.48-3.34 (m, 2H), 3.28-3.09 (m, 2H), 3.00 (s, 2H), 2.96-2.78 (m, 4H), 2.78-2.51 (m, 7H), 2.51-2.10 (m, 2H), 2.00-1.89 (m, 2H), 1.87-1.58 (m, 5H), 1.58-1.19 (m, 19H), 1.14-0.82 (m, 7H).

S6-3-I1-4-1

(3S,6R,8R,9R,10R)-9-(((2S,3R,4S,6R)-4-(dimethylamino)-3-hydroxy-6-methyltetrahydro-2H-pyran-2-yl)oxy)-4-isobutyl-3-(3-(isopropyl(methyl)amino)propyl)-8-methoxy-6,8,10,12,12-pentamethyl-1-oxa-4-azacyclotridecane-11,13-dione (S6-3-I1-4-1) (Compound 8)

Prepared according to the methods of S6-3-I1-1-1 from S2-1-I1-4 and N-methylisopropylamine to give the title compound as a formate salt. MS (ESI+) m/z: 656.34 [M+H]$^{+}$; $^1$H NMR (400 MHz, Methanol-d$_4$) δ 4.45 (d, 2H), 4.05 (d, 1H), 3.85 (t, 1H), 3.77-3.51 (m, 3H), 3.52-3.42 (m, 1H), 3.17-3.01 (m, 3H), 2.89-2.67 (m, 12H), 2.46-2.19 (m, 3H), 2.19-1.94 (m, 3H), 1.92-1.46 (m, 10H), 1.38-1.23 (m, 18H), 1.07 (dd, 6H), 0.90 (t, 6H).

2.66-2.01 (m, 6H), 2.01-1.49 (m, 10H), 1.49-1.25 (m, 12H), 1.25-1.02 (m, 5H), 1.02-0.77 (m, 5H).

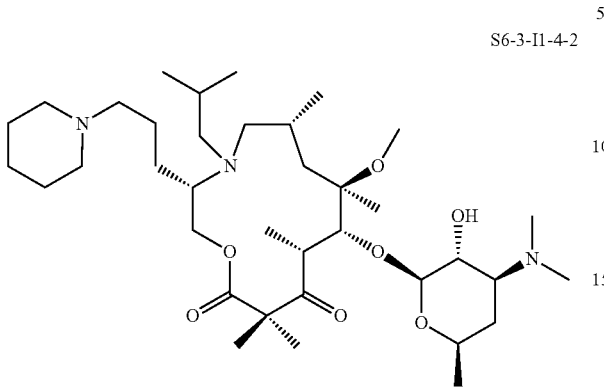

S6-3-I1-4-2

(3S,6R,8R,9R,10R)-9-(((2S,3R,4S,6R)-4-(dimethyl-amino)-3-hydroxy-6-methyltetrahydro-2H-pyran-2-yl)oxy)-4-isobutyl-8-methoxy-6,8,10,12,12-pentamethyl-3-(3-(piperidin-1-yl)propyl)-1-oxa-4-azacyclotridecane-11,13-dione (S6-3-I1-4-2) (Compound 121)

Prepared according to the methods of S6-3-I1-1-1 from S2-1-I1-4 and piperidine to give the title compound as a formate salt. MS (ESI+) m/z: 668.29 [M+H]$^+$; $^1$H NMR (400 MHz, Acetonitrile-d$_3$) δ 4.82 (m, 1H), 4.55-4.34 (m, 2H), 4.05 (d, 1H), 3.85 (t, 1H), 3.79-3.56 (m, 2H), 3.45 (dd, 1H), 3.41-3.33 (m, 1H), 3.29-2.89 (m, 6H), 2.79 (s, 9H), 2.44-2.19 (m, 3H), 2.19-1.96 (m, 3H), 1.94-1.78 (m, 5H), 1.78-1.60 (m, 5H), 1.53 (d, 5H), 1.43-1.17 (m, 12H), 1.05 (dd, 6H), 0.90 (dd, 6H).

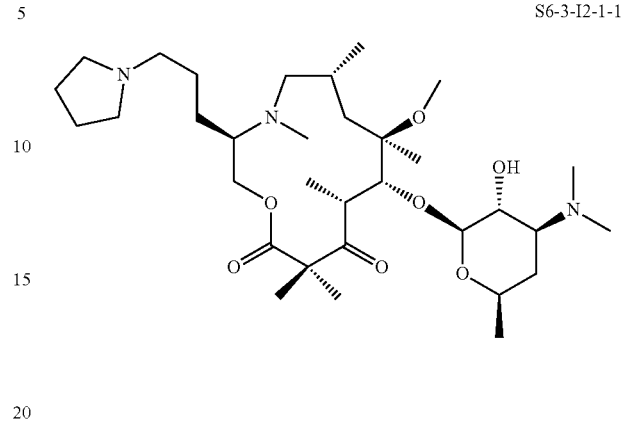

S6-3-I2-1-1

(3R,6R,8R,9R,10R)-9-(((2S,3R,4S,6R)-4-(dimethyl-amino)-3-hydroxy-6-methyltetrahydro-2H-pyran-2-yl)oxy)-8-methoxy-4,6,8,10,12,12-hexamethyl-3-(3-(pyrrolidin-1-yl)propyl)-1-oxa-4-azacyclotridecane-11,13-dione (S6-3-I2-1-1) (Compound 161)

Prepared according to the methods of S6-3-I1-1-1 from S2-1-I2-1 and pyrrolidine to give the title compound as a formate salt. MS (ESI+) m/z: 612.37 [M+H]$^+$; $^1$H NMR (400 MHz, Methanol-d$_4$) δ 4.45 (d, 1H), 4.26 (t, 2H), 3.85-3.63 (m, 2H), 3.41 (ddd, 3H), 3.31-3.21 (m, 5H), 3.15 (t, 2H), 3.05 (s, 5H), 2.78 (s, 9H), 2.19 (s, 1H), 2.13-1.97 (m, 6H), 1.86 (d, 3H), 1.60 (s, 3H), 1.54 (s, 4H), 1.45-1.23 (m, 12H), 1.05 (d, 3H).

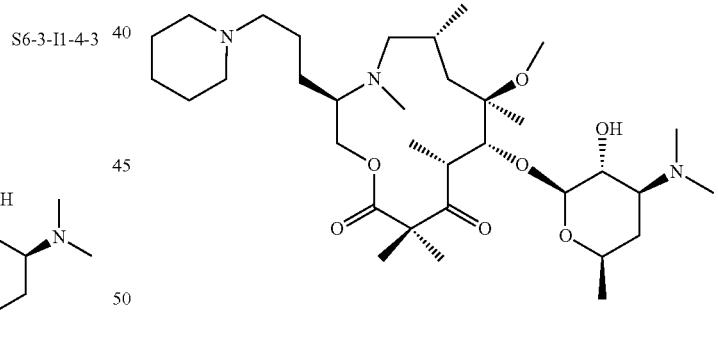

S6-3-I1-4-3

(3S,6R,8R,9R,10R)-3-(3-(3,4-dihydroisoquinolin-2(1H)-yl)propyl)-9-(((2S,3R,4S,6R)-4-(dimethyl-amino)-3-hydroxy-6-methyltetrahydro-2H-pyran-2-yl)oxy)-4-isobutyl-8-methoxy-6,8,10,12,12-pentamethyl-1-oxa-4-azacyclotridecane-11,13-dione (S6-3-I1-4-3) (Compound 141)

Prepared according to the methods of S6-3-I1-1-1 from S2-1-I1-4 and 1,2,3,4-tetrahydroisoquinoline to give the title compound as a formate salt. MS (ESI+) m/z: 716.32 [M+H]$^+$; $^1$H NMR (400 MHz, Methanol-d$_4$) δ 7.41-6.89 (m, 4H), 4.66-4.40 (m, 2H), 4.27-4.01 (m, 3H), 4.01-3.62 (m, 3H), 3.62-3.30 (m, 3H), 3.15 (dd, 5H), 3.05-2.67 (m, 11H),

S6-3-I2-1-2

(3R,6R,8R,9R,10R)-9-(((2S,3R,4S,6R)-4-(dimethyl-amino)-3-hydroxy-6-methyltetrahydro-2H-pyran-2-yl)oxy)-8-methoxy-4,6,8,10,12,12-hexamethyl-3-(3-(piperidin-1-yl)propyl)-1-oxa-4-azacyclotridecane-11,13-dione (S6-3-I2-1-2) (Compound 93)

Prepared according to the methods of S6-3-I1-1-1 from S2-1-I2-1 and piperidine to give the title compound as a formate salt. MS (ESI+) m/z: 626.48 [M+H]$^+$; $^1$H NMR (400 MHz, Methanol-d$_4$) δ 4.45 (d, 1H), 4.26 (t, 2H), 3.84-3.63 (m, 2H), 3.51-3.33 (m, 3H), 3.21-2.91 (m, 11H), 2.78 (s, 9H), 2.20 (s, 1H), 2.08-1.96 (m, 1H), 1.83 (p, 8H), 1.74-1.57 (m, 5H), 1.51 (q, 5H), 1.40 (d, 6H), 1.34 (t, 6H), 1.05 (d, 3H).

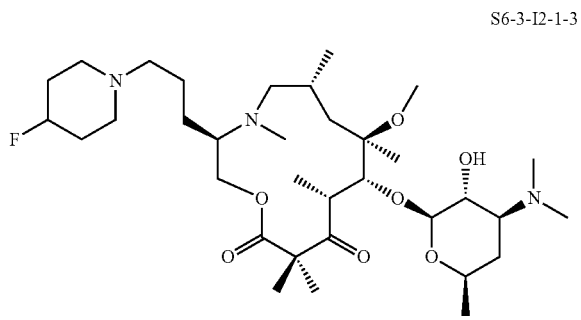

(3R,6R,8R,9R,10R)-9-(((2S,3R,4S,6R)-4-(dimethyl-amino)-3-hydroxy-6-methyltetrahydro-2H-pyran-2-yl)oxy)-3-(3-(4-fluoropiperidin-1-yl)propyl)-8-methoxy-4,6,8,10,12,12-hexamethyl-1-oxa-4-azacyclotridecane-11,13-dione (S6-3-I2-1-3) (Compound 85)

Prepared according to the methods of S6-3-I1-1-1 from S2-1-I2-1 and 4-fluoropiperidine to give the title compound as a formate salt. MS (ESI+) m/z: 644.36 [M+H]$^+$; $^1$H NMR (400 MHz, Methanol-d$_4$) δ 4.75 (d, 1H), 4.45 (d, 1H), 4.29 (dd, 2H), 3.90-3.64 (m, 2H), 3.54-3.32 (m, 4H), 3.07 (s, 5H), 2.95-2.59 (m, 15H), 2.24 (s, 1H), 2.00 (d, 6H), 1.78 (s, 3H), 1.69-1.46 (m, 7H), 1.46-1.25 (m, 12H), 1.07 (d, 3H)

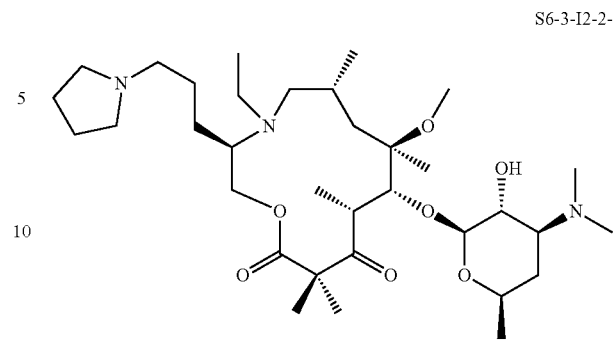

(3R,6R,8R,9R,10R)-9-(((2S,3R,4S,6R)-4-(dimethyl-amino)-3-hydroxy-6-methyltetrahydro-2H-pyran-2-yl)oxy)-4-ethyl-8-methoxy-6,8,10,12,12-pentam-ethyl-3-(3-(pyrrolidin-1-yl)propyl)-1-oxa-4-azacyclotridecane-11,13-dione (S6-3-I2-2-1) (Compound 113)

Prepared according to the methods of S6-3-I1-1-1 from S2-1-I2-2 and pyrrolidine to give the title compound as a formate salt. MS (ESI+) m/z: 626.31 [M+H]$^+$; 1H NMR (400 MHz, Methanol-d$_4$) δ 4.46 (d, 1H), 4.13 (s, 2H), 3.82-3.49 (m, 3H), 3.49-3.20 (m, 6H), 3.21-3.04 (m, 3H), 2.92 (s, 493.33 (s, 3H), 2.17-1.94 (m, 6H), 1.94-1.68 (m, 4H), 1.68-1.41 (m, 7H), 1.43-1.26 (m, 13H), 1.21 (s, 3H), 0.97 (s, 3H).

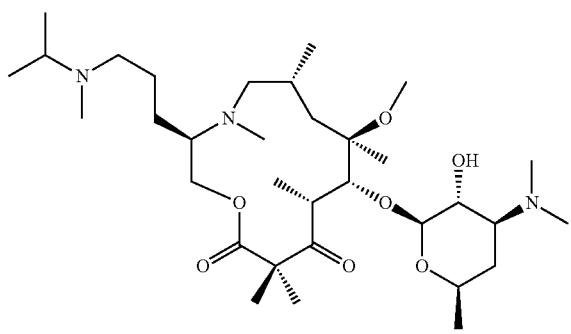

(3R,6R,8R,9R,10R)-9-(((2S,3R,4S,6R)-4-(dimethyl-amino)-3-hydroxy-6-methyltetrahydro-2H-pyran-2-yl)oxy)-3-(3-(isopropyl(methyl)amino)propyl)-8-methoxy-4,6,8,10,12,12-hexamethyl-1-oxa-4-azacyclotridecane-11,13-dione (S6-3-I2-1-4) (Compound 12)

Prepared according to the methods of S6-3-I1-1-1 from S2-1-I2-1 and N-methylisopropylamine to give the title compound as a formate salt. MS (ESI+) m/z: 614.43 [M+H]$^+$; $^1$H NMR (400 MHz, Methanol-d$_4$) δ 4.71 (s, 1H), 4.45 (d, 1H), 4.27 (d, 2H), 3.87-3.63 (m, 2H), 3.53 (p, 1H), 3.49-3.33 (m, 3H), 3.05 (d, 7H), 2.77 (s, 9H), 2.70 (s, 4H), 2.17 (s, 1H), 2.01 (ddd, 1H), 1.85 (s, 3H), 1.75-1.43 (m, 7H), 1.43-1.21 (m, 18H), 1.04 (d, 3H).

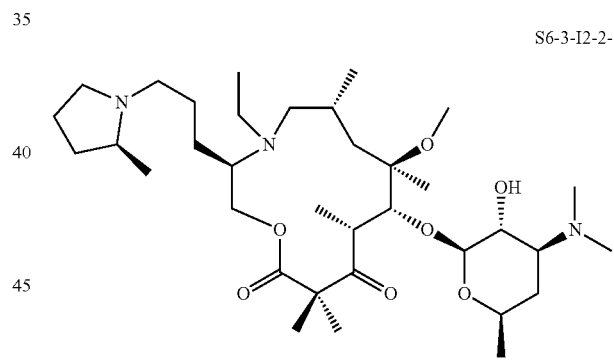

(3R,6R,8R,9R,10R)-9-(((2S,3R,4S,6R)-4-(dimethyl-amino)-3-hydroxy-6-methyltetrahydro-2H-pyran-2-yl)oxy)-4-ethyl-8-methoxy-6,8,10,12,12-pentam-ethyl-3-(3-((S)-2-methylpyrrolidin-1-yl)propyl)-1-oxa-4-azacyclotridecane-11,13-dione (S6-3-I2-2-2) (Compound 88)

Prepared according to the methods of S6-3-I1-1-1 from S2-1-I2-2 and (S)-2-methylpyrrolidine to give the title compound as a formate salt. MS (ESI+) m/z: 640.32 [M+H]$^+$; $^1$H NMR (400 MHz, Methanol-d$_4$) δ 4.46 (d, 1H), 4.11 (s, 2H), 3.80-3.51 (m, 4H), 3.49-3.22 (m, 4H), 2.97 (d, 7H), 2.77 (s, 7H), 2.28 (dq, 2H), 2.14-1.92 (m, 4H), 1.92-1.65 (m, 6H), 1.66-1.26 (m, 22H), 1.19 (s, 3H), 0.95 (s, 3H).

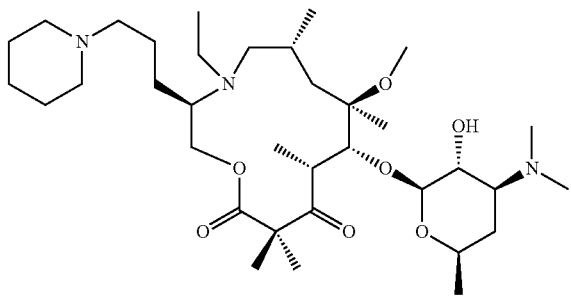

(3R,6R,8R,9R,10R)-9-(((2S,3R,4S,6R)-4-(dimethyl-
amino)-3-hydroxy-6-methyltetrahydro-2H-pyran-2-
yl)oxy)-4-ethyl-8-methoxy-6,8,10,12,12-pentam-
ethyl-3-(3-(piperidin-1-yl)propyl)-1-oxa-4-
azacyclotridecane-11,13-dione (S6-3-I2-2-3)
(Compound 140)

Prepared according to the methods of S6-3-I1-1-1 from S2-1-I2-2 and piperidine to give the title compound as a formate salt. MS (ESI+) n/z: 640.32 [M+H]$^+$; $^1$H NMR (400 MHz, Methanol-d$_4$) δ 4.46 (d, 1H), 4.13 (s, 2H), 3.83-3.39 (m, 4H), 3.38-3.24 (m, 2H), 3.24-2.83 (m, 10H), 2.77 (s, 7H), 2.11-1.93 (m, 2H), 1.84 (dt, 9H), 1.71-1.42 (m, 9H), 1.42-1.26 (m, 13H), 1.21 (s, 3H), 0.97 (s, 3H).

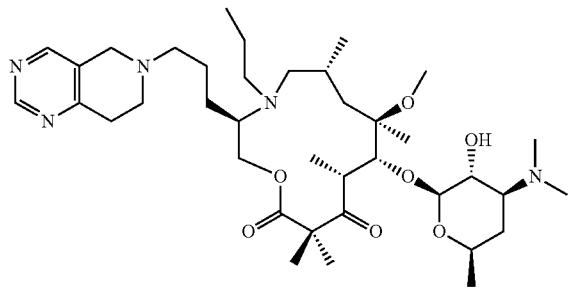

(3R,6R,8R,9R,10R)-3-(3-(7,8-dihydropyrido[4,3-d]
pyrimidin-6 (5H)-yl)propyl)-9-(((2S,3R,4S,6R)-4-
(dimethylamino)-3-hydroxy-6-methyltetrahydro-2H-
pyran-2-yl)oxy)-8-methoxy-6,8,10,12,12-
pentamethyl-4-propyl-1-oxa-4-azacyclotridecane-11,
13-dione (S6-3-I2-3-1) (Compound 182)

Prepared according to the methods of S6-3-I1-1-1 from S2-1-I2-3 and 5,6,7,8-tetrahydropyrido[4,3-d]pyrimidine to give the title compound as a formate salt. MS (ESI+) m/z: 704.04 [M+H]$^+$; $^1$H NMR (400 MHz, Methanol-d$_4$) δ 8.93 (s, 1H), 8.54 (s, 1H), 4.45 (d, 1H), 4.41-4.10 (m, 2H), 3.73 (q, 4H), 3.57-3.16 (m, 6H), 3.08-2.87 (m, 9H), 2.84 (s, 6H), 2.80-2.63 (m, 2H), 2.18-1.60 (m, 8H), 1.61-1.44 (m, 6H), 1.42-1.22 (m, 13H), 1.01-0.85 (m, 6H).

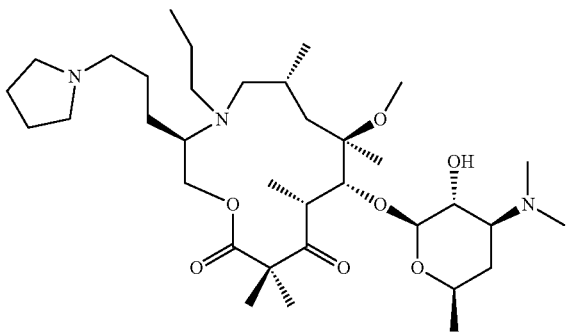

(3R,6R,8R,9R,10R)-9-(((2S,3R,4S,6R)-4-(dimethyl-
amino)-3-hydroxy-6-methyltetrahydro-2H-pyran-2-
yl)oxy)-8-methoxy-6,8,10,12,12-pentamethyl-4-
propyl-3-(3-(pyrrolidin-1-yl)propyl)-1-oxa-4-
azacyclotridecane-11,13-dione (S6-3-I2-3-2)
(Compound 144)

Prepared according to the methods of S6-3-I1-1-1 from S2-1-I2-3 and pyrrolidine to give the title compound as a formate salt. MS (ESI+) m/z: 640.32 [M+H]$^+$; $^1$H NMR (400 MHz, Methanol-d$_4$) δ 4.45 (d, 1H), 4.09 (s, 2H), 3.79-3.64 (m, 11H), 3.57 (s, 1H), 3.44 (dd, 1H), 3.41-3.22 (m, 7H), 3.15 (qt, 3H), 2.87 (s, 4H), 2.79 (s, 8H), 2.14-1.96 (m, 6H), 1.80 (s, 4H), 1.66-1.41 (m, 8H), 1.40-1.20 (m, 13H), 0.96 (dd, 6H).

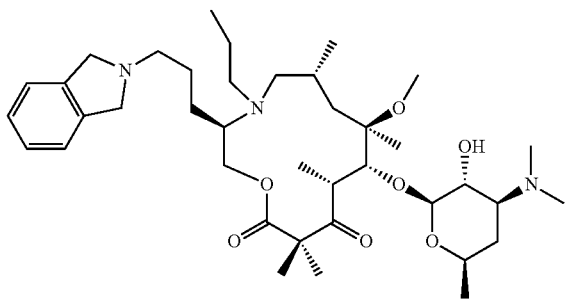

(3R,6R,8R,9R,10R)-9-(((2S,3R,4S,6R)-4-(dimethyl-
amino)-3-hydroxy-6-methyltetrahydro-2H-pyran-2-
yl)oxy)-3-(3-(isoindolin-2-yl)propyl)-8-methoxy-6,8,
10,12,12-pentamethyl-4-propyl-1-oxa-4-
azacyclotridecane-11,13-dione (S6-3-I2-3-3)
(Compound 145)

Prepared according to the methods of S6-3-I1-1-1 from S2-1-I2-3 and isoindoline to give the title compound as a formate salt. MS (ESI+) m/z: 688.27 [M+H]$^+$; $^1$H NMR (400 MHz, Methanol-d$_4$) δ 7.29 (t, 4H), 4.46 (d, 1H), 4.18 (s, 6H), 3.72 (ddt, 1H), 3.61-3.31 (m, 5H), 2.98 (d, 8H), 2.79 (s, 7H), 2.02 (ddd, 2H), 1.82 (s, 7H), 1.51 (d, 5H), 1.44-1.23 (m, 13H), 1.00 (t, 6H).

S6-3-I2-3-5

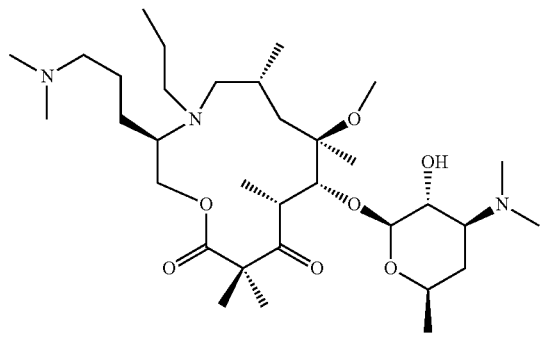

(3R,6R,8R,9R,10R)-9-(((2S,3R,4S,6R)-4-(dimethyl-amino)-3-hydroxy-6-methyltetrahydro-2H-pyran-2-yl)oxy)-3-(3-(dimethylamino)propyl)-8-methoxy-6,8,10,12,12-pentamethyl-4-propyl-1-oxa-4-azacyclotridecane-11,13-dione (S6-3-I2-3-5) (Compound 21)

Prepared according to the methods of S6-3-I1-1-1 from S2-1-I2-3 and dimethylamine to give the title compound as a formate salt. MS (ESI+) m/z: 614.26 [M+H]$^+$; $^1$H NMR (400 MHz, Methanol-d$_4$) δ 4.45 (d, 1H), 4.08 (s, 2H), 3.78-3.52 (m, 2H), 3.44 (dd, 1H), 3.38-3.32 (m, 1H), 3.14-2.52 (m, 22H), 2.21-1.93 (m, 2H), 1.75 (s, 4H), 1.64-1.40 (m, 8H), 1.39-1.18 (m, 14H), 0.96 (dd, 6H).

S6-4-I1-1

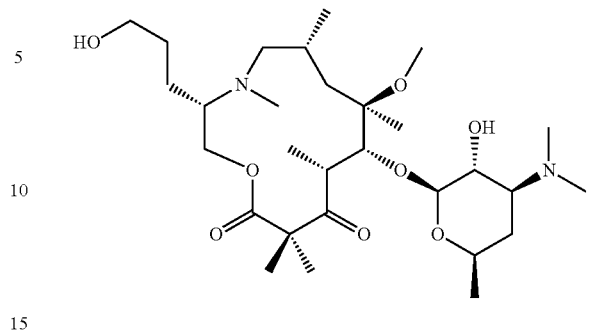

(3S,6R,8R,9R,10R)-9-(((2S,3R,4S,6R)-4-(dimethyl-amino)-3-hydroxy-6-methyltetrahydro-2H-pyran-2-yl)oxy)-3-(3-hydroxypropyl)-8-methoxy-4,6,8,10,12,12-hexamethyl-1-oxa-4-azacyclotridecane-11,13-dione (S6-4-I1-1) (Compound 4)

Prepared from S6-1-I1-1 according to the methods of S2-2-I3-1 to give the title compound as a formate salt. MS (ESI+) m/z: 559.35 [M+H]$^+$; $^1$H NMR (400 MHz, Methanol-d$_4$) δ 4.44 (d, 1H), 4.24 (t, 2H), 3.86-3.67 (m, 2H), 3.64 (t, 2H), 3.49-3.37 (m, 2H), 3.33 (d, 3H), 3.04 (d, 7H), 2.82 (dd, 1H), 2.75 (s, 6H), 2.21 (s, 1H), 2.07-1.90 (m, 2H), 1.89-1.54 (m, 4H), 1.49 (d, 5H), 1.45-1.24 (m, 13H), 1.06 (d, 3H).

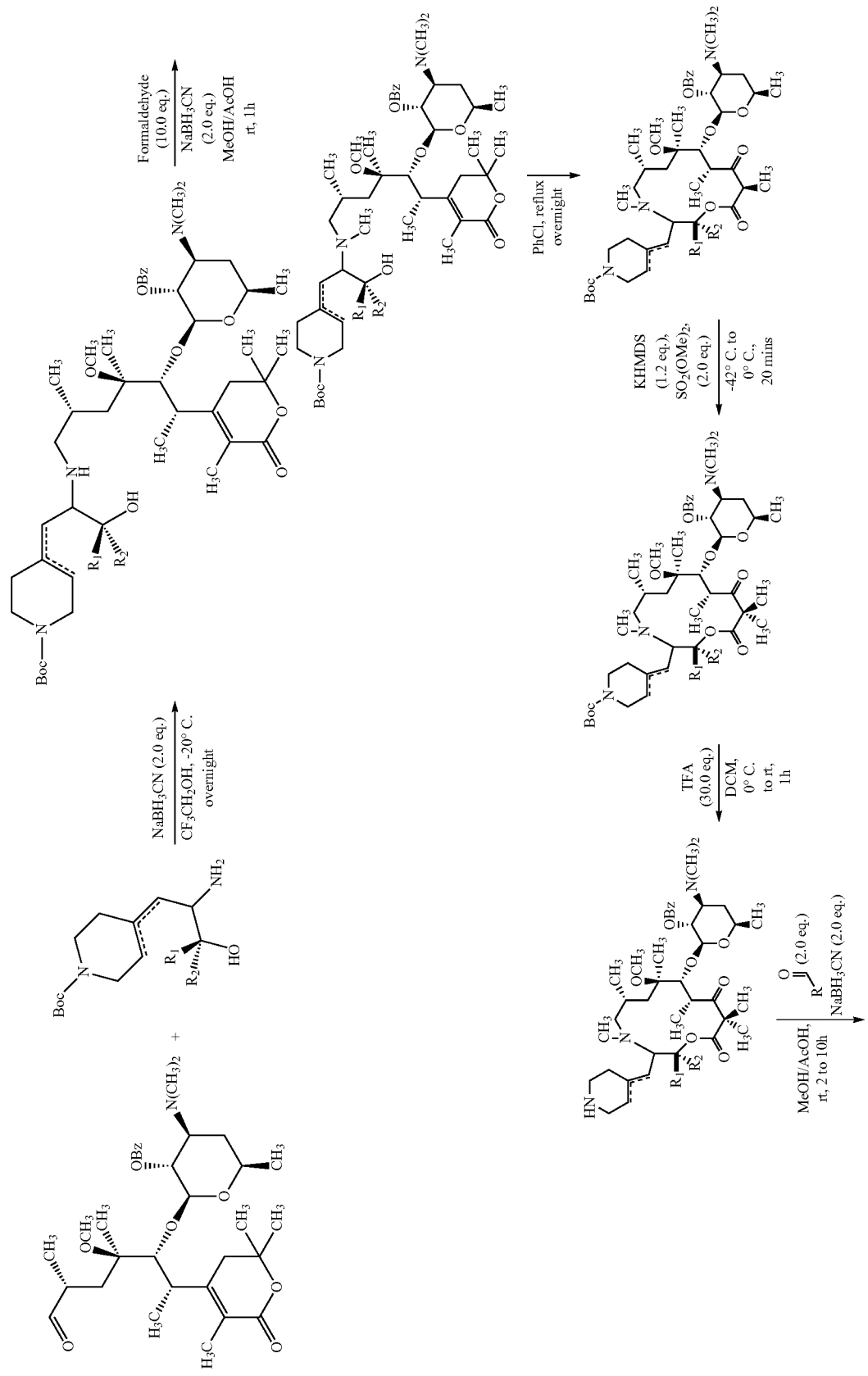

-continued
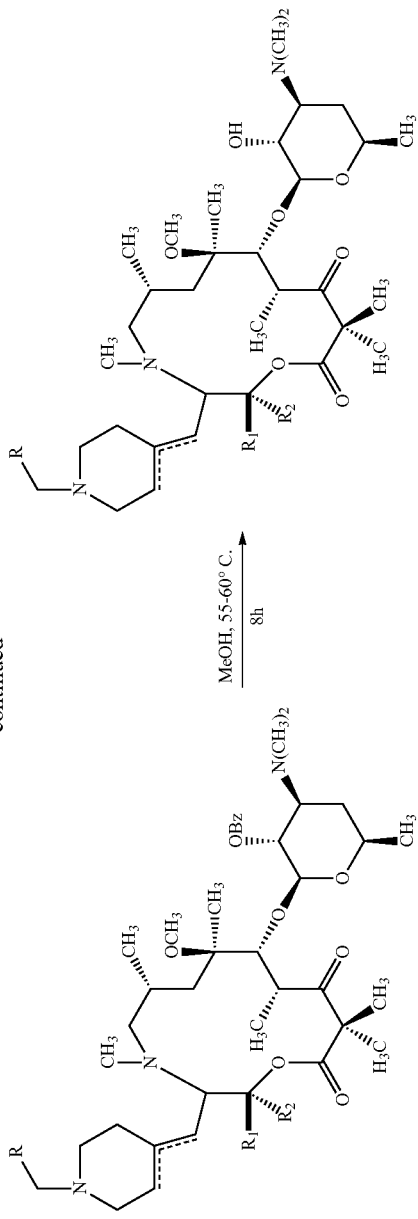
$R_1$ = H, Me
$R_2$ = H, Me

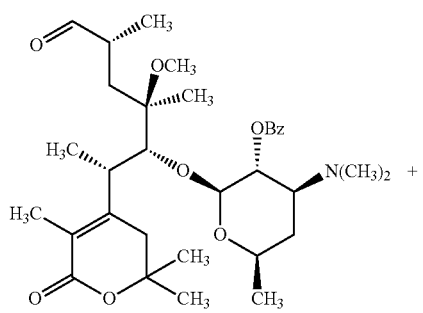

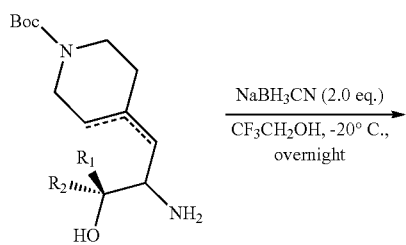

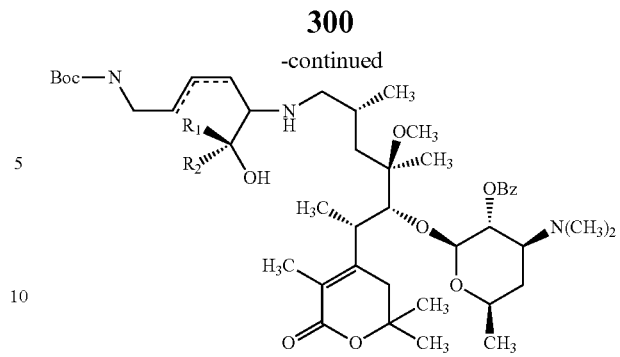

To a stirring solution of the amino-alcohol (1.2 eq.) and sodium cynaoborohydride (2.0 eq.) in trifluoroethanol at −20° C. was added dropwise a solution of (2S,3R,4S,6R)-4-(dimethylamino)-2-(((2R,3R,4R,6R)-4-methoxy-4,6-dimethyl-7-oxo-2-(2,2,5-trimethyl-4-oxo-4H-1,3-dioxin-6-yl)heptan-3-yl)oxy)-6-methyltetrahydro-2H-pyran-3-yl benzoate (1.0 eq.) in trifluoroethanol (final concentration 0.1 M). The reaction media was stirred overnight. When complete, the reaction media was diluted with DCM and quenched with NaHCO₃ sat aq. The organic phase was extracted three times with DCM. Organic layers were assembled, dried over Na₂SO₄ anhydrous and concentrated under reduced pressure. Pure compounds were obtained by purification on column chromatography (Eluent: DCM/MeOH: 100:0 to 90:10+1% NEt₃) as off-white solids.

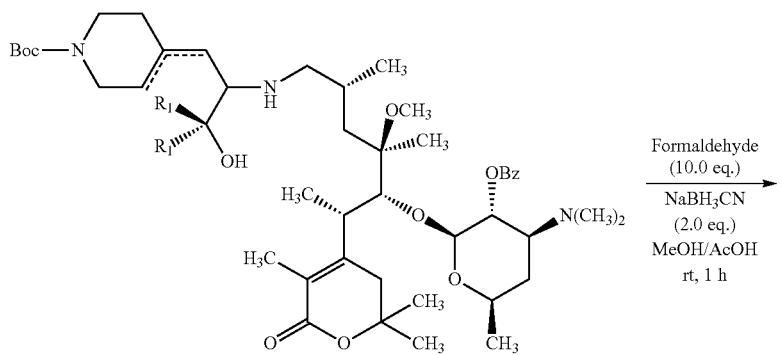

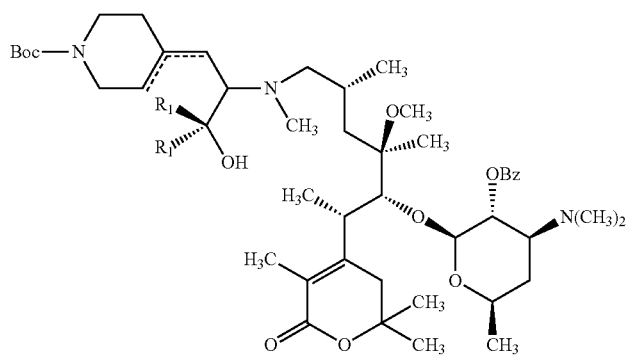

To a stirring solution of the previous compound (1.0 eq.) and sodium cynaoborohydride (2.0 eq.) in a MeOH/AcOH 9:1 mixture (0.1 M) at room temperature was added drop-wise the formaldehyde (15 eq., 37 wt % in MeOH) in trifluoroethanol. The reaction media was kept under stirring for 1 hour at which point LCMS analysis showed full methylation of the north nitrogen. The reaction media was diluted with DCM and quenched with NaHCO₃ sat aq. The organic phase was extracted three times with DCM. Organic layers were assembled, dried over Na₂SO₄ anhydrous and concentrated under reduced pressure. Pure compounds were obtained by purification on column chromatography (Eluent: DCM/MeOH: 100:0 to 90:10+1% NEt₃) as off-white solids.

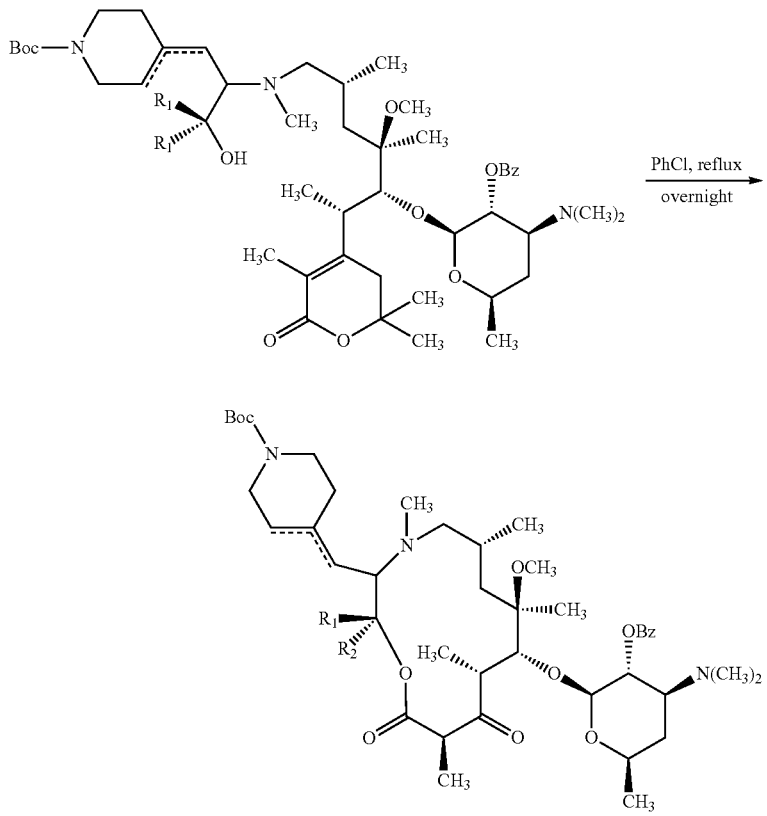

The pure compound from the previous step was azeotroped three times with toluene and kept under high vacuum overnight. A solution of the title compound in dry chlorobenzene (1 mM solution) under argon atmosphere was placed under reflux overnight. At this point LCMS analysis showed full cyclization into the desire product. The chlorobenzene was removed under vacuum and the product was used as such for the next step.

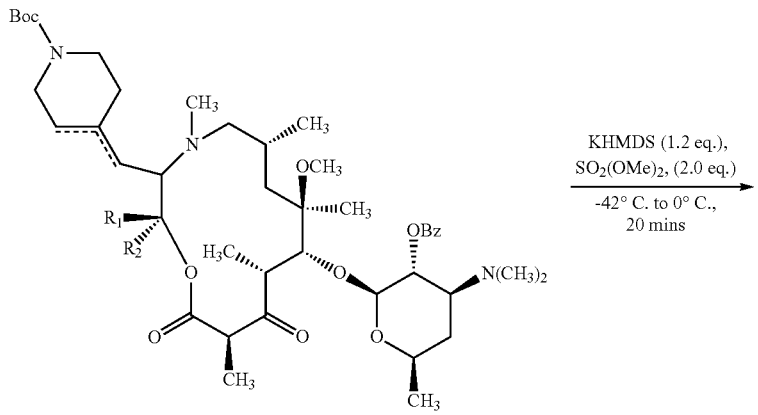

-continued

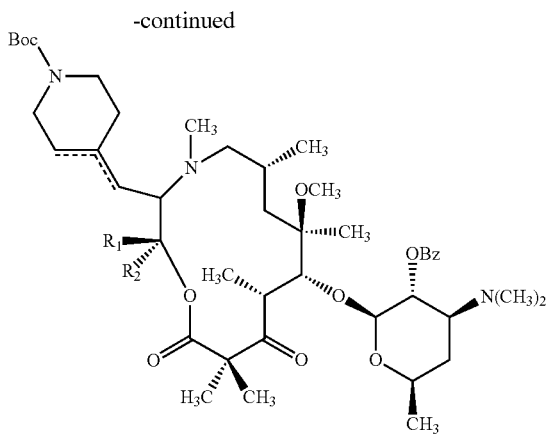

To a stirring solution of the macrolide in THF (0.1 M) at −42° C. (acetonitrile/dry ice bath) under argon atmosphere was added a molar solution of KHMDS (1.2 eq) and the reaction mixture was allowed to stir for 10 minutes at this temperature. Two equivalents of sodium sulfate were then added dropwise at −42° C. and the acetonitrile/dry ice bath was replaced by an ice bath. The reaction mixture was kept under stirring at 0° C. until full conversion (typically 20 mins). Ten eq. of $NEt_3$ were added to the reaction media to mop up the excess of dimethylsulfate and the reaction media was allowed to warm up to room temperature. Half saturated solution of $NH_4Cl$ and DCM were then added to the reaction media and the organic phase was extracted three times with DCM. Organic layers were assembled, dried over $Na_2SO_4$ and finally concentrated under reduced pressure to afford desired macrolides which were purified over column chromatography (Eluent: DCM/MeOH: 100:0 to 90:10+1% $NEt_3$).

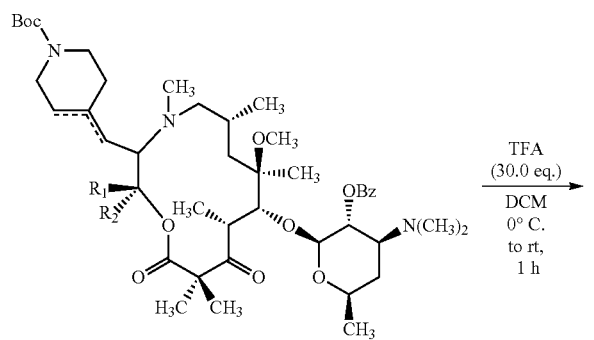

TFA (30.0 eq.) was added to a stirring solution of the macrolide (1.0 eq.) in DCM (0.1 M solution) at 0° C. and the reaction mixture was kept stirring at room temperature until full deprotection. After 1 h LCMS showed complete conversion. DCM and $NaHCO_3$ sat. aq. were added to the reaction mixture and vigorous stirring was kept for 5 mins and the aqueous phase was extracted with DCM (3×10 mL). Organic layers were assembled, dried over anhydrous $Na_2SO_4$ and concentrated under reduced pressure to afford deprotected macrolide which was used as such for next step.

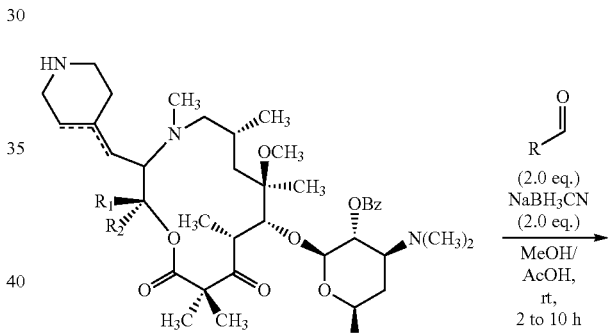

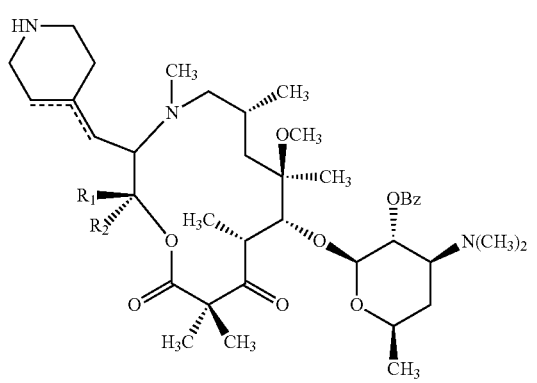

Aldehyde (2.0 to 4.0 eq.) was added to a stirring solution of the macrolide (1.0 eq.) and sodium cyano borohydride (53 mg, 0.84 mmol, 2.0 eq.) in trifluoroethanol (0.1 M) and the reaction was kept under stirring until full consumption of starting material. After 2 to 8 h of reaction time LCMS showed full conversion of starting material in desired product. DCM and water were added to the reaction mixture and aqueous phase was extracted three times with DCM. Organic layers were assembled, dried over Na₂SO₄ anhydrous and concentrated to afford desired crude product which was purified by column chromatography (DCM/MeOH+1% NEt₃ 100:0 to 70:30).

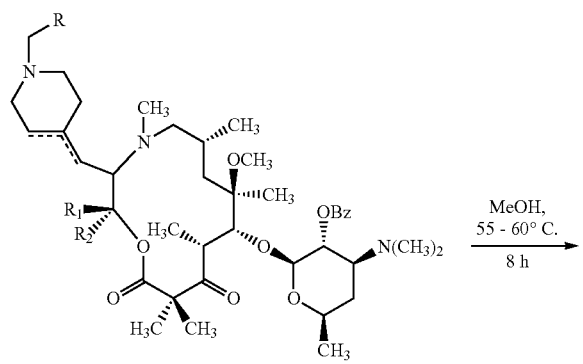

MeOH, 55 - 60° C.
8 h

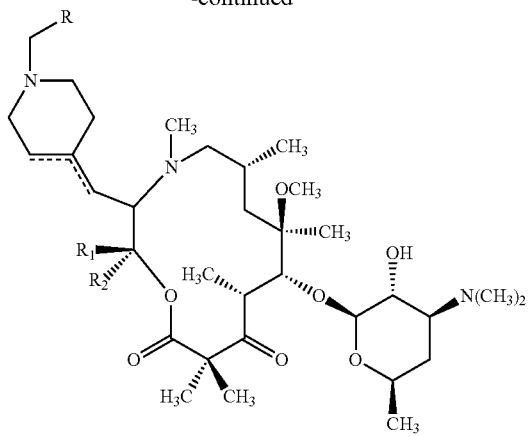

The macrolide compound was diluted in MeOH (0.01 M) and the solution was heated to 55-60° C. and kept stirring at this temperature until full deprotection of the benzoyl group (typically 8 h). The reaction media was then concentrated under vacuum and the crude products were then purified via HPLC to afford pure macrolide analogs.

The following compounds were prepared using the synthetic procedures detailed in Scheme 7 using intermediate compounds I10-I16 and I19. Compound 2 was prepared from a byproduct (elimination/azetidine ring opening) formed in the synthesis of Compound 1.

| Compound | Characterization |
| --- | --- |
|  | ¹H NMR (600 MHz, Methanol-d₄) δ 4.44 (d, 1H), 4.31-4.13 (m, 2H), 3.89-3.76 (m, 1H), 3.76-3.68 (m, 1H), 3.55-3.46 (m, 2H), 3.46-3.39 (m, 1H), 3.37-3.32 (m, 2H), 3.12-3.05 (m, 4H), 2.98-2.89 (m, 2H), 2.89-2.79 (m, 6H), 2.77 (s, 6H), 2.26-2.14 (m, 1H), 2.09 (d, 1H), 2.01 (d, 1H), 1.96-1.85 (m, 1H), 1.85-1.64 (m, 4H), 1.64-1.56 (m, 2H), 1.50 (s, 3H), 1.45-1.25 (m, 12H), 1.04 (s, 3H), 1.01-0.9 (m, 3H) |

| Compound | Characterization |
|---|---|
| 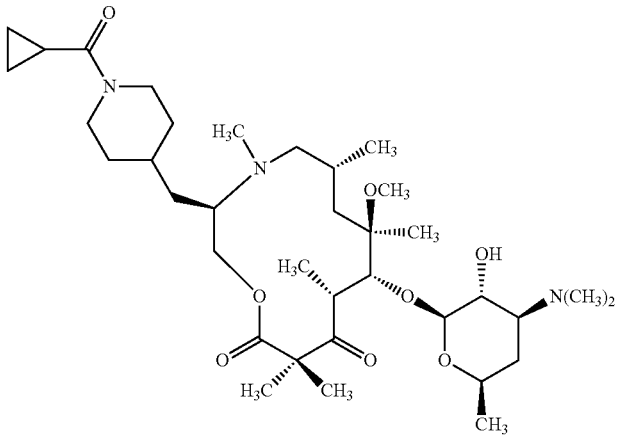<br>45 | ¹H NMR (600 MHz, Methanol-d₄) δ 4.57-4.45 (m, 1H), 4.41 (d, 1H), 4.39-4.31 (m, 1H), 4.29-4.17 (m, 1H), 3.72-3.63 (m, 1H), 3.41-3.33 (m, 2H), 3.22-3.12 (m, 1H), 3.12-2.97 (m, 6H), 2.85-2.75 (m, 1H), 2.74-2.63 (m, 4H), 2.60 (s, 6H), 2.31 (d, 1H), 2.37-2.25 (m, 1H), 2.24-2.27 (m, 1H), 2.04-1.88 (m, 2H), 1.88-1.78 (m, 1H), 1.77-1.66 (m, 2H), 1.62-1.44 (m, 1H), 1.51 (s, 3H), 1.45-1.39 (m, 3H), 1.38-1.32 (m, 3H), 1.29 (d, 6H), 1.16-1.00 (m, 2H), 0.98-0.88 (m, 1H), 0.84 (d, 2H), 0.80 (d, 2H). |
| 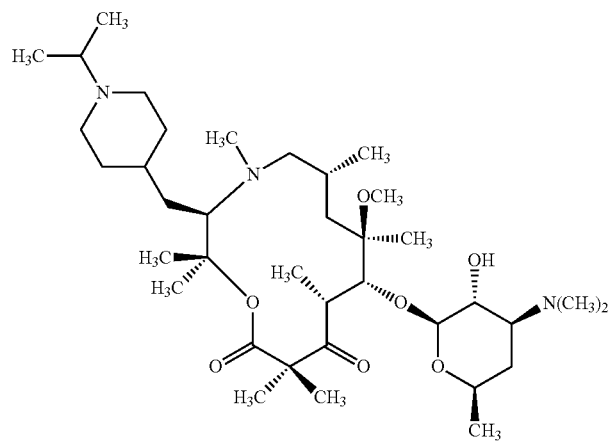<br>47 | ¹H NMR (600 MHz, Methanol-d₄) δ 4.51 (d, 1H), 4.38-4.33 (m, 1H), 4.15 (d, 1H), 3.74 (ddd, 2H), 3.66 (dd, 1H), 3.54-3.38 (m, 6H), 3.06 (d, 1H), 3.00 (s, 3H), 2.94 (s, 3H), 2.82 (s, 6H), 2.30-2.21 (m, 1H), 2.19-2.11 (m, 2H), 2.07-1.96 (m, 2H), 1.94-1.86 (m, 1H), 1.83 (d, 1H), 1.76-1.61 (m, 1H), 1.59 (s, 3H), 1.56 (m, 3H), 1.53 (s, 3H), 1.42 (s, 3H), 1.41-1.30 (m, 16H), 1.08 (d, 3H). |
| 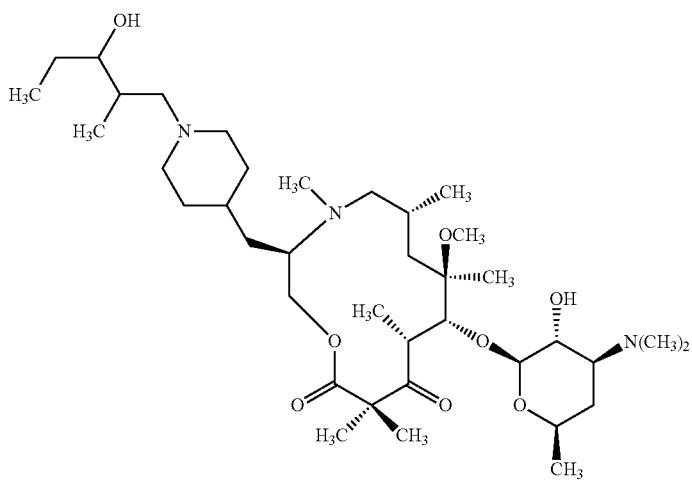<br>35 | ¹H NMR (500 MHz, Methanol-d₄) δ 4.74 (d, 1H), 4.44 (d, 1H), 4.33-4.24 (m, 2H), 3.90-3.80 (m, 1H), 3.79-3.67 (m, 2H), 3.55 (t, 1H), 3.48-3.44 (m, 1H), 3.40-3.32 (m, 2H), 3.21-3.09 (m, 2H), 3.06 (s, 3H), 3.04-3.00 (m, 1H), 2.95 (t, 1H), 2.88-2.81 (m, 5H), 2.80 (s, 7H), 2.25-2.17 (m, 0H), 2.17-2.11 (m, 1H), 2.05-1.92 (m, 2H), 1.86-1.68 (m, 5H), 1.67-1.58 (m, 1H), 1.56-1.47 (m, 1H), 1.54 (s, 3H), 1.41 (s, 3H), 1.39 (s, 3H), 1.35 (d, 3H), 1.33 (d, 3H), 1.12-1.08 (m, 3H), 1.08-1.04 (m, 4H), 1.01-0.96 (m, 1H), 0.93 (d, 2H). |

| Compound | Characterization |
|---|---|
| 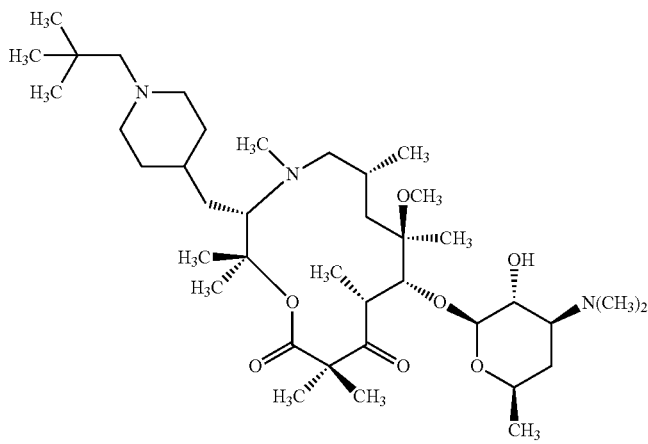<br>37 | ¹H NMR (500 MHz, Methanol-d₄) δ 4.41 (d, 1H), 4.22-4.31 (m, 1H), 4.12-4.02 (m, 1H), 3.93-3.81 (m, 1H), 3.65-3.56 (m, 2H), 3.37-3.25 (m, 2H), 3.25-3.12 (m, 2H), 3.12-2.99 (m, 3H), 2.96-2.86 (m, 2H), 2.83 (s, 6H), 2.66-2.51 (m, 2H), 2.45-2.35 (m, 1H), 1.99 (dd, 1H), 1.96-1.82 (m, 1H), 1.82-1.70 (m, 2H), 1.62-1.51 (m, 3H), 1.49-1.32 (m, 4H), 1.28 (s, 3H), 1.27-1.19 (m, 6H), 1.11-0.99 (m, 3H), 0.95-0.88 (m, 9H), 0.87-0.82 (m, 2H). |
| 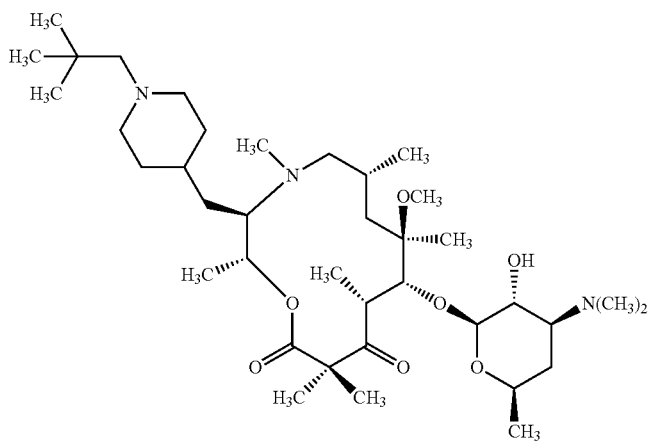<br>39 | ¹H NMR (600 MHz, Methanol-d₄) δ 5.07-5.00 (m, 1H), 4.48-4.39 (m, 1H), 4.16-4.02 (m, 1H), 3.77-3.63 (m, 2H), 3.49-3.38 (m, 1H), 2.90-2.81 (m, 5H), 2.79-2.62 (m, 7H), 2.59-2.44 (m, 2H), 2.06-1.98 (m, 1H), 1.95 (d, 1H), 1.82 (d, 1H), 1.62 (s, 3H), 1.53-1.39 (m, 3H), 1.32 (d, 7H), 1.29-1.23 (m, 3H), 1.04 (s, 9H), 1.01-0.93 (m, 3H). |
| 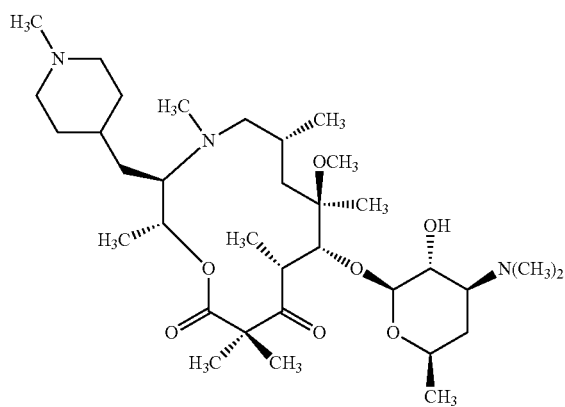<br>49 | ¹H NMR (500 MHz, Methanol-d₄) δ 5.14-5.08 (m, 1H), 5.02-4.93 (m, 1H), 4.43 (d, 1H), 4.10-4.00 (m, 1H), 3.74-3.63 (m, 2H), 3.49-3.38 (m, 2H), 3.27-3.16 (m, 2H), 3.02-2.91 (m, 2H), 2.81 (s, 3H), 2.71 (s, 6H), 2.57-2.46 (m, 1H), 2.45-2.31 (m, 2H), 2.10-1.99 (m, 2H), 1.99-1.91 (m, 2H), 1.76-1.69 (m, 1H), 1.67 (s, 3H), 1.61 (s, 3H), 1.58 (s, 3H), 1.56-1.44 (m, 3H), 1.44-1.33 (m, 3H), 1.32-1.21 (m, 12H), 0.99-0.91 (m, 6H). |

| Compound | Characterization |
|---|---|
| 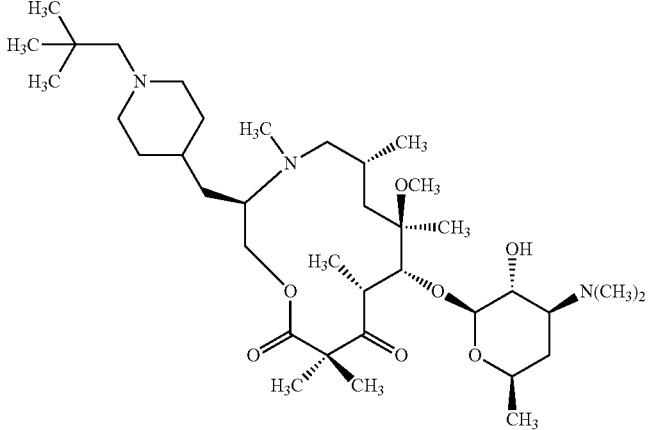<br>54 | ¹H NMR (600 MHz, Methanol-d₄) δ 4.80-4.66 (m, 1H), 4.43 (d, 1H), 4.34-4.22 (m, 2H), 3.92-3.82 (m, 1H), 3.71 (ddt, 1H), 3.39-3.33 (m, 2H), 3.29-3.22 (m, 1H), 3.17-3.08 (m, 2H), 3.05 (s, 3H), 2.92-2.78 (m, 2H), 2.72 (s, 6H), 2.61-2.48 (m, 2H), 2.48-2.36 (m, 2H), 2.30-2.17 (m, 1H), 2.01-1.96 (m, 1H), 1.94-1.86 (m, 1H), 1.83-1.67 (m, 1H), 1.53 (s, 3H), 1.52-1.45 (m, 7H), 1.39 (s, 3H), 1.34 (d, 3H), 1.31 (d, 3H), 1.11-1.01 (m, 3H), 0.97 (s, 9H). |
| 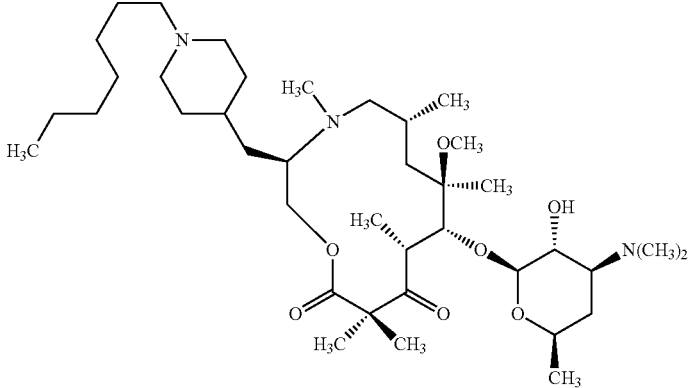<br>56 | ¹H NMR (600 MHz, Methanol-d₄) δ 4.77 (d, 1H), 4.44 (d, 1H), 4.32 (d, 1H), 4.31-4.26 (m, 1H), 3.89 (s, 1H), 3.74 (dqd, 1H), 3.57 (t, 2H), 3.47 (dd, 1H), 3.40 (ddd, 1H), 3.36-3.32 (m, 0H), 3.20-3.13 (m, 1H), 3.07 (s, 3H), 3.06-3.02 (m, 2H), 2.96-2.89 (m, 1H), 2.87 (s, 3H), 2.82 (s, 6H), 2.28-2.20 (m, 1H), 2.13 (d, 1H), 2.04 (ddd, 1H), 1.97 (d, 1H), 1.83-1.71 (m, 5H), 1.70-1.63 (m, 1H), 1.60 (dd, 1H), 1.56-1.49 (m, 1H), 1.52 (s, 3H), 1.42 (s, 3H), 1.40 (s, 3H), 1.39-1.37 (m, 9H), 1.35 (d, 2H), 1.33 (d, 5H), 1.07 (d, 3H), 0.94-0.89 (m, 2H). |
| 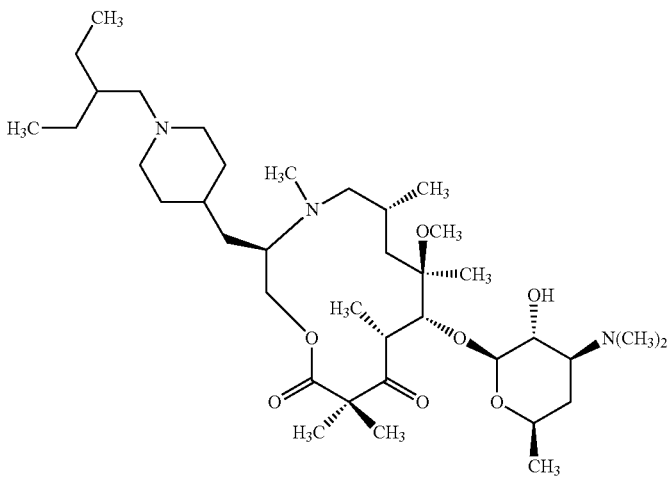<br>58 | ¹H NMR (600 MHz, Methanol-d₄) δ 4.81-4.64 (m, 1H), 4.42 (d, 1H), 4.35-4.14 (m, 2H), 3.91-3.82 (m, 1H), 3.69 (td, 1H), 3.40 (ddd, 1H), 3.23-3.14 (m, 1H), 2.99 (bs, 3H), 2.94-2.79 (m, 2H), 2.69 (s, 7H), 2.59-2.44 (m, 2H), 2.29-2.06 (m, 1H), 2.04-1.92 (m, 2H), 1.85 (d, 1H), 1.75-1.56 (m, 3H), 1.53 (s, 3H), 1.49-1.37 (m, 15H), 1.34 (s, 3H), 1.30 (tt, 3H), 1.13-0.97 (m, 3H), 0.91 (td, 6H). |

| Compound | Characterization |
|---|---|
| 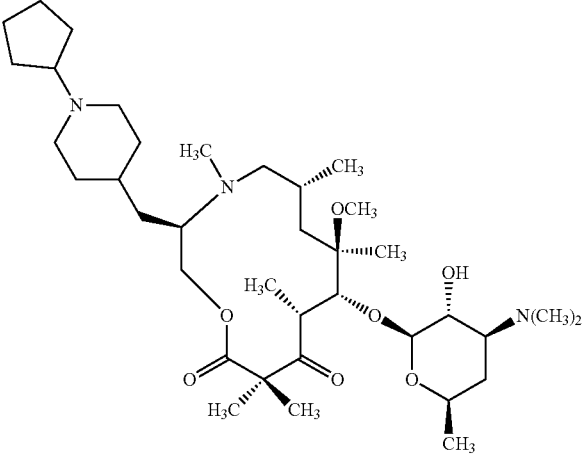<br>60 | ¹H NMR (600 MHz, Methanol-d₄) δ 4.81-4.64 (m, 1H), 4.43 (d, 1H), 4.34-4.14 (m, 2H), 3.91-3.83 (m, 1H), 3.70 (dqd, 1H), 3.55-3.45 (m, 2H), 3.41 (dd, 1H), 3.28-3.19 (m, 1H), 3.03 (bs, 3H), 2.86-2.73 (m, 5H), 2.70 (s, 6H), 2.14-2.04 (m, 3H), 2.01-1.90 (m, 2H), 1.86-1.76 (m, 2H), 1.73-1.62 (m, 5H), 1.53 (s, 3H), 1.46 (td, 1H), 1.38 (s, 3H), 1.34 (d, 3H), 1.33-1.29 (m, 5H), 0.99-1.07 (m, 3H). |
| 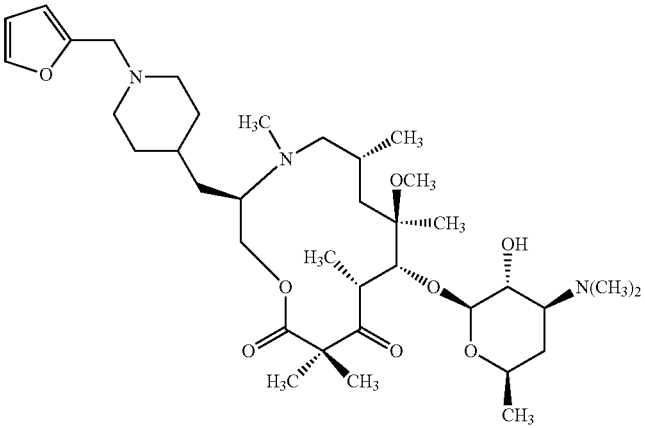<br>62 | ¹H NMR (600 MHz, Methanol-d₄) δ 7.56 (d, 1H), 6.49 (d, 1H), 6.44 (dd, 1H), 4.74 (d, 1H), 4.44 (d, 1H), 4.31 (d, 1H), 4.26 (dd, 1H), 3.94 (s, 2H), 3.91-3.84 (m, 1H), 3.74 (dqd, 1H), 3.46 (dd, 1H), 3.42-3.32 (m, 2H), 3.18 (q, 3H), 3.06 (s, 3H), 2.99 (d, 1H), 2.85 (s, 3H), 2.81 (s, 6H), 2.51 (t, 2H), 2.23 (s, 1H), 2.07-1.97 (m, 2H), 1.88-1.82 (m, 1H), 1.82-1.70 (m, 1H), 1.62 (dd, 2H), 1.53 (s, 3H), 1.52-1.49 (m, 1H), 1.41 (s, 3H), 1.39 (s, 3H), 1.35 (d, 3H), 1.33 (d, 3H), 1.06 (d, 3H). |
| 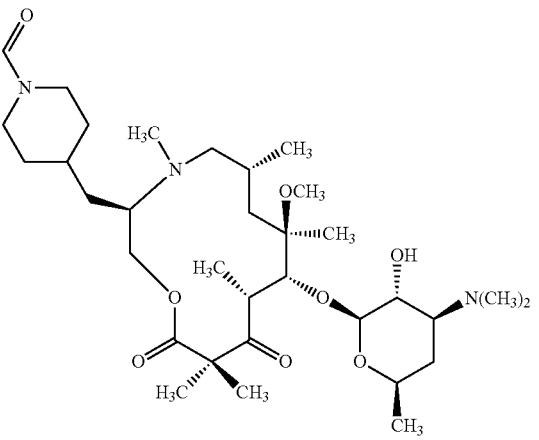<br>64 | ¹H NMR (600 MHz, Methanol-d₄) δ 8.01 (d, 1H), 4.79-4.71 (m, 1H), 4.44 (d, 1H), 4.35 (ddd, 1H), 4.32-4.24 (m, 2H), 3.93-3.83 (m, 1H), 3.81-3.69 (m, 2H), 3.45 (dd, 1H), 3.39-3.32 (m, 2H), 3.21-3.11 (m, 1H), 3.06 (s, 3H), 2.89-2.80 (m, 3H), 2.78 (s, 6H), 2.72 (tdd, 1H), 2.22 (s, 1H), 2.02 (ddd, 1H), 1.96 (dd, 1H), 1.87-1.71 (m, 4H), 1.66-1.61 (m, 1H), 1.54 (s, 3H), 1.52-1.46 (m, 1H), 1.41 (s, 3H), 1.40 (s, 3H), 1.36 (d, 3H), 1.32 (d, 3H), 1.30-1.25 (m, 1H), 1.23-1.16 (m, 1H), 1.06 (d, 3H). |

-continued
| Compound | Characterization |
|---|---|
| 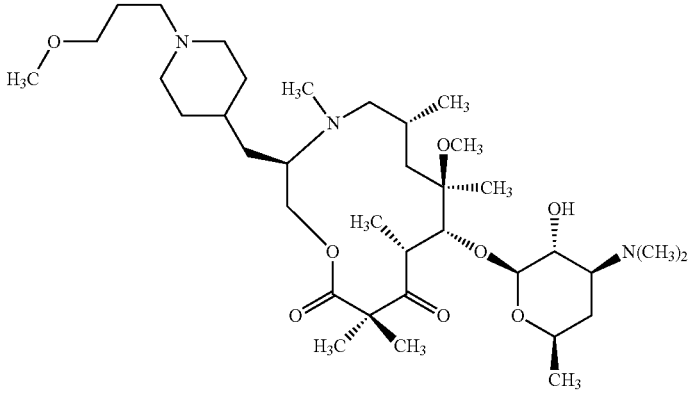<br>50 | ¹H NMR (600 MHz, Methanol-$d_4$) δ 4.75 (d, 1H), 4.43 (d, 1H), 4.32 (d, 1H), 4.26 (dd, 1H), 3.90-3.84 (m, 1H), 3.75 (dqd, 1H), 3.61-3.522 (m, 1H), 3.47-3.42 (m, 2H), 3.42-3.37 (m, 1H), 3.31 (s, 3H), 3.19-3.13 (m, 2H), 3.07 (s, 3H), 3.05-2.99 (m, 1H), 2.99 (d, 1H), 2.85 (s, 3H), 2.82 (s, 6H), 2.30 (s, 3H), 2.26-2.21 (m, 1H), 2.14-2.09 (m, 1H), 2.07-1.98 (m, 3H), 1.82-1.70 (m, 2H), 1.71-1.58 (m, 2H), 1.52 (dd, 1H), 1.52 (s, 3H), 1.41 (s, 3H), 1.39 (s, 3H), 1.34 (d, 3H), 1.32 (d, 3H), 1.32 (d, 3H), 1.07 (d, 3H). |
| 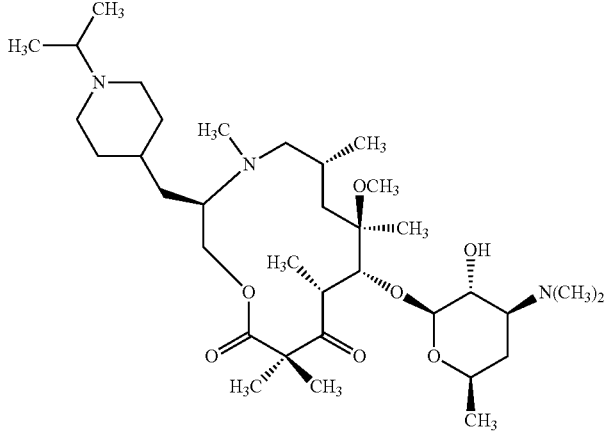<br>52 | ¹H NMR (600 MHz, Methanol-$d_4$) δ 4.78-4.71 (m, 1H), 4.43 (d, 1H), 4.36-4.17 (m, 3H), 3.93-3.84 (m, 1H), 3.69 (pt, 1H), 3.46-3.34 (m, 3H), 3.17 (d, 1H), 3.03 (s, 3H), 2.89-2.80 (m, 3H), 2.67 (s, 6H), 2.25-2.19 (m, 1H), 2.10 (d, 1H), 2.01-1.89 (m, 2H), 1.84-1.56 (m, 8H), 1.52 (s, 3H), 1.49-1.41 (m, 2H), 1.38 (s, 3H), 1.30 (dd, 12H), 1.09-1.03 (m, 3H). |
| 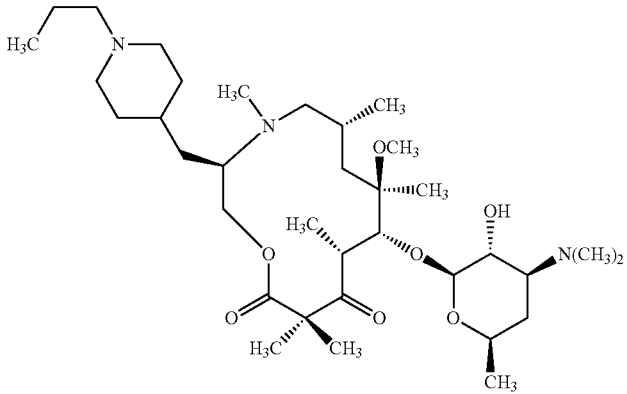<br>42 | ¹H NMR (600 MHz, Methanol-$d_4$) δ 4.80-4.68 (m, 1H), 4.44 (dd, 1H), 4.34-4.21 (m, 2H), 3.92-3.80 (m, 1H), 3.78-3.69 (m, 1H), 3.59-3.50 (m, 2H), 3.46 (ddd, 1H), 3.41-3.33 (m, 2H), 3.23-3.10 (m, 1H), 3.07 (s, 3H), 2.99 (t, 2H), 2.94-2.82 (m, 6H), 2.80 (d, 6H), 2.29-2.18 (m, 1H), 2.12 (d, 1H), 2.08-2.00 (m, 1H), 1.96 (d, 1H), 1.84-1.71 (m, 4H), 1.71-1.58 (m, 2H), 1.57-1.48 (m, 1H), 1.53 (s, 3H), 1.44-1.37 (m, 6H), 1.34 (ddd, 6H), 1.06 (d, 3H), 1.03-0.98 (m, 3H). |

| Compound | Characterization |
|---|---|
| 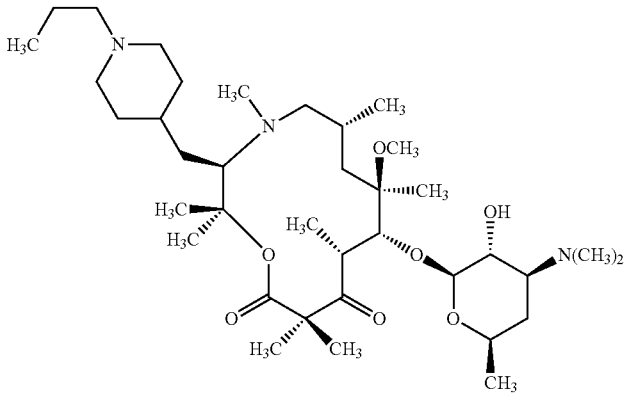<br>46 | ¹H NMR (600 MHz, Methanol-d₄) δ 4.47 (d, 1H), 4.35 (t, 1H), 4.15 (d, 1H), 3.74-3.63 (m, 2H), 3.51-3.43 (m, 1H), 3.43-3.34 (m, 2H), 3.23-3.13 (m, 1H), 3.03-2.97 (m, 1H), 2.99 (s, 3H), 2.92 (s, 3H), 2.76 (d, 3H), 2.67 (s, 6H), 2.65-2.56 (m, 1H), 2.31-2.17 (m, 2H), 2.07-1.99 (m, 2H), 1.99-1.88 (m, 2H), 1.78-1.63 (m, 4H), 1.57 (d, 6H), 1.52 (s, 3H), 1.50-1.45 (m, 4H), 1.41 (s, 3H), 1.34 (d, 6H), 1.30 (d, 6H), 1.28-1.19 (m, 2H), 1.07 (d, 2H), 0.98 (q, 3H), 0.93-0.83 (m, 1H). |
| 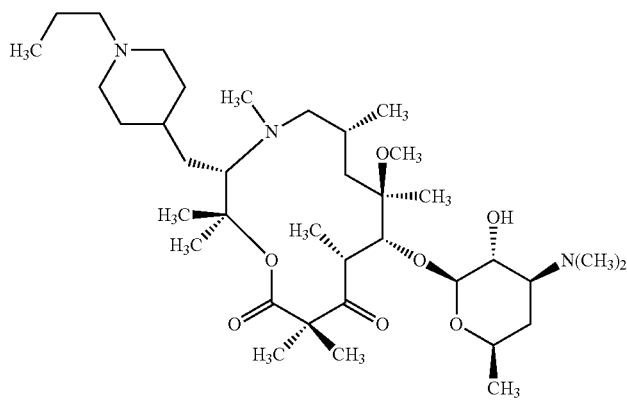<br>48 | ¹H NMR (600 MHz, Methanol-d₄) δ 4.38 (dd, 1H), 4.06 (dd, 1H), 3.63-3.55 (m, 1H), 3.23-3.14 (m, 2H), 3.10-2.97 (m, 1H), 2.91-2.77 (m, 1H), 2.86 (s, 3H), 2.55 (s, 3H), 2.45 (s, 6H), 2.42-2.27 (m, 3H), 2.06 (d, 1H), 1.85-1.71 (m, 4H), 1.66-1.58 (m, 2H), 1.56 (d, 3H), 1.44 (d, 3H), 1.37 (d, 6H), 1.32 (d, 1H), 1.29-1.22 (m, 9H), 1.22-1.13 (m, 1H), 1.07 (d, 1H), 0.98-0.93 (m, 3H), 0.89 (dd, 2H). |
| 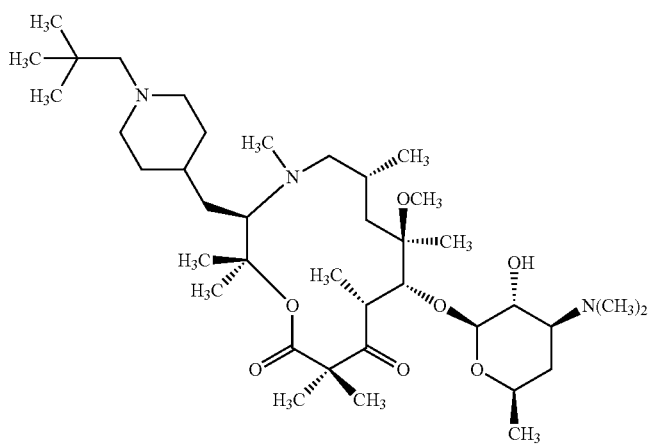<br>36 | ¹H NMR (500 MHz, Methanol-d₄) δ 4.46 (d, 1H), 4.35 (t, 1H), 4.15 (d, 1H), 3.73-3.62 (m, 2H), 3.42-3.34 (m, 2H), 3.17-3.07 (m, 1H), 2.99 (s, 3H), 2.98-2.94 (m, 1H), 2.90 (s, 3H), 2.73 (s, 2H), 2.62 (s, 6H), 2.41-2.32 (m, 1H), 2.21 (s, 3H), 1.98-1.86 (m, 2H), 1.86-1.79 (m, 2H), 1.72 (dd, 1H), 1.65-1.59 (m, 1H), 1.56 (d, 6H), 1.51 (s, 3H), 1.50-1.45 (m, 1H), 1.41 (s, 3H), 1.36-1.31 (m, 1H), 1.34 (d, 6H), 1.33-1.22 (m, 1H), 1.29 (d, 3H), 1.07 (d, 3H), 1.01 (s, 3H), 0.91 (s, 9H). |

-continued
| Compound | Characterization |
|---|---|
| 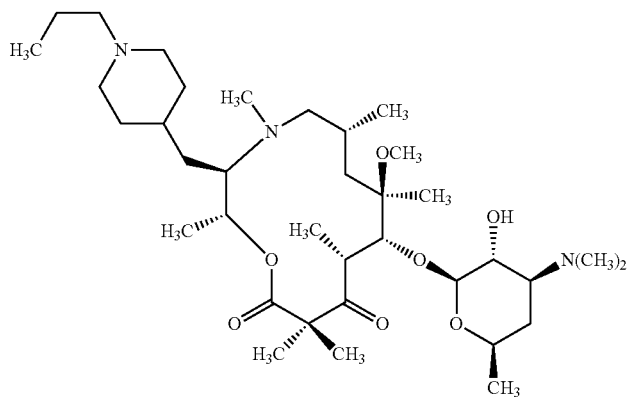<br>38 | $^1$H NMR (600 MHz, Methanol-d$_4$) δ 5.16-5.08 (m, 1H), 4.51-4.40 (m, 1H), 4.23-4.09 (m, 1H), 3.75-3.66 (m, 1H), 3.54 (d, 2H), 3.52-3.36 (m, 2H), 3.05-2.98 (m, 2H), 2.96-2.87 (m, 5H), 2.87-2.78 (m, 7H), 2.11-2.04 (m, 2H), 1.97 (d, 1H), 1.94-1.86 (m, 1H), 1.84-1.74 (m, 2H), 1.68 (s, 3H), 1.58 (s, 3H), 1.55-1.47 (m, 7H), 1.41-1.32 (m, 3H), 1.32-1.23 (m, 2H), 1.06-0.98 (m, 5H). |
| 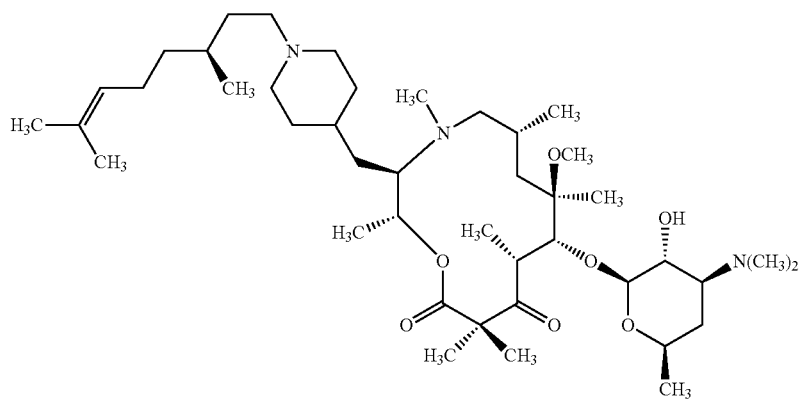<br>40 | $^1$H NMR (500 MHz, Methanol-d$_4$) δ 5.16-5.10 (m, 1H), 4.44 (d, 1H), 4.17-4.23 (m, 1H), 3.75-3.64 (m, 1H), 3.57-3.42 (m, 1H), 3.48-3.36 (m, 3H), 3.01-2.82 (m, 5H), 2.81 (s, 6H), 2.13-1.93 (m, 3H), 1.92-1.81 (m, 1H), 1.79-1.63 (m, 2H), 1.58 (s, 3H), 1.55 (s, 3H), 1.39 (s, 3H), 1.35 (d, 3H), 1.28 (d, 3H), 1.04-0.97 (m, 3H). |
| 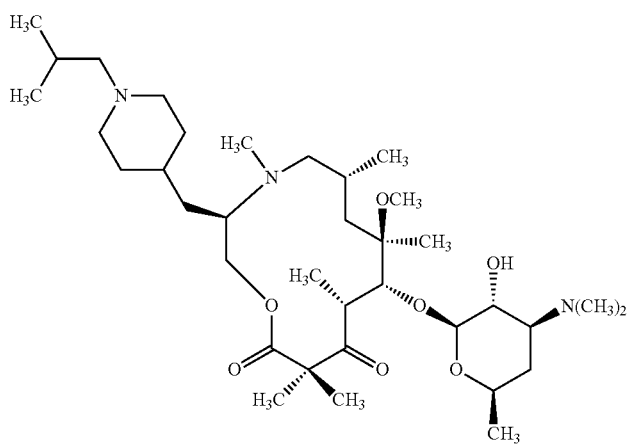<br>53 | $^1$H NMR (600 MHz, Methanol-d$_4$) δ 4.79-4.70 (m, 1H), 4.44 (d, 1H), 4.34-4.24 (m, 2H), 3.92-3.82 (m, 1H), 3.78-3.68 (m, 1H), 3.58-3.50 (m, 2H), 3.50-3.42 (m, 1H), 3.42-3.33 (m, 2H), 3.19-3.11 (m, 1H), 3.07 (s, 3H), 2.93-2.83 (m, 8H), 2.80 (s, 6H), 2.27-2.17 (m, 1H), 2.17-2.07 (m, 1H), 2.07-2.00 (m, 1H), 1.98-1.91 (m, 1H), 1.84-171 (m, 4H), 1.71-1.58 (m, 2H), 1.56-1.49 (m, 1H), 1.54 (s, 3H), 1.41 (s, 3H), 1.39 (s, 3H), 1.35 (d, 3H), 1.33 (d, 3H), 1.06 (d, 4H), 1.04 (d, 7H). |

-continued
| Compound | Characterization |
|---|---|
| 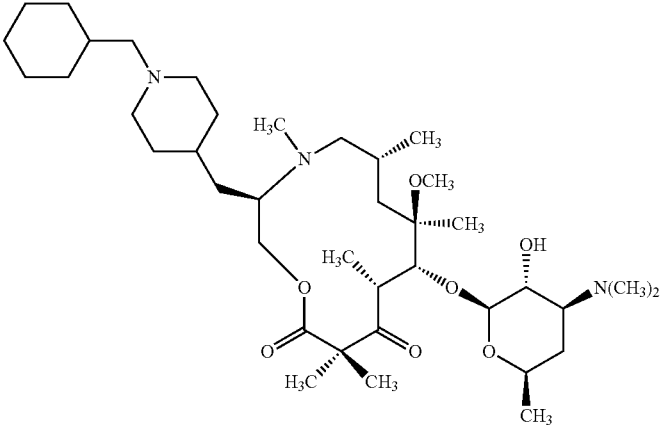
55 | ¹H NMR (600 MHz, Methanol-d₄) δ 4.82-4.65 (m, 1H), 4.43 (d, 1H), 4.34-4.18 (m, 2H), 3.93-3.81 (m, 1H), 3.71 (dtd, 1H), 3.46-3.33 (m, 4H), 3.29-3.20 (m, 1H), 3.04 (s, 3H), 2.93-2.66 (m, 5H), 2.71 (s, 6H), 2.29-2.11 (m, 1H), 2.03 (d, 1H), 1.98 (ddd, 1H), 1.89 (d, 1H), 1.84-1.73 (m, 4H), 1.73-1.68 (m, 1H), 1.68-1.58 (m, 2H), 1.53 (s, 3H), 1.47 (q, 1H), 1.38 (s, 5H), 1.36-1.33 (m, 3H), 1.31 (d, 3H), 1.22 (qt, 1H), 1.10-0.97 (m, 5H). |
| 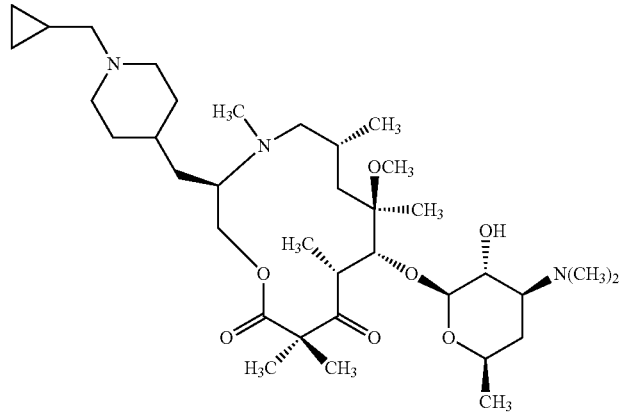
57 | ¹H NMR (600 MHz, Methanol-d₄) δ 4.80-4.69 (m, 1H), 4.44 (d, 1H), 4.36-4.23 (m, 2H), 3.93-3.82 (m, 1H), 3.74 (dt, 1H), 3.62 (d, 2H), 3.45 (dd, 1H), 3.40-3.33 (m, 1H), 3.06 (s, 3H), 2.94 (d, 2H), 2.92-2.83 (m, 3H), 2.79 (s, 6H), 2.27-2.16 (m, 1H), 2.12 (d, 1H), 2.02 (d, 1H), 1.97 (d, 1H), 1.84-1.70 (m, 3H), 1.61 (dd, 2H), 1.56-1.49 (m, 1H), 1.52 (s, 3H), 1.42-1.40 (m, 3H), 1.40 (s, 3H), 1.35 (d, 3H), 1.33 (d, 3H), 1.12 (dq, 1H), 1.06 (d, 2H), 0.76-0.72 (m, 2H), 0.40 (dt, 2H). |
| 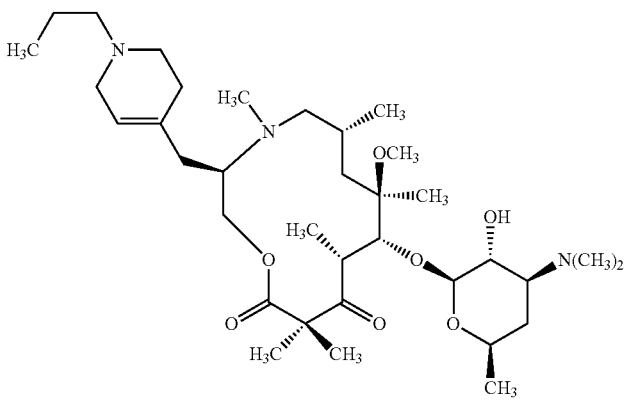
59 | ¹H NMR (600 MHz, Methanol-d₄) δ 5.73-5.48 (m, 1H), 4.82-4.64 (m, 1H), 4.42 (d, 1H), 4.33-4.07 (m, 2H), 3.93-3.80 (m, 1H), 3.66 (ddt, 1H), 3.36 (t, 1H), 3.24-2.96 (m, 4H), 2.97-2.79 (m, 3H), 2.60 (bs, 8H), 2.42-2.30 (m, 1H), 2.28-2.15 (m, 1H), 1.91 (d, 1H), 1.71-1.59 (m, 2H), 1.50 (s, 3H), 1.44-1.36 (m, 4H), 1.33 (s, 6H), 1.29 (d, 3H), 1.02 (t, 2H), 0.96 (t, 3H). |

-continued
| Compound | Characterization |
|---|---|
| 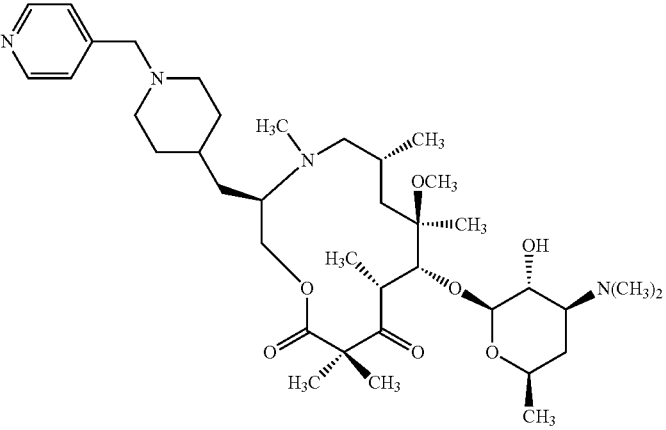            61 | ¹H NMR (600 MHz, Methanol-d₄) δ 9.12 (bs, 4H), 4.81-4.68 (m, 1H), 4.47-4.41 (m, 1H), 4.32 (dd, 1H), 4.27 (dd, 1H), 3.87 (d, 1H), 3.79-3.71 (m, 1H), 3.67 (s, 2H), 3.50-3.44 (m, 1H), 3.44-3.37 (m, 1H), 3.34 (td, 1H), 3.22-3.13 (m, 1H), 3.07 (d, 3H), 3.03 (d, 1H), 2.87 (s, 3H), 2.82 (s, 6H), 2.33 (s, 2H), 2.24 (s, 1H), 2.04 (d, 1H), 2.00-1.91 (m, 1H), 1.84-1.71 (m, 3H), 1.61 (q, 1H), 1.54 (d, 4H), 1.42 (d, 3H), 1.39 (d, 3H), 1.37-1.31 (m, 5H), 1.07 (dd, 3H). |
| 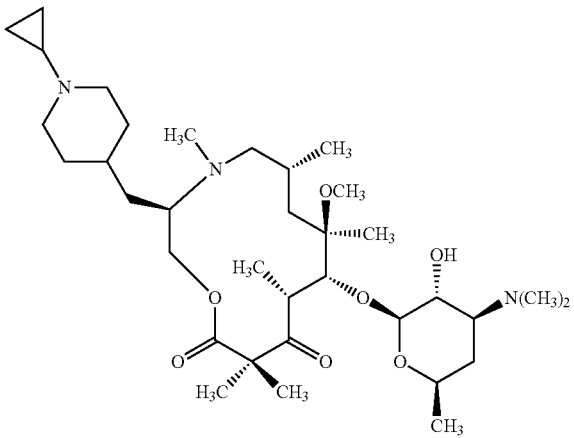            63 | ¹H NMR (600 MHz, Methanol-d₄) δ 4.77 (d, 1H), 4.45 (d, 1H), 4.32 (d, 1H), 4.26 (dd, 1H), 3.87 (s, 1H), 3.78-3.69 (m, 3H), 3.47-3.44 (m, 1H), 3.43-3.41 (m, 1H), 3.29-3.21 (m, 1H), 3.19-3.14 (m, 1H), 3.08 (s, 3H), 3.06-2.99 (m, 1H), 2.86 (s, 3H), 2.81 (s, 6H), 2.53 (s, 2H), 2.24 (s, 1H), 2.06-2.01 (m, 1H), 2.01-1.93 (m, 1H), 1.89-1.85 (m, 2H), 1.80 (d, 2H), 1.72 (d, 1H), 1.60 (t, 2H), 1.54 (s, 4H), 1.52 (s, 1H), 1.41 (d, 6H), 1.36 (d, 3H), 1.34 (d, 3H), 1.31 (dd, 3H), 1.07 (d, 3H), 0.67-0.62 (m, 3H). |
| 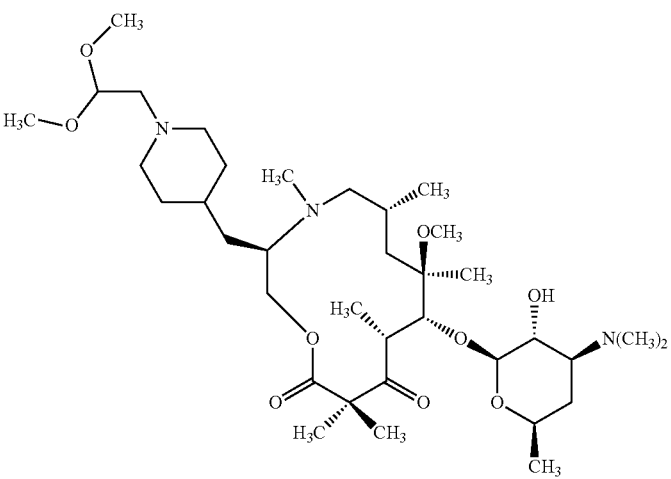            65 | ¹H NMR (600 MHz, Methanol-d₄) δ 4.78-4.72 (m, 1H), 4.42 (d, 1H), 4.37-4.13 (m, 3H), 4.06-3.98 (m, 1H), 3.92-3.84 (m, 1H), 3.69-3.59 (m, 3H), 3.41 (s, 6H), 3.20-3.11 (m, 1H), 3.08-2.89 (m, 3H), 2.87-2.77 (m, 3H), 2.60 (s, 3H), 2.49 (s, 3H), 2.25-2.19 (m, 1H), 2.17 (d, 1H), 2.90-2.79 (m, 1H), 2.71-2.62 (m, 1H), 1.62-1.44 (m, 1H), 1.51 (s, 3H), 1.49-1.41 (m, 2H), 1.39 (s, 3H), 1.35 (s, 3H), 1.30 (s, 3H), 1.09-1.03 (m, 1H), 0.99-0.80 (m, 1H). |

-continued
| Compound | Characterization |
|---|---|
| 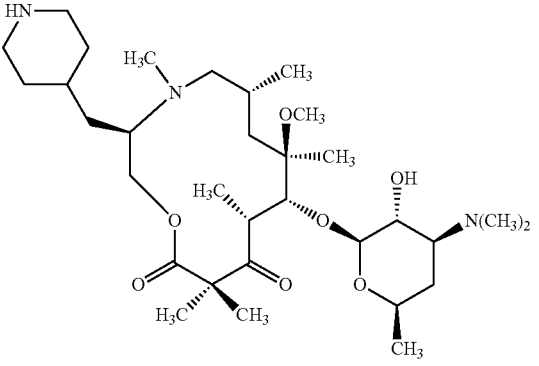 51 | ¹H NMR (600 MHz, Methanol-d₄) δ 4.77-4.71 (m, 1H), 4.43 (d, 1H), 4.37-4.16 (m 3H), 3.92-3.84 (m, 1H), 3.68 (t, 1H), 3.46-3.35 (m, 3H), 3.17 (d, 1H), 3.08-2.89 (m, 5H), 2.87-2.77 (m, 1H), 2.67 (s, 6H), 2.25-2.19 (m, 1H), 2.11 (d, 1H), 2.02-1.90 (m, 2H), 1.84-1.56 (m, 2H), 1.51 (s, 3H), 1.49-1.41 (m, 2H), 1.38 (s, 3H), 1.32 (d, 3H), 1.29 (d, 3H), 1.09-1.03 (m, 3H). |
| 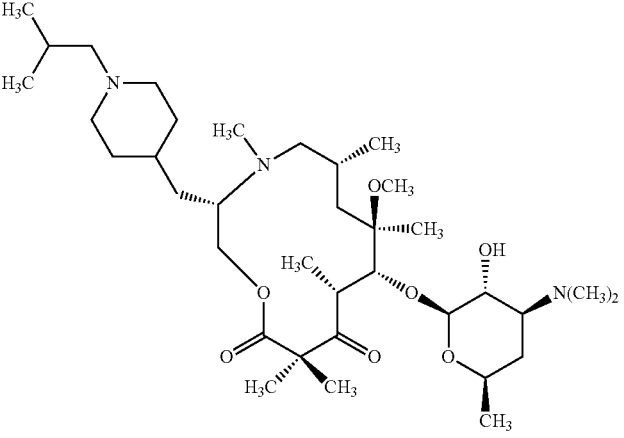 67 | ¹H NMR (600 MHz, Methanol-d₄) δ 4.36 (d, 2H), 4.03 (d, 1H), 3.91 (s, 1H), 3.65 (s, 1H), 3.62-3.57 (m, 2H), 3.07 (s, 1H), 3.01 (s, 1H), 2.83 (s, 1H), 2.75 (s, 2H), 2.46 (s, 4H), 2.42 (s, 2H), 2.38 (s, 3H), 2.23 (d, 4H), 2.15 (s, 2H), 1.93 (s, 1H), 1.81 (d, 2H), 1.72 (s, 1H), 1.57 (s, 2H), 1.48 (s, 1H), 1.40 (s, 3H), 1.27 (dd, 16H), 1.07 (s, 1H), 0.97-0.93 (m, 8H), 0.91 (d, 3H). |
| 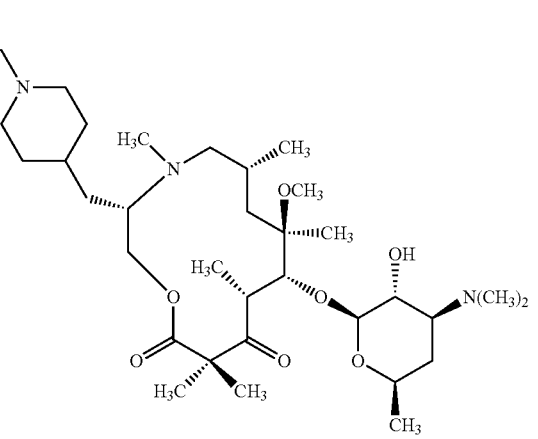 72 | ¹H NMR (600 MHz, Methanol-d₄) δ 4.47 (d, 1H), 4.27-4.19 (m, 2H), 3.86 (tt, 1H), 3.75 (dtt, 1H), 3.62 (t, 2H), 3.50-3.43 (m, 2H), 3.43-3.34 (m, 2H), 3.22 (q, 1H), 3.10-3.00 (m, 5H), 2.99-2.91 (m, 3H), 2.88 (s, 2H), 2.86-2.79 (m, 3H), 2.28-2.22 (m, 1H), 2.16 (dt, 1H), 2.05 (ddd, 1H), 1.96 (dt, 1H), 1.90-1.81 (m, 2H), 1.81-1.73 (m, 4H), 1.73-1.68 (m, 1H), 1.68-1.50 (m, 4H), 1.50 (s, 2H), 1.49-1.43 (m, 1H), 1.43-1.30 (m, 10H), 1.30-1.19 (m, 2H), 1.07 (d, 3H), 1.04 (dd, 3H). |

| Compound | Characterization |
|---|---|
| 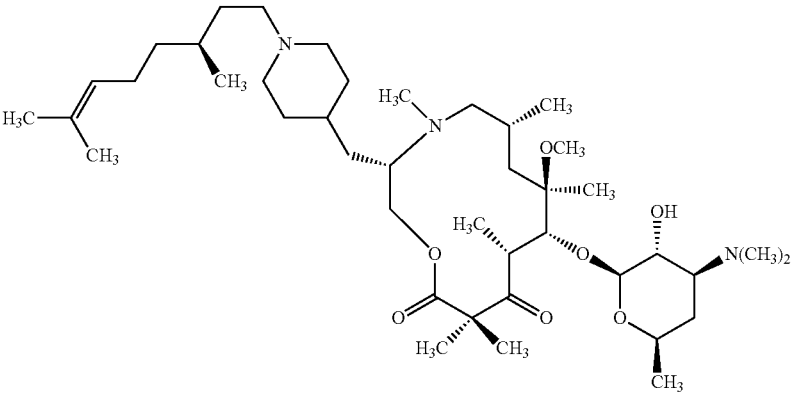<br>71 | ¹H NMR (600 MHz, Methanol-d₄) δ 5.10 (dtd, 1H), 4.46 (d, 1H), 4.24 (d, 1H), 4.21 (dd, 1H), 3.85 (tt, 1H), 3.74 (dtd, 2H), 3.66-3.57 (m, 2H), 3.49-3.33 (m, 4H), 3.13 (ddd, 2H), 3.08 (s, 2H), 3.07-2.94 (m, 5H), 2.94-2.88 (m, 2H), 2.87 (s, 2H), 2.85-2.75 (m, 4H), 2.26-2.21 (m, 1H), 2.18 (dt, 1H), 2.08-1.94 (m, 4H), 1.84-1.66 (m, 7H), 1.66-1.58 (m, 4H), 1.58-1.44 (m, 7H), 1.41 (d, 6H), 1.34 (dd, 6H), 1.26-1.18 (m, 2H), 1.12-1.04 (m, 3H), 0.96 (d, 3H). |
| 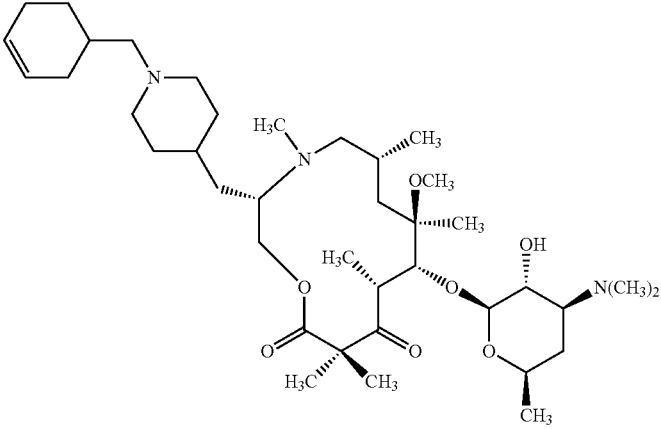<br>73 | ¹H NMR (600 MHz, Methanol-d₄) δ 8.51 (s, 3H), 5.70 (dd, 1H), 5.65 (ddd, 1H), 4.45 (d, 2H), 4.21 (s, 1H), 3.72 (dtt, 2H), 3.50 (s, 2H), 3.45 (dd, 3H), 3.37 (ddd, 3H), 3.05 (s, 2H), 2.94-2.90 (m, 3H), 2.84-2.81 (m, 2H), 2.79 (s, 9H), 2.20 (d, 2H), 2.10 (d, 6H), 2.02 (ddd, 2H), 1.91-1.83 (m, 4H), 1.82-1.78 (m, 2H), 1.71-1.68 (m, 1H), 1.66 (s, 1H), 1.57-1.46 (m, 8H), 1.43-1.36 (m, 8H), 1.33 (dd, 10H), 1.04 (s, 3H). |
| 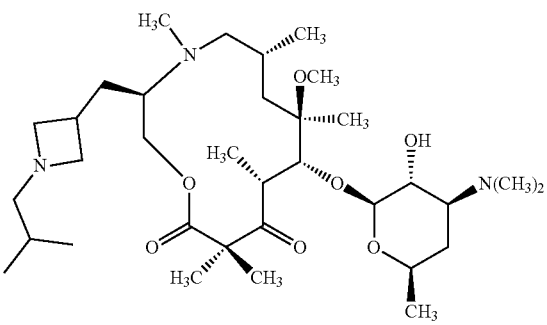<br>74 | ¹H NMR (600 MHz, Methanol-d₄) δ 8.40 (s, 3H), 8.11 (s, 1H), 4.47 (d, 2H), 4.20 (dd, 2H), 4.07 (t, 2H), 4.01 (d, 2H), 3.75-3.68 (m, 3H), 3.65 (dq, 3H), 3.47-3.33 (m, 7H), 3.09 (d, 5H), 2.86 (s, 3H), 2.81 (s, 6H), 2.74 (d, 3H), 2.08-1.93 (m, 6H), 1.91 (s, 1H), 1.79 (d, 2H), 1.65 (d, 2H), 1.61-1.57 (m, 1H), 1.55 (s, 3H), 1.55-1.47 (m, 2H), 1.34 (s, 3H), 1.34-1.27 (m, 11H), 1.23-1.15 (m, 5H), 1.01 (d, 5H), 0.92-0.85 (m, 2H). |

-continued
| Compound | Characterization |
|---|---|
| 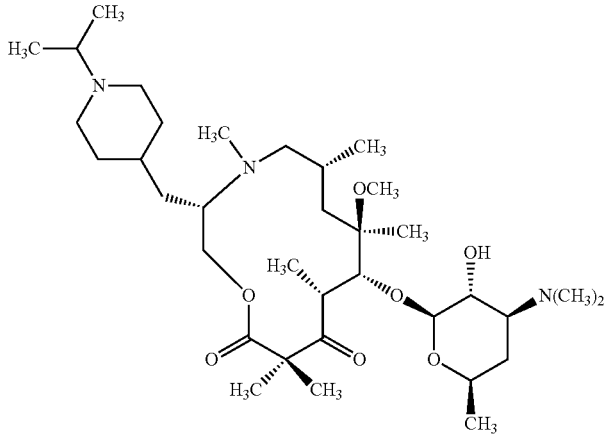<br>68 | ¹H NMR (600 MHz, Methanol-$d_4$) δ 4.36 (d, 2H), 4.03 (d, 1H), 3.94 (d, 1H), 3.65 (s, 1H), 3.63-3.57 (m, 2H), 3.21 (d, 2H), 3.06 (s, 1H), 2.81 (s, 1H), 2.76 (s, 2H), 2.45 (s, 4H), 2.24 (s, 2H), 2.17 (d, 1H), 2.07 (d, 2H), 1.87 (d, 1H), 1.81 (d, 2H), 1.57 (s, 2H), 1.45-1.38 (m, 3H), 1.29 (s, 4H), 1.27 (d, 8H), 1.24 (d, 6H), 1.09 (s, 1H), 0.90 (d, 3H). |
| 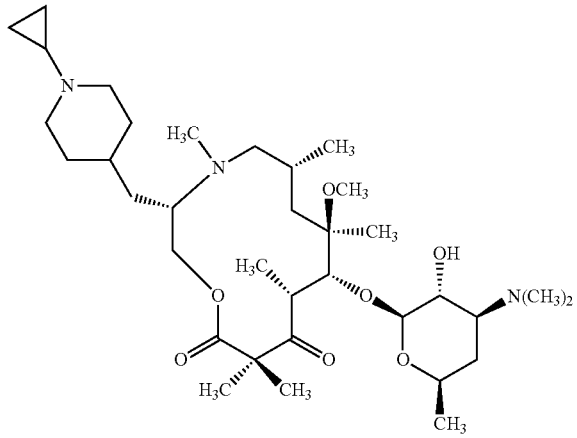<br>69 | ¹H NMR (600 MHz, Methanol-$d_4$) δ 4.58 (s, 1H), 4.36 (d, 1H), 4.03 (d, 1H), 3.64 (s, 1H), 3.60 (dd, 1H), 3.04 (d, 2H), 3.01 (s, 1H), 2.76 (s, 1H), 2.45 (s, 2H), 2.37 (s, 1H), 2.29-2.19 (m, 3H), 2.14 (d, 1H), 1.88 (d, 1H), 1.80 (s, 1H), 1.73 (s, 1H), 1.65 (tt, 2H), 1.57 (s, 1H), 1.48 (s, 1H), 1.40 (s, 1H), 1.30 (s, 2H), 1.29-1.23 (m, 6H), 1.07 (s, 1H), 1.02 (d, 3H), 0.90-0.87 (m, 3H). |
| 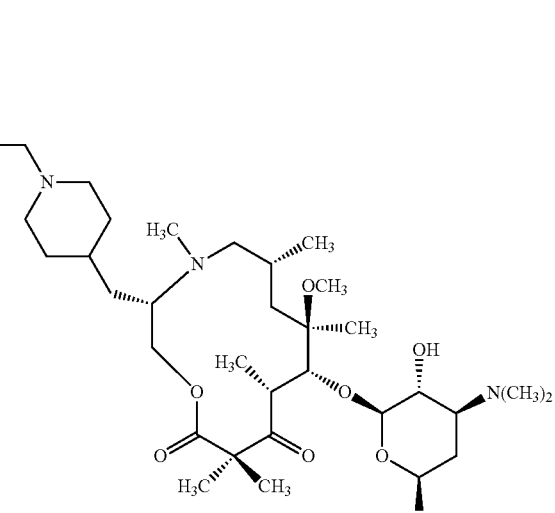<br>70 | ¹H NMR (600 MHz, Methanol-$d_4$) δ 4.40 (d, 2H), 4.27-4.13 (m, 3H), 3.70-3.62 (m, 3H), 3.37 (q, 4H), 3.14-2.98 (m, 6H), 2.71 (s, 1H), 2.65 (d, 5H), 2.59 (t, 7H), 2.49-2.44 (m, 2H), 2.26 (s, 1H), 2.04 (d, 2H), 1.91 (d, 2H), 1.66 (s, 2H), 1.52 (s, 2H), 1.43-1.24 (m, 31H), 0.94-0.87 (m, 6H). |

-continued

| Compound | Characterization |
|---|---|
| 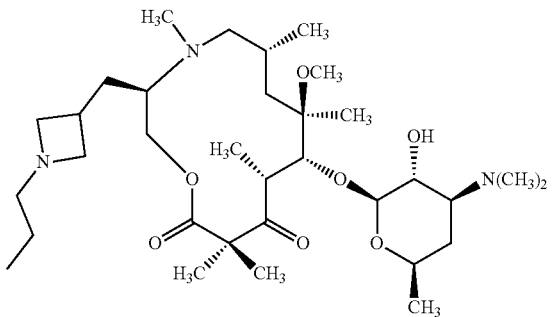<br>1 | ¹H NMR (600 MHz, Methanol-d₄) δ 8.53 (s, 2H), 4.98 (dd, 1H), 4.58 (s, 1H), 4.46-4.39 (m, 2H), 4.20 (dd, 1H), 4.01 (d, 1H), 3.96 (dd, 1H), 3.71-3.58 (m, 3H), 3.39-3.30 (m, 8H), 3.11 (s, 1H), 3.07 (s, 2H), 2.85 (s, 2H), 2.63 (s, 4H), 2.58-2.52 (m, 2H), 2.48-2.35 (m, 4H), 1.97-1.92 (m, 2H), 1.92-1.86 (m, 1H), 1.77 (d, 1H), 1.64 (dd, 1H), 1.55 (s, 2H), 1.54-1.43 (m, 4H), 1.43-1.40 (m, 1H), 1.40-1.27 (m, 11H), 1.16 (d, 2H), 0.90 (t, 3H). |
| 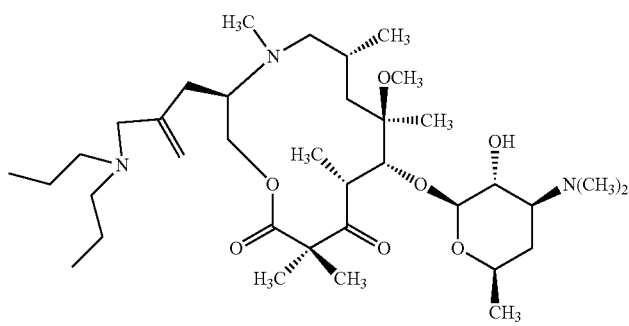<br>2 | ¹H NMR (600 MHz, Methanol-d₄) δ 8.54 (s, 1H), 4.61 (s, 3H), 4.59-4.52 (m, 2H), 4.42 (p, 1H), 4.38 (d, 1H), 4.10 (d, 1H), 3.79 (ddd, 2H), 3.65-3.59 (m, 1H), 3.49 (dd, 1H), 3.42-3.35 (m, 1H), 3.29-3.24 (m, 1H), 3.18 (s, 2H), 3.12 (dd, 1H), 2.85 (s, 2H), 2.82 (d, 1H), 2.60-2.34 (m, 10H), 1.87-1.78 (m, 2H), 1.65-1.56 (m, 2H), 1.48 (dddd, 4H), 1.38 (d, 4H), 1.35-1.27 (m, 4H), 1.26 (d, 2H), 1.10 (d, 2H), 0.91 (t, 4H). |
| 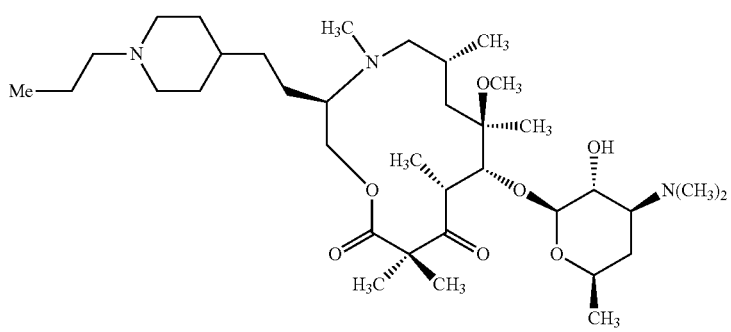<br>75 | ¹H NMR (600 MHz, Methanol-d₄) δ 8.54 (s, 3H), 4.58 (s, 2H), 4.26 (s, 1H), 3.37 (s, 3H), 3.33 (d, 12H), 3.20 (s, 3H), 3.05 (s, 2H), 2.83 (s, 2H), 2.67 (d, 4H), 2.64 (d, 4H), 1.93 (d, 4H), 1.70 (q, 5H), 1.53 (s, 3H), 1.44 (s, 5H), 1.41 (s, 4H), 1.38 (s, 4H), 1.33-1.27 (m, 8H), 1.11-1.03 (m, 5H), 0.98 (t, 6H). |
| 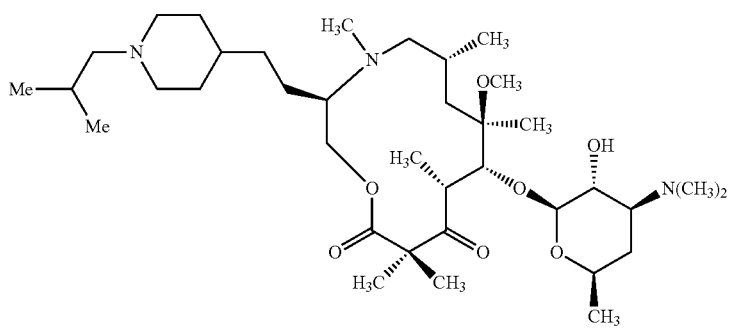<br>76 | ¹H NMR (600 MHz, Methanol-d₄) δ 8.54 (s, 3H), 4.58 (s, 2H), 4.42 (dd, 2H), 4.28 (s, 1H), 3.67 (ddd, 3H), 3.38-3.35 (m, 2H), 3.34 (s, 2H), 3.32 (s, 13H), 3.05 (s, 2H), 2.88 (s, 1H), 2.64-2.58 (m, 8H), 2.02 (s, 1H), 1.91 (d, 3H), 1.88 (s, 2H), 1.53 (s, 3H), 1.49 (s, 2H), 1.38 (s, 4H), 1.35 (d, 5H), 1.29 (dd, 7H), 1.26-1.21 (m, 2H), 1.12-1.04 (m, 4H), 0.99 (d, 9H), 0.90 (d, 1H). |

| Compound | Characterization |
|---|---|
| 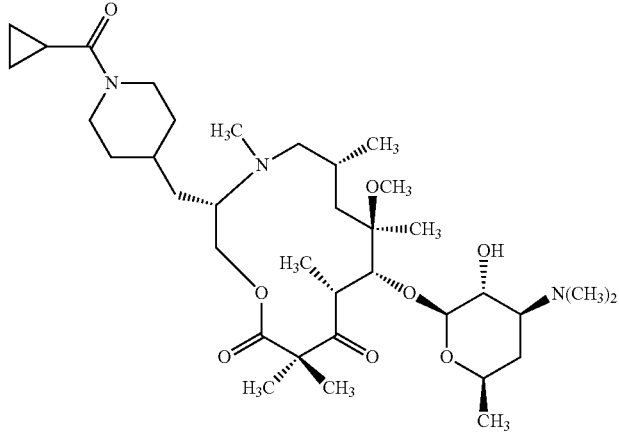<br>44 | ¹H NMR (600 MHz, Methanol-d₄) δ 4.51 (d, 1H), 4.41 (d, 1H), 4.39-4.31 (m, 1H), 4.26-4.18 (m, 1H), 3.88-3.80 (m, 1H), 3.67 (td, 1H), 3.40-3.34 (m, 1H), 3.21-3.14 (m, 1H), 3.10-2.97 (m, 5H), 2.83-2.74 (m, 1H), 2.73-2.69 (m, 1H), 2.64 (s, 6H), 2.59 (s, 3H), 2.34-2.17 (m, 1H), 2.03-1.89 (m, 3H), 1.81 (s, 1H), 1.72 (s, 2H), 1.53-1.46 (m, 2H), 1.41 (s, 3H), 1.35 (s, 3H), 1.30 (s, 3H), 1.29 (s, 3H), 1.14-1.02 (m, 2H), 0.96-0.88 (m, 1H), 0.84 (d, 2H), 0.80 (d, 2H). |
| 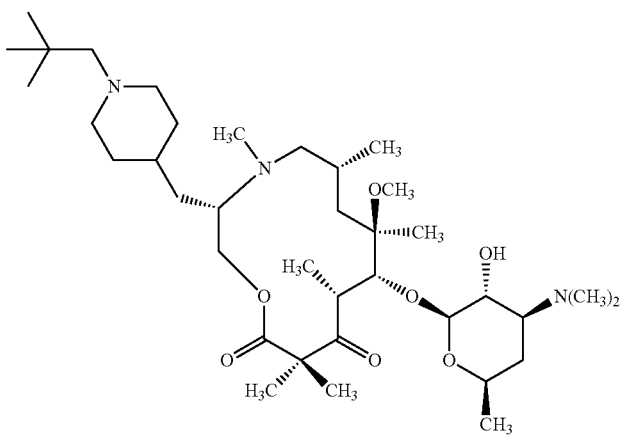<br>66 | ¹H NMR (600 MHz, Methanol-d₄) δ 8.55 (s, 2H), 4.36 (d, 2H), 4.03 (d, 1H), 3.65 (s, 1H), 3.63-3.57 (m, 2H), 3.21 (d, 2H), 3.06 (s, 1H), 2.81 (s, 1H), 2.76 (s, 2H), 2.45 (s, 4H), 2.24 (s, 2H), 2.17 (d, 1H), 2.07 (d, 2H), 1.87 (d, 1H), 1.81 (d, 2H), 1.57 (s, 2H), 1.45-1.38 (m, 3H), 1.29 (s, 4H), 1.27 (d, 8H), 1.24 (d, 6H), 1.09 (s, 3H). |
| 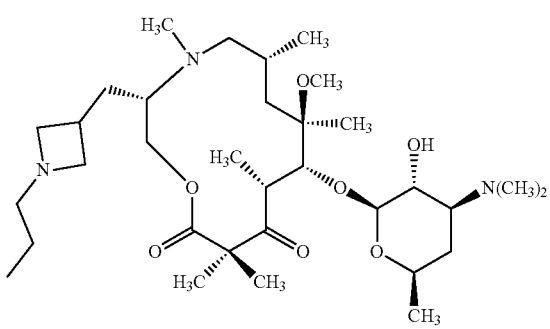<br>79 | ¹H NMR (600 MHz, Methanol-d₄) δ 8.49-8.46 (m, 4H), 4.62 (s, 4H), 4.46 (d, 2H), 4.19 (s, 1H), 4.05 (s, 1H), 4.00 (d, 2H), 3.74-3.62 (m, 5H), 3.47-3.39 (m, 3H), 3.11-3.08 (m, 2H), 2.99-2.96 (m, 1H), 2.86 (s, 2H), 2.77 (s, 5H), 2.01 (s, 1H), 1.92 (s, 1H), 1.79 (d, 2H), 1.67-1.60 (m, 3H), 1.55 (s, 2H), 1.50 (q, 4H), 1.41-1.30 (m, 11H), 1.29 (d, 3H), 1.23 (d, 1H), 1.16 (s, 2H), 1.06-1.00 (m, 3H), 0.99 (s, 2H), 0.94-0.87 (m, 3H). |

-continued
| Compound | Characterization |
|---|---|
| 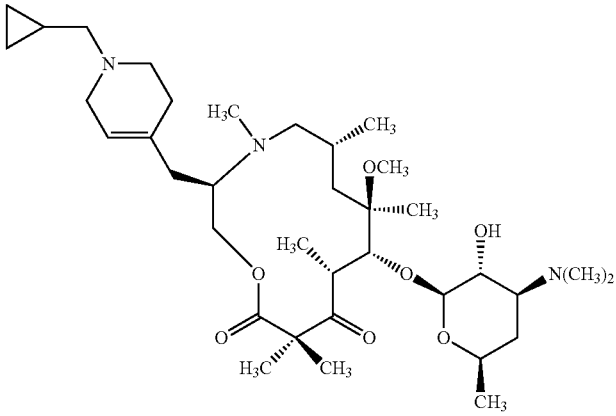<br>148 | ¹H NMR (600 MHz, Methanol-d₄) δ 5.71-5.64 (m, 1H), 4.45 (d, 1H), 4.24-4.12 (m, 2H), 3.72 (td, 1H), 3.66 (s, 1H), 3.45 (dd, 1H), 3.41-3.34 (m, 1H), 3.12-2.87 (m, 6H), 2.80 (s, 6H), 2.51 (d, 1H), 2.34 (d, 1H), 2.02 (ddd, 1H), 1.56-1.48 (m, 4H), 1.41-1.34 (m, 5H), 1.32 (d, 6H), 1.10 (s, 1H), 1.07-0.95 (m, 3H), 0.72 (d, 2H), 0.42-0.34 (m, 2H). |
| 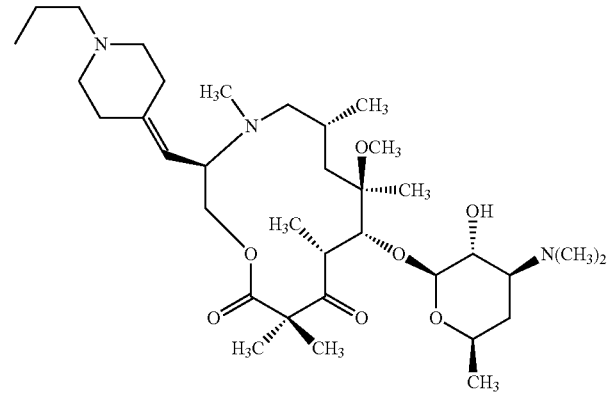<br>149 | ¹H NMR (600 MHz, Methanol-d₄) δ 5.34 (d, 1H), 4.59-4.47 (m, 1H), 4.42 (d, 1H), 4.30-4.18 (m, 1H), 4.16-4.05 (m, 1H), 3.68 (ddd, 1H), 3.42 (dt, 1H), 3.37 (dd, 1H), 3.14-2.96 (m, 4H), 2.91-2.80 (m, 2H), 2.72-2.63 (m, 2H), 2.62 (s, 6H), 2.51 (s, 2H), 2.47-2.38 (m, 3H), 2.25 (s, 1H), 1.96-1.90 (m, 1H), 1.82 (s, 1H), 1.60 (q, 2H), 1.52 (s, 3H), 1.42 (s, 1H), 1.39 (s, 3H), 1.35 (d, 2H), 1.29 (d, 3H), 1.12-0.99 (m, 2H), 0.94 (t, 3H). |
| 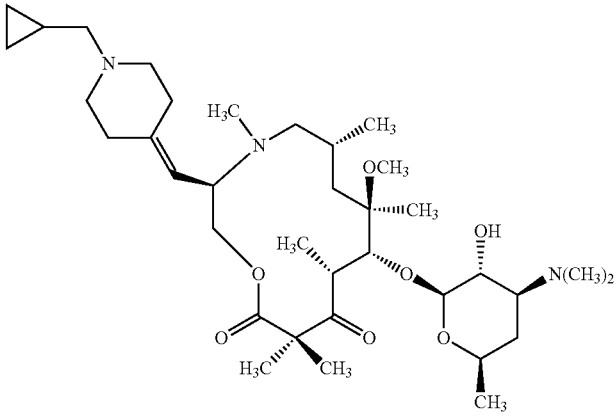<br>150 | ¹H NMR (600 MHz, Methanol-d₄) δ 5.40 (d, 1H), 4.51 (s, 1H), 4.45 (d, 1H), 4.25 (s, 1H), 4.15-4.06 (m, 1H), 3.71 (d, 1H), 3.47-3.39 (m, 2H), 3.29-3.25 (m, 1H), 3.05 (s, 3H), 2.98-2.91 (m, 3H), 2.85 (s, 4H), 2.74 (s, 6H), 2.63-2.53 (m, 4H), 2.53-2.46 (m, 2H), 2.23 (s, 1H), 2.03-1.97 (m, 1H), 1.84-1.73 (m, 1H), 1.70-1.59 (m, 1H), 1.52 (s, 3H), 1.48 (d, 1H), 1.40 (s, 6H), 1.36 (d, 3H), 1.32 (d, 3H), 1.08-1.02 (m, 3H), 1.01-0.97 (m, 1H), 0.63 (q, 2H), 0.25 (d, 2H). |

-continued

| Compound | Characterization |
|---|---|
| 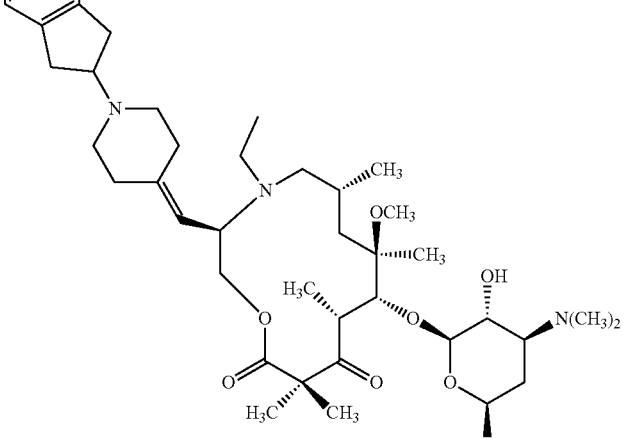<br>191 | ¹H NMR (600 MHz, Methanol-d₄) δ 7.19 (dd, 2H), 7.18-7.11 (m, 2H), 5.45 (d, 1H), 5.22-5.03 (m, 1H), 4.47 (d, 1H), 4.45-4.37 (m, 1H), 4.22 (d, 1H), 4.04 (dd, 1H), 3.73 (ddd, 1H), 3.45 (dd, 2H), 3.38 (ddd, 2H), 3.21 (d, 1H), 3.18 (d, 1H), 3.05 (s, 3H), 3.00 (dd, 3H), 2.90-2.83 (m, 2H), 2.80 (s, 1H), 2.56 (q, 2H), 2.49 (q, 2H), 2.25-2.17 (m, 1H), 2.03 (ddd, 1H), 1.81-1.74 (m, 1H), 1.68-1.58 (m, 1H), 1.56-1.47 (m, 1H), 1.50 (s, 3H), 1.40 (s, 6H), 1.36 (d, 3H), 1.33 (d, 3H), 1.22 (t, 2H), 1.09-1.04 (m, 2H). |
| 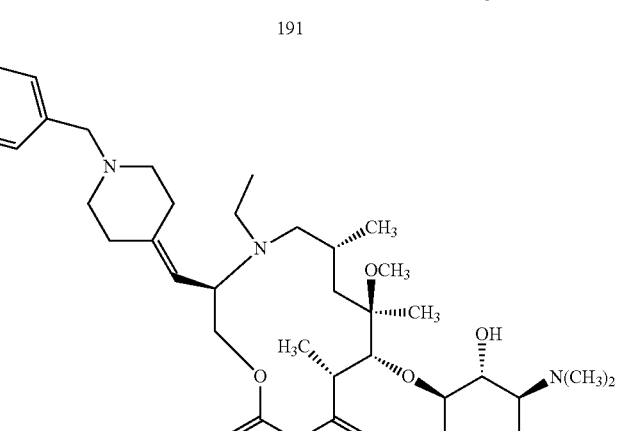<br>192 | ¹H NMR (600 MHz, Methanol-d₄) δ 7.38-7.32 (m, 3H), 7.32-7.27 (m, 1H), 5.40 (d, 1H), 5.18-5.06 (m, 1H), 4.46 (d, 1H), 4.44-4.35 (m, 1H), 4.21 (d, 1H), 4.01 (dd, 1H), 3.76-3.70 (m, 1H), 3.68 (s, 2H), 3.45 (dd, 2H), 3.37 (ddd, 2H), 3.18-3.09 (m, 1H), 3.04 (s, 3H), 2.79 (s, 6H), 2.71-2.56 (m, 4H), 2.49 (t, 2H), 2.42 (dt, 2H), 2.25-2.15 (m, 1H), 2.02 (ddd, 1H), 1.83-1.73 (m, 1H), 1.66-1.57 (m, 1H), 1.56-1.47 (m, 1H), 1.50 (s, 3H), 1.39 (s, 5H), 1.36 (d, 3H), 1.32 (d, 3H), 1.20 (t, 2H), 1.05 (d, 2H). |

The synthetic route detailed in Scheme 7 was modified to achieve the syntheses of analogues having alternative groups at C2 of the macrolide ring. The following route in Scheme 8 is exemplary.

Scheme 8.

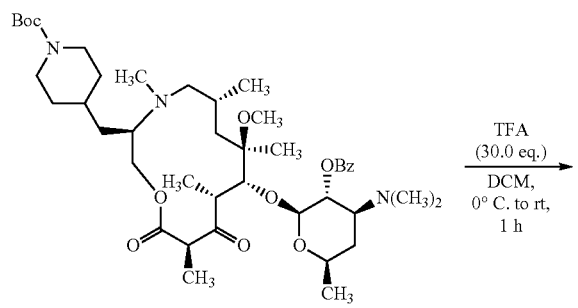

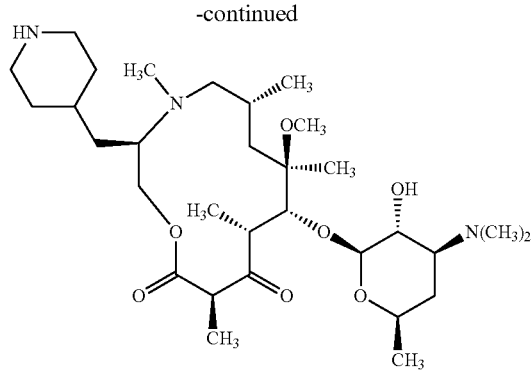

TFA (0.96 mL, 12.56 mmol, 30.0 eq.) was added to a stirring solution of tert-butyl 4-(((3R,6R,8R,9R,10R)-9-(((2S,3R,4S,6R)-3-(benzoyloxy)-4-(dimethylamino)-6-methyltetrahydro-2H-pyran-2-yl)oxy)-8-methoxy-4,6,8,10,12-pentamethyl-11,13-dioxo-1-oxa-4-azacyclotridecan-3- yl)methyl)piperidine-1-carboxylate (0.33 g, 0.44 mmol, 1.0 eq.) in 7 mL of DCM at 0° C. and the reaction mixture was kept stirring at room temperature until full deprotection. After 1 h LCMS showed complete conversion. Ten mL of DCM and 10 mL of NaHCO₃ sat. aq. were added to the reaction mixture and vigorous stirring was kept for 5 mins. The aqueous phase was extracted with DCM (3×10 mL). Organic layers were assembled, dried over anhydrous Na₂SO₄ and concentrated under reduced pressure to afford deprotected macrolide which was used as such for next step.

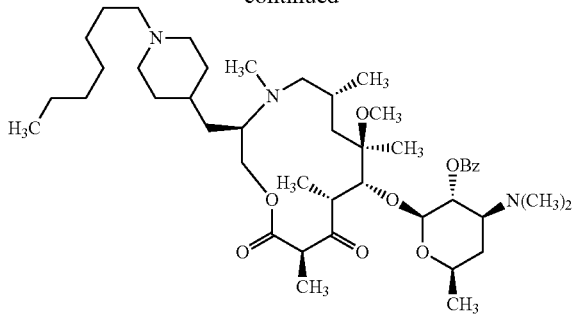

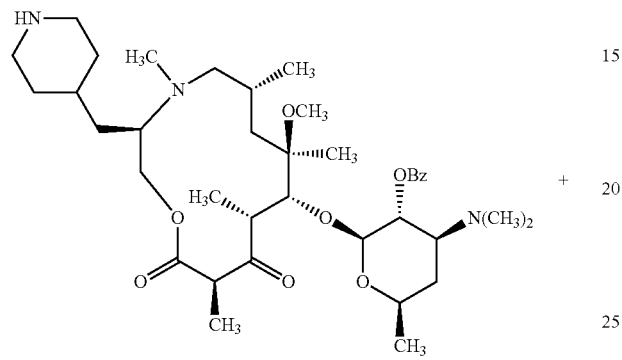

+

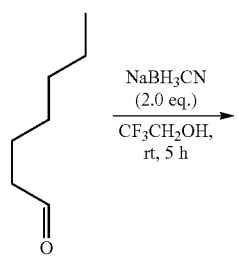

Heptanal (0.12 mL, 0.84 mmol, 2.0 eq.) was added to a stirring solution of (2S,3R,4S,6R)-4-(dimethylamino)-2-(((3R,6R,8R,9R,10R)-8-methoxy-4,6,8,10,12-pentamethyl-11,13-dioxo-3-(piperidin-4-ylmethyl)-1-oxa-4-azacyclotridecan-9-yl)oxy)-6-methyltetrahydro-2H-pyran-3-yl benzoate (0.29 g, 0.42 mmol, 1.0 eq.) and sodium cyanoborohydride (53 mg, 0.84 mmol, 2.0 eq.) in trifluoroethanol (7 mL) and the reaction was kept stirring until full consumption of starting material. After 2 h of reaction time LCMS showed full conversion of starting material in desired product. DCM and water were added to the reaction mixture and aqueous phase was extracted by DCM (3×5 mL). Organic layers were assembled, dried over Na₂SO₄ anhydrous and concentrated to afford desired crude product which was purified by column chromatography (DCM/MeOH+1% NEt₃ 100:0 to 70:30). (2S,3R,4S,6R)-4-(Dimethylamino)-2-(((3R,6R,8R,9R,10R,12R)-3-((1-heptylpiperidin-4-yl)methyl)-8-methoxy-4,6,8,10,12-pentamethyl-11,13-dioxo-1-oxa-4-azacyclotridecan-9-yl)oxy)-6-methyltetrahydro-2H-pyran-3-yl benzoate was obtained as an off-white solid (0.2 g, 61% yield).

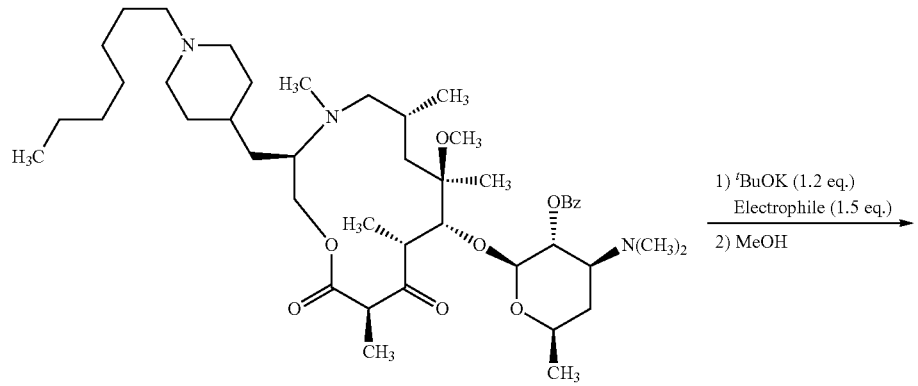

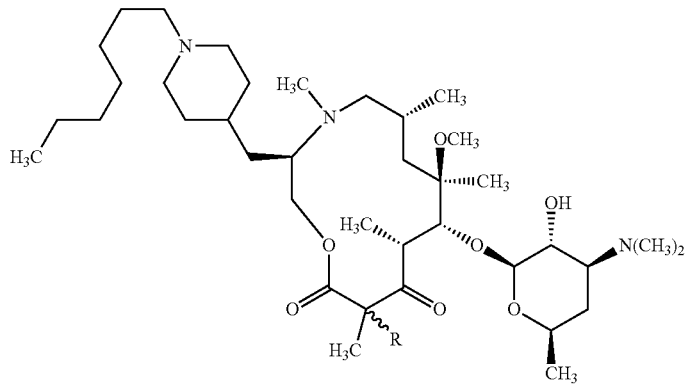

To a stirring solution of the macrolide in THF (0.1 molar) at −42° C. (acetonitrile/dry ice bath) under argon atmosphere was added a molar solution of $^t$BuOK (1.2 eq) and the reaction mixture was allowed to stir for 10 minutes at this temperature. The electrophile (1.5 equivalents) was then added dropwise at −42° C. and the acetonitrile/dry ice bath was replaced by an ice bath. The reaction mixture was kept under stirring at 0° C. until full conversion (typically 2 to 3 h of reaction time). Half saturated solution of $NH_4Cl$ and DCM were then added to the reaction media and the organic phase was extracted three times with DCM. Organic layers were assembled, dried over $Na_2SO_4$, and concentrated under reduced pressure to afford macrolides having disubstitution at the C-2 position as a mixture of two diastereomers. Methanolysis of the benzoyl group followed to complete the macrolide synthesis.

The following compounds were prepared using suitable electrophiles and synthetic procedures analogous to those described above in Scheme 8.

| Compound | Characterization |
|---|---|
| (structure shown) | $^1$H NMR (600 MHz, Methanol-$d_4$) δ 7.29-7.21 (m, 3H), 7.15 (dd, 2H), 4.45 (d, 1H), 4.46-4.35 (m, 1H), 4.22 (d, 1H), 4.02 (dd, 1H), 3.77-3.63 (m, 2H), 3.45-3.36 (m, 2H), 3.03 (s, 3H), 2.93-2.84 (m, 1H), 2.71 (s, 6H), 2.03 (d, 1H), 1.98 (d, 1H), 1.88-1.81 (m, 1H), 1.69 (s, 2H), 1.59 (s, 1H), 1.48 (s, 3H), 1.44-1.40 (m, 2H), 1.39-1.34 (m, 5H), 1.34-1.31 (m, 8H), 1.30-1.27 (m, 3H), 1.22 (s, 2H), 0.93-0.88 (m, 4H). |

171

-continued
| Compound | Characterization |
|---|---|
| 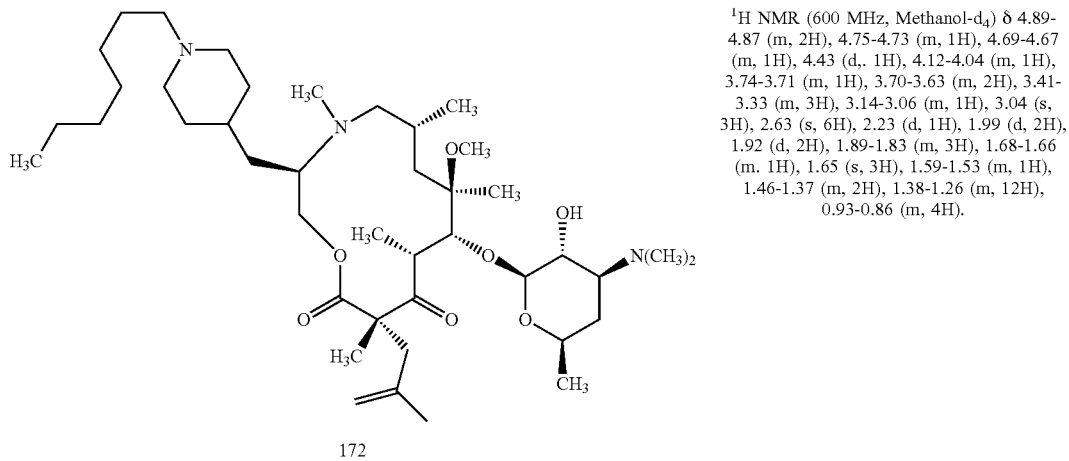<br>172 | ¹H NMR (600 MHz, Methanol-d₄) δ 4.89-4.87 (m, 2H), 4.75-4.73 (m, 1H), 4.69-4.67 (m, 1H), 4.43 (d,. 1H), 4.12-4.04 (m, 1H), 3.74-3.71 (m, 1H), 3.70-3.63 (m, 2H), 3.41-3.33 (m, 3H), 3.14-3.06 (m, 1H), 3.04 (s, 3H), 2.63 (s, 6H), 2.23 (d, 1H), 1.99 (d, 2H), 1.92 (d, 2H), 1.89-1.83 (m, 3H), 1.68-1.66 (m, 1H), 1.65 (s, 3H), 1.59-1.53 (m, 1H), 1.46-1.37 (m, 2H), 1.38-1.26 (m, 12H), 0.93-0.86 (m, 4H). |
| 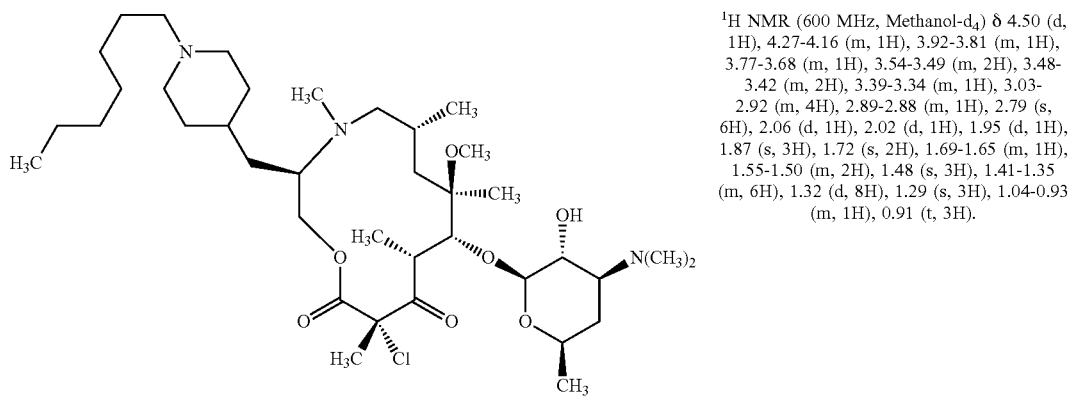<br>173 | ¹H NMR (600 MHz, Methanol-d₄) δ 4.50 (d, 1H), 4.27-4.16 (m, 1H), 3.92-3.81 (m, 1H), 3.77-3.68 (m, 1H), 3.54-3.49 (m, 2H), 3.48-3.42 (m, 2H), 3.39-3.34 (m, 1H), 3.03-2.92 (m, 4H), 2.89-2.88 (m, 1H), 2.79 (s, 6H), 2.06 (d, 1H), 2.02 (d, 1H), 1.95 (d, 1H), 1.87 (s, 3H), 1.72 (s, 2H), 1.69-1.65 (m, 1H), 1.55-1.50 (m, 2H), 1.48 (s, 3H), 1.41-1.35 (m, 6H), 1.32 (d, 8H), 1.29 (s, 3H), 1.04-0.93 (m, 1H), 0.91 (t, 3H). |
| 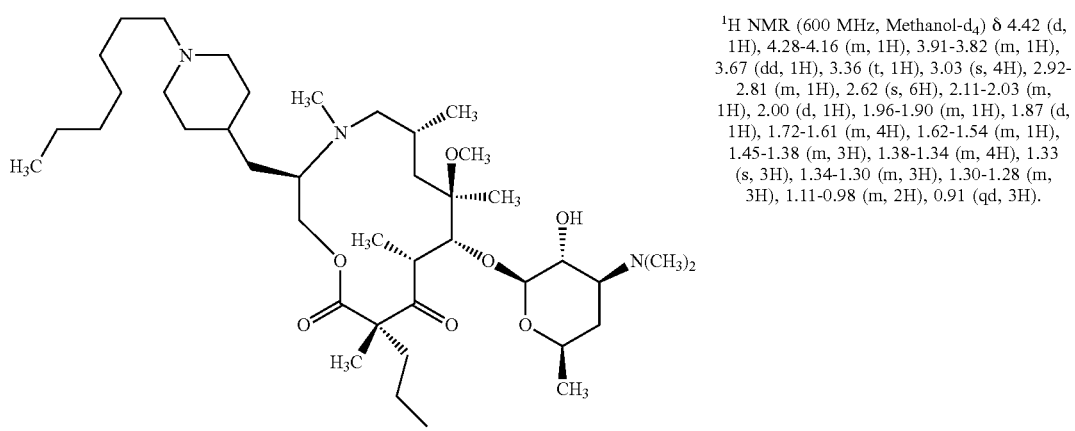<br>174 | ¹H NMR (600 MHz, Methanol-d₄) δ 4.42 (d, 1H), 4.28-4.16 (m, 1H), 3.91-3.82 (m, 1H), 3.67 (dd, 1H), 3.36 (t, 1H), 3.03 (s, 4H), 2.92-2.81 (m, 1H), 2.62 (s, 6H), 2.11-2.03 (m, 1H), 2.00 (d, 1H), 1.96-1.90 (m, 1H), 1.87 (d, 1H), 1.72-1.61 (m, 4H), 1.62-1.54 (m, 1H), 1.45-1.38 (m, 3H), 1.38-1.34 (m, 4H), 1.33 (s, 3H), 1.34-1.30 (m, 3H), 1.30-1.28 (m, 3H), 1.11-0.98 (m, 2H), 0.91 (qd, 3H). |

| Compound | Characterization |
|---|---|
| 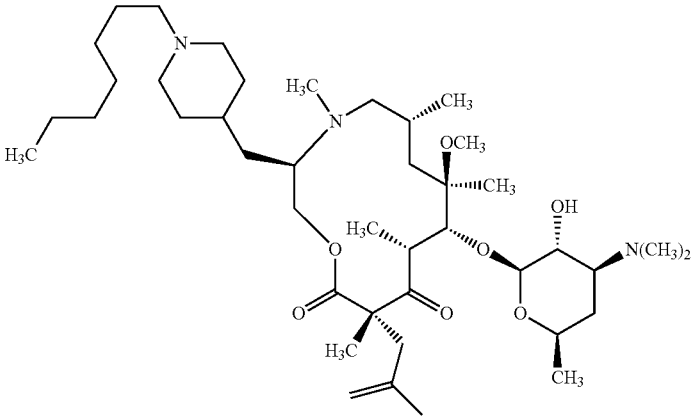<br>175 | ¹H NMR (600 MHz, Methanol-d₄) δ 4.42 (d, 1H), 4.26-4.17 (m, 1H), 3.92-3.82 (m, 1H), 3.77-3.69 (m, 1H), 3.69-3.63 (m, 2H), 3.39-3.33 (m, 2H), 3.03-2.92 (m, 4H), 2.61 (s, 6H), 2.00 (t, 2H), 1.91 (d, 1H), 1.87 (d, 1H), 1.74-1.68 (m, 1H), 1.67-1.61 (m, 3H), 1.38-1.34 (m, 4H), 1.34-1.30 (m, 3H), 1.29 (dd, 3H), 1.10-0.99 (m, 1H), 0.94 (d, 3H), 0.91 (t, 3H), 0.84 (d, 3H). |
| 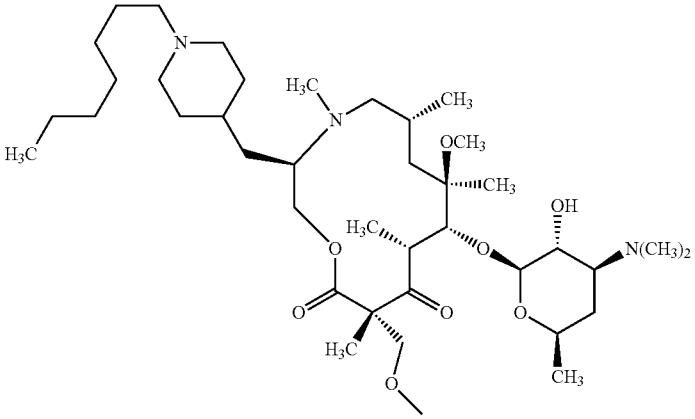<br>176 | ¹H NMR (600 MHz, Methanol-d₄) δ 4.43 (d, 1H), 4.31-4.15 (m, 1H), 4.11-3.95 (m, 1H), 3.81 (d, 1H), 3.69-3.62 (m, 1H), 3.39-3.33 (m, 1H), 3.10-2.94 (m, 2H), 2.87 (s, 3H), 2.60 (s, 6H), 2.39-2.20 (m. 1H), 1.99 (d, 1H), 1.95-1.80 (m, 2H), 1.70-1.59 (m, 3H), 1.58-1.51 (m, 1H), 1.40 (s, 6H), 1.37-1.34 (m, 4H), 1.32 (q, 3H), 1.28 (d, 3H), 1.25 (d, 3H), 1.13-0.99 (m, 1H), 0.91 (t, 3H), 0.90-0.79 (m, 1H). |
Scheme 9.
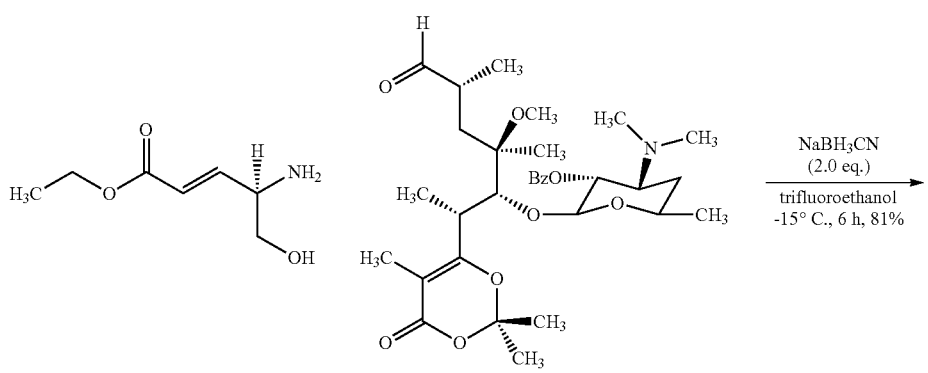

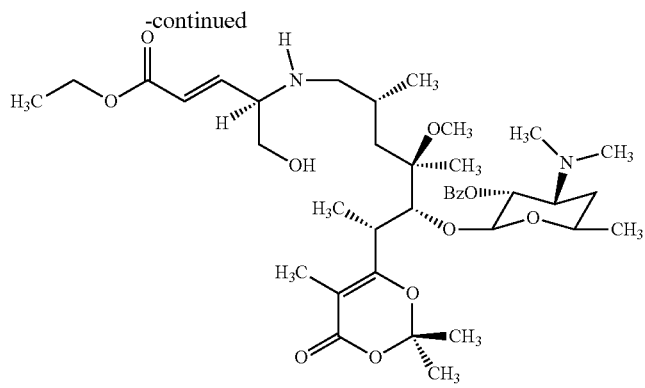

To a stirred solution of ethyl (4S,5S,E)-4-amino-5-hydroxyhex-2-enoate (I22) (0.418 g, 2.257 mmol) and sodium cyanoborohydride (0.294 g, 4.58 mmol) in trifluoroethanol (20 mL) at −15° C., (2S,3R,4S,6R)-4-(dimethylamino)-2-(((2R,3R,4R,6R)-4-methoxy-4,6-dimethyl-7-oxo-2-(2,2,5-trimethyl-4-oxo-4H-1,3-dioxin-6-yl)heptan-3-yl)oxy)-6-methyltetrahydro-2H-pyran-3-yl benzoate (1.38 g, 2.34 mmol) was added slowly to the reaction mixture and stirred for 6 h. Reaction was diluted with CH$_2$Cl$_2$ (30 mL), and neutralized with cold water (20 mL) at same temperature. Organic layer was separated, and aqueous layer was washed with CH$_2$Cl$_2$ (20 mL×3). Combined organic layers were washed with brine and the organic layer was dried over anhydrous Na$_2$SO$_4$, concentrated over vacuum, and purified with flash column chromatography to give (2S,3R,4S,6R)-4-(dimethylamino)-2-(((2R,3R,4R,6R)-7-(((R,E)-5-ethoxy-1-hydroxy-5-oxopent-3-en-2-yl)amino)-4-methoxy-4,6-dimethyl-2-(2,2,5-trimethyl-4-oxo-4H-1,3-dioxin-6-yl)heptan-3-yl)oxy)-6-methyltetrahydro-2H-pyran-3-yl benzoate (1.572 g, 81%) as a white foaming solid.

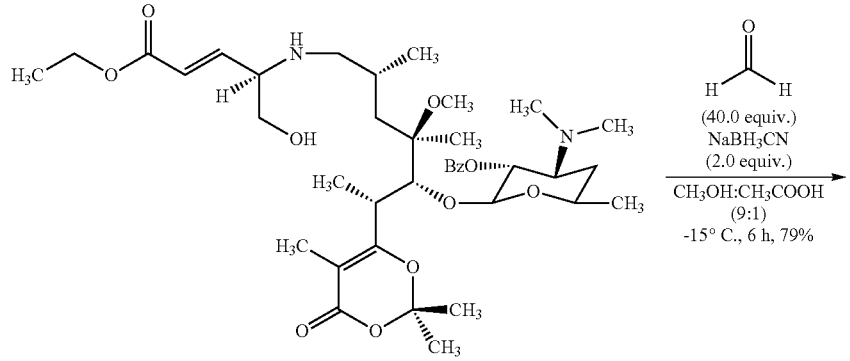

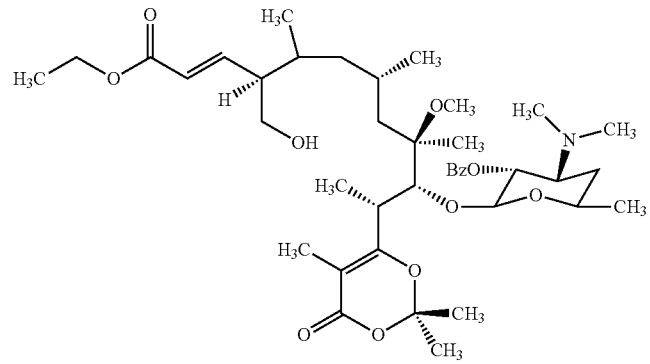

To a stirred solution of (2S,3R,4S,6R)-4-(dimethylamino)-2-(((2R,3R,4R,6R)-7-(((R,E)-5-ethoxy-1-hydroxy-5-oxopent-3-en-2-yl)amino)-4-methoxy-4,6-dimethyl-2-(2,2,5-trimethyl-4-oxo-4H-1,3-dioxin-6-yl)heptan-3-yl)oxy)-6-methyltetrahydro-2H-pyran-3-yl benzoate (700 g, 1.917 mmol) and sodium cyanoborohydride (0.240 g, 3.82 mmol) in trifluoroethanol (20 mL) at 0° C., formaldehyde (4.3 mL 30% solution in MeOH, 28.17 mmol) was added slowly to the reaction mixture and stirred for 2 h. Solvent was concentrated under vacuum and the reaction was diluted with CH₂Cl₂ (50 mL) and neutralized with cold water (20 mL) at the same temperature. The organic layer was separated and the aqueous layer was washed with CH₂Cl₂ (20 mL×3). Combined organic layers were washed with brine and organic layer was dried over anhydrous Na₂SO₄, concentrated under vacuum, and purified with flash column chromatography to give (2S,3R,4S,6R)-4-(dimethylamino)-2-(((2R,3R,4R,6R)-7-(((R,E)-5-ethoxy-1-hydroxy-5-oxopent-3-en-2-yl)(methyl)amino)-4-methoxy-4,6-dimethyl-2-(2,2,5-trimethyl-4-oxo-4H-1,3-dioxin-6-yl)heptan-3-yl)oxy)-6-methyltetrahydro-2H-pyran-3-yl benzoate (1.13 g, 79%) as a white foaming solid.

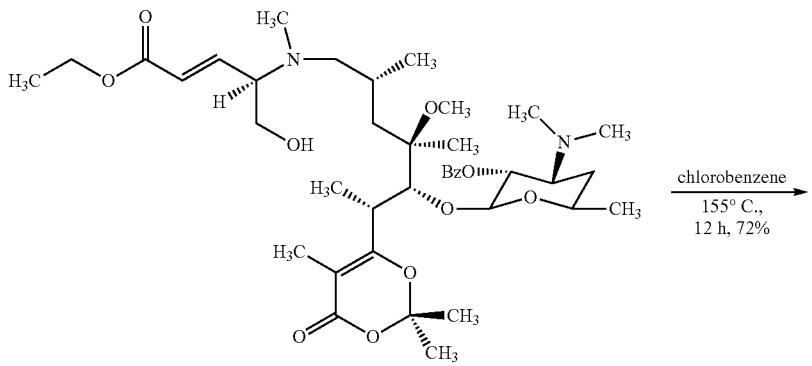

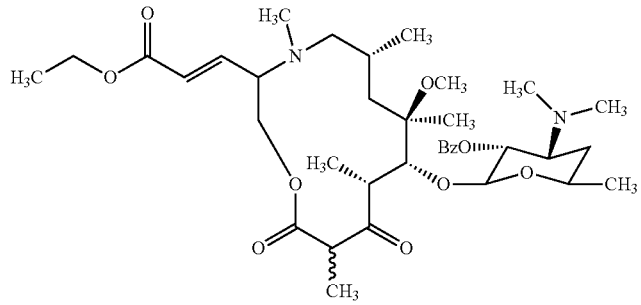

(2S,3R,4S,6R)-4-(Dimethylamino)-2-(((2R,3R,4R,6R)-7-(((R,E)-5-ethoxy-1-hydroxy-5-oxopent-3-en-2-yl) (methyl)amino)-4-methoxy-4,6-dimethyl-2-(2,2,5-trimethyl-4-oxo-4H-1,3-dioxin-6-yl)heptan-3-yl)oxy)-6-methyltetrahydro-2H-pyran-3-yl benzoate was azeotropically dried with toluene four times under argon and exposed to high vacuum overnight. A 3000 mL round bottom flask was flame dried and cooled to 23° C., and (2S,3R,4S,6R)-4-(dimethylamino)-2-(((2R,3R,4R,6R)-7-(((R,E)-5-ethoxy-1-hydroxy-5-oxopent-3-en-2-yl)(methyl)amino)-4-methoxy-4,6-dimethyl-2-(2,2,5-trimethyl-4-oxo-4H-1,3-dioxin-6-yl)heptan-3-yl)oxy)-6-methyltetrahydro-2H-pyran-3-yl benzoate (810 mg, 1.074 mmol) was transferred with chlorobenzene (2100 mL) into the flask at rt. The reaction solution was degassed with argon for 30 min and fitted with a reflux condenser. Vacuum was applied for 30 seconds and released with argon (repeated 3 times). The reaction mixture was heated to 150° C. in an oil bath for 12 h. The reaction was monitored by LCMS which showed a full conversion into the product. Chlorobenzene was distilled off, and the crude material was purified by flash column chromatography to give (2S,3R,4S,6R)-4-(dimethylamino)-2-(((6R,8R,9R,10R)-3-((E)-3-ethoxy-3-oxoprop-1-en-1-yl)-8-methoxy-4,6,8,10,12-pentamethyl-11,13-dioxo-1-oxa-4-azacyclotridecan-9-yl)oxy)-6-methyltetrahydro-2H-pyran-3-yl benzoate (717 mg, 81%).

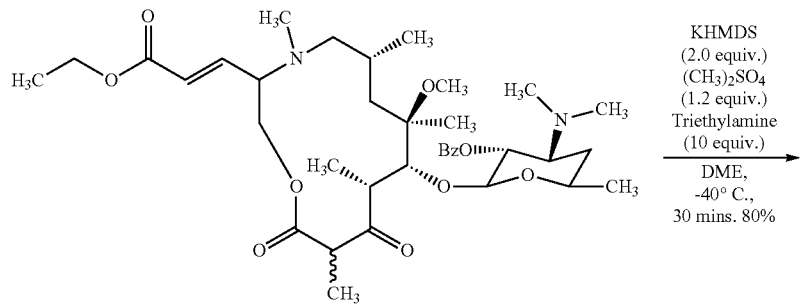

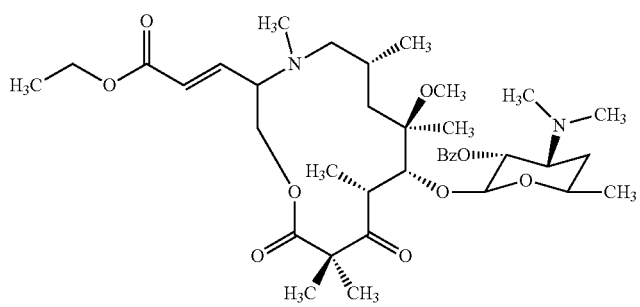

To a stirred solution of (2S,3R,4S,6R)-4-(dimethylamino)-2-(((6R,8R,9R,10R)-3-((E)-3-ethoxy-3-oxoprop-1-en-1-yl)-8-methoxy-4,6,8,10,12-pentamethyl-11,13-dioxo-1-oxa-4-azacyclotridecan-9-yl)oxy)-6-methyltetrahydro-2H-pyran-3-yl benzoate (715 mg, 1.379 mmol) (7 mL) at −40° C., KHMDS (1.27 mL, 1.246 mmol) was added slowly and stirred for 15 mins. Dimethyl sulfate (0.197 mL, 2.076 mmol) was added and stirred for another 15 mins. The reaction was monitored by LCMS which showed complete conversion. Reaction was neutralized with triethylamine (0.396 mL, 2.89 mmol). Water and ethyl acetate (15 mL) were added. The organic layer was separated, and aqueous layer was washed ethyl acetate (10 mL×3). Combined organic layers were washed with brine, dried over anhydrous Na$_2$SO$_4$, concentrated under vacuum, and purified by flash column chromatography to give (2S,3R,4S,6R)-4-(dimethylamino)-2-(((6R,8R,9R,10R)-3-((E)-3-ethoxy-3-oxoprop-1-en-1-yl)-8-methoxy-4,6,8,10,12,12-hexamethyl-11,13-dioxo-1-oxa-4-azacyclotridecan-9-yl)oxy)-6-methyltetrahydro-2H-pyran-3-yl benzoate (501 mg, 81%) as white foaming solid.

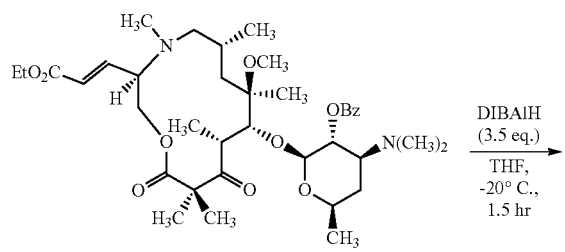

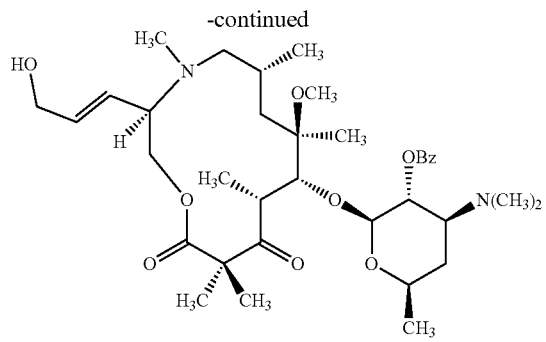

To a solution of (2S,3R,4S,6R)-4-(dimethylamino)-2-(((3R,6R,8R,9R,10R)-3-((E)-3-ethoxy-3-oxoprop-1-en-1-yl)-8-methoxy-4,6,8,10,12,12-hexamethyl-11,13-dioxo-1-oxa-4-azacyclotridecan-9-yl)oxy)-6-methyltetrahydro-2H-pyran-3-yl benzoate (100 mg, 0.14 mmol, 1.0 eq.) in THF (1.5 mL) at −20° C. under argon atmosphere was added diisobutylaluminum hydride in THF (0.28 mL, 0.28 mmol, 2.0 eq.) dropwise and the reaction media was kept stirring for 40 minutes. At this time an extra 1.5 equivalents of diisobutylaluminum hydride were added dropwise to the reaction media over a 15-minute period to avoid conjugated reduction of the alkene moiety. After 30 minutes of stirring LCMS analysis showed full reduction of the ester moiety. The reaction media was diluted with DCM and quenched with a solution of NaHCO$_3$ sat aq. After 20 mins of stirring to separate the two layers, the organic phase was extracted by DCM (3×5 mL). Organic layers were assembled, dried over Na$_2$SO$_4$ and concentrated under vacuum. (2S,3R,4S,6R)-4-(Dimethylamino)-2-(((3R,6R,8R,9R,10R)-3-((E)-3-hydroxyprop-1-en-1-yl)-8-methoxy-4,6,8,10,12,12-hexamethyl-11,13-dioxo-1-oxa-4-azacyclotridecan-9-yl)oxy)-6-methyltetrahydro-2H-pyran-3-yl benzoate was obtained as an off-white solid (69 mg, 74%) after purification over column chromatography (Eluent DCM/MeOH: 100:0 to 90:10).

353                                                              354

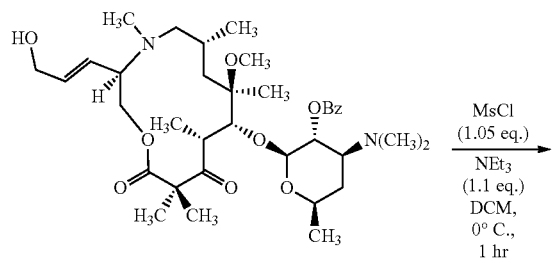

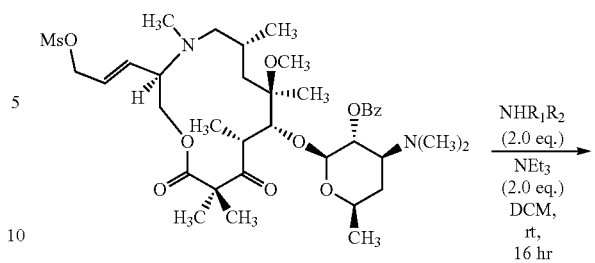

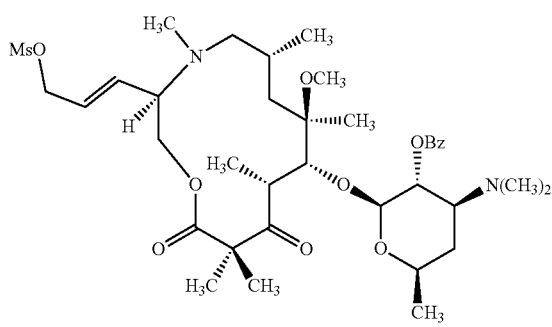

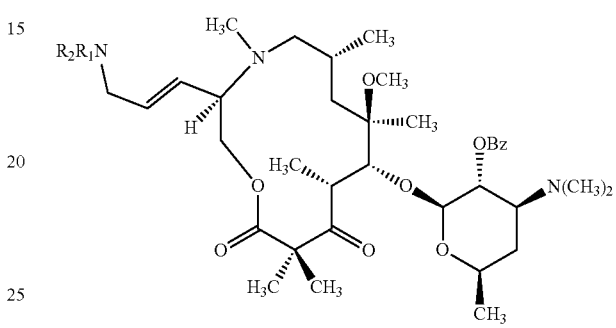

Methanesulfonyl chloride (1.8 µl, 0.024 mmol, 1.05 eq.) was added to a stirring solution of (2S,3R,4S,6R)-4-(dimethylamino)-2-(((3R,6R,8R,9R,10R)-3-((E)-3-hydroxyprop-1-en-1-yl)-8-methoxy-4,6,8,10,12,12-hexamethyl-11,13-dioxo-1-oxa-4-azacyclotridecan-9-yl)oxy)-6-methyltetrahydro-2H-pyran-3-yl benzoate (15 mg, 0.023 mmol, 1.0 eq.) and triethylamine (3.5 µl, 0.025 mmol, 1.1 eq.) in DCM (2 mL) at 0° C. under argon. The reaction mixture was kept stirring until full conversion of starting material (1 hr). The reaction media was quenched with NaHCO₃ sat aq. (2 mL) and the organic layer was extracted by DCM (3×4 mL). Organic layers were combined, dried over Na₂SO₄ and concentrated under vacuum to afford crude desired product which was used as such for next step.

An amine (2.0 eq.) and triethylamine (2.0 eq.) were added to a stirring solution of (2S,3R,4S,6R)-4-(dimethylamino)-2-(((3R,6R,8R,9R,10R)-8-methoxy-4,6,8,10,12,12-hexamethyl-3-((E)-3-((methylsulfonyl)oxy)prop-1-en-1-yl)-11,13-dioxo-1-oxa-4-azacyclotridecan-9-yl)oxy)-6-methyltetrahydro-2H-pyran-3-yl benzoate (1.0 eq.) in DCM (0.1 M) and the reaction mixture was kept stirring at room temperature overnight. LCMS analysis indicated full conversion of the starting material. NaHCO₃ sat. aq (2 mL) was added to the reaction media and the organic phase was extracted by DCM (3×3 mL). Organic layers were assembled, dried over Na₂SO₄ and concentrated under vacuum to afford desired product. Methanolysis of the benzoyl group followed to complete the macrolide synthesis.

The following compounds were prepared using synthetic procedures analogous to those described above in Scheme 9.

| Compound | Characterization |
|---|---|
| ![structure] | $^1$H NMR (600 MHz, Methanol-$d_4$) δ 8.39-8.33 (m, 1H), 7.72 (ddd, 1H), 7.28 (ddd, 1H), 6.36-6.22 (m, 1H), 5.88 (d, 1H), 5.05-4.93 (m, 1H), 4.61 (s, 1H), 4.44 (d, 1H), 4.31-4.21 (m, 1H), 4.07-4.04 (m, 2H), 4.00-.97 (m, 2H), 3.74-3.67 (m, 2H), 3.58-3.50 (m, 2H), 3.41 (dd, 2H), 3.27-3.16 (m, 1H), 3.07 (s, 3H), 2.94-2.84 (m, 2H), 2.71 (s, 6H), 1.97 (d, 1H), 1.88-1.84 (m, 1H), 1.52 (s, 3H), 1.5-1.43 (m, 2H), 1.40 (s, 6H), 1.38-1.33 (m, 4H), 1.32 (d, 2H), 1.30 (d, 2H), 1.30-1.26 (m, 1H), 1.12-1.00 (m, 2H), 0.89 (td, 1H). |

-continued
| Compound | Characterization |
|---|---|
| 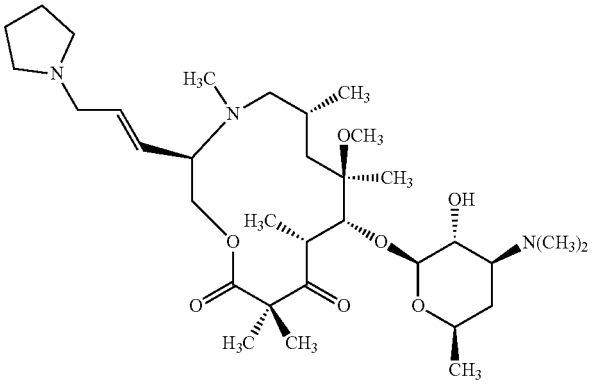
153 | $^1$H NMR (500 MHz, Methanol-d4) δ 5.89-5.78 (m, 1H), 4.57 (d, 1H), 4.46-4.38 (m, 1H), 3.72 (dddd, 1H), 3.66 (ddd, 1H), 3.38-3.32 (m, 1H), 2.95-2.84 (m, 1H), 2.57 (s, 6H), 2.40-2.24 (m, 1H), 1.96-1.89 (m, 2H), 1.88-1.83 (m, 2H), 1.50 (s, 3H), 1.41-1.35 (m, 2H), 1.35-1.30 (m, 4H), 1.29 (s, 3H), 1.28 (s, 3H), 0.92-0.83 (m, 4H). |
| 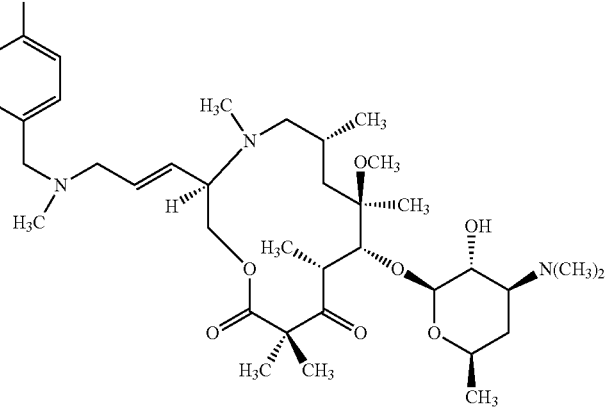
195 | $^1$H NMR (600 MHz, cd3od) δ 8.38 (s, 3H), 7.48-7.29 (m, 5H), 6.26 (s, 1H), 5.89 (dd, 1H), 4.93 (d, 2H), 4.46 (d, 4H), 4.36-4.16 (m, 3H), 3.83-3.69 (m, 5H), 3.43 (ddd, 4H), 3.32 (dd, 4H), 3.06 (s, 3H), 2.96 (d, 2H), 2.89-2.76 (s, 6H), 2.38 (s, 4H), 2.25 (s, 2H), 2.02 (t, 2H), 1.82 (d, 3H), 1.61 (d, 3H), 1.58-1.46 (m, 6H), 1.39 (d, 6H), 1.36 (d, 3H), 1.34 (d, 3H), 1.05 (d, 3H). |
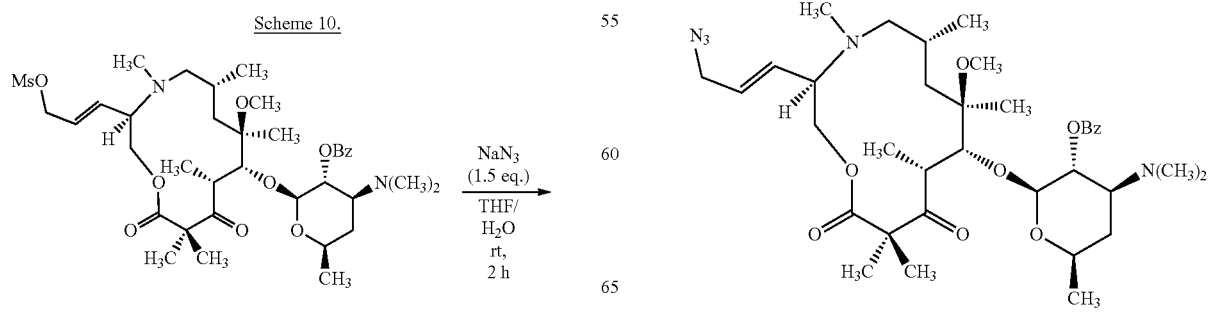

Sodium azide (1.9 mg, 30.0 μmol, 1.5 eq.) was added to a stirring solution of (2S,3R,4S,6R)-2-(((3R,6R,8R,9R,10R)-3-((E)-3-bromoprop-1-en-1-yl)-8-methoxy-4,6,8,10,12,12-hexamethyl-11,13-dioxo-1-oxa-4-azacyclotridecan-9-yl)oxy)-4-(dimethylamino)-6-methyltetrahydro-2H-pyran-3-yl benzoate (18 mg, 25.0 μmol, 1.0 eq.) in a THF/H$_2$O 5:1 mixture (0.05 M) at room temperature. The reaction media was kept stirring for 2 h. At this point LCMS analysis showed full conversion of starting material in desired product. The solvent was removed and the crude mixture was purified by HPLC to give (2S,3R,4S,6R)-2-(((3R,6R,8R,9R,10R)-3-((E)-3-Azidoprop-1-en-1-yl)-8-methoxy-4,6,8,10,12,12-hexamethyl-11,13-dioxo-1-oxa-4-azacyclotridecan-9-yl)oxy)-4-(dimethylamino)-6-methyltetrahydro-2H-pyran-3-yl benzoate.

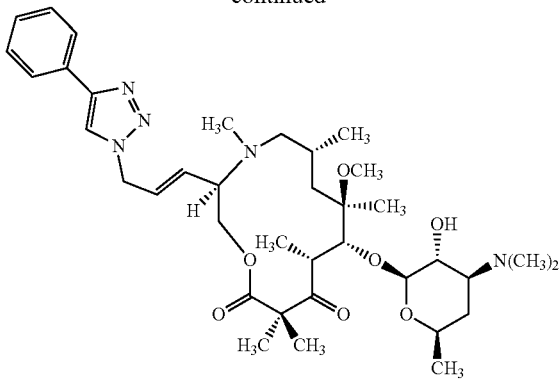

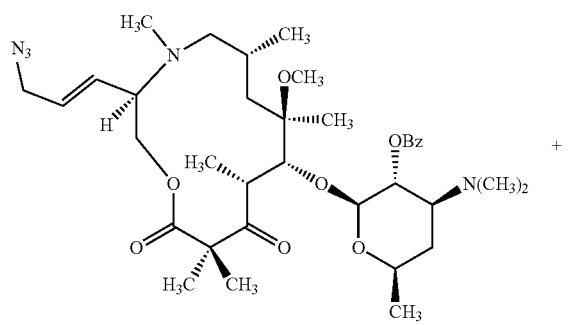

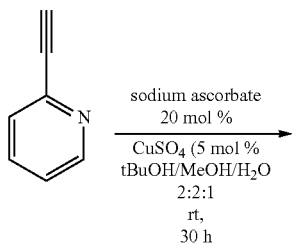

(2S,3R,4S,6R)-2-(((3R,6R,8R,9R,10R)-3-((E)-3-Azidoprop-1-en-1-yl)-8-methoxy-4,6,8,10,12,12-hexamethyl-11,13-dioxo-1-oxa-4-azacyclotridecan-9-yl)oxy)-4-(dimethylamino)-6-methyltetrahydro-2H-pyran-3-yl benzoate (6 mg, 8.75 μmol, 1.0 eq.) was added to a stirring solution of 2-ethynylpyridine (2.7 μl, 26 μmol, 3.0 eq.), 0.1 molar solution of copper sulfate in water (4.4 μl 0.44 μmol, 5 mol %). and a 0.1 M solution of sodium 2-(1,2-dihydroxyethyl)-4-hydroxy-5-oxo-2,5-dihydrofuran-3-olate in water (17.5 μl, 1.75 μmol, 20 mol %) in a tBuOH/MeOH/water 2:2:1 mixture and the reaction mixture was stirred for 30 h. At this point LCMS analysis indicated full conversion of the starting material. NaHCO$_3$ sat. aq (2 mL) was added to the reaction media and the organic phase was extracted by DCM (3×3 mL). The organic layers were combined, dried over Na$_2$SO$_4$ and concentrated under vacuum to afford (3R,6R,8R,9R,10R)-9-(((2S,3R,4S,6R)-4-(dimethylamino)-3-hydroxy-6-methyltetrahydro-2H-pyran-2-yl)oxy)-8-methoxy-4,6,8,10,12,12-hexamethyl-3-((E)-3-(4-phenyl-1H-1,2,3-triazol-1-yl)prop-1-en-1-yl)-1-oxa-4-azacyclotridecane-11,13-dione (Compound 151) which was purified over HPLC. $^1$H NMR (600 MHz, Methanol-d$_4$) δ 8.58 (dt, 1H), 8.09 (dt, 1H), 7.94 (td, 2H), 7.39 (ddd, 1H), 6.52-6.44 (m, 1H), 5.69-5.60 (m, 2H), 5.30-5.21 (m, 3H), 5.10-5.00 (m, 2H), 4.65-4.57 (m, 11H), 4.44 (d, 2H), 4.37-4.26 (m, 2H), 4.25-4.13 (m, 2H), 3.75-3.69 (m, 4H), 3.42 (dd, 2H), 3.36-3.32 (m, 2H), 3.23-3.14 (m, 2H), 2.98 (s, 4H), 2.91-2.81 (m, 3H), 2.77 (s, 7H), 2.30-2.23 (m, 1H), 2.03-1.99 (m, 1H), 1.89-1.85 (m, 3H), 1.59-1.55 (m, 1H), 1.53-1.48 (m, 2H), 1.47 (s, 3H), 1.41-1.36 (m, 3H), 1.32 (s, 3H), 1.31 (s, 3H), 1.30-1.28 (m, 2H), 1.27-1.24 (m, 3H), 1.04 (s, 3H), 0.90 (t, 2H).

Scheme 11.

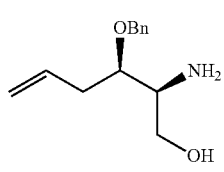

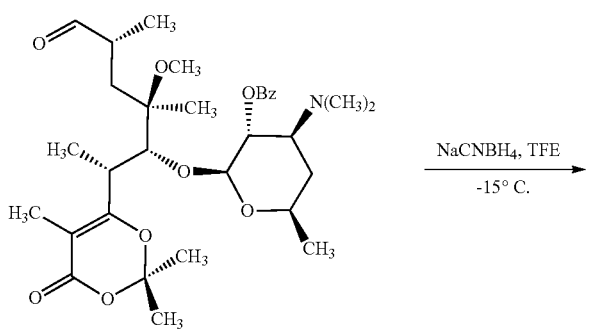

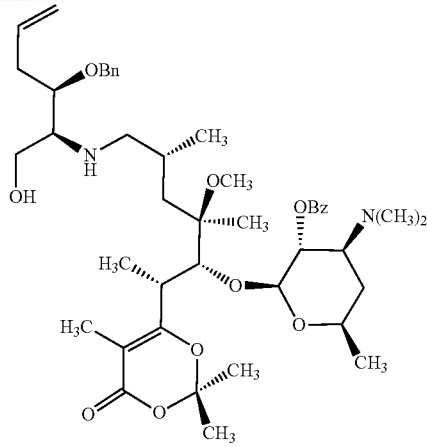

Sodium cyanoborohydride (0.583 g, 9.28 mmol, 2.00 equiv) was added in one portion to a solution of 120 (0.939 g, 4.64 mmol, 1 equiv) in trifluoroethanol (10 mL) at −15° C. (ice-salt bath). A solution of aldehyde (1.85 g, 4.64 mmol, 1 equiv) in trifluoroethanol (3.0 mL) was added dropwise via syringe. The transfer was quantitated with the same solvent (2×1.5 mL). After 2 h, TLC analysis indicated that full consumption of the aldehyde had occurred. The reaction mixture was allowed to warm to 23° C., then was concentrated under reduced pressure. The residue was partitioned between dichloromethane (20 mL) and saturated aqueous sodium bicarbonate solution (15 mL). The aqueous layer was separated and further extracted with dichloromethane (2×10 mL). The combined organic layers were dried over sodium sulfate, and the dried solution was concentrated. The residue was purified by column chromatography (30% acetone-hexanes+0.3% triethylamine) to afford (2S,3R,4S,6R)-2-(((2R,3R,4R,6R)-7-(((2S,3R)-3-(benzyloxy)-1-hydroxyhex-5-en-2-yl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (1.93 g, 71%) as a white foam.

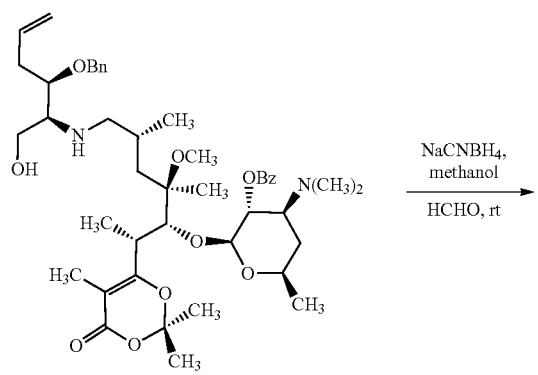

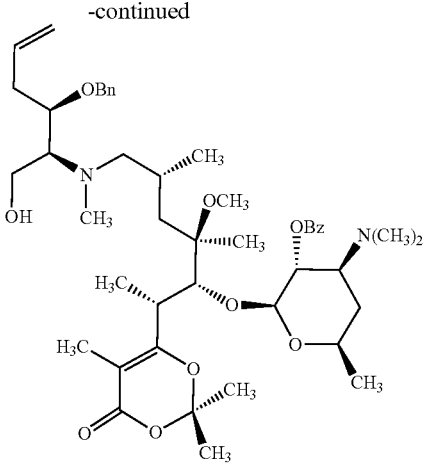

Sodium cyanoborohydride (0.583 g, 9.28 mmol, 2.00 equiv) was added in one portion to a solution of (2S,3R,4S,6R)-2-(((2R,3R,4R,6R)-7-(((2S,3R)-3-(benzyloxy)-1-hydroxyhex-5-en-2-yl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (1 equiv) in methanol (10 mL) at room temperature. Formaldehyde (10 equiv) was added dropwise via syringe. After 1 h, TLC analysis indicated that full consumption of the amine had occurred. The reaction mixture was concentrated under reduced pressure. The residue was partitioned between dichloromethane (20 mL) and saturated aqueous sodium bicarbonate solution (15 mL). The aqueous layer was separated and further extracted with dichloromethane (2×10 mL). The combined organic layers were dried over sodium sulfate, and the dried solution was concentrated. The residue was purified by column chromatography (30% acetone-hexanes+0.3% triethylamine) to afford (2S,3R,4S,6R)-2-(((2R,3R,4R,6R)-7-(((2S,3R)-3-(benzyloxy)-1-hydroxyhex-5-en-2-yl)(methyl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (71%) as a white foam.

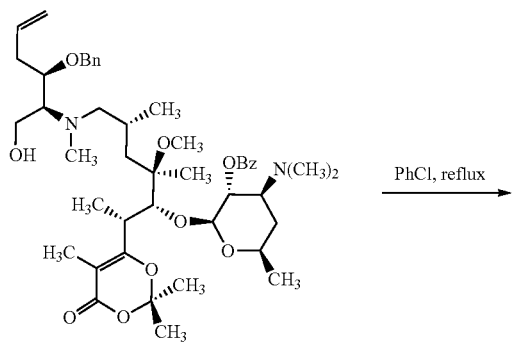

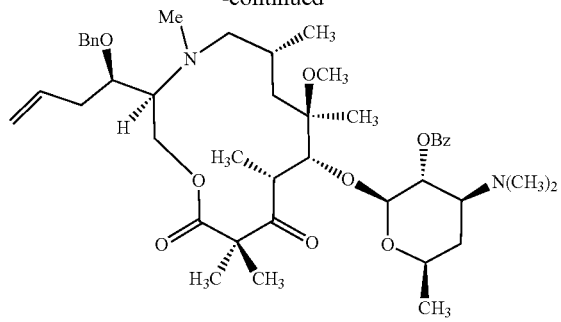

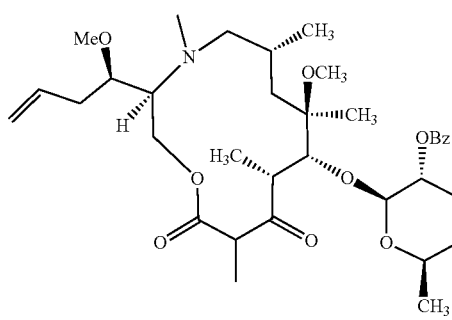

An oven-dried 5-L as was charged with (2S,3R,4S,6R)-2-(2S,3R,4S,6R)-7-(((2S,3R)-3-(benzyloxy)-1-hydroxyhex-5-en-2-yl)(methyl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (1.56 g, 2.28 mmol) and chlorobenzene (3 L, 1 mM). The flask was fitted with an oven-dried reflux condenser. Dry argon was bubbled through the solution via a 22-gauge needle for 15 min. The flask was then immersed in an oil bath preheated to 150° C. to allow a gentle reflux of the reaction solution. After 16 h, the heating bath was removed and the solution was allowed to cool to 23° C. The cooled solution was concentrated under reduced pressure (rotary evaporation, ~10 Torr, 40° C. water bath) and the residue was purified by flash column chromatography to afford (2S,3R,4S,6R)-4-(dimethylamino)-2-(((3S,6R,8R,9R,10R)-8-methoxy-3-((R)-1-methoxybut-3-en-1-yl)-4,6,8,10,12-pentamethyl-11,13-dioxo-1-oxa-4-azacyclotridecan-9-yl)oxy)-6-methyltetrahydro-2H-pyran-3-yl benzoate as a white foam.

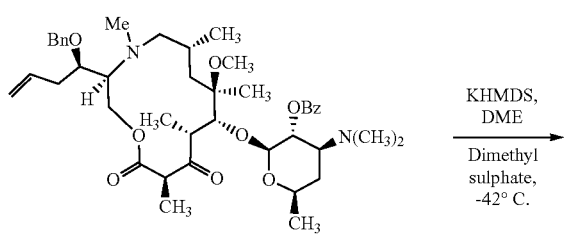

KHMDS (1.1 mL, 1.105 mmol, 1.3 equiv) was added dropwise to a stirring solution of (2S,3R,4S,6R)-4-(dimethylamino)-2-(((3S,6R,8R,9R,10R)-8-methoxy-3-((R)-1-methoxybut-3-en-1-yl)-4,6,8,10,12-pentamethyl-11,13-dioxo-1-oxa-4-azacyclotridecan-9-yl)oxy)-6-methyltetrahydro-2H-pyran-3-yl benzoate (0.650 mg, 0.850 mmol, 1.0 equiv) in DME (10 mL) at −42° C. (dry ice/acetonitrile bath) under an argon atmosphere. Stirring was kept for 15 mins at −42° C. and dimethyl sulphate (0.161 mL, 1.699 mmol, 2.0 equiv) was added. The reaction was allowed to reach 0° C. After 20 mins of stirring HRMS showed complete methylation. Ten eq. of NEt₃ were added to the reaction mixture and the reaction mixture was allowed to reach rt. AcOEt (10 mL) and water (10 mL) were added and aqueous phase was extracted by AcOEt (2×5 mL). Organic layers were assembled, dried over Na₂SO₄ anhydrous, and concentrated under reduced pressure to afforded (2S,3R,4S,6R)-2-(((3S,6R,8R,9R,10R)-3-((R)-1-(benzyloxy)but-3-en-1-yl)-8-methoxy-4,6,8,10,12,12-hexamethyl-11,13-dioxo-1-oxa-4-azacyclotridecan-9-yl)oxy)-4-(dimethylamino)-6-methyltetrahydro-2H-pyran-3-yl benzoate as a brown foam. The crude mixture was purified by column chromatography (Eluant DCM/MeOH 100:0 to 90:10)

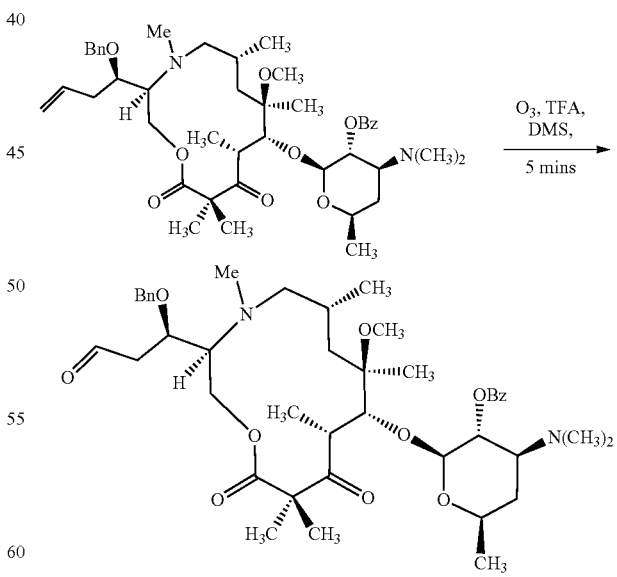

TFA (327 μl, 4.44 mmol, 20.0 eq.) was added to a solution of (2S,3R,4S,6R)-2-(((3S,6R,8R,9R,10R)-3-((R)-1-(benzyloxy)but-3-en-1-yl)-8-methoxy-4,6,8,10,12,12-hexamethyl-11,13-dioxo-1-oxa-4-azacyclotridecan-9-yl)oxy)-4-(dimethylamino)-6-methyltetrahydro-2H-pyran-3-yl benzoate in DCM at −78° C. and the reaction mixture was stirred for 2 mins at this temperature. Ozone was then bubbled in the reaction media at −78° C. until blue color persisted (5-6 mins). At this point, the reaction was flushed with N₂ and dimethylsulfide (18 µl, 0.24 mmol, 1.1 eq.) was then added. The reaction media was kept under stirring for 5 mins at −78° C. and then allowed to warm up at room temperature and stirring was continued for an extra 5 mins. LCMS indicated complete conversion of starting material in desired aldehyde. DCM (3 mL) and sat aq. Na₂CO₃ solution (3 mL) were added to the reaction mixture and organic phase was extracted by DCM (3×5 mL). Organic layers were assembled, dried over Na₂SO₄ anhydrous and concentrated under vacuum to afford (2S,3R,4S,6R)-2-(((3S,6R,8R,9R, 10R)-3-((R)-1-(benzyloxy)-3-oxopropyl)-8-methoxy-4,6,8, 10,12,12-hexamethyl-11,13-dioxo-1-oxa-4-azacyclotride-can-9-yl)oxy)-4-(dimethylamino)-6-methyltetrahydro-2H-pyran-3-yl benzoate which was used as such for next step.

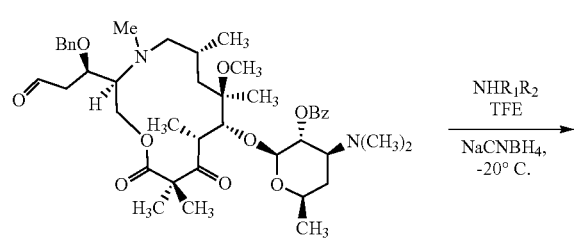

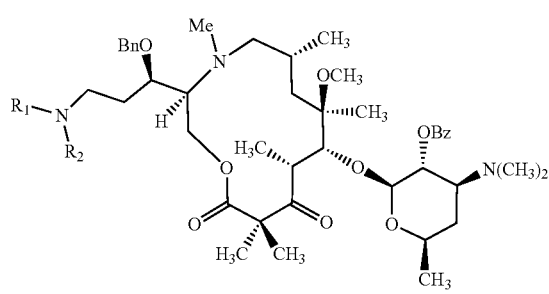

A solution of (2S,3R,4S,6R)-2-(((3S,6R,8R,9R,10R)-3-((R)-1-(benzyloxy)-3-oxopropyl)-8-methoxy-4,6,8,10,12, 12-hexamethyl-11,13-dioxo-1-oxa-4-azacyclotridecan-9-yl) oxy)-4-(dimethylamino)-6-methyltetrahydro-2H-pyran-3-yl benzoate (170 mg, 0.22 mmol, 1.0 eq.) in trifluoroethanol (0.5 mL) was added dropwise to a stirring solution of a secondary amine (0.44 mmol, 2.0 eq.) and sodium cyano-borohydride (28 mg, 0.44 mmol, 2.0 eq.) in trifluoroethanol (1.5 mL; total: 0.1 molar solution) at −15° C. The reaction media was allowed to stir for 2 h at this temperature. DCM (5 mL) and sat aq. Na₂CO₃ (3 mL) were added to the reaction mixture and organic phase was extracted by DCM (3×5 mL). Organic layers were assembled, dried over Na₂SO₄ anhydrous and concentrated under vacuum. Crude product was purified over column chromatography (Eluant DCM/MeOH: 100:0 to 90:10) to afford the desired product as a white foam.

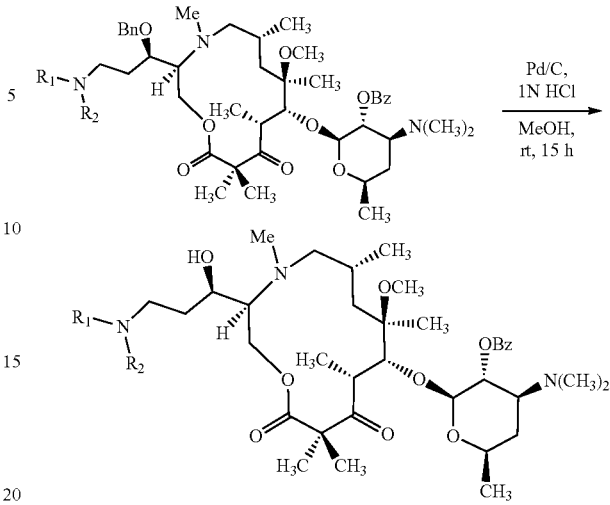

H₂ atmosphere was introduced (H₂ bubbling through the solution for 15 mins) to a stirring mixture of the macrolide (1.0 eq.), HCl (3.0 eq.), and Pd/C 10 wt % (50 mol %) in MeOH (5 mL). 4.0 extra equivalents of HCl (1N) were added to the reaction media which was kept under H2 atmosphere (1 atm) overnight. After stirring overnight, LCMS showed full conversion to desired product. The reaction media was filtrated and washed several times with methanol (4×3 mL). DCM (10 mL) was added to the reaction mixture and the reaction media was basified with NaHCO₃ sat. aq. (15 mL) to pH~11. The aqueous phase was extracted by DCM (4×10 mL). Organic layers were gathered, dried over MgSO₄ anhydrous and finally concentrated under vacuum to afford crude desired product which was purified over column chromatography.

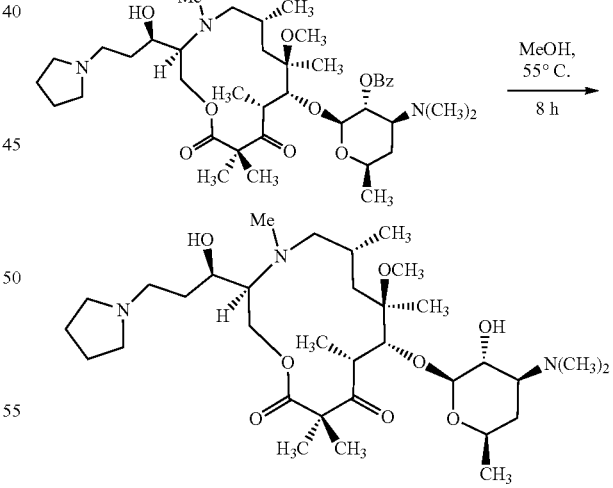

A solution of (2S,3R,4S,6R)-4-(dimethylamino)-2-(((3S, 6R,8R,9R,10R)-3-((R)-1-hydroxy-3-(pyrrolidin-1-yl)pro-pyl)-8-methoxy-4,6,8,10,12,12-hexamethyl-11,13-dioxo-1-oxa-4-azacyclotridecan-9-yl)oxy)-6-methyltetrahydro-2H-pyran-3-yl benzoate in methanol was stirred at 50-55° C. until full deprotection of the benzoyl group (8 h). The reaction mixture was allowed to cool to room temperature and the solvent was removed under reduced pressure. (3S, 6R,8R,9R,10R)-9-(((2S,3R,4S,6R)-4-(Dimethylamino)-3-hydroxy-6-methyltetrahydro-2H-pyran-2-yl)oxy)-3-((R)-1-hydroxy-3-(pyrrolidin-1-yl)propyl)-8-methoxy-4,6,8,10,12,12-hexamethyl-1-oxa-4-azacyclotridecane-11,13-dione (Compound 78) was obtained by purification over column chromatography (Eluant:DCM/MeOH: 90:10 to 80:20+1% NEt₃). ¹H NMR (500 MHz, Methanol-d₄) δ 8.53 (s, 3H), 4.61 (s, 1H), 4.45 (d, 2H), 4.37 (s, 1H), 4.19 (s, 1H), 3.70 (dt, 3H), 3.51 (s, 1H), 3.44-3.33 (m, 6H), 3.20 (s, 2H), 3.09 (s, 2H), 2.99 (s, 3H), 2.69 (s, 7H), 2.00 (s, 4H), 1.91 (s, 2H), 1.53 (s, 4H), 1.45 (d, 3H), 1.38 (s, 5H), 1.34-1.27 (m, 11H), 0.99 (s, 3H)

The following compounds were prepared using synthetic procedures analogous to those described above in Scheme 11.

| Compound | Characterization |
|---|---|
| 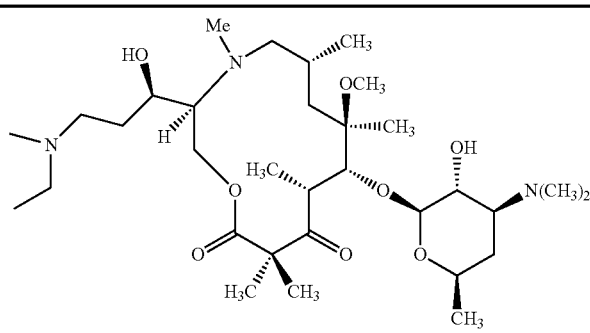<br>3 | ¹H NMR (600 MHz, Methanol-d₄) δ 8.49 (s, 3H), 4.46 (d, 3H), 4.24 (s, 1H), 3.77-3.69 (m, 3H), 3.45 (dd, 4H), 3.37 (ddd, 3H), 3.19-3.16 (m, 2H), 3.08 (s, 3H), 3.03 (s, 5H), 2.79 (s, 10H), 2.73 (s, 4H), 2.24 (s, 1H), 2.02 (ddd, 3H), 1.97 (s, 2H), 1.66 (s, 114), 1.53 (s, 6H), 1.49 (d, 2H), 1.39 (d, 9H), 1.32 (tt, 18H), 1.04 (s, 3H). |
| 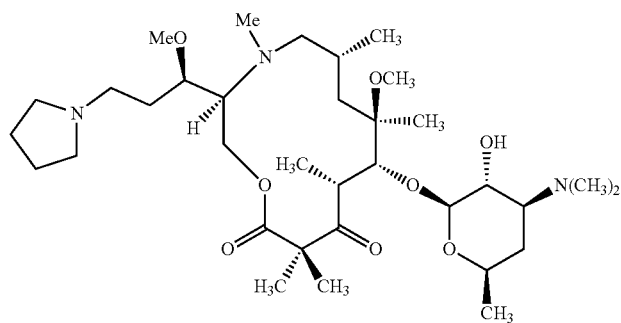<br>77 | ¹H NMR (500 MHz, Methanol-d₄) δ 8.54 (s, 3H), 4.40 (d, 1H), 4.31 (d, 1H), 4.23 (t, 1H), 4.02 (d, 1H), 3.64 (t, 1H), 3.57 (ddt, 1H), 3.43-3.38 (m, 1H), 3.33 (s, 3H), 3.28 (dd, 4H), 2.99 (d, 1H), 2.88 (s, 2H), 2.66 (td, 6H), 2.56 (d, 1H), 2.37 (s, 3H), 2.35 (s, 4H), 2.12 (t, 1H), 1.94 (d, 1H), 1.85 (h, 4H), 1.82-1.80 (m, 1H), 1.76 (ddd, 2H), 1.51 (s, 2H), 1.34 (s, 2H), 1.31-1.21 (m, 8H). |
| 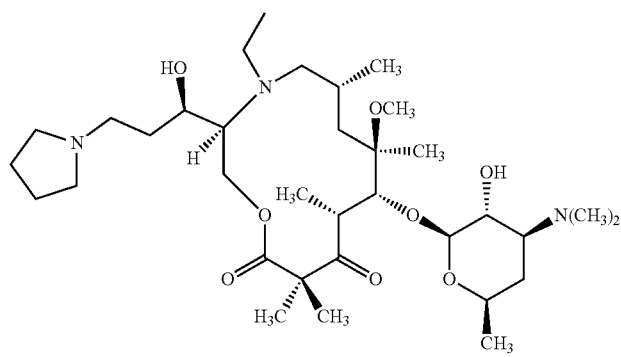<br>146 | ¹H NMR (600 MHz, Methanol-d₄) δ 8.53 (s, 2H), 4.60 (s, 3H), 4.44 (d, 2H), 4.17 (s, 1H), 4.04 (s, 1H), 3.71-3.62 (m, 4H), 3.42-3.37 (m, 2H), 2.83 (s, 2H), 2.68 (s, 6H), 2.02 (s, 4H), 1.95 (ddd, 3H), 1.84 (s, 1H), 1.55 (s, 3H), 1.45 (q, 3H), 1.35 (s, 4H), 1.29 (d, 11H), 0.90-0.88 (m, 2H). |

-continued
| Compound | Characterization |
|---|---|
| 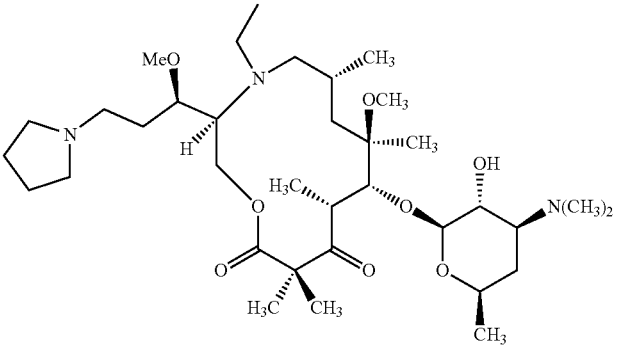<br>147 | $^1$H NMR (500 MHz, Methanol-d$_4$) δ 8.44 (s, 3H), 4.48 (d, 2H), 3.47 (dd, 3H), 3.41 (dd, 2H), 3.25 (s, 1H), 3.11 (s, 5H), 2.90 (s, 2H), 2.82 (s, 11H), 2.27 (s, 6H), 2.13 (s, 1H), 2.09 (s, 1H), 2.07-2.01 (m, 3H), 1.57 (s, 5H), 1.53 (d, 2H), 1.40-1.32 (m, 20H), 1.31 (d, 6H), 1.20 (s, 3H). |
| 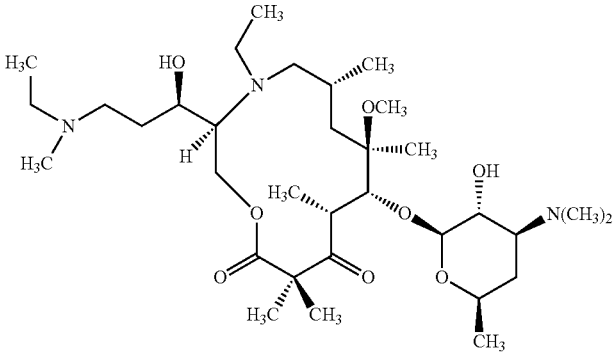<br>168 | $^1$H NMR (600 MHz, Methanol-d$_4$) δ 8.49 (s, 4H), 4.46 (d, 2H), 4.12 (s, 1H), 3.72 (td, 3H), 3.60 (s, 1H), 3.45 (dd, 3H), 3.42-3.33 (m, 4H), 3.14 (s, 2H), 2.91 (s, 2H), 2.80 (s, 10H), 2.77 (s, 4H), 2.05-1.99 (m, 4H), 1.95 (s, 1H), 1.54-1.47 (m, 6H), 1.36 (s, 5H), 1.32 (q, 20H), 1.17 (s, 3H). |
| 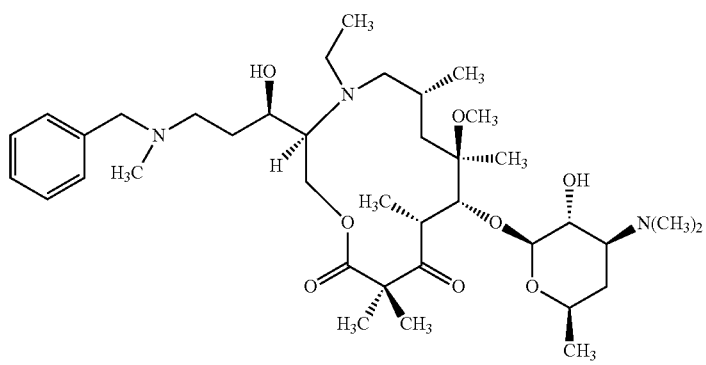<br>194 | $^1$H NMR (600 MHz, Methanol-d$_4$) δ 8.44 (d, 6H), 7.40-7.35 (m, 8H), 4.46 (d, 3H), 4.35 (s, 1H), 4.17 (s, 2H), 3.90 (s, 1H), 3.78 (s, 1H), 3.76-3.69 (m, 4H), 3.56 (s, 2H), 3.44 (ddd, 4H), 3.38 (ddd, 5H), 2.98 (s, 3H), 2.80 (d, 13H), 2.42 (s, 2H), 2.02 (ddt, 4H), 1.97 (s, 1H), 1.82 (s, 1H), 1.52 (s, 7H), 1.49 (dd, 2H), 1.38-1.30 (m, 26H), 1.01 (s, 3H). |

Scheme 12.

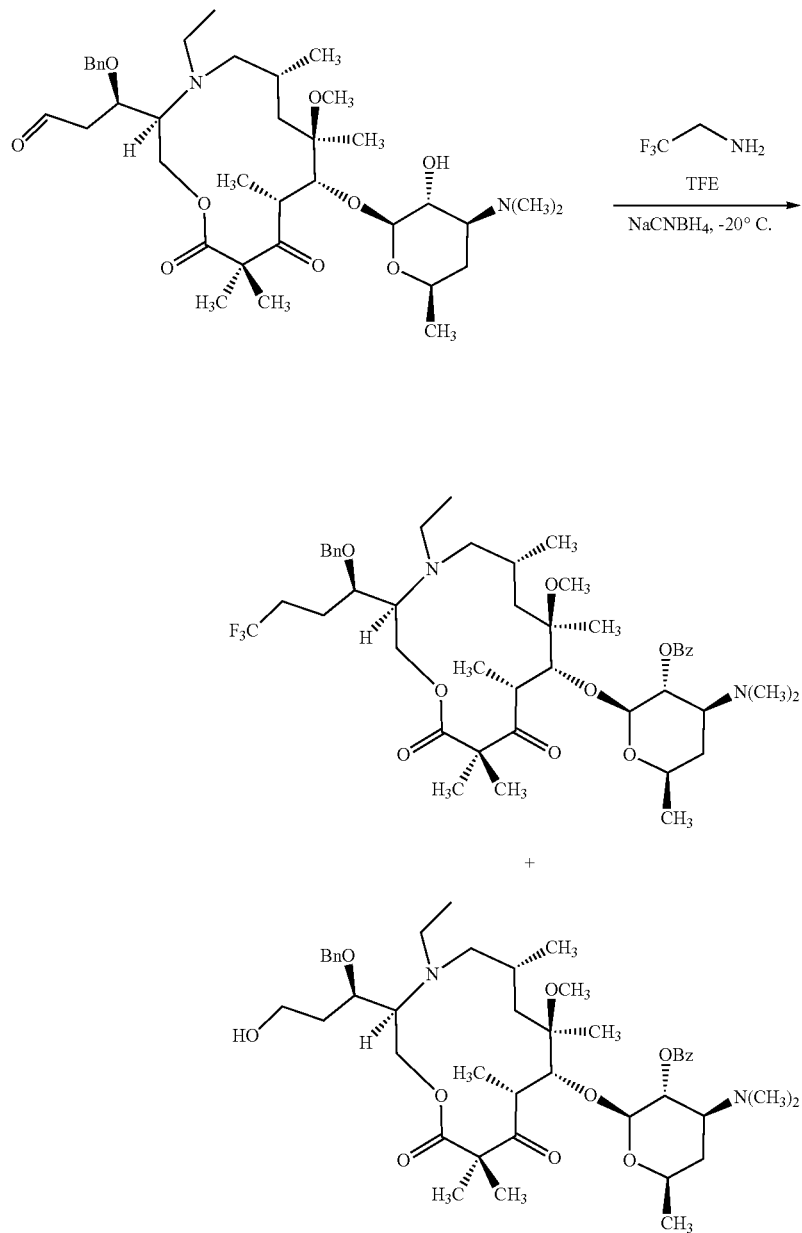

A solution of (2S,3R,4S,6R)-2-(((3S,6R,8R,9R,10R)-3-((R)-1-(benzyloxy)-3-oxopropyl)-4-ethyl-8-methoxy-6,8,10,12,12-pentamethyl-11,13-dioxo-1-oxa-4-azacyclotridecan-9-yl)oxy)-4-(dimethylamino)-6-methyltetrahydro-2H-pyran-3-yl benzoate (170 mg, 0.22 mmol, 1.0 eq.) in trifluoroethanol (0.5 mL) was added dropwise to a stirring solution of trifluoroethylamine (38 µL, 0.44 mmol, 2.0 eq.) and sodium cyanoborohydride (28 mg, 0.44 mmol, 2.0 eq.) in trifluoroethanol (1.5 mL; total: 0.1 molar solution) at −15° C. The reaction media was allowed to stir for 2 h at this temperature. DCM (5 mL) and sat aq. $Na_2CO_3$ (3 mL) were added to the reaction mixture and organic phase was extracted by DCM (3×5 mL). Organic layers were assembled, dried over $Na_2SO_4$ anhydrous, and concentrated under vacuum. (2S,3R,4S,6R)-2-(((3S,6R,8R,9R,10R)-3-((R)-1-(benzyloxy)-3-((2,2,2-trifluoroethyl)amino)propyl)-4-ethyl-8-methoxy-6,8,10,12,12-pentamethyl-11,13-dioxo-1-oxa-4-azacyclotridecan-9-yl)oxy)-4-(dimethylamino)-6-methyltetrahydro-2H-pyran-3-yl benzoate (40% yield) and (2S,3R,4S,6R)-2-(((3S,6R,8R,9R,10R)-3-((R)-1-(benzyloxy)-3-hydroxypropyl)-4-ethyl-8-methoxy-6,8,10,12,12-pentamethyl-11,13-dioxo-1-oxa-4-azacyclotridecan-9-yl)oxy)-4-(dimethylamino)-6-methyltetrahydro-2H-pyran-3-yl benzoate (45%) were isolated after purification over silica gel.

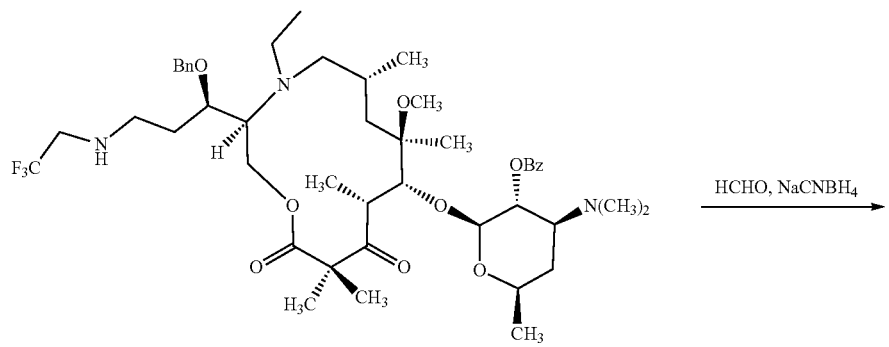

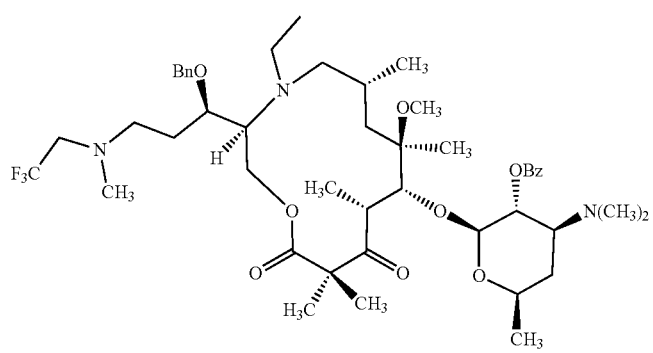

Sodium cyanoborohydride (7.27 mg, 0.116 mmol, 2.00 equiv) was added in one portion to a solution of (2S,3R,4S,6R)-2-(((3S,6R,8R,9R,10R)-3-((R)-1-(benzyloxy)-3-((2,2,2-trifluoroethyl)amino)propyl)-4-ethyl-8-methoxy-6,8,10,12,12-pentamethyl-11,13-dioxo-1-oxa-4-azacyclotridecan-9-yl)oxy)-4-(dimethylamino)-6-methyltetrahydro-2H-pyran-3-yl benzoate by column chromatography (50 mg, 0.058 mmol, 1 equiv) in methanol (3 mL) at room temperature. Formaldehyde (34.8 mg, 1.157 mmol, 20 equiv) was added dropwise via syringe. After 1 h, TLC analysis indicated that full consumption of the amine had occurred. The reaction mixture was concentrated under reduced pressure. The residue was partitioned between dichloromethane (20 mL) and saturated aqueous sodium bicarbonate solution (15 mL). The aqueous layer was separated and further extracted with dichloromethane (2×10 mL). The combined organic layers were dried over sodium sulfate, and the dried solution was concentrated. The residue was purified by column chromatography (30% acetone-hexanes+0.3% triethylamine) to afford (2S,3R,4S,6R)-2-(((3S,6R,8R,9R,10R)-3-((R)-1-(benzyloxy)-3-(methyl(2,2,2-trifluoroethyl)amino)propyl)-4-ethyl-8-methoxy-6,8,10,12,12-pentamethyl-11,13-dioxo-1-oxa-4-azacyclotridecan-9-yl)oxy)-4-(dimethylamino)-6-methyltetrahydro-2H-pyran-3-yl benzoate (71%) as a white foam.

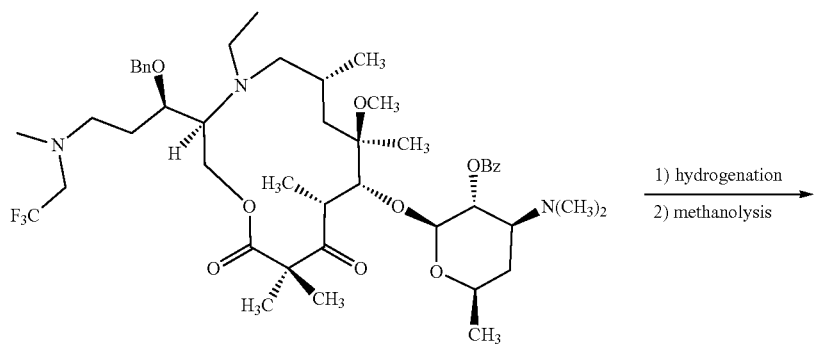

-continued

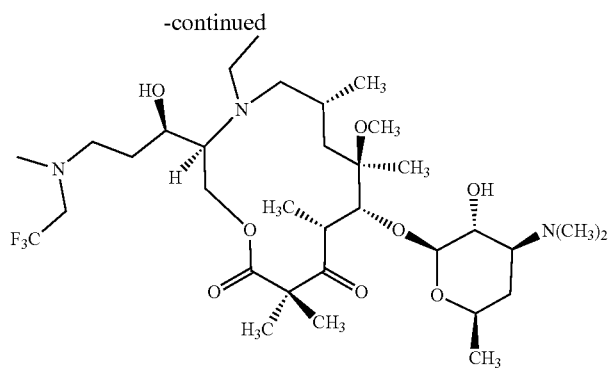

(2S,3R,4S,6R)-2-(((3S,6R,8R,9R,10R)-3-((R)-1-(Benzyloxy)-3-(methyl(2,2,2-trifluoroethyl)amino)propyl)-4-ethyl-8-methoxy-6,8,10,12,12-pentamethyl-11,13-dioxo-1-oxa-4-azacyclotridecan-9-yl)oxy)-4-(dimethylamino)-6-methyltetrahydro-2H-pyran-3-yl benzoate was subjected to hydrogenation to remove the benzyl protecting group followed by methanolysis of the benzoyl group, as described in the procedures above, to provide (3S,6R,8R,9R,10R)-9-(((2S,3R,4S,6R)-4-(dimethylamino)-3-hydroxy-6-methyltetrahydro-2H-pyran-2-yl)oxy)-4-ethyl-3-((R)-1-hydroxy-3-(methyl(2,2,2-trifluoroethyl)amino)propyl)-8-methoxy-6,8,10,12,12-pentamethyl-1-oxa-4-azacyclotridecane-11,13-dione (Compound 193). $^1$H NMR (600 MHz, Methanol-d$_4$) δ 8.55 (s, 1H), 4.61 (s, 1H), 4.44 (d, 2H), 3.71-3.60 (m, 4H), 3.12 (s, 2H), 3.03 (s, 1H), 2.79 (s, 2H), 2.72 (s, 3H), 2.64 (s, 2H), 2.45 (s, 3H), 2.27 (s, 1H), 1.95 (s, 1H), 1.79-1.74 (m, 2H), 1.53 (s, 2H), 1.36 (s, 4H), 1.29 (t, 7H), 1.07 (s, 3H).

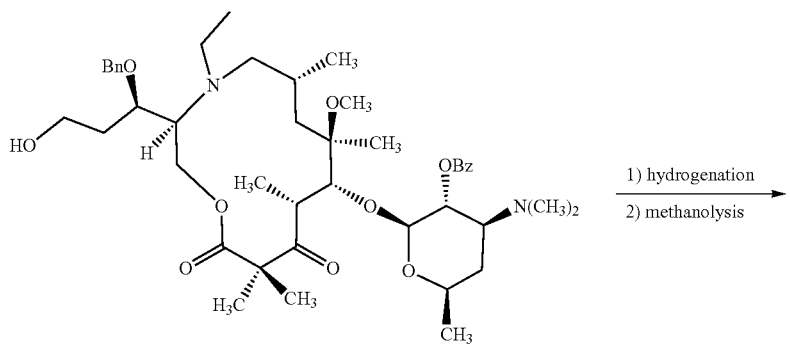

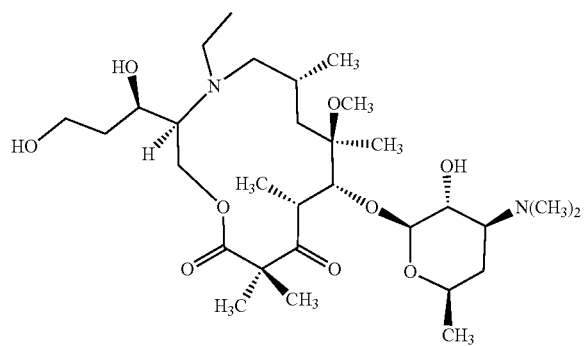

In similar fashion, ((2S,3R,4S,6R)-2-(((3S,6R,8R,9R,10R)-3-((R)-1-(benzyloxy)-3-hydroxypropyl)-4-ethyl-8-methoxy-6,8,10,12,12-pentamethyl-11,13-dioxo-1-oxa-4-azacyclotridecan-9-yl)oxy)-4-(dimethylamino)-6-methyltetrahydro-2H-pyran-3-yl benzoate was subjected to hydrogenation to remove the benzyl protecting group followed by methanolysis of the benzoyl group, as described in the procedures above, to provide (3S,6R,8R,9R,10R)-3-((R)-1,3-dihydroxypropyl)-9-(((2S,3R,4S,6R)-4-(dimethylamino)-3-hydroxy-6-methyltetrahydro-2H-pyran-2-yl)oxy)-4-ethyl-8-methoxy-6,8,10,12,12-pentamethyl-1-oxa-4-azacyclotridecane-11,13-dione (Compound 200). $^1$H NMR (600 MHz, Methanol-$d_4$) δ 8.49 (s, 4H), 5.12 (s, 1H), 4.46 (d, 3H), 4.42 (s, 1H), 4.34 (s, 1H), 4.21 (s, 1H), 3.78-3.69 (m, 8H), 3.60 (s, 1H), 3.52 (s, 2H), 3.45 (dd, 3H), 3.41-3.33 (m, 4H), 3.24 (s, 1H), 3.00 (s, 4H), 2.80 (s, 13H), 2.22 (s, 1H), 2.02 (ddd, 3H), 1.85 (q, 5H), 1.66 (s, 1H), 1.55-1.47 (m, 10H), 1.37 (d, 12H), 1.36 (s, 3H), 1.33 (dd, 17H), 1.05 (s, 3H).

Scheme 13.

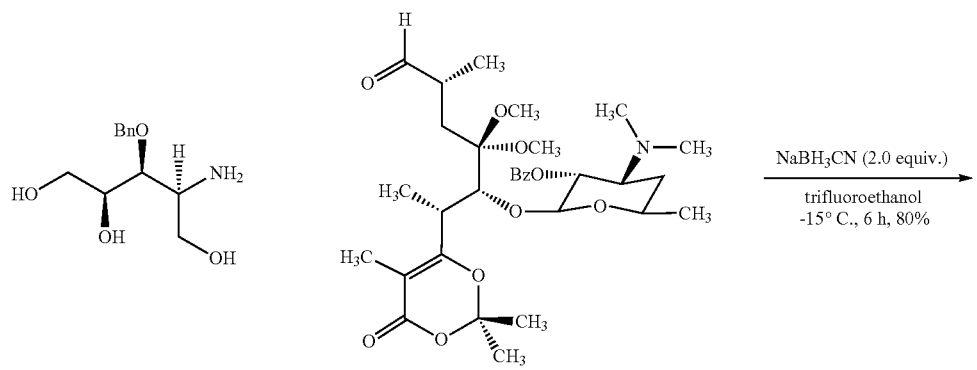

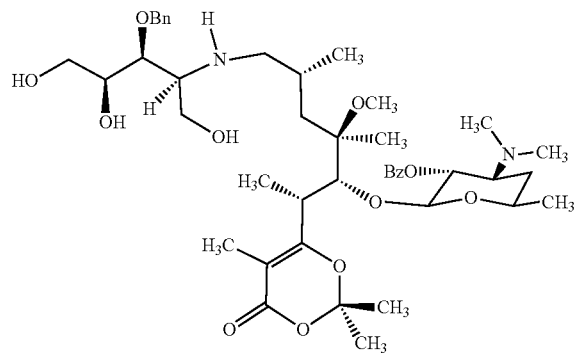

To a stirred solution of (2S,3S,4S)-4-amino-3-(benzyloxy)pentane-1,2,5-triol (I23) (0.519 g, 2.152 mmol) and sodium cyanoborohydride (0.180 g, 2.87 mmol) in trifluoroethanol (20 mL) at −15° C. (2S,3R,4S,6R)-4-(dimethylamino)-2-(((2R,3R,4R,6R)-4-methoxy-4,6-dimethyl-7-oxo-2-(2,2,5-trimethyl-4-oxo-4H-1,3-dioxin-6-yl)heptan-3-yl)oxy)-6-methyltetrahydro-2H-pyran-3-yl benzoate (0.846 g, 1.435 mmol) was added slowly to the reaction mixture and stirred for 6 h. Reaction was diluted with CH$_2$Cl$_2$ (30 mL) neutralized with cold water (20 mL) at same temperature. Organic layer was separated, and aqueous layer was washed CH$_2$Cl$_2$ (20 mL×3). Combined organic layer was washed with brine and organic layer was dried over anhydrous Na$_2$SO$_4$, concentrated under vacuum, and purified with flash column chromatography to give (2S,3R,4S,6R)-2-(((2R,3R,4R,6R)-7-(((2S,3S,4S)-3-(benzyloxy)-1,4,5-trihydroxypentan-2-yl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (0.931 g, 80%) as a white foaming solid.

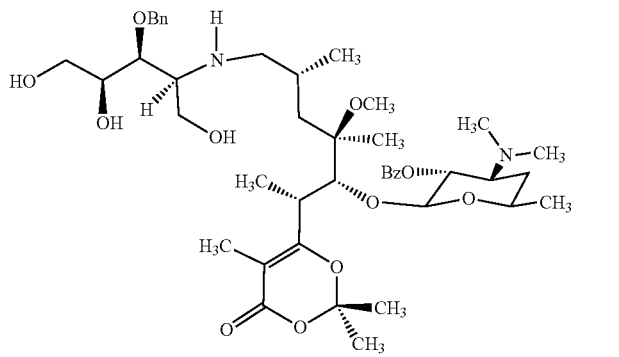 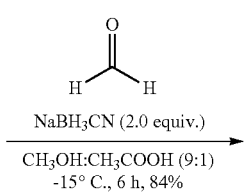

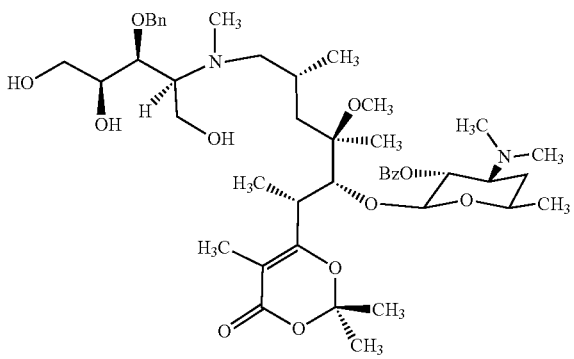

To a stirred solution of (2S,3R,4S,6R)-2-(((2R,3R,4R,6R)-7-(((2S,3S,4S)-3-(benzyloxy)-1,4,5-trihydroxypentan-2-yl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (0.931 g, 1.142 mmol) and sodium cyanoborohydride (0.179 g, 2.86 mmol) in MeOH:CH$_3$COOH (9:1) (20 mL) at 0° C. Formaldehyde (4.3 mL 30% solution in MeOH, 40.0 mmol) was added slowly to the reaction mixture and stirred for 2 h. The solvent was concentrated under vacuum and the reaction was diluted with CH$_2$Cl$_2$ (50 mL) neutralized with cold water (20 mL) at same temperature. Organic layer was separated and aqueous layer was washed CH$_2$Cl$_2$ (20 mL×3). Combined organic layer was washed with brine and organic layer was dried over anhydrous Na$_2$SO$_4$, concentrated under vacuum, and purified with flash column chromatography to give (2S,3R,4S,6R)-2-(((2R,3R,4R,6R)-7-(((2S,3S,4S)-3-(benzyloxy)-1,4,5-trihydroxypentan-2-yl)(methyl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (0.794 g, 84%) as a white foaming solid.

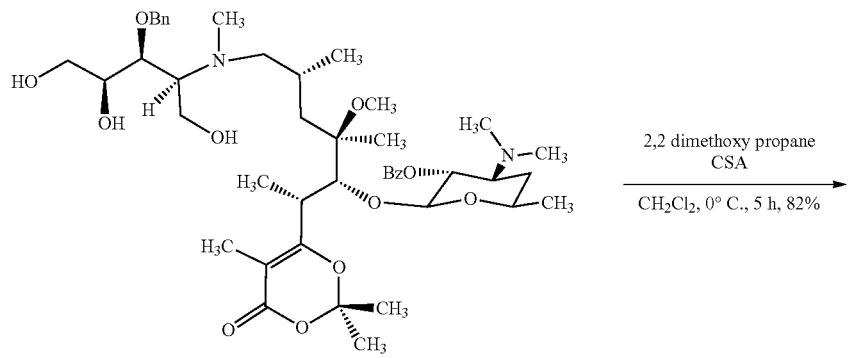

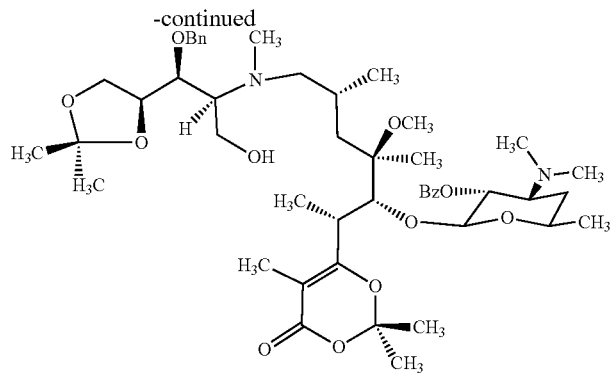

To a stirred solution of (2S,3R,4S,6R)-2-(((2R,3R,4R,6R)-7-(((2S,3S,4S)-3-(benzyloxy)-1,4,5-trihydroxypentan-2-yl)(methyl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (0.794 g, 0.958 mmol) in dry $CH_2Cl_2$ (10 mL), 2,2-dimethoxypropane (0.199 g, 1.915 mmol) and a catalytic amount of CSA (56 mg, 0.239 mmol) was added to the reaction and allowed to stirred for 5 h. After completion of the reaction it was quenched with water and diluted with $CH_2Cl_2$ (5 mL). The organic layer was separated and the aqueous layer was extracted with $CH_2Cl_2$ (2×10 mL). The combined organic layers were dried over anhydrous $Na_2SO_4$. After concentrating, the residue was purified by silica gel chromatography using ethyl acetate/hexane as eluent to give a mixture of both isomers as a colorless oil. Product was purified by flash chromatography on silica gel to afford (2S,3R,4S,6R)-2-(((2R,3R,4R,6R)-7-(((1S,2S)-1-(benzyloxy)-1-((S)-2,2-dimethyl-1,3-dioxolan-4-yl)-3-hydroxypropan-2-yl)(methyl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (0.681 g, 82%).

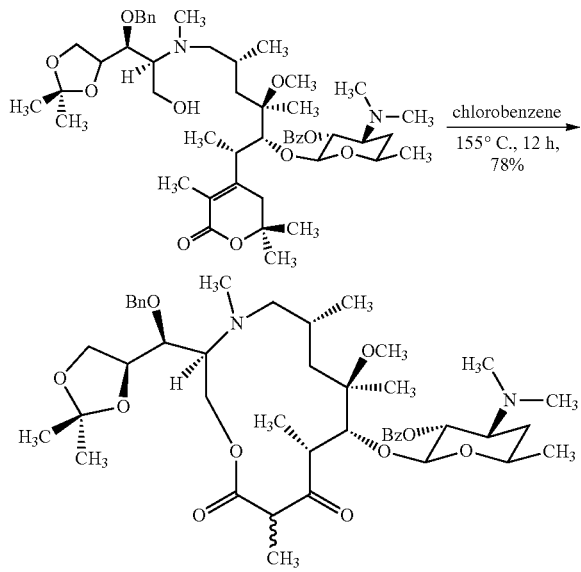

(2S,3R,4S,6R)-2-(((2R,3R,4R,6R)-7-(((1S,2S)-1-(Benzyloxy)-1-((S)-2,2-dimethyl-1,3-dioxolan-4-yl)-3-hydroxypropan-2-yl)(methyl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate was azeotropically dried with toluene four times under argon and exposed to high vacuum overnight. It was transferred with chlorobenzene (1576 mL) into a 3000 mL flame dried round bottom flask at rt. The reaction solution was degassed with argon for 30 min and fitted with a reflux condenser. Vacuum was applied for 30 second and released with argon (repeated 3 times). The reaction mixture was heated to 150° C. in an oil bath for 12 h. Chlorobenzene was distilled off. Crude material was purified by flash column chromatography to (2S,3R,4S,6R)-2-(((3S,6R,8R,9R,10R)-3-((S)-(benzyloxy)((S)-2,2-dimethyl-1,3-dioxolan-4-yl)methyl)-8-methoxy-4,6,8,10,12-pentamethyl-11,13-dioxo-1-oxa-4-azacyclotridecan-9-yl)oxy)-4-(dimethylamino)-6-methyltetrahydro-2H-pyran-3-yl benzoate (0.494 g, 78%) as a white solid.

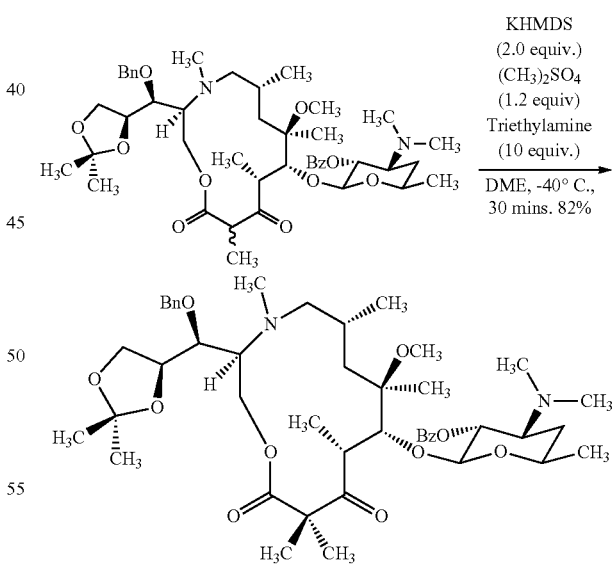

To a stirred solution of (2S,3R,4S,6R)-2-(((3S,6R,8R,9R,10R)-3-((S)-(benzyloxy)((S)-2,2-dimethyl-1,3-dioxolan-4-yl)methyl)-8-methoxy-4,6,8,10,12-pentamethyl-11,13-dioxo-1-oxa-4-azacyclotridecan-9-yl)oxy)-4-(dimethylamino)-6-methyltetrahydro-2H-pyran-3-yl benzoate (0.494 g, 0.840 mmol) in DME (7 mL) at −40° C., KHMDS (0.734 mL, 0.731 mmol) was added slowly to the reaction mixture and stirred for 15 mins. Dimethyl sulfate (0.116 mL, 1.218 mmol) was added and the reaction stirred for another 15 min. The reaction was monitored by LCMS which showed complete conversion. Reaction was neutralized with triethylamine (0.896 mL, 6.089 mmol). Water was added into the reaction mixture, and diluted with ethyl acetate (15 mL). The organic layer was separated and the aqueous layer was washed ethyl acetate (10 mL×3). Combined organic layers were washed with brine and the organic layer was dried over anhydrous Na$_2$SO$_4$, concentrated, and purified by flash column chromatography to give (2S,3R, 4S,6R)-2-(((3S,6R,8R,9R,10R)-3-((S)-(benzyloxy)((S)-2,2-dimethyl-1,3-dioxolan-4-yl)methyl)-8-methoxy-4,6,8,10, 12,12-hexamethyl-11,13-dioxo-1-oxa-4-azacyclotridecan-9-yl)oxy)-4-(dimethylamino)-6-methyltetrahydro-2H-pyran-3-yl benzoate (410, 82%) as a white foaming solid.

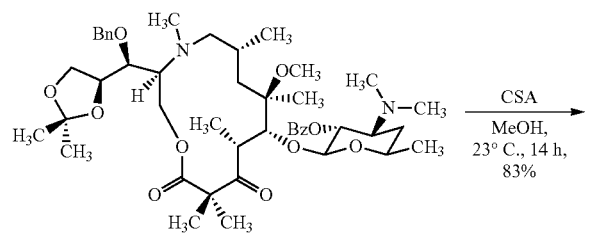

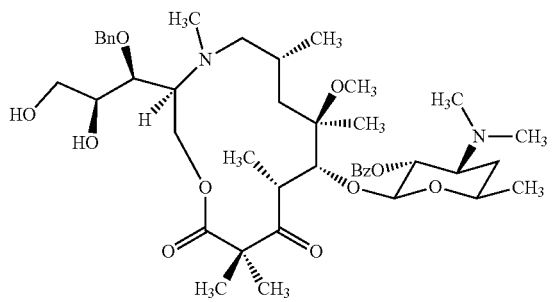

To a stirred solution of (2S,3R,4S,6R)-2-(((3S,6R,8R,9R, 10R)-3-((S)-(benzyloxy)((S)-2,2-dimethyl-1,3-dioxolan-4-yl)methyl)-8-methoxy-4,6,8,10,12,12-hexamethyl-11,13-dioxo-1-oxa-4-azacyclotridecan-9-yl)oxy)-4-(dimethylamino)-6-methyltetrahydro-2H-pyran-3-yl benzoate (410 mg, 0.497 mmol) in dry MeOH (10 mL), was added CSA (50 mg). The reaction was allowed to stir for 14 h. After completion of the reaction, methanol was removed and crude material was diluted with CH$_2$Cl$_2$ (10 mL) and quenched with water (5 mL). The organic layer was separated and the aqueous layer was extracted with CH$_2$Cl$_2$ (2×10 mL). The combined organic layers were dried over anhydrous Na$_2$SO$_4$. After concentrating, the residue was purified by silica gel chromatography using ethyl acetate/hexane as eluent to give a mixture of both isomers as a colorless oil. Further purification by flash chromatography on silica gel gave (2S,3R,4S,6R)-2-(((3S,6R,8R,9R,10R)-3-((1S,2S)-1-(benzyloxy)-2,3-dihydroxypropyl)-8-methoxy-4,6,8,10,12,12-hexamethyl-11,13-dioxo-1-oxa-4-azacyclotridecan-9-yl)oxy)-4-(dimethylamino)-6-methyltetrahydro-2H-pyran-3-yl benzoate (325 mg, 83%) as a white foaming solid.

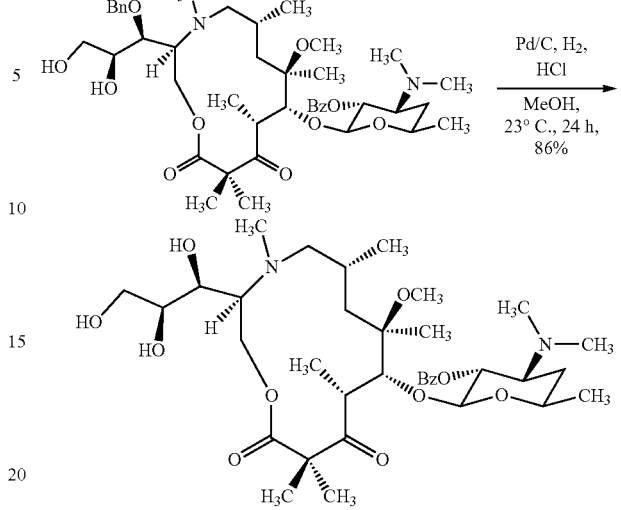

To a stirred solution of (2S,3R,4S,6R)-2-(((3S,6R,8R,9R, 10R)-3-((1S,2S)-1-(benzyloxy)-2,3-dihydroxypropyl)-8-methoxy-4,6,8,10,12,12-hexamethyl-11,13-dioxo-1-oxa-4-azacyclotridecan-9-yl)oxy)-4-(dimethylamino)-6-methyltetrahydro-2H-pyran-3-yl benzoate (50 mg, 0.064 mmol) in MeOH (3 mL) at 23° C., Pd/C (16.33 mg, 0.025 mmol) was added to the reaction mixture and HCl (0.1 mL, 0.763 mmol) was added to the reaction mixture. The reaction was purged with hydrogen for 10 mins, then the reaction was allowed to stir under 1 atmosphere of hydrogen for 24 h. The mixture was filtered through a small pad of celite and washed the cake many times with MeOH to ensure the complete recovery of product. After concentration, the crude material was diluted with CH$_2$Cl$_2$ and then it was quenched with saturated solution of NaHCO$_3$ (5 mL). The organic layer was separated and the aqueous layer was washed with CH$_2$Cl$_2$ (2×10 mL). The organic layer was concentrated to afford (2S,3R,4S,6R)-4-(dimethylamino)-2-(((3S,6R,8R, 9R,10R)-8-methoxy-4,6,8,10,12,12-hexamethyl-11,13-dioxo-3-((1S,2S)-1,2,3-trihydroxypropyl)-1-oxa-4-azacyclotridecan-9-yl)oxy)-6-methyltetrahydro-2H-pyran-3-yl benzoate (50 mg, crude product) as a white foaming solid.

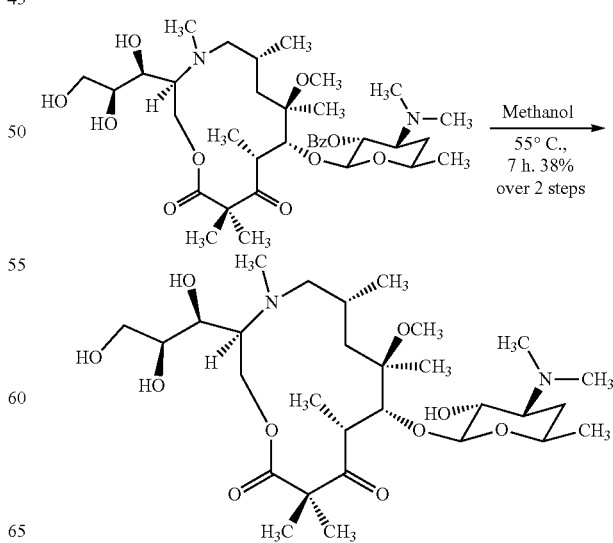

A stirred solution of (2S,3R,4S,6R)-4-(dimethylamino)-2-(((3S,6R,8R,9R,10R)-8-methoxy-4,6,8,10,12,12-hexamethyl-11,13-dioxo-3-((1S,2S)-1,2,3-trihydroxypropyl)-1-oxa-4-azacyclotridecan-9-yl)oxy)-6-methyltetrahydro-2H-pyran-3-yl benzoate (50 mg, 0.072 mmol) in MeOH (2 mL) was heated at 55° C. for 7 h. The mixture was concentrated and purified by HPLC to give ((3S,6R,8R,9R,10R)-9-(((2S,3R,4S,6R)-4-(dimethylamino)-3-hydroxy-6-methyltetrahydro-2H-pyran-2-yl)oxy)-8-methoxy-4,6,8,10,12,12-hexamethyl-3-((1S,2S)-1,2,3-trihydroxypropyl)-1-oxa-4-azacyclotridecane-11,13-dione (Compound 201) (14 mg, 38%) as a white solid. $^1$H NMR (600 MHz, cd$_3$od) δ 8.47 (s, 3H), 5.06-4.94 (m, 1H), 4.56 (ddd, 1H), 4.44 (t, 1H), 4.33-4.27 (m, 2H), 4.27-4.20 (m, 2H), 3.89 (s, 3H), 3.79-3.71 (m, 2H), 3.69 (dd, 2H), 3.66-3.61 (m, 1H), 3.45 (dt, 2H), 3.43-3.35 (m, 2H), 3.35-3.26 (m, 3H), 3.25-3.14 (m, 1H), 3.07 (t, 3H), 2.81 (s, 6H), 2.26 (s, 2H), 2.08-1.99 (m, 2H), 1.81 (dd, 2H), 1.65-1.58 (m, 5H), 1.58-1.48 (m, 6H), 1.42 (dd, 6H), 1.38-1.29 (m, 6H), 1.14-0.94 (m, 3H).

Scheme 14.

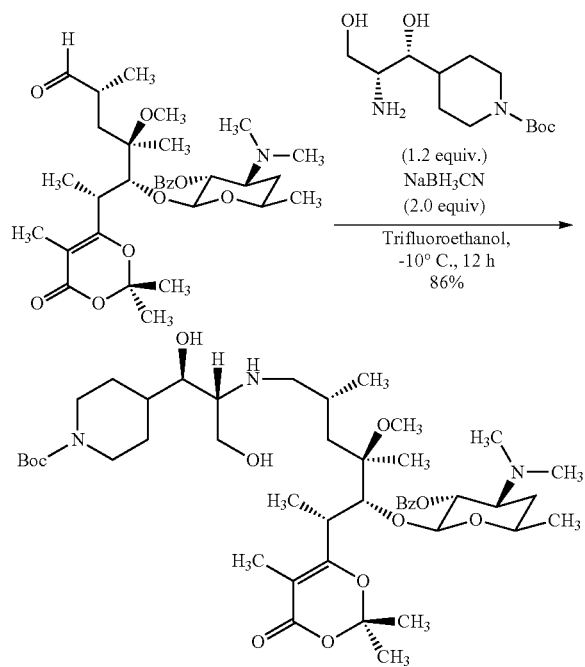

To a stirred solution of tert-butyl 4-((1R,2R)-2-amino-1,3-dihydroxypropyl)piperidine-1-carboxylate (117) (0.230 g, 0.838 mmol) and sodium cyanoborohydride (0.079 g, 1.257 mmol) in trifluoroethanol (5 mL) at −15° C. was slowly added (2S,3R,4S,6R)-4-(dimethylamino)-2-(((2R,3R,4R,6R)-4-methoxy-4,6-dimethyl-7-oxo-2-(2,2,5-trimethyl-4-oxo-4H-1,3-dioxin-6-yl)heptan-3-yl)oxy)-6-methyltetrahydro-2H-pyran-3-yl benzoate (0.495 g, 0.838 mmol) in a solution of trifluoroethanol (10 mL). The reaction mixture was stirred for 6 h. The reaction was diluted with CH$_2$Cl$_2$ (10 mL) and neutralized with cold water (10 mL) at the same temperature. The organic layer was separated, and the aqueous layer was washed CH$_2$C$_2$ (15 mL×3). The combined organic layer was washed with brine and organic layer was dried over anhydrous Na$_2$SO$_4$, concentrated under vacuum, and purified by flash column chromatography to give tert-butyl 4-((1R,2R)-2-(((2R,4R,5R,6R)-5-(((2S,3R,4S,6R)-3-(benzoyloxy)-4-(dimethylamino)-6-methyltetrahydro-2H-pyran-2-yl)oxy)-4-methoxy-2,4-di methyl-6-(2,2,5-trimethyl-4-oxo-4H-1,3-dioxin-6-yl)heptyl)amino)-1,3-dihydroxypropyl) piperidine-1-carboxylate (0.612 g, 86%) as a white foaming solid.

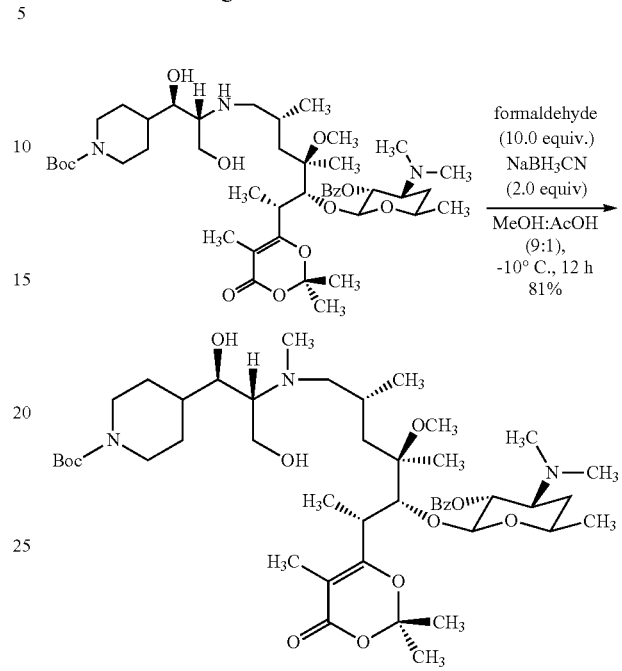

To a stirred solution of tert-butyl 4-((1R,2R)-2-(((2R,4R,5R,6R)-5-(((2S,3R,4S,6R)-3-(benzoyloxy)-4-(dimethylamino)-6-methyltetrahydro-2H-pyran-2-yl)oxy)-4-methoxy-2,4-dimethyl-6-(2,2,5-trimethyl-4-oxo-4H-1,3-dioxin-6-yl)heptyl)amino)-1,3-dihydroxypropyl) piperidine-1-carboxylate 0.300 g, 0.354 mmol) and sodium cyanoborohydride (44.5 mg, 0.707 mmol) in trifluoroethanol (10 mL) at 0° C. was slowly added formaldehyde (1.6 mL 30% solution in MeOH, 3.54 mmol). The solvent was concentrated in vacuo and the reaction was diluted with CH$_2$Cl$_2$ (10 mL) and neutralized with cold water (10 mL) at the same temperature. The organic layer was separated and the aqueous layer was washed with CH$_2$Cl$_2$ (10 mL×3). The combined organic layers were washed with brine, dried over anhydrous Na$_2$SO$_4$, concentrated under vacuum, and purified with flash column chromatography to give tert-butyl 4-((1R,2R)-2-(((2R,4R,5R,6R)-5-(((2S,3R,4S,6R)-3-(benzoyloxy)-4-(dimethylamino)-6-methyltetrahydro-2H-pyran-2-yl)oxy)-4-methoxy-2,4-dimethyl-6-(2,2,5-trimethyl-4-oxo-4H-1,3-dioxin-6-yl)heptyl) (methyl)amino)-1,3-dihydroxypropyl)piperidine-1-carboxylate (248 mg, 81%) as a white foaming solid.

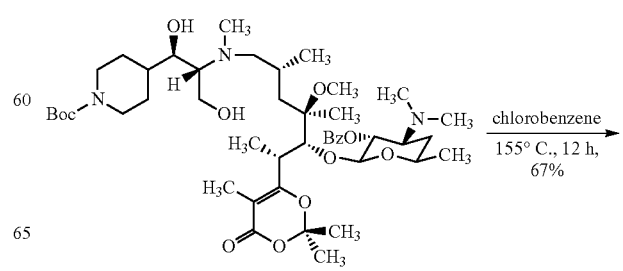

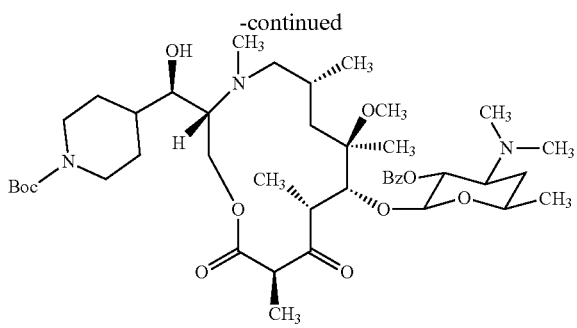

tert-Butyl 4-((1R,2R)-2-(((2R,4R,5R,6R)-5-(((2S,3R,4S,6R)-3-(benzoyloxy)-4-(dimethylamino)-6-methyltetrahydro-2H-pyran-2-yl)oxy)-4-methoxy-2,4-dimethyl-6-(2,2,5-trimethyl-4-oxo-4H-1,3-dioxin-6-yl)heptyl)(methyl)amino)-1,3-dihydroxypropyl)piperidine-1-carboxylate (0.248 g, 0.288 mmol) was azeotropically dried with toluene four times under argon and placed under high vacuum overnight, and then transferred with chlorobenzene (525 mL) to a dry 1000 mL round bottom flask at rt (flame dried prior to addition). The reaction solution was degassed with argon for 30 min and fitted with a reflux condenser. Vacuum was applied for 30 seconds and released with argon (repeated 3 times). The reaction mixture was heated to 150° C. in an oil bath for 12 h. The reaction was monitored by LCMS which showed the 100% conversion to the product. The reaction was allowed to cool to room temperature and chlorobenzene was distilled off at high vacuum. The crude material was purified with flash column chromatography to give tert-butyl 4-((R)-((3R,6R,8R,9R,10R,12R)-9-(((2S,3R,4S,6R)-3-(benzoyloxy)-4-(dimethylamino)-6-methyltetrahydro-2H-pyran-2-yl)oxy)-8-methoxy-4,6,8,10,12-pentamethyl-11,13-dioxo-1-oxa-4-azacyclotridecan-3-yl)(hydroxy)methyl)piperidine-1-carboxylate (0.144 g, 62%) as a white foaming solid.

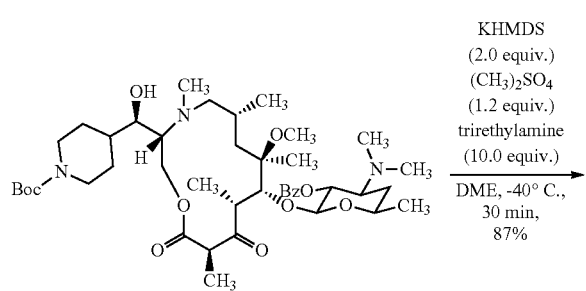

To a stirred solution of tert-butyl 4-((R)-((3R,6R,8R,9R,10R,12R)-9-(((2S,3R,4S,6R)-4-(dimethylamino)-3-hydroxy-6-methyltetrahydro-2H-pyran-2-yl)oxy)-8-methoxy-4,6,8,10,12-pentamethyl-11,13-dioxo-1-oxa-4-azacyclotridecan-3-yl)(hydroxy)methyl)piperidine-1-carboxylate (0.180 g, 0.224 mmol) in dimethoxyethane (7 mL) at −40° C. was slowly added KHMDS (269 µl, 0.269 mmol) and stirred for 15 mins. Dimethyl sulfate (42.5 µl, 0.448 mmol) was added and stirred for another 15 mins. Reaction was monitored by LCMS which shows complete conversion. Reaction was neutralized with triethylamine (306 µl, 2.89 mmol) and added water into the reaction mixture, and diluted with ethyl acetate (15 mL). Organic layer was separated and aqueous layer was washed ethyl acetate (10 mL×3). Combined organic layers were washed with brine and organic layer was dried over anhydrous $Na_2SO_4$, concentrated under vacuum, and purified by flash column chromatography to give tert-butyl 4-((R)-((3R,6R,8R,9R,10R)-9-(((2S,3R,4S,6R)-4-(dimethylamino)-3-hydroxy-6-methyltetrahydro-2H-pyran-2-yl)oxy)-8-methoxy-4,6,8,10,12,12-hexamethyl-11,13-dioxo-1-oxa-4-azacyclotridecan-3-yl)(hydroxy)methyl)piperidine-1-carboxylate (165 mg, 87%) as a white foaming solid.

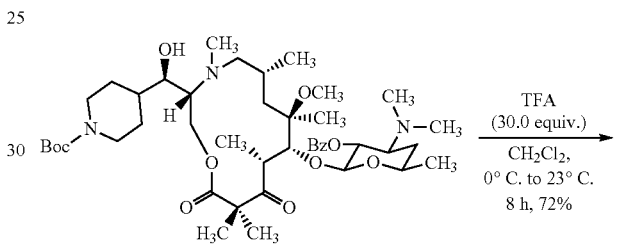

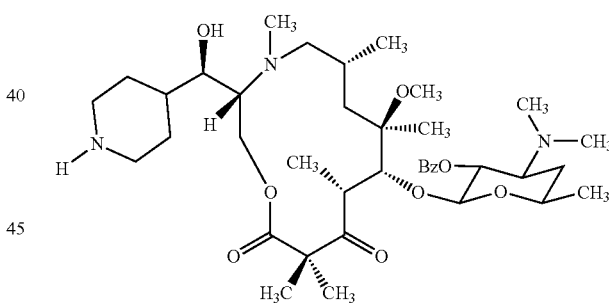

To a solution of tert-butyl 4-((R)-((3R,6R,8R,9R,10R)-9-(((2S,3R,4S,6R)-4-(dimethylamino)-3-hydroxy-6-methyltetrahydro-2H-pyran-2-yl)oxy)-8-methoxy-4,6,8,10,12,12-hexamethyl-11,13-dioxo-1-oxa-4-azacyclotridecan-3-yl)(hydroxy)methyl)piperidine-1-carboxylate (165 mg, 0.202 mmol) in $CH_2Cl_2$ at 0° C. was added 2,2,2-trifluoroacetic acid (463 µl, 6.05 mmol) and was stirred for 12 h. After completion of reaction 10 mL of $CH_2Cl_2$ and 10 mL sat. aq. of $NaHCO_3$ were added to the reaction mixture and vigorous stirring was kept for 5 mins. Organic layer was separated and aqueous phase was extracted with $CH_2Cl_2$ (3×10 mL). Organic layers were assembled, dried over anhydrous $Na_2SO_4$ and concentrated under reduced pressure to afford (2S,3R,4S,6R)-4-(dimethylamino)-2-(((3R,6R,8R,9R,10R)-3-((R)-hydroxy(piperidin-4-yl)methyl)-8-methoxy-4,6,8,10,12,12-hexamethyl-11,13-dioxo-1-oxa-4-azacyclotridecan-9-yl)oxy)-6-methyltetrahydro-2H-pyran-3-yl benzoate (114.8 mg. 79%) as a white foaming solid.

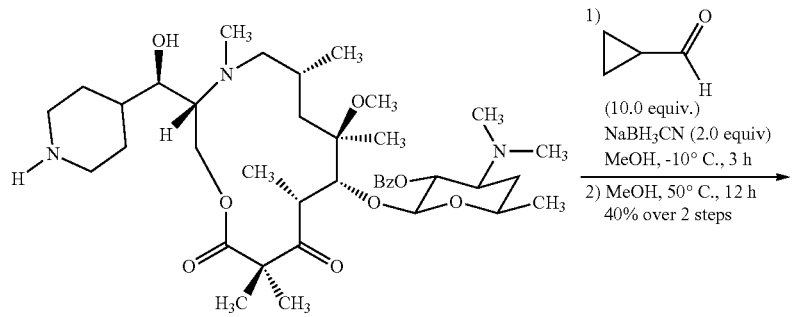

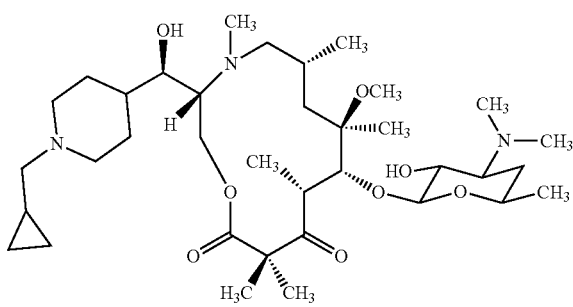

To a stirred solution of (2S,3R,4S,6R)-4-(dimethylamino)-2-(((3R,6R,8R,9R,10R)-3-((R)-hydroxy(piperidin-4-yl)methyl)-8-methoxy-4,6,8,10,12,12-hexamethyl-11,13-dioxo-1-oxa-4-azacyclotridecan-9-yl)oxy)-6-methyltetrahydro-2H-pyran-3-yl benzoate (0.300 g, 0.354 mmol) and sodium cyanoborohydride (25 mg, 0.707 mmol) in methanol (2 mL) at 0° C. was slowly added cyclopropanecarbaldehyde (4.5 mL, 3.54 mmol). The reaction was stirred for 3 h then concentrated and the reaction was diluted with CH$_2$Cl$_2$ (5 mL) and neutralized with cold water (5 mL) at the same temperature. Organic layer was separated, and aqueous layer was washed CH$_2$Cl$_2$ (5 mL×3). Combined organic layer was washed with brine and organic layer was dried over anhydrous Na$_2$SO$_4$, and concentrated under vacuum to give tert-butyl 4-((1R,2R)-2-(((2R,4R,5R,6R)-5-(((2S,3R,4S,6R)-3-(benzoyloxy)-4-(dimethylamino)-6-methyltetrahydro-2H-pyran-2-yl)oxy)-4-methoxy-2,4-dimethyl-6-(2,2,5-trimethyl-4-oxo-4H-1,3-dioxin-6-yl)heptyl)(methyl)amino)-1,3-dihydroxypropyl)piperidine-1-carboxylate (17 mg) as a white foaming solid. The benzoyl group was removed by methanolysis under heating condition at 55° C. in CH$_3$OH for 7 h. Reaction was monitored by LCMS which shows complete conversion to the product. Methanol was concentrated under vacuum, and compound was purified with HPLC to get (3R,6R,8R,9R,10R)-3-((R)-(1-(cyclopropylmethyl)piperidin-4-yl)(hydroxy)methyl)-9-(((2S,3R,4S,6R)-4-(dimethylamino)-3-hydroxy-6-methyltetrahydro-2H-pyran-2-yl)oxy)-8-methoxy-4,6,8,10,12,12-hexamethyl-1-oxa-4-azacyclotridecane-11,13-dione (Compound 23) (9.2 mg, 40% over 2 steps) as a white solid of its formate salt. H NMR (600 MHz, Methanol-d$_4$) δ 8.45 (s, 3H), 4.71 (s, 1H), 4.46 (dd, 1H), 4.33-4.17 (n, 1H), 4.08-3.84 (m, 3H), 3.79-3.61 (m, 4H), 3.46 (dd, 2H), 3.44-3.39 (m, 2H), 3.23 (t, 2H), 3.06 (dd, 3H), 3.02-2.90 (m, 6H), 2.83 (d, 6H), 2.60-2.51 (m, 2H), 2.23 (s, 1H), 2.08-1.92 (m, 2H), 1.86 (dd, 2H), 1.80 (d, 2H), 1.71 (d, 1H), 1.57-1.45 (m, 3H), 1.45-1.36 (m, 9H), 1.33 (t, 3H), 1.11 (ddd, 3H), 0.75 (d, 2H), 0.40 (d, 2H)

The following compounds were prepared using synthetic procedures analogous to those described above in Scheme 14 employing intermediate I17 or I18.

| Compound | Characterization |
|---|---|
| ![structure] | $^1$H NMR (600 MHz, Methanol-d$_4$) δ 8.52 (s, 3H), 4.43 (s, 1H), 4.26 (s, 1H), 4.13-3.87 (m, 2H), 3.67 (d, 2H), 3.52 (s, 3H), 3.46-3.36 (m, 1H), 3.21 (s, 3H), 3.10 (d, 1H), 3.02-2.80 (m, 2H), 2.73 (s, 6H), 2.53 (s, 2H), 2.03-1.94 (m, 6H), 1.94-1.77 (m, 2H), 1.70 (s, 3H), 1.51-1.40 (m, 10H), 1.37 (s, 6H), 1.31 (d, 6H), 1.09 (s, 6H), 0.91 (t, 3H). |

| Compound | Characterization |
|---|---|
| 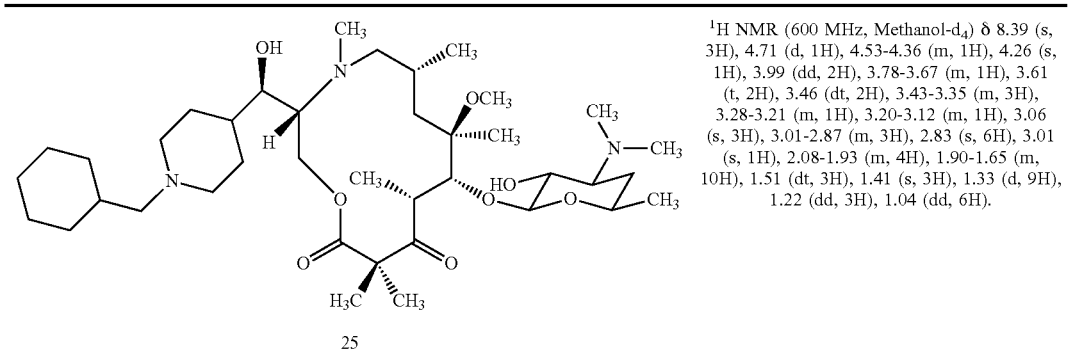<br>25 | $^1$H NMR (600 MHz, Methanol-d$_4$) δ 8.39 (s, 3H), 4.71 (d, 1H), 4.53-4.36 (m, 1H), 4.26 (s, 1H), 3.99 (dd, 2H), 3.78-3.67 (m, 1H), 3.61 (t, 2H), 3.46 (dt, 2H), 3.43-3.35 (m, 3H), 3.28-3.21 (m, 1H), 3.20-3.12 (m, 1H), 3.06 (s, 3H), 3.01-2.87 (m, 3H), 2.83 (s, 6H), 3.01 (s, 1H), 2.08-1.93 (m, 4H), 1.90-1.65 (m, 10H), 1.51 (dt, 3H), 1.41 (s, 3H), 1.33 (d, 9H), 1.22 (dd, 3H), 1.04 (dd, 6H). |
| 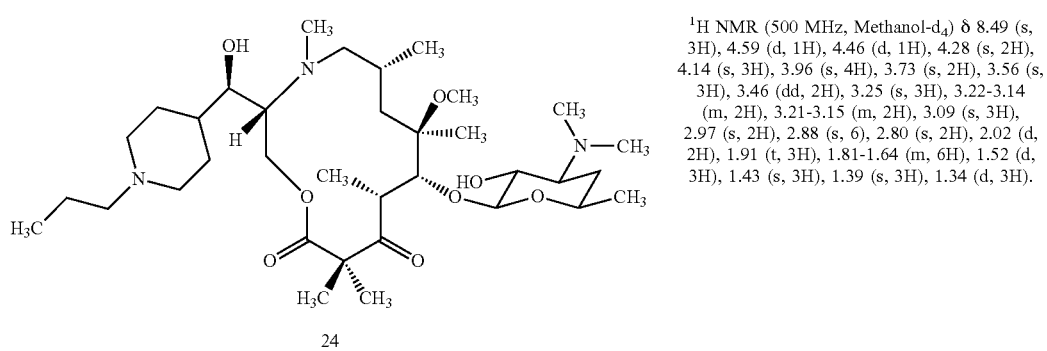<br>24 | $^1$H NMR (500 MHz, Methanol-d$_4$) δ 8.49 (s, 3H), 4.59 (d, 1H), 4.46 (d, 1H), 4.28 (s, 2H), 4.14 (s, 3H), 3.96 (s, 4H), 3.73 (s, 2H), 3.56 (s, 3H), 3.46 (dd, 2H), 3.25 (s, 3H), 3.22-3.14 (m, 2H), 3.21-3.15 (m, 2H), 3.09 (s, 3H), 2.97 (s, 2H), 2.88 (s, 6), 2.80 (s, 2H), 2.02 (d, 2H), 1.91 (t, 3H), 1.81-1.64 (m, 6H), 1.52 (d, 3H), 1.43 (s, 3H), 1.39 (s, 3H), 1.34 (d, 3H). |
| 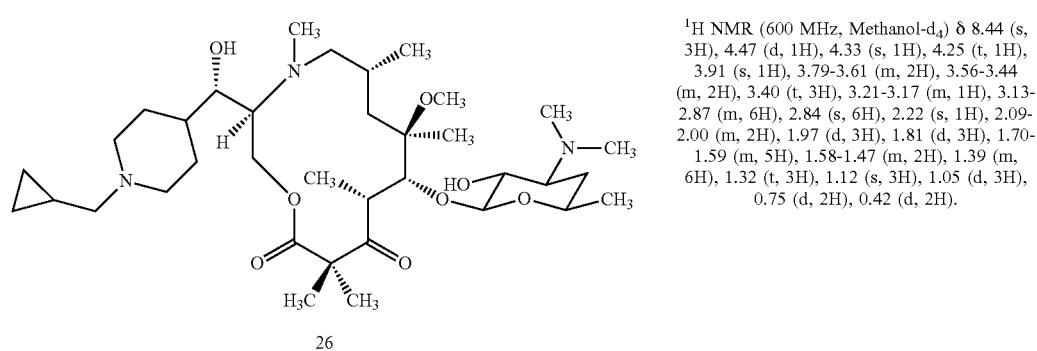<br>26 | $^1$H NMR (600 MHz, Methanol-d$_4$) δ 8.44 (s, 3H), 4.47 (d, 1H), 4.33 (s, 1H), 4.25 (t, 1H), 3.91 (s, 1H), 3.79-3.61 (m, 2H), 3.56-3.44 (m, 2H), 3.40 (t, 3H), 3.21-3.17 (m, 1H), 3.13-2.87 (m, 6H), 2.84 (s, 6H), 2.22 (s, 1H), 2.09-2.00 (m, 2H), 1.97 (d, 3H), 1.81 (d, 3H), 1.70-1.59 (m, 5H), 1.58-1.47 (m, 2H), 1.39 (m, 6H), 1.32 (t, 3H), 1.12 (s, 3H), 1.05 (d, 3H), 0.75 (d, 2H), 0.42 (d, 2H). |
| 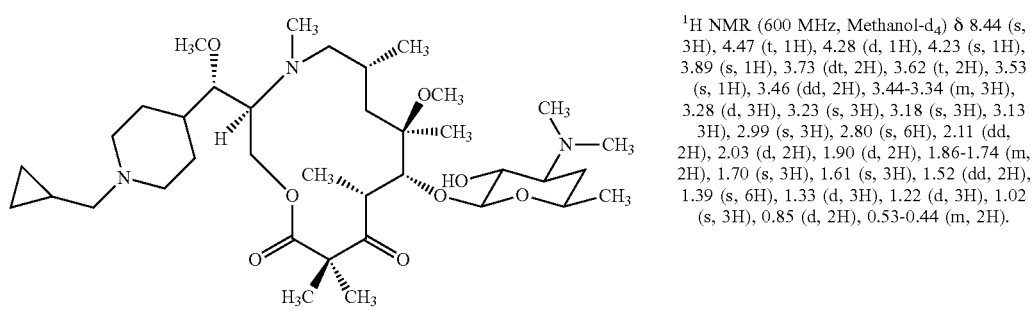<br>28 | $^1$H NMR (600 MHz, Methanol-d$_4$) δ 8.44 (s, 3H), 4.47 (t, 1H), 4.28 (d, 1H), 4.23 (s, 1H), 3.89 (s, 1H), 3.73 (dt, 2H), 3.62 (t, 2H), 3.53 (s, 1H), 3.46 (dd, 2H), 3.44-3.34 (m, 3H), 3.28 (d, 3H), 3.23 (s, 3H), 3.18 (s, 3H), 3.13 3H), 2.99 (s, 3H), 2.80 (s, 6H), 2.11 (dd, 2H), 2.03 (d, 2H), 1.90 (d, 2H), 1.86-1.74 (m, 2H), 1.70 (s, 3H), 1.61 (s, 3H), 1.52 (dd, 2H), 1.39 (s, 6H), 1.33 (d, 3H), 1.22 (d, 3H), 1.02 (s, 3H), 0.85 (d, 2H), 0.53-0.44 (m, 2H). |

-continued

| Compound | Characterization |
|---|---|
| 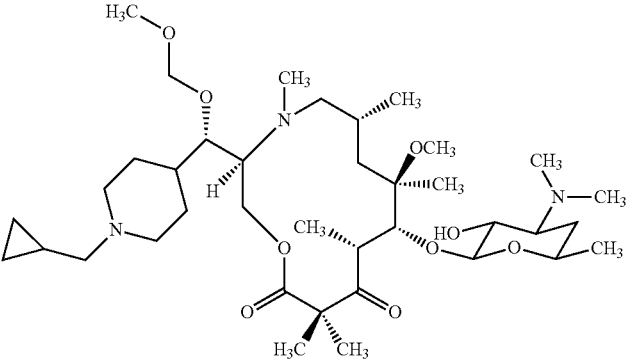<br>29 | ¹H NMR (600 MHz, Methanol-d₄) δ 8.45 (s, 3H), 4.80 (s, 2H), 4.72 (s, 1H), 4.48 (d, 1H), 4.36-4.29 (m, 1H), 4.25 (d, 1H), 3.92 (s, 1H), 3.81-3.69 (m, 2H), 3.66 (d, 2H), 3.64 (s, 3H), 3.52 (s, 1H), 3.45 (dd, 2H), 3.43-3.33 (m, 3H), 3.25 (d, 1H), 3.00 (s, 3H), 2.92 (d, 2H), 2.81 (s, 6H), 2.19 (s, 1H), 2.03 (d, 3H), 1.90 (d, 2H), 1.78 (d, 2H), 1.69 (s, 1H), 1.62 (s, 3H), 1.52 (dd, 2H), 1.39 (s, 6H), 1.33 (d, 3H), 1.16 (s, 2H), 1.04 (d, 3H), 0.82 (d, 2H), 0.47 (dd, 2H). |
| 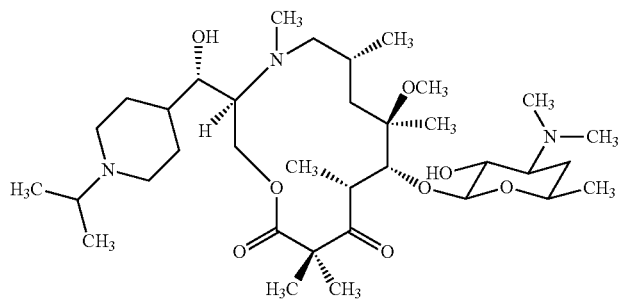<br>27 | ¹H NMR (600 MHz, Methanol-d4) δ 8.44 (s, 3H), 4.46 (dd, 1H), 4.33 (d, 1H), 4.26 (d, 1H), 3.92 (s, 1H), 3.74 (dd, 1H), 3.57-3.44 (m, 4H), 3.44 -3.36 (m, 2H), 3.05 (t, 2H), 2.99 (d, 3H), 2.94 (d, 2H), 2.82 (s, 6H), 2.22 (s, 1H), 2.07-2.01 (m, 3H), 1.96 (d, 2H), 1.90-1.74 (m, 2H), 1.68 (d, 2H), 1.63 (s, 3H), 1.53 (dd, 3H), 1.40 (s, 3H), 1.39 (s, 6H), 1.35 (d, 6H), 1.33 (d, 6H), 1.05 (d, 3H). |

The following compounds were prepared using synthetic procedures analogous to those described above for the preparation of S1-5-I1-1 in Scheme 1 employing the indicated amino alcohol. The syntheses were completed by deprotection of the benzoyl group as described above.

| Compound | Amino alcohol | Characterization |
|---|---|---|
| 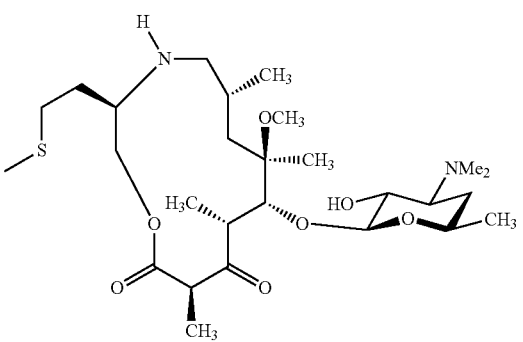<br>202 | 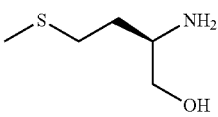 | ¹H NMR (600 MHz, Methanol-d4) δ 8.43 (s, 2H), 4.62 (td, 1H), 4.44 (dd, 1H), 4.29-4.20 (m, 2H), 3.72 (dqd, 1H), 3.57 (dtt, 1H), 3.54-3.40 (m, 3H), 3.40-3.32 (m, 1H), 3.27-3.19 (m, 1H), 3.00 (s, 1H), 2.91 (d, 2H), 2.81 (s, 5H), 2.75-2.65 (m, 2H), 2.61 (dt, 1H), 2.12 (d, J =1.3 Hz, 2H), 2.10-1.98 (m, 3H), 1.96-1.87 (m, 1H), 1.80-1.70 (m, 2H), 1.56-1.46 (m, 2H), 1.36 (d, 3H), 1.34-1.27 (m, 8H), 1.06 (d, 3H). |

-continued

| Compound | Amino alcohol | Characterization |
|---|---|---|
| 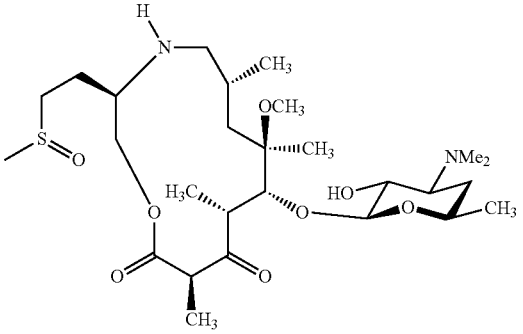<br>203 | 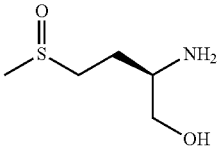 | ¹H NMR (600 MHz, Methanol-d4) δ 8.45 (s, 4H), 4.58 (s, 1H), 4.42 (dd, 2H), 4.39-4.29 (m, 3H), 4.21 (dd, 2H), 3.87 (s, 1H), 3.74-3.69 (m, 2H), 3.47-3.42 (m, 2H), 3.35 (s, 1H), 3.04-2.96 (m, 3H), 2.88 (d, 3H), 2.79 (s, 5H), 2.69 (d, 1H), 2.67 (d, 3H), 2.35 (d, 1H), 2.15 (s, 1H), 2.12 (d, 1H), 2.09 (s, 1H), 2.01 (d, 3H), 1.93 (s, 1H), 1.82 (s, 1H), 1.71-1.57 (m,4H), 1.56-1.44 (m, 4H), 1.38 (d, 2H), 1.35 (s, 1H), 1.34-1.25 (m, 14H), 1.10 (t, 2H), 1.01 (d, 3H). |
| 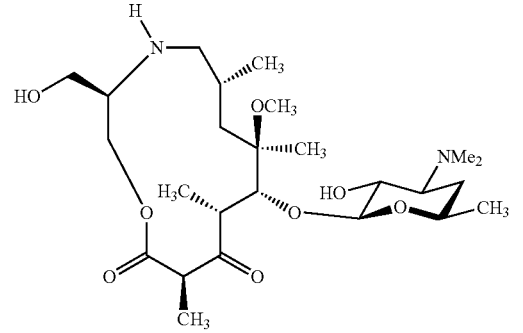<br>204 | 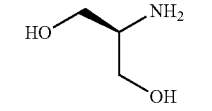 | ¹H NMR (600 MHz, Methanol-d4) δ 8.49 (s, 1H), 4.53 (dd, 1H), 4.43 (dd, 1H), 4.40-4.31 (m, 1H), 4.24 (d, 1H), 3.86-3.78 (m, 1H), 3.78-3.68 (m, 2H), 3.52-3.45 (m, 2H), 3.44 (d, 1H), 3.36 (ddd, 1H), 3.18 (dd, 1H), 2.91 (s, 2H), 2.83 (d, 1H), 2.79 (s, 5H), 2.68 (t, 1H), 2.02 (ddd, 2H), 1.79-1.67 (m, 2H), 1.56-1.45 (m, 2H), 1.38-1.24 (m, 13H), 1.09-1.03 (m, 3H). |
| 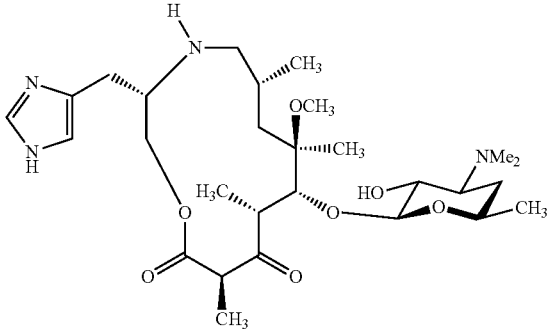<br>205 | 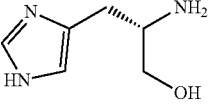 | ¹H NMR (600 MHz, Methanol-d4) δ 8.34 (s, 1H), 7.73 (d, 1H), 7.06 (s, 1H), 4.47-4.37 (m, 2H), 4.32 (ddd, 1H), 4.13 (d, 1H), 3.94 (q, 1H), 3.73 (ddd, 2H), 3.57 (dq, 1H), 3.45 (dd, 1H), 3.42-3.36 (m, 1H), 3.22-3.17 (m, 1H), 3.06-2.88 (m, 4H), 2.82 (d, 7H), 2.13 (s, 1H), 2.06-2.00 (m, 1H), 1.73 (dd, 1H), 1.65 (dd, 1H), 1.56-1.45 (m, 2H), 1.36-1.29 (m, 5H), 1.29-1.23 (m, 5H), 1.09 (d, 3H). |
| 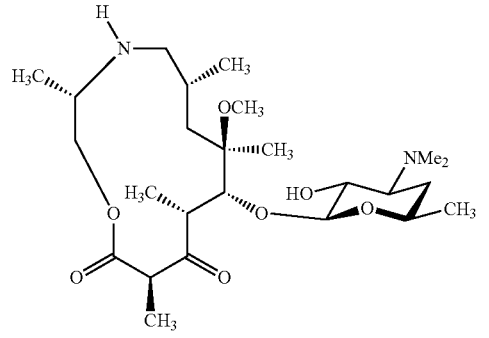<br>206 | 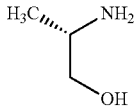 | ¹H NMR (600 MHz, Methanol-d4) δ 8.45 (s, 2H), 5.48 (s, 1H), 4.47-4.36 (m, 2H), 4.30 (ddd, 1H), 4.14 (d, 1H), 3.75-3.68 (m, 1H), 3.61-3.53 (m, 2H), 3.43 (dd, 1H), 3.37-3.32 (m, 1H), 3.06-2.99 (m, 1H), 2.94-2.84 (m, 3H), 2.78 (s, 5H), 2.11-2.05 (m, 1H), 2.01 (ddd, 1H), 1.72-1.62 (m, 214), 1.49 (td, 2H), 1.37-1.23 (m, 14H), 1.14-1.05 (m, 3H). |

| Compound | Amino alcohol | Characterization |
|---|---|---|
| 207 | H₃C⧫NH₂, OH | ¹H NMR (600 MHz, Methanol-d4) δ 8.43 (s, 2H), 4.49-4.38 (m, 2H), 4.24-4.16 (m, 2H), 3.70 (dqd, 1H), 3.55 (tt, 1H), 3.48-3.40 (m, 2H), 3.40-3.33 (m, 1H), 3.21 (dt, 1H), 2.89 (d, 2H), 2.78 (s, 5H), 2.65 (dd, 1H), 2.00 (ddd, 2H), 1.72-1.68 (m, 1H), 1.54-1.50 (m, 1H), 1.50-1.44 (m, 1H), 1.41 (d, 1H), 1.36-1.24 (m, 12H), 1.04 (d, 3H). |
| 208 | Ph-CH₂-CH(NH₂)-CH₂OH | ¹H NMR (600 MHz, Methanol-d4) δ 8.49 (s, 3H), 7.35 (t, 2H), 7.32-7.25 (m, 3H), 4.42 (d, 1H), 4.30-4.22 (m, 2H), 4.11 (d, 1H), 3.91 (q, 1H), 3.74-3.68 (m, 1H), 3.64 (s, 1H), 3.58-3.50 (m, 1H), 3.43 (dd, 1H), 3.24-3.18 (m, 1H), 3.07 (dd, 1H), 2.99 (d, 1H), 2.81 (d, 3H), 2.76 (s, 5H), 2.02-1.99 (m, 1H), 1.73 (dd, 1H), 1.58-1.51 (m, 1H), 1.51-1.42 (m, 2H), 1.34-1.27 (m, 7H), 1.26 (d, 2H), 1.22 (d, 2H), 1.07-1.00 (m, 3H). |
| 209 | HO-C₆H₄-CH₂-CH(NH₂)-CH₂OH | ¹H NMR (600 MHz, Methanol-d4) δ 8.42 (s, 2H), 7.15-7.07 (m, 2H), 6.81-6.74 (m, 2H), 4.44 (d, 1H), 4.42-4.34 (m, 1H), 4.25 (ddd, 1H), 4.12 (d, 1H), 3.76-3.68 (m, 2H), 3.54 (ddd, 1H), 3.48-3.32 (m, 3H), 3.08 (dt, 1H), 3.04-2.97 (m, 1H), 2.88 (dd, 1H), 2.85-2.79 (m, 7H), 2.76 (dd, 1H), 2.02 (q, 2H), 1.72 (dd, 1H), 1.62 (dt, 1H), 1.56-1.44 (m, 2H), 1.36-1.24 (m, 9H), 1.23 (s, 2H), 1.13-1.03 (m, 3H). |
| 210 | H₃C⧫NH₂, H₃C-CH₂-CH(OH)-CH(NH₂)-CH₃ | ¹H NMR (600 MHz, Methanol-d4) δ 8.49 (s, 2H), 5.49 (s, 1H), 4.99 (dt, 1H), 4.41 (d, 1H), 4.12 (d, 1H), 4.00 (q, 1H), 3.75-3.67 (m, 2H), 3.67-3.63 (m, 1H), 3.47-3.30 (m, 10H), 3.08 (dd, 1H), 2.83 (dd, 1H), 2.78 (d, 7H), 2.04-1.98 (m, 2H), 1.75 (ddt, 2H), 1.66 (ddt, 1H), 1.50 (td, 1H), 1.42 (dd, 1H), 1.35-1.24 (m, 13H), 1.05 (d, 3H), 0.97 (t, 3H). |

-continued
| Compound | Amino alcohol | Characterization |
|---|---|---|
| 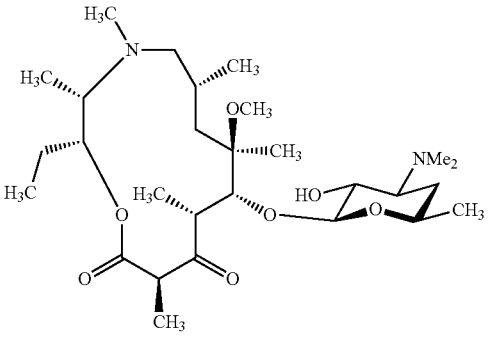<br>211 | 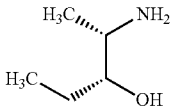 | ¹H NMR (600 MHz, Methanol-d4) δ 8.50 (s, 2H), 5.49 (s, 2H), 4.40 (d, 1H), 3.71 (ddt, 2H), 3.43 (dd, 1H), 3.33 (d, 11H), 2.88 (s, 2H), 2.76 (s, 6H), 2.00 (ddd, 1H), 1.81 (s, 1H), 1.74 (s, 1H), 1.49 (td, 3H), 1.39 (s, 2H), 1.33-1.25 (m, 9H), 1.05 (s, 2H), 0.96 (t, 3H). |
| 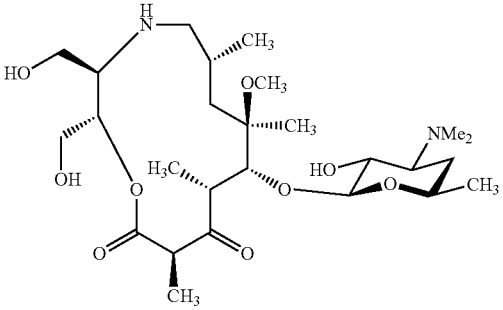<br>212 | 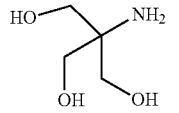 | ¹H NMR (600 MHz, Methanol-d4) δ 8.49 (s, 2H), 5.13 (d, 1H), 4.48-4.41 (m, 2H), 4.07 (d, 1H), 3.83 (dd, 2H), 3.77-3.57 (m, 7H), 3.48-3.40 (m, 2H), 3.37-3.32 (m, 2H), 3.09-3.02 (m, 2H), 2.96 (d, 4H), 2.90 (d, 1H), 2.77 (s, 6H), 2.03-1.97 (m, 2H), 1.79-1.65 (m, 3H), 1.48 (t, 4H), 1.37-1.26 (m, 12H), 1.07 (d, 3H). |
| 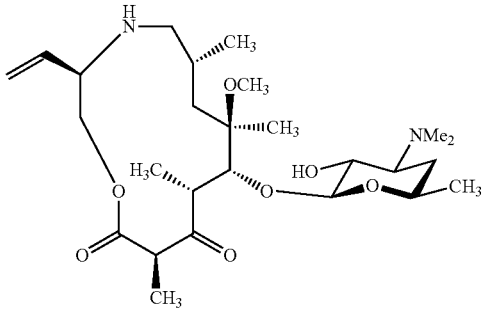<br>211 | 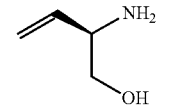 | ¹H NMR (600 MHz, Methanol-d4) δ 8.35 (s, 2H), 5.78 (dt, 1H), 5.62-5.55 (m, 2H), 4.46-4.39 (m, 2H), 4.39-4.32 (m, 1H), 4.15 (d, 1H), 3.97 (p, 1H), 3.72 (d, 1H), 3.60-3.52 (m, 1H), 3.45 (dd, 1H), 3.39 (dd, 1H), 3.36-3.31 (m, 1H), 2.95-2.90 (m, 1H), 2.87 (d, 2H), 2.81 (s, 4H), 2.78 (d, 1H), 1.70 (dd, 1H), 1.59 (d, 1H), 1.52 (q, 1H), 1.37-1.30 (m, 5H), 1.30-1.25 (m, 5H), 1.04 (d, 3H). |
| 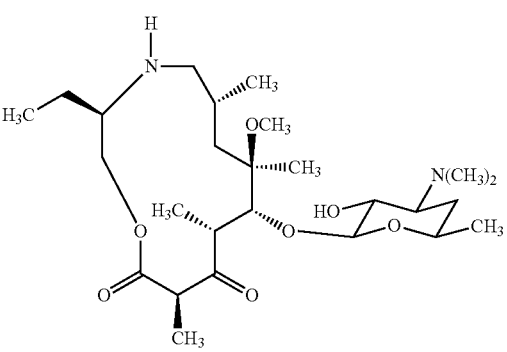<br>215 | 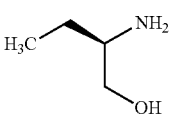 | MS (ES-API, m/z): [M + 2H]²⁺ = 251.3 |

-continued

| Compound | Amino alcohol | Characterization |
|---|---|---|
| 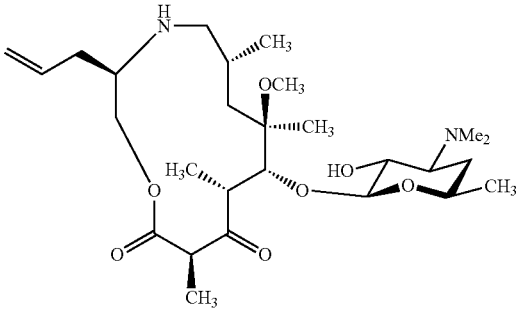 222 | 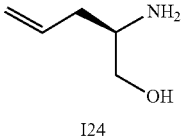 I24 | MS (ES-API, m/z): [M + 2H]$^{2+}$ = 257.3 |

Scheme 15.

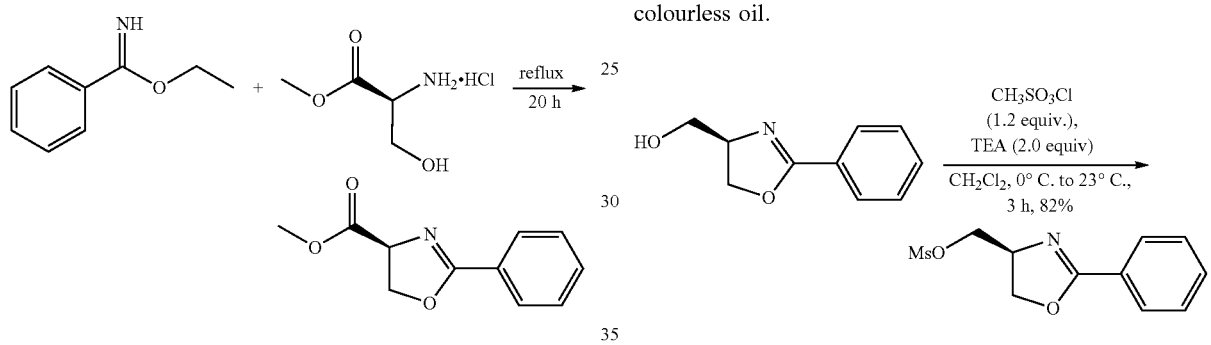

To a solution of L-serine methyl ester hydrochloride (10 g, 52.6 mmol) in 1,2-dichloroethane (100 mL) was added ethyl benzimidate (8.5 g, 62.2 mmol). The mixture was heated to reflux for 20 hours, cooled, filtered through diatomaceous earth, and concentrated to dryness to achieve methyl (S)-2-phenyl-4,5-dihydrooxazole-4-carboxylate (10.5 g, 82%) as a semi solid material.

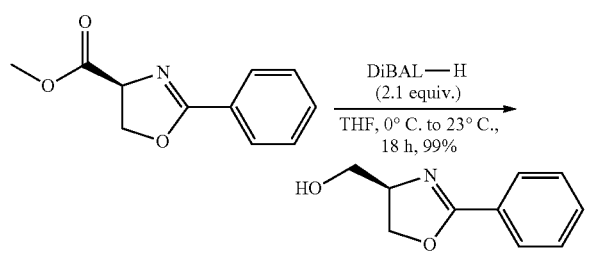

To the stirred solution of methyl (S)-2-phenyl-4,5-dihydrooxazole-4-carboxylate (10.5 g, 51.2 mmol) in THF (150 mL) at −78° C., was added DIBAL-H (14.55 ml, 102 mmol) slowly, and then stirred overnight at room temperature. Reaction was monitored by TLC which shows complete reduction of ester into aldehyde. Reaction was neutralized with saturated solution of sodium potassium tartatrate (50 ml) at same temperature, added CH$_2$Cl$_2$ (100 ml) and allowed to stirred reaction till layer separation at 23° C. Organic layer was separated, and aqueous layer was washed CH$_2$Cl$_2$ (50 mL×3). Combined organic layers were washed with brine, dried over anhydrous Na$_2$SO$_4$, concentrated, and purified by flash column chromatography to give (R)-(2-phenyl-4,5-dihydrooxazol-4-yl)methanol (9 g, 95%) as a colourless oil.

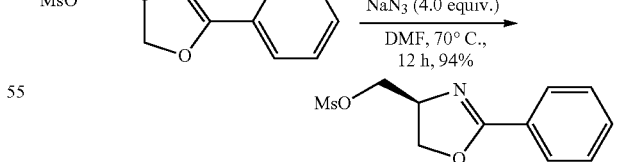

To a stirred solution of (R)-(2-phenyl-4,5-dihydrooxazol-4-yl)methanol (4 g, 22.57 mmol) in CH$_2$Cl$_2$ (100 mL) in 250 ml round bottom flask at 23° C. was added triethyl amine (4.57 g, 45.1 mmol) and methanesulphonyl chloride (3.10 g, 27.1 mmol) slowly, and then stirred for 3 h. The reaction was neutralized with cold water (50 ml) at same temperature, and CH$_2$Cl$_2$ added (50 ml). Organic layer was separated and aqueous layer was washed CH$_2$Cl$_2$ (50 ml×3). Combined organic layer was washed with brine, dried over anhydrous Na$_2$SO$_4$, and concentrated to give (S)-(2-phenyl-4,5-dihydrooxazol-4-yl)methyl methanesulfonate (4.75 g, 82%) as a colourless oil.

To a stirred solution of (S)-(2-phenyl-4,5-dihydrooxazol-4-yl)methyl methanesulfonate (4.8 g, 18.88 mmol) in DMF (60 mL), was added sodium azide (4.89 g, 75 mmol) and the reaction was heated to 70° C. overnight. The reaction mixture was cooled to room temperature, and cold water (20 ml) and EtOAc (200 mL) were added to the reaction mixture. The organic layer was separated, and aqueous layer was extracted with EtOAc (2×100 ml). The combined organic layers were washed with brine, dried over anhydrous Na₂SO₄, concentrated, and purified by flash column chromatography to provide (R)-4-(azidomethyl)-2-phenyl-4,5-dihydrooxazole (3.7 g, 94%) as a colourless oil.

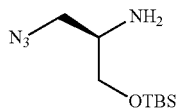

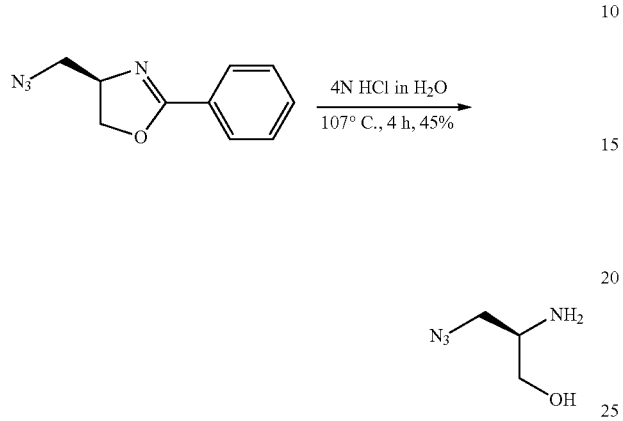

(R)-4-(azidomethyl)-2-phenyl-4,5-dihydrooxazole (3.8 g, 18.79 mmol) in 4 N HCl solution was stirred under heated condition at 107° C. for 3 h. The reaction was then diluted with MeOH and concentrated. The residue was dissolved in MeOH and filtered through Amberlist —(OH) resin. The resin was washed thoroughly with MeOH, solvent was concentrated, purified with flash column chromatography to give (R)-2-amino-3-azidopropan-1-ol (1 g, 45%) as a colourless oil.

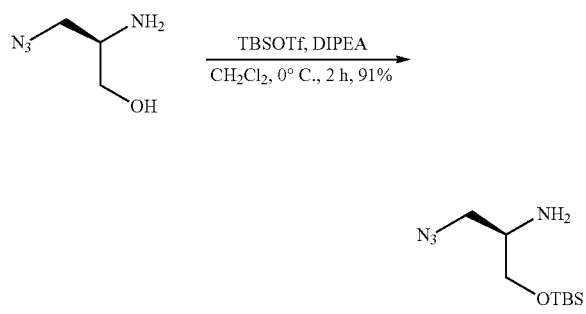

To a stirred solution of (R)-2-amino-3-azidopropan-1-ol (1 g, 12.32 mmol) in CH₂Cl₂ (15 mL) at 23° C., was added DIPEA (2.3 g, 25.12 mmol) and methanesulfonyl chloride (0.72 g, 12.41 mmol) slowly to the reaction mixture, which was stirred for 2 h. The reaction then was neutralized with cold water (50 ml) and CH₂Cl₂ (20 ml) was added. Organic layer was separated and aqueous layer was washed CH₂Cl₂ (50 ml×3). Combined organic layers were washed with brine, dried over anhydrous Na₂SO₄, and concentrated to give (R)-1-azido-3-((tert-butyldimethylsilyl)oxy)propan-2-amine (1.47 g, 91%) as a colorless oil.

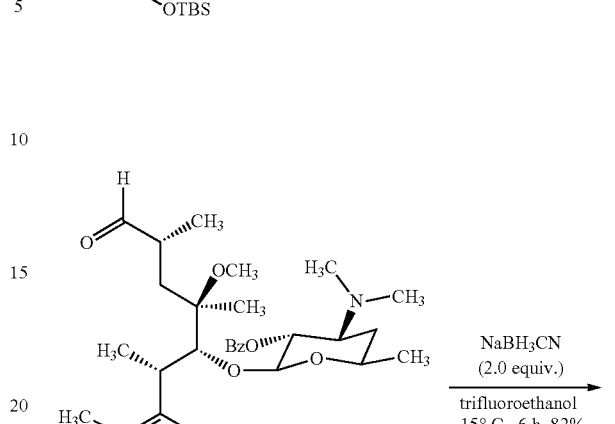

To a stirred solution of (R)-1-azido-3-((tert-butyldimethylsilyl)oxy)propan-2-amine (0.315 g, 1.605 mmol) and sodium cyanoborohydride (0.202 g, 3.21 mmol) in trifluoroethanol (20 ml) at −15° C., was slowly added (2S,3R,4S,6R)-4-(dimethylamino)-2-(((2R,3R,4R,6R)-4-methoxy-4,6-dimethyl-7-oxo-2-(2,2,5-trimethyl-4-oxo-4H-1,3-dioxin-6-yl)heptan-3-yl)oxy)-6-methyltetrahydro-2H-pyran-3-yl benzoate (0.946 g, 1.605 mmol), and the reaction mixture stirred for 6 h. The reaction was diluted with CH₂Cl₂ (30 ml) and neutralized with cold water (20 ml) at the same temperature. The organic layer was separated, and aqueous layer was washed CH₂Cl₂ (20 mL×3). Combined organic layers were washed with brine, dried over anhydrous Na₂SO₄, concentrated, and purified by flash column chromatography to give (2S,3R,4S,6R)-2-(((2R,3R,4R,6R)-7-(((R)-1-azido-3-((tert-butyldimethylsilyl)oxy)propan-2-yl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (558 g, 82%) as a white foaming solid.

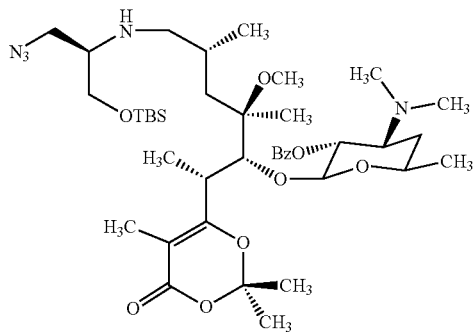 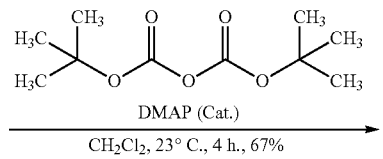

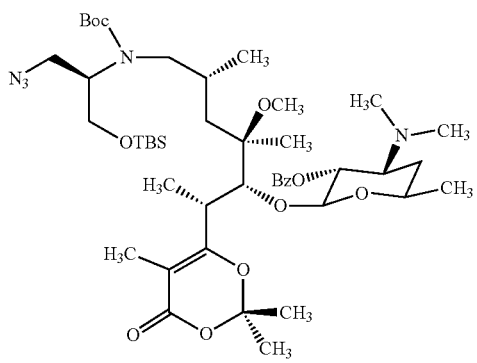

To a stirred solution of (2S,3R,4S,6R)-2-(((2R,3R,4R,6R)-7-(((R)-1-azido-3-((tert-butyldimethylsilyl)oxy)propan-2-yl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (558 g, 1.47 mmol) in CH$_2$Cl$_2$ (30 mL) at 23° C., was added di-tert-butyl dicarbonate (22.91 g, 105 mmol) slowly. The reaction mixture was stirred for 4 mins. The reaction was then neutralized with cold water (50 ml), CH$_2$Cl$_2$ (50 ml) added. The organic layer was separated and aqueous layer was washed CH$_2$Cl$_2$ (50 ml×3). The combined organic layers were washed with brine, dried over anhydrous Na$_2$SO$_4$, concentrated, and purified by flash column chromatography to give (2S,3R,4S,6R)-2-(((2R,3R,4R,6R)-7-(((R)-1-azido-3-((tert-butyldimethylsilyl)oxy)propan-2-yl)(tert-butoxycarbonyl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (354 g, 67%) as a colorless oil.

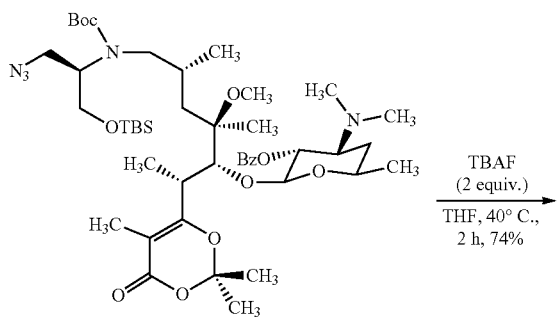

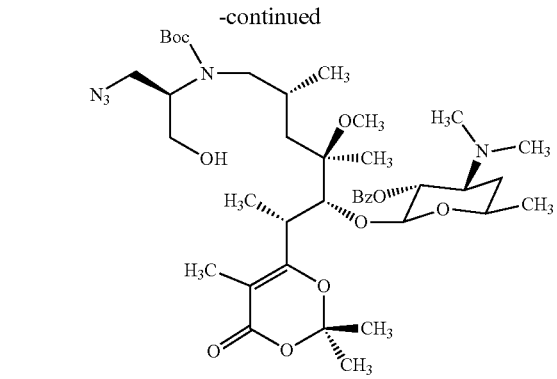

To a stirred solution of methyl (2S,3R,4S,6R)-2-(((2R,3R,4R,6R)-7-(((R)-1-azido-3-((tert-butyldimethylsilyl)oxy)propan-2-yl)(tert-butoxycarbonyl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (354 mg, 1.14 mmol) in THF (10 mL) at 23° C., was added TBAF (1.4 ml, 2.28 mmol) slowly. The reaction mixture was stirred for 4 mins. The reaction was then neutralized with cold water (50 ml), EtOAc (50 ml) was added. The organic layer was separated, and the aqueous layer was washed EtOAc (50 ml×3). The combined organic layers were washed with brine, dried over anhydrous Na$_2$SO$_4$, concentrated, and purified by flash column chromatography to give (2S,3R,4S,6R)-2-(((2R,3R,4R,6R)-7-(((R)-1-azido-3-hydroxypropan-2-yl)(tert-butoxycarbonyl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (234 mg, 74%) as a colorless oil.

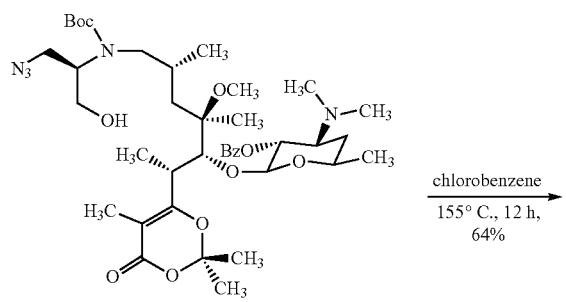

chlorobenzene
155° C., 12 h,
64%

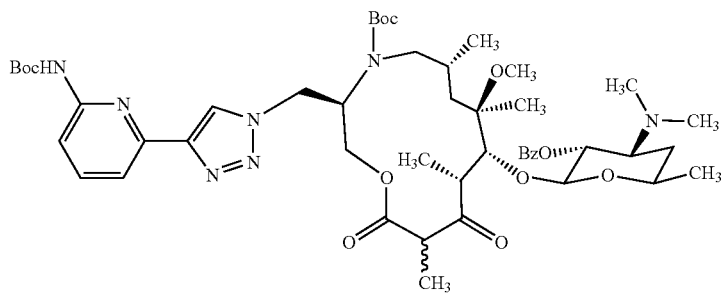

under argon and placed under high vacuum. A 2 L round bottom flask was flame dried and cooled to 23° C. The compound was transferred with chlorobenzene (893 mL) into the flask at rt. The reaction solution was degassed with argon for 30 min and fitted with a reflux condenser. Vacuum was applied for 30 seconds and back-filled with argon (repeated 3 times). The reaction mixture was heated to 150° C. in an oil bath for 12 h. The reaction was allowed to stir at room temperature, then chlorobenzene was distilled off under high vacuum. The crude material was purified by flash column chromatography to give tert-butyl (3R,6R,8R,9R, 10R)-3-(azidomethyl)-9-(((2S,3R,4S,6R)-3-(benzoyloxy)-4-(dimethylamino)-6-methyltetrahydro-2H-pyran-2-yl) oxy)-8-methoxy-6,8,10,12-tetramethyl-11,13-dioxo-1-oxa-4-azacyclotridecane-4-carboxylate (110 mg, 64%)

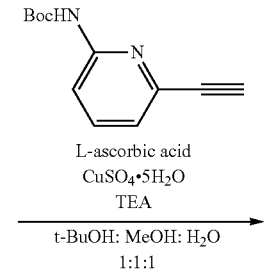

L-ascorbic acid
CuSO₄•5H₂O
TEA
t-BuOH: MeOH: H₂O
1:1:1

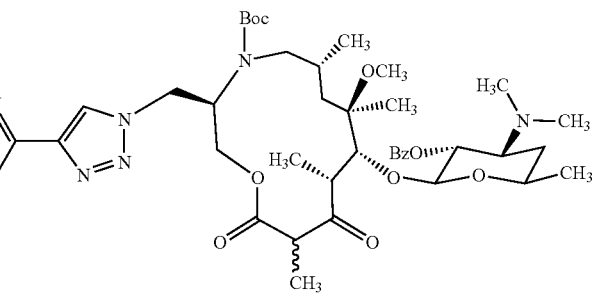

-continued

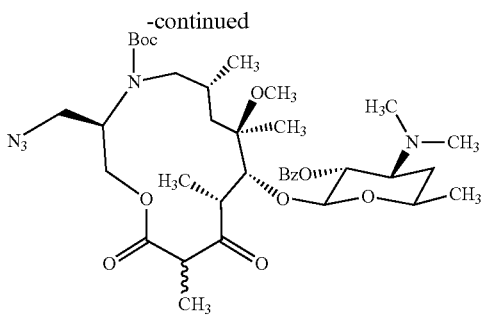

(2S,3R,4S,6R)-2-(((2R,3R,4R,6R)-7-(((R)-1-Azido-3-hydroxypropan-2-yl)(tert-butoxycarbonyl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (120 mg, 0.204 mmol) was azeotropically dried with toluene four times To a stirred solution of tert-butyl (3R,6R,8R,9R,10R)-3-(azidomethyl)-9-(((2S,3R,4S,6R)-3-(benzoyloxy)-4-(dimethylamino)-6-methyltetrahydro-2H-pyran-2-yl)oxy)-8-methoxy-6,8,10,12-tetramethyl-11,13-dioxo-1-oxa-4-azacyclotridecane-4-carboxylate (100 mg, 0.0743 mmol), tert-butyl (6-ethynylpyridin-2-yl)carbamate (30 mg, 0.0743 mmol) and L-ascorbic acid (110 mg, 0.0793 mmol) in t-butanol:MeOH:H2O (1:1:1) (10 mL) at 23° C., was added CuSO₄·5H₂O (0.02 ml, 1.03 mmol) and TEA (30 mg, 0.0743 mmol). The reaction was stirred for 12 h, then neutralized with cold water (50 ml). CH₂Cl₂ (50 ml) was added. The organic layer was separated, and the aqueous layer was washed with CH₂Cl₂ (50 ml×3). The combined organic layers were washed with brine, dried over anhydrous Na₂SO₄, concentrated, and purified by flash column chromatography to give tert-butyl (3R,6R,8R,9R,10R)-9-(((2S, 3R,4S,6R)-3-(benzoyloxy)-4-(dimethylamino)-6-methyltetrahydro-2H-pyran-2-yl)oxy)-3-((4-(6-((tert-butoxycarbonyl)amino)pyridin-2-yl)-1H-1,2,3-triazol-1-yl) methyl)-8-methoxy-6,8,10,12-tetramethyl-11,13-dioxo-1-oxa-4-azacyclotridecane-4-carboxylate (87 mg, as a crude liquid) as a colorless oil.

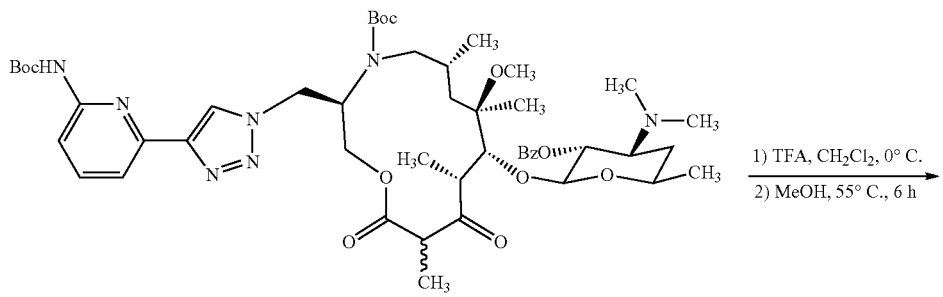

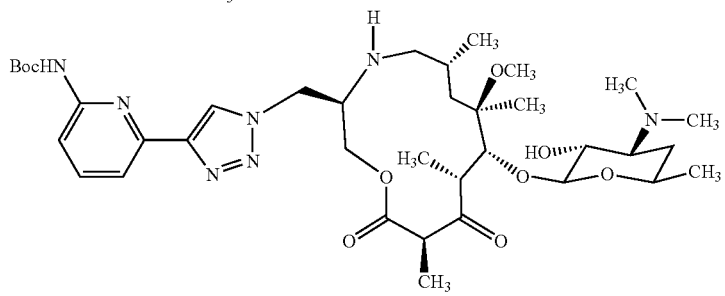

To a stirred solution of tert-butyl (3R,6R,8R,9R,10R)-3-((4-(6-aminopyridin-2-yl)-1H-1,2,3-triazol-1-yl)methyl)-9-(((2S,3R,4S,6R)-3-(benzoyloxy)-4-(dimethylamino)-6-methyltetrahydro-2H-pyran-2-yl)oxy)-8-methoxy-6,8,10,12-tetramethyl-11,13-dioxo-1-oxa-4-azacyclotridecane-4-carboxylate (87 mg, 0.053 mmol) in CH$_2$Cl$_2$ (2 ml) at 0° C., was added TFA (0.34 ml, 0.648 mmol) and the reaction was stirred for 6 h at 23° C. The reaction mixture was then diluted with CH$_2$Cl$_2$ (5 ml) and neutralized with a saturated solution of NaHCO$_3$. The organic layer was separated and the aqueous layer was washed CH$_2$Cl$_2$ (20 ml×3). The combined organic layers were washed with brine, dried over anhydrous Na$_2$SO$_4$, and concentrated to give (2S,3R,4S,6R)-2-(((3R,6R,8R,9R,10R)-3-((4-(6-aminopyridin-2-yl)-1H-1,2,3-triazol-1-yl)methyl)-8-methoxy-6,8,10,12-tetramethyl-11,13-dioxo-1-oxa-4-azacyclotridecan-9-yl)oxy)-4-(dimethylamino)-6-methyltetrahydro-2H-pyran-3-yl benzoate (38 mg crude)

A stirred solution of (2S,3R,4S,6R)-2-(((3R,6R,8R,9R,10R)-3-((4-(6-aminopyridin-2-yl)-1H-1,2,3-triazol-1-yl)methyl)-8-methoxy-6,8,10,12-tetramethyl-11,13-dioxo-1-oxa-4-azacyclotridecan-9-yl)oxy)-4-(dimethylamino)-6-methyltetrahydro-2H-pyran-3-yl benzoate (38 mg, 0.0173 mmol) in MeOH (1 mL) was heated at 55° C. for 7 h. The reaction was concentrated and the product was purified by HPLC to give (3R,6R,8R,9R,10R)-3-((4-(6-aminopyridin-2-yl)-1H-1,2,3-triazol-1-yl)methyl)-9-(((2S,3R,4S,6R)-4-(dimethylamino)-3-hydroxy-6-methyltetrahydro-2H-pyran-2-yl)oxy)-8-methoxy-6,8,10,12-tetramethyl-1-oxa-4-azacyclotridecane-11,13-dione (Compound 219) (9 mg, 40% over 2 steps) as white solid. $^1$H NMR (600 MHz, Methanol-d$_4$) δ 7.53 (t, 2H), 7.25 (d, 2H), 6.54 (d, 2H), 4.87 (d, 3H), 4.56 (dd, 1H), 4.43 (dd, 1H), 4.27 (dd, 1H), 4.20 (t, 1H), 3.87 (q, 1H), 3.72 (t, 1H), 3.48-3.42 (m, 2H), 3.36-3.30 (m, 25H), 2.85 (s, 1H), 2.82 (s, 2H), 2.21-2.12 (m, 1H), 2.03-1.92 (m, 1H), 1.58-1.49 (m, 2H), 1.34-1.21 (m, 9H), 0.95 (t, 3H).

Scheme 16.

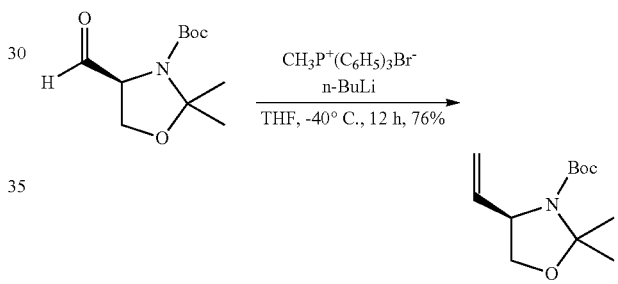

To a stirred solution of CH$_3$P$^+$(C$_6$H$_5$)$_3$Br$^-$ (4.2 g, 19.2 mmol) in THF at −40° C., was added n-butyllithium (8.9 ml. 4M. 19.2 mmol). The reaction mixture was stirred for 30 mins, and the reaction color changed to orange red. After 30 mins Garner's aldehyde (1.7 g, 9.1 mmol) was added to the reaction mixture dropwise diluting with THF and stirred for 12 h. Water was added and the reaction mixture was diluted with EtOAc (100 ml). The organic layer was separated, and the aqueous layer was washed EtOAc (20 ml×3). The combined organic layers were washed with brine, dried over anhydrous Na$_2$SO$_4$, concentrated, and purified by flash column chromatography to give tert-butyl (R)-2,2-dimethyl-4-vinyloxazolidine-3-carboxylate (1.52 g, 87%) as thick liquid.

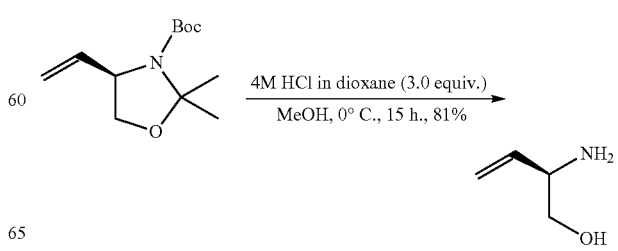

To a stirred solution of tert-butyl (R)-2,2-dimethyl-4-vinyloxazolidine-3-carboxylate (1.52 g, 8.12 mmol) in methanol at 0° C., was added HCl in dioxane (4 ml. 4M. 36.3 mmol). The reaction mixture was stirred for 15 h at 23° C. Methanol was removed in vacuo and the reaction mixture was diluted with CH₂Cl₂ (15 ml) and neutralized with a saturated solution of NaHCO₃. The organic layer was separated and the aqueous layer was washed with CH₂Cl₂ (20 ml×3). The combined organic layers were washed with brine, dried over anhydrous Na₂SO₄, concentrated, and purified by flash column chromatography to give (R)-2-aminobut-3-en-1-ol (890 mg, 81%) as a thick liquid.

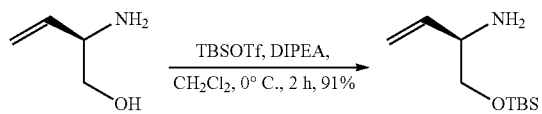

To a stirred solution (R)-2-aminobut-3-en-1-ol (890 mg, 3.45 mmol) in CH₂Cl₂ (20 ml) at 0° C., was added DIPEA (1.5 ml, 6.48 mmol) and tert-butyldimethylsilyl trifluoromethanesulfonate (0.458 ml, 3.87 mmol). The reaction mixture was stirred for 6 h at 23° C. After 6 h, the reaction mixture was diluted with CH₂Cl₂ (5 ml) and neutralized with saturated solution of NaHCO₃. The organic layer was separated and the aqueous layer was washed with CH₂Cl₂ (20 ml×3). The combined organic layers were washed with brine, dried over anhydrous Na₂SO₄, and concentrated to give (R)-1-((tert-butyldimethylsilyl)oxy)but-3-en-2-amine (1.32 g, 91%) as a colorless liquid.

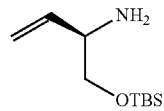

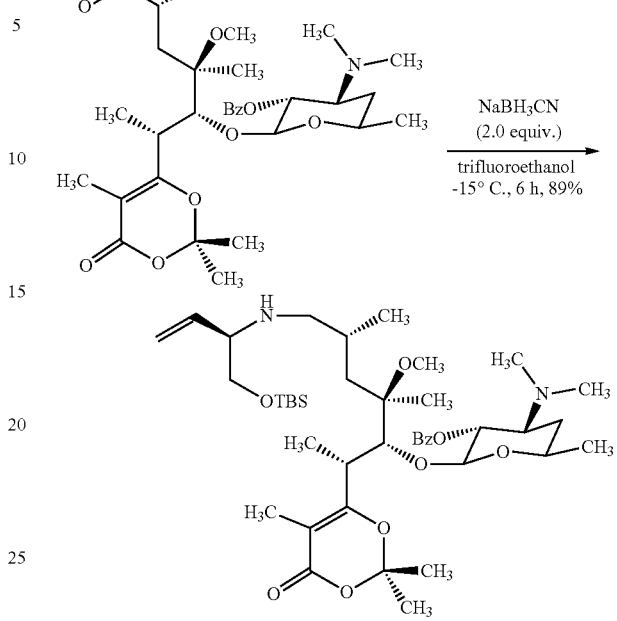

To a stirred solution of (R)-1-((tert-butyldimethylsilyl)oxy)but-3-en-2-amine (0.315 g, 2.605 mmol) and sodium cyanoborohydride (0.202 g, 5.32 mmol) in trifluoroethanol (20 ml) at −15° C., was slowly added (2S,3R,4S,6R)-4-(dimethylamino)-2-(((2R,3R,4R,6R)-4-methoxy-4,6-dimethyl-7-oxo-2-(2,2,5-trimethyl-4-oxo-4H-1,3-dioxin-6-yl)heptan-3-yl)oxy)-6-methyltetrahydro-2H-pyran-3-yl benzoate (0.946 g, 2.605 mmol). The reaction mixture was stirred for 6 h. The reaction was then diluted with CH₂Cl₂ (30 ml) and neutralized with cold water (20 ml) at same temperature. The organic layer was separated, and aqueous layer was washed CH₂Cl₂ (20 mL×3). The combined organic layers were washed with brine, dried over anhydrous Na₂SO₄, concentrated, and purified by flash column chromatography to give (2S,3R,4S,6R)-2-(((2R,3R,4R,6R)-7-(((R)-1-((tert-butyldimethylsilyl)oxy)but-3-en-2-yl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (1.168 g, 82%) as a white foaming solid.

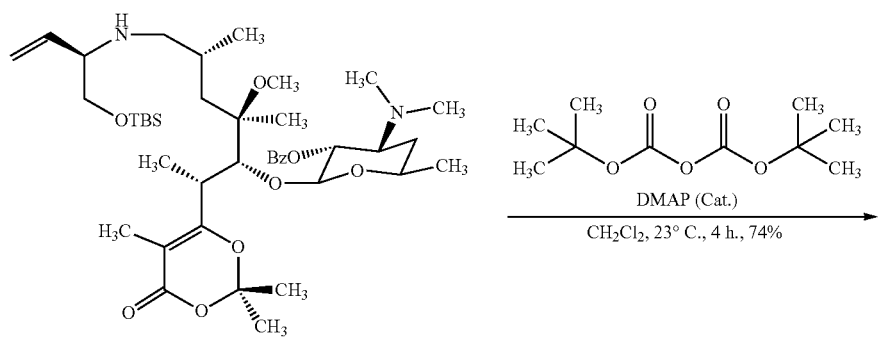

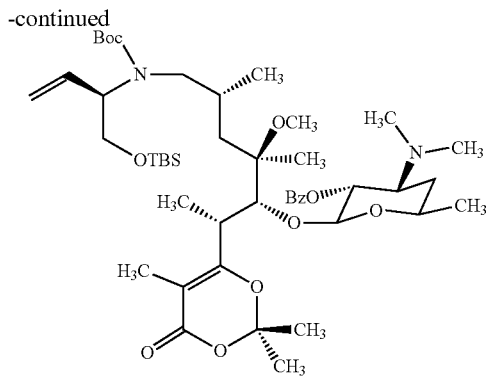

To a stirred solution of (2S,3R,4S,6R)-2-(((2R,3R,4R,6R)-7-(((R)-1-((tert-butyldimethylsilyl)oxy)but-3-en-2-yl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (1.065 g, 3.21 mmol) in $CH_2Cl_2$ (30 mL) at 23° C., was added di-tert-butyl dicarbonate (1.131 g, 5.13 mmol). The reaction mixture was stirred for 4 mins. The reaction was then neutralized with cold water (50 ml) at the same temperature, followed by addition of $CH_2Cl_2$ (50 ml). The organic layer was separated and the aqueous layer was washed with $CH_2Cl_2$ (50 ml×3). The combined organic layers were washed with brine, dried over anhydrous $Na_2SO_4$, concentrated, and purified by flash column chromatography to give (2S,3R,4S,6R)-2-(((2R,3R,4R,6R)-7-((tert-butoxycarbonyl)((R)-1-((tert-butyldimethylsilyl)oxy)but-3-en-2-yl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (0.743 g, 74%) as a foaming solid.

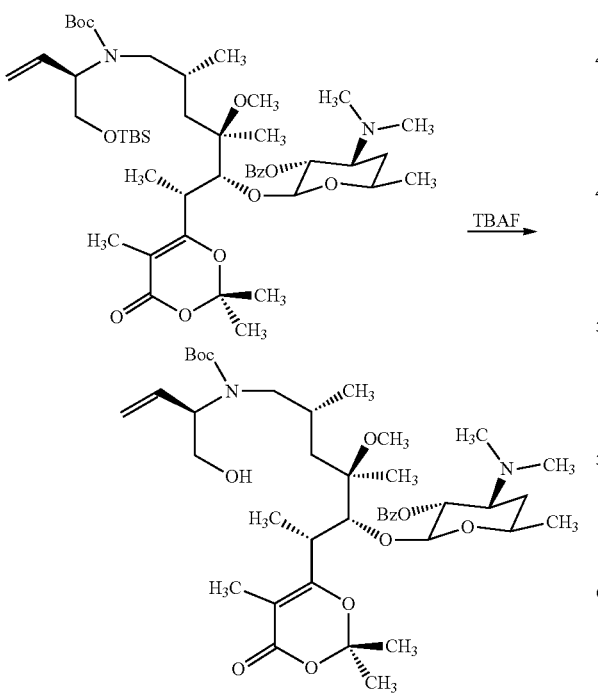

To a stirred solution of (2S,3R,4S,6R)-2-(((2R,3R,4R,6R)-7-((tert-butoxycarbonyl)((R)-1-((tert-butyldimethylsilyl)oxy)but-3-en-2-yl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (0.743 g, 1.13 mmol) in THF (20 mL) at 23° C., was slowly added TBAF (2.2 ml, 2.1 mmol). The reaction mixture was stirred for 4 minutes, then the reaction was heated for 2 h at 40° C. Reaction then was neutralized with cold water (50 ml), followed by addition of EtOAc (50 ml). The organic layer was separated and the aqueous layer was washed EtOAc (50 ml×3). The combined organic layers were washed with brine, dried over anhydrous $Na_2SO_4$, concentrated, and purified by flash column chromatography to give (2S,3R,4S,6R)-2-(((2R,3R,4R,6R)-7-((tert-butoxycarbonyl)((R)-1-hydroxybut-3-en-2-yl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (0.584 g, 84%) as a colorless oil.

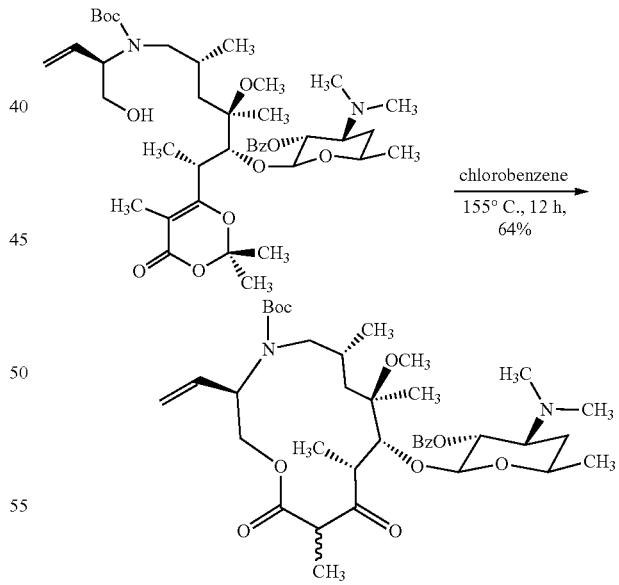

(2S,3R,4S,6R)-2-(((2R,3R,4R,6R)-7-((tert-butoxycarbonyl)((R)-1-hydroxybut-3-en-2-yl)amino)-4-methoxy-4,6-dimethyl-2-(2,2,5-trimethyl-4-oxo-4H-1,3-dioxin-6-yl)heptan-3-yl)oxy)-4-(dimethylamino)-6-methyltetrahydro-2H-pyran-3-yl benzoate (0.543 mg, 0.804 mmol) was azeotropically dried with toluene four times under argon and placed under high vacuum. A 2 L round bottom flask was flame dried and cooled to 23° C. The compound was transferred with chlorobenzene (993 mL) into the flask at rt. The reaction solution was degassed with argon for 30 min and fitted with a reflux condenser. Vacuum was applied for 30 seconds and back-filled with argon (repeated 3 times). The reaction mixture was heated to 150° C. in an oil bath for 12 h. The reaction was allowed to stir at room temperature, then chlorobenzene was distilled off under high vacuum. The crude material was purified by flash column chromatography to give tert-butyl (3R,6R,8R,9R,10R)-9-(((2S,3R,4S,6R)-3-(benzoyloxy)-4-(dimethylamino)-6-methyltetrahydro-2H-pyran-2-yl)oxy)-8-methoxy-6,8,10,12-tetramethyl-11,13-dioxo-3-vinyl-1-oxa-4-azacyclotridecane-4-carboxylate (314 mg, 64%).

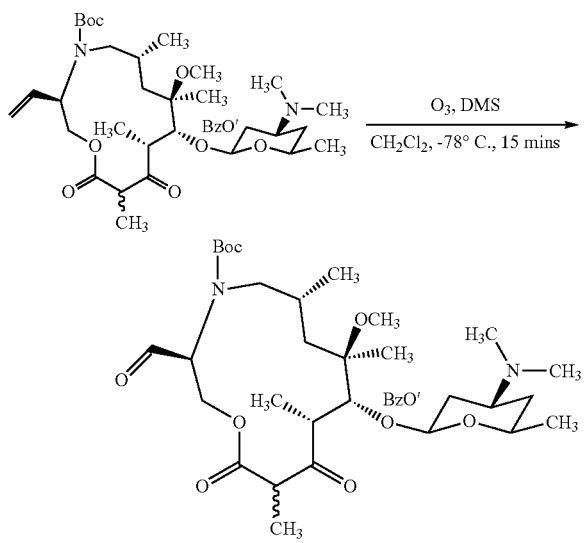

To a stirred solution of tert-butyl (3R,6R,8R,9R,10R)-9-(((2S,3R,4S,6R)-3-(benzoyloxy)-4-(dimethylamino)-6-methyltetrahydro-2H-pyran-2-yl)oxy)-8-methoxy-6,8,10,12-tetramethyl-11,13-dioxo-3-vinyl-1-oxa-4-azacyclotridecane-4-carboxylate (60 mg, 0.078 mmol) in CH$_2$Cl$_2$ (2 ml) at 0° C., was added TFA (0.48 ml, 0.781 mmol). Ozone was passed through the reaction mixture for 10 minutes. Nitrogen was then bubbled through the reaction and dimethyl sulfide was added to the reaction. The reaction mixture was diluted with CH$_2$Cl$_2$ (5 ml) and neutralized with a saturated solution of NaHCO$_3$. The organic layer was separated and the aqueous layer was washed with CH$_2$Cl$_2$ (20 ml×3). The combined organic layers were washed with brine, dried over anhydrous Na$_2$SO$_4$, and concentrated to give tert-butyl (3S,6R,8R,9R,10R)-9-(((2S,3R,4S,6R)-3-(benzoyloxy)-4-(dimethylamino)-6-methyltetrahydro-2H-pyran-2-yl)oxy)-3-formyl-8-methoxy-6,8,10,12-tetramethyl-11,13-dioxo-1-oxa-4-azacyclotridecane-4-carboxylate (67 mg crude material) as a foaming solid.

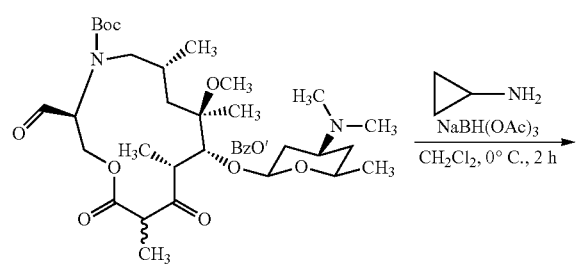

-continued

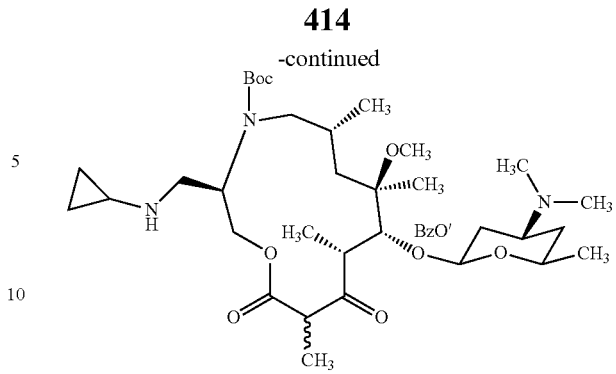

To a stirred solution of cyclopropanamine (9 mg, 0.071 mmol) and sodium triacetoxyborohydride (40 mg, 0.142 mmol) in trifluoroethanol (2 ml) at −15° C., was slowly added tert-butyl (3S,6R,8R,9R,10R)-9-(((2S,3R,4S,6R)-3-(benzoyloxy)-4-(dimethylamino)-6-methyltetrahydro-2H-pyran-2-yl)oxy)-3-formyl-8-methoxy-6,8,10,12-tetramethyl-11,13-dioxo-1-oxa-4-azacyclotridecane-4-carboxylate (67 mg, 0.071 mmol). The reaction mixture was stirred for 6 h. The reaction was diluted with CH$_2$Cl$_2$ (3 ml) and neutralized with cold water (5 ml) at the same temperature. The organic layer was separated, and the aqueous layer was washed CH$_2$Cl$_2$ (20 mL×3). The combined organic layers were washed with brine, dried over anhydrous Na$_2$SO$_4$, concentrated over vacuum, and purified by flash column chromatography to give tert-butyl (3R,6R,8R,9R,10R)-9-(((2S,3R,4S,6R)-3-(benzoyloxy)-4-(dimethylamino)-6-methyltetrahydro-2H-pyran-2-yl)oxy)-3-((cyclopropylamino)methyl)-8-methoxy-6,8,10,12-tetramethyl-11,13-dioxo-1-oxa-4-azacyclotridecane-4-carboxylate (53 mg crude material) as a white foaming solid.

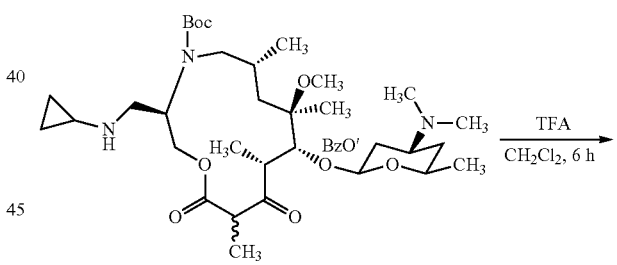

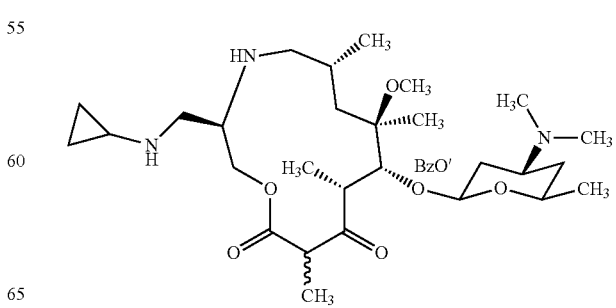

415

To a stirred solution of tert-butyl (3R,6R,8R,9R,10R)-9-(((2S,3R,4S,6R)-3-(benzoyloxy)-4-(dimethylamino)-6-methyltetrahydro-2H-pyran-2-yl)oxy)-8-methoxy-6,8,10,12-tetramethyl-11,13-dioxo-3-vinyl-1-oxa-4-azacyclotridecane-4-carboxylate (60 mg, 0.078 mmol) in $CH_2Cl_2$ (2 ml) at 0° C., was added TFA (0.48 ml, 0.781 mmol). The reaction mixture was stirred for 6 h at 23° C. The reaction mixture was then diluted with $CH_2Cl_2$ (5 ml) and neutralized with saturated solution of $NaHCO_3$. The organic layer was separated, and the aqueous layer was washed with $CH_2Cl_2$ (20 ml×3). The combined organic layers were washed with brine, dried over anhydrous $Na_2SO_4$, and concentrated to give (2S,3R,4S,6R)-2-(((3R,6R,8R,9R,10R)-3-((cyclopropylamino)methyl)-8-methoxy-6,8,10,12-tetramethyl-11,13-dioxo-1-oxa-4-azacyclotridecan-9-yl)oxy)-4-(dimethylamino)-6-methyltetrahydro-2H-pyran-3-yl benzoate (67 mg crude).

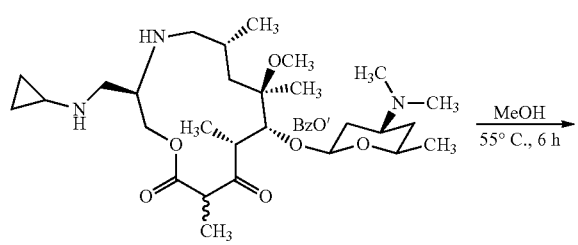

416

-continued

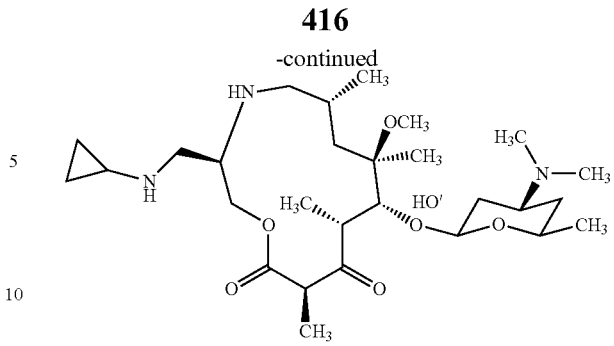

A stirred solution of ((2S,3R,4S,6R)-2-(((3R,6R,8R,9R,10R)-3-((cyclopropylamino)methyl)-8-methoxy-6,8,10,12-tetramethyl-11,13-dioxo-1-oxa-4-azacyclotridecan-9-yl)oxy)-4-(dimethylamino)-6-methyltetrahydro-2H-pyran-3-yl benzoate (40 mg, 0.0173 mmol) in MeOH (1 mL) was heated at 55° C. for 7 hr. The reaction was concentrated, and the crude product was purified by HPLC to give (3R,6R,8R,9R,10R)-3-((cyclopropylamino)methyl)-9-(((2S,3R,4S,6R)-4-(dimethylamino)-3-hydroxy-6-methyltetrahydro-2H-pyran-2-yl)oxy)-8-methoxy-6,8,10-trimethyl-1-oxa-4-azacyclotridecane-11,13-dione (Compound 218) (10 mg, 23% over 3 steps) as a white solid. $^1H$ NMR (600 MHz, Methanol-$d_4$) δ 8.53 (s, 1H), 5.34 (t, 1H), 4.51 (t, 1H), 4.41 (dd, 1H), 4.28-4.18 (m, 2H), 3.93-3.84 (m, 1H), 3.69 (dd, 1H), 3.45 (qd, 1H), 3.41-3.36 (m, 1H), 2.94 (s, 1H), 2.93-2.79 (m, 4H), 2.73 (s, 1H), 2.69 (s, 3H), 2.24-2.16 (m, 1H), 2.03 (d, 1H), 1.95 (d, 1H), 1.72-1.63 (m, 1H), 1.60 (d, 1H), 1.50-1.41 (m, 2H), 1.35-1.20 (m, 13H), 1.07-0.96 (in, 3H)

The following compounds were prepared using synthetic procedures analogous to those described above for the preparation of Compound 218 in Scheme 16 employing the indicated amine.

| Compound | Amine | Characterization |
|---|---|---|
| 216 | | $^1H$ NMR (600 MHz, Acetonitrile-d3) δ 8.27 (s, 1H), 4.70 (t, 2H), 4.48-4.41 (m, 1H), 4.41-4.36 (m, 1H), 4.36-4.28 (m, 2H), 4.17 (d, 1H), 3.96-3.83 (m, 3H), 3.66-3.51 (m, 3H), 3.44-3.35 (m, 2H), 3.33-3.24 (m, 2H), 3.13-3.08 (m, 1H), 2.88 (s, 2H), 2.78 (t, 1H), 2.54 (s, 1H), 2.48 (t, 6H), 1.70-1.61 (m, 2H), 1.35-1.20 (m, 16H), 1.02 (dd, 3H). |
| 217 | | $^1H$ NMR (600 MHz, Acetonitrile-d3) δ 8.43 (dd, 1H), 8.30 (s, 1H), 7.54 (td, 2H), 7.44-7.39 (m, 2H), 4.47-4.41 (m, 2H), 4.37 (dt, 2H), 4.29 (dd, 2H), 4.16 (d, 2H), 4.00-3.88 (m, 4H), 3.88-3.82 (m, 2H), 3.63-3.60 (m, 1H), 3.45-3.32 (m, 3H), 3.27-3.24 (m, 2H), 2.89 (s, 3H), 2.85 (s, 4H), 2.46 (dd, 9H), 1.63 (s, 2H), 1.44 (d, 1H), 1.33 (d, 4H), 1.30 (s, 2H), 1.28 d, 5H), 1.27-1.20 (m, 8H), 1.03 (t, 3H). |

-continued
| Compound | Amine | Characterization |
|---|---|---|
| 220 | | 1H NMR (600 MHz, Methanol-d4) δ 8.43 (s, 1H), 7.81 (s, 1H), 7.67 (s, 1H), 7.13 (s, 1H), 7.03 (s, 1H), 6.98 (s, 1H), 5.34 (t, 1H), 4.56 (d, 1H), 4.43 (t, 1H), 4.17 (d, 1H), 4.11-4.02 (m, 3H), 3.72 (d, 1H), 3.70 (s, 1H), 3.53 (t, 1H), 3.49-3.41 (m, 2H), 3.34 (s, 1H), 3.04 (d, 2H), 2.95-2.86 (m, 4H), 2.86 (s, 2H), 2.79 (s, 5H), 2.76 (s, 1H), 2.25 (d, 1H), 2.24-2.16 (m, 2H), 2.01 (d, 2H), 1.82 (p, 3H), 1.65 (d, 2H), 1.59 (d, 2H), 1.52 (t, 3H), 1.44 (d, 1H), 1.40 (s, 2H), 1.34-1.27 (m, 15H), 1.26 (s, 3H), 1.00-0.94 (m, 3H). |
| 221 | NH$_3$ | 1H NMR (600 MHz, Methanol-d4) δ 4.44 (dd, 1H), 4.11 (dd, 1H), 3.81 (dd, 1H), 3.77-3.68 (m, 2H), 3.36-3.30 (m, 20H), 3.23-3.16 (m, 1H), 3.11 (d, 1H), 3.00 (dd, 1H), 2.87 (dd, 1H), 2.74 (d, 2H), 2.02-1.96 (m, 1H), 1.83-1.76 (m, 1H), 1.47 (q, 1H), 1.35-1.28 (m, 4H), 1.25 (td, 3H). |
Intermediate Scheme 17.
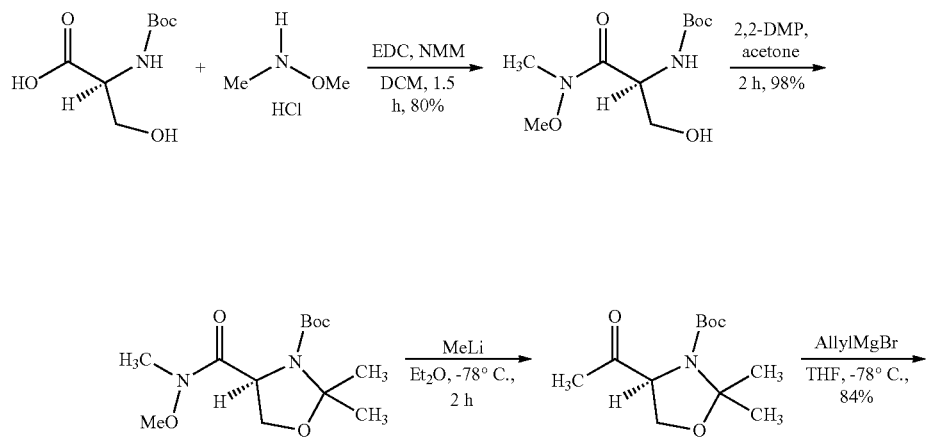

419 420
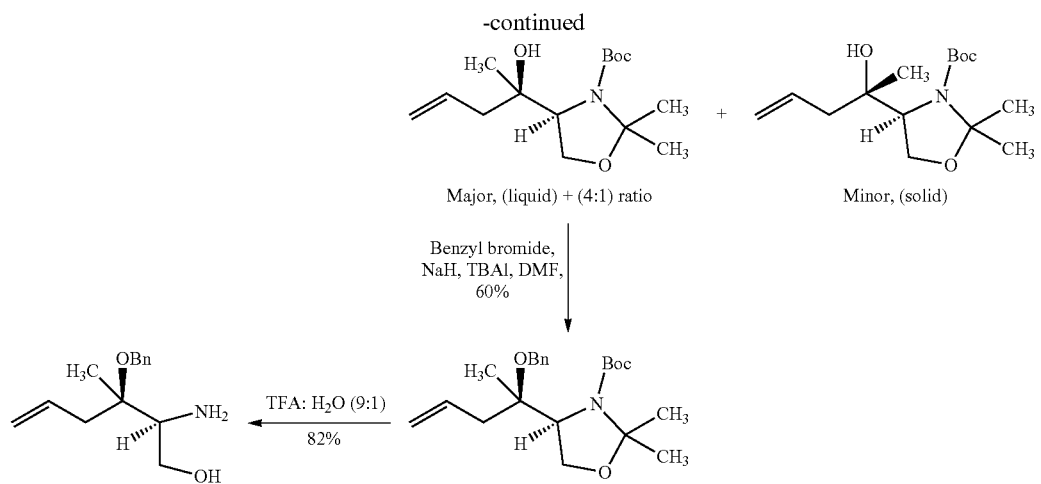
Major, (liquid) + (4:1) ratio     Minor, (solid)
Benzyl bromide, NaH, TBAI, DMF, 60%
TFA: H₂O (9:1) 82%
Scheme 17
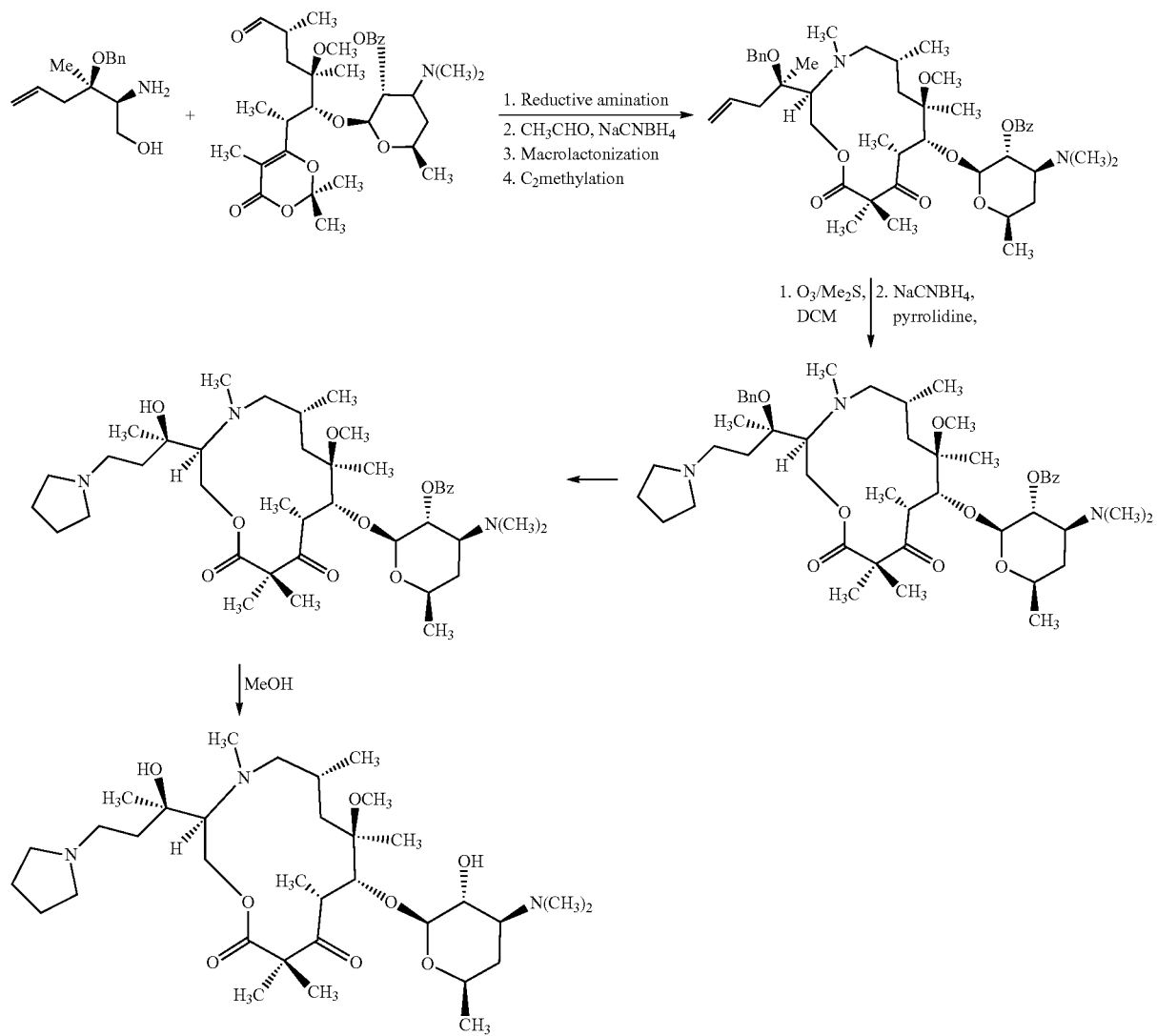
1. Reductive amination
2. CH₃CHO, NaCNBH₄
3. Macrolactonization
4. C₂methylation
1. O₃/Me₂S, DCM
2. NaCNBH₄, pyrrolidine,
MeOH

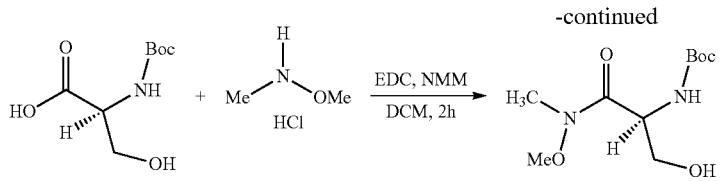

tert-Butyl (S)-(3-hydroxy-1-(methoxy(methyl)amino)-1-oxopropan-2-yl)carbamate To a solution of D-Boc-serine (5.0 g, 24.37 mmol, 1 eq) in CH$_2$Cl$_2$ (60 mL) at −15° C., N,O-dimethylhydroxylamine hydrochloride (2.5 g, 25.6 mmol, 1.05 eq) and N-methylmorpholine (2.5 g, 25.6 mmol. 1.05 eq) were added, followed by portion wise addition of EDCl·HCl (4.9 g, 25.6 mmol, 1.05 eq) over 30 min. After stirring at the same temperature for 90 min, the reaction was quenched by ice cold 1M HCl (30 mL). The organic layer was separated, and the aqueous layer was extracted by CH$_2$Cl$_2$ (100 mL). The combined organic layers were washed with sat. aqueous NaHCO$_3$ (150 mL). The NaHCO$_3$ layers were back extracted with CH$_2$Cl$_2$ (100 mL). The combined CH$_2$Cl$_2$ layers were dried over MgSO$_4$. Filtration and concentration afforded the product 17 as a white solid (4.84 g, 80%), which was used for the next step without further purification.

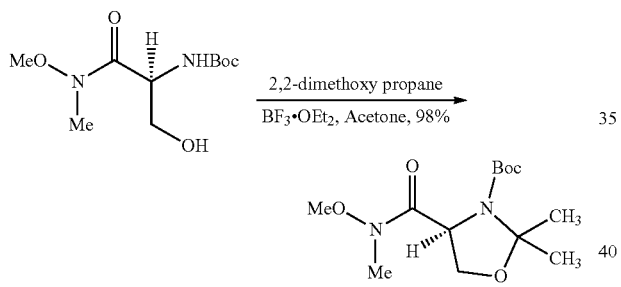

tert-Butyl (S)-4-(methoxy(methyl)carbamoyl)-2,2-dimethyloxazolidine-3-carboxylate BF$_3$:OEt$_2$ (0.255 mL, 5% mol) was added to a solution of amino alcohol (5.0 g, 20.14 mmol, 1 eq) in dimethoxy propane (45 mL) and acetone (100 mL). The resulting yellow solution was stirred at 23° C. for 2.5 h. The solvent was partially removed under reduced pressure and the residue was diluted with ethyl acetate (200 mL). Washing with saturated sodium bicarbonate solution/water in 1:1 (100 ml) and brine 100 mL, drying over MgSO$_4$ and evaporation of the solvent under reduced pressure furnished the crude product which was subjected to flash chromatography (hexane/ethyl aceatate) to give ester 5.57 g, 98% as a colorless oil.

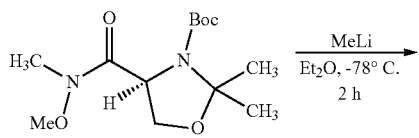

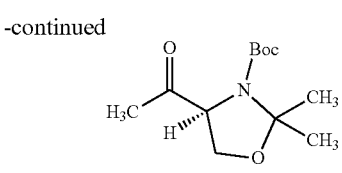

tert-Butyl (S)-4-acetyl-2,2-dimethyloxazolidine-3-carboxylate

To compound amide (5.0 g, 17.34 mmol, 1 eq) in THF at −78° C., MeLi (17.34 mL, 1.0 M in diethyl ether, 17.34 mmol, 1 eq) in Et$_2$O solution was added via cannula. After stirring at the same temperature for 90 min, the reaction was quenched by saturated aqueous NH$_4$Cl (250 mL). The mixture was extracted with Et$_2$O (3×200 mL). The combined ether layers were dried over MgSO$_4$. Flash silica gel column chromatography with 20% EtOAc-hexanes afforded the product 3.04 g in 72% yield as a colorless oil.

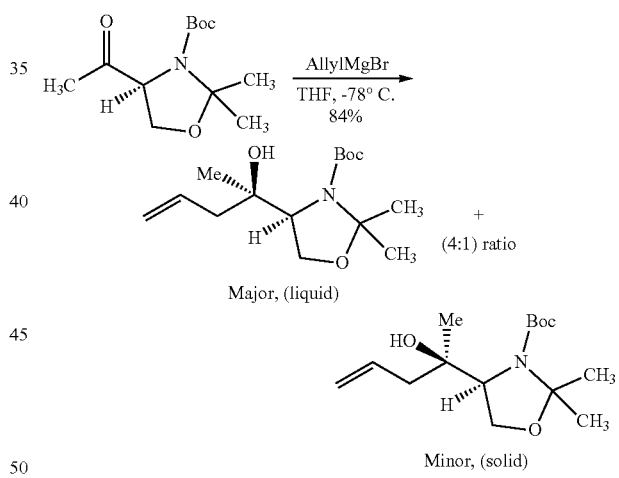

tert-Butyl (S)-4-((R)-2-hydroxypent-4-en-2-yl)-2,2-dimethyloxazolidine-3-carboxylate In a round bottomed flask the ketone, (2.8 g, 11.51 mmol, 1.0 eq) was dissolved in THF (30 mL) under argon. The solution was cooled to −78° C. and allylmagnesium bromide (11.51 mL, 1.0 M in diethyl ether, 1 eq) was added. The solution was stirred at −78° C. under argon and was stirred for 4 h. After completion, the reaction was quenched at −78° C. with 10 mL of sat. NH4Cl. The solution was allowed to warm-up to room temperature and 20 mL of water was added to dissolve the white solid. The aqueous layer was extracted with diethyl ether (2×200 mL). The combined organic layers were dried over Na$_2$SO$_4$, filtered, and concentrated. The two diastereomers were purified using silica gel chromatography. Solid compound is confirmed through x-ray crystallography.

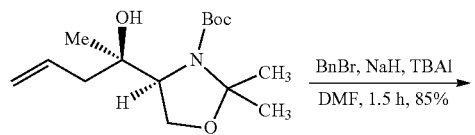

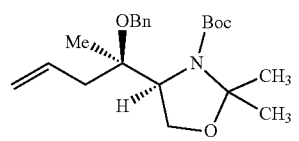

(2S,3R)-2-amino-3-(benzyloxy)-3-methylhex-5-en-1-ol tert-Butyl (S)-4-((R)-2-(benzyloxy)pent-4-en-2-yl)-2,2-dimethyloxazolidine-3-carboxylate Alcohol (1.7 g, 5.96 mmol, 1 eq) was dissolved in dry DMF (20 mL), and the solution was cooled to 0° C. and stirred under $N_2$. Tetrabutylammonium iodide (3.06 g, 8.94 mmol, 1.5 eq) and benzyl bromide (1.065 mL, 8.9 mmol, 1.5 eq) were added, followed by NaH (60%, 0.429 g, 17.87 mmol, 3 eq) was added in two portions. The reaction mixture was stirred for at 0° C. for 45 minutes and then stirred at room temperature for 45 minutes. After complete conversion of the reaction as monitored using TLC, the reaction mixture was quenched with aqueous ammonium chloride, and the reaction mixture was extracted with diethyl ether (4×40 mL). The combined organic extracts were dried under $Na_2SO_4$ and concentrated in vacuo to leave a light-yellow oil. Purification by flash chromatography to give alcohol in 1.34 g, 60% as solid.

The benzyl ether (1.5 g, 3.99 mmol, 1 eq) was dissolved in dichloromethane (20 mL). A mixture of TFA (13.3 mL, 200 mmol, 50 eq) and water (9:1, 1.3 mL) was added. The reaction mixture was stirred at room temperature for 3 hours until TLC analysis showed consumption of the starting material. Afterwards all volatiles were removed at the rotary evaporator and the residue was dissolved in 3 M NaOH-solution and the pH was adjusted to pH=13. The mixture was extracted with $CHCl_3$:$^i$PrOH (9:1, 10×50 mL). Combined organic extracts were dried over $MgSO_4$, filtered and concentrated in vacuo to yield (0.490 g, 82%) as a light-yellow oil. Purified through column chromatography in MeOH and $CH_2Cl_2$ solvent system. (TLC 10% MeOH: $CH_2Cl_2$)

The following compounds were prepared using synthetic procedures analogous to those described above in Scheme 17 employing the corresponding amino alcohols provided above.

| Compound | Characterization |
|---|---|
|  | $^1$H NMR (600 MHz, Methanol-$d_4$) δ 8.53 (s, 3H), 4.45 (d, J = 7.1 Hz, 2H), 4.24 (s, 1H), 4.08 (s, 1H), 3.70 (dqd, J = 12.3, 6.1, 1.7 Hz, 3H), 3.64 (s, 1H), 3.43 (dd, J = 10.5, 7.1 Hz, 3H), 3.36-3.31 (m, 2H), 3.21 (d, J = 13.3 Hz, 2H), 3.13 (s, 1H), 3.01-2.96 (m, 4H), 2.90-2.86 (m, 4H), 2.77 (s, 9H), 2.08 (s, 1H), 2.00 (ddd, J = 12.4, 4.3, 2.1 Hz, 3H), 1.94 (s, 1H), 1.87 (s, 1H), 1.70 (p, J = 7.4, 6.7 Hz, 7H), 1.54 (s, 4H), 1.49 (td, J = 12.5, 10.6 Hz, 3H), 1.35 (s, 5H), 1.31 (d, J = 6.3 Hz, 14H), 1.21-1.16 (m, 3H), 1.00 (t, J= 7.3 Hz, 10H), 0.93 (s, 3H). |

| Compound | Characterization |
|---|---|
| 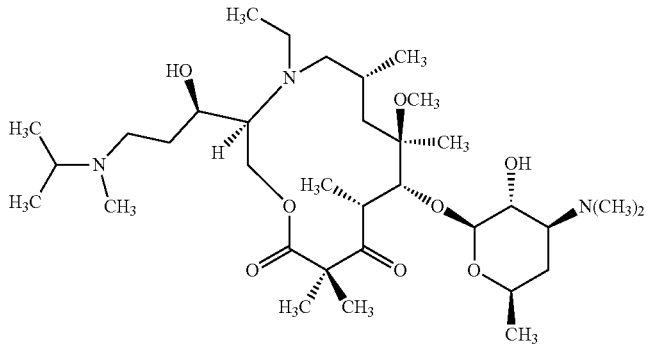<br>224 | 1H NMR (600 MHz, Methanol-d4) δ 8.45 (s, 4H), 4.46 (d, J = 6.9 Hz, 2H), 4.37 (s, 1H), 4.21-4.14 (m, 2H), 3.73 (ddd, J = 12.1, 6.5, 3.5 Hz, 2H), 3.63 (p, J = 6.2 Hz, 2H), 3.55 (s, 1H), 3.49-3.37 (m, 6H), 3.27 (d, J = 6.3 Hz, 2H), 3.23 (s, 1H), 3.16 (s, 1H), 2.96 (s, 3H), 2.82 (s, 9H), 2.76 (s, 4H), 2.08-1.98 (m, 5H), 1.76 (s, 1H), 1.53 (d, J = 4.5 Hz, 7H), 1.37 (s, 5H), 1.34 (dd, J = 11.5, 5.8 Hz, 18H), 1.32 (s, 9H), 1.02 (s, 3H). |
| 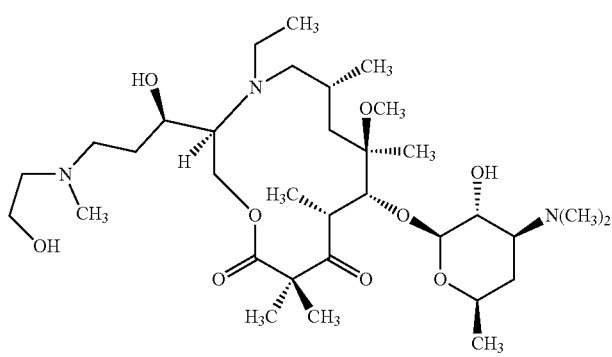<br>225 | $^1$H NMR (600 MHz, Methanol-$d_4$) δ 8.54 (s, 3H), 4.43 (d, J = 7.2 Hz, 2H), 4.18 (d, J = 19.2 Hz, 2H), 4.05 (s, 2H), 3.75 (s, 2H), 3.67 (dddd, J =14.7, 10.4, 7.6, 3.7 Hz, 4H), 3.38 (dd, J = 10.3, 7.2 Hz, 3H), 3.16 (d, J = 7.6 Hz, 1H), 2.68-2.64 (m, 6H), 2.56 (s, 1H), 1.94 (d, J = 12.4 Hz, 2H), 1.84 (s, 1H), 1.54 (s, 4H), 1.43 (q, J = 12.0 Hz, 3H), 1.35 (s, 4H), 1.29 (q, J = 3.9, 2.7 Hz, 16H). |
| 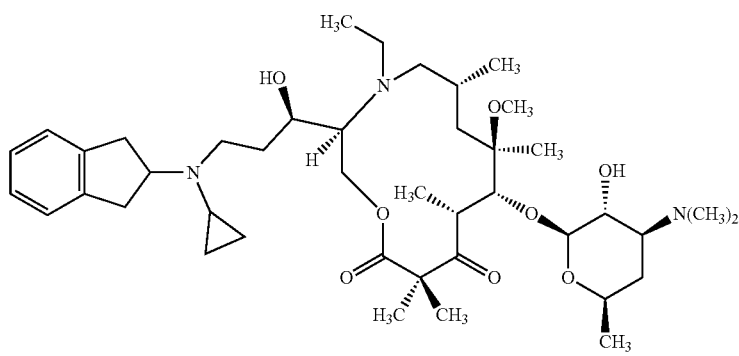<br>226 | $^1$H NMR (600 MHz, Methanol-$d_4$) δ 8.47 (s, 1H), 7.19 (dt, J = 5.8, 3.1 Hz, 2H), 7.11 (dd, J = 5.6, 3.1 Hz, 2H), 4.46 (d, J = 7.0 Hz, 1H), 4.20 (s, 1H), 3.84 (p, J = 7.9 Hz, 1H), 3.73 (qd, J = 6.8, 3.6 Hz, 1H), 3.54 (s, 1H), 3.45 (dd, J = 10.5, 7.0 Hz, 1H), 3.39 (td, J = 11.5, 10.8, 3.9 Hz, 2H), 3.16-3.01 (m, 7H), 2.99 (s, 2H), 2.81 (s, 5H), 2.06-2.00 (m, 3H), 1.82 (s, 1H), 1.53 (d, J = 12.1 Hz, 1H), 1.50 (s, 3H), 1.38-1.30 (m, 13H), 1.07-1.04 (m, 2H), 0.71-0.66 (m, 1H), 0.64 (d, J = 7.1 Hz, 2H), 0.54 (s, 1H). |
| 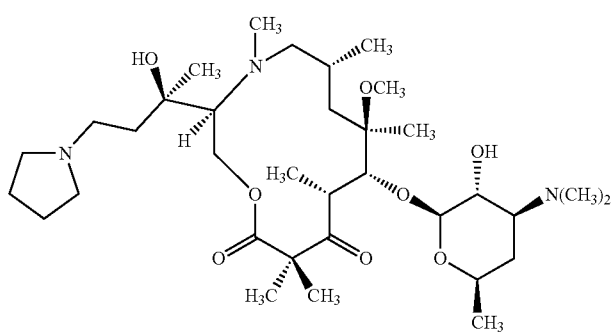<br>227 | $^1$H NMR (600 MHz, Methanol-$d_4$) δ 8.48 (s, 1H), 4.51 (dd, J = 7.1, 1.9 Hz, 2H), 4.42 (d, J = 12.3 Hz, 2H), 4.09 (s, 1H), 3.75-3.69 (m, 2H), 3.59 (p, J = 7.3 Hz, 2H), 3.46 (dd, J = 10.6, 7.1 Hz, 2H), 3.42-3.32 (m, 7H), 3.04 (s, 1H), 2.92 (s, 3H), 2.81 (d, J = 2.2 Hz, 7H), 2.50 (s, 1H), 2.08 (d, J = 6.7 Hz, 5H), 2.02 (ddd, J = 12.3, 4.3, 2.1 Hz, 3H), 1.94 (s, 1H), 1.87-1.83 (m, 2H), 1.57 (s, 3H), 1.55-1.48 (m, 2H), 1.35 (s, 4H), 1.32 (d, J = 6.2 Hz, 5H), 1.30-1.26 (m, 8H), 1.25 (s, 2H), 0.88 (d, J = 7.0 Hz, 3H). |

| Compound | Characterization |
|---|---|
| 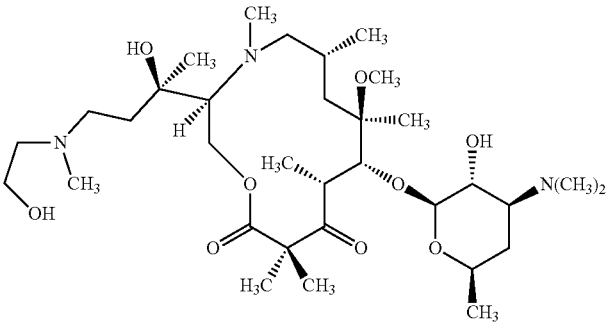<br>228 | ¹H NMR (600 MHz, Methanol-d₄) δ 8.48 (s, 3H), 4.50 (d, J = 7.2 Hz, 1H), 4.41 (q, J = 7.6, 6.5 Hz, 2H), 4.08 (d, J = 8.0 Hz, 1H), 3.83 (t, J = 5.3 Hz, 2H), 3.75-3.68 (m, 1H), 3.59 (p, J = 7.3 Hz, 1H), 3.45 (dd, J = 10.5, 7.2 Hz, 1H), 3.35 (d, J = 6.2 Hz, 1H), 3.31 (s, 21H), 3.16 (s, 1H), 2.92 (s, 2H), 2.80 (d, J = 12.8 Hz, 7H), 2.51 (s, 1H), 2.03-1.96 (m, 2H), 1.87 (d, J = 14.7 Hz, 2H), 1.78 (td, J = 13.8, 11.4, 5.4 Hz, 1H), 1.56 (s, 2H), 1.55-1.46 (m, 2H), 1.35 (s, 3H), 1.34-1.25 (m, 12H), 0.92-0.84 (m, 3H). |
| 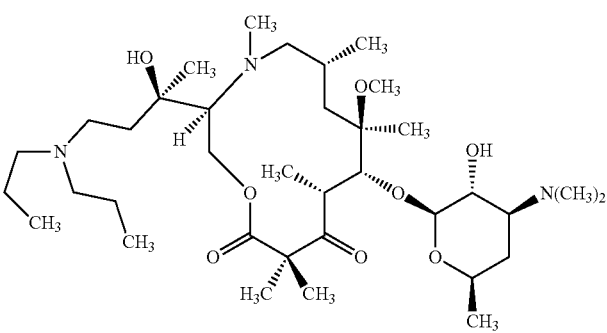<br>229 | ¹H NMR (600 MHz, Methanol-d₄) δ 8.39 (s, 3H), 4.51 (d, J = 7.0 Hz, 1H), 4.42 (q, J = 8.3, 7.9 Hz, 2H), 4.11 (d, J = 8.0 Hz, 1H), 3.72 (dqd, J = 12.2, 6.2, 2.3 Hz, 2H), 3.59 (p, J = 7.0 Hz, 2H), 3.47 (dd, J = 10.5, 7.0 Hz, 1H), 3.44-3.31 (m, 3H), 3.26-3.19 (m, 2H), 3.14-3.02 (m, 5H), 2.93 (s, 3H), 2.82 (s, 6H), 2.56 (s, 1H), 2.02 (ddd, J = 12.3, 4.1, 2.0 Hz, 2H), 1.99 (s, 1H), 1.88-1.78 (m, 3H), 1.75 (dtt, J = 13.4, 10.0, 4.9 Hz, 4H), 1.57 (s, 2H), 1.53 (td, J = 12.3, 10.5 Hz, 2H), 1.36 (s, 3H), 1.30 (dd, J = 20.9, 6.6 Hz, 12H), 1.02 (t, J = 7.3 Hz, 6H), 0.92-0.86 (m, 3H). |

The following compounds were prepared using synthetic procedures analogous to those employed in the present disclosure.

| Compounds |
|---|
| 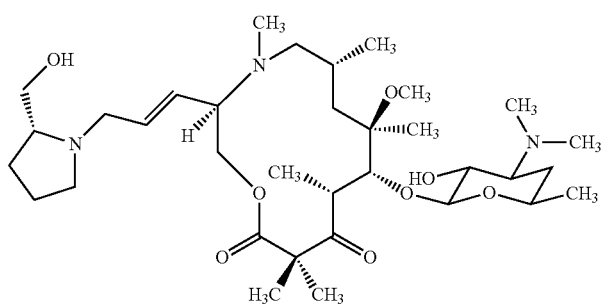<br>230 |
| 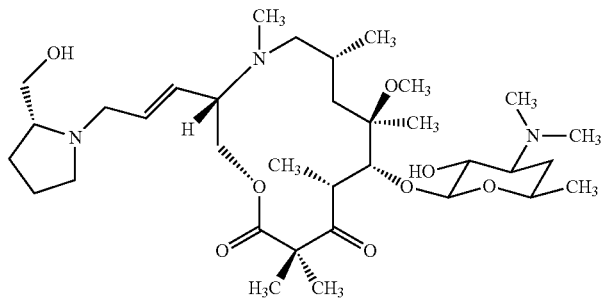<br>231 |

-continued
Compounds
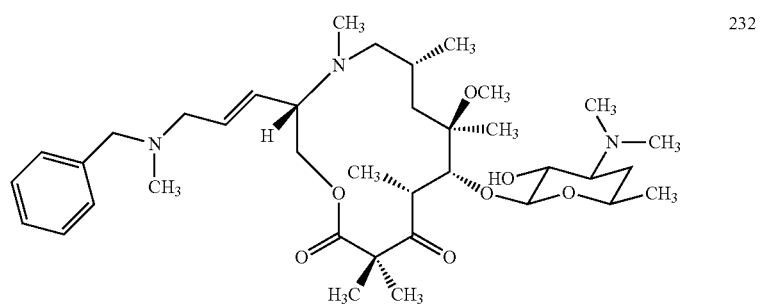
232
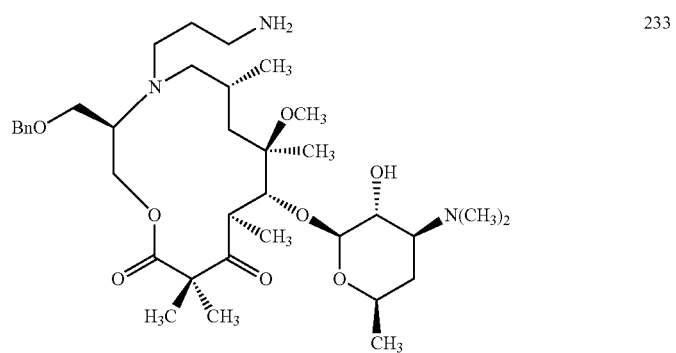
233
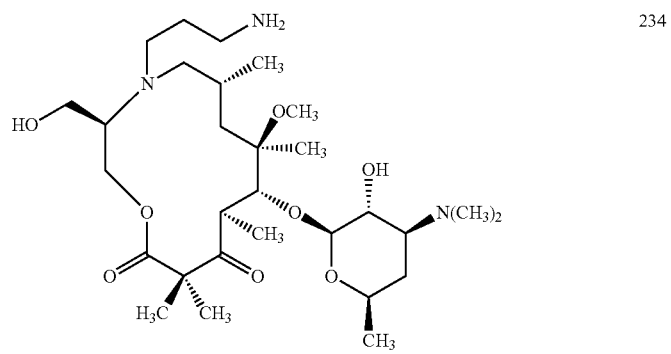
234
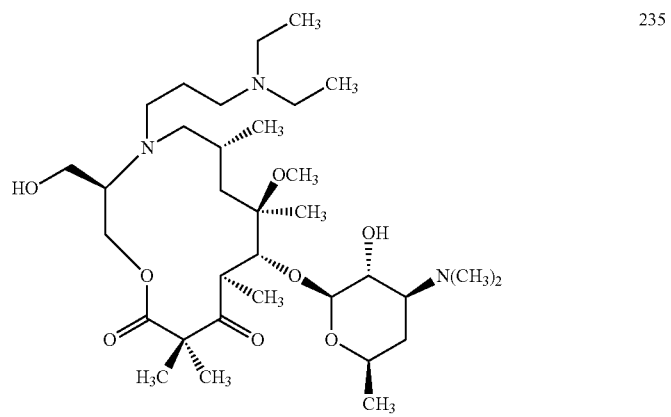
235

-continued
| Compounds |
|---|
| 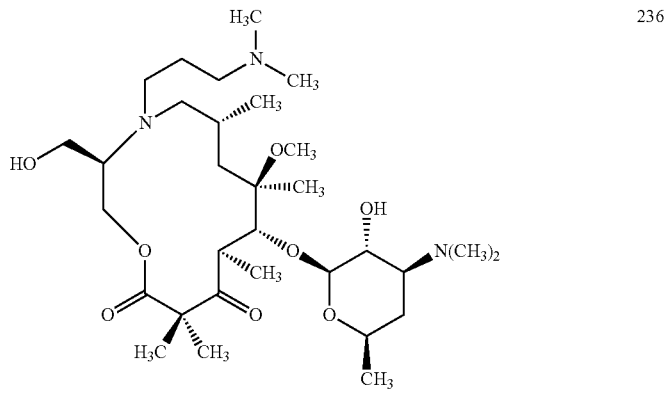 236 |
| 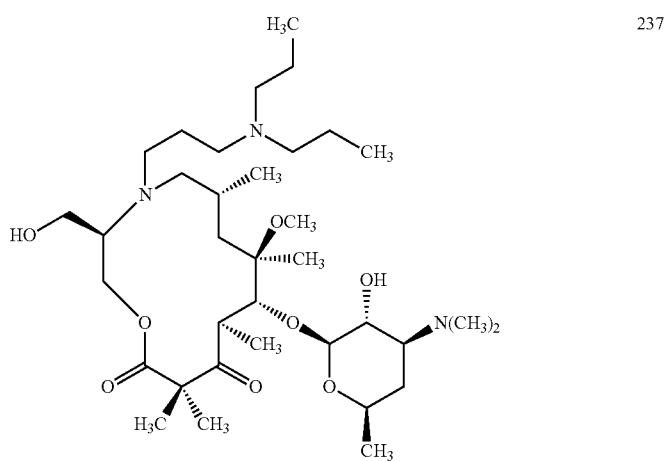 237 |
| 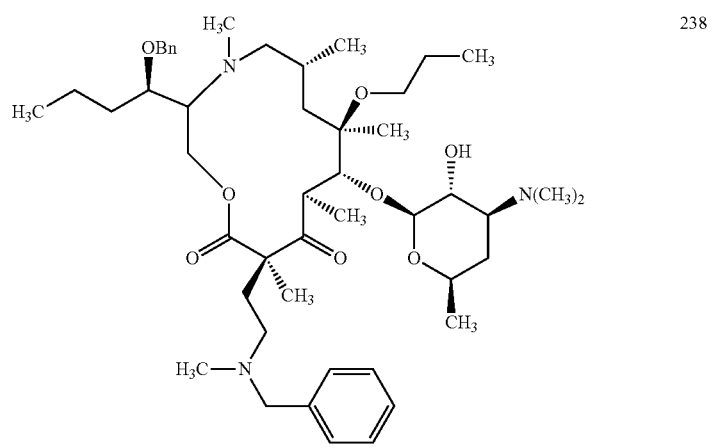 238 |

-continued

Compounds

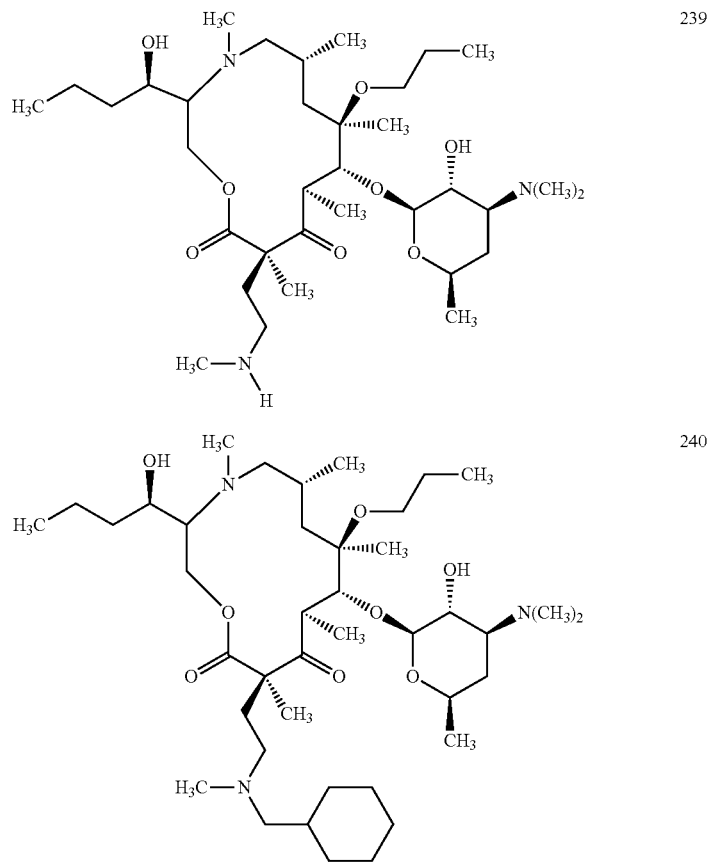

239

240

Biological Testing

Minimum inhibitory concentrations (MICs) for macrolides described herein have been determined for the following strains using similar test procedures as published in US Pat. Pub. No. 2017/0305953

| | |
|---|---|
| S. aureus | MP-12 |
| E. coli | MP-4 |
| K. pneumoniae | MP-546 |
| K. pneumoniae | MP-648 |
| P. aeruginosa | MP-3 |
| A. baumannii | MP-15 |

Several exemplary macrolides demonstrated potent activity against these Gramnegative strains, including multidrug-resistant strains, as depicted in the following Table B. CLSI standard procedures for broth dilution MIC determination were used. MIC data is represented as "+++" for values less than or equal to 4 mg/L, "++" for values of greater than 4 mg/L and less than or equal to 32 mg/L, and "+" for values greater than 32 mg/L. "--" indicates the compound was not tested for a particular strain.

TABLE B

MIC Data for Compounds

| Cmpd # | S. aureus MP-12 | E. coli MP-4 | K. pneumoniae MP-546 | K. pneumoniae MP-648 | P aeruginosa MP-3 | A. baumanii MP-15 |
|---|---|---|---|---|---|---|
| 1 | + | +++ | ++ | + | + | + |
| 2 | + | ++ | + | + | + | + |
| 3 | ++ | +++ | +++ | +++ | + | + |
| 4 | + | +++ | ++ | ++ | + | + |
| 5 | + | ++ | + | -- | + | + |
| 6 | + | +++ | +++ | -- | + | + |
| 7 | ++ | +++ | ++ | +++ | + | + |
| 8 | +++ | +++ | ++ | ++ | + | + |

TABLE B-continued

MIC Data for Compounds

| Cmpd # | S. aureus MP-12 | E. coli MP-4 | K. pneumoniae MP-546 | K. pneumoniae MP-648 | P aeruginosa MP-3 | A. baumanii MP-15 |
|---|---|---|---|---|---|---|
| 9 | + | ++ | ++ | -- | + | + |
| 10 | +++ | +++ | +++ | +++ | + | + |
| 11 | ++ | +++ | +++ | -- | + | + |
| 12 | ++ | +++ | +++ | +++ | + | + |
| 13 | + | ++ | ++ | -- | + | + |
| 14 | + | ++ | ++ | -- | + | + |
| 15 | + | ++ | + | -- | + | + |
| 16 | ++ | +++ | ++ | -- | + | + |
| 17 | + | + | + | -- | + | + |
| 18 | +++ | +++ | +++ | +++ | + | + |
| 19 | ++ | +++ | +++ | -- | + | + |
| 20 | ++ | +++ | +++ | -- | + | + |
| 21 | ++ | +++ | +++ | +++ | +++ | + |
| 22 | + | +++ | ++ | + | + | + |
| 23 | ++ | ++ | ++ | ++ | + | + |
| 24 | ++ | ++ | ++ | + | + | + |
| 25 | + | +++ | ++ | ++ | + | + |
| 26 | + | +++ | ++ | ++ | + | + |
| 27 | + | ++ | ++ | + | + | + |
| 28 | + | + | + | + | + | + |
| 29 | ++ | ++ | + | + | + | + |
| 35 | ++ | +++ | +++ | -- | + | + |
| 36 | ++ | +++ | ++ | -- | + | ++ |
| 37 | + | ++ | + | -- | + | + |
| 38 | + | +++ | +++ | -- | + | + |
| 39 | + | +++ | ++ | -- | + | + |
| 40 | ++ | +++ | ++ | -- | + | ++ |
| 41 | + | ++ | ++ | -- | + | + |
| 42 | ++ | +++ | +++ | -- | + | + |
| 44 | ++ | + | + | -- | + | + |
| 45 | ++ | ++ | ++ | -- | + | + |
| 46 | ++ | +++ | +++ | -- | + | + |
| 47 | ++ | +++ | ++ | -- | + | + |
| 48 | + | +++ | ++ | -- | + | + |
| 49 | + | +++ | ++ | -- | + | + |
| 50 | ++ | +++ | +++ | +++ | + | + |
| 51 | + | ++ | + | + | + | + |
| 52 | ++ | +++ | +++ | ++ | + | + |
| 53 | ++ | +++ | +++ | +++ | + | + |
| 54 | ++ | +++ | +++ | -- | + | + |
| 55 | ++ | +++ | +++ | +++ | + | + |
| 56 | ++ | +++ | +++ | +++ | + | + |
| 57 | ++ | +++ | +++ | +++ | + | + |
| 58 | ++ | +++ | +++ | +++ | + | + |
| 59 | +++ | +++ | +++ | ++ | + | + |
| 60 | ++ | +++ | +++ | +++ | + | + |
| 61 | ++ | +++ | ++ | ++ | + | + |
| 62 | ++ | +++ | +++ | +++ | + | ++ |
| 63 | ++ | +++ | +++ | ++ | + | + |
| 64 | + | + | + | + | + | + |
| 65 | ++ | +++ | +++ | ++ | + | + |
| 66 | + | ++ | ++ | -- | + | + |
| 67 | + | ++ | ++ | -- | + | + |
| 68 | + | ++ | ++ | -- | + | + |
| 69 | ++ | ++ | ++ | -- | + | + |
| 70 | + | +++ | ++ | -- | + | + |
| 71 | + | ++ | + | -- | + | + |
| 72 | + | +++ | ++ | -- | + | + |
| 73 | ++ | +++ | +++ | ++ | + | + |
| 74 | + | + | + | + | + | + |
| 75 | + | ++ | + | + | + | + |
| 76 | + | +++ | ++ | ++ | + | + |
| 77 | ++ | +++ | +++ | +++ | + | + |
| 78 | +++ | +++ | +++ | +++ | + | + |
| 79 | + | ++ | + | + | + | + |
| 80 | ++ | + | + | -- | + | + |
| 81 | ++ | + | + | -- | + | + |
| 83 | ++ | +++ | +++ | -- | + | + |
| 84 | ++ | + | + | -- | + | + |
| 85 | +++ | +++ | +++ | +++ | + | + |
| 87 | +++ | +++ | +++ | +++ | + | + |
| 88 | ++ | +++ | +++ | +++ | + | + |
| 90 | ++ | +++ | +++ | ++ | + | + |
| 91 | + | + | + | -- | + | + |

TABLE B-continued

MIC Data for Compounds

| Cmpd # | S. aureus MP-12 | E. coli MP-4 | K. pneumoniae MP-546 | K. pneumoniae MP-648 | P aeruginosa MP-3 | A. baumanii MP-15 |
|---|---|---|---|---|---|---|
| 92 | + | +++ | ++ | ++ | + | + |
| 93 | ++ | +++ | +++ | +++ | + | + |
| 95 | ++ | +++ | +++ | +++ | + | ++ |
| 96 | ++ | +++ | +++ | ++ | + | + |
| 97 | + | + | + | -- | + | + |
| 98 | ++ | +++ | +++ | +++ | + | + |
| 99 | ++ | +++ | +++ | +++ | + | + |
| 102 | ++ | +++ | +++ | +++ | + | ++ |
| 103 | ++ | +++ | +++ | +++ | + | + |
| 104 | + | ++ | + | -- | + | + |
| 105 | ++ | +++ | ++ | ++ | + | + |
| 106 | ++ | + | + | -- | + | + |
| 107 | ++ | +++ | +++ | +++ | + | + |
| 108 | ++ | +++ | +++ | +++ | + | + |
| 109 | ++ | ++ | + | -- | + | + |
| 110 | ++ | +++ | ++ | ++ | + | + |
| 111 | ++ | +++ | +++ | +++ | + | + |
| 112 | +++ | +++ | +++ | +++ | + | ++ |
| 113 | +++ | +++ | +++ | +++ | + | + |
| 114 | ++ | + | + | -- | + | + |
| 115 | + | + | + | + | + | + |
| 117 | +++ | +++ | +++ | +++ | + | + |
| 118 | ++ | +++ | +++ | +++ | + | ++ |
| 120 | +++ | +++ | +++ | +++ | + | ++ |
| 121 | ++ | +++ | ++ | ++ | + | + |
| 122 | ++ | +++ | +++ | +++ | + | + |
| 123 | + | + | + | + | + | + |
| 124 | ++ | + | + | -- | + | + |
| 125 | ++ | +++ | +++ | ++ | + | + |
| 126 | +++ | +++ | +++ | +++ | + | ++ |
| 127 | ++ | +++ | +++ | +++ | + | + |
| 128 | ++ | +++ | +++ | +++ | + | + |
| 129 | ++ | +++ | +++ | +++ | + | + |
| 130 | + | + | + | -- | + | + |
| 133 | ++ | + | + | -- | + | + |
| 134 | ++ | +++ | +++ | +++ | + | + |
| 135 | ++ | + | + | -- | + | + |
| 136 | + | + | + | -- | + | + |
| 138 | +++ | +++ | +++ | +++ | + | + |
| 139 | ++ | + | + | -- | + | + |
| 140 | ++ | +++ | +++ | +++ | + | + |
| 141 | +++ | +++ | +++ | ++ | + | + |
| 142 | ++ | + | + | -- | + | + |
| 144 | +++ | +++ | +++ | +++ | +++ | + |
| 145 | +++ | +++ | +++ | +++ | +++ | + |
| 146 | ++ | +++ | +++ | +++ | + | + |
| 147 | ++ | +++ | ++ | ++ | + | + |
| 148 | ++ | +++ | ++ | ++ | + | + |
| 149 | +++ | +++ | +++ | +++ | + | + |
| 150 | ++ | +++ | +++ | ++ | + | + |
| 151 | + | ++ | -- | + | + | + |
| 152 | ++ | +++ | -- | ++ | + | + |
| 153 | ++ | +++ | -- | +++ | + | + |
| 154 | + | +++ | -- | ++ | + | + |
| 155 | ++ | +++ | -- | ++ | + | + |
| 156 | ++ | +++ | -- | ++ | + | + |
| 157 | ++ | +++ | -- | ++ | + | + |
| 158 | ++ | +++ | -- | ++ | + | + |
| 159 | ++ | +++ | -- | ++ | + | + |
| 160 | ++ | +++ | +++ | ++ | + | + |
| 161 | +++ | +++ | +++ | +++ | ++ | + |
| 168 | ++ | +++ | ++ | +++ | + | + |
| 169 | ++ | +++ | -- | ++ | + | + |
| 170 | ++ | +++ | -- | +++ | + | + |
| 171 | ++ | +++ | ++ | ++ | + | + |
| 172 | ++ | ++ | ++ | ++ | + | + |
| 173 | + | +++ | +++ | ++ | + | + |
| 174 | ++ | +++ | ++ | ++ | + | + |
| 175 | ++ | +++ | ++ | + | + | + |
| 176 | + | +++ | +++ | ++ | + | + |
| 177 | + | ++ | -- | + | + | + |
| 178 | + | +++ | -- | +++ | + | + |
| 180 | + | +++ | -- | + | + | + |
| 181 | + | +++ | -- | + | + | + |

TABLE B-continued

MIC Data for Compounds

| Cmpd # | S. aureus MP-12 | E. coli MP-4 | K. pneumoniae MP-546 | K. pneumoniae MP-648 | P aeruginosa MP-3 | A. baumanii MP-15 |
|---|---|---|---|---|---|---|
| 182 | ++ | +++ | ++ | ++ | + | + |
| 191 | +++ | +++ | -- | +++ | + | ++ |
| 192 | +++ | +++ | -- | ++ | + | ++ |
| 193 | + | ++ | -- | + | + | + |
| 194 | ++ | +++ | -- | +++ | + | ++ |
| 195 | ++ | +++ | -- | ++ | + | ++ |
| 196 | ++ | +++ | -- | + | + | + |
| 197 | ++ | +++ | -- | ++ | + | + |
| 198 | ++ | ++ | -- | + | + | + |
| 199 | ++ | ++ | -- | + | + | + |
| 200 | + | ++ | -- | + | + | + |
| 201 | + | ++ | -- | + | + | + |
| 202 | + | + | -- | -- | + | + |
| 203 | + | + | -- | -- | + | + |
| 204 | + | + | -- | -- | + | + |
| 205 | + | + | -- | -- | + | + |
| 206 | + | ++ | -- | -- | + | + |
| 207 | + | + | -- | -- | + | + |
| 208 | ++ | + | -- | -- | + | + |
| 209 | ++ | + | -- | -- | + | + |
| 210 | + | + | -- | -- | + | + |
| 211 | + | + | -- | -- | + | + |
| 212 | + | + | -- | -- | + | + |
| 213 | + | + | -- | -- | + | + |
| 215 | + | + | -- | -- | + | + |
| 216 | + | ++ | -- | -- | + | + |
| 217 | + | + | -- | -- | + | + |
| 218 | + | + | -- | -- | + | + |
| 219 | + | + | -- | -- | + | + |
| 220 | + | + | -- | -- | + | + |
| 221 | + | -- | + | -- | -- | -- |
| 223 | ++ | +++ | -- | ++ | + | + |
| 224 | ++ | +++ | -- | ++ | + | + |
| 225 | ++ | +++ | -- | ++ | + | + |
| 226 | ++ | +++ | -- | ++ | + | + |
| 227 | ++ | ++ | -- | + | + | + |
| 228 | + | ++ | -- | +++ | + | + |
| 229 | ++ | ++ | -- | + | + | + |

EQUIVALENTS AND SCOPE

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or all of the group members are present in, employed in, or otherwise relevant to a given product or process.

Furthermore, the invention encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the invention, or aspects of the invention, is/are referred to as comprising particular elements and/or features, certain embodiments of the invention or aspects of the invention consist, or consist essentially of, such elements and/or features. For purposes of simplicity, those embodiments have not been specifically set forth in haec verba herein. It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the invention, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the instant specification, the specification shall control. In addition, any particular embodiment of the present invention that falls within the prior art may be explicitly excluded from any one or more of the claims. Because such embodiments are deemed to be known to one of ordinary skill in the art, they may be excluded even if the exclusion is not set forth explicitly herein. Any particular embodiment of the invention can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present invention, as defined in the following claims.

The invention claimed is:

1. A compound of Formula IIA, IIB, IIC, or IID:

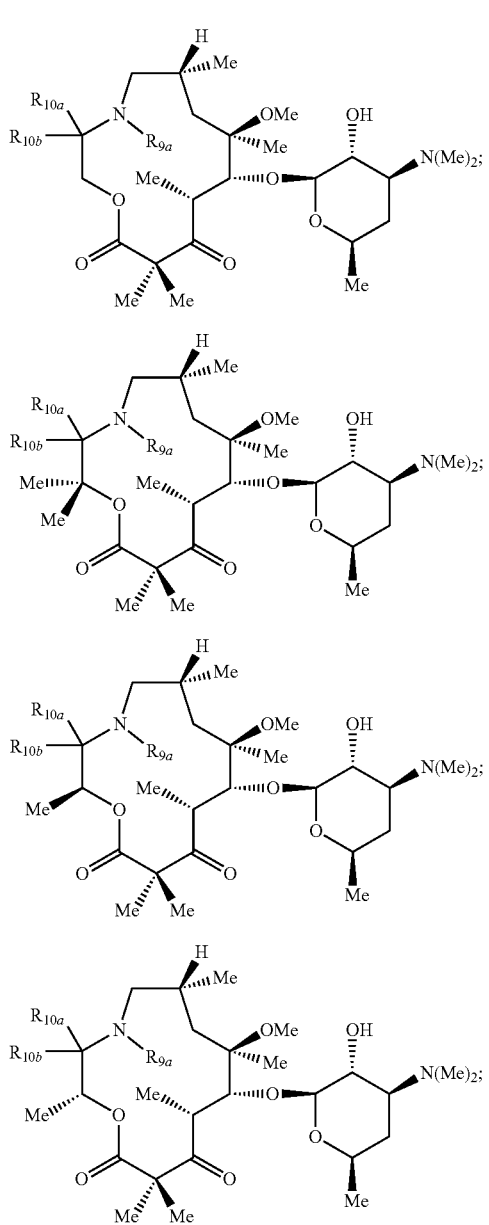

or a pharmaceutically acceptable salt thereof, wherein:
$R_{9a}$ is selected from the group consisting of —H, optionally substituted $C_{1-10}$ alkyl, hydroxyalkyl, optionally substituted $C_{1-10}$ alkylene-$NR_T R_{T'}$, optionally substituted $C_{1-10}$ alkylene-cycloalkyl-$NR_T R_{T'}$, and optionally substituted alkoxyalkyl; wherein $R_T$ and $R_{T'}$ are each independently selected from the group consisting of —H, optionally substituted alkyl, and optionally substituted $C_{1-10}$ alkylene-heterocycloalkyl;

one of $R_{10a}$ and $R_{10b}$ is selected from the group consisting of —H and optionally substituted $C_{1-10}$ alkyl; and the other of $R_{10a}$ and $R_{10b}$ is selected from the group consisting of —$CO_2H$, —$CO_2$— optionally substituted alkyl, optionally substituted $C_{2-10}$ alkylene-$R_{101}$, $C_{2-10}$ alkenylene-$R_{101}$, optionally substituted $C_2$ alkylene-$R_{101a1}$, optionally substituted —$CH_2$—$R_{101a2}$, —CH(OH)—$R_{101a2}$, —CH(OMe)-$R_{101a2}$,

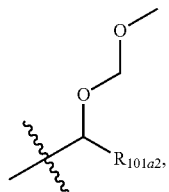

and —C(=O)—$R_{101a2}$;

$R_{101}$ is selected from the group consisting of —H, —S—($C_{1-6}$ alkyl), —SO—($C_{1-6}$ alkyl), —$SO_2$—($C_{1-6}$ alkyl), —OH, —O-alkyl, —$NR_x R_{x'}$, optionally substituted cycloalkyl, optionally substituted heterocycloalkyl, optionally substituted aryl, and optionally substituted heteroaryl;

$R_{101a1}$ is selected from the group consisting of —H, —S—($C_{1-6}$ alkyl), —SO—($C_{1-6}$ alkyl), —$SO_2$—($C_{1-6}$ alkyl), —OH, —O-alkyl, —$NR_x R_{x'}$, optionally substituted cycloalkyl, optionally substituted heterocycloalkyl, optionally substituted aryl, and optionally substituted heteroaryl;

$R_{101a2}$ is selected from the group consisting of —H, —OH, —O-alkyl, —$NR_x R_{x'}$, optionally substituted cycloalkyl, optionally substituted heterocycloalkyl, optionally substituted aryl, and optionally substituted heteroaryl;

wherein if either $R_{10a}$ or $R_{10b}$ are —H, then $R_{101a2}$ is not —H;

wherein if $R_{10b}$ is —H, then $R_{101a1}$ is not —H;

$R_x$ and $R_{x'}$ are each independently selected from the group consisting of —H, optionally substituted alkyl, optionally substituted carbocyclyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-N($R_{y'}$) ($R_{y''}$); wherein $R_{y'}$ and $R_{y''}$ are each independently —H or optionally substituted alkyl; or $R_x$ and $R_{x'}$ together with the atom to which they are attached form an optionally substituted 3-, 4-, 5-, 6-, or 7-membered ring optionally containing an additional heteroatom selected from the group consisting of O, S, SO, $SO_2$, $NR_y$, and N—($C_{1-10}$ alkyl); and wherein: each $R_y$ is independently selected from the group consisting of —H and optionally substituted $C_{1-10}$ alkyl.

2. The compound of claim 1, or a pharmaceutically acceptable salt thereof, wherein $R_{9a}$ is —H, methyl, ethyl, propyl, isopropyl, butyl, or isobutyl.

3. The compound of claim 1, or a pharmaceutically acceptable salt thereof, wherein:

$R_{10a}$ is an optionally substituted $C_3$ alkylene-$R_{101}$;

$R_{101}$ is selected from the group consisting of —H, —OH, —O-alkyl, —$NR_xR_{x'}$, optionally substituted cycloalkyl, optionally substituted heterocycloalkyl, optionally substituted aryl, and optionally substituted heteroaryl; or $R_{10a}$ is an optionally substituted $C_2$ alkylene-$R_{101a1}$;

$R_{101a1}$ is selected from the group consisting of —H, —S—($C_{1-6}$ alkyl), —SO—($C_{1-6}$ alkyl), —$SO_2$—($C_{1-6}$ alkyl), —OH, —O-alkyl, —$NR_xR_{x'}$, optionally substituted cycloalkyl, optionally substituted heterocycloalkyl, optionally substituted aryl, and optionally substituted heteroaryl;

wherein if $R_{10b}$ is —H, then $R_{101a1}$ is not —H; or $R_{10a}$ is an optionally substituted —$CH_2$—$R_{101a2}$, —CH(OH)—$R_{101a2}$, —CH(OMe)-$R_{101a2}$,

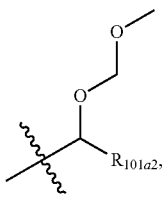

or —C(=O)—$R_{101a2}$;

$R_{101a2}$ is selected from the group consisting of —H, —OH, —O-alkyl, —$NR_xR_{x'}$, optionally substituted cycloalkyl, optionally substituted heterocycloalkyl, optionally substituted aryl, and optionally substituted heteroaryl;

wherein if $R_{10b}$ is —H, then $R_{101a2}$ is not —H; wherein $R_x$ and $R_{x'}$ are each independently selected from the group consisting of —H, optionally substituted alkyl, optionally substituted carbocyclyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-N($R_{y'}$)($R_{y''}$); wherein $R_y'$ and $R_y''$ are each independently —H or optionally substituted alkyl; or $R_x$ and $R_{x'}$ together with the atom to which they are attached form an optionally substituted 3-, 4-, 5-, 6-, or 7-membered ring optionally containing an additional heteroatom selected from the group consisting of O, S, SO, $SO_2$, $NR_y$, and N—($C_{1-10}$ alkyl); and wherein each $R_y$ is independently selected from the group consisting of —H and optionally substituted $C_{1-10}$ alkyl.

4. The compound of claim 3, or a pharmaceutically acceptable salt thereof, wherein:

$R_{10a}$ is selected from the group consisting of an optionally substituted —$CH_2CH_2CH_2$—$R_{101}$, optionally substituted —CH(OH)$CH_2CH_2CH$—$R_{101}$, and optionally substituted —CH(OMe)$CH_2CH_2CH$—$R_{101}$ and $R_{101}$ is selected from the group consisting of —H, —OH, —O-alkyl, —N(Me)(Et), —N(Me)$_2$, —N(Me)(t-Bu), —N(Me)(iPr), —NH(Me), —NH(iPr), —N(Et)$_2$, —N(Me)(cyclopropyl), —NH(cyclopropyl), —N(Me)(cyclobutyl), —NH(cyclobutyl), —N(Me)(cyclopentyl), —NH(cyclopentyl), —N(Me)(cyclohexyl), —NH(cyclohexyl), optionally substituted aziridinyl, optionally substituted azetidinyl, optionally substituted pyrollidinyl, optionally substituted piperidinyl, optionally substituted piperazinyl, optionally substituted morpholinyl, optionally substituted piperazinyl-2-one, optionally substituted tetrahydroisoquinolinyl, optionally substituted indolinyl, and optionally substituted isoindolinyl; or $R_{101a2}$ is an optionally substituted

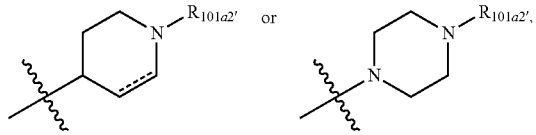

wherein $R_{101a2'}$ is —H, optionally substituted alkyl, optionally substituted alkenyl, optionally substituted cycloalkyl, optionally substituted cycloalkenyl, optionally substituted heterocycloalkyl, —C(=O)—H, —C(=O)-optionally substituted cycloalkyl, —C(=O)-optionally substituted alkylene-$R_{101a2''}$, or optionally substituted alkylene-$R_{101a2''}$, wherein $R_{101a2''}$ is selected from the group consisting of H, optionally substituted cycloalkyl, optionally substituted heterocycloalkyl, optionally substituted aryl, and optionally substituted heteroaryl; or $R_{10a}$ is an optionally substituted $C_{2-5}$ alkenylene-$R_{101}$ selected from the group consisting of

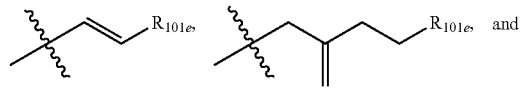

wherein $R_{101e}$ is selected from H, optionally substituted alkyl, optionally substituted cycloalkyl, optionally substituted heterocycloalkyl, optionally substituted aryl, optionally substituted heteroaryl, and $NR_xR_{x'}$, wherein $R_x$ and $R_{x'}$ are each independently selected from the group consisting of —H, optionally substituted alkyl, optionally substituted carbocyclyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-N($R_{y'}$)($R_{y''}$); wherein $R_{y'}$ and $R_{y''}$ are each independently —H or optionally substituted alkyl; or $R_x$ and $R_{x'}$ together with the atom to which they are attached form an optionally substituted 3-, 4-, 5-, 6-, or 7-membered ring optionally containing an additional heteroatom selected from the group consisting of O, S, SO, $SO_2$, $NR_y$, and N—($C_{1-10}$ alkyl); and wherein each $R_y$ is independently selected from the group consisting of —H and optionally substituted $C_{1-10}$ alkyl; or $R_{10a}$ is an optionally substituted alkenylene-$R_{101}$ which is

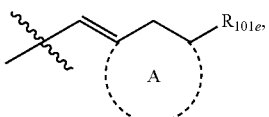

wherein A is an optionally substituted cycloalkyl or heterocycloalkyl and $R_{101e}$ is selected from the group consisting of —H, alkyl, and —$NR_xR_{x'}$, wherein $R_x$ and $R_{x'}$ are each independently selected from the group consisting of —H and optionally substituted alkyl, and wherein "⁓" indicates a point of attachment.

5. The compound of claim 3, or a pharmaceutically acceptable salt thereof, wherein $R_{10a}$ is selected from the group consisting of:

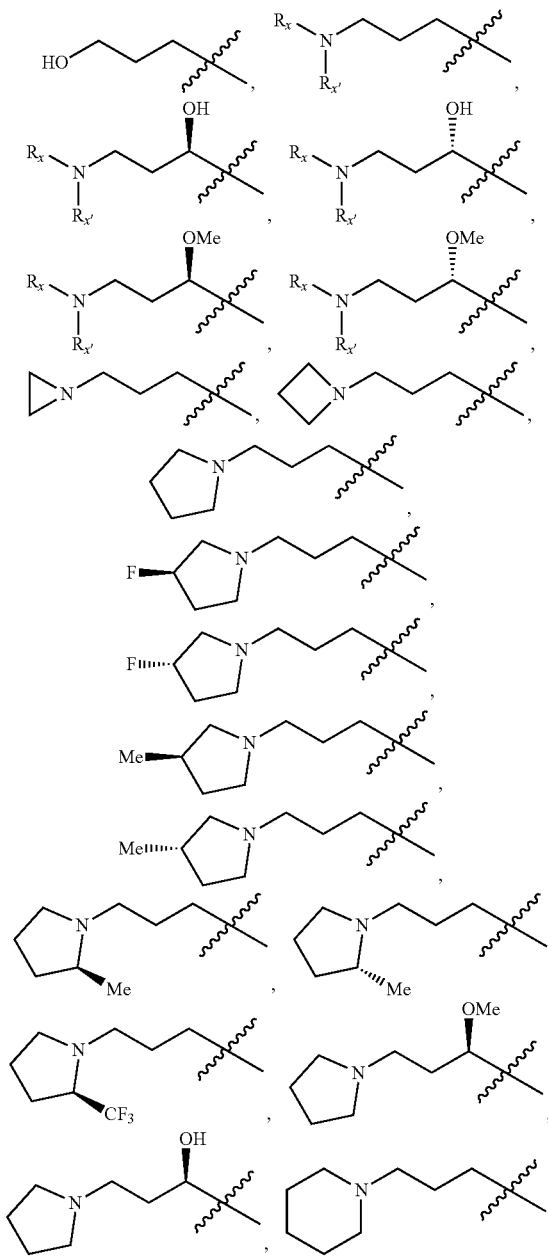

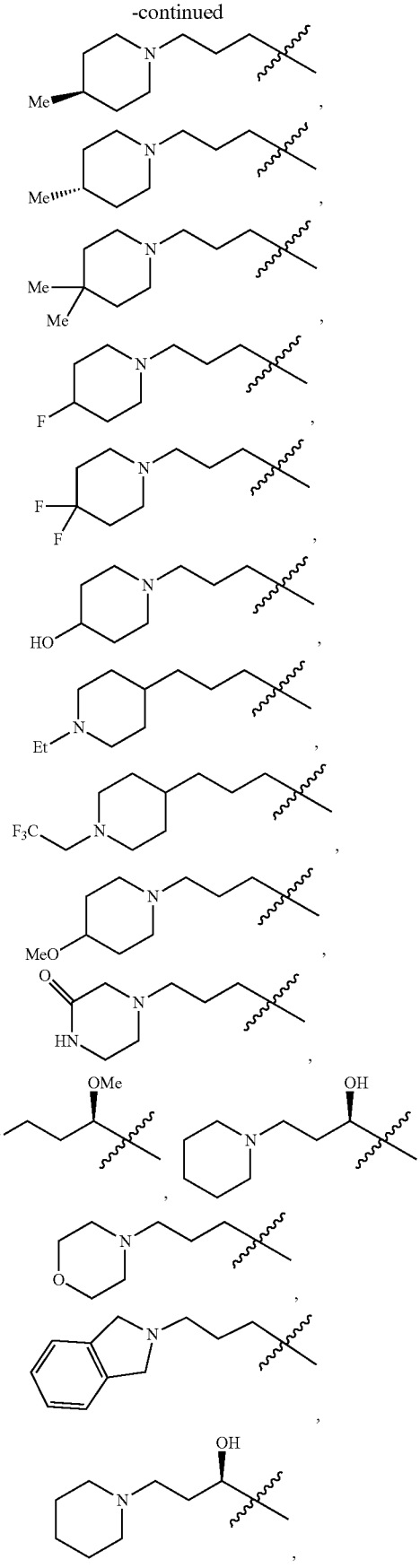

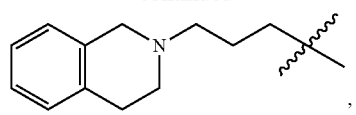
MeSCH₂CH₂—, MeSOCH₂CH₂—, MeSO₂CH₂CH₂—,
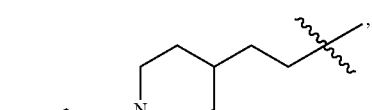
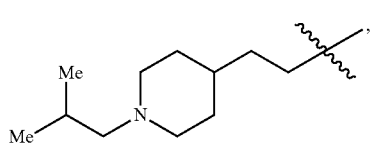
—CH₂NHMe, —CH₂N(Me)₂, —CH₂N(Me)(cyclopropyl),
—CH₂NH(oxetanyl), —CH₂NHCH₂(cyclopropyl),
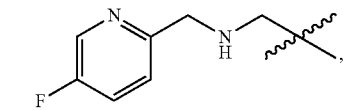
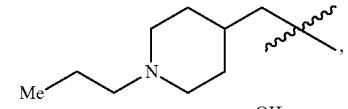
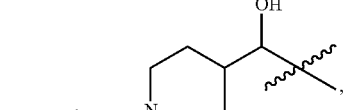
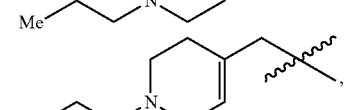
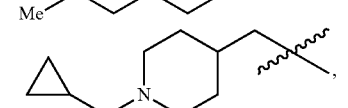
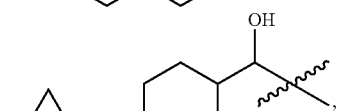
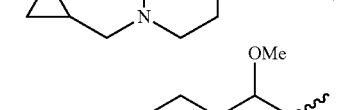
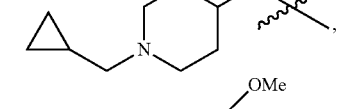
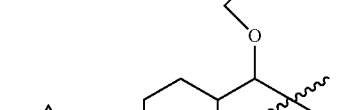
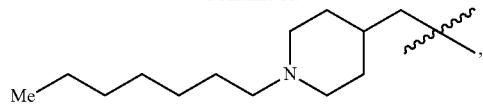
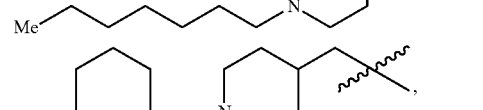
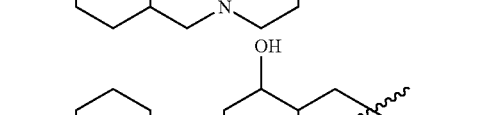
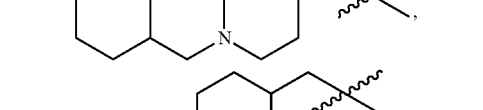
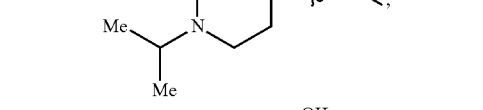
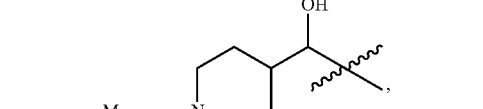
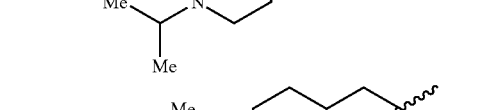
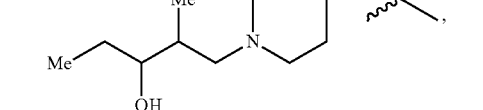
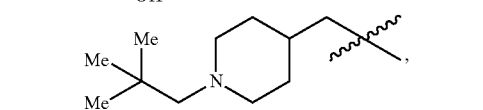
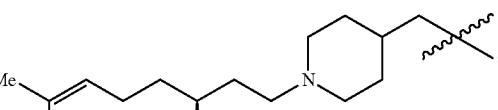
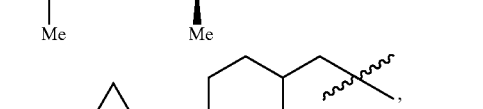
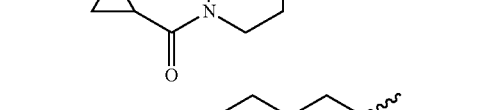
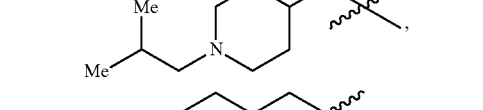
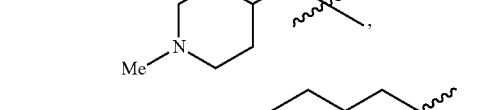
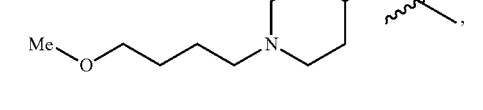

-continued
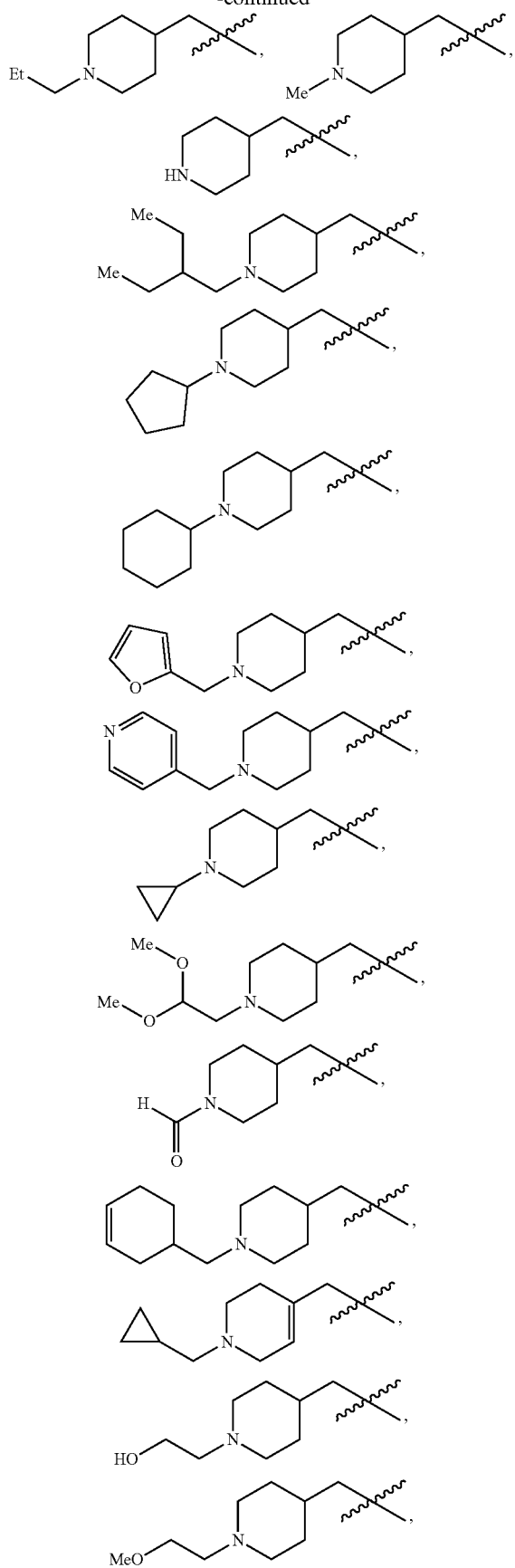
-continued
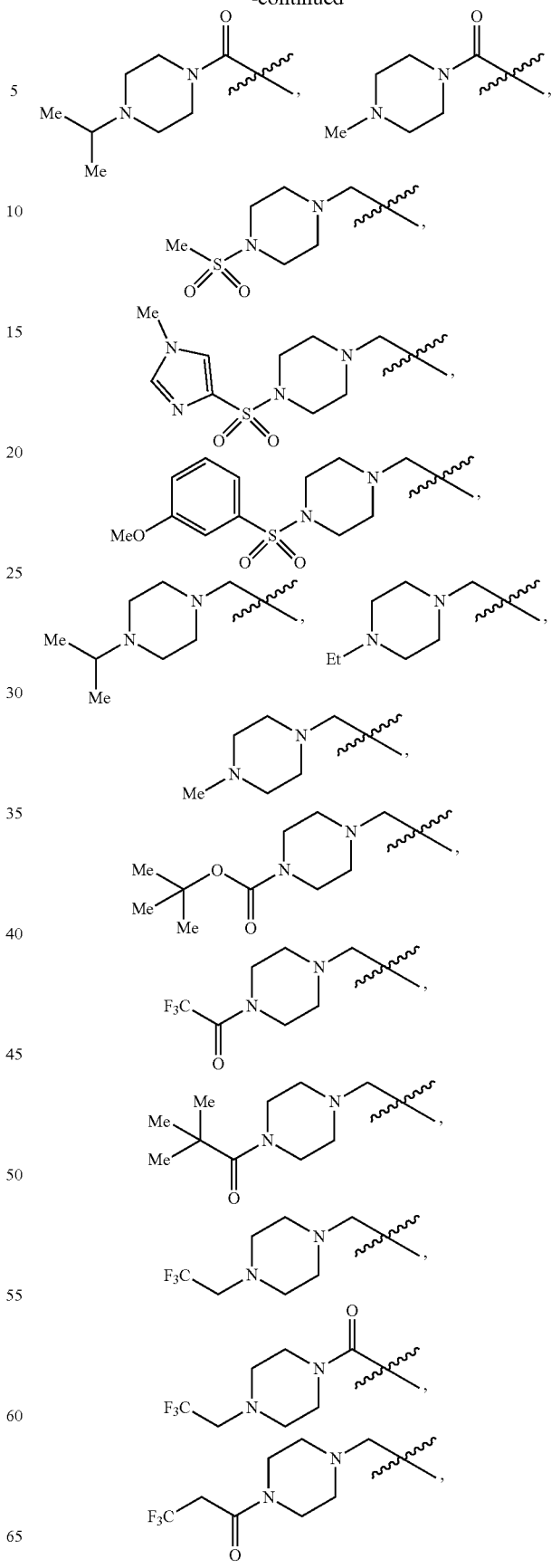

451

-continued

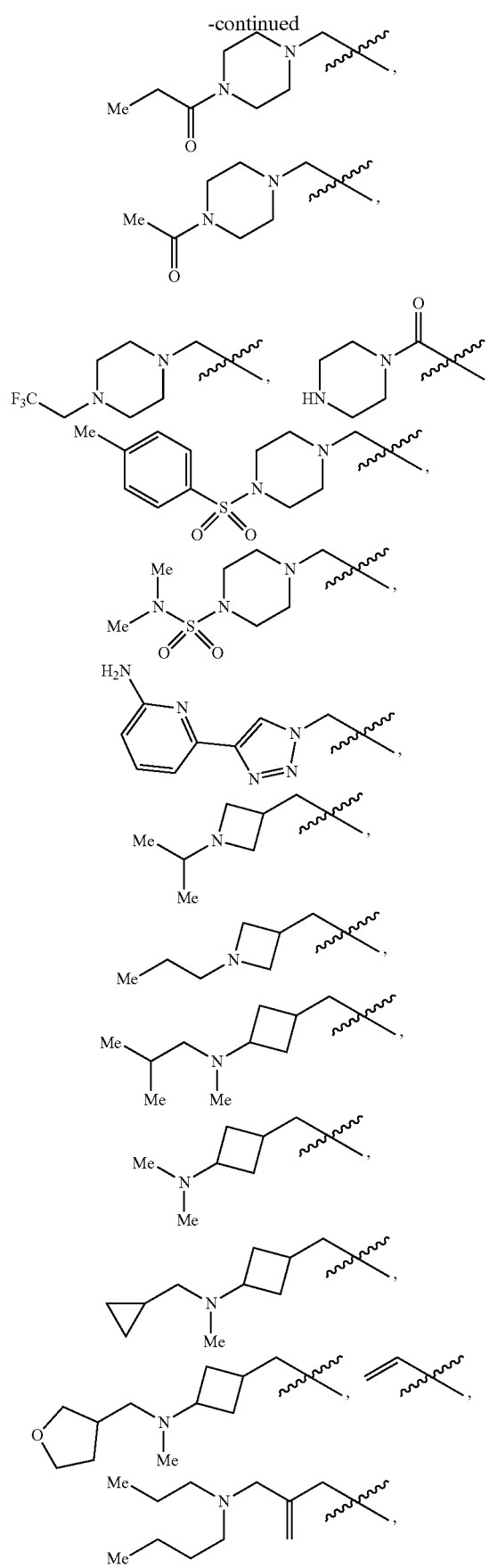

452

-continued

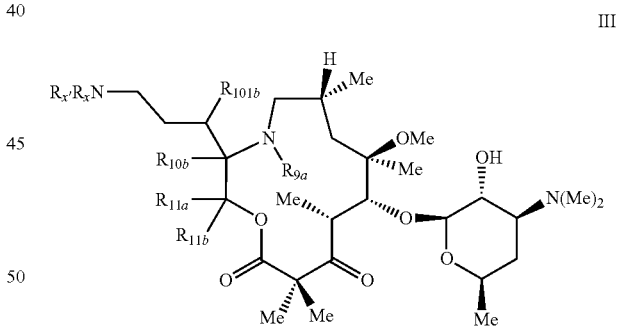

wherein
NR$_x$R$_{x'}$ is selected from the group consisting of —N(Me)(Et), —N(Me)$_2$, —N(Me)(t-Bu), —N(Me)(iPr), —NH(Me), —NH(iPr), —N(Et)$_2$, —N(Me) (cyclopropyl), —NH(cyclopropyl), —N(Me)(cyclobutyl), —NH (cyclobutyl), —N(Me) (cyclopentyl), —NH (cyclopentyl), —N(Me)(cyclohexyl), and —NH(cyclohexyl); and wherein "⁓" indicates a point of attachment.

6. The compound of claim 1, which is a compound of formula III:

III

[structure of formula III]

or a pharmaceutically acceptable salt thereof, wherein:
R$_{101b}$ is —H, methyl, or methoxy;
R$_{10b}$ is —H or alkyl;
R$_{11a}$ and R$_{11b}$ are independently selected from the group consisting of —H and methyl;
R$_x$ and R$_{x'}$ are each independently selected from the group consisting of —H, optionally substituted alkyl, optionally substituted carbocyclyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-N(R$_y$)$_2$; or R$_x$ and R$_{x'}$ together with the atom to which they are attached form an optionally substituted 3-, 4-, 5-, 6-, or 7-membered ring optionally containing an additional heteroatom selected from the group consisting of O, S, SO, SO$_2$, NR$_y$, and N—(C$_{1-10}$ alkyl); and wherein each R$_y$ is independently selected from the group consisting of —H and optionally substituted C$_{1-10}$ alkyl.

7. The compound of claim 6, or a pharmaceutically acceptable salt thereof, wherein NR$_x$R$_{x'}$ is selected from the group consisting of —N(Me)(Et), —N(Me)$_2$, —N(Me)(t-Bu), —N(Me)(iPr), —NH(Me), —NH(iPr), —N(Et)$_2$, —N(Me)(cyclopropyl), —NH(cyclopropyl), —N(Me)(cyclobutyl), —NH(cyclobutyl), —N(Me)(cyclopentyl), —NH(cyclopentyl), —N(Me)(cyclohexyl), and —NH(cyclohexyl).

8. The compound of claim 1, which is a compound of formula IV:

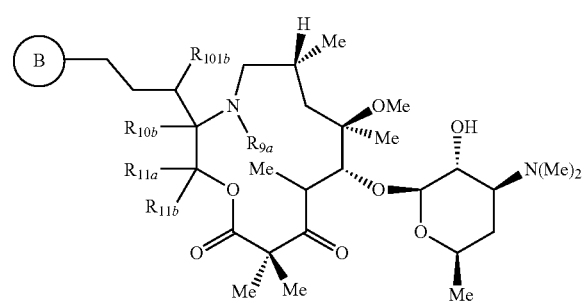

IV or a pharmaceutically acceptable salt thereof, wherein:

R$_{101b}$ is —H, methyl, or methoxy;

R$_{10b}$ is —H or alkyl;

R$_{11a}$ and R$_{11b}$ are independently selected from the group consisting of —H and methyl; and

is selected from the group consisting of optionally substituted cycloalkyl, optionally substituted heterocycloalkyl, optionally substituted aryl, and optionally substituted heteroaryl; further wherein

is optionally substituted aziridinyl, optionally substituted azetidinyl, optionally substituted pyrollidinyl, optionally substituted piperidinyl, optionally substituted piperazinyl, optionally substituted morpholinyl, optionally substituted piperazinyl-2-one, optionally substituted tetrahydroisoquinolinyl, optionally substituted indolinyl, or optionally substituted isoindolinyl.

9. The compound of claim 1, which is a compound of formula V:

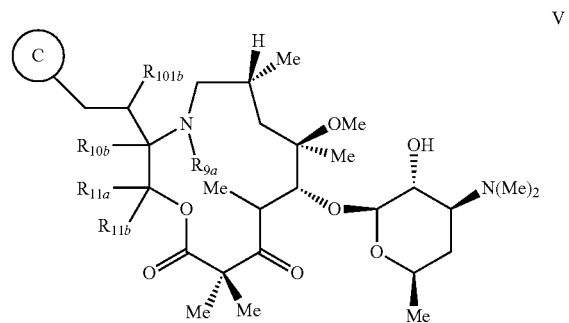

V or a pharmaceutically acceptable salt thereof, wherein:

R$_{101b}$ is —H, methyl, or methoxy;

R$_{10b}$ is —H or alkyl;

R$_{11a}$ and R$_{11b}$ are independently selected from the group consisting of —H and methyl; and

is selected from the group consisting of optionally substituted heterocycloalkyl.

10. The compound of claim 1, which is a compound of formula VI:

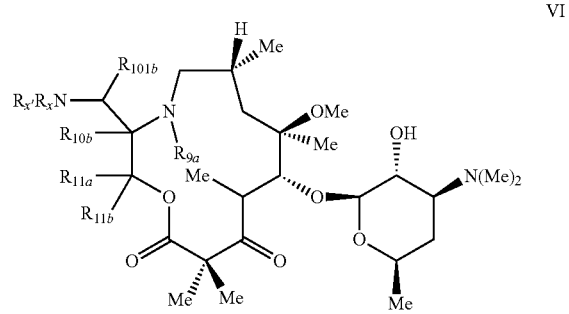

VI or a pharmaceutically acceptable salt thereof, wherein:

R$_{101b}$ is —H;

R$_{10b}$ is —H or alkyl;

R$_{11a}$ and R$_{11b}$ are independently selected from the group consisting of —H and methyl; and R$_x$ and R$_{x'}$ are each independently selected from the group consisting of —H, optionally substituted alkyl, optionally substituted carbocyclyl, optionally substituted heterocycloalkyl, optionally substituted aryl, optionally substituted heteroaryl, optionally substituted alkylene-cycloalkyl, optionally substituted alkylene-heterocycloalkyl, optionally substituted alkylene-aryl, optionally substituted alkylene-heteroaryl, —C(=O)-alkyl, and —C(=O)-alkylene-N(R$_{y'}$)(R$_{y''}$); wherein R$_{y'}$ and R$_{y''}$ are each independently —H or optionally substituted alkyl; or R$_x$ and R$_{x'}$ together with the atom to which they are attached form an optionally substituted 3-, 4-, 5-, 6-, or 7-membered ring optionally containing an additional heteroatom selected from the group consisting of O, S, SO, SO$_2$, NR$_y$, and N—(C$_{1-10}$ alkyl); and wherein each R$_y$ is independently selected from the group consisting of —H and optionally substituted C$_{1-10}$ alkyl; or one of R$_x$ and R$_{x'}$ is —H or alkyl and the other is Rz, wherein R$_z$ is —(C=O)-cycloalkyl or —(C=O)-alkylene-NR$_{z''}$R$_{z'''}$; wherein R$_{z''}$ and R$_{z'''}$ are each independently —H or alkyl; or R$_z$ is -alkylene-R$_{101a}$ wherein R$_{101a}$ is optionally substituted heteroaryl.

11. The compound of claim 1, which is a compound of formula VII:

VII

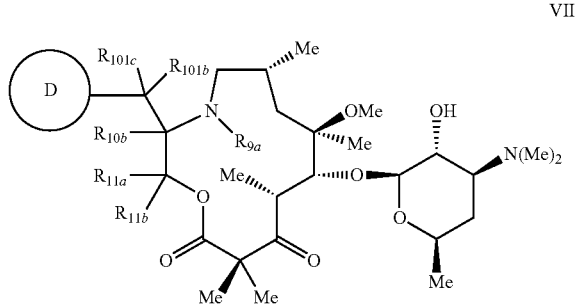

or a pharmaceutically acceptable salt thereof, wherein:

R$_{101c}$ is —H;

R$_{101b}$ is —H, —OH, —OMe, or —OCH$_2$—OMe; or

R$_{101b}$ and R$_{101c}$ form —C=O; and

R$_{101}$ is selected from the group consisting of optionally substituted cyclobutyl, optionally substituted azetinyl, optionally substituted pyrrolidinyl, optionally substituted piperidinyl, optionally substituted piperazinyl, optionally substituted morpholinyl, and optionally substituted triazolyl;

R$_{10b}$ is —H or alkyl;

R$_{11a}$ and R$_{11b}$ are independently selected from the group consisting of —H and methyl; and

is selected from the group consisting of optionally substituted cyclobutyl, optionally substituted azetinyl, optionally substituted pyrrolidinyl, optionally substituted piperidinyl, optionally substituted piperazinyl, optionally substituted morpholinyl, and optionally substituted triazolyl.

12. A compound according to claim 1, or a pharmaceutically acceptable salt thereof, wherein the compound is selected from the group consisting of:

| Compound # | Structure |
|---|---|
| 1 | ![structure 1] |
| 2 | ![structure 2] |

-continued

| Compound # | Structure |
|---|---|
| 3 | |
| 4 | |
| 5 | |
| 6 | |
| 7 | |

-continued

| Compound # | Structure |
|---|---|
| 8 | |
| 9 | |
| 10 | |
| 11 | |
| 12 | |

-continued

| Compound # | Structure |
|---|---|
| 13 | |
| 14 | |
| 15 | |
| 16 | |
| 17 | |

-continued
| Compound # | Structure |
|---|---|
| 18 | 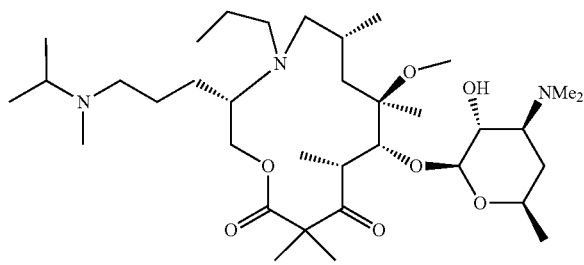 |
| 19 | 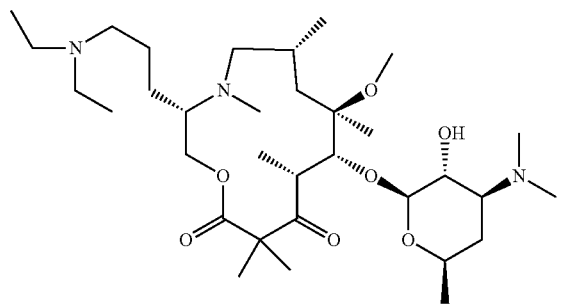 [SMILES: CCN(CC)CCC[C@H]1COC(=O)C(C)(C)C(=O)[C@H](C)[C@@H](O[C@@H]2O[C@H](C)C[C@H](N(C)C)[C@H]2O)[C@](C)(OC)C[C@@H](C)CN1C] |
| 20 | 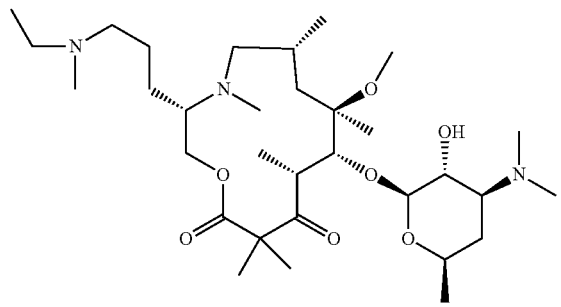 [SMILES: CCN(C)CCC[C@H]1COC(=O)C(C)(C)C(=O)[C@H](C)[C@@H](O[C@@H]2O[C@H](C)C[C@H](N(C)C)[C@H]2O)[C@](C)(OC)C[C@@H](C)CN1C] |
| 21 | 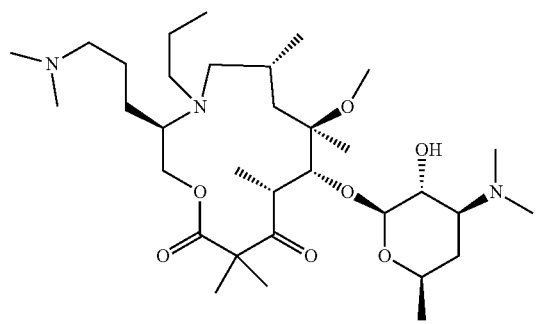 |
| 22 | 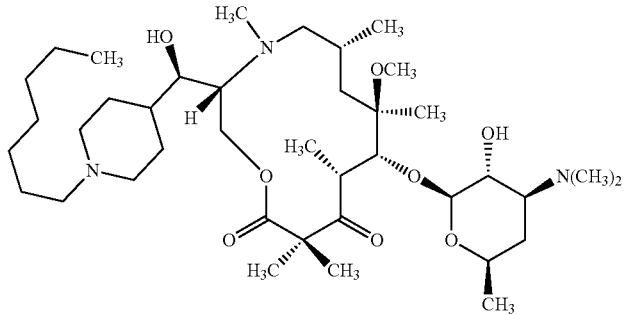 |

-continued
| Compound # | Structure |
|---|---|
| 23 | 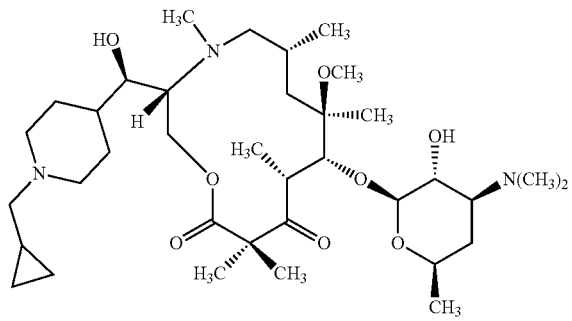 |
| 24 | 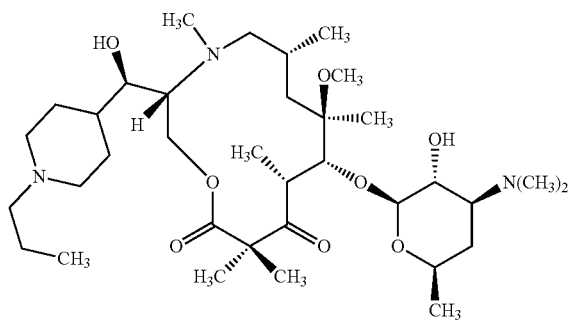 |
| 25 | 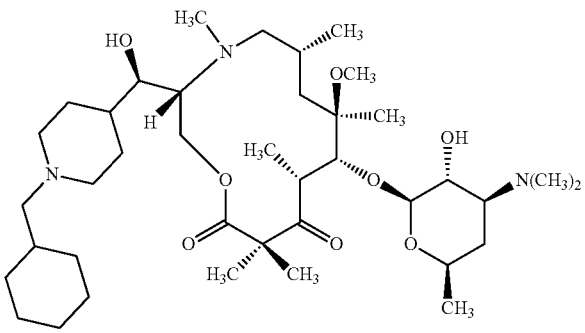 |
| 26 | 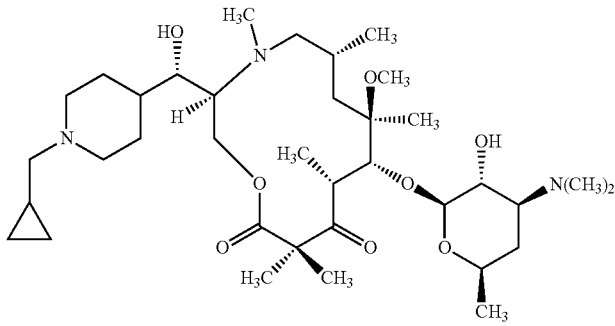 |

| Compound # | Structure |
|---|---|
| 27 | 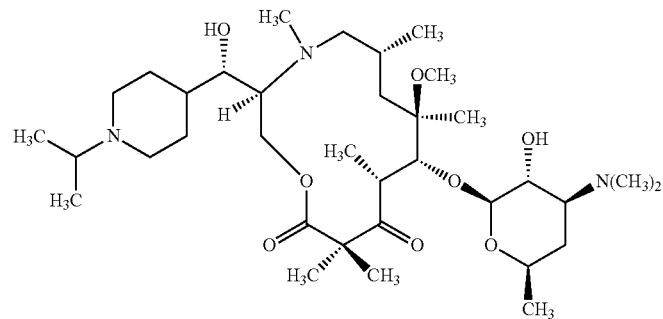 |
| 28 | 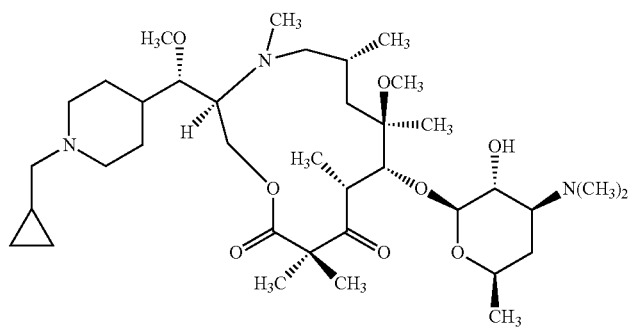 |
| 29 | 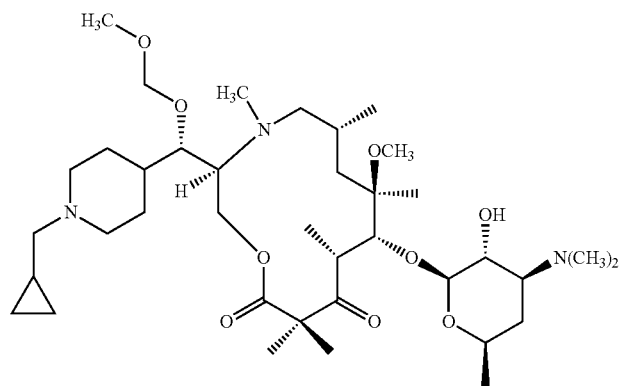 |
| 35 | 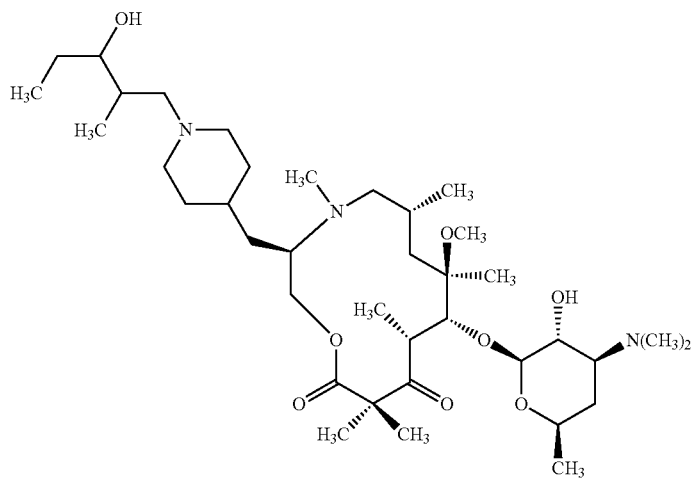 |

-continued

| Compound # | Structure |
|---|---|
| 36 | |
| 37 | |
| 38 | |

-continued
| Compound # | Structure |
|---|---|
| 39 | 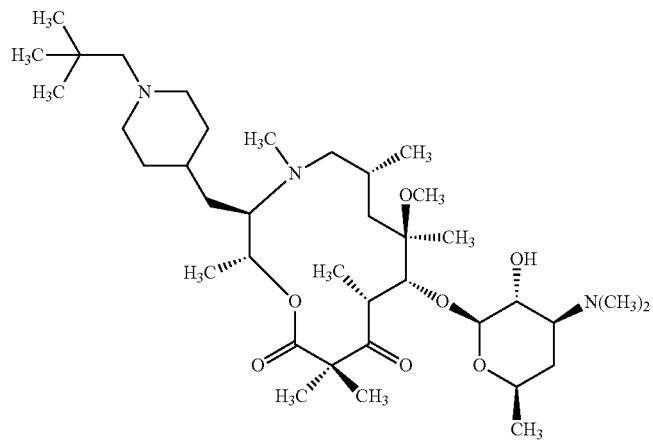 |
| 40 | 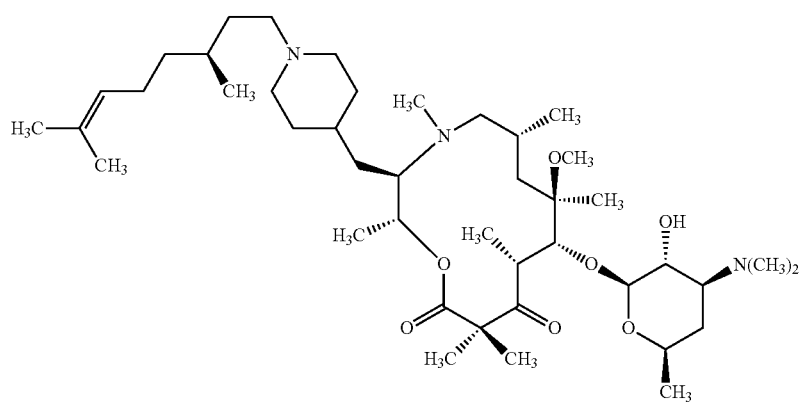 |
| 41 | 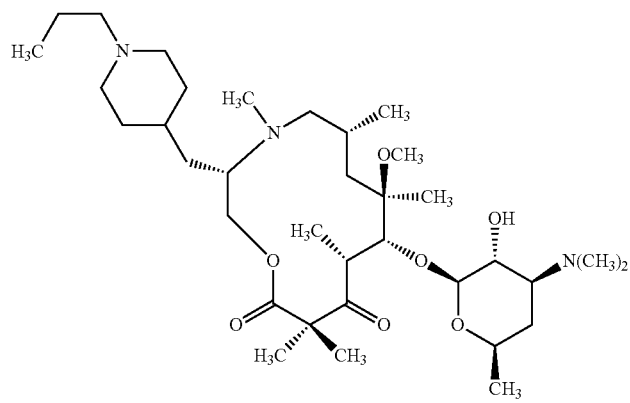 |

| Compound # | Structure |
|---|---|
| 42 | 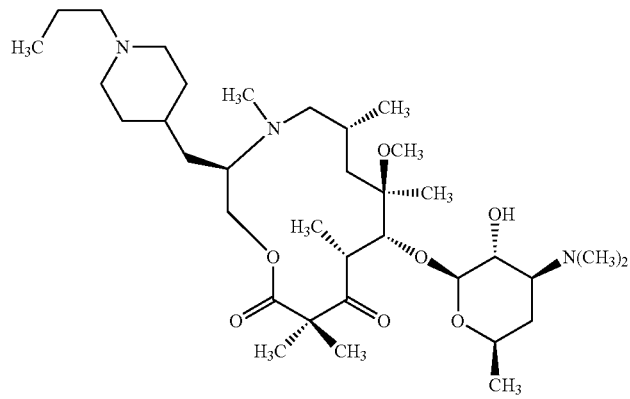 |
| 44 | 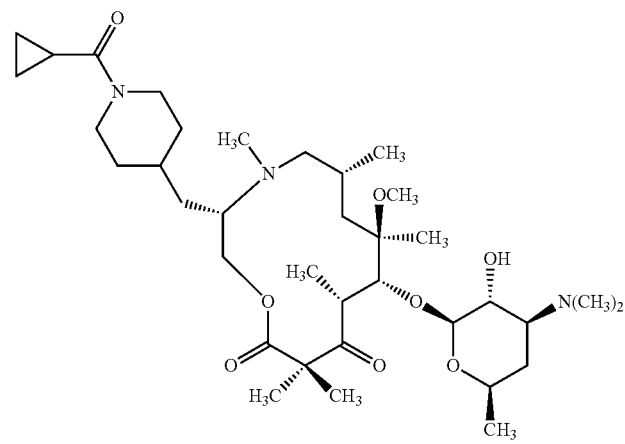 |
| 45 | 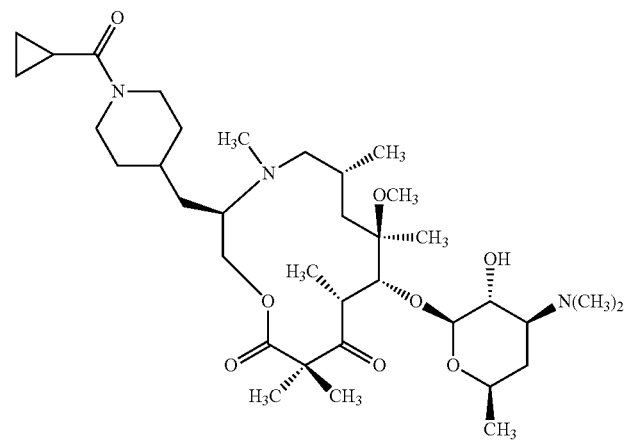 |

| Compound # | Structure |
|---|---|
| 46 | 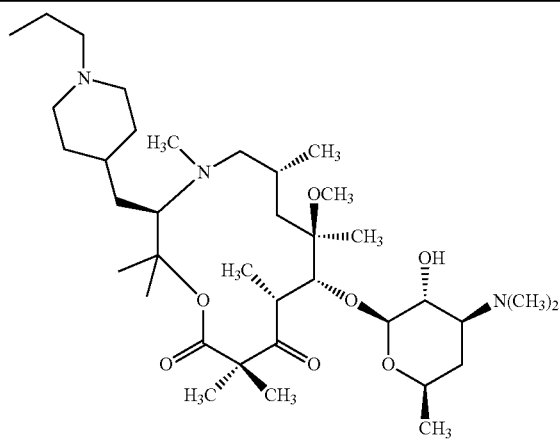 |
| 47 | 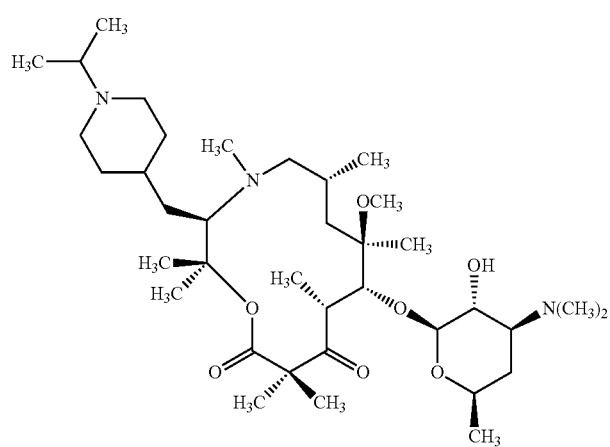 |
| 48 | 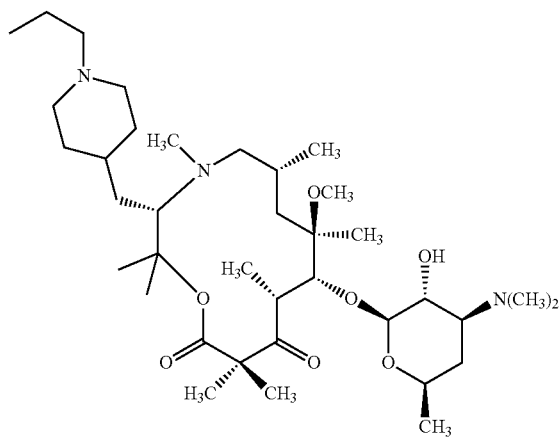 |

| Compound # | Structure |
|---|---|
| 49 | 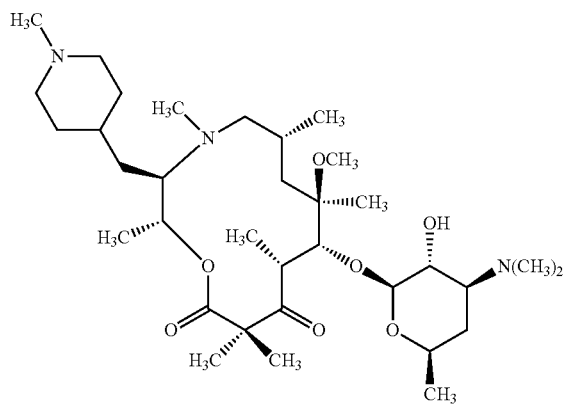 |
| 50 | 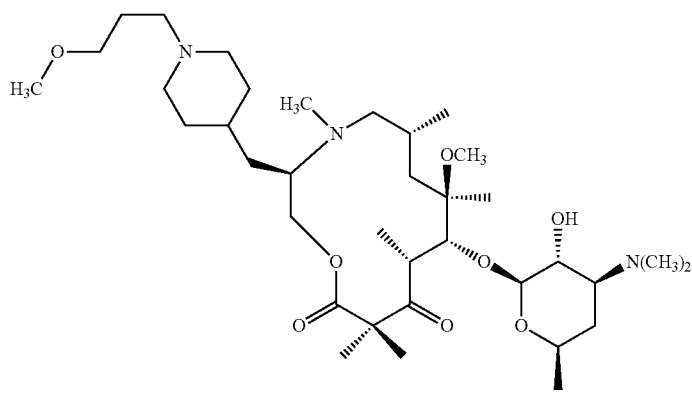 |
| 51 | 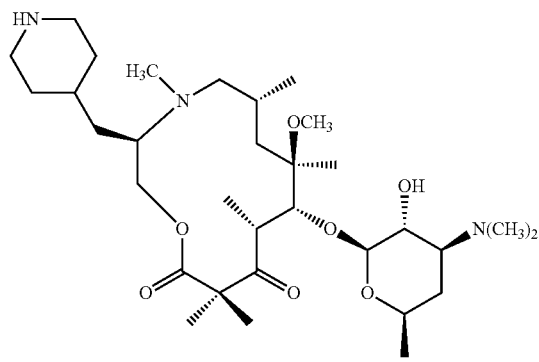 |
| 52 | 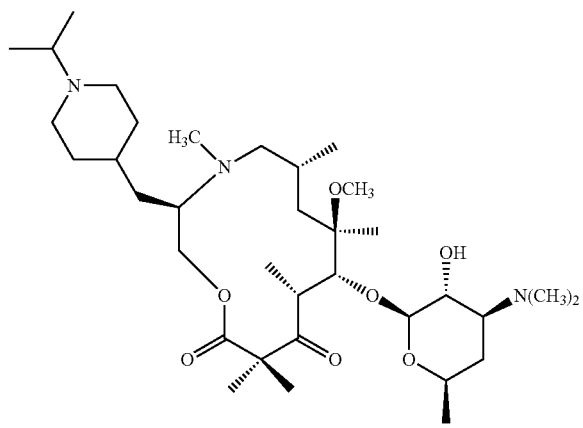 |

| Compound # | Structure |
|---|---|
| 53 | 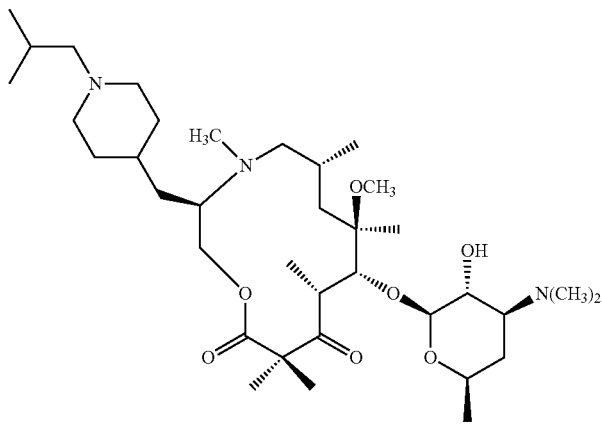 |
| 54 | 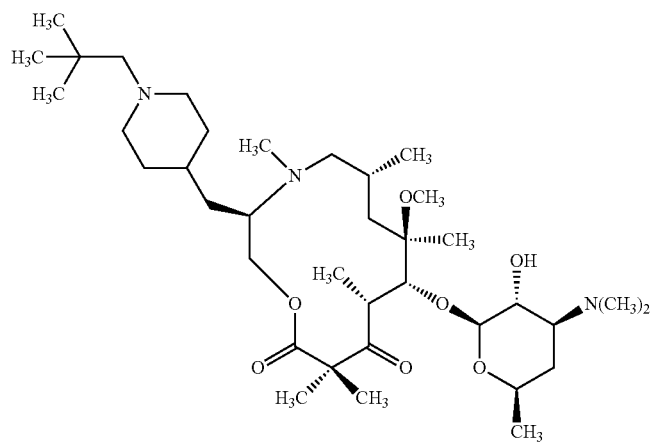 |
| 55 | 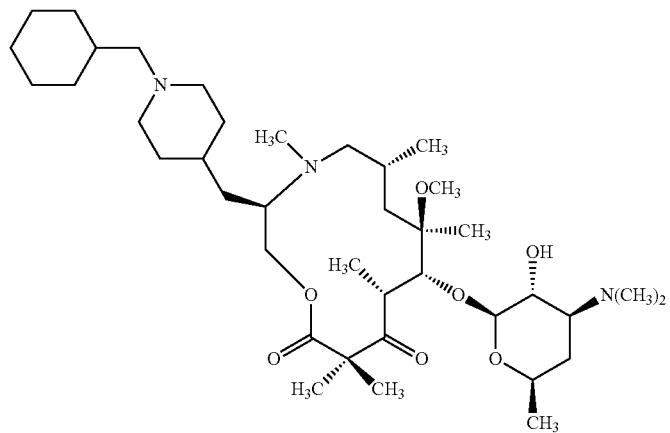 |

| Compound # | Structure |
|---|---|
| 56 | 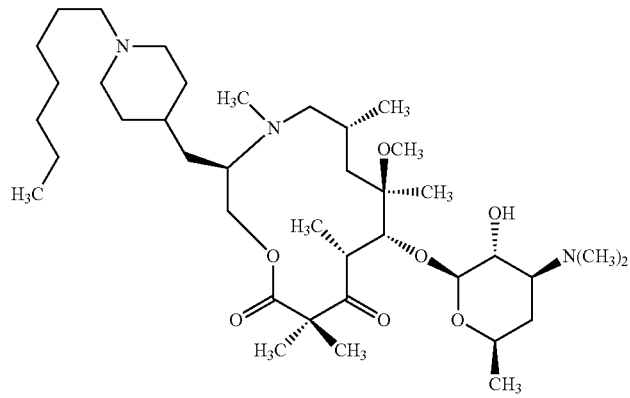 |
| 57 | 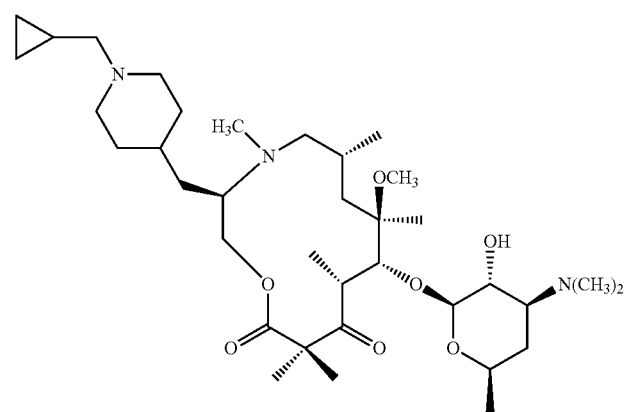 |
| 58 | 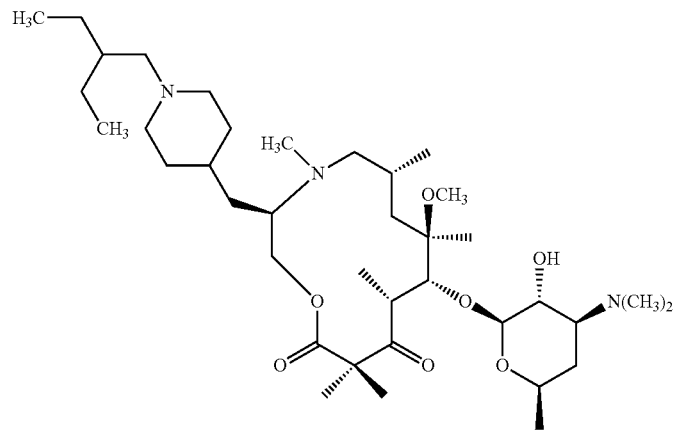 |

-continued
| Compound # | Structure |
|---|---|
| 59 | 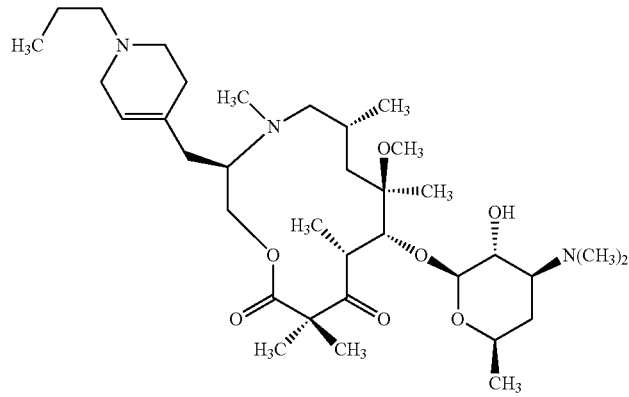 |
| 60 | 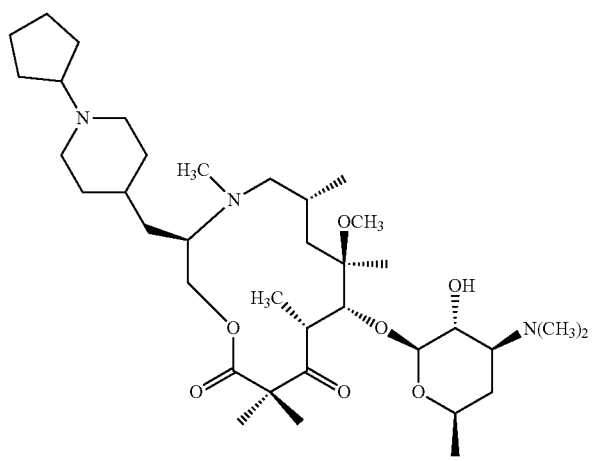 |
| 61 | 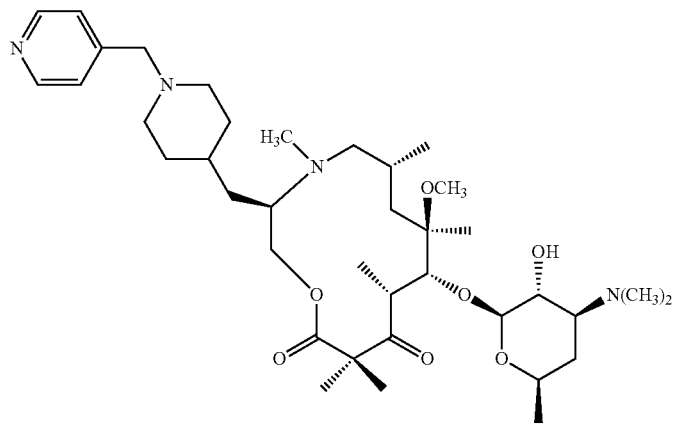 |

| Compound # | Structure |
|---|---|
| 62 | 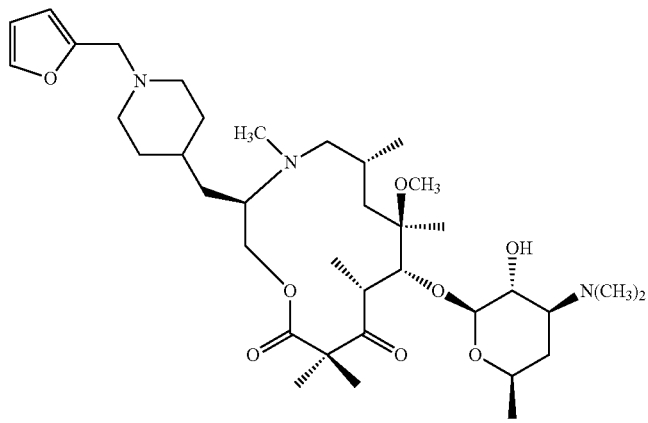 |
| 63 | 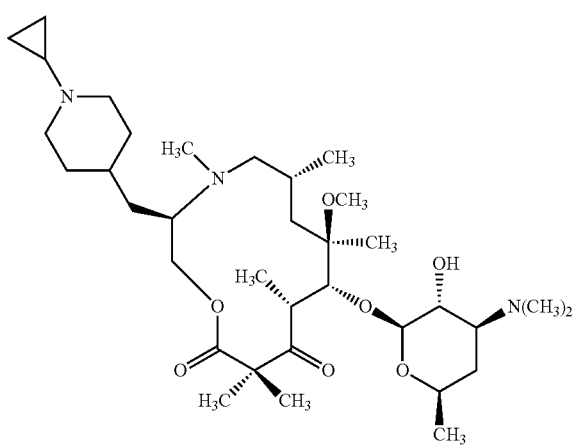 |
| 64 | 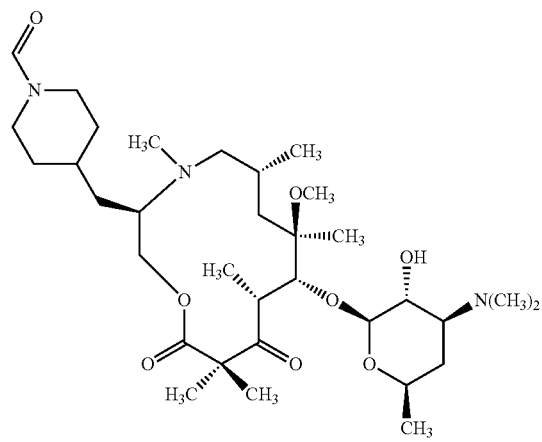 |

-continued
| Compound # | Structure |
|---|---|
| 65 | 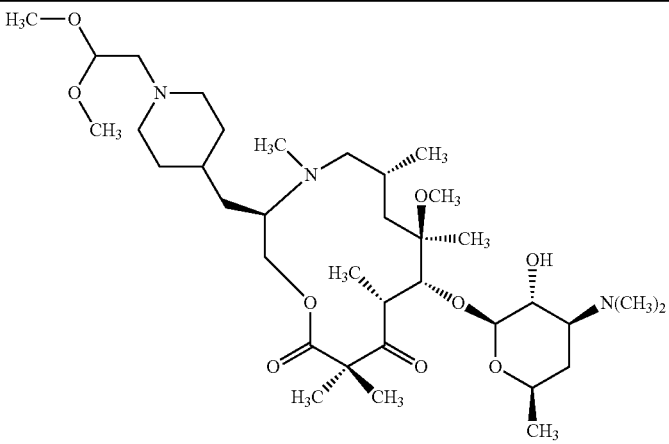 |
| 66 | 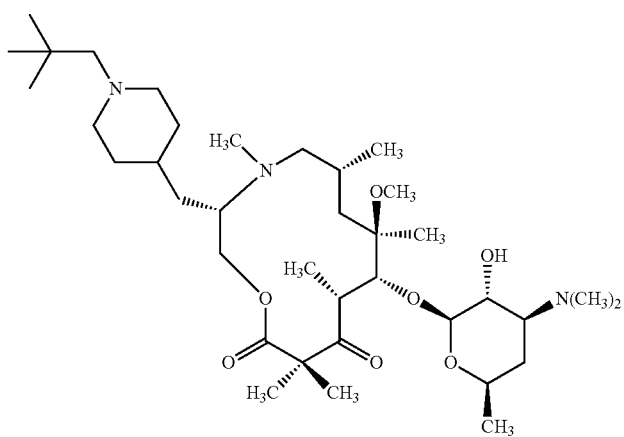 |
| 67 | 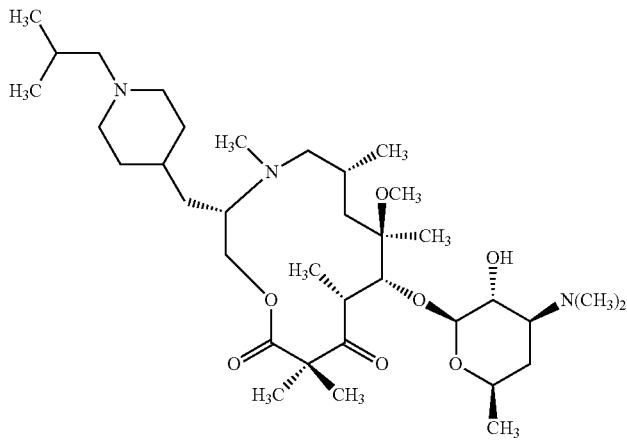 |

-continued
| Compound # | Structure |
|---|---|
| 68 | 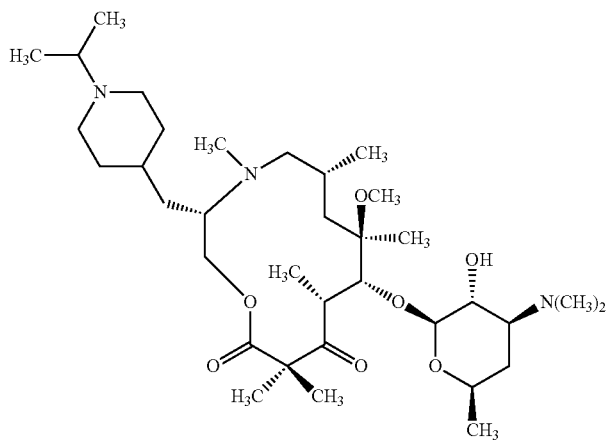 |
| 69 | 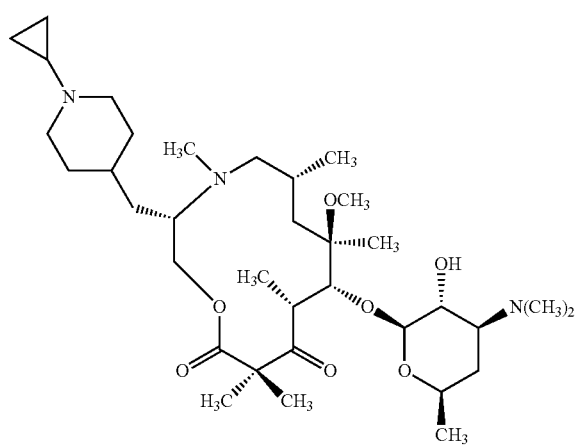 |
| 70 | 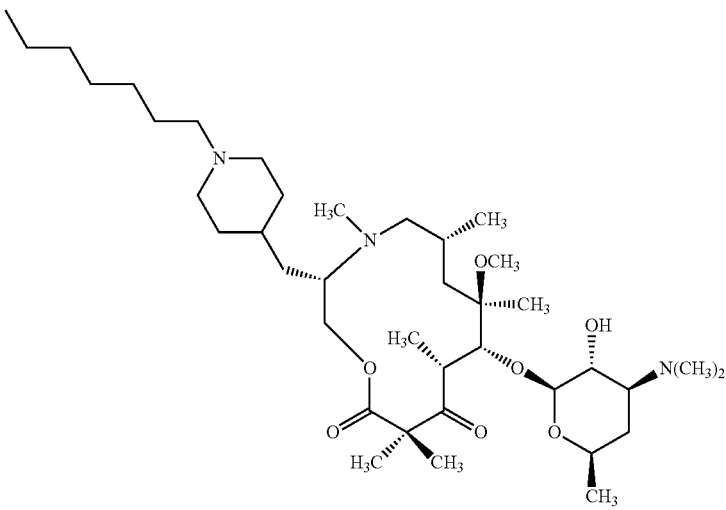 |

| Compound # | Structure |
|---|---|
| 71 | 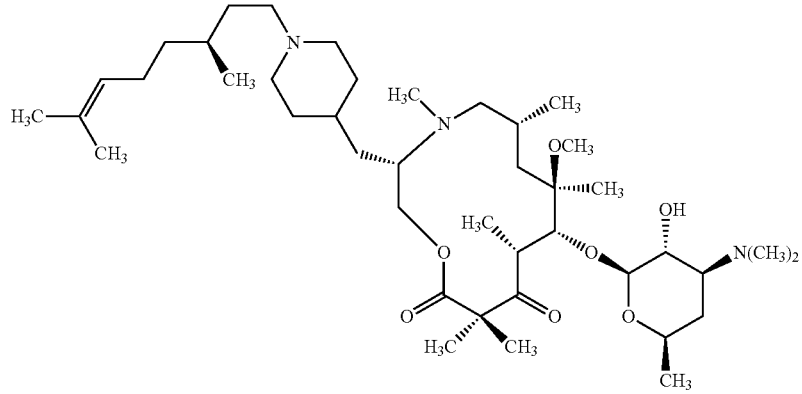 |
| 72 | 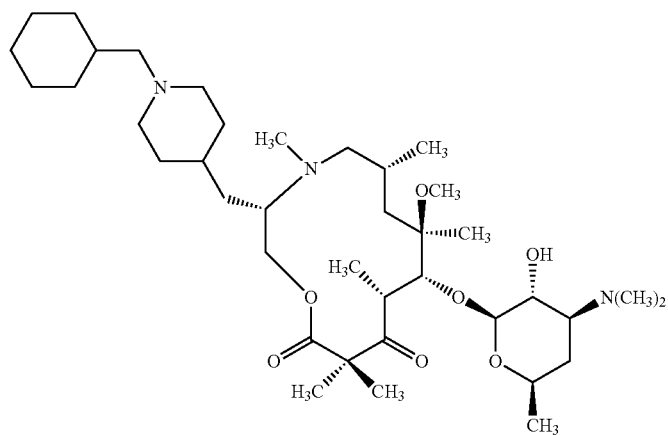 |
| 73 | 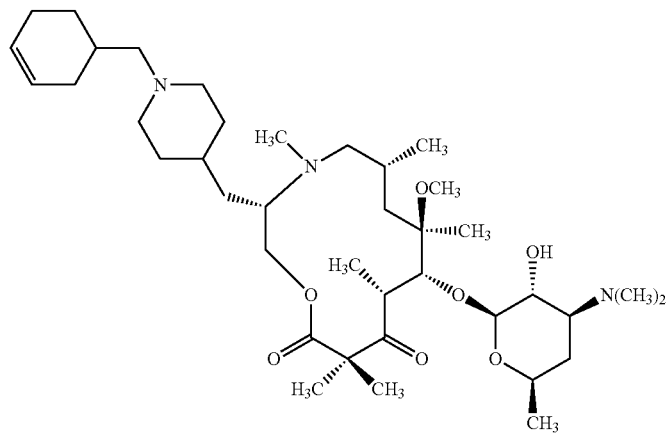 |

-continued

| Compound # | Structure |
| --- | --- |
| 74 | |
| 75 | |
| 76 | |
| 77 | |

-continued

| Compound # | Structure |
|---|---|
| 78 | |
| 79 | |
| 80 | |
| 81 | |
| 82 | |

| Compound # | Structure |
|---|---|
| 83 | 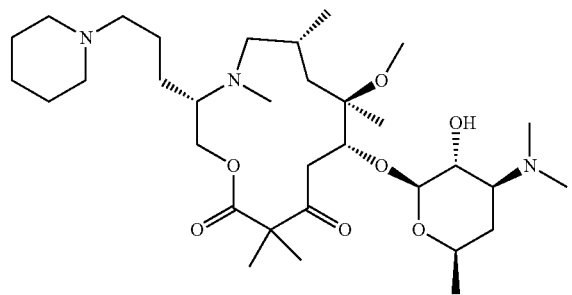 [SMILES: CO[C@]1(C)C[C@@H](C)CN(C)[C@@H](CCCN2CCCCC2)COC(=O)C(C)(C)C(=O)C[C@H]1O[C@@H]1O[C@H](C)C[C@H](N(C)C)[C@H]1O] |
| 84 | 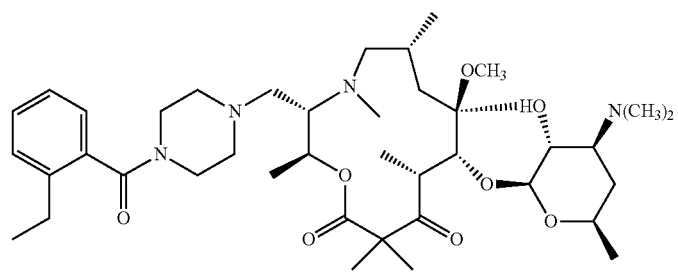 [SMILES: CCc1ccccc1C(=O)N1CCN(C[C@H]2[C@H](C)OC(=O)C(C)(C)C(=O)[C@H](C)[C@H]3O[C@@H]4O[C@H](C)C[C@H](N(C)C)[C@H]4O[C@@]3(OC)C[C@@H](C)CN2C)CC1] |
| 85 | 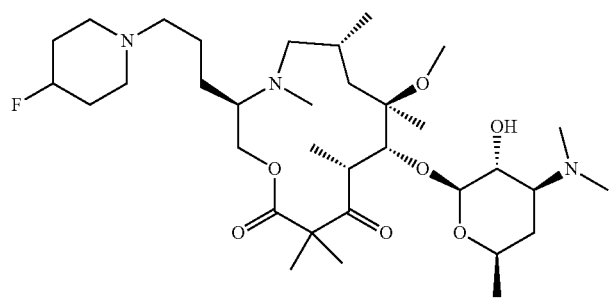 [SMILES: CO[C@]1(C)C[C@@H](C)CN(C)[C@H](CCCN2CCC(F)CC2)COC(=O)C(C)(C)C(=O)[C@H](C)[C@H]1O[C@@H]1O[C@H](C)C[C@H](N(C)C)[C@H]1O] |
| 86 | 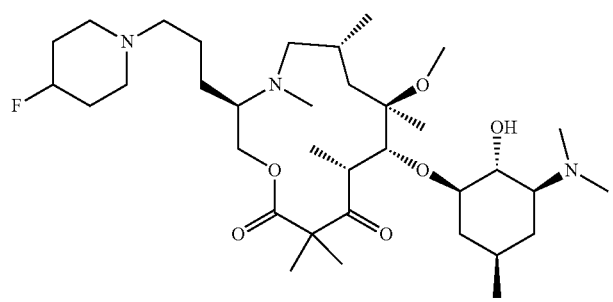 [SMILES: CO[C@]1(C)C[C@@H](C)CN(C)[C@H](CCCN2CCC(F)CC2)COC(=O)C(C)(C)C(=O)[C@H](C)[C@H]1O[C@@H]1C[C@H](C)C[C@H](N(C)C)[C@H]1O] |
| 87 | 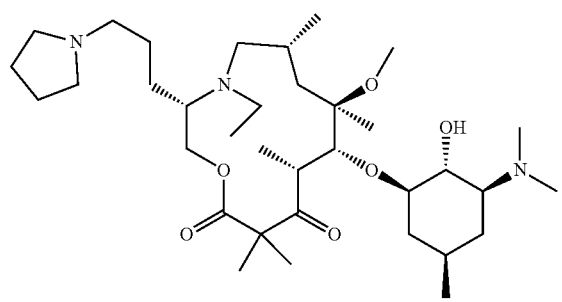 [SMILES: CCN1C[C@H](C)C[C@@](C)(OC)[C@H](O[C@@H]2C[C@H](C)C[C@H](N(C)C)[C@H]2O)[C@@H](C)C(=O)C(C)(C)C(=O)OC[C@@H]1CCCN1CCCC1] |

| Compound # | Structure |
|---|---|
| 88 | 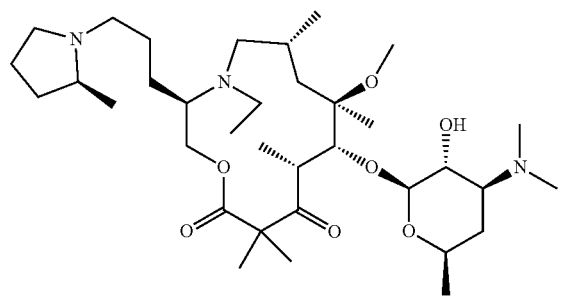 [SMILES: CCN1C[C@H](C)C[C@@](C)(OC)[C@H](O[C@@H]2O[C@H](C)C[C@H](N(C)C)[C@H]2O)[C@@H](C)C(=O)C(C)(C)C(=O)OC[C@H]1CCCN1CCC[C@@H]1C] |
| 89 | 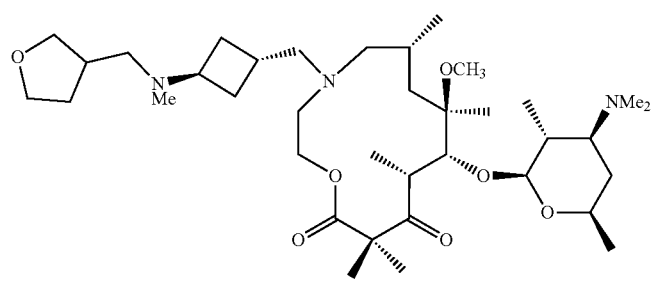 |
| 90 | 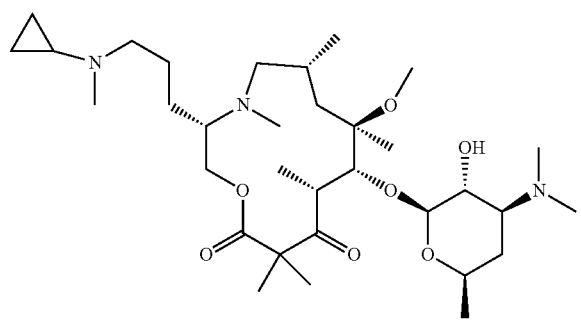 [SMILES: CO[C@]1(C)C[C@@H](C)CN(C)[C@@H](CCCN(C)C2CC2)COC(=O)C(C)(C)C(=O)[C@H](C)[C@H]1O[C@@H]1O[C@H](C)C[C@H](N(C)C)[C@H]1O] |
| 91 | 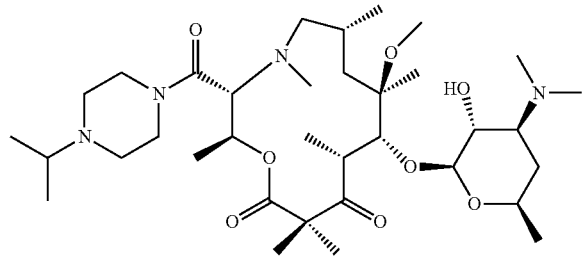 |
| 92 | 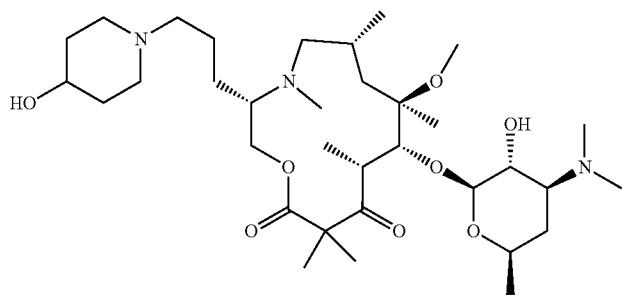 [SMILES: CO[C@]1(C)C[C@@H](C)CN(C)[C@@H](CCCN2CCC(O)CC2)COC(=O)C(C)(C)C(=O)[C@H](C)[C@H]1O[C@@H]1O[C@H](C)C[C@H](N(C)C)[C@H]1O] |

| Compound # | Structure |
|---|---|
| 93 | 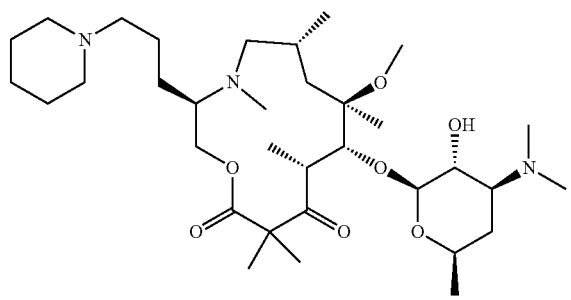 [SMILES: CO[C@]1(C)C[C@@H](C)CN(C)[C@H](CCCN2CCCCC2)COC(=O)C(C)(C)C(=O)[C@H](C)[C@H]1O[C@@H]1O[C@H](C)C[C@H](N(C)C)[C@H]1O] |
| 94 | 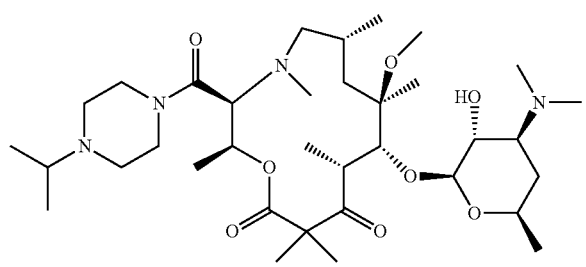 [SMILES: CO[C@]1(C)C[C@@H](C)CN(C)[C@H](C(=O)N2CCN(C(C)C)CC2)[C@H](C)OC(=O)C(C)(C)C(=O)[C@H](C)[C@H]1O[C@@H]1O[C@H](C)C[C@H](N(C)C)[C@H]1O] |
| 95 | 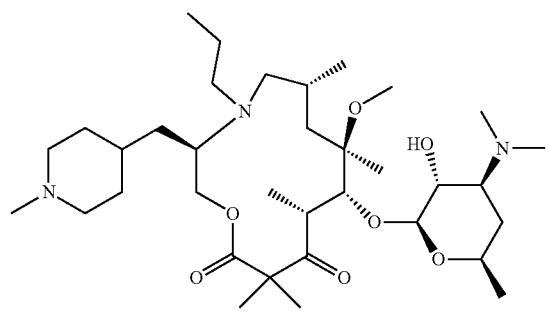 |
| 96 | 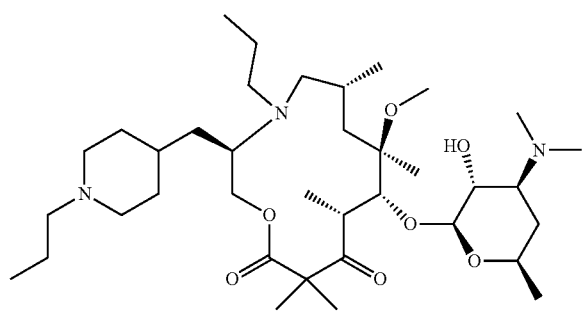 [SMILES: CCCN1CCC(C[C@@H]2COC(=O)C(C)(C)C(=O)[C@H](C)[C@@H](O[C@@H]3O[C@H](C)C[C@H](N(C)C)[C@H]3O)[C@](C)(OC)C[C@@H](C)CN2CCC)CC1] |
| 97 | 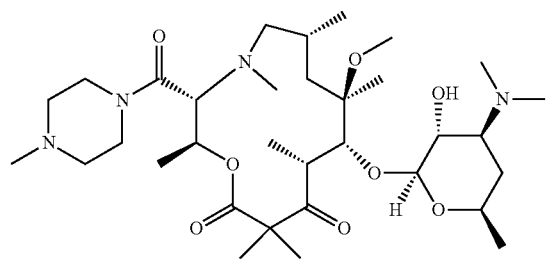 |

| Compound # | Structure |
|---|---|
| 98 | 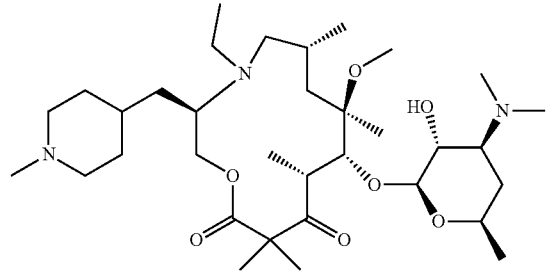 |
| 99 | 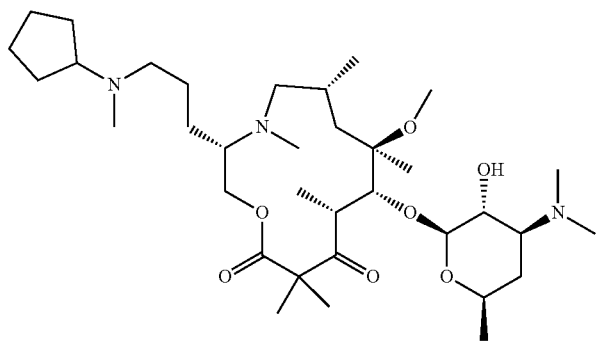 [SMILES: CO[C@]1(C)C[C@@H](C)CN(C)[C@@H](CCCN(C)C2CCCC2)COC(=O)C(C)(C)C(=O)[C@H](C)[C@H]1O[C@@H]1O[C@H](C)C[C@H](N(C)C)[C@H]1O] |
| 101 | 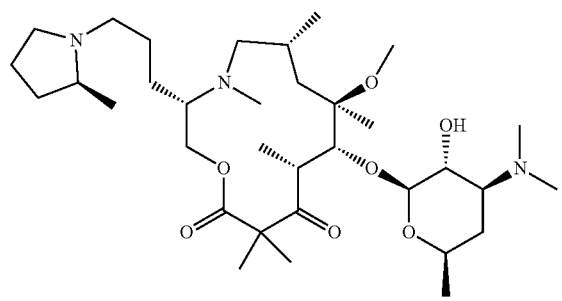 [SMILES: CO[C@]1(C)C[C@@H](C)CN(C)[C@@H](CCCN2CCC[C@@H]2C)COC(=O)C(C)(C)C(=O)[C@H](C)[C@H]1O[C@@H]1O[C@H](C)C[C@H](N(C)C)[C@H]1O] |
| 102 | 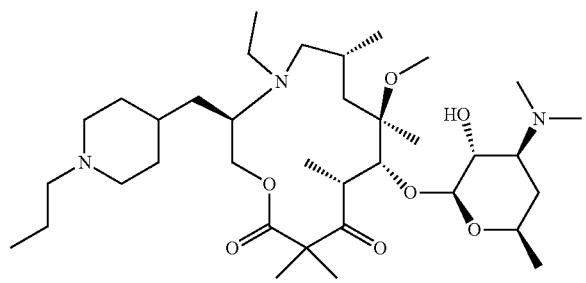 [SMILES: CCCN1CCC(C[C@@H]2COC(=O)C(C)(C)C(=O)[C@H](C)[C@@H](O[C@@H]3O[C@H](C)C[C@H](N(C)C)[C@H]3O)[C@](C)(OC)C[C@@H](C)CN2CC)CC1] |
| 103 | 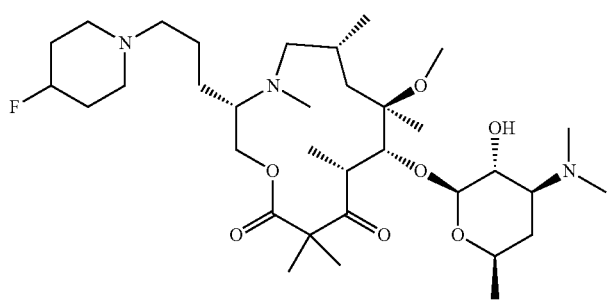 [SMILES: CO[C@]1(C)C[C@@H](C)CN(C)[C@@H](CCCN2CCC(F)CC2)COC(=O)C(C)(C)C(=O)[C@H](C)[C@H]1O[C@@H]1O[C@H](C)C[C@H](N(C)C)[C@H]1O] |

| Compound # | Structure |
|---|---|
| 104 | 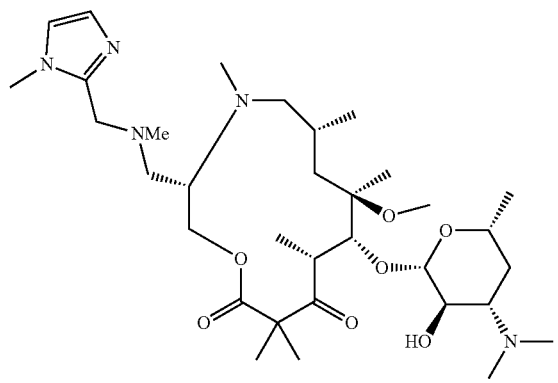 |
| 105 | 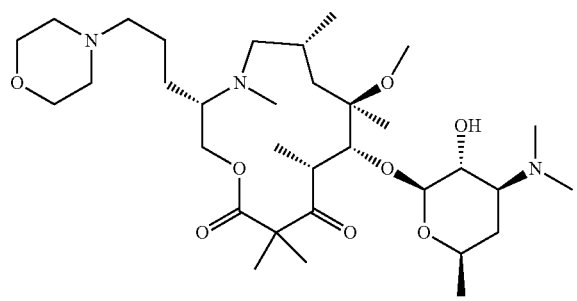 [SMILES: CO[C@]1(C)C[C@@H](C)CN(C)[C@@H](CCCN2CCOCC2)COC(=O)C(C)(C)C(=O)[C@H](C)[C@H]1O[C@@H]1O[C@H](C)C[C@H](N(C)C)[C@H]1O] |
| 106 | 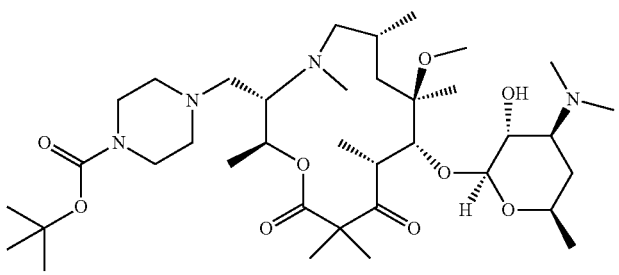 [SMILES: CO[C@]1(C)C[C@@H](C)CN(C)[C@@H](CN2CCN(C(=O)OC(C)(C)C)CC2)[C@H](C)OC(=O)C(C)(C)C(=O)[C@H](C)[C@H]1O[C@@H]1O[C@H](C)C[C@H](N(C)C)[C@H]1O] |
| 107 | 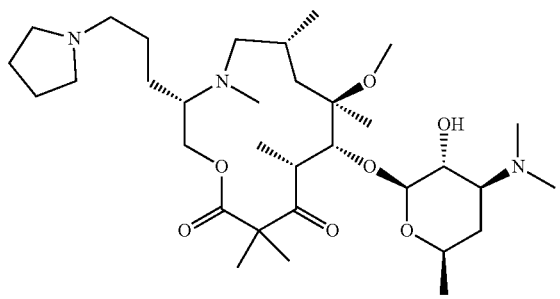 [SMILES: CO[C@]1(C)C[C@@H](C)CN(C)[C@@H](CCCN2CCCC2)COC(=O)C(C)(C)C(=O)[C@H](C)[C@H]1O[C@@H]1O[C@H](C)C[C@H](N(C)C)[C@H]1O] |
| 108 | 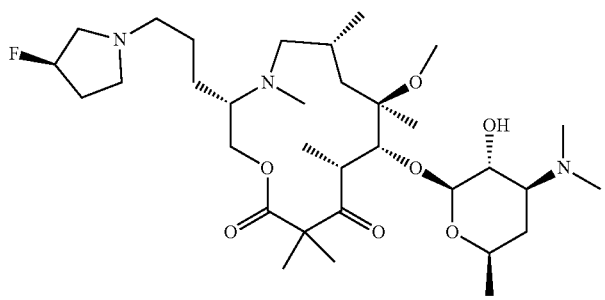 [SMILES: CO[C@]1(C)C[C@@H](C)CN(C)[C@@H](CCCN2CC[C@@H](F)C2)COC(=O)C(C)(C)C(=O)[C@H](C)[C@H]1O[C@@H]1O[C@H](C)C[C@H](N(C)C)[C@H]1O] |

-continued
| Compound # | Structure |
|---|---|
| 109 | 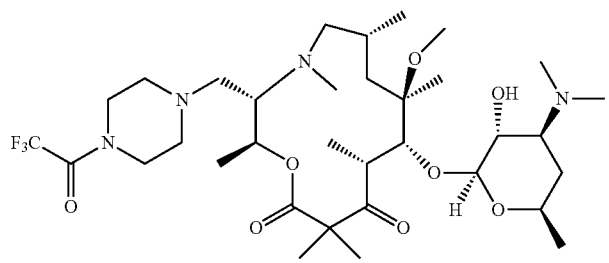 [SMILES: CO[C@]1(C)C[C@@H](C)CN(C)[C@@H](CN2CCN(C(=O)C(F)(F)F)CC2)[C@H](C)OC(=O)C(C)(C)C(=O)[C@H](C)[C@H]1O[C@@H]1O[C@H](C)C[C@H](N(C)C)[C@H]1O] |
| 110 | 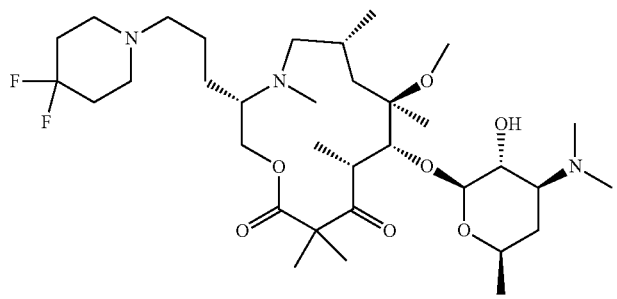 [SMILES: CO[C@]1(C)C[C@@H](C)CN(C)[C@@H](CCCN2CCC(F)(F)CC2)COC(=O)C(C)(C)C(=O)[C@H](C)[C@H]1O[C@@H]1O[C@H](C)C[C@H](N(C)C)[C@H]1O] |
| 111 | 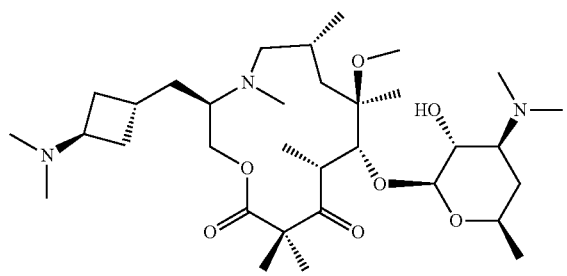 |
| 112 | 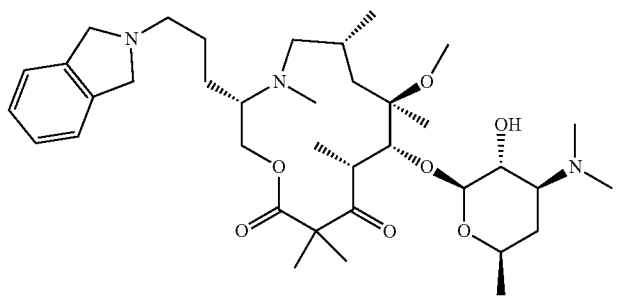 [SMILES: CO[C@]1(C)C[C@@H](C)CN(C)[C@@H](CCCN2Cc3ccccc3C2)COC(=O)C(C)(C)C(=O)[C@H](C)[C@H]1O[C@@H]1O[C@H](C)C[C@H](N(C)C)[C@H]1O] |
| 113 | 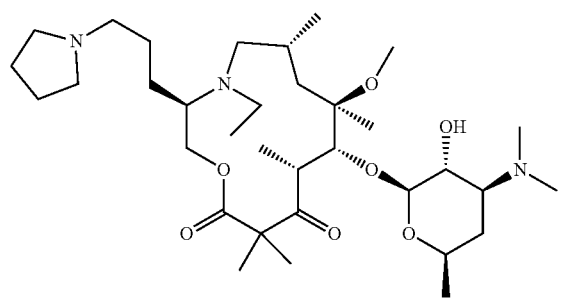 [SMILES: CCN1C[C@H](C)C[C@@](C)(OC)[C@H](O[C@@H]2O[C@H](C)C[C@H](N(C)C)[C@H]2O)[C@@H](C)C(=O)C(C)(C)C(=O)OC[C@H]1CCCN1CCCC1] |

-continued
| Compound # | Structure |
|---|---|
| 114 | 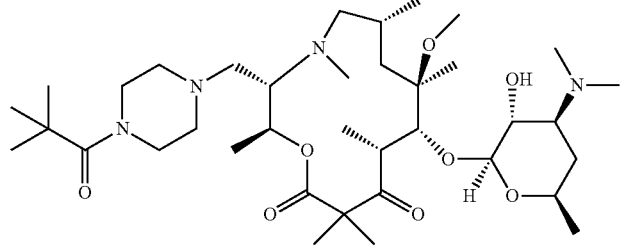 [SMILES: CO[C@]1(C)C[C@@H](C)CN(C)[C@@H](CN2CCN(C(=O)C(C)(C)C)CC2)[C@H](C)OC(=O)C(C)(C)C(=O)[C@H](C)[C@H]1O[C@@H]1O[C@H](C)C[C@H](N(C)C)[C@H]1O] |
| 115 | 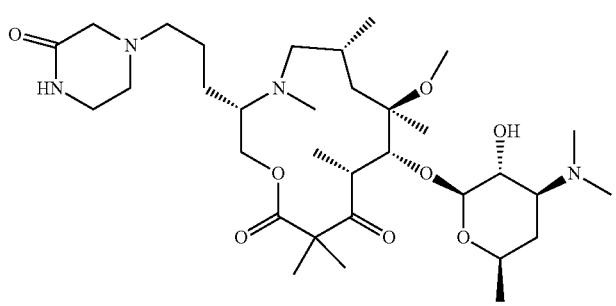 [SMILES: CO[C@]1(C)C[C@@H](C)CN(C)[C@@H](CCCN2CCNC(=O)C2)COC(=O)C(C)(C)C(=O)[C@H](C)[C@H]1O[C@@H]1O[C@H](C)C[C@H](N(C)C)[C@H]1O] |
| 116 | 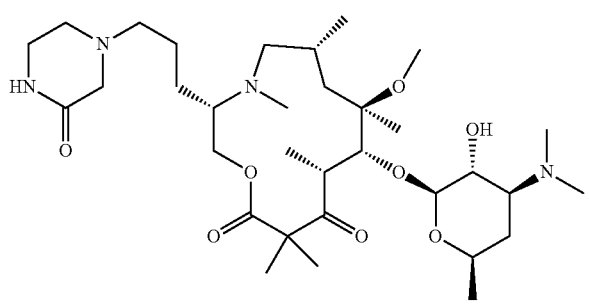 [SMILES: CO[C@]1(C)C[C@@H](C)CN(C)[C@@H](CCCN2CCNC(=O)C2)COC(=O)C(C)(C)C(=O)[C@H](C)[C@H]1O[C@@H]1O[C@H](C)C[C@H](N(C)C)[C@H]1O] |
| 117 | 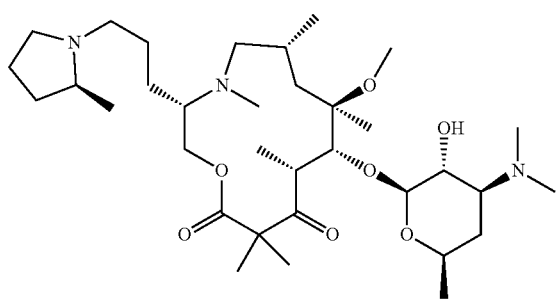 [SMILES: CO[C@]1(C)C[C@@H](C)CN(C)[C@@H](CCCN2CCC[C@@H]2C)COC(=O)C(C)(C)C(=O)[C@H](C)[C@H]1O[C@@H]1O[C@H](C)C[C@H](N(C)C)[C@H]1O] |
| 118 | 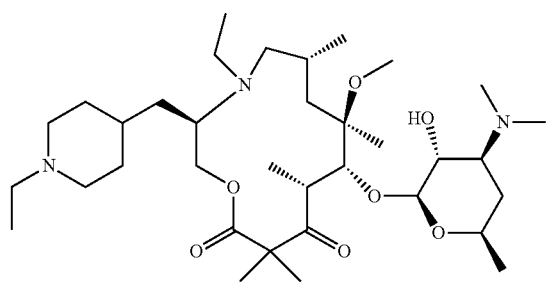 [SMILES: CCN1CCC(C[C@@H]2COC(=O)C(C)(C)C(=O)[C@H](C)[C@@H](O[C@@H]3O[C@H](C)C[C@H](N(C)C)[C@H]3O)[C@](C)(OC)C[C@@H](C)CN2CC)CC1] |

| Compound # | Structure |
|---|---|
| 119 | 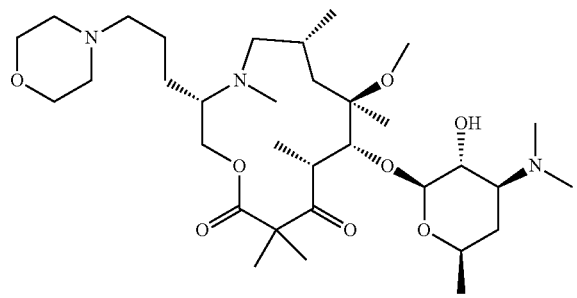 [SMILES: CO[C@]1(C)C[C@@H](C)CN(C)[C@@H](CCCN2CCOCC2)COC(=O)C(C)(C)C(=O)[C@H](C)[C@H]1O[C@@H]1O[C@H](C)C[C@H](N(C)C)[C@H]1O] |
| 120 | 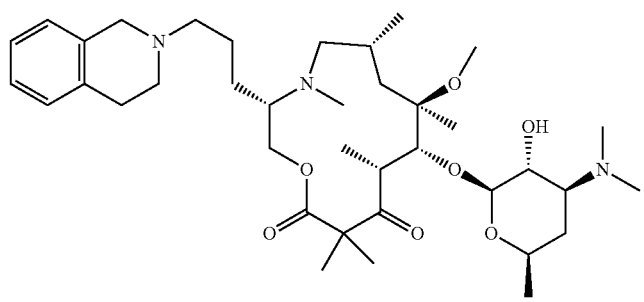 [SMILES: CO[C@]1(C)C[C@@H](C)CN(C)[C@@H](CCCN2CCc3ccccc3C2)COC(=O)C(C)(C)C(=O)[C@H](C)[C@H]1O[C@@H]1O[C@H](C)C[C@H](N(C)C)[C@H]1O] |
| 121 | 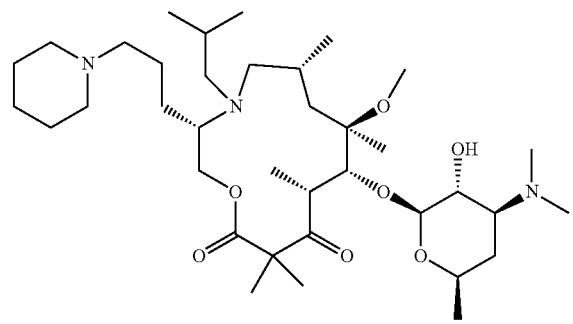 [SMILES: CO[C@]1(C)C[C@@H](C)CN(CC(C)C)[C@@H](CCCN2CCCCC2)COC(=O)C(C)(C)C(=O)[C@H](C)[C@H]1O[C@@H]1O[C@H](C)C[C@H](N(C)C)[C@H]1O] |
| 122 | 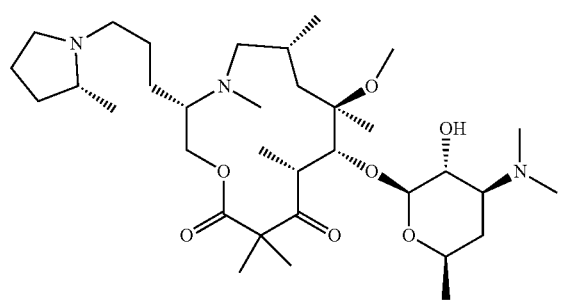 [SMILES: CO[C@]1(C)C[C@@H](C)CN(C)[C@@H](CCCN2CCC[C@H]2C)COC(=O)C(C)(C)C(=O)[C@H](C)[C@H]1O[C@@H]1O[C@H](C)C[C@H](N(C)C)[C@H]1O] |
| 123 | 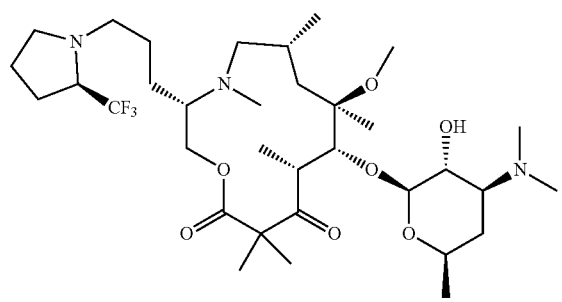 [SMILES: CO[C@]1(C)C[C@@H](C)CN(C)[C@@H](CCCN2CCC[C@@H]2C(F)(F)F)COC(=O)C(C)(C)C(=O)[C@H](C)[C@H]1O[C@@H]1O[C@H](C)C[C@H](N(C)C)[C@H]1O] |

| Compound # | Structure |
|---|---|
| 124 | 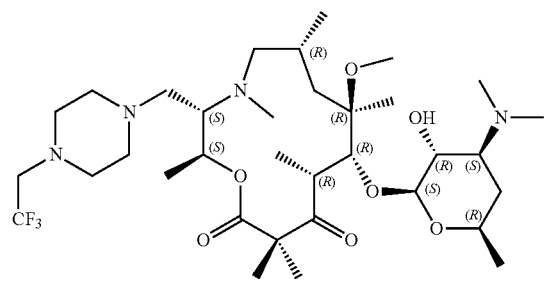 |
| 125 | 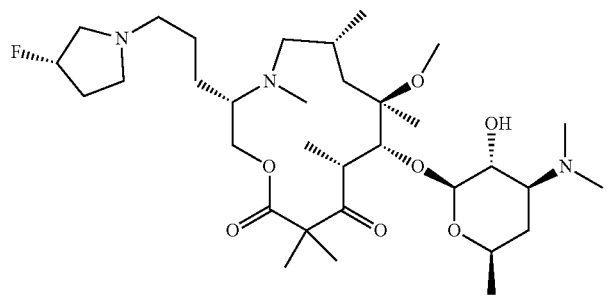 [SMILES: CO[C@]1(C)C[C@@H](C)CN(C)[C@@H](CCCN2CC[C@H](F)C2)COC(=O)C(C)(C)C(=O)[C@H](C)[C@H]1O[C@@H]1O[C@H](C)C[C@H](N(C)C)[C@H]1O] |
| 126 | 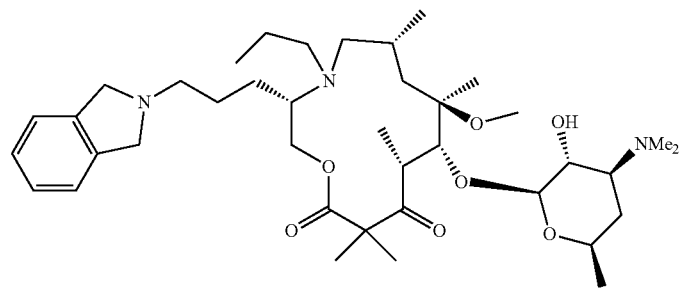 [SMILES: CCCN1C[C@H](C)C[C@@](C)(OC)[C@H](O[C@@H]2O[C@H](C)C[C@H](N(C)C)[C@H]2O)[C@@H](C)C(=O)C(C)(C)C(=O)OC[C@@H]1CCCN1Cc2ccccc2C1] |
| 127 | 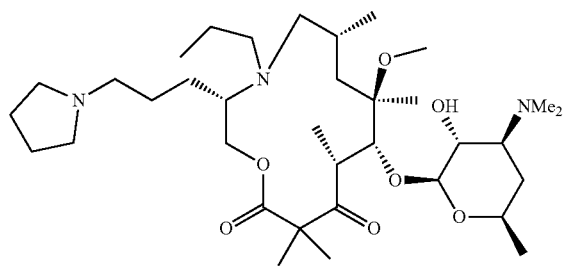 |
| 128 | 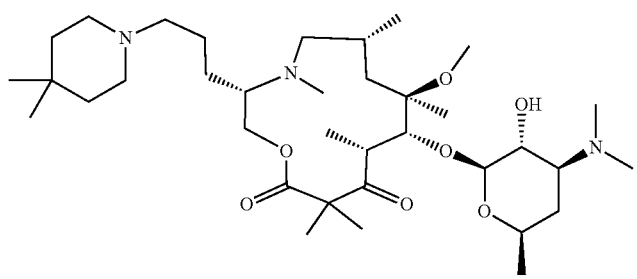 |

-continued
| Compound # | Structure |
|---|---|
| 129 | 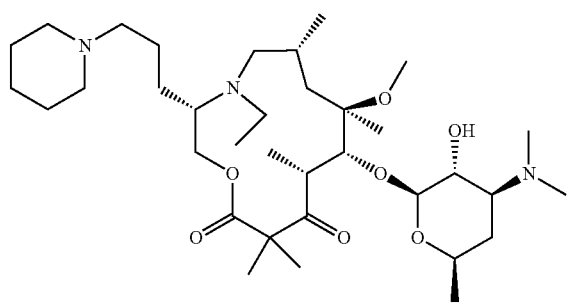 [SMILES: CCN1C[C@H](C)C[C@@](C)(OC)[C@H](O[C@@H]2O[C@H](C)C[C@H](N(C)C)[C@H]2O)[C@@H](C)C(=O)C(C)(C)C(=O)OC[C@@H]1CCCN1CCCCC1] |
| 130 | 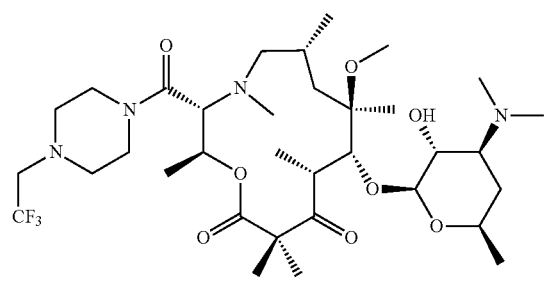 |
| 131 | 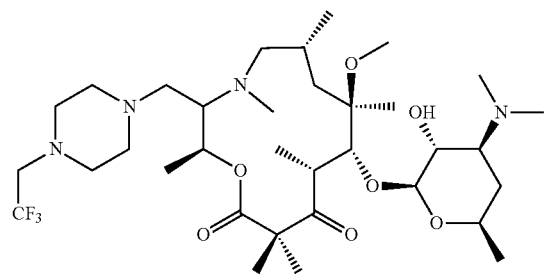 |
| 132 | 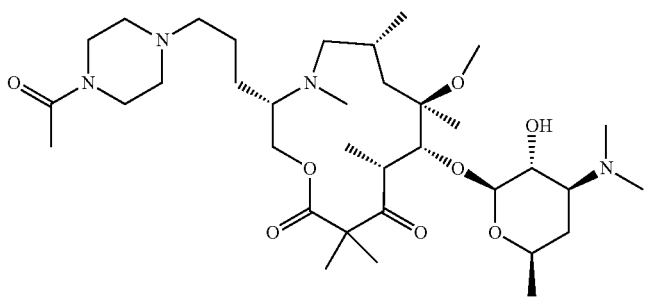 [SMILES: CO[C@]1(C)C[C@@H](C)CN(C)[C@@H](CCCN2CCN(C(C)=O)CC2)COC(=O)C(C)(C)C(=O)[C@H](C)[C@H]1O[C@@H]1O[C@H](C)C[C@H](N(C)C)[C@H]1O] |
| 133 | 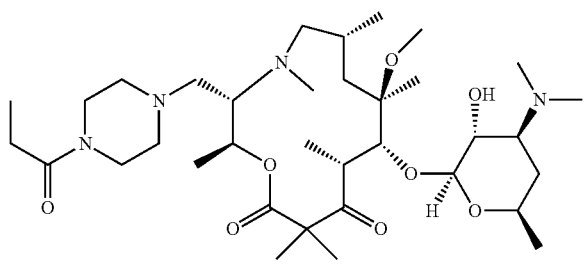 |

-continued
| Compound # | Structure |
|---|---|
| 134 | 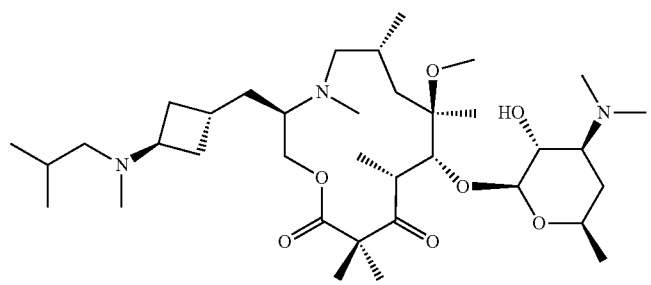 |
| 135 | 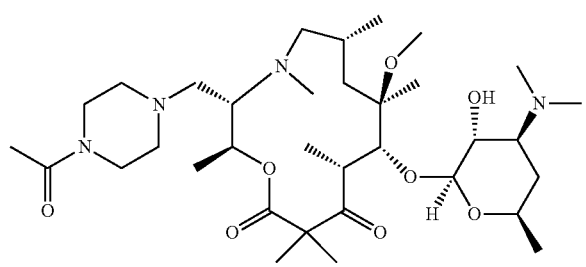 [SMILES: CO[C@]1(C)C[C@@H](C)CN(C)[C@@H](CN2CCN(C(C)=O)CC2)[C@H](C)OC(=O)C(C)(C)C(=O)[C@H](C)[C@H]1O[C@@H]1O[C@H](C)C[C@H](N(C)C)[C@H]1O] |
| 136 | 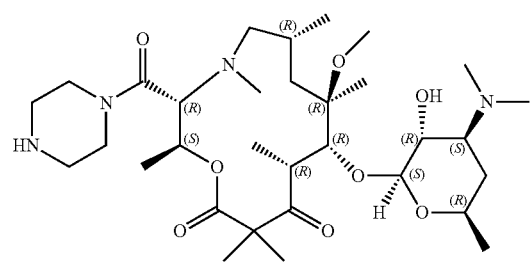 |
| 137 | 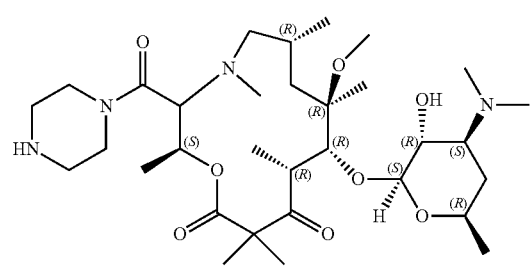 |
| 138 | 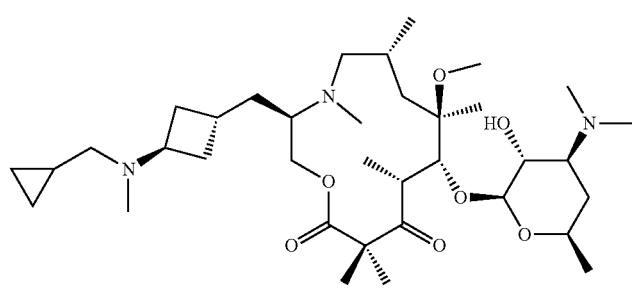 |

| Compound # | Structure |
|---|---|
| 139 | 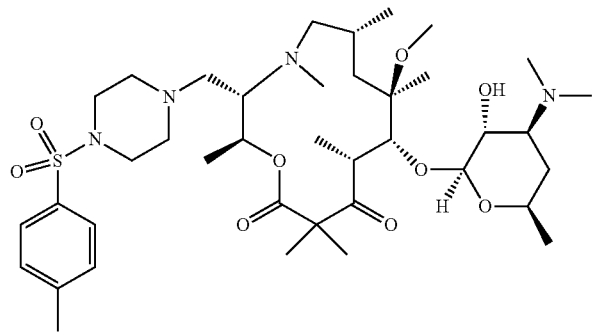 [SMILES: CO[C@]1(C)C[C@@H](C)CN(C)[C@@H](CN2CCN(S(=O)(=O)c3ccc(C)cc3)CC2)[C@H](C)OC(=O)C(C)(C)C(=O)[C@H](C)[C@H]1O[C@@H]1O[C@H](C)C[C@H](N(C)C)[C@H]1O] |
| 140 | 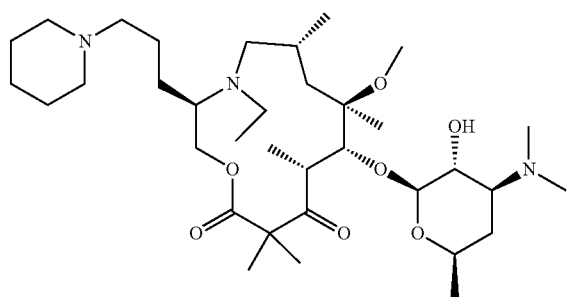 [SMILES: CCN1C[C@H](C)C[C@@](C)(OC)[C@H](O[C@@H]2O[C@H](C)C[C@H](N(C)C)[C@H]2O)[C@@H](C)C(=O)C(C)(C)C(=O)OC[C@H]1CCCN1CCCCC1] |
| 141 | 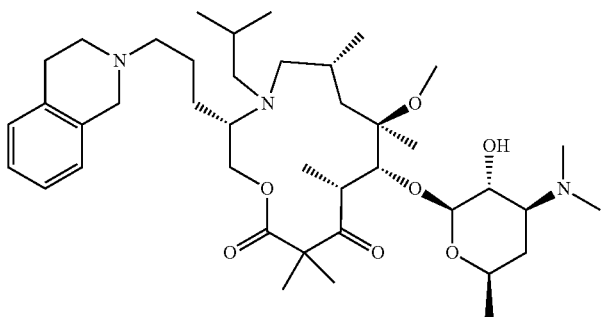 [SMILES: CO[C@]1(C)C[C@@H](C)CN(CC(C)C)[C@@H](CCCN2CCc3ccccc3C2)COC(=O)C(C)(C)C(=O)[C@H](C)[C@H]1O[C@@H]1O[C@H](C)C[C@H](N(C)C)[C@H]1O] |
| 142 | 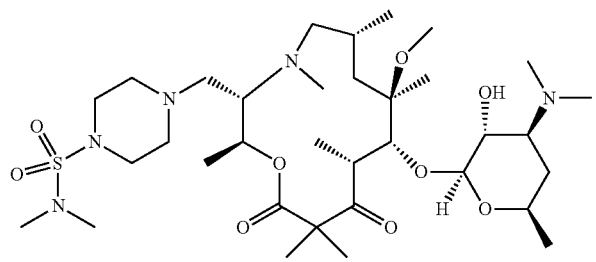 [SMILES: CO[C@]1(C)C[C@@H](C)CN(C)[C@@H](CN2CCN(S(=O)(=O)N(C)C)CC2)[C@H](C)OC(=O)C(C)(C)C(=O)[C@H](C)[C@H]1O[C@@H]1O[C@H](C)C[C@H](N(C)C)[C@H]1O] |
| 143 | 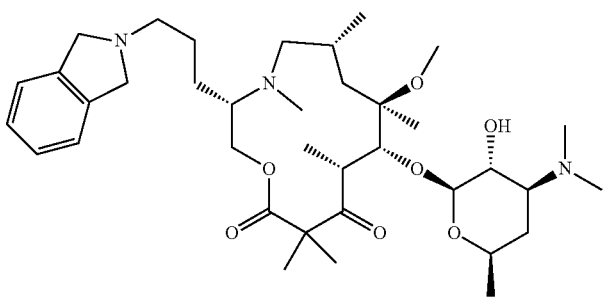 [SMILES: CO[C@]1(C)C[C@@H](C)CN(C)[C@@H](CCCN2Cc3ccccc3C2)COC(=O)C(C)(C)C(=O)[C@H](C)[C@H]1O[C@@H]1O[C@H](C)C[C@H](N(C)C)[C@H]1O] |

| Compound # | Structure |
|---|---|
| 144 | 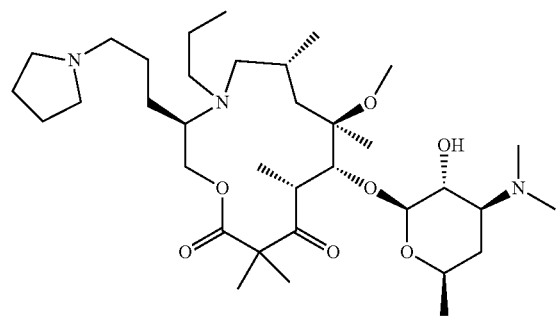 [SMILES: CCCN1C[C@H](C)C[C@@](C)(OC)[C@H](O[C@@H]2O[C@H](C)C[C@H](N(C)C)[C@H]2O)[C@@H](C)C(=O)C(C)(C)C(=O)OC[C@H]1CCCN1CCCC1] |
| 145 | 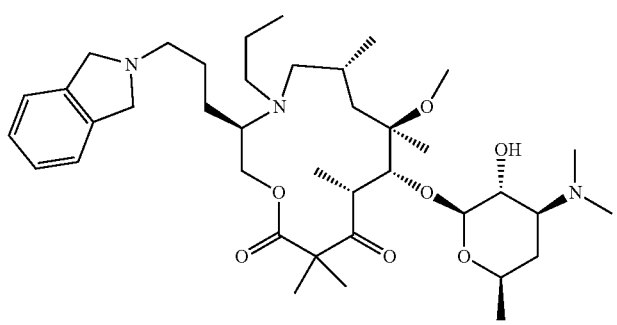 [SMILES: CCCN1C[C@H](C)C[C@@](C)(OC)[C@H](O[C@@H]2O[C@H](C)C[C@H](N(C)C)[C@H]2O)[C@@H](C)C(=O)C(C)(C)C(=O)OC[C@H]1CCCN1Cc2ccccc2C1] |
| 146 | 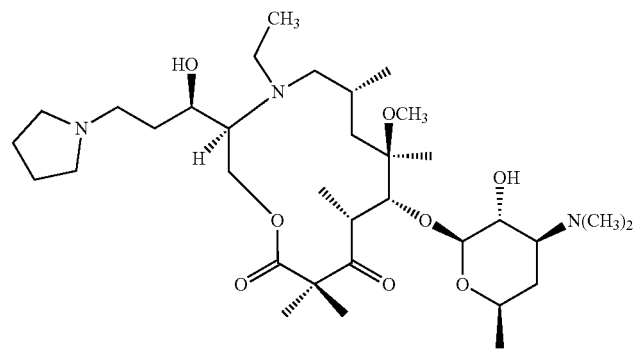 |
| 147 | 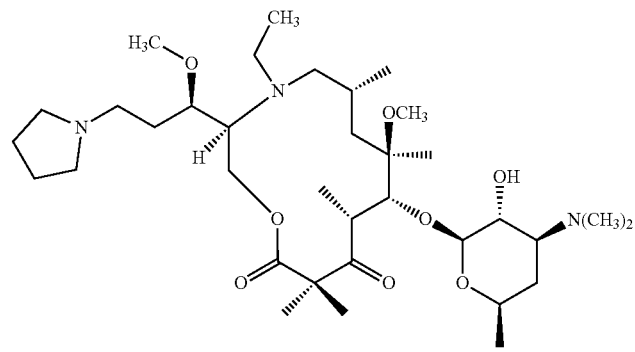 |

| Compound # | Structure |
|---|---|
| 148 | 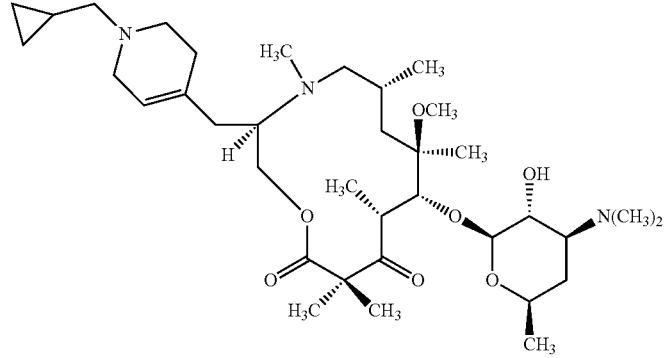 |
| 149 | 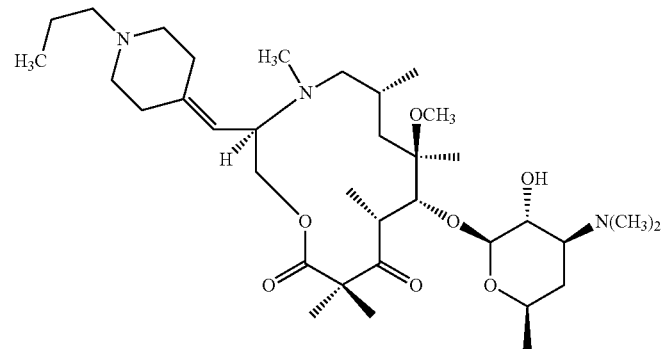 |
| 150 | 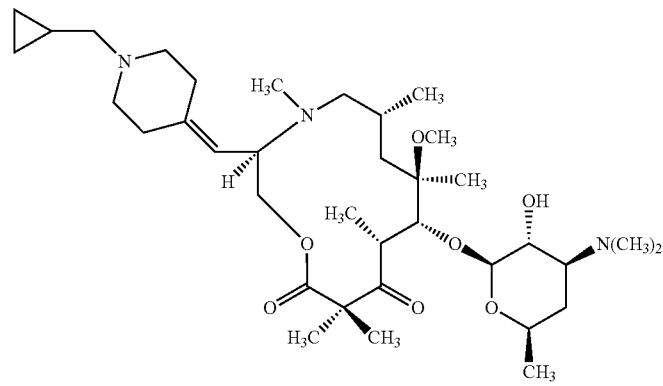 |
| 151 | 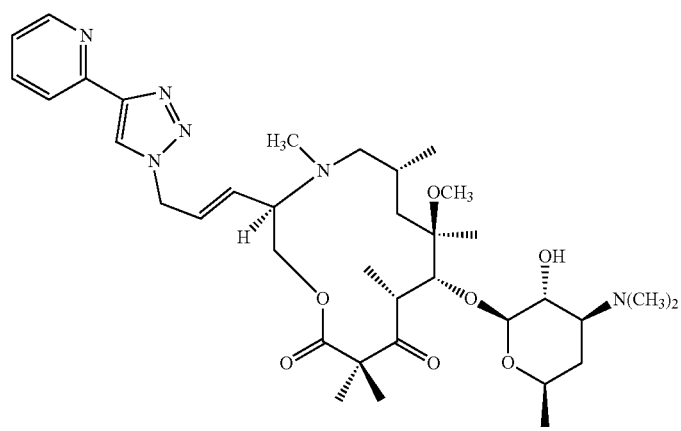 |

| Compound # | Structure |
|---|---|
| 152 | 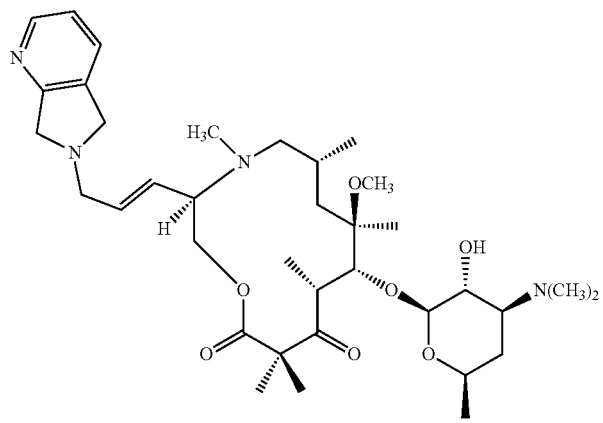 |
| 153 | 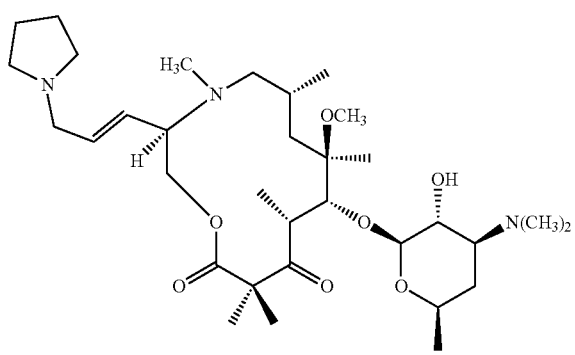 |
| 154 | 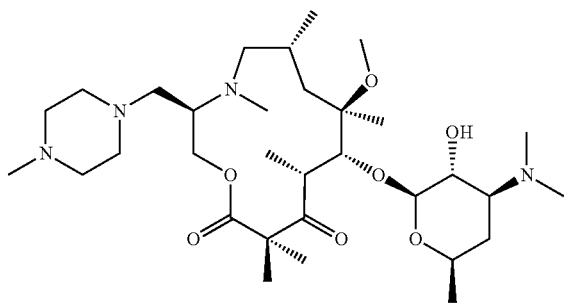 |
| 155 | 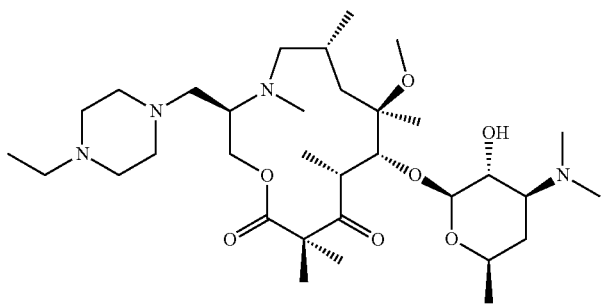 |

-continued
| Compound # | Structure |
|---|---|
| 156 | 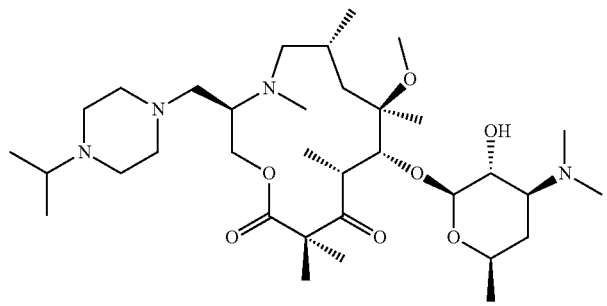 |
| 157 | 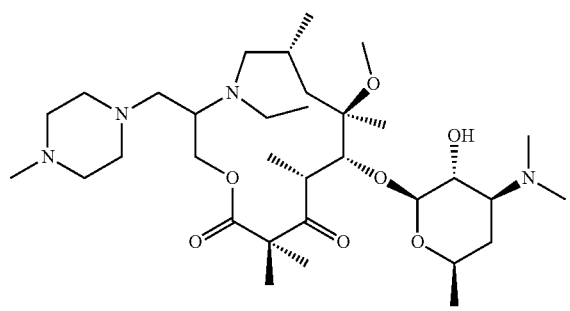 |
| 158 | 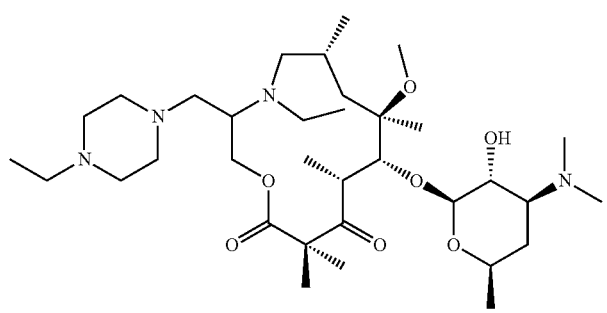 |
| 159 | 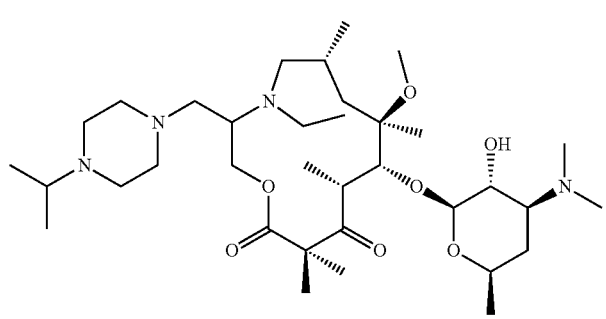 |
| 160 | 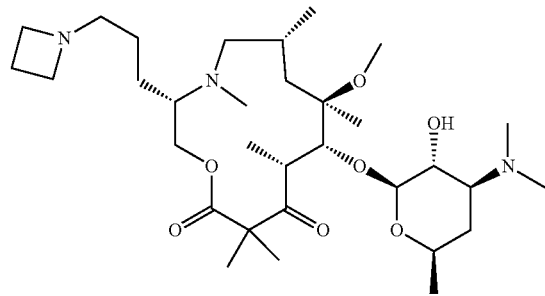 [SMILES: CO[C@]1(C)C[C@@H](C)CN(C)[C@@H](CCCN2CCC2)COC(=O)C(C)(C)C(=O)[C@H](C)[C@H]1O[C@@H]1O[C@H](C)C[C@H](N(C)C)[C@H]1O] |

-continued
| Compound # | Structure |
|---|---|
| 161 | 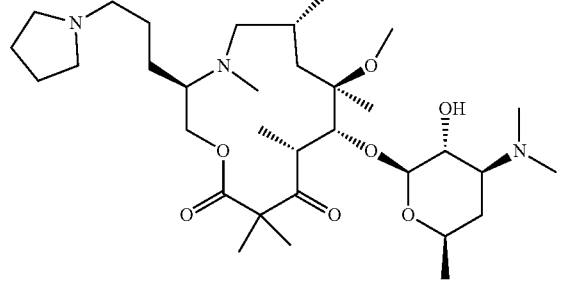 |
| 162 | 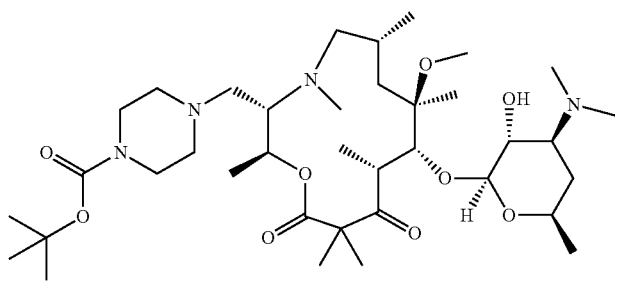 [SMILES: CO[C@]1(C)C[C@@H](C)CN(C)[C@@H](CN2CCN(C(=O)OC(C)(C)C)CC2)[C@H](C)OC(=O)C(C)(C)C(=O)[C@H](C)[C@H]1O[C@@H]1O[C@H](C)C[C@H](N(C)C)[C@H]1O] |
| 163 | 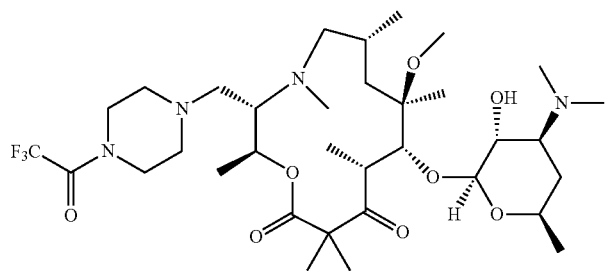 [SMILES: CO[C@]1(C)C[C@@H](C)CN(C)[C@@H](CN2CCN(C(=O)C(F)(F)F)CC2)[C@H](C)OC(=O)C(C)(C)C(=O)[C@H](C)[C@H]1O[C@@H]1O[C@H](C)C[C@H](N(C)C)[C@H]1O] |
| 164 | 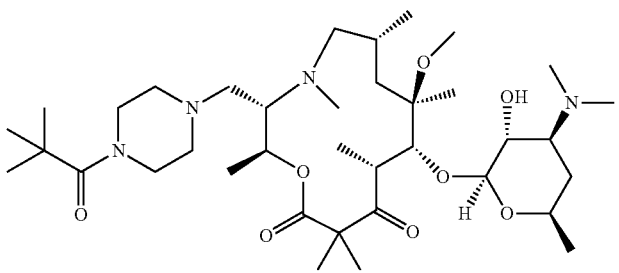 [SMILES: CO[C@]1(C)C[C@@H](C)CN(C)[C@@H](CN2CCN(C(=O)C(C)(C)C)CC2)[C@H](C)OC(=O)C(C)(C)C(=O)[C@H](C)[C@H]1O[C@@H]1O[C@H](C)C[C@H](N(C)C)[C@H]1O] |
| 165 | 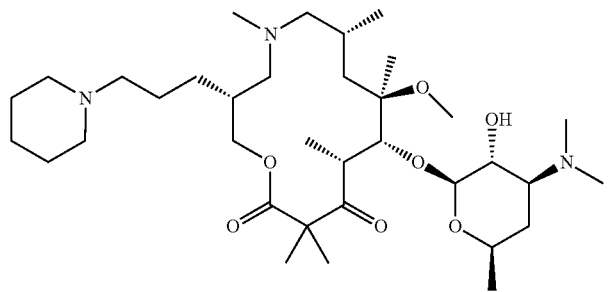 [SMILES: CO[C@]1(C)C[C@@H](C)CN(C)C[C@@H](CCCN2CCCCC2)COC(=O)C(C)(C)C(=O)[C@H](C)[C@H]1O[C@@H]1O[C@H](C)C[C@H](N(C)C)[C@H]1O] |

| Compound # | Structure |
|---|---|
| 166 | 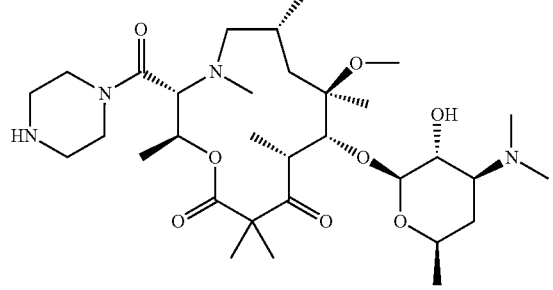 |
| 168 | 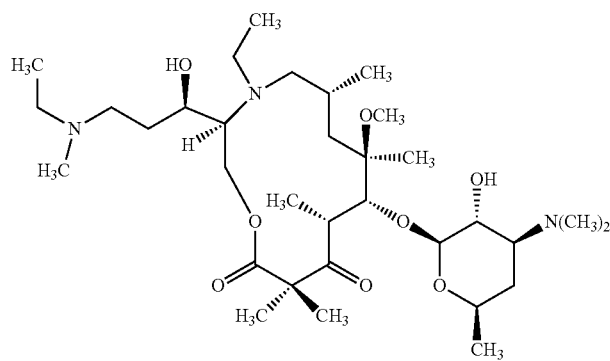 |
| 169 | 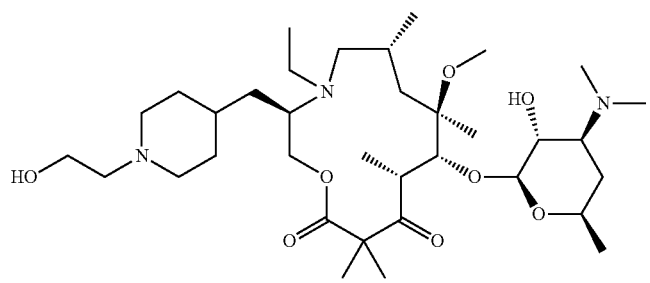 [SMILES: CCN1C[C@H](C)C[C@@](C)(OC)[C@H](O[C@@H]2O[C@H](C)C[C@H](N(C)C)[C@H]2O)[C@@H](C)C(=O)C(C)(C)C(=O)OC[C@H]1CC1CCN(CCO)CC1] |
| 170 | 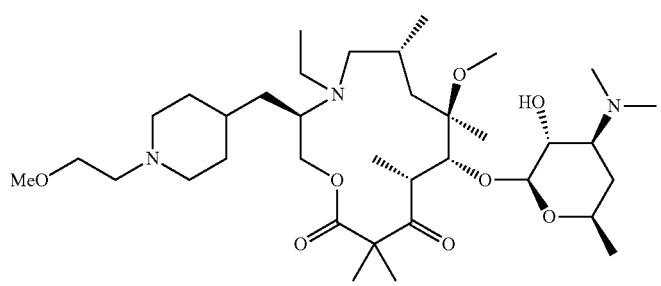 [SMILES: CCN1C[C@H](C)C[C@@](C)(OC)[C@H](O[C@@H]2O[C@H](C)C[C@H](N(C)C)[C@H]2O)[C@@H](C)C(=O)C(C)(C)C(=O)OC[C@H]1CC1CCN(CCOC)CC1] |

-continued
| Compound # | Structure |
|---|---|
| 171 | 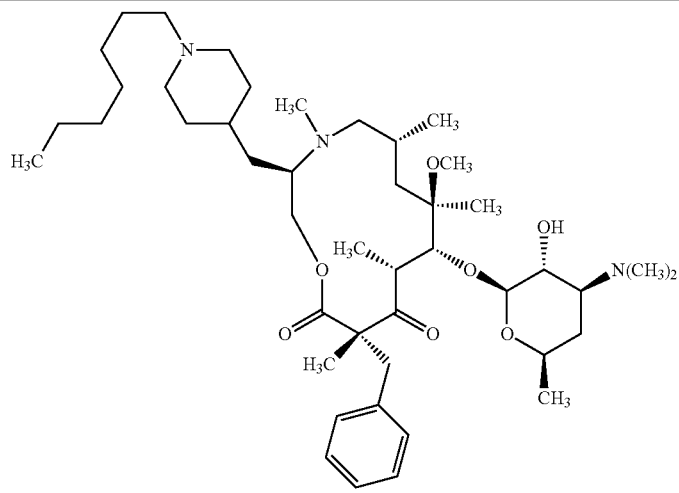 [SMILES: CCCCCCCN1CCC(C[C@@H]2COC(=O)[C@@](C)(Cc3ccccc3)C(=O)[C@H](C)[C@@H](O[C@@H]3O[C@H](C)C[C@H](N(C)C)[C@H]3O)[C@](C)(OC)C[C@@H](C)CN2C)CC1] |
| 172 | 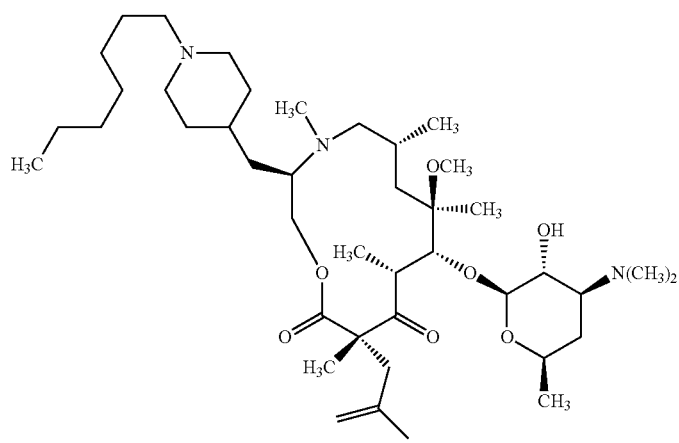 [SMILES: C=C(C)C[C@]1(C)C(=O)OC[C@@H](CC2CCN(CCCCCCC)CC2)N(C)C[C@H](C)C[C@@](C)(OC)[C@H](O[C@@H]2O[C@H](C)C[C@H](N(C)C)[C@H]2O)[C@@H](C)C1=O] |
| 173 | 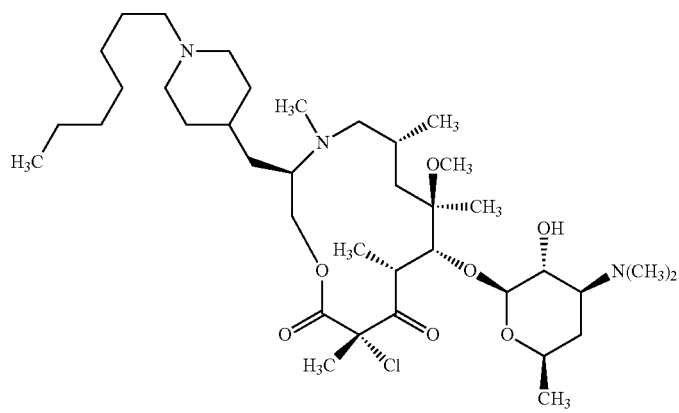 [SMILES: CCCCCCCN1CCC(C[C@@H]2COC(=O)[C@@](C)(Cl)C(=O)[C@H](C)[C@@H](O[C@@H]3O[C@H](C)C[C@H](N(C)C)[C@H]3O)[C@](C)(OC)C[C@@H](C)CN2C)CC1] |

-continued
| Compound # | Structure |
|---|---|
| 174 | 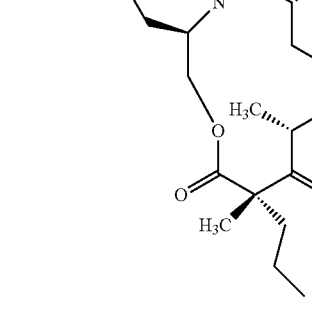 |
| 175 | 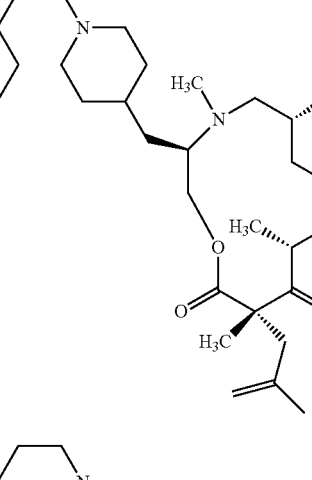 |
| 176 | 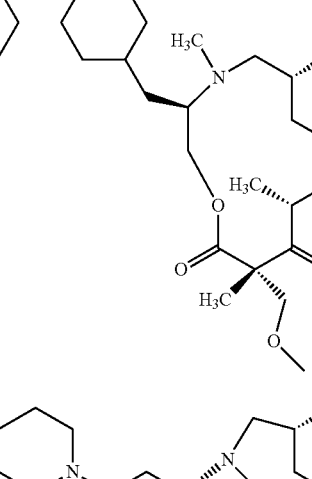 |
| 177 | 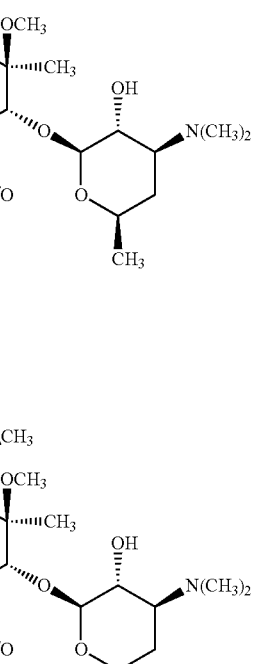 |

-continued
| Compound # | Structure |
|---|---|
| 178 | 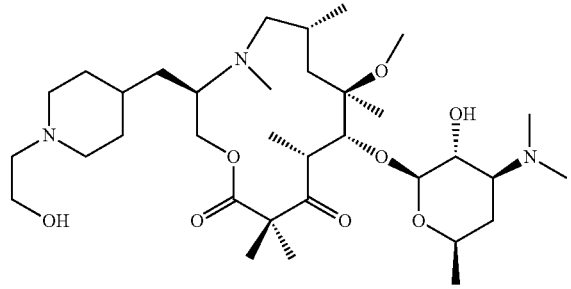 |
| 180 | 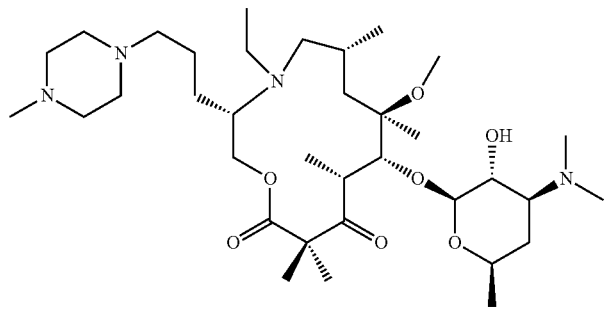 |
| 181 | 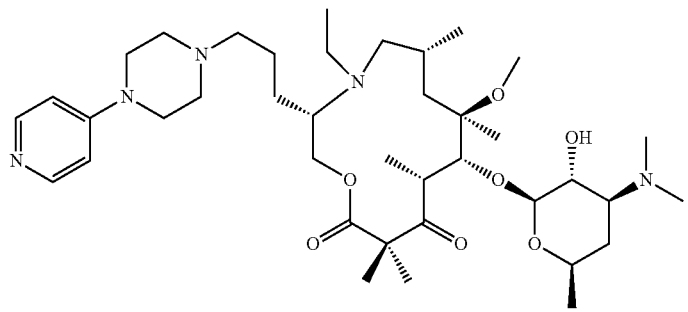 |
| 182 | 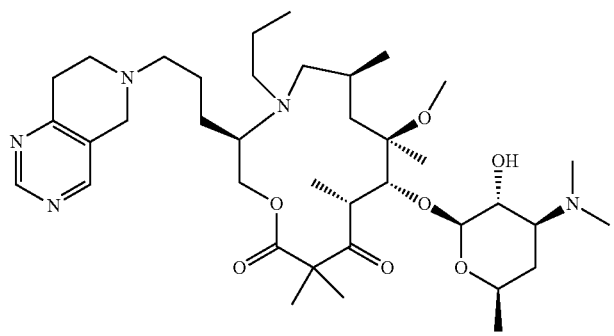 [SMILES: CCCN1C[C@@H](C)C[C@@](C)(OC)[C@H](O[C@@H]2O[C@H](C)C[C@H](N(C)C)[C@H]2O)[C@@H](C)C(=O)C(C)(C)C(=O)OC[C@H]1CCCN1CCc2ncncc2C1] |
| 189 | 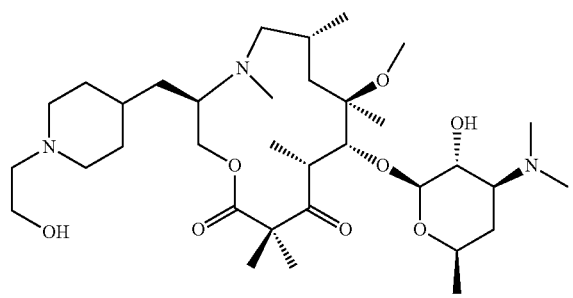 |

-continued
| Compound # | Structure |
|---|---|
| 190 | 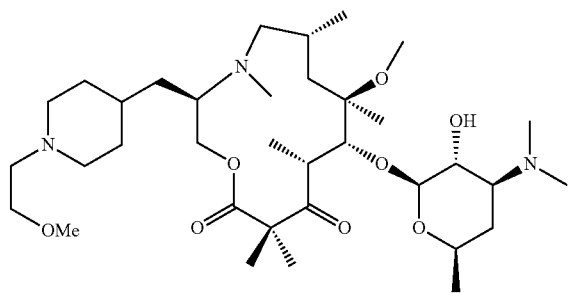 |
| 191 | 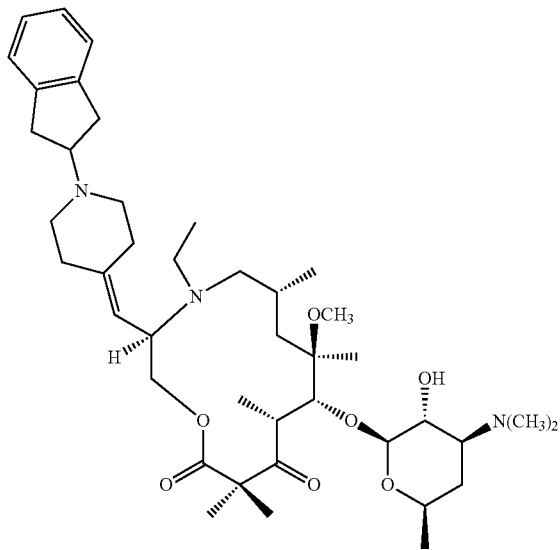 |
| 192 | 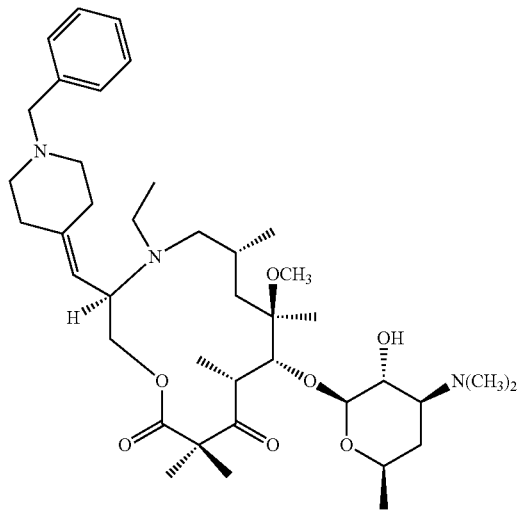 |

| Compound # | Structure |
|---|---|
| 193 | 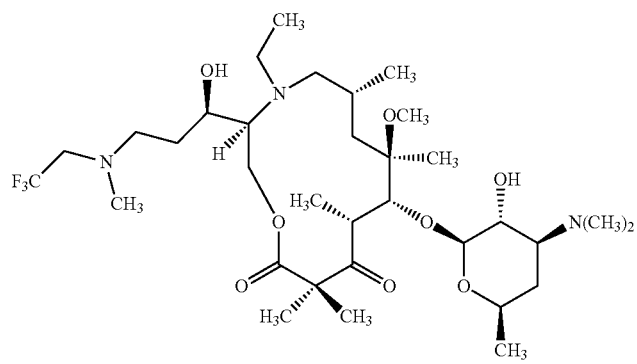 |
| 194 | 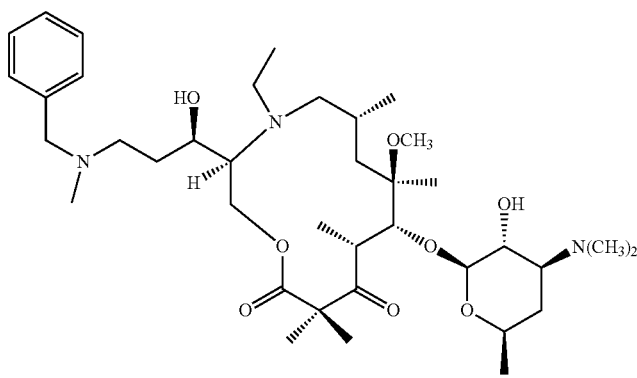 |
| 195 | 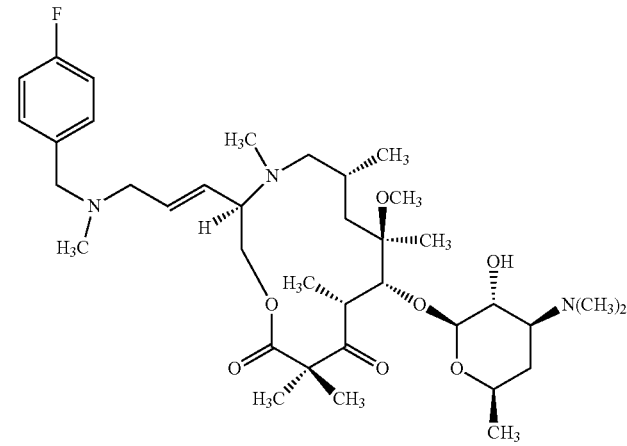 |
| 196 | 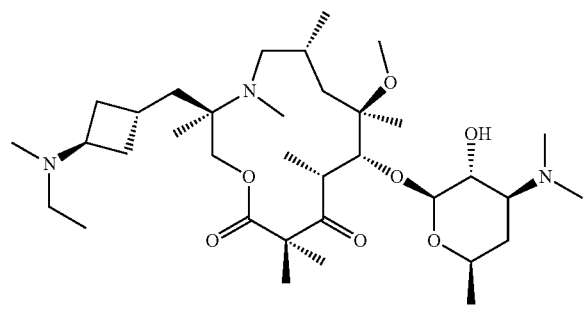 |

-continued

| Compound # | Structure |
|---|---|
| 197 | |
| 198 | |
| 199 | |
| 200 | |
| 201 | |

| Compound # | Structure |
|---|---|
| 202 | 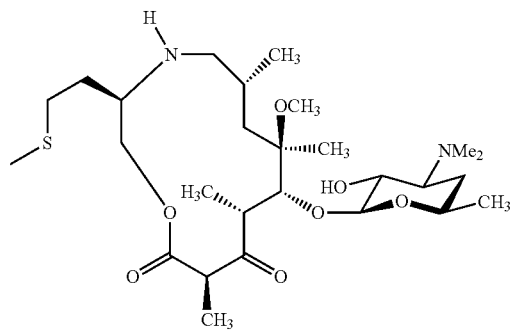 |
| 203 | 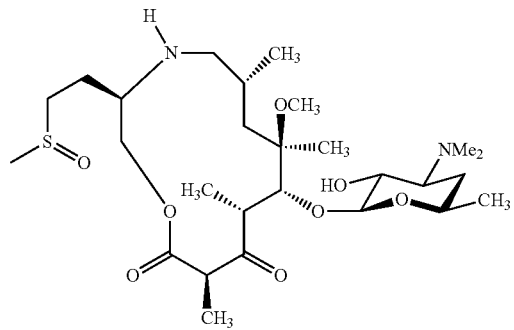 |
| 204 | 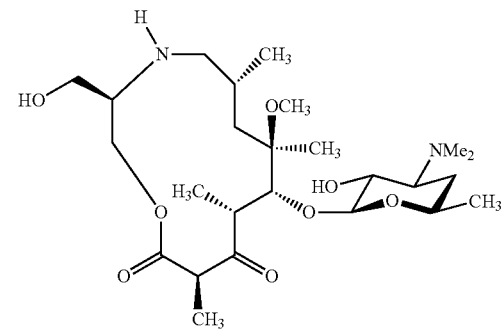 |
| 205 | 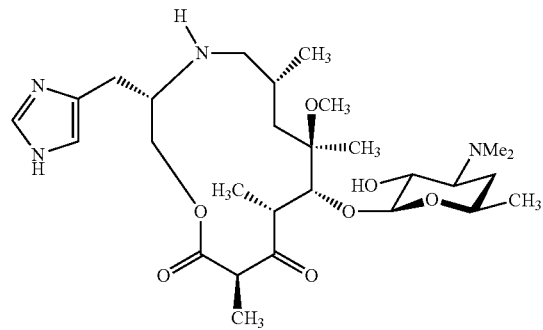 |

| Compound # | Structure |
|---|---|
| 206 | 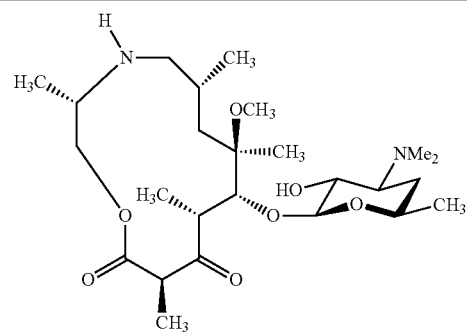 |
| 207 | 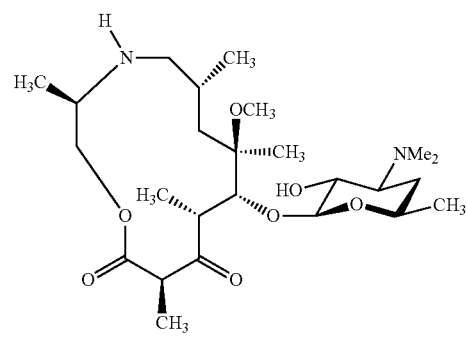 |
| 208 | 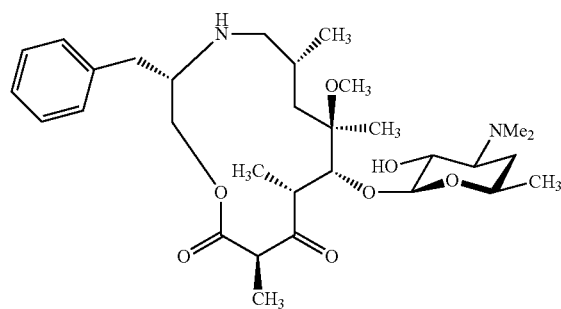 |
| 209 | 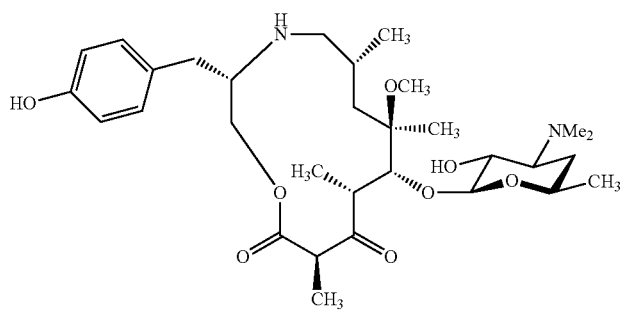 |

| Compound # | Structure |
|---|---|
| 210 | 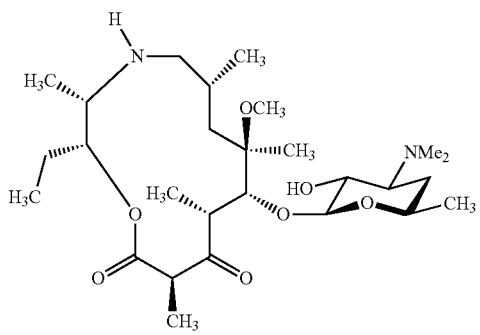 |
| 211 | 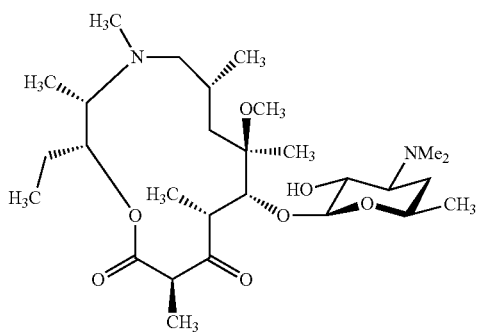 |
| 212 | 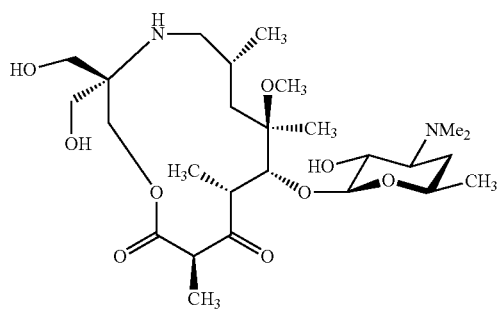 |
| 213 | 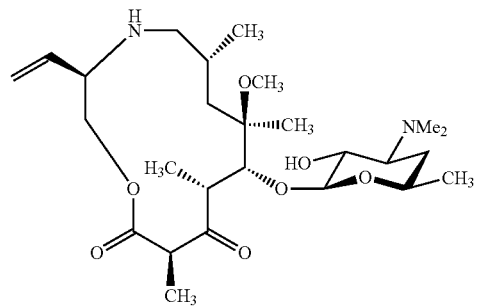 |

| Compound # | Structure |
|---|---|
| 215 | 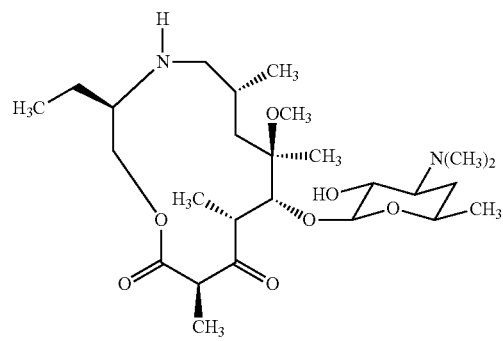 [SMILES: CC[C@@H]1COC(=O)[C@H](C)C(=O)[C@H](C)[C@@H](OC2OC(C)CC(N(C)C)C2O)[C@](C)(OC)C[C@@H](C)CN1] |
| 216 | 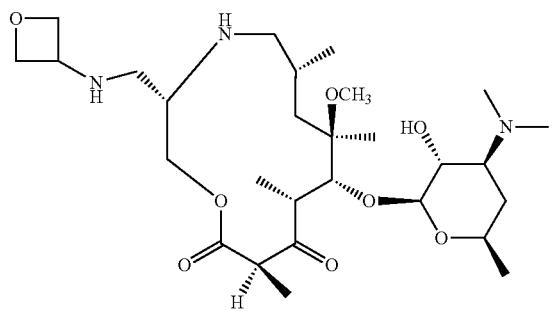 [SMILES: CO[C@]1(C)C[C@@H](C)CN[C@@H](CNC2COC2)COC(=O)[C@H](C)C(=O)[C@H](C)[C@H]1O[C@@H]1O[C@H](C)C[C@H](N(C)C)[C@H]1O] |
| 217 | 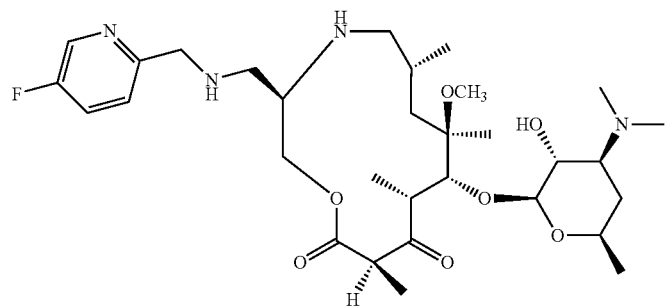 [SMILES: CO[C@]1(C)C[C@@H](C)CN[C@H](CNCc2ccc(F)cn2)COC(=O)[C@H](C)C(=O)[C@H](C)[C@H]1O[C@@H]1O[C@H](C)C[C@H](N(C)C)[C@H]1O] |
| 218 | 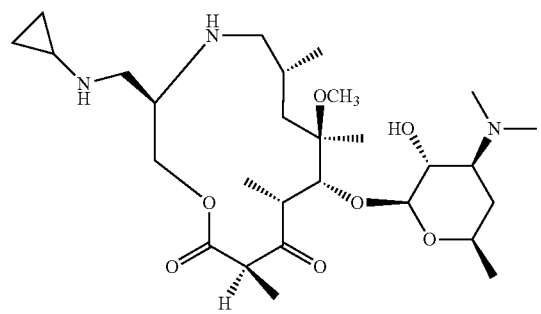 [SMILES: CO[C@]1(C)C[C@@H](C)CN[C@H](CNC2CC2)COC(=O)[C@H](C)C(=O)[C@H](C)[C@H]1O[C@@H]1O[C@H](C)C[C@H](N(C)C)[C@H]1O] |

| Compound # | Structure |
|---|---|
| 219 | 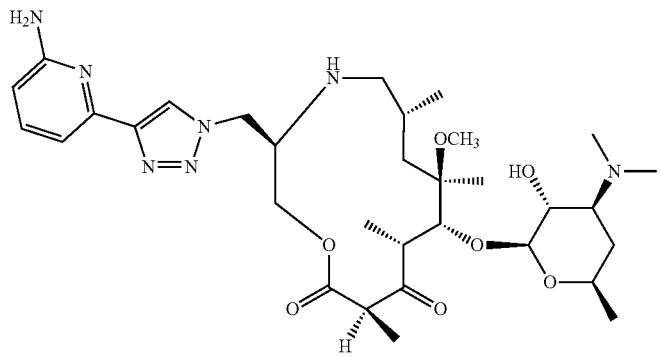 [SMILES: CO[C@]1(C)C[C@@H](C)CN[C@H](Cn2cc(-c3cccc(N)n3)nn2)COC(=O)[C@H](C)C(=O)[C@H](C)[C@H]1O[C@@H]1O[C@H](C)C[C@H](N(C)C)[C@H]1O] |
| 220 | 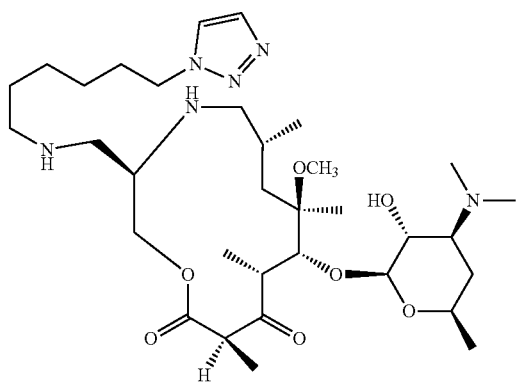 [SMILES: CO[C@]1(C)C[C@@H](C)CN[C@H](CNCCCCCCn2ccnn2)COC(=O)[C@H](C)C(=O)[C@H](C)[C@H]1O[C@@H]1O[C@H](C)C[C@H](N(C)C)[C@H]1O] |
| 221 | 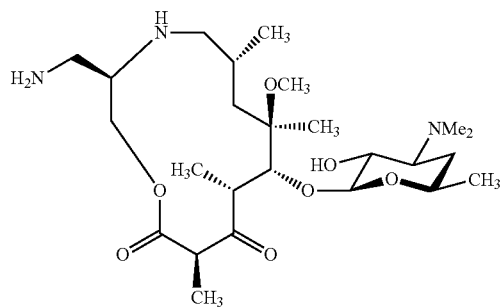 |
| 222 | 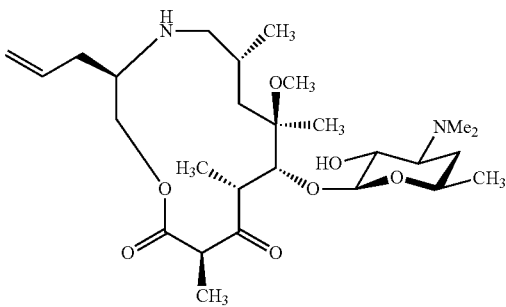 |

-continued
| Compound # | Structure |
|---|---|
| 223 | 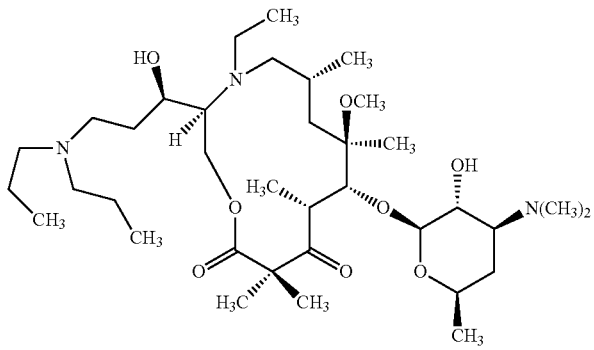 |
| 224 | 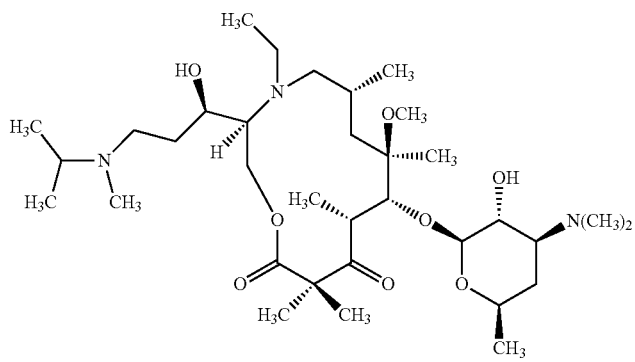 |
| 225 | 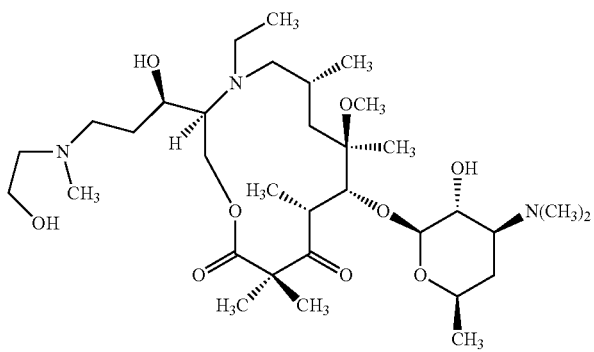 |
| 226 | 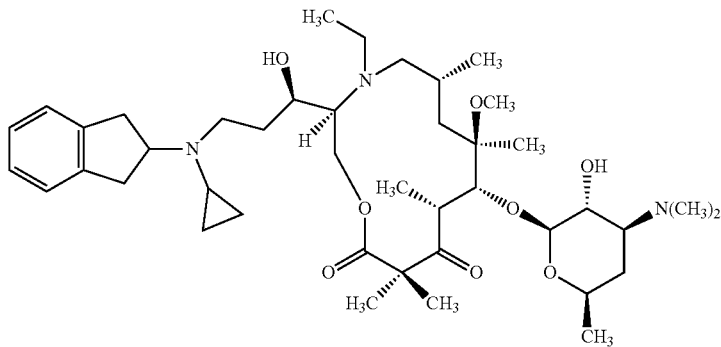 |

| Compound # | Structure |
|---|---|
| 227 | 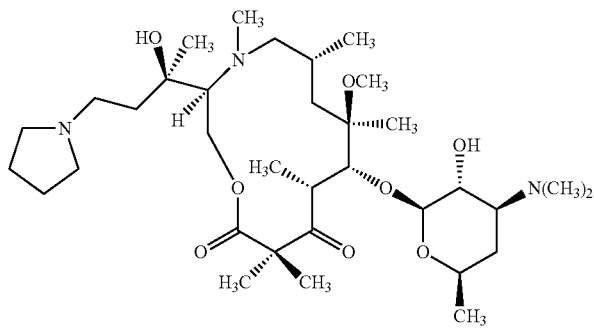 |
| 228 | 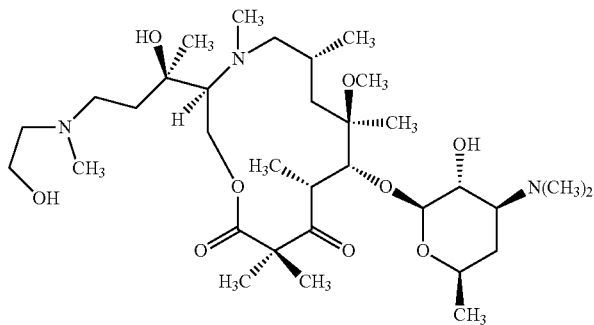 |
| 229 | 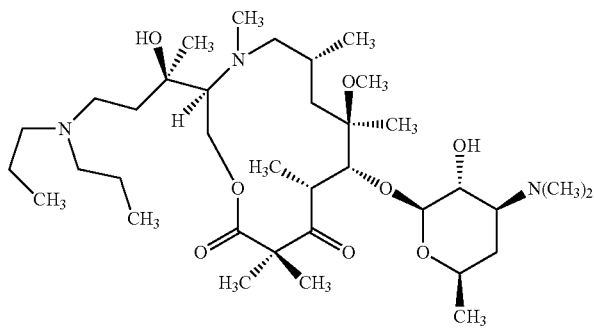 |
| 230 | 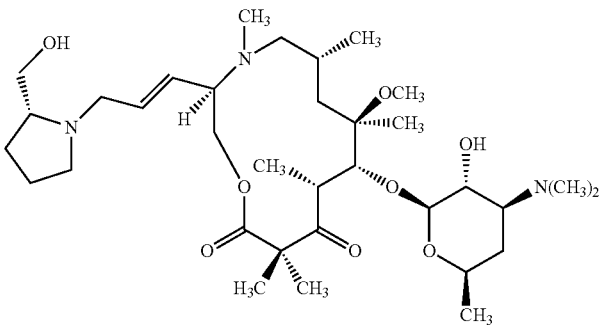 |

| Compound # | Structure |
|---|---|
| 231 | 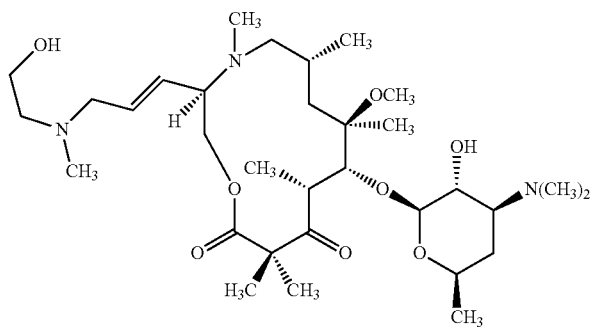 |
| 232 | 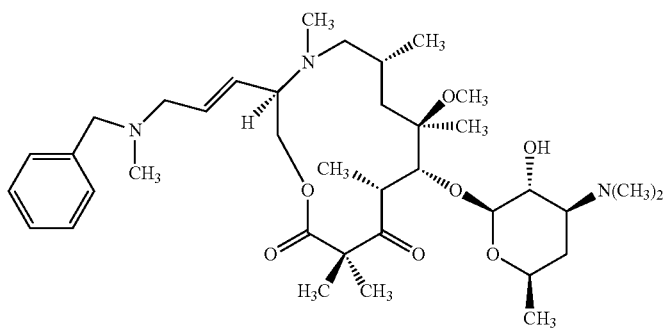 |
| 233 | 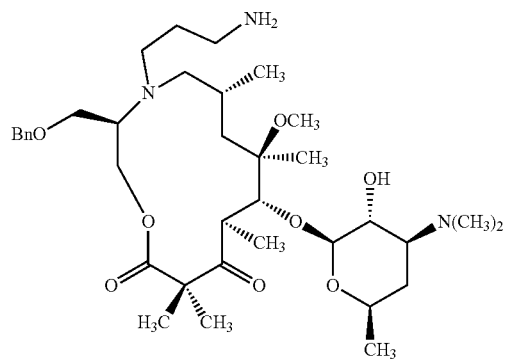 |
| 234 | 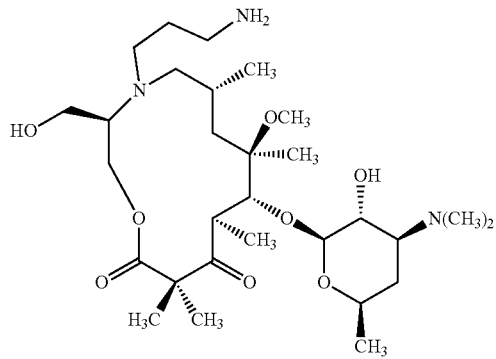 |

-continued
| Compound # | Structure |
|---|---|
| 235 | 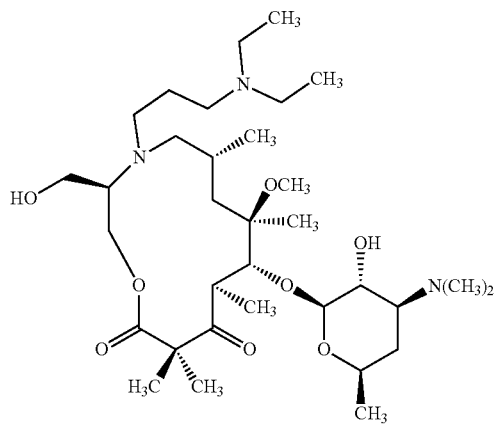 |
| 236 | 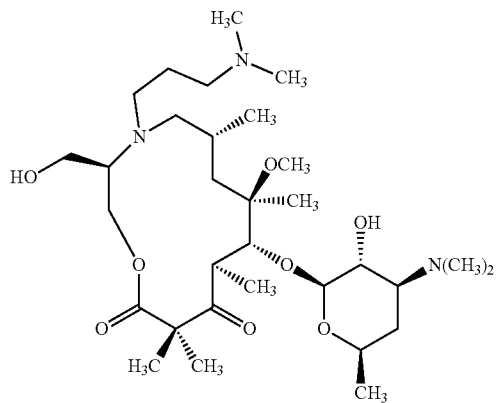 |
| 237 | 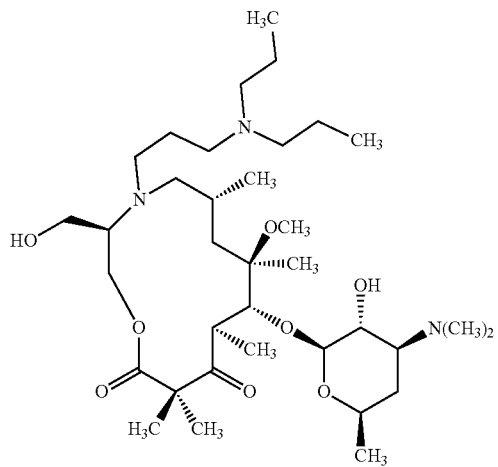 |

| Compound # | Structure |
|---|---|
| 238 | |
| 239 | |
| 240 | |

13. A pharmaceutical composition comprising a compound of claim 1, or a pharmaceutically acceptable salt thereof, and a pharmaceutically acceptable excipient.

14. A kit comprising a compound of claim 1, or pharmaceutically acceptable salt thereof, and instructions for administering to a subject in need thereof.

15. A method of treating an infectious disease in a subject, comprising administering to the subject a compound of claim 1, or pharmaceutically acceptable salt thereof, wherein the infectious disease is a Gram positive bacterial infection or a Gram negative bacterial infection, or the infectious disease is a parasitic infection.

16. The method of claim 15 wherein the bacterial infection is a *Staphylococcus* infection, an *Acinetobacter* infection, a *Klebsiella* infection, an *Escherichia* infection, or a *Pseudomonas* infection.

* * * * *